US005284943A

United States Patent [19]

Tai et al.

[11] Patent Number: 5,284,943

[45] Date of Patent: * Feb. 8, 1994

[54] TATRAAZAPORPHIN, PROCESS FOR PRODUCING THE SAME, AS WELL AS OPTICAL RECORDING MEDIA USING THE SAME AND PRODUCTION PROCESSES THEREOF

[75] Inventors: Seiji Tai; Nobuyuki Hayashi; Koichi Kamijima; Mitsuo Katayose; Takayuki Akimoto; Hideo Hagiwara, all of Hitachi, Japan

[73] Assignee: Hitachi Chemical Company, Co., Tokyo, Japan

[ * ] Notice: The portion of the term of this patent subsequent to Jun. 8, 2010 has been disclaimed.

[21] Appl. No.: 824,582

[22] Filed: Jan. 22, 1992

Related U.S. Application Data

[63] Continuation of Ser. No. 334,290, Apr. 6, 1989, Pat. No. 5,217,856.

[30] Foreign Application Priority Data

| | | | |
|---|---|---|---|
| Apr. 7, 1988 | [JP] | Japan | 63-85965 |
| Jul. 4, 1988 | [JP] | Japan | 63-166349 |
| Jul. 4, 1988 | [JP] | Japan | 63-166350 |
| Jul. 14, 1988 | [JP] | Japan | 63-175381 |
| Aug. 29, 1988 | [JP] | Japan | 63-214572 |
| Nov. 2, 1988 | [JP] | Japan | 63-277969 |
| Nov. 7, 1988 | [JP] | Japan | 63-280558 |
| Nov. 7, 1988 | [JP] | Japan | 63-280559 |
| Nov. 7, 1988 | [JP] | Japan | 63-280560 |
| Dec. 6, 1988 | [JP] | Japan | 63-308545 |
| Jan. 26, 1989 | [JP] | Japan | 1-17151 |
| Jan. 26, 1989 | [JP] | Japan | 1-17152 |
| Jan. 26, 1989 | [JP] | Japan | 1-17153 |
| Jan. 26, 1989 | [JP] | Japan | 1-17154 |
| Jan. 26, 1989 | [JP] | Japan | 1-17155 |
| Jan. 26, 1989 | [JP] | Japan | 1-17156 |
| Jan. 26, 1989 | [JP] | Japan | 1-17157 |
| Jan. 26, 1989 | [JP] | Japan | 1-17158 |
| Jan. 26, 1989 | [JP] | Japan | 1-17159 |

[51] Int. Cl.$^5$ .................... C07D 487/22; C09B 47/00

[52] U.S. Cl. .................................... 540/121; 540/123; 540/124; 540/125; 540/128; 430/270

[58] Field of Search ........................ 540/121, 123-125, 540/128

[56] References Cited

U.S. PATENT DOCUMENTS 5,032,495 7/1991 Albert et al. ........................ 540/124

*Primary Examiner*—Cecilia Tsang
*Assistant Examiner*—Philip I. Datlow
*Attorney, Agent, or Firm*—Antonelli, Terry, Stout & Kraus

[57] ABSTRACT

Special tetraazaporphins containing Si, Ge or Sn as the central metal are useful for forming a recording layer in an optical recording medium.

14 Claims, 87 Drawing Sheets

TATRAAZAPORPHIN, PROCESS FOR PRODUCING THE SAME, AS WELL AS OPTICAL RECORDING MEDIA USING THE SAME AND PRODUCTION PROCESSES THEREOF

This application is a Continuation application of application Ser. No. 334,290, filed Apr. 6, 1989, now U.S. Pat. No. 5,219,856.

BACKGROUND OF THE INVENTION

This invention relates to a tetraazaporphin, a process for producing the same, an optical recording medium using the same, and a process for producing the optical recording medium.

Recently, application of a semiconductor laser light is proposed for writing or reading out in compact discs, video discs, liquid crystal display devices, optical reading machines, etc. or as a light source for electrophotography. Particularly, in the case of optical recording media using semiconductor laser, since a recording or reading head does not contact with a recording medium, the recording medium is characterized by no-friction. Thus, development and research of various recording media have been made. Particularly, in the field of a heat mode recording method, low melting point metals, organic polymers or dyestuffs have been proposed as substances for melting, vaporizing or subliming. Organic thin films containing organic polymers or dyestuffs are known to have a low thermal conductivity, or a low melting or subliming temperature. Thus, various substances such as cyanine dyestuffs, squalium dyestuffs, which are preferable in recording sensitivity, have been proposed as materials for forming recording layers. For example, Japanese Patent Unexamined Publication No. 56-16948 proposes an optical recording medium using dyestuffs as a recording layer.

When cyanine dyestuffs which have properly high reflectance by themselves are used as a recording layer and a dyestuff thin film recording layer is used in a reflection type optical recording medium, the formation of a metal reflecting film is not necessary, the structure of the medium is simplified and deterioration of recording and reading properties can be prevented (e.g. Japanese Patent Unexamined Publication No. 60-7878). But the cyanine dyestuffs and other known dyestuffs have generally low stability against light, so that the dyestuffs are faded by repeated irradiation of light at the time of readout after writing information, and the carrier-to-noise ratio (C/N ratio) of readout is lowered. That is, there is a problem in that stability in reading is worse.

In order to overcome such a problem, it is proposed to use naphthalocyanine dyestuffs excellent in light-fastness as the recording layer (e.g. U.S. Pat. No. 4,725,525).

On the other hand, recording layers of information recording media are formed by a vacuum forming method such as a vacuum deposition method, a sputtering method etc., and a wet method such as a coating method, a dipping method, etc. The wet method is more advantageous than the vacuum forming method economically. Therefore, solubility of dyestuffs in organic solvents becomes important economically and technically in the course of forming recording layers.

Furthermore, in order to make information recording and reading devices smaller, a semiconductor laser is used. Recently, in order to improve a recording density, the emission wavelength is gradually shortened from about 800 nm to about 600 nm. In the case of using a semiconductor laser having such a shortened wavelength, there is a problem in that it is impossible to use known naphthalocyanine derivatives having a maximum absorption at about 810 nm and small absorptions in the wavelength region of 800 nm or less, and a small reflectance.

SUMMARY OF THE INVENTION

It is an object of the present invention to provide compounds having a large absorption for a semiconductor laser which has an emission wavelength in the wavelength region of 800 nm or less, and having a large and sufficient reflectance, high sensitivity, excellent solubility in organic solvents and being usable in optical recording media.

The present invention provides a tetraazaporphin represented by the formula:

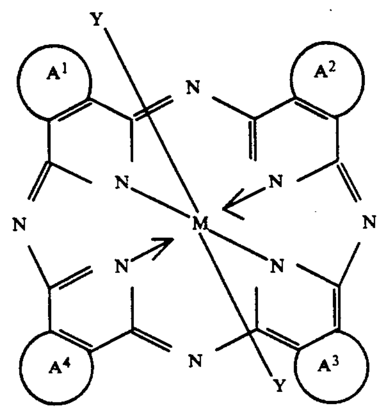

(I)

wherein M is Si, Ge, or Sn; Y is an aryloxy group, an alkoxy group, a trialkylsiloxy group, a triarylsiloxy group, a trialkoxysiloxy group, a triaryloxysiloxy group, a trityloxy group or an acyloxy group, and two Y's may be the same or different; $A^1$, $A^2$, $A^3$ and $A^4$ are independently an aromatic ring which may have one or more organic substituents, and at least one of $A^1$, $A^2$, $A^3$ and $A^4$ is a nitrogen-containing aromatic ring.

The present invention also provides a process for producing the tetraazaporphin of the formula (I), which comprises reacting a compound of the formula:

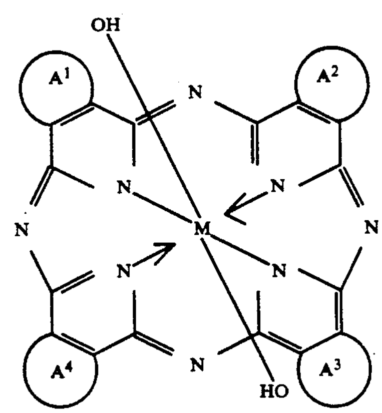

(II)

wherein M, $A^1$, $A_2$, $A^3$ and $A^4$ are as defined in the formula (I), with one member selected from the group consisting of a chlorosilane of the formula:

$(R^{16})_3SiCl$ (III)

wherein $R^{16}$ is an alkyl group, an aryl group, an alkoxy group or an aryloxy group, a silanol of the formula:

$(R^{17})_3SiOH$ (IV)

wherein $R^{17}$ is an alkyl group, an aryl group, an alkoxy group or an aryloxy group, an alcohol of the formula:

$R^{18}OH$ (V)

wherein $R^{18}$ is an alkyl group or an aryl group, and a compound of the formula:

$R^{19}CO.X^2$ (VI)

wherein $R^{19}$ is an alkyl group; and $X^2$ is a halogen atom, a hydroxyl group or an acyloxy group.

The present invention further provides an optical recording medium comprising a substrate and formed thereon a recording layer made of a tetraazaporphin of the formula (I) as a major component, wherein information is recorded on the recording layer by irradiation witha laser light to change the recording layer, and the recorded information is read out by differences in optical densities between the recorded portions thus changed and the portions not irradiated with the laser light and not changed.

The present invention still further provides a process for producing an optical recording medium, which comprises coating a solution of a tetraazaporphin of the formula (I) dissolved in an organic solvent on a substrate to form a recording layer.

BRIEF DESCRIPTION OF THE DRAWINGS

FIGS. 5, 8, 21, 30, 33, 43, 46, 49, 52 and 75 are NMR spectra of the tetraazaporphins obtained in Examples of the present invention.

DESCRIPTION OF THE PREFERRED EMBODIMENTS

Figure 1:
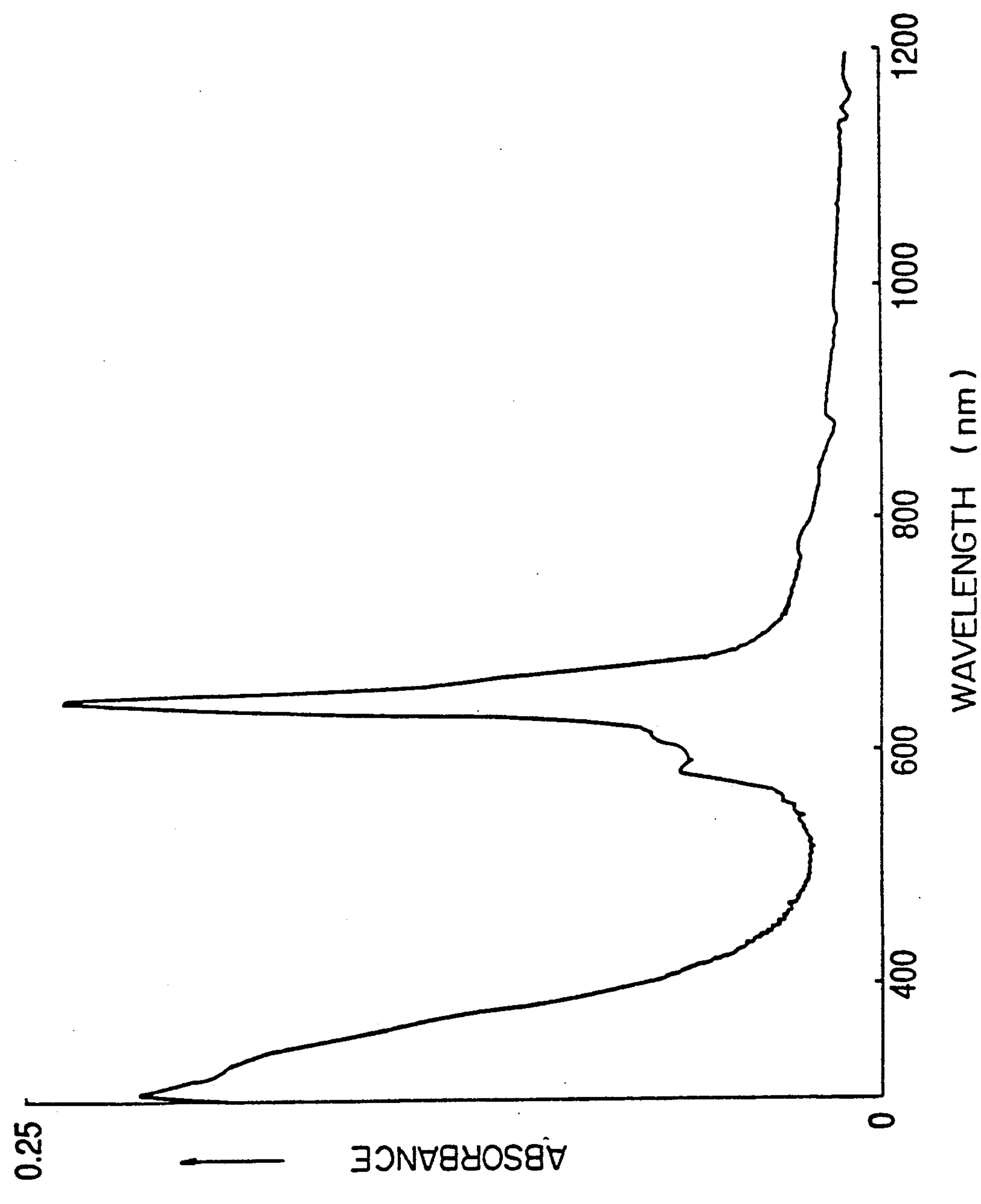
FIGS. 1, 3, 6, 9, 17, 19, 22, 26, 28, 31, 34, 44, 47, 50, 53, 55, 56, 57, 58, 59, 60, 61, 76, 81(*a*) and (*b*) and 82 are electronic spectra of compounds used in working examples.

The tetraazaporphins of the formula (I) are soluble in organic solvents of aromatic hydrocarbons, halogen-containing organic solvents, ethers, ketones, saturated hydrocarbons and alicyclic hydrocarbons, easily purified to improve the purity and do not show changes in absorptions depending on kinds of solvents used and on concentration of the solution. By properly selecting one or more nitrogen-containing aromatic rings as $A^1$, $A^2$, $A^3$ and/or $A^4$, resulting coated films of the tetraazaporphins of the present invention can be applied to semiconductor laser having an emission wavelength in the wavelength region of 800 nm or less, effectively in the wavelength region of 780 nm or less, more effectively in the wavelength region of 740 nm or less, particularly effectively in the wavelength region of 700 nm or less, and most effectively in the wavelength region of 650 nm or less.

Examples of the organic solvents for the tetraazaporphin of the formula (I) are aromatic hydrocarbons such as benzene, toluene, xylene, chlorobenzene, dichlorobenzene, trimethylbenzene, 1-chloronaphthalene, quinoline, etc.; halogen-containing organic solvents such as methylene chloride, chloroform, carbon tetrachloride, trichloroethane, etc.; ethers such as diethyl ether, dibutyl ether, tetrahydrofuran, ethylene glycol monomethyl ether, ethylene glycol dimethyl ether, diethylene glycol monomethyl ether, diethylene glycol dimethyl ether, etc.; ketones such as acetone, methyl ethyl ketone, methyl propyl ketone, cyclopentanone, cyclohexanone, acetone alcohol, etc.; saturated hydrocarbons such as hexane, heptane, octane, nonane, decane, undecane, dodecane, etc.; alicyclic hydrocarbons such as cyclooctane, cyclopentane, cyclohexane, cycloheptane, etc.

The tetraazaporphins of the present invention are represented by the formula:

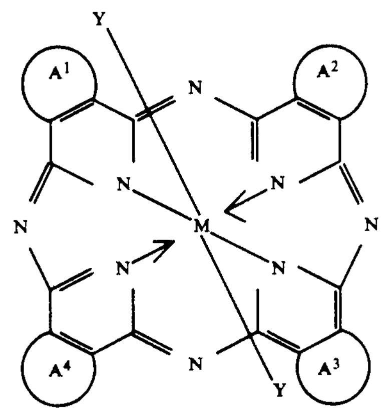

(I)

wherein M is Si, Ge, or Sn; Y is an aryloxy group, an alkoxy group, a trialkylsiloxy group, a triarylsiloxy group, a trialkoxysiloxy group, a triaryloxysiloxy group, a trityloxy group, or an acyloxy group, and two Y's may be the same or different; $A^1$, $A^2$, $A^3$ and $A^4$ are independently an aromatic ring which may have one or more organic substituents, and at least one of $A^1$, $A^2$, $A^3$ and $A^4$ is a nitrogen-containing aromatic ring.

In the formula (I), the aryloxy group includes, for example, a phenoxy group, a tolyloxy group, an anisyloxy group, etc.; the alkoxy group preferably has 1 to 22 carbon atoms and includes, for example, an amyloxy group, a hexyloxy group, an octyloxy group, a decyloxy group, a dodecyloxy group, a tetradecyloxy group, a hexadecyloxy group, an octadecyloxy group, an eicosyloxy group, a docosyloxy group, etc.; the trialkylsiloxy group preferably has 1 to 66 carbon atoms and includes, for example, a trimethylsiloxy group, a triethylsiloxy group, a tripropylsiloxy group, a tributylsiloxy group, a trihexylsiloxy group, a tribenzylsiloxy group, a tricyclohexylsiloxy group, a dimethyl-t-butylsiloxy group, a dimethyloctylsiloxy group, a dimethyloctadecylsiloxy group, a dimethylcyclohexylsiloxy group, a dimethylcyclopentylsiloxy group, a diethylcyclohexylsiloxy group, a diethylcyclopentylsiloxy group, a dipropylcyclohexylsiloxy group, a dipropylcyclopentylsiloxy group, a dibutylcyclohexylsiloxy group, a dibutylcyclopentylsiloxy group, a dicyclohexylmethylsiloxy group, a dicyclohexylethylsiloxy group, a dicyclohexylpropylsiloxy group, a dicyclohexylbutylsiloxy group, a dicyclopentylmethylsiloxy group, a dicyclopentylethylsiloxy group, a dicyclopentylpropylsiloxy group, a dicyclopentylbutylsiloxy group, a dimethylphenylsiloxy group, a dimethylmethoxysiloxy group, a dimethyloctoxysiloxy group, a dimethylphenoxysiloxy group,

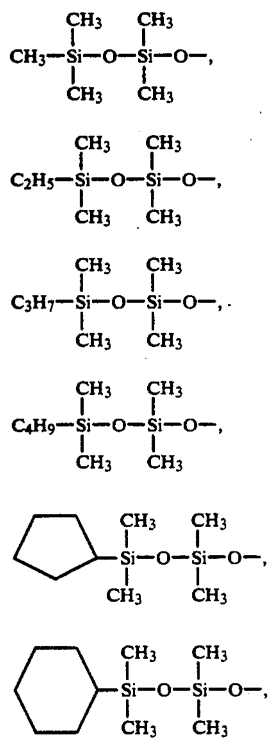

etc.; the triarylsiloxy group includes, for example, a triphenylsiloxy group, a trianisylsiloxy group, a tritolylsiloxy group, etc.; the trialkoxysiloxy group includes, for example, a trimethoxysiloxy group, a triethoxysiloxy group, a tripropoxysiloxy group, a tributoxysiloxy group, etc.; the triaryloxysiloxy group includes, for example, a triphenoxysiloxy group, a trianisyloxysiloxy group, a tritolyloxysiloxy group, etc.; the acyloxy group includes, for example, an acetoxy group, a propionyloxy group, a butyloxy group, a valeryloxy group, a pivaloyloxy group, a hexanoyloxy group, an octanoyloxy group, etc.

In the formula (I), $A^1$, $A^2$, $A^3$ and $A^4$ are independently an aromatic ring which may have one or more organic substituents, and at least one of $A^1$, $A^2$, $A^3$ and $A^4$ is a nitrogen-containing aromatic ring.

Examples of the aromatic ring are

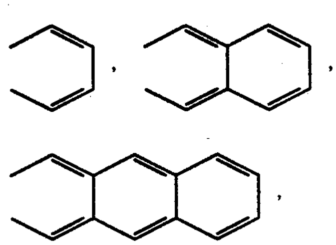

-continued

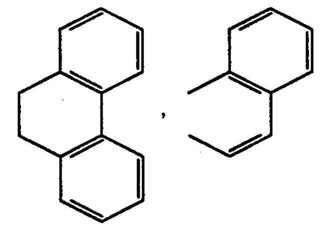

etc.

Examples of the nitrogen-containing aromatic ring are

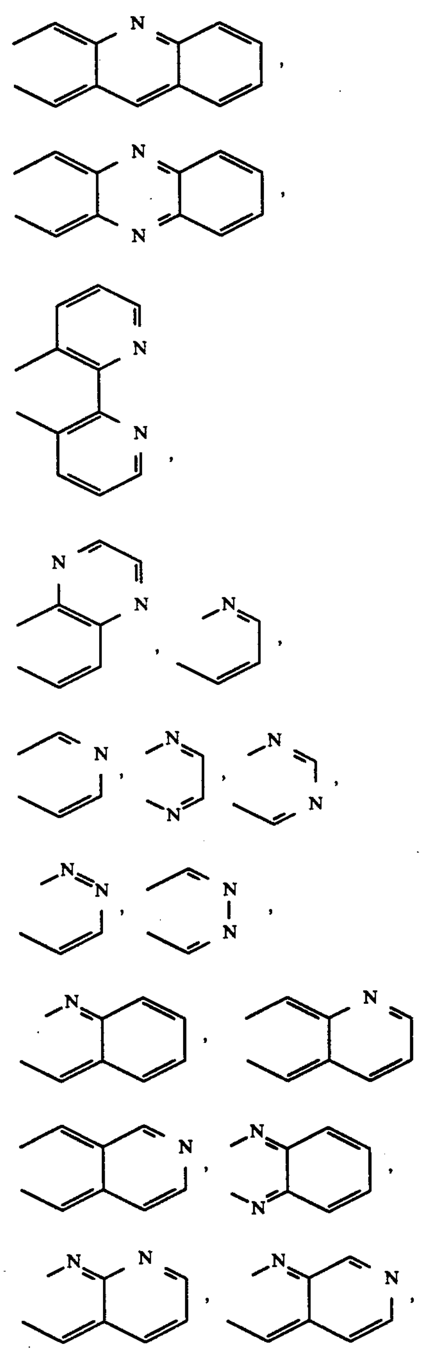

-continued

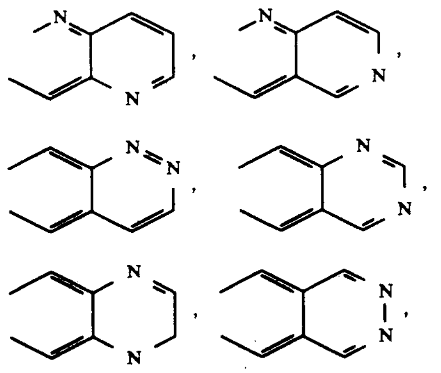

etc.

The organic substituents bound to the aromatic ring in the definition of $A^1$, $A^2$, $A^3$ and $A^4$ are selected from the group consisting of:

—$R^1$,

—$OR_2$, $SiR^3R^4R^5$, $SO_2NR^6R^7$,

—$CO.R^8$,

—$COOR^9$,

—$O.COR^{10}$,

—$CO.NHR^{11}$,

—$NR^{12}R^{13}$,

—$SR^{14}$,

—$SO_2R^{15}$, and

—$X^1$ wherein $R^1$ to $R^{15}$ are independently a hydrogen atom, an alkyl group, an alkyl group having one or more substituents or an aryl group; and $X^1$ is a halogen atom.

The alkyl group in the definition of $R^1$ to $R^{15}$ has preferably 1 to 22 carbon atoms and includes, for example, a methyl group, an ethyl group, an n-propyl group, a sec-propyl group, an n-butyl group, a sec-butyl group, a t-butyl group, an n-amyl group, a t-amyl group, a 2-amyl group, a 3-amyl group, a neopentyl group, a hexyl group, a heptyl group, an octyl group, a decyl group, a dodecyl group, a tetradecyl group, a hexadecyl group, an octadecyl group, an eicosyl group, a docosyl group, a cyclopropyl group, a cyclobutyl group, a cyclopentyl group, a cyclohexyl group, a cycloheptyl group, a cyclooctyl group, a 2-methylcyclopentyl group, a 3-methylcyclopentyl group, a 4-methylcyclohexyl group,

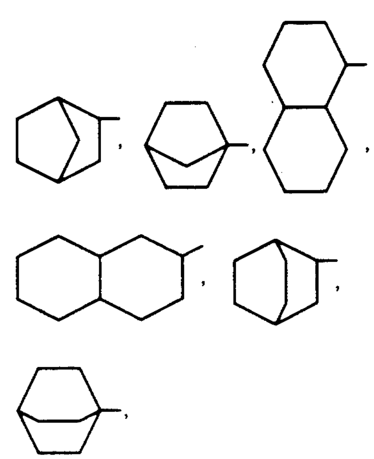

-continued

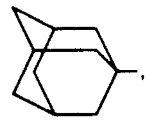

a 1,1-dicyclohexylmethyl group, a 1,1-dicyclopentylmethyl group, a cyclohexylmethyl group, a cyclopropylmethyl group, a 2-cyclohexylethyl group, a 2-cyclopentylethyl group, a 2-cyclohexylpropyl group, a 3-cyclohexylpropyl group, etc.

The alkyl group having a substituent in the definition of $R^1$ to $R^{15}$ includes an alkyl group having an ester group, an alkyl group having an amide group, an alkyl group having a hydroxyl group, an aralkyl group, an alkyl group having a trialkylsilyl group, an alkoxyalkyl group, a haloalkyl group, etc.

The aryl group in the definition of $R^1$ to $R^{15}$ includes a phenyl group, a tolyl group, an anisyl group, a halophenyl group, etc.

The halogen atom in the definition of $X^1$ includes a fluorine atom, a chlorine atom, an iodine atom, and a bromine atom.

In the formula (I), the length of alkyl group in Y and the organic substituents bound to aromatic rings represented by $A^1$, $A^2$, $A^3$ and $A^4$ greatly influences not only the solubility of the tetraazaporphin of the formula (I) in an organic solvent but also the melting point of the compound of the formula (I) as well as spectra (absorption spectrum, transmission spectrum and reflection spectrum) of an amorphous film formed by spin coating a solution obtained by dissolving this compound in an organic solvent on a substrate such as a glass plate.

Particularly, the length of the alkyl group of the substituent Y bound to the central metal M can slightly control the spectra of spin coated film. Therefore, it is possible to change the alkyl chain length of Y depending on the emission wavelength of laser used. The shorter the alkyl chain length becomes, the absorption maximum, the transmission minimum and the reflection maximum shift to longer wavelengths, respectively.

On the other hand, the alkyl chain length in the organic substituents bound to the aromatic rings of $A^1$, $A^2$, $A^3$ and $A^4$ has a function of controlling the solubility in an organic solvent and the melting point of the compound of the formula (I).

The spectra of spin coated films can also be changed greatly depending on the kind of the nitrogen-containing aromatic rings. Therefore, it is possible to select proper nitrogen-containing aromatic rings depending on the emission wavelength of laser to be used.

Among many tetraazaporphins of the formula (I), preferable ones are those having Si or Ge as M, those having trialkylsiloxy groups as two Y's, and those having nitrogen-containing aromatic rings, particularly the same nitrogen-containing aromatic rings, as $A^1$, $A^2$, $A^3$ and $A^4$.

Among the nitrogen-containing aromatic rings, preferable ones are as follows:

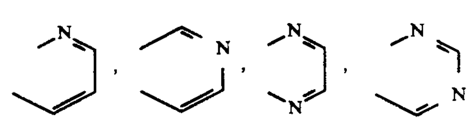

-continued

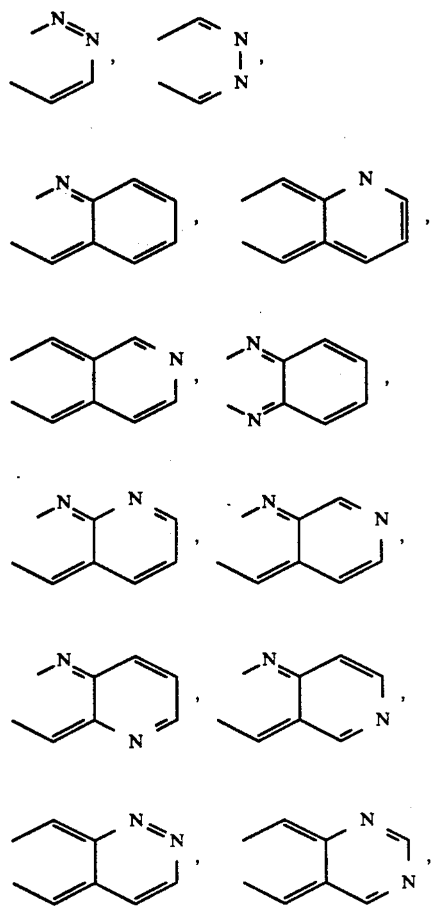

-continued

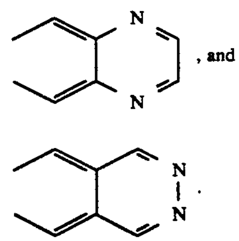

Particularly, the following nitrogen-containing aromatic rings are more preferable:

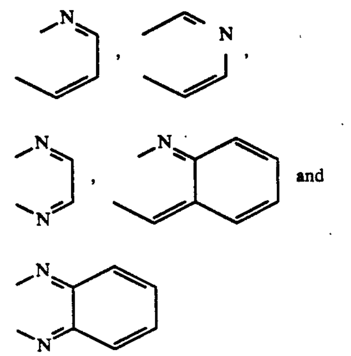

Concrete examples of tetraazaporphins of the formula (I) are listed in Table 1.

There are many isomers of tetraazaporphins of the formula (I) depending on the kinds of aromatic rings represented by $A^1$, $A^2$, $A^3$ and $A^4$, the direction of the aromatic ring condensed, and substituting positions of organic substituents bound to the aromatic rings condensed. The formula (I) includes such many isomers and mixtures thereof.

TABLE 1
| Compound No. | $A^1$ | $A^2$ | $A^3$ | $A^4$ | M | Y |
|---|---|---|---|---|---|---|
| (1) | 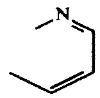 | $=A^1$ | $=A^1$ | $=A^1$ | Si | $OSi(C_6H_{13})_3$ |
| (2) | " | " | " | " | " | $OSi(C_4H_9)_3$ |
| (3) | " | " | " | " | " | $OSi(C_3H_7)_3$ |
| (4) | " | " | " | " | " | $OSi(C_2H_5)_3$ |
| (5) | 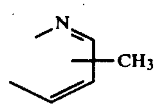 | " | " | " | " | $OSi(C_6H_{13})_3$ |
| (6) | 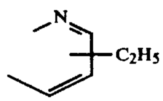 | " | " | " | " | $OSi(C_4H_9)_3$ |
| (7) | 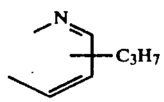 | " | " | " | " | $OSi(C_3H_7)_3$ |
| (8) | 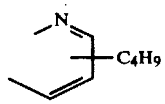 | " | " | " | " | $OSi(C_2H_5)_3$ |
| (9) | 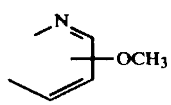 | " | " | " | " | $OSi(C_6H_{13})_3$ |
| (10) | 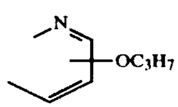 | " | " | " | " | $OSi(C_4H_9)_3$ |
| (11) | 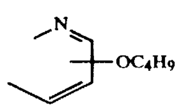 | $=A^1$ | $=A^1$ | $=A^1$ | Si | $OSi(C_3H_7)_3$ |

-continued
| | | | | | | |
|---|---|---|---|---|---|---|
| (12) | 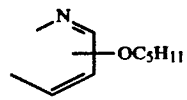 | " | " | " | " | $OSi(C_2H_5)_3$ |
| (13) | 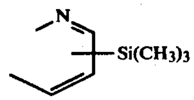 | " | " | " | " | $OSi(C_4H_9)_3$ |
| (14) | 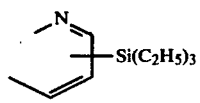 | " | " | " | " | $OSi(C_3H_7)_3$ |
| (15) | 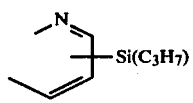 | " | " | " | " | $OSi(C_2H_5)_3$ |
| (16) | 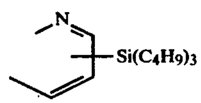 | " | " | " | " | $OSi(CH_3)_3$ |
| (17) | 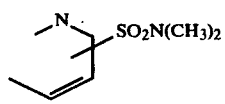 | " | " | " | " | $OSi(C_6H_{13})_3$ |
| (18) | 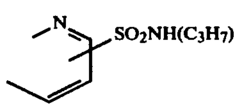 | " | " | " | " | $OSi(C_4H_9)_3$ |
| (19) | 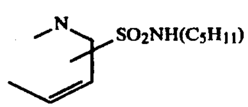 | " | " | " | " | $OSi(C_3H_7)_3$ |
| (20) | 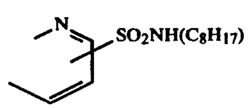 | " | " | " | " | $OSi(C_2H_5)_3$ |

-continued
| | | | | | | |
|---|---|---|---|---|---|---|
| (21) | 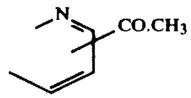 | = $A^1$ | = $A^1$ | = $A^1$ | Si | $OSi(C_6H_{13})_3$ |
| (22) | 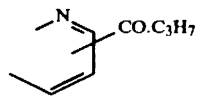 | " | " | " | " | $OSi(C_4H_9)_3$ |
| (23) | 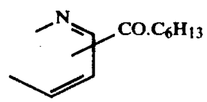 | " | " | " | " | $OSi(C_3H_7)_3$ |
| (24) | 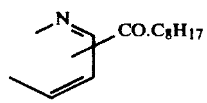 | " | " | " | " | $OSi(C_2H_5)_3$ |
| (25) | 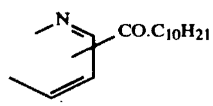 | " | " | " | " | $OSi(CH_3)_3$ |
| (26) | 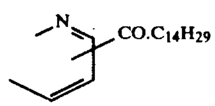 | " | " | " | " | $OSi(CH_3)_3$ |
| (27) | 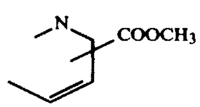 | " | " | " | " | $OSi(C_6H_{13})_3$ |
| (28) | 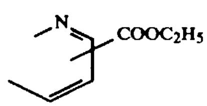 | " | " | " | " | $OSi(C_4H_9)_3$ |
| (29) | 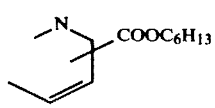 | " | " | " | " | $OSi(C_3H_7)_3$ |

-continued
| | | | | | | |
|---|---|---|---|---|---|---|
| (30) | 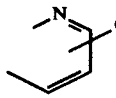 $COOC_{10}H_{21}$ | " | " | " | " | $OSi(C_2H_5)_3$ |
| (31) | 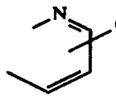 $COOC_{16}H_{33}$ | $= A^1$ | $= A^1$ | $= A^1$ | Si | $OSi(CH_3)_3$ |
| (32) | 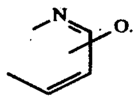 $O.COC_2H_5$ | " | " | " | " | $OSi(C_6H_{13})_3$ |
| (33) | 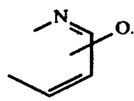 $O.COC_6H_{13}$ | " | " | " | " | $OSi(C_4H_9)_3$ |
| (34) | 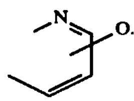 $O.COC_8H_{17}$ | " | " | " | " | $OSi(C_3H_7)_3$ |
| (35) | 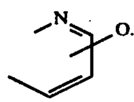 $O.COC_{12}H_{25}$ | " | " | " | " | $OSi(C_2H_5)_3$ |
| (36) | 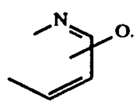 $O.COC_{16}H_{33}$ | " | " | " | " | $OSi(CH_3)_3$ |
| (37) | 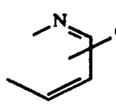 $CO.NH(C_3H_7)$ | " | " | " | " | $OSi(C_6H_{13})_3$ |
| (38) | 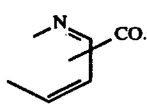 $CO.NH(C_6H_{13})$ | " | " | " | " | $OSi(C_4H_9)_3$ |

-continued
| | | | | | | |
|---|---|---|---|---|---|---|
| (39) | 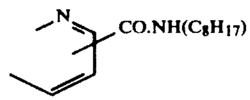 | " | " | " | " | $OSi(C_3H_7)_3$ |
| (40) | 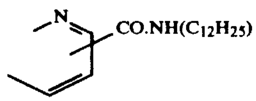 | " | " | " | " | $OSi(C_2H_5)_3$ |
| (41) | 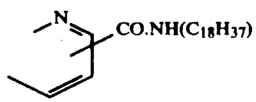 | $= A^1$ | $= A^1$ | $= A^1$ | Si | $OSi(CH_3)_3$ |
| (42) | 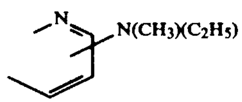 | " | " | " | " | $OSi(C_6H_{13})_3$ |
| (43) | 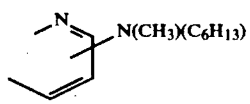 | " | " | " | " | $OSi(C_4H_9)_3$ |
| (44) | 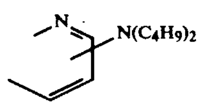 | " | " | " | " | $OSi(C_3H_7)_3$ |
| (45) | 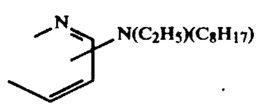 | " | " | " | " | $OSi(C_2H_5)_3$ |
| (46) | 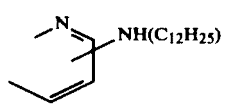 | " | " | " | " | $OSi(CH_3)_3$ |
| (47) | 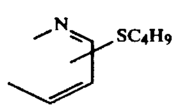 | " | " | " | " | $OSi(C_6H_{13})_3$ |

-continued
| | | | | | |
|---|---|---|---|---|---|
| (48) | 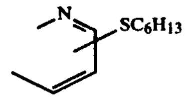 | " | " | " | " $OSi(C_4H_9)_3$ |
| (49) | 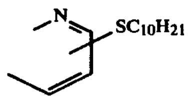 | " | " | " | " $OSi(C_3H_7)_3$ |
| (50) | 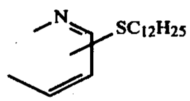 | " | " | " | " $OSi(C_2H_5)_3$ |
| (51) | 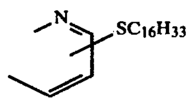 | $=A^1$ | $=A^1$ | $=A^1$ | Si $OSi(CH_3)_3$ |
| (52) | 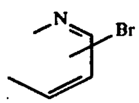 | " | " | " | " $OSi(C_6H_{13})_3$ |
| (53) | 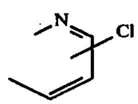 | " | " | " | " $OSi(C_4H_9)_3$ |
| (54) | 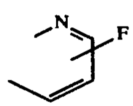 | " | " | " | " $OSi(C_3H_7)_3$ |
| (55) | 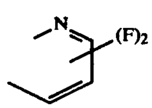 | " | " | " | " $OSi(C_2H_5)_3$ |
| (56) | 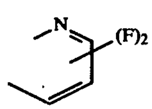 | " | " | " | " $OSi(CH_3)_3$ |

-continued
| | | | | | | |
|---|---|---|---|---|---|---|
| (57) | 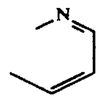 | " | " | " | Ge | $OSi(C_4H_9)_3$ |
| (58) | 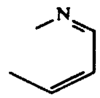 | " | " | " | " | $OSi(C_2H_5)_3$ |
| (59) | 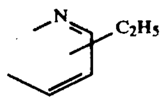 | " | " | " | " | $OSi(C_4H_9)_3$ |
| (60) | 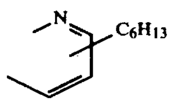 | " | " | " | " | $OSi(C_2H_5)_3$ |
| (61) | 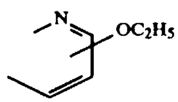 | $= A^1$ | $= A^1$ | $= A^1$ | Ge | $OSi(C_4H_9)_3$ |
| (62) | 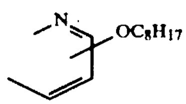 | " | " | " | " | $OSi(C_2H_5)_3$ |
| (63) | 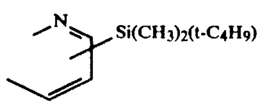 | " | " | " | " | $OSi(C_4H_9)_3$ |
| (64) | 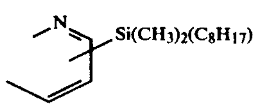 | " | " | " | " | $OSi(C_2H_5)_3$ |
| (65) | 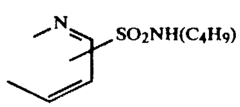 | " | " | " | " | $OSi(C_4H_9)_3$ |

-continued
| | | | | | | |
|---|---|---|---|---|---|---|
| (66) | 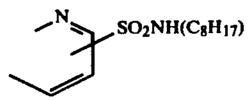 | " | " | " | " | $OSi(C_2H_5)_3$ |
| (67) | 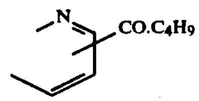 | " | " | " | " | $OSi(C_4H_9)_3$ |
| (68) | 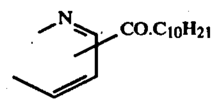 | " | " | " | " | $OSi(C_2H_5)_3$ |
| (69) | 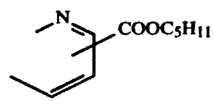 | " | " | " | " | $OSi(C_4H_9)_3$ |
| (70) | 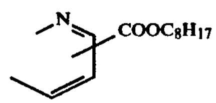 | " | " | " | " | $OSi(C_2H_5)_3$ |
| (71) | 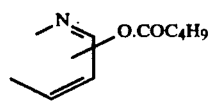 | $= A^1$ | $= A^1$ | $= A^1$ | Ge | $OSi(C_4H_9)_3$ |
| (72) | 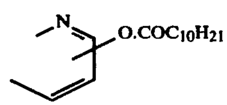 | " | " | " | " | $OSi(C_2H_5)_3$ |
| (73) | 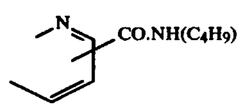 | " | " | " | " | $OSi(C_4H_9)_3$ |
| (74) | 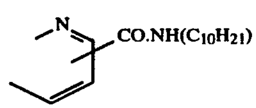 | " | " | " | " | $OSi(C_2H_5)_3$ |

-continued
| | | | | | |
|---|---|---|---|---|---|
| (75) | 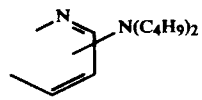 | " | " | " | " $OSi(C_4H_9)_3$ |
| (76) | 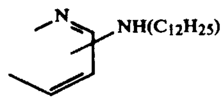 | " | " | " | " $OSi(C_2H_5)_3$ |
| (77) | 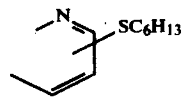 | " | " | " | " $OSi(C_4H_9)_3$ |
| (78) | 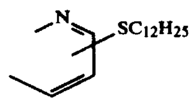 | " | " | " | " $OSi(C_2H_5)_3$ |
| (79) | 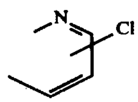 | " | " | " | " $OSi(C_4H_9)_3$ |
| (80) | 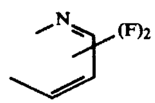 | " | " | " | " $OSi(C_2H_5)_3$ |
| (81) | 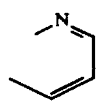 | $= A^1$ | $= A^1$ | $= A^1$ | Sn $OSi(C_4H_9)_3$ |
| (82) | 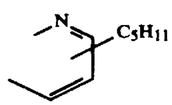 | " | " | " | " $OSi(C_4H_9)_3$ |
| (83) | 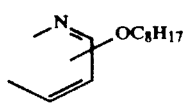 | " | " | " | " $OSi(C_4H_9)_3$ |

-continued
| | | | | | | |
|---|---|---|---|---|---|---|
| (84) | 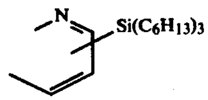 | ″ | ″ | ″ | ″ | $OSi(C_2H_5)_3$ |
| (85) | 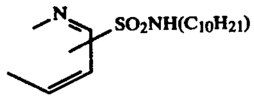 | ″ | ″ | ″ | ″ | $OSi(C_4H_9)_3$ |
| (86) | 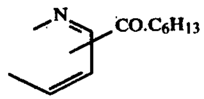 | ″ | ″ | ″ | ″ | $OSi(C_4H_9)_3$ |
| (87) | 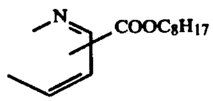 | ″ | ″ | ″ | ″ | $OSi(C_2H_5)_3$ |
| (88) | 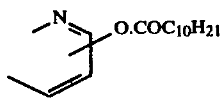 | ″ | ″ | ″ | ″ | $OSi(C_2H_5)_3$ |
| (89) | 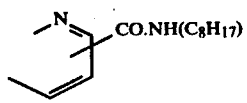 | ″ | ″ | ″ | ″ | $OSi(C_4H_9)_3$ |
| (90) | 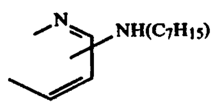 | ″ | ″ | ″ | ″ | $OSi(C_4H_9)_3$ |
| (91) | 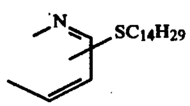 | $= A^1$ | $= A^1$ | $= A^1$ | Sn | $OSi(C_2H_5)_3$ |
| (92) | 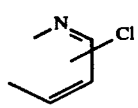 | ″ | ″ | ″ | ″ | $OSi(C_2H_5)_3$ |

-continued
| | | | | | | |
|---|---|---|---|---|---|---|
| (93) | 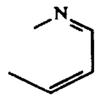 | " | " | " | Si | $OSi(CH_3)_2(OC_2H_4OCH_3)$ |
| (94) | 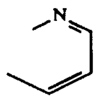 | " | " | " | " | $OSi(CH_3)_2(OC_2H_4OCOCH_3)$ |
| (95) | 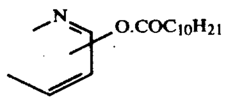 | " | " | " | " | $OC_{18}H_{37}$ |
| (96) | 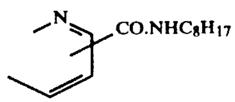 | " | " | " | " | $OC_{22}H_{45}$ |
| (97) | 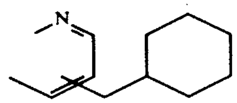 | " | " | " | " | $OSi(C_3H_7)_3$ |
| (98) | 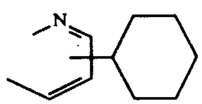 | " | " | " | " | $OSi(C_2H_5)_3$ |
| (99) | 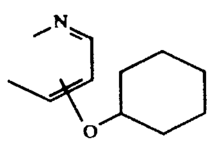 | " | " | " | " | $OSi(C_6H_{13})_3$ |
| (100) | 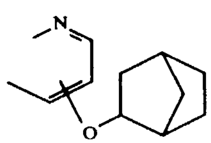 | " | " | " | " | $OSi(C_4H_9)_3$ |
| (101) | 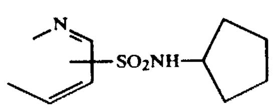 | $= A^1$ | $= A^1$ | $= A^1$ | Si | $OSi(C_3H_7)_3$ |

-continued
| | | | | | | |
|---|---|---|---|---|---|---|
| (102) | 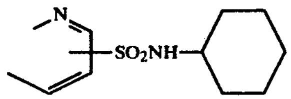 | " | " | " | " | $OSi(C_2H_5)_3$ |
| (103) | 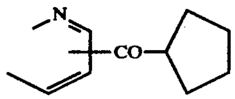 | " | " | " | " | $OSi(C_6H_{13})_3$ |
| (104) | 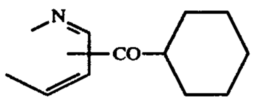 | " | " | " | " | $OSi(C_4H_9)_3$ |
| (105) | 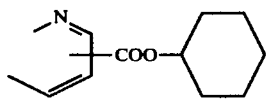 | " | " | " | " | $OSi(C_3H_7)_3$ |
| (106) | 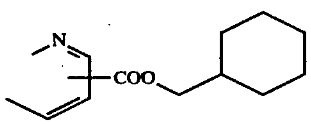 | " | " | " | " | $OSi(C_2H_5)_3$ |
| (107) | 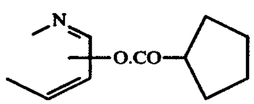 | " | " | " | " | $OSi(C_4H_9)_3$ |
| (108) | 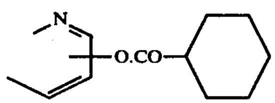 | " | " | " | " | $OSi(C_3H_7)_3$ |
| (109) | 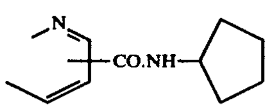 | " | " | " | " | $OSi(C_6H_{13})_3$ |

-continued
| | | | | | | |
|---|---|---|---|---|---|---|
| (110) | 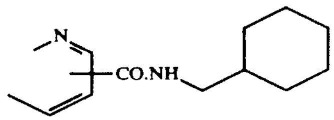 | ″ | ″ | ″ | ″ | $OSi(C_4H_9)_3$ |
| (111) | 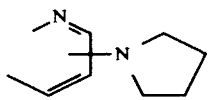 | $= A^1$ | $= A^1$ | $= A^1$ | Si | $OSi(C_4H_9)_3$ |
| (112) | 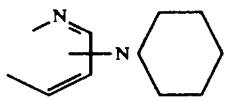 | ″ | ″ | ″ | ″ | $OSi(C_3H_7)_3$ |
| (113) | 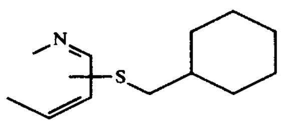 | ″ | ″ | ″ | ″ | $OSi(C_2H_5)_3$ |
| (114) | 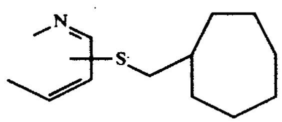 | ″ | ″ | ″ | ″ | $OSi(CH_3)_3$ |
| (115) | 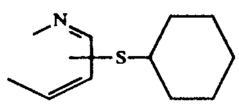 | ″ | ″ | ″ | ″ | $OSi(C_6H_{13})_3$ |
| (116) | 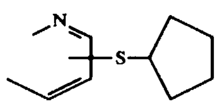 | ″ | ″ | ″ | ″ | $OSi(C_4H_9)_3$ |
| (117) | 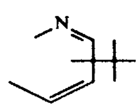 | ″ | ″ | ″ | ″ | $OSi(C_4H_9)_3$ |

-continued
| | | | | | | |
|---|---|---|---|---|---|---|
| (118) | 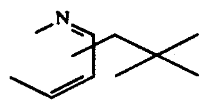 | " | " | " | " | $OSi(C_4H_9)_3$ |
| (119) | 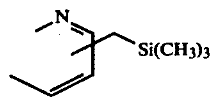 | " | " | " | " | $OSi(C_3H_7)_3$ |
| (120) | 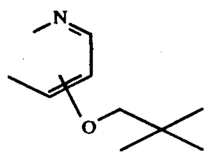 | " | " | " | " | $OSi(C_2H_5)_3$ |
| (121) | 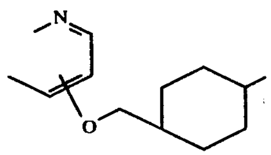 | $= A^1$ | $= A^1$ | $= A^1$ | Si | $OSi(C_2H_5)_3$ |
| (122) | 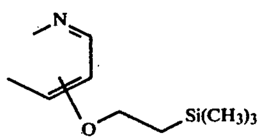 | " | " | " | " | $OSi(C_2H_5)_3$ |
| (123) | 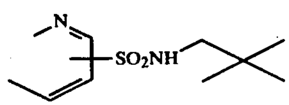 | " | " | " | " | $OSi(C_6H_{13})_3$ |
| (124) | 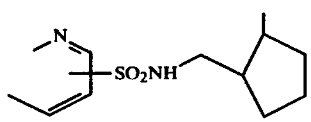 | " | " | " | " | $OSi(C_6H_{13})_3$ |
| (125) | 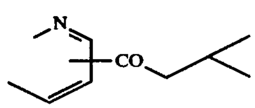 | " | " | " | " | $OSi(C_4H_9)_3$ |

-continued
| | | | | | |
|---|---|---|---|---|---|
| (126) | 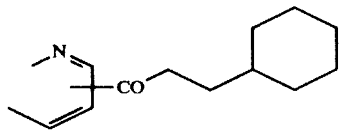 | " | " | " | " $OSi(C_3H_7)_3$ |
| (127) | 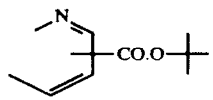 | " | " | " | " $OSi(C_4H_9)_3$ |
| (128) | 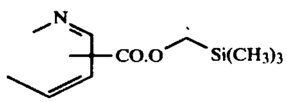 | " | " | " | " $OSi(C_2H_5)_3$ |
| (129) | 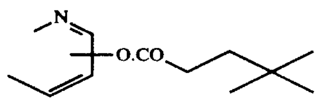 | " | " | " | " $OSi(CH_3)_3$ |
| (130) | 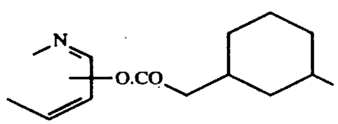 | " | " | " | " $OSi(C_2H_5)_3$ |
| (131) | 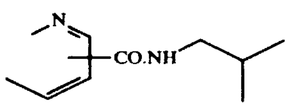 | $= A^1$ | $= A^1$ | $= A^1$ | Si $OSi(C_6H_{13})_3$ |
| (132) | 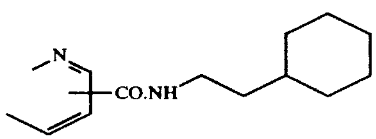 | " | " | " | " $OSi(C_4H_9)_3$ |
| (133) | 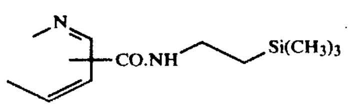 | " | " | " | " $OSi(C_2H_5)_3$ |

-continued
| | | | | | |
|---|---|---|---|---|---|
| (134) | 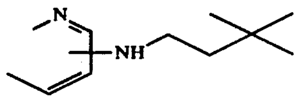 | " | " | " | " $OSi(C_3H_7)_3$ |
| (135) | 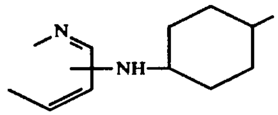 | " | " | " | " $OSi(C_4H_9)_3$ |
| (136) | 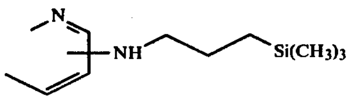 | " | " | " | " $OSi(CH_3)_3$ |
| (137) | 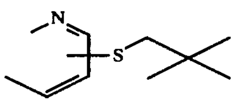 | " | " | " | " $OSi(C_2H_5)_3$ |
| (138) | 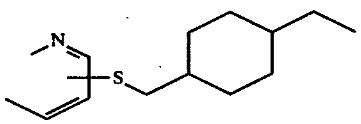 | " | " | " | " $OSi(C_3H_7)_3$ |
| (139) | 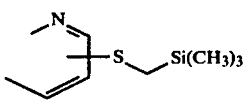 | " | " | " | " $OSi(C_2H_5)_3$ |
| (140) | 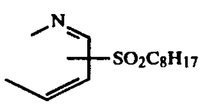 | " | " | " | " $OSi(C_4H_9)_3$ |
| (141) | 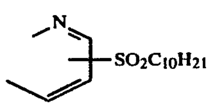 | $= A^1$ | $= A^1$ | $= A^1$ | Si $OSi(C_2H_5)_3$ |

-continued
| | | | | | |
|---|---|---|---|---|---|
| (142) | 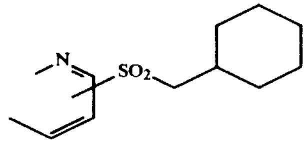 | " | " | " | Si $OSi(C_6H_{13})_3$ |
| (143) | 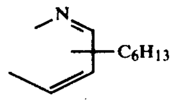 | " | " | " | " OSi 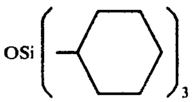 |
| (144) | 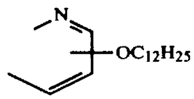 | " | " | " | " $OSi(CH_3)_2$ 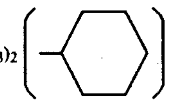 |
| (145) | 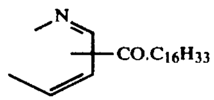 | " | " | " | " $OSi(CH_3)_2(t\text{-}C_4H_9)$ |
| (146) | 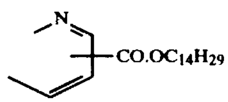 | " | " | " | " OSi 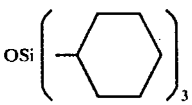 |
| (147) | 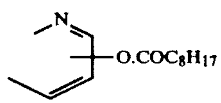 | " | " | " | " OSi 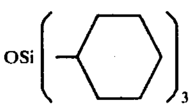 |
| (148) | 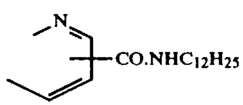 | " | " | " | " $OSi(CH_3)_2$ 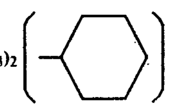 |
| (149) | 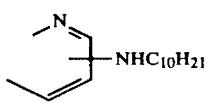 | " | " | " | " $OSi(CH_3)_2$ 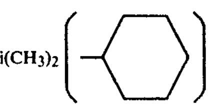 |

-continued
| | | | | | |
|---|---|---|---|---|---|
| (150) | 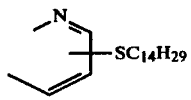 | " | " | " | " OSi(CH3)2 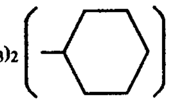 |
| (151) | 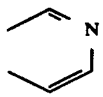 | = A1 | = A1 | = A1 | Si OSi(C6H13)3 |
| (152) | " | " | " | " | " OSi(C4H9)3 |
| (153) | " | " | " | " | " OSi(C3H7)3 |
| (154) | " | " | " | " | " OSi(C2H5)3 |
| (155) | 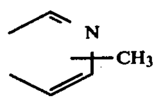 | " | " | " | " OSi(C6H13)3 |
| (156) | 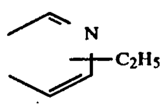 | " | " | " | " OSi(C4H9)3 |
| (157) | 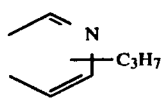 | " | " | " | " OSi(C3H7)3 |
| (158) | 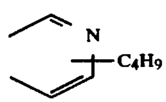 | " | " | " | " OSi(C2H5)3 |
| (159) | 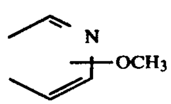 | " | " | " | " OSi(C6H13)3 |
| (160) | 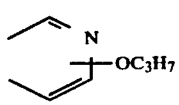 | " | " | " | " OSi(C4H9)3 |

-continued
| | | | | | |
|---|---|---|---|---|---|
| (161) | 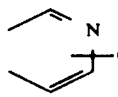 $-OC_4H_9$ | $=A^1$ | $=A^1$ | $=A^1$ | Si $OSi(C_3H_7)_3$ |
| (162) | 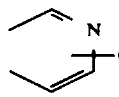 $-OC_5H_{11}$ | " | " | " | " $OSi(C_2H_5)_3$ |
| (163) | 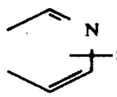 $-Si(CH_3)_3$ | " | " | " | " $OSi(C_4H_9)_3$ |
| (164) | 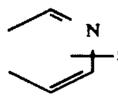 $-Si(C_2H_5)_3$ | " | " | " | " $OSi(C_3H_7)_3$ |
| (165) | 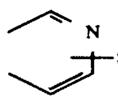 $-Si(C_3H_7)_3$ | " | " | " | " $OSi(C_2H_5)_3$ |
| (166) | 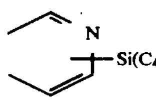 $-Si(C_4H_9)_3$ | " | " | " | " $OSi(CH_3)_3$ |
| (167) | 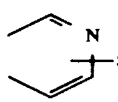 $-SO_2N(CH_3)_2$ | " | " | " | " $OSi(C_6H_{13})_3$ |
| (168) | 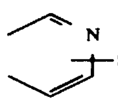 $-SO_2NH(C_3H_7)$ | " | " | " | " $OSi(C_4H_9)_3$ |
| (169) | 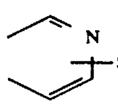 $-SO_2NH(C_5H_{11})$ | " | " | " | " $OSi(C_3H_7)_3$ |

-continued
| | | | | | |
|---|---|---|---|---|---|
| (170) | 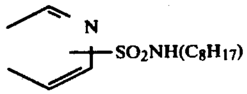 | " | " | " | " $OSi(C_2H_5)_3$ |
| (171) | 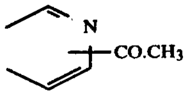 | $= A^1$ | $= A^1$ | $= A^1$ | Si $OSi(C_6H_{13})_3$ |
| (172) | 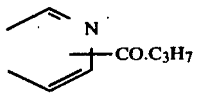 | " | " | " | " $OSi(C_4H_9)_3$ |
| (173) | 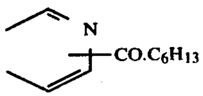 | " | " | " | " $OSi(C_3H_7)_3$ |
| (174) | 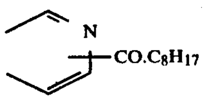 | " | " | " | " $OSi(C_2H_5)_3$ |
| (175) | 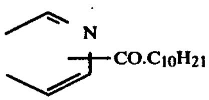 | " | " | " | " $OSi(CH_3)_3$ |
| (176) | 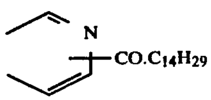 | " | " | " | " $OSi(CH_3)_3$ |
| (177) | 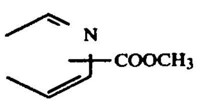 | " | " | " | " $OSi(C_6H_{13})_3$ |
| (178) | 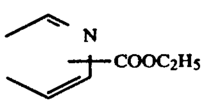 | " | " | " | " $OSi(C_4H_9)_3$ |

-continued
| | | | | | |
|---|---|---|---|---|---|
| (179) | 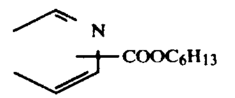 | " | " | " | " $OSi(C_3H_7)_3$ |
| (180) | 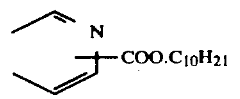 | " | " | " | " $OSi(C_2H_5)_3$ |
| (181) | 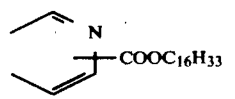 | $= A^1$ | $= A^1$ | $= A^1$ | Si $OSi(CH_3)_3$ |
| (182) | 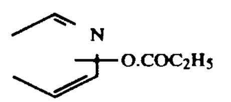 | " | " | " | " $OSi(C_6H_{13})_3$ |
| (183) | 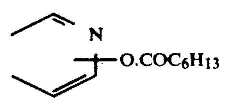 | " | " | " | " $OSi(C_4H_9)_3$ |
| (184) | 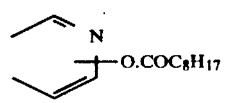 | " | " | " | " $OSi(C_3H_7)_3$ |
| (185) | 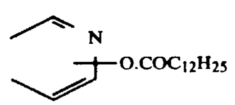 | " | " | " | " $OSi(C_2H_5)_3$ |
| (186) | 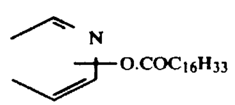 | " | " | " | " $OSi(CH_3)_3$ |
| (187) | 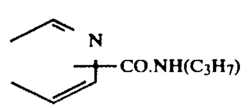 | " | " | " | " $OSi(C_6H_{13})_3$ |

-continued
| | | | | | |
|---|---|---|---|---|---|
| (188) | 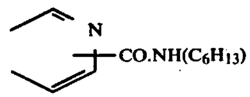 | " | " | " | " $OSi(C_4H_9)_3$ |
| (189) | 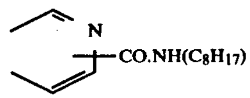 | " | " | " | " $OSi(C_3H_7)_3$ |
| (190) | 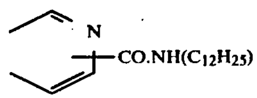 | " | " | " | " $OSi(C_2H_5)_3$ |
| (191) | 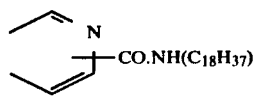 | $=A^1$ | $=A^1$ | $=A^1$ | Si $OSi(CH_3)_3$ |
| (192) | 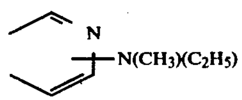 | " | " | " | " $OSi(C_6H_{13})_3$ |
| (193) | 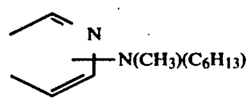 | " | " | " | " $OSi(C_4H_9)_3$ |
| (194) | 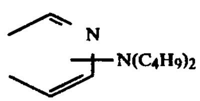 | " | " | " | " $OSi(C_3H_7)_3$ |
| (195) | 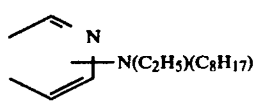 | " | " | " | " $OSi(C_2H_5)_3$ |
| (196) | 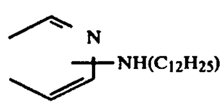 | " | " | " | " $OSi(CH_3)_3$ |

-continued
| | | | | | | |
|---|---|---|---|---|---|---|
| (197) | 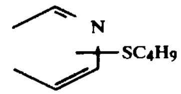 | " | " | " | " | $OSi(C_6H_{13})_3$ |
| (198) | 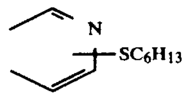 | " | " | " | " | $OSi(C_4H_9)_3$ |
| (199) | 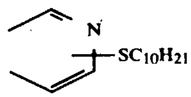 | " | " | " | " | $OSi(C_3H_7)_3$ |
| (200) | 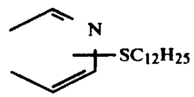 | " | " | " | " | $OSi(C_2H_5)_3$ |
| (201) | 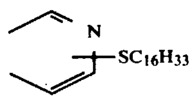 | $= A^1$ | $= A^1$ | $= A^1$ | Si | $OSi(CH_3)_3$ |
| (202) | 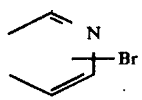 | " | " | " | " | $OSi(C_6H_{13})_3$ |
| (203) | 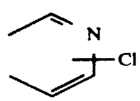 | " | " | " | " | $OSi(C_4H_9)_3$ |
| (204) | 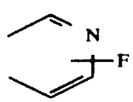 | " | " | " | " | $OSi(C_3H_7)_3$ |
| (205) | 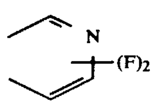 | " | " | " | " | $OSi(C_2H_5)_3$ |

-continued
| | | | | | | |
|---|---|---|---|---|---|---|
| (206) | 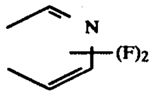 | ″ | ″ | ″ | ″ | $OSi(CH_3)_3$ |
| (207) | 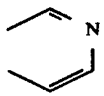 | ″ | ″ | ″ | Ge | $OSi(C_4H_9)_3$ |
| (208) | ″ | ″ | ″ | ″ | ″ | $OSi(C_2H_5)_3$ |
| (209) | 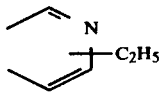 | ″ | ″ | ″ | ″ | $OSi(C_4H_9)_3$ |
| (210) | 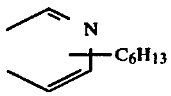 | ″ | ″ | ″ | ″ | $OSi(C_2H_5)_3$ |
| (211) | 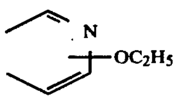 | $= A^1$ | $= A^1$ | $= A^1$ | Ge | $OSi(C_4H_9)_3$ |
| (212) | 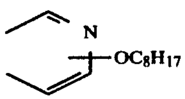 | ″ | ″ | ″ | ″ | $OSi(C_2H_5)_3$ |
| (213) | 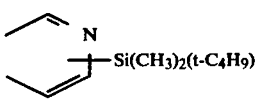 | ″ | ″ | ″ | ″ | $OSi(C_4H_9)_3$ |
| (214) | 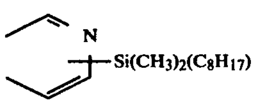 | ″ | ″ | ″ | ″ | $OSi(C_2H_5)_3$ |

-continued
| | | | | | |
|---|---|---|---|---|---|
| (215) | 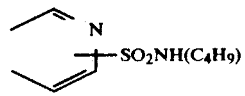 | " | " | " | " $OSi(C_4H_9)_3$ |
| (216) | 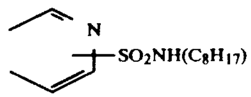 | " | " | " | " $OSi(C_2H_5)_3$ |
| (217) | 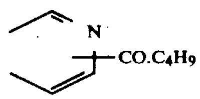 | " | " | " | " $OSi(C_4H_9)_3$ |
| (218) | 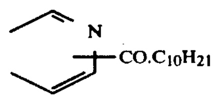 | " | " | " | " $OSi(C_2H_5)_3$ |
| (219) | 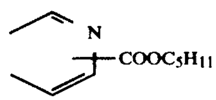 | " | " | " | " $OSi(C_4H_9)_3$ |
| (220) | 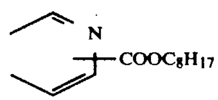 | " | " | " | " $OSi(C_2H_5)_3$ |
| (221) | 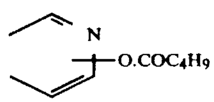 | $= A^1$ | $= A^1$ | $= A^1$ | Ge $OSi(C_4H_9)_3$ |
| (222) | 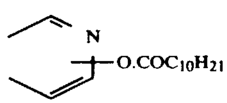 | " | " | " | " $OSi(C_2H_5)_3$ |
| (223) | 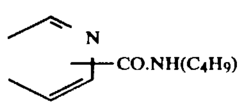 | " | " | " | " $OSi(C_4H_9)_3$ |

-continued
| | | | | | | |
|---|---|---|---|---|---|---|
| (224) | 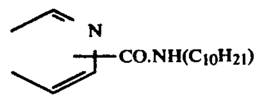 | " | " | " | " | $OSi(C_2H_5)_3$ |
| (225) | 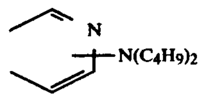 | " | " | " | " | $OSi(C_4H_9)_3$ |
| (226) | 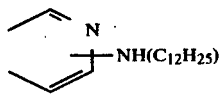 | " | " | " | " | $OSi(C_2H_5)_3$ |
| (227) | 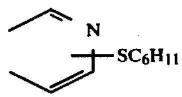 | " | " | " | " | $OSi(C_4H_9)_3$ |
| (228) | 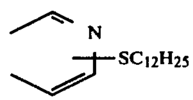 | " | " | " | " | $OSi(C_2H_5)_3$ |
| (229) | 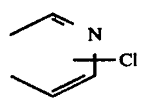 | " | " | " | " | $OSi(C_4H_3)_3$ |
| (230) | 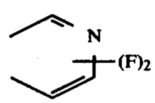 | " | " | " | " | $OSi(C_2H_5)_3$ |
| (231) | 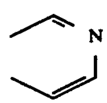 | $= A^1$ | $= A^1$ | $= A^1$ | Sn | $OSi(C_4H_9)_3$ |
| (232) | 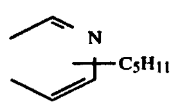 | " | " | " | " | $OSi(C_4H_9)_3$ |

-continued
| | | | | | | |
|---|---|---|---|---|---|---|
| (233) | 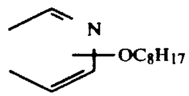 | " | " | " | " | OSi(C$_2$H$_5$)$_3$ |
| (234) | 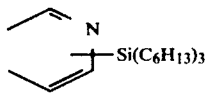 | " | " | " | " | OSi(C$_2$H$_5$)$_3$ |
| (235) | 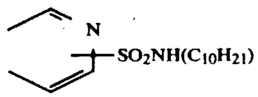 | " | " | " | " | OSi(C$_4$H$_9$)$_3$ |
| (236) | 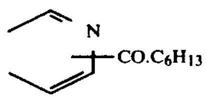 | " | " | " | " | OSi(C$_4$H$_9$)$_3$ |
| (237) | 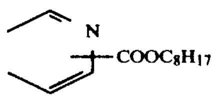 | " | " | " | " | OSi(C$_2$H$_5$)$_3$ |
| (238) | 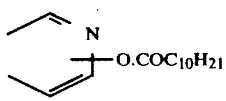 | " | " | " | " | OSi(C$_2$H$_5$)$_3$ |
| (239) | 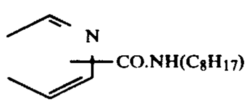 | " | " | " | " | OSi(C$_4$H$_9$)$_3$ |
| (240) | 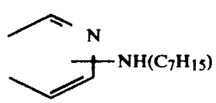 | " | " | " | " | OSi(C$_4$H$_9$)$_3$ |
| (241) | 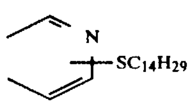 | = A[1] | = A[1] | = A[1] | Sn | OSi(C$_2$H$_5$)$_3$ |

-continued
| | | | | | | |
|---|---|---|---|---|---|---|
| (242) | 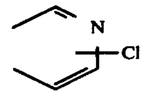 | " | " | " | " | $OSi(C_2H_5)_3$ |
| (243) | 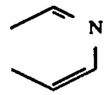 | " | " | " | Si | $OSi(CH_3)_2(OC_2H_4OCH_3)$ |
| (244) | " | " | " | " | " | $(OSi(CH_3)_2(OC_2H_4O.COCH_3)$ |
| (245) | 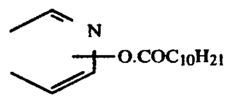 | " | " | " | " | $OC_{18}H_{37}$ |
| (246) | 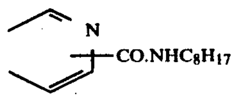 | " | " | " | " | $OC_{22}H_{45}$ |
| (247) | 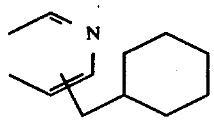 | " | " | " | " | $OSi(C_3H_7)_3$ |
| (248) | 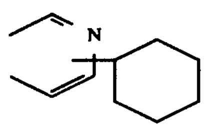 | " | " | " | " | $OSi(C_2H_5)_3$ |
| (249) | 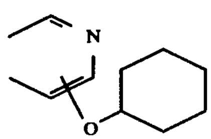 | " | " | " | Gn | $OSi(C_6H_{13})_3$ |

-continued
| | | | | | |
|---|---|---|---|---|---|
| (250) | 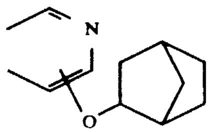 | " | " | " | " $OSi(C_4H_9)_3$ |
| (251) | 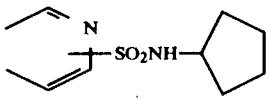 | $= A^1$ | $= A^1$ | $= A^1$ | Si $OSi(C_3H_7)_3$ |
| (252) | 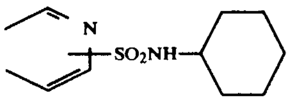 | " | " | " | " $OSi(C_2H_5)_3$ |
| (253) | 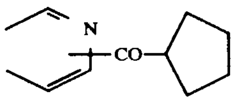 | " | " | " | " $OSi(C_6H_{13})_3$ |
| (254) | 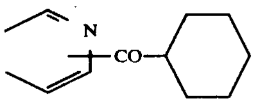 | " | " | " | " $OSi(C_4H_9)_3$ |
| (255) | 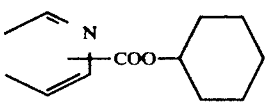 | " | " | " | " $OSi(C_3H_7)_3$ |
| (256) | 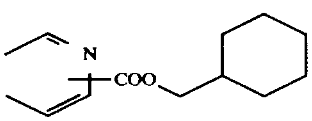 | " | " | " | " $OSi(C_2H_5)_3$ |
| (257) | 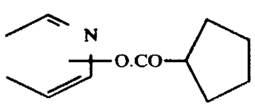 | " | " | " | " $OSi(C_4H_9)_3$ |

-continued
| | | | | | |
|---|---|---|---|---|---|
| (258) | 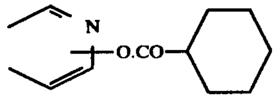 | " | " | " | " OSi($C_3H_7$)$_3$ |
| (259) | 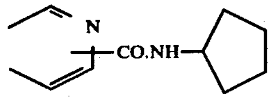 | " | " | " | " OSi($C_6H_{13}$)$_3$ |
| (260) | 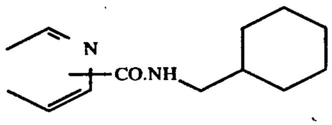 | " | " | " | " OSi($C_4H_9$)$_3$ |
| (261) | 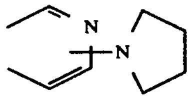 | $= A^1$ | $= A^1$ | $= A^1$ | Si OSi($C_4H_9$)$_3$ |
| (262) | 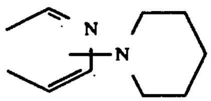 | " | " | " | " OSi($C_3H_7$)$_3$ |
| (263) | 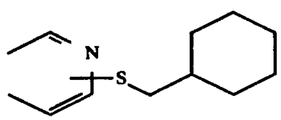 | " | " | " | " OSi($C_2H_9$)$_3$ |
| (264) | 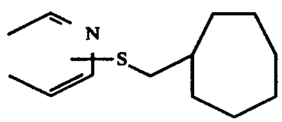 | " | " | " | " OSi($C_2H_5$)$_3$ |
| (265) | 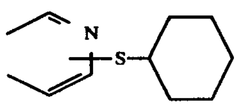 | " | " | " | " OSi($CH_3$)$_3$ |

-continued
| | | | | | |
|---|---|---|---|---|---|
| (266) | 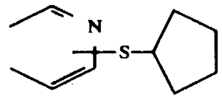 | " | " | " | " $OSi(C_4H_9)_3$ |
| (267) | 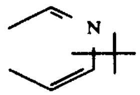 | " | " | " | " $OSi(C_4H_9)_3$ |
| (268) | 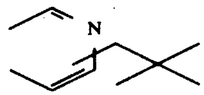 | " | " | " | " $OSi(C_4H_9)_3$ |
| (269) | 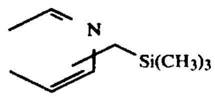 | " | " | " | Ge $OSi(C_3H_7)_3$ |
| (270) | 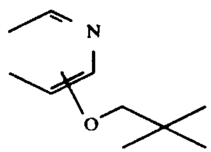 | " | " | " | " $OSi(C_2H_5)_3$ |
| (271) | 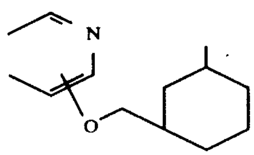 | $= A^1$ | $= A^1$ | $= A^1$ | Si $OSi(C_2H_5)_3$ |
| (272) | 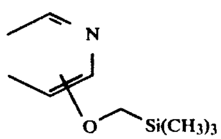 | " | " | " | " $OSi(C_2H_5)_3$ |
| (273) | 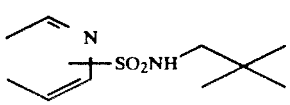 | " | " | " | " $OSi(C_4H_3)_3$ |

-continued
| | | | | | |
|---|---|---|---|---|---|
| (274) | 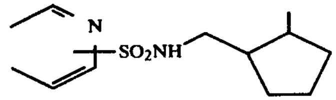 | " | " | " | " $OSi(C_6H_{13})_3$ |
| (275) | 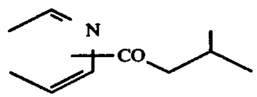 | " | " | " | " $OSi(C_3H_7)_3$ |
| (276) | 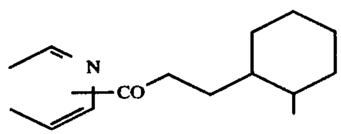 | " | " | " | " $OSi(C_4H_9)_3$ |
| (277) | 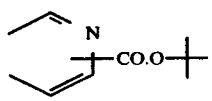 | " | " | " | " $OSi(C_2H_5)_3$ |
| (278) | 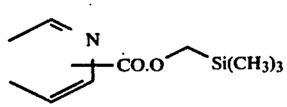 | " | " | " | " $OSi(C_3H_7)_3$ |
| (279) | 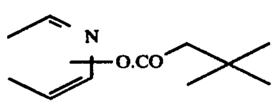 | " | " | " | " $OSi(C_2H_5)_3$ |
| (280) | 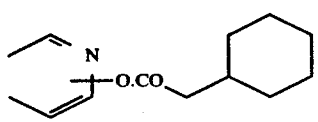 | " | " | " | " $OSi(CH_3)_3$ |
| (281) | 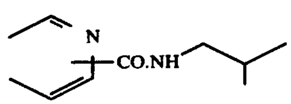 | $= A^1$ | $= A^1$ | $= A^1$ | Si $OSi(C_6H_{13})_3$ |

-continued
| | | | | | | |
|---|---|---|---|---|---|---|
| (282) | 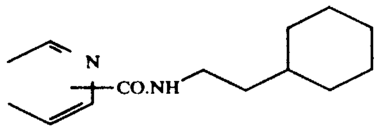 | ″ | ″ | ″ | ″ | $OSi(C_4H_9)_3$ |
| (283) | 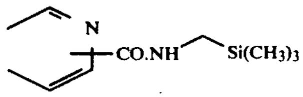 | ″ | ″ | ″ | ″ | $OSi(C_3H_7)_3$ |
| (284) | 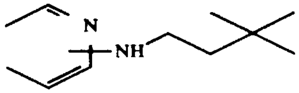 | ″ | ″ | ″ | ″ | $OSi(C_2H_5)_3$ |
| (285) | 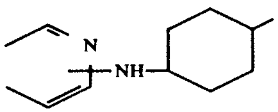 | ″ | ″ | ″ | ″ | $OSi(C_4H_9)_3$ |
| (286) | 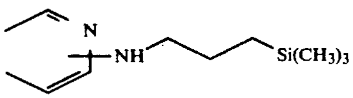 | ″ | ″ | ″ | ″ | $OSi(CH_3)_3$ |
| (287) | 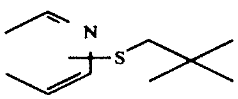 | ″ | ″ | ″ | ″ | $OSi(C_2H_5)_3$ |
| (288) | 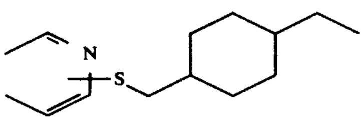 | ″ | ″ | ″ | ″ | $OSi(C_3H_7)_3$ |
| (289) | 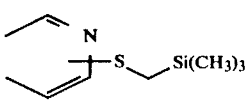 | ″ | ″ | ″ | Ge | $OSi(CH_3)_3$ |

-continued
| | | | | | |
|---|---|---|---|---|---|
| (290) | 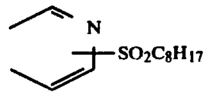 | " | " | " | " $OSi(C_6H_{13})_3$ |
| (291) | 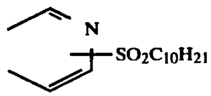 | $= A^1$ | $= A^1$ | $= A^1$ | Si $OSi(C_4H_9)_3$ |
| (292) | 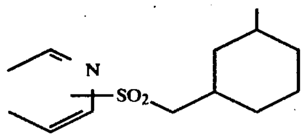 | " | " | " | " $OSi(C_6H_{13})_3$ |
| (293) | 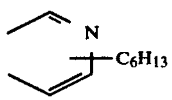 | " | " | " | " OSi 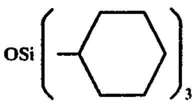 |
| (294) | 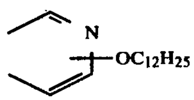 | " | " | " | " $OSi(CH_3)_2$ 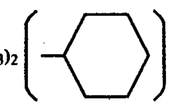 |
| (295) | 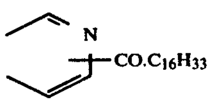 | " | " | " | " $OSi(CH_3)_2(t\text{-}C_4H_9)$ |
| (296) | 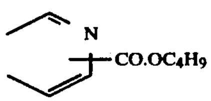 | " | " | " | " OSi 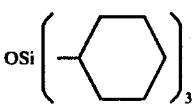 |
| (297) | 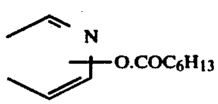 | " | " | " | " OSi 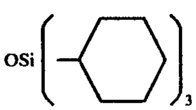 |

-continued
| | | | | | | |
|---|---|---|---|---|---|---|
| (298) |  | ″ | ″ | ″ | ″ | OSi(CH$_3$)$_2$ 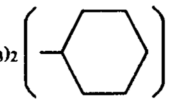 |
| (299) | 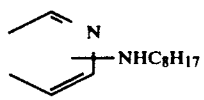 | ″ | ″ | ″ | ″ | OSi 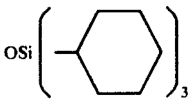 |
| (300) | 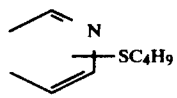 | ″ | ″ | ″ | ″ | OSi 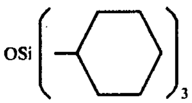 |
| (301) | 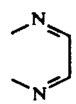 | $= A^1$ | $= A^1$ | $= A^1$ | Si | OSi(C$_6$H$_{13}$)$_3$ |
| (302) | ″ | ″ | ″ | ″ | ″ | OSi(C$_4$H$_9$)$_3$ |
| (303) | ″ | ″ | ″ | ″ | ″ | OSi(C$_3$H$_7$)$_3$ |
| (304) | ″ | ″ | ″ | ″ | ″ | OSi(C$_2$H$_5$)$_3$ |
| (305) | 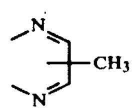 | ″ | ″ | ″ | ″ | OSi(C$_6$H$_{13}$)$_3$ |
| (306) | 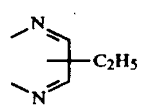 | ″ | ″ | ″ | ″ | OSi(C$_4$H$_9$)$_3$ |
| (307) | 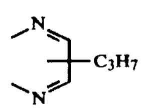 | ″ | ″ | ″ | ″ | OSi(C$_3$H$_7$)$_3$ |
| (308) | 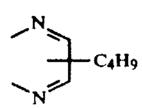 | ″ | ″ | ″ | ″ | OSi(C$_2$H$_5$)$_3$ |

-continued
| | | | | | | |
|---|---|---|---|---|---|---|
| (309) | 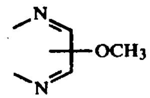 | " | " | " | " | $OSi(C_6H_{13})_3$ |
| (310) | 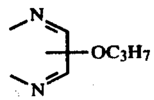 | " | " | " | " | $OSi(C_4H_9)_3$ |
| (311) | 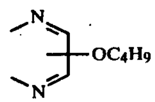 | $= A^1$ | $= A^1$ | $= A^1$ | Si | $OSi(C_3H_7)_3$ |
| (312) | 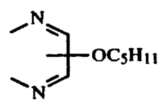 | " | " | " | " | $OSi(C_2H_5)_3$ |
| (313) | 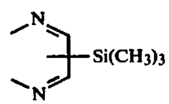 | " | " | " | " | $OSi(C_4H_9)_3$ |
| (314) | 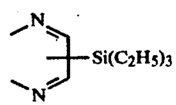 | " | " | " | " | $OSi(C_3H_7)_3$ |
| (315) | 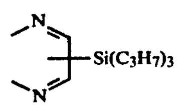 | " | " | " | " | $OSi(C_2H_5)_3$ |
| (316) | 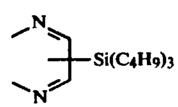 | " | " | " | " | $OSi(CH_3)_3$ |
| (317) | 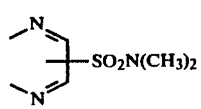 | " | " | " | " | $OSi(C_6H_{13})_3$ |

-continued
| | | | | | |
|---|---|---|---|---|---|
| (318) | 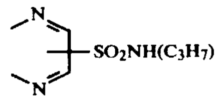 | " | " | " | " $OSi(C_4H_9)_3$ |
| (319) | 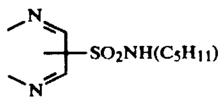 | " | " | " | " $OSi(C_3H_7)_3$ |
| (320) | 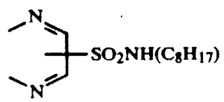 | " | " | " | " $OSi(C_2H_5)_3$ |
| (321) | 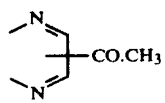 | $= A^1$ | $= A^1$ | $= A^1$ | Si $OSi(C_6H_{13})_3$ |
| (322) | 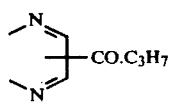 | " | " | " | " $OSi(C_4H_9)_3$ |
| (323) | 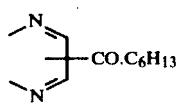 | " | " | " | " $OSi(C_3H_7)_3$ |
| (324) | 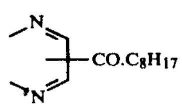 | " | " | " | " $OSi(C_2H_5)_3$ |
| (325) | 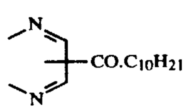 | " | " | " | " $OSi(CH_3)_3$ |
| (326) | 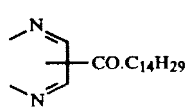 | " | " | " | " $OSi(CH_3)_3$ |

-continued
| | | | | | |
|---|---|---|---|---|---|
| (327) | 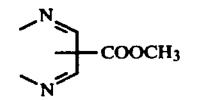  | " | " | " | " OSi$(C_6H_{13})_3$ |
| (328) | 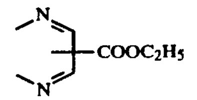  | " | " | " | " OSi$(C_4H_9)_3$ |
| (329) | 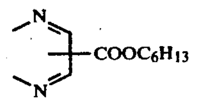  | " | " | " | " OSi$(C_3H_7)_3$ |
| (330) | 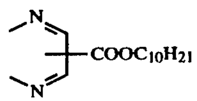  | " | " | " | " OSi$(C_2H_5)_3$ |
| (331) | 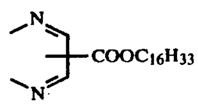  | $= A^1$ | $= A^1$ | $= A^1$ | Si OSi$(CH_3)_3$ |
| (332) | 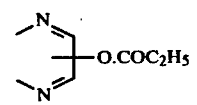  | " | " | " | " OSi$(C_6H_{13})_3$ |
| (333) | 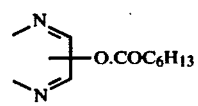  | " | " | " | " OSi$(C_4H_9)_3$ |
| (334) | 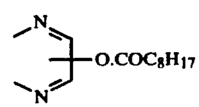  | " | " | " | " OSi$(C_3H_7)_3$ |
| (335) | 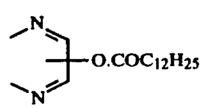  | " | " | " | " OSi$(C_2H_5)_3$ |

-continued
| | | | | | | |
|---|---|---|---|---|---|---|
| (336) | 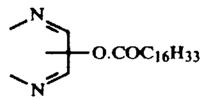 | " | " | " | " | $OSi(CH_3)_3$ |
| (337) | 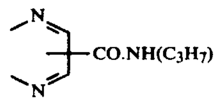 | " | " | " | " | $OSi(C_6H_{13})_3$ |
| (338) | 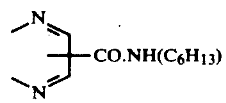 | " | " | " | " | $OSi(C_4H_9)_3$ |
| (339) | 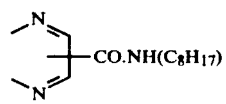 | " | " | " | " | $OSi(C_3H_7)_3$ |
| (340) | 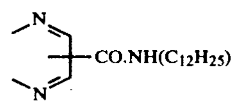 | " | " | " | " | $OSi(C_2H_5)_3$ |
| (341) | 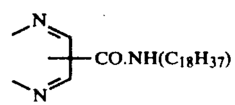 | $= A^1$ | $= A^1$ | $= A^1$ | Si | $OSi(CH_3)_3$ |
| (342) | 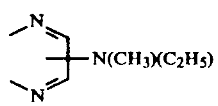 | " | " | " | " | $OSi(C_6H_{13})_3$ |
| (343) | 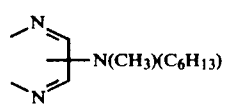 | " | " | " | " | $OSi(C_4H_9)_3$ |
| (344) | 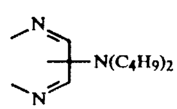 | " | " | " | " | $OSi(C_3H_7)_3$ |

-continued
| | | | | | |
|---|---|---|---|---|---|
| (345) | 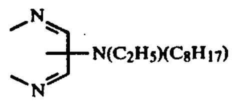 | " | " | " | " $OSi(C_2H_5)_3$ |
| (346) | 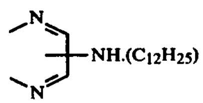 | " | " | " | " $OSi(CH_3)_3$ |
| (347) | 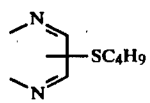 | " | " | " | " $OSi(C_6H_{13})_3$ |
| (348) | 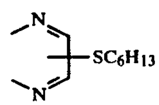 | " | " | " | " $OSi(C_4H_9)_3$ |
| (349) | 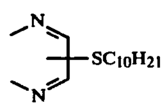 | " | " | " | " $OSi(C_3H_7)_3$ |
| (350) | 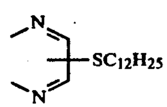 | " | " | " | " $OSi(C_2H_5)_3$ |
| (351) | 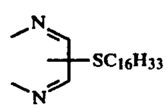 | $= A^1$ | $= A^1$ | $= A^1$ | Si $OSi(CH_3)_3$ |
| (352) | 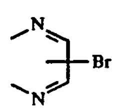 | " | " | " | " $OSi(C_6H_{13})_3$ |
| (353) | 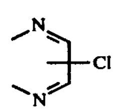 | " | " | " | " $OSi(C_4H_9)_3$ |

-continued
| | | | | | | |
|---|---|---|---|---|---|---|
| (354) | 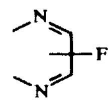 | " | " | " | " | $OSi(C_4H_7)_3$ |
| (355) | 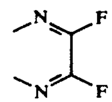 | " | " | " | " | $OSi(C_2H_5)_3$ |
| (356) | 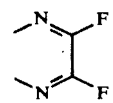 | " | " | " | " | $OSi(CH_3)_3$ |
| (357) | 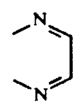 | " | " | " | Ge | $OSi(C_4H_9)_3$ |
| (358) | " | " | " | " | " | $OSi(C_2H_5)_3$ |
| (359) | 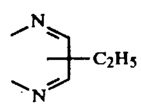 | " | " | " | " | $OSi(C_4H_9)_3$ |
| (360) | 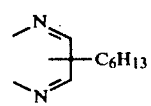 | " | " | " | " | $OSi(C_2H_5)_3$ |
| (361) | 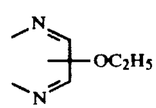 | $=A^1$ | $=A^1$ | $=A^1$ | Ge | $OSi(C_4H_9)_3$ |
| (362) | 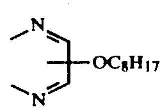 | " | " | " | " | $OSi(C_2H_5)_3$ |
| (363) | 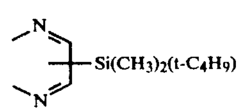 | " | " | " | " | $OSi(C_4H_9)_3$ |

| | | | | | | |
|---|---|---|---|---|---|---|
| (364) | 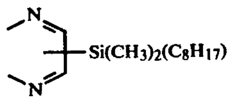 | " | " | " | " | $OSi(C_2H_5)_3$ |
| (365) | 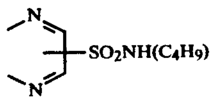 | " | " | " | " | $OSi(C_4H_9)_3$ |
| (366) | 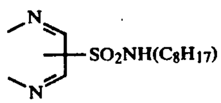 | " | " | " | " | $OSi(C_2H_5)_3$ |
| (367) | 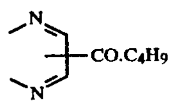 | " | " | " | " | $OSi(C_4H_9)_3$ |
| (368) | 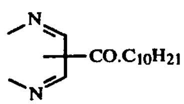 | " | " | " | " | $OSi(C_2H_5)_3$ |
| (369) | 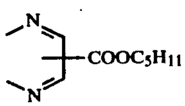 | " | " | " | " | $OSi(C_4H_9)_3$ |
| (370) | 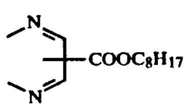 | " | " | " | " | $OSi(C_2H_5)_3$ |
| (371) | 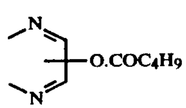 | $= A^1$ | $= A^1$ | $= A^1$ | Ge | $OSi(C_4H_9)_3$ |
| (372) | 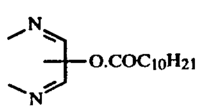 | " | " | " | " | $OSi(C_2H_5)_3$ |

-continued
| | | | | | |
|---|---|---|---|---|---|
| (373) | 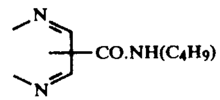 | " | " | " | " $OSi(C_4H_9)_3$ |
| (374) | 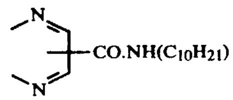 | " | " | " | " $OSi(C_2H_5)_3$ |
| (375) | 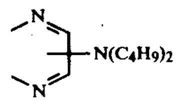 | " | " | " | " $OSi(C_4H_9)_3$ |
| (376) | 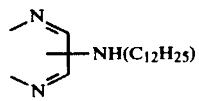 | " | " | " | " $OSi(C_2H_5)_3$ |
| (377) | 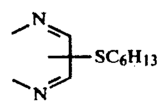 | " | " | " | " $OSi(C_4H_9)_3$ |
| (378) | 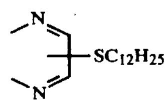 | " | " | " | " $OSi(C_2H_5)_3$ |
| (379) | 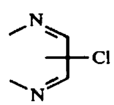 | " | " | " | " $OSi(C_4H_9)_3$ |
| (380) |  | " | " | " | " $OSi(C_2H_5)_3$ |
| (381) | 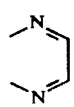 | $= A^1$ | $= A^1$ | $= A^1$ | Sn $OSi(C_4H_9)_3$ |

-continued
| | | | | | |
|---|---|---|---|---|---|
| (382) | 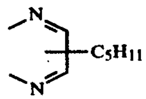 | " | " | " | " $OSi(C_4H_9)_3$ |
| (383) | 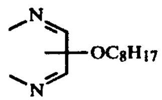 | " | " | " | " $OSi(C_2H_5)_3$ |
| (384) | 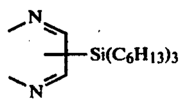 | " | " | " | " $OSi(C_2H_5)_3$ |
| (385) | 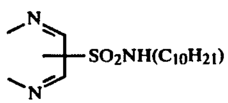 | " | " | " | " $OSi(C_4H_9)_3$ |
| (386) | 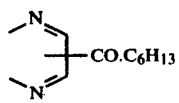 | " | " | " | " $OSi(C_4H_9)_3$ |
| (387) | 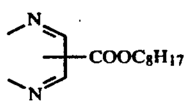 | " | " | " | " $OSi(C_2H_5)_3$ |
| (388) | 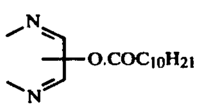 | " | " | " | " $OSi(C_2H_5)_3$ |
| (389) | 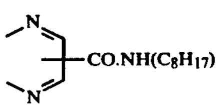 | " | " | " | " $OSi(C_4H_9)_3$ |
| (390) | 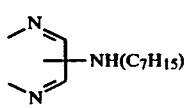 | " | " | " | " $OSi(C_4H_9)_3$ |

-continued
| | | | | | |
|---|---|---|---|---|---|
| (391) | 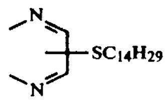 | = $A^1$ | = $A^1$ | = $A^1$ | Sn $OSi(C_2H_5)_3$ |
| (392) | 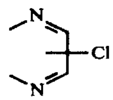 | " | " | " | " $OSi(C_2H_5)_3$ |
| (393) | 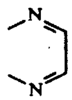 | " | " | " | Si $OSi(CH_3)_2(OC_2H_4OCH_3)$ |
| (394) | " | " | " | " | " $OSi(CH_3)_2(OC_2H_4O.COCH_3)$ |
| (395) | 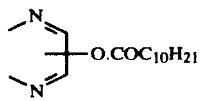 | " | " | " | " $OC_{18}H_{37}$ |
| (396) | 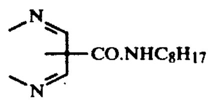 | " | " | " | " $OC_{22}H_{45}$ |
| (397) | 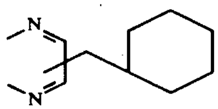 | " | " | " | " $OSi(C_3H_7)_3$ |
| (398) | 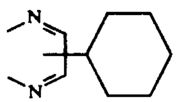 | " | " | " | " $OSi(C_4H_9)_3$ |
| (399) | 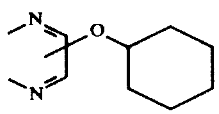 | " | " | " | " $OSi(C_6H_{13})_3$ |
| (400) | 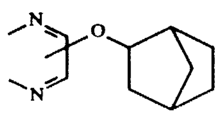 | " | " | " | " $OSi(C_4H_9)_3$ |

-continued
| | | | | | | |
|---|---|---|---|---|---|---|
| (401) | 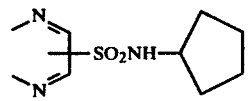 | = $A^1$ | = $A^1$ | = $A^1$ | Si | $OSi(C_3H_7)_3$ |
| (402) | 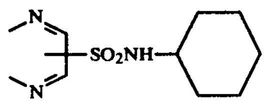 | " | " | " | " | $OSi(C_2H_5)_3$ |
| (403) | 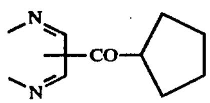 | " | " | " | " | $OSi(C_6H_{13})_3$ |
| (404) | 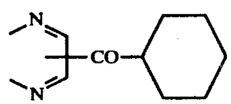 | " | " | " | " | $OSi(C_4H_9)_3$ |
| (405) | 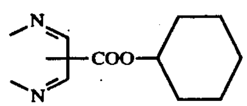 | " | " | " | " | $OSi(C_3H_7)_3$ |
| (406) | 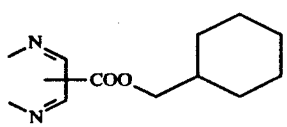 | " | " | " | " | $OSi(C_2H_5)_3$ |
| (407) | 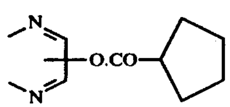 | " | " | " | " | $OSi(C_4H_9)_3$ |
| (408) | 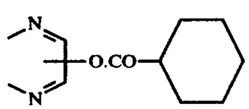 | " | " | " | " | $OSi(C_3H_7)_3$ |

-continued
| | | | | | |
|---|---|---|---|---|---|
| (409) | 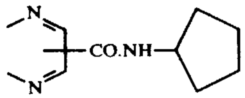 | " | " | " | " $OSi(C_6H_{13})_3$ |
| (410) | 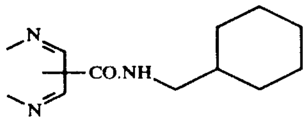 | " | " | " | " $OSi(C_4H_9)_3$ |
| (411) | 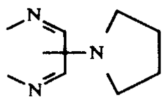 | $= A^1$ | $= A^1$ | $= A^1$ | Si $OSi(C_6H_{13})_3$ |
| (412) | 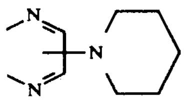 | " | " | " | " $OSi(C_4H_9)_3$ |
| (413) | 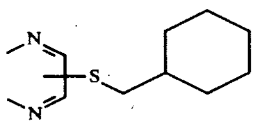 | " | " | " | " $OSi(C_2H_5)_3$ |
| (414) | 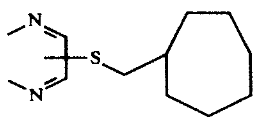 | " | " | " | " $OSi(CH_3)_3$ |
| (415) | 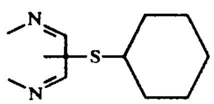 | " | " | " | " $OSi(C_6H_{13})_3$ |
| (416) | 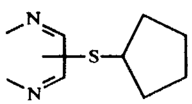 | " | " | " | " $OSi(C_6H_{13})_3$ |

-continued
| | | | | | | |
|---|---|---|---|---|---|---|
| (417) | 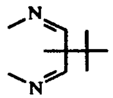 | " | " | " | " | $OSi(C_4H_9)_3$ |
| (418) | 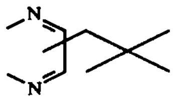 | " | " | " | " | $OSi(C_3H_7)_3$ |
| (419) | 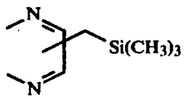 | " | " | " | " | $OSi(C_3H_7)_3$ |
| (420) | 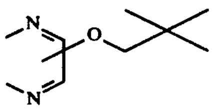 | " | " | " | " | $OSi(C_2H_5)_3$ |
| (421) | 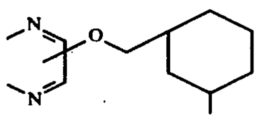 | $= A^1$ | $= A^1$ | $= A^1$ | Si | $OSi(C_2H_5)_3$ |
| (422) | 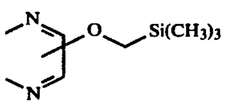 | " | " | " | " | $OSi(C_2H_5)_3$ |
| (423) | 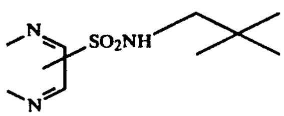 | " | " | " | " | $OSi(C_4H_9)_3$ |
| (424) | 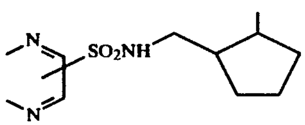 | " | " | " | " | $OSi(C_6H_{13})_3$ |

-continued
| | | | | | | |
|---|---|---|---|---|---|---|
| (425) | 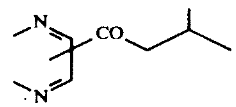 | " | " | " | " | $OSi(C_3H_7)_3$ |
| (426) | 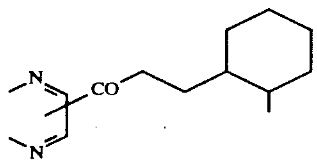 | " | " | " | " | $OSi(C_4H_9)_3$ |
| (427) | 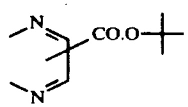 | " | " | " | " | $OSi(C_4H_9)_3$ |
| (428) | 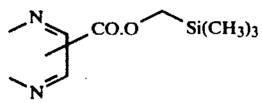 | " | " | " | " | $OSi(C_3H_7)_3$ |
| (429) | 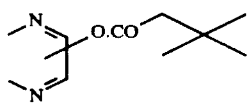 | " | " | " | " | $OSi(C_3H_7)_3$ |
| (430) | 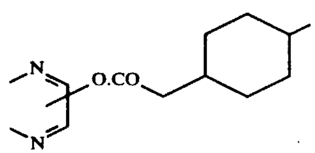 | " | " | " | " | $OSi(CH_3)_3$ |
| (431) | 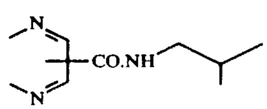 | $= A^1$ | $= A^1$ | $= A^1$ | Si | $OSi(C_6H_{13})_3$ |

-continued
| | | | | | | |
|---|---|---|---|---|---|---|
| (432) | 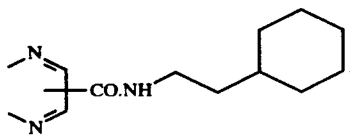 | " | " | " | " | $OSi(C_4H_9)_3$ |
| (433) | 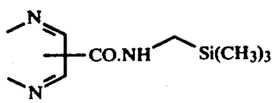 | " | " | " | " | $OSi(C_3H_7)_3$ |
| (434) | 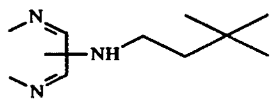 | " | " | " | " | $OSi(C_2H_5)_3$ |
| (435) | 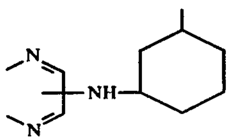 | " | " | " | " | $OSi(C_4H_9)_3$ |
| (436) | 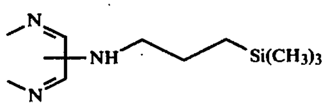 | " | " | " | " | $OSi(CH_3)_3$ |
| (437) | 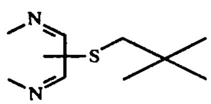 | " | " | " | " | $OSi(C_2H_5)_3$ |
| (438) | 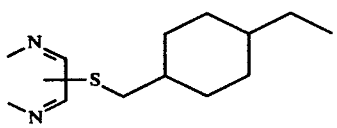 | " | " | " | " | $OSi(C_3H_7)_3$ |
| (439) | 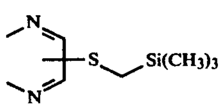 | " | " | " | " | $OSi(C_2H_5)_3$ |

-continued
| | | | | | |
|---|---|---|---|---|---|
| (440) | 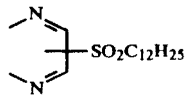 | " | " | " | " $OSi(C_4H_9)_3$ |
| (441) | 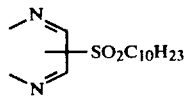 | $= A^1$ | $= A^1$ | $= A^1$ | Si $OSi(C_3H_7)_3$ |
| (442) | 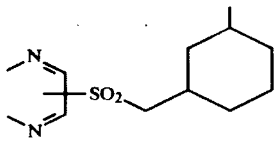 | " | " | " | " $OSi(C_6H_{13})_3$ |
| (443) | 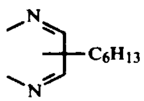 | " | " | " | " 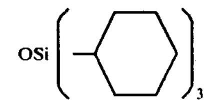 |
| (444) | 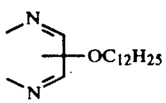 | " | " | " | " 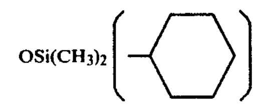 |
| (445) | 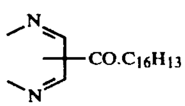 | " | " | " | " $OSi(CH_3)_2(t\text{-}C_4H_9)_3$ |
| (446) | 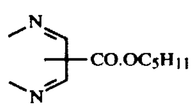 | " | " | " | " 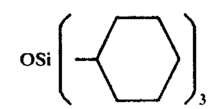 |
| (447) | 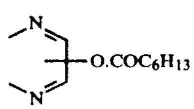 | " | " | " | " 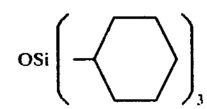 |

-continued
| | | | | | |
|---|---|---|---|---|---|
| (448) | 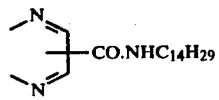 | " | " | " | " OSi(CH3)2 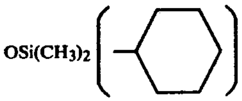 |
| (449) | 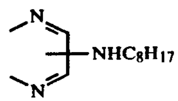 | " | " | " | " OSi 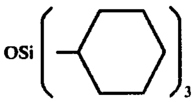 |
| (450) | 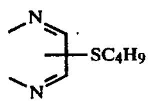 | " | " | " | " OSi 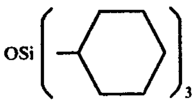 |
| (451) | 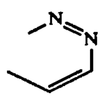 | $= A^1$ | $= A^1$ | $= A^1$ | Si $OSi(C_6H_{13})_3$ |
| (452) | " | " | " | " | " $OSi(C_4H_9)_3$ |
| (453) | " | " | " | " | " $OSi(C_3H_7)_3$ |
| (454) | " | " | " | " | " $OSi(C_2H_5)_3$ |
| (455) | 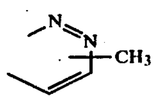 | " | " | " | " $OSi(C_6H_{13})_3$ |
| (456) | 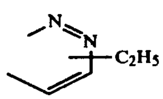 | " | " | " | " $OSi(C_4H_9)_3$ |
| (457) | 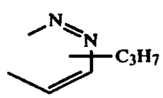 | " | " | " | " $OSi(C_3H_7)_3$ |
| (458) | 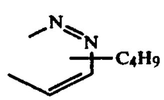 | " | " | " | " $OSi(C_2H_5)_3$ |
| (459) | 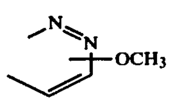 | " | " | " | " $OSi(C_6H_{13})_3$ |

-continued
| | | | | | |
|---|---|---|---|---|---|
| (460) | 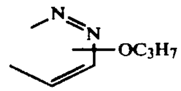 | " | " | " | " $OSi(C_4H_9)_3$ |
| (461) | 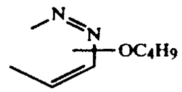 | $= A^1$ | $= A^1$ | $= A^1$ | Si $OSi(C_3H_7)_3$ |
| (462) | 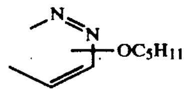 | " | " | " | " $OSi(C_2H_5)_3$ |
| (463) | 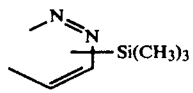 | " | " | " | " $OSi(C_4H_9)_3$ |
| (464) | 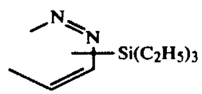 | " | " | " | " $OSi(C_3H_7)_3$ |
| (465) | 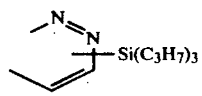 | " | " | " | " $OSi(C_2H_5)_3$ |
| (466) | 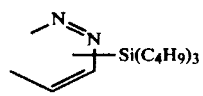 | " | " | " | " $OSi(CH_3)_3$ |
| (467) | 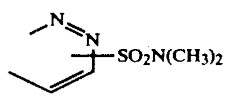 | " | " | " | " $OSi(C_6H_{13})_3$ |
| (468) | 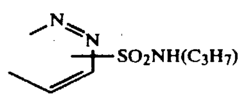 | " | " | " | " $OSi(C_4H_9)_3$ |
| (469) | 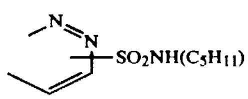 | " | " | " | " $OSi(C_3H_7)_3$ |

-continued
| | | | | | |
|---|---|---|---|---|---|
| (470) | 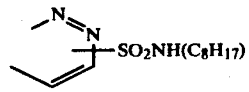 | " | " | " | " $OSi(C_2H_5)_3$ |
| (471) | 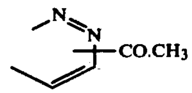 | = A[1] | = A[1] | = A[1] | Si $OSi(C_6H_{13})_3$ |
| (472) | 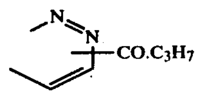 | " | " | " | " $OSi(C_4H_9)_3$ |
| (473) | 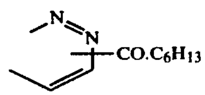 | " | " | " | " $OSi(C_3H_7)_3$ |
| (474) | 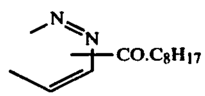 | " | " | " | " $OSi(C_2H_5)_3$ |
| (475) | 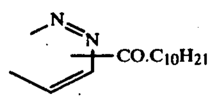 | " | " | " | " $OSi(CH_3)_3$ |
| (476) | 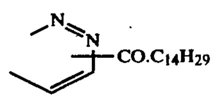 | " | " | " | " $OSi(CH_3)_3$ |
| (477) | 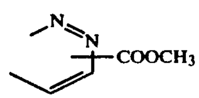 | " | " | " | " $OSi(C_6H_{13})_3$ |
| (478) | 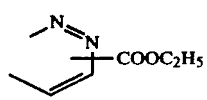 | " | " | " | " $OSi(C_4H_9)_3$ |
| (479) | 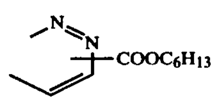 | " | " | " | " $OSi(C_3H_7)_3$ |

-continued
| | | | | | |
|---|---|---|---|---|---|
| (480) | 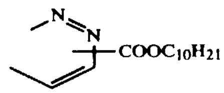 | " | " | " | " OSi($C_2H_5$)$_3$ |
| (481) | 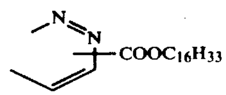 | = $A^1$ | = $A^1$ | = $A^1$ | Si OSi($CH_3$)$_3$ |
| (482) | 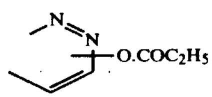 | " | " | " | " OSi($C_6H_{13}$)$_3$ |
| (483) | 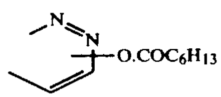 | " | " | " | " OSi($C_4H_9$)$_3$ |
| (484) | 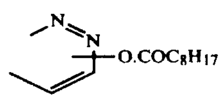 | " | " | " | " OSi($C_3H_7$)$_3$ |
| (485) | 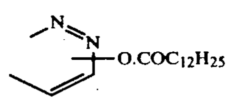 | " | " | " | " OSi($C_2H_5$)$_3$ |
| (486) | 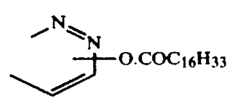 | " | " | " | " OSi($CH_3$)$_3$ |
| (487) | 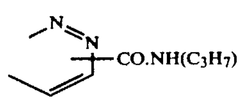 | " | " | " | " OSi($C_6H_{13}$)$_3$ |
| (488) | 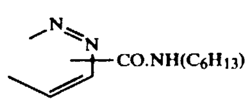 | " | " | " | " OSi($C_4H_9$)$_3$ |
| (489) | 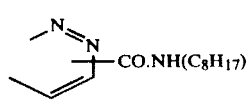 | " | " | " | " OSi($C_3H_7$)$_3$ |

-continued
| | | | | | |
|---|---|---|---|---|---|
| (490) | 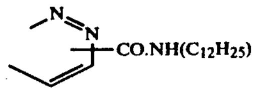  | " | " | " | " $OSi(C_2H_5)_3$ |
| (491) |   | $= A^1$ | $= A^1$ | $= A^1$ | Si $OSi(CH_3)_3$ |
| (492) | 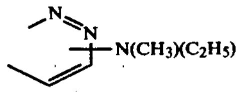  | " | " | " | " $OSi(C_6H_{13})_3$ |
| (493) | 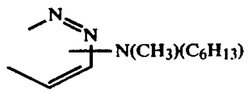  | " | " | " | " $OSi(C_4H_9)_3$ |
| (494) | 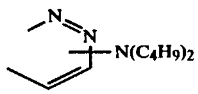  | " | " | " | " $OSi(C_3H_7)_3$ |
| (495) | 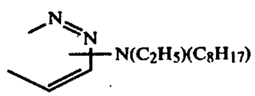  | " | " | " | " $OSi(C_2H_5)_3$ |
| (496) | 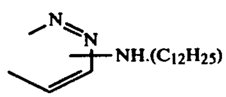  | " | " | " | " $OSi(CH_3)_3$ |
| (497) | 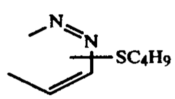  | " | " | " | " $OSi(C_6H_{13})_3$ |
| (498) | 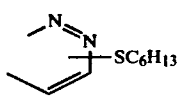  | " | " | " | " $OSi(C_4H_9)_3$ |
| (499) | 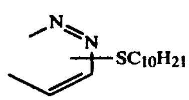  | " | " | " | " $OSi(C_3H_7)_3$ |

-continued
| | | | | | |
|---|---|---|---|---|---|
| (500) | 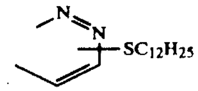 | " | " | " | " $OSi(C_2H_5)_3$ |
| (501) | 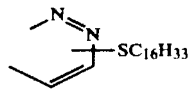 | $=A^1$ | $=A^1$ | $=A^1$ | Si $OSi(CH_3)_3$ |
| (502) | 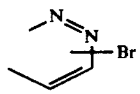 | " | " | " | " $OSi(C_6H_{13})_3$ |
| (503) | 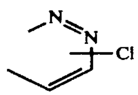 | " | " | " | " $OSi(C_4H_9)_3$ |
| (504) | 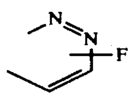 | " | " | " | " $OSi(C_3H_7)_3$ |
| (505) | 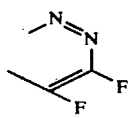 | " | " | " | " $OSi(C_2H_5)_3$ |
| (506) | 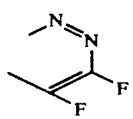 | " | " | " | " $OSi(CH_3)_3$ |
| (507) | 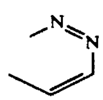 | " | " | " | " $OSi(C_4H_9)_3$ |
| (508) | " | " | " | " | " $OSi(C_2H_5)_3$ |
| (509) | 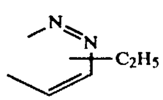 | " | " | " | " $OSi(C_4H_9)_3$ |

-continued
| | | | | | |
|---|---|---|---|---|---|
| (651) | 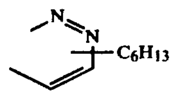 | " | " | " | " $OSi(C_2H_5)_3$ |
| (511) | 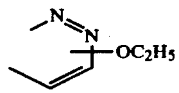 | $= A^1$ | $= A^1$ | $= A^1$ | Ge $OSi(C_4H_9)_3$ |
| (512) | 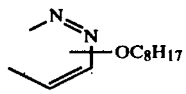 | " | " | " | " $OSi(C_2H_5)_3$ |
| (513) | 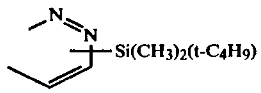 | " | " | " | " $OSi(C_4H_9)_3$ |
| (514) |  | " | " | " | " $OSi(C_2H_5)_3$ |
| (515) | 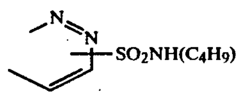 | " | " | " | " $OSi(C_4H_9)_3$ |
| (516) | 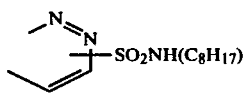 | " | " | " | " $OSi(C_2H_5)_3$ |
| (517) | 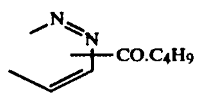 | " | " | " | " $OSi(C_4H_9)_3$ |
| (518) | 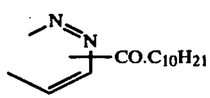 | " | " | " | " $OSi(C_2H_5)_3$ |
| (519) | 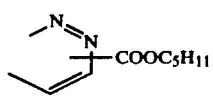 | " | " | " | " $OSi(C_4H_9)_3$ |

-continued
| | | | | | |
|---|---|---|---|---|---|
| (520) | 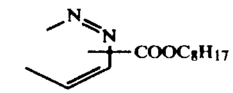 | " | " | " | " $OSi(C_2H_5)_3$ |
| (521) | 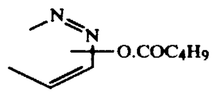 | $= A^1$ | $= A^1$ | $= A^1$ | Ge $OSi(C_4H_9)_3$ |
| (522) | 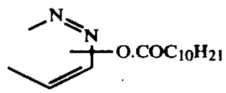 | " | " | " | " $OSi(C_2H_5)_3$ |
| (523) | 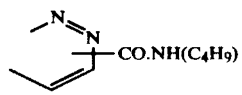 | " | " | " | " $OSi(C_4H_9)_3$ |
| (524) | 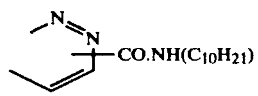 | " | " | " | " $OSi(C_2H_5)_3$ |
| (525) | 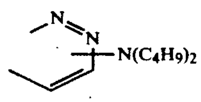 | " | " | " | " $OSi(C_4H_9)_3$ |
| (526) | 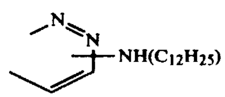 | " | " | " | " $OSi(C_2H_5)_3$ |
| (527) | 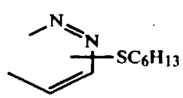 | " | " | " | " $OSi(C_4H_9)_3$ |
| (528) | 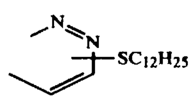 | " | " | " | " $OSi(C_2H_5)_3$ |
| (529) | 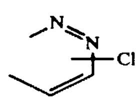 | " | " | " | " $OSi(C_4H_9)_3$ |

-continued
| | | | | | |
|---|---|---|---|---|---|
| (630) | 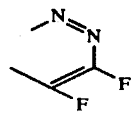 | " | " | " | " $OSi(C_2H_5)_3$ |
| (531) | 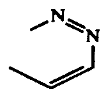 | $= A^1$ | $= A^1$ | $= A^1$ | Sn $OSi(C_4H_9)_3$ |
| (532) | 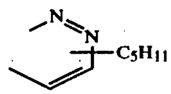 | " | " | " | " $OSi(C_4H_9)_3$ |
| (533) | 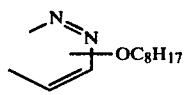 | " | " | " | " $OSi(C_2H_5)_3$ |
| (534) | 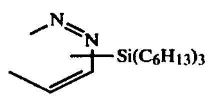 | " | " | " | " $OSi(C_2H_5)_3$ |
| (535) | 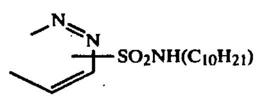 | " | " | " | " $OSi(C_4H_5)_3$ |
| (536) | 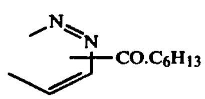 | " | " | " | " $OSi(C_4H_9)_3$ |
| (537) | 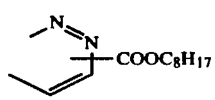 | " | " | " | " $OSi(C_2H_5)_3$ |
| (538) | 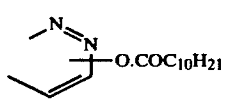 | " | " | " | " $OSi(C_2H_5)_3$ |
| (539) | 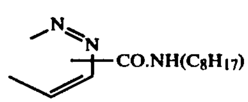 | " | " | " | " $OSi(C_4H_9)_3$ |

-continued
| | | | | | | |
|---|---|---|---|---|---|---|
| (540) | 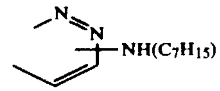 | " | " | " | " | $OSi(C_4H_9)_3$ |
| (541) | 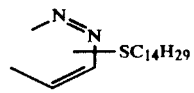 | $= A^1$ | $= A^1$ | $= A^1$ | Sn | $OSi(C_2H_5)_3$ |
| (542) | 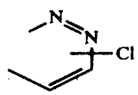 | " | " | " | " | $OSi(C_2H_5)_3$ |
| (543) | 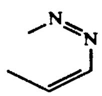 | " | " | " | " | $OSi(CH_3)_2(OC_2H_4OCH_3)$ |
| (544) | " | " | " | " | " | $OSi(CH_3)_2(OC_2H_4O.COCH_3)$ |
| (545) | 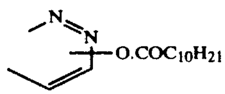 | " | " | " | " | $OC_{16}H_{33}$ |
| (546) | 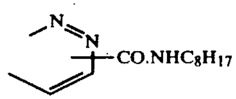 | " | " | " | " | $OC_{22}H_{45}$ |
| (547) | 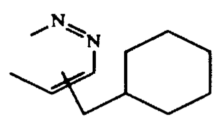 | " | " | " | " | $OSi(C_3H_7)_3$ |
| (548) | 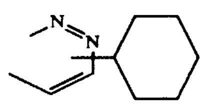 | " | " | " | " | $OSi(C_2H_5)_3$ |
| (549) | 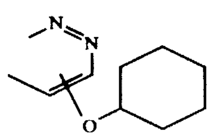 | " | " | " | " | $OSi(C_6H_{13})_3$ |

-continued
| | | | | | |
|---|---|---|---|---|---|
| (550) | 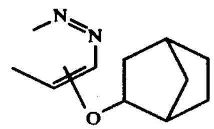 | " | " | " | " $OSi(C_4H_9)_3$ |
| (551) | 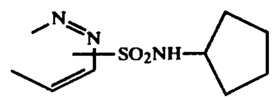 | $= A^1$ | $= A^1$ | $= A^1$ | Si $OSi(C_3H_7)_3$ |
| (552) | 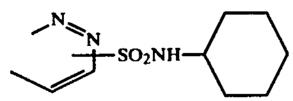 | " | " | " | " $OSi(C_2H_5)_3$ |
| (553) | 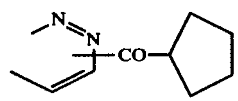 | " | " | " | " $OSi(C_6H_{13})_3$ |
| (554) | 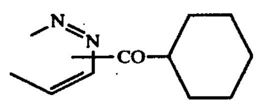 | " | " | " | " $OSi(C_4H_9)_3$ |
| (555) | 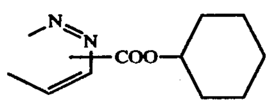 | " | " | " | " $OSi(C_3H_7)_3$ |
| (556) | 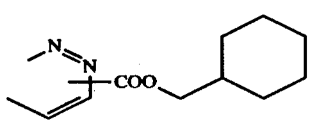 | " | " | " | " $OSi(C_2H_5)_3$ |
| (557) | 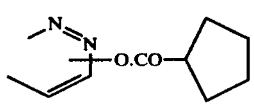 | " | " | " | " $OSi(C_4H_9)_3$ |

-continued
| | | | | | | |
|---|---|---|---|---|---|---|
| (558) | 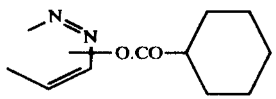 | " | " | " | " | $OSi(C_3H_7)_3$ |
| (559) | 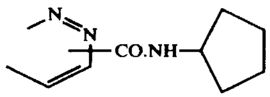 | " | " | " | " | $OSi(C_6H_{13})_3$ |
| (560) | 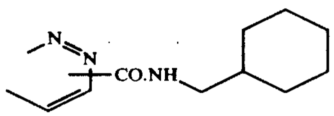 | " | " | " | " | $OSi(C_4H_9)_3$ |
| (561) | 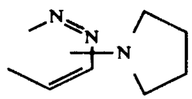 | $= A^1$ | $= A^1$ | $= A^1$ | Si | $OSi(C_4H_9)_3$ |
| (562) | 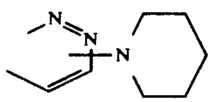 | " | " | " | " | $OSi(C_3H_7)_3$ |
| (563) | 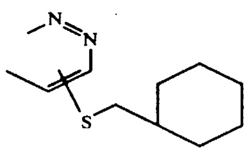 | " | " | " | " | $OSi(C_2H_5)_3$ |
| (564) | 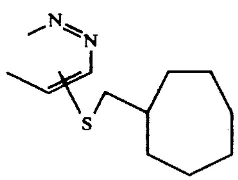 | " | " | " | " | $OSi(CH_3)_3$ |
| (565) | 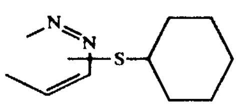 | " | " | " | " | $OSi(C_6H_{13})_3$ |

-continued
| | | | | | | |
|---|---|---|---|---|---|---|
| (566) | 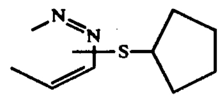 | " | " | " | " | $OSi(C_4H_9)_3$ |
| (567) | 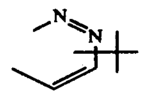 | " | " | " | " | $OSi(C_4H_9)_3$ |
| (568) | 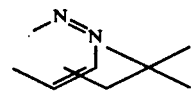 | " | " | " | " | $OSi(C_4H_9)_3$ |
| (569) | 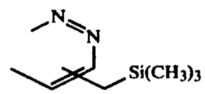 | " | " | " | " | $OSi(C_3H_7)_3$ |
| (570) | 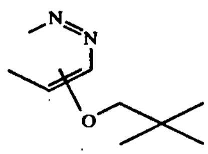 | " | " | " | " | $OSi(C_4H_9)_3$ |
| (571) | 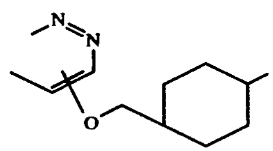 | $= A^1$ | $= A^1$ | $= A^1$ | Si | $OSi(C_3H_7)_3$ |
| (572) | 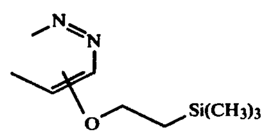 | " | " | " | " | $OSi(C_2H_5)_3$ |
| (573) | 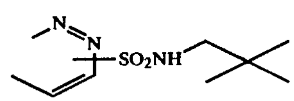 | " | " | " | " | $OSi(C_6H_{13})_3$ |

-continued
| | | | | | |
|---|---|---|---|---|---|
| (574) | 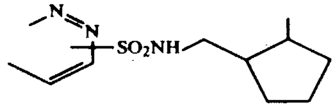 | " | " | " | " $OSi(C_4H_9)_3$ |
| (575) | 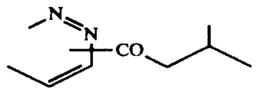 | " | " | " | " $OSi(C_4H_9)_3$ |
| (576) | 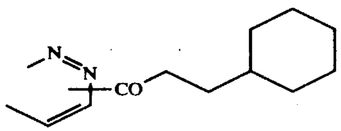 | " | " | " | " $OSi(C_3H_7)_3$ |
| (577) | 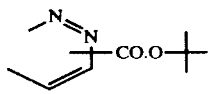 | " | " | " | " $OSi(C_4H_9)_3$ |
| (578) | 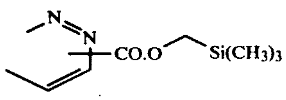 | " | " | " | " $OSi(C_2H_5)_3$ |
| (579) | 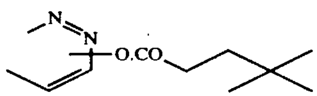 | " | " | " | " $OSi(CH_3)_3$ |
| (580) | 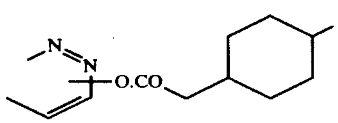 | " | " | " | " $OSi(C_2H_5)_3$ |
| (581) | 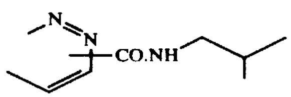 | $= A^1$ | $= A^1$ | $= A^1$ | Si $OSi(C_6H_{13})_3$ |
| (582) | 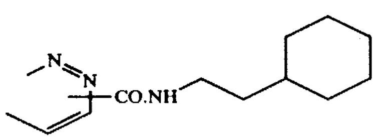 | " | " | " | " $OSi(C_4H_9)_3$ |

-continued
| | | | | | |
|---|---|---|---|---|---|
| (583) | 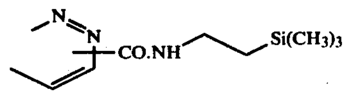 | " | " | " | " OSi($C_3H_7$)$_3$ |
| (584) | 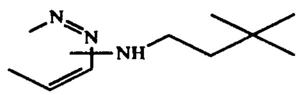 | " | " | " | " OSi($C_2H_5$)$_3$ |
| (585) | 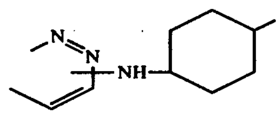 | " | " | " | " OSi($C_4H_9$)$_3$ |
| (586) | 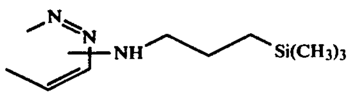 | " | " | " | " OSi($CH_3$)$_3$ |
| (587) | 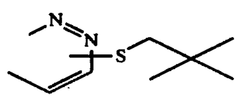 | " | " | " | " OSi($C_2H_5$)$_3$ |
| (588) | 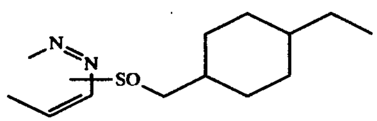 | " | " | " | " OSi($C_3H_7$)$_3$ |
| (589) | 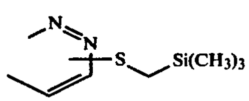 | " | " | " | " OSi($C_4H_9$)$_3$ |
| (590) | 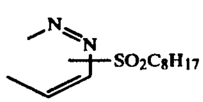 | " | " | " | " OSi($C_6H_{13}$)$_3$ |
| (591) | 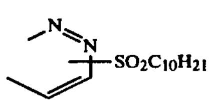 | $= A^1$ | $= A^1$ | $= A^1$ | Si OSi($C_3H_7$)$_3$ |

-continued
| | | | | | |
|---|---|---|---|---|---|
| (592) | 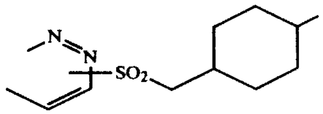 | " | " | " | " OSi($C_4H_9$)$_3$ |
| (593) | 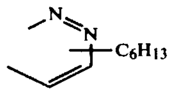 | " | " | " | " OSi 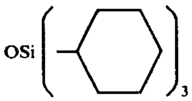 |
| (594) | 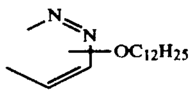 | " | " | " | " OSi($CH_3$)$_2$ 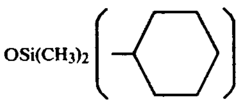 |
| (595) | 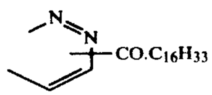 | " | " | " | " OSi($CH_3$)$_2$(t-$C_4H_9$) |
| (596) | 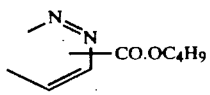 | " | " | " | " OSi 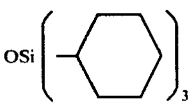 |
| (597) | 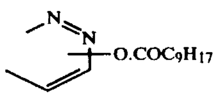 | " | " | " | " OSi 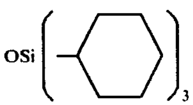 |
| (598) | 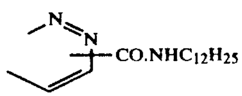 | " | " | " | " OSi($CH_3$)$_2$ 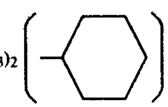 |
| (599) | 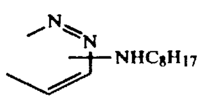 | " | " | " | " OSi 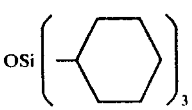 |

-continued
| | | | | | | |
|---|---|---|---|---|---|---|
| (600) | 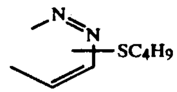 | " | " | " | " | 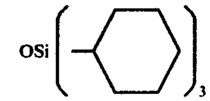 |
| (601) | 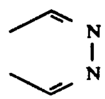 | = $A^1$ | = $A^1$ | = $A^1$ | Si | $OSi(C_6H_{13})_3$ |
| (602) | " | " | " | " | " | $OSi(C_4H_9)_3$ |
| (603) | " | " | " | " | " | $OSi(C_3H_7)_3$ |
| (604) | " | " | " | " | " | $OSi(C_2H_5)_3$ |
| (605) | 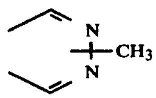 | " | " | " | " | $OSi(C_6H_{13})_3$ |
| (606) | 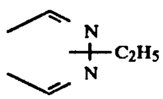 | " | " | " | " | $OSi(C_4H_9)_3$ |
| (607) | 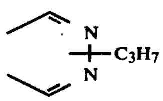 | " | " | " | " | $OSi(C_3H_7)_3$ |
| (608) | 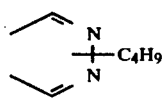 | " | " | " | " | $OSi(C_2H_5)_3$ |
| (609) | 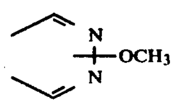 | " | " | " | " | $OSi(C_6H_{13})_3$ |
| (610) | 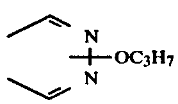 | " | " | " | " | $OSi(C_4H_9)_3$ |

-continued
| | | | | | |
|---|---|---|---|---|---|
| (611) | 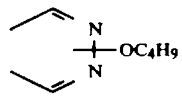 | = $A^1$ | = $A^1$ | = $A^1$ | Si $OSi(C_3H_7)_3$ |
| (612) | 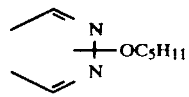 | " | " | " | " $OSi(C_2H_5)_3$ |
| (613) | 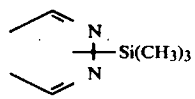 | " | " | " | " $OSi(C_4H_9)_3$ |
| (614) | 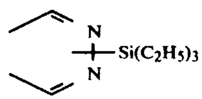 | " | " | " | " $OSi(C_3H_7)_3$ |
| (615) | 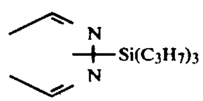 | " | " | " | " $OSi(C_2H_5)_3$ |
| (616) | 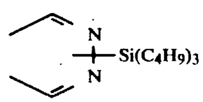 | " | " | " | " $OSi(CH_3)_3$ |
| (617) | 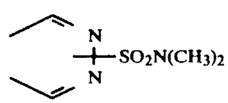 | " | " | " | " $OSi(C_6H_{13})_3$ |
| (618) | 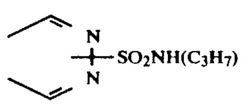 | " | " | " | " $OSi(C_4H_9)_3$ |
| (619) | 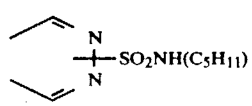 | " | " | " | " $OSi(C_3H_7)_3$ |

-continued
| | | | | | | |
|---|---|---|---|---|---|---|
| (620) | 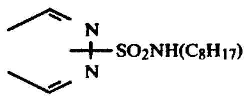 | " | " | " | " | $OSi(C_2H_5)_3$ |
| (621) | 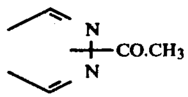 | $= A^1$ | $= A^1$ | $= A^1$ | Si | $OSi(C_6H_{13})_3$ |
| (622) | 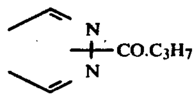 | " | " | " | " | $OSi(C_4H_9)_3$ |
| (623) | 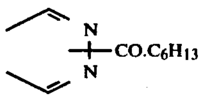 | " | " | " | " | $OSi(C_3H_7)_3$ |
| (624) | 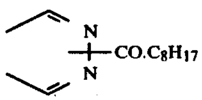 | " | " | " | " | $OSi(C_2H_5)_3$ |
| (625) | 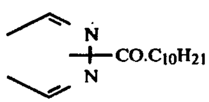 | " | " | " | " | $OSi(CH_3)_3$ |
| (626) | 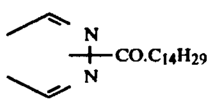 | " | " | " | " | $OSi(CH_3)_3$ |
| (627) | 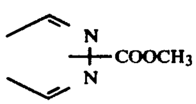 | " | " | " | " | $OSi(C_6H_{13})_3$ |
| (628) | 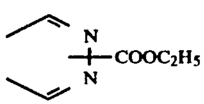 | " | " | " | " | $OSi(C_4H_9)_3$ |

-continued
| | | | | | | |
|---|---|---|---|---|---|---|
| (629) | 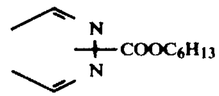 | " | " | " | " | $OSi(C_3H_7)_3$ |
| (630) | 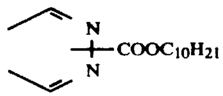 | " | " | " | " | $OSi(C_2H_5)_3$ |
| (631) | 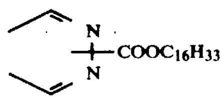 | $= A^1$ | $= A^1$ | $= A^1$ | Si | $OSi(CH_3)_3$ |
| (632) | 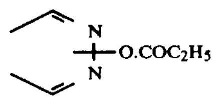 | " | " | " | " | $OSi(C_6H_{13})_3$ |
| (633) | 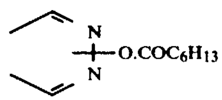 | " | " | " | " | $OSi(C_4H_9)_3$ |
| (634) | 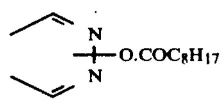 | " | " | " | " | $OSi(C_3H_7)_3$ |
| (635) | 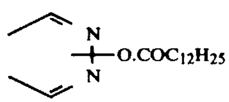 | " | " | " | " | $OSi(C_2H_5)_3$ |
| (636) | 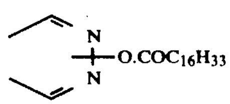 | " | " | " | " | $OSi(CH_3)_3$ |
| (637) | 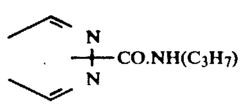 | " | " | " | " | $OSi(C_6H_{13})_3$ |

-continued
| | | | | | | |
|---|---|---|---|---|---|---|
| (638) | 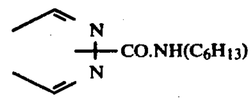 | " | " | " | " | $OSi(C_4H_9)_3$ |
| (639) | 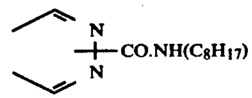 | " | " | " | " | $OSi(C_3H_7)_3$ |
| (640) | 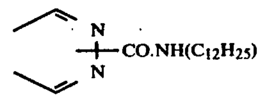 | " | " | " | " | $OSi(C_2H_5)_3$ |
| (641) | 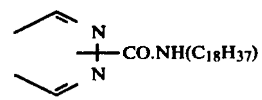 | $= A^1$ | $= A^1$ | $= A^1$ | Si | $OSi(CH_3)_3$ |
| (642) | 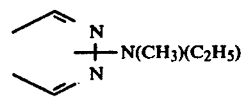 | " | " | " | " | $OSi(C_6H_{13})_3$ |
| (643) | 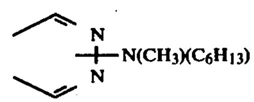 | " | " | " | " | $OSi(C_4H_9)_3$ |
| (644) | 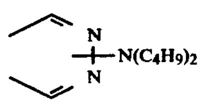 | " | " | " | " | $OSi(C_3H_7)_3$ |
| (645) | 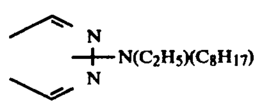 | " | " | " | " | $OSi(C_2H_5)_3$ |
| (646) | 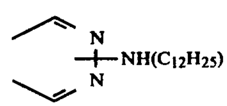 | " | " | " | " | $OSi(CH_3)_3$ |

-continued
| | | | | | |
|---|---|---|---|---|---|
| (647) | 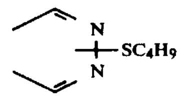 | " | " | " | " $OSi(C_6H_{13})_3$ |
| (648) | 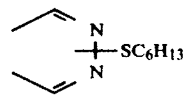 | " | " | " | " $OSi(C_4H_9)_3$ |
| (649) | 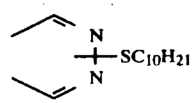 | " | " | " | " $OSi(C_3H_7)_3$ |
| (650) | 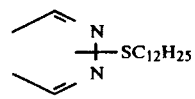 | " | " | " | " $OSi(C_2H_5)_3$ |
| (651) | 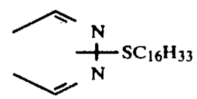 | $= A^1$ | $= A^1$ | $= A^1$ | Si $OSi(CH_3)_3$ |
| (652) | 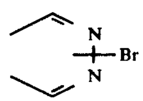 | " | " | " | " $OSi(C_6H_{13})_3$ |
| (653) | 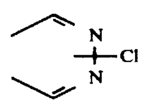 | " | " | " | " $OSi(C_4H_9)_3$ |
| (654) | 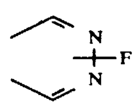 | " | " | " | " $OSi(C_3H_7)_3$ |

-continued
| | | | | | |
|---|---|---|---|---|---|
| (655) | 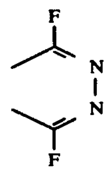 | " | " | " | " $OSi(C_2H_5)_3$ |
| (656) | 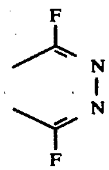 | " | " | " | " $OSi(CH_3)_3$ |
| (657) | 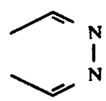 | " | " | " | " $OSi(C_4H_9)_3$ |
| (658) | " | " | " | " | " $OSi(C_2H_5)_3$ |
| (659) | 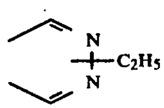 | " | " | " | " $OSi(C_4H_9)_3$ |
| (660) | 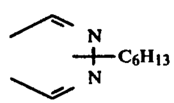 | " | " | " | " $OSi(C_2H_5)_3$ |
| (661) | 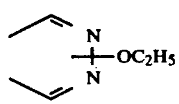 | $= A^1$ | $= A^1$ | $= A^1$ | Ge $OSi(C_4H_9)_3$ |
| (662) | 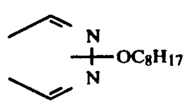 | " | " | " | " $OSi(C_2H_5)_3$ |

-continued
| | | | | | | |
|---|---|---|---|---|---|---|
| (663) | 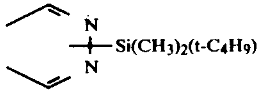 | " | " | " | " | $OSi(C_4H_9)_3$ |
| (664) | 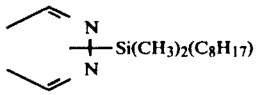 | " | " | " | " | $OSi(C_2H_5)_3$ |
| (665) | 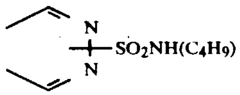 | " | " | " | " | $OSi(C_4H_9)_3$ |
| (666) | 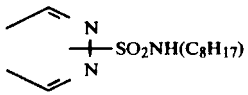 | " | " | " | " | $OSi(C_2H_5)_3$ |
| (667) | 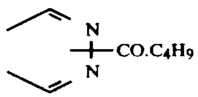 | " | " | " | " | $OSi(C_4H_9)_3$ |
| (668) | 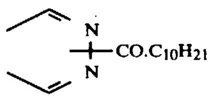 | " | " | " | " | $OSi(C_2H_5)_3$ |
| (669) | 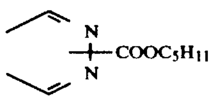 | " | " | " | " | $OSi(C_4H_9)_3$ |
| (670) | 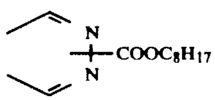 | " | " | " | " | $OSi(C_2H_5)_3$ |
| (671) | 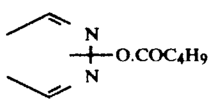 | $= A^1$ | $= A^1$ | $= A^1$ | Ge | $OSi(C_4H_9)_3$ |

-continued
| | | | | | |
|---|---|---|---|---|---|
| (672) | 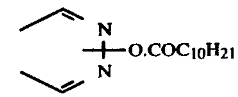 | " | " | " | " $OSi(C_2H_5)_3$ |
| (673) | 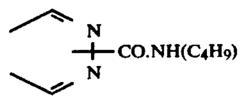 | " | " | " | " $OSi(C_4H_9)_3$ |
| (674) | 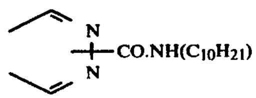 | " | " | " | " $OSi(C_2H_5)_3$ |
| (675) | 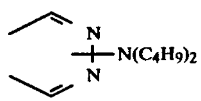 | " | " | " | " $OSi(C_4H_9)_3$ |
| (676) | 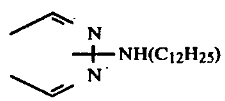 | " | " | " | " $OSi(C_2H_5)_3$ |
| (677) | 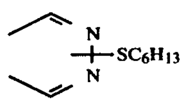 | " | " | " | " $OSi(C_4H_9)_3$ |
| (678) | 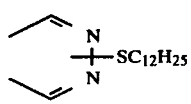 | " | " | " | " $OSi(C_2H_5)_3$ |
| (679) | 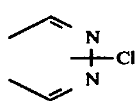 | " | " | " | " $OSi(C_4H_9)_3$ |

-continued
| | | | | | | |
|---|---|---|---|---|---|---|
| (680) | 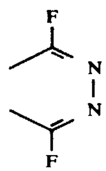 | " | " | " | " | $OSi(C_2H_5)_3$ |
| (681) | 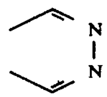 | $= A^1$ | $= A^1$ | $= A^1$ | Sn | $OSi(C_4H_9)_3$ |
| (682) | 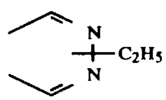 | " | " | " | " | $OSi(C_4H_9)_3$ |
| (683) | 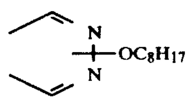 | " | " | " | " | $OSi(C_2H_5)_3$ |
| (684) | 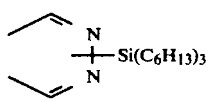 | " | " | " | " | $OSi(C_2H_5)_3$ |
| (685) | 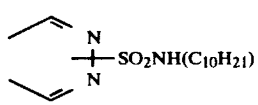 | " | " | " | " | $OSi(C_4H_9)_3$ |
| (686) | 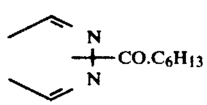 | " | " | " | " | $OSi(C_4H_9)_3$ |
| (687) | 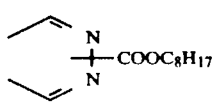 | " | " | " | " | $OSi(C_2H_5)_3$ |

-continued
| | | | | | |
|---|---|---|---|---|---|
| (688) | 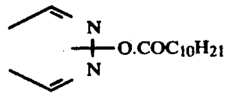 | " | " | " | " OSi($C_2H_5$)$_3$ |
| (689) | 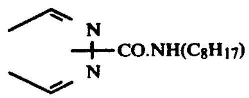 | " | " | " | " OSi($C_4H_9$)$_3$ |
| (690) | 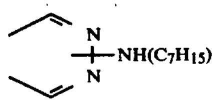 | " | " | " | " OSi($C_4H_9$)$_3$ |
| (691) | 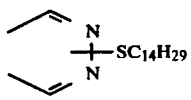 | $= A^1$ | $= A^1$ | $= A^1$ | Sn OSi($C_2H_5$)$_3$ |
| (692) | 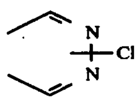 | " | " | " | " OSi($C_2H_5$)$_3$ |
| (693) | 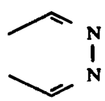 | " | " | " | Si OSi($CH_3$)$_2$($OC_2H_4OCH_3$) |
| (694) | " | " | " | " | " OSi($CH_3$)$_2$($OC_2H_4O.COCH_3$) |
| (695) | 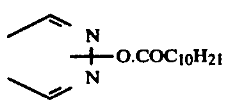 | " | " | " | " $OC_{16}H_{33}$ |
| (696) | 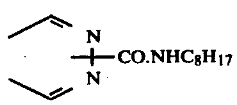 | " | " | " | " $OC_{22}H_{45}$ |

-continued
| | | | | | |
|---|---|---|---|---|---|
| (697) | 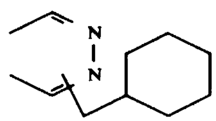 | " | " | " | " $OSi(C_3H_7)_3$ |
| (698) | 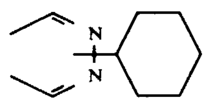 | " | " | " | " $OSi(C_4H_9)_3$ |
| (699) | 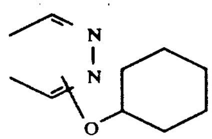 | " | " | " | " $OSi(C_6H_{13})_2$ |
| (700) | 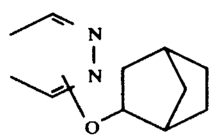 | " | " | " | " $OSi(C_4H_9)_3$ |
| (701) | 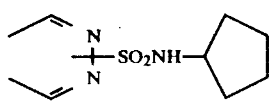 | " | " | " | Si $OSi(C_4H_9)_3$ |
| (702) | 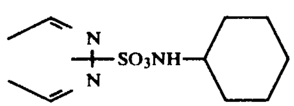 | " | " | " | " $OSi(C_3H_7)_3$ |
| (703) | 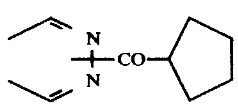 | " | " | " | " $OSi(C_6H_{13})_3$ |
| (704) | 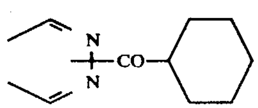 | " | " | " | " $OSi(C_4H_9)_3$ |

-continued
| | | | | | |
|---|---|---|---|---|---|
| (705) | 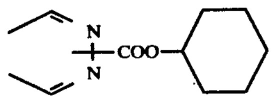 | " | " | " | " $OSi(C_3H_7)_3$ |
| (706) | 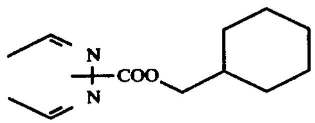 | " | " | " | " $OSi(C_2H_5)_3$ |
| (707) | 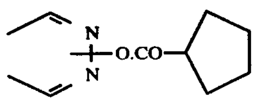 | " | " | " | " $OSi(C_6H_{13})_3$ |
| (708) | 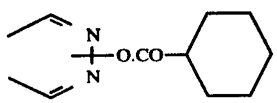 | " | " | " | " $OSi(C_3H_7)_3$ |
| (709) | 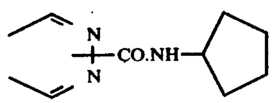 | " | " | " | " $OSi(C_6H_{13})_3$ |
| (710) | 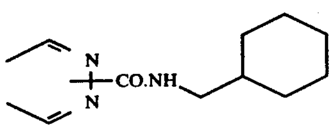 | " | " | " | " $OSi(C_4H_9)_3$ |
| (711) | 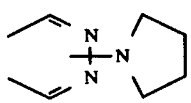 | $= A^1$ | $= A^1$ | $= A^1$ | Si $OSi(C_4H_9)_3$ |
| (712) | 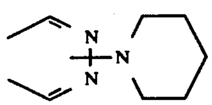 | " | " | " | " $OSi(C_3H_7)_3$ |

-continued
| | | | | | | |
|---|---|---|---|---|---|---|
| (713) | 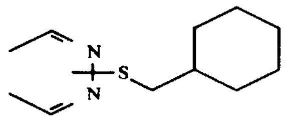 | " | " | " | " | $OSi(C_3H_7)_3$ |
| (714) | 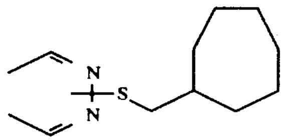 | " | " | " | " | $OSi(C_2H_5)_3$ |
| (715) | 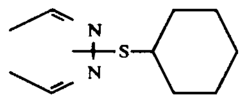 | " | " | " | " | $OSi(C_6H_{13})_3$ |
| (716) | 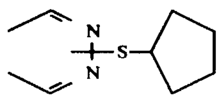 | " | " | " | " | $OSi(C_4H_9)_3$ |
| (717) | 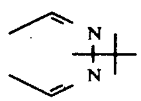 | " | " | " | " | $OSi(C_6H_{13})_3$ |
| (718) | 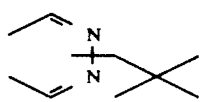 | " | " | " | " | $OSi(C_4H_9)_3$ |
| (719) | 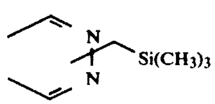 | " | " | " | " | $OSi(C_3H_7)_3$ |
| (720) | 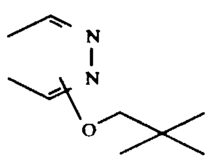 | " | " | " | " | $OSi(C_2H_5)_3$ |

-continued
| | | | | | |
|---|---|---|---|---|---|
| (721) | 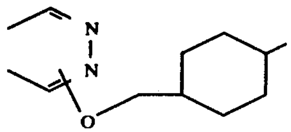 | = $A^1$ | = $A^1$ | = $A^1$ | Si $OSi(C_2H_5)_3$ |
| (722) | 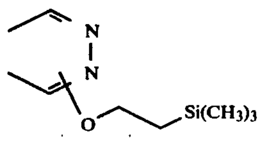 | " | " | " | " $OSi(C_2H_5)_3$ |
| (723) | 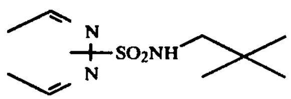 | " | " | " | " $OSi(C_6H_{13})_3$ |
| (724) | 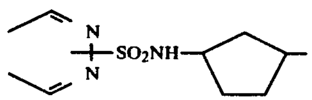 | " | " | " | " $OSi(C_4H_9)_3$ |
| (725) | 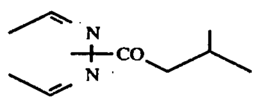 | " | " | " | " $OSi(C_6H_{13})_3$ |
| (726) | 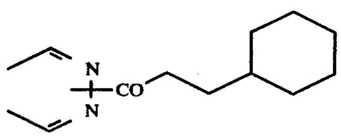 | " | " | " | " $OSi(C_4H_9)_3$ |
| (727) | 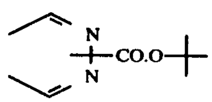 | " | " | " | " $OSi(C_6H_{13})_3$ |
| (728) | 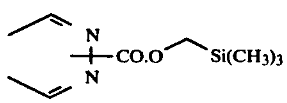 | " | " | " | " $OSi(C_2H_5)_3$ |

-continued
| | | | | | | |
|---|---|---|---|---|---|---|
| (729) | 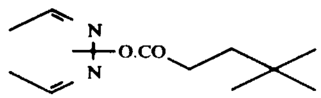 | " | " | " | " | $OSi(C_3H_7)_3$ |
| (730) | 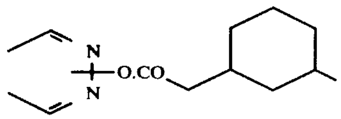 | " | " | " | " | $OSi(C_2H_5)_3$ |
| (731) | 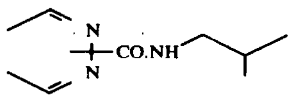 | $= A^1$ | $= A^1$ | $= A^1$ | Si | $OSi(C_6H_{13})_3$ |
| (732) | 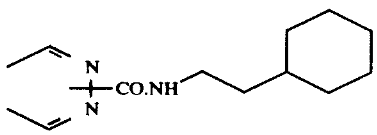 | " | " | " | " | $OSi(C_4H_9)_3$ |
| (733) | 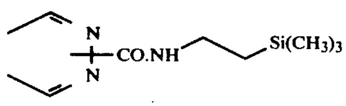 | " | " | " | " | $OSi(C_2H_5)_3$ |
| (734) | 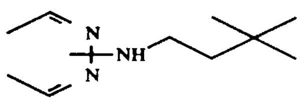 | " | " | " | " | $OSi(C_3H_7)_3$ |
| (735) | 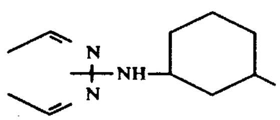 | " | " | " | " | $OSi(C_4H_9)_3$ |
| (736) | 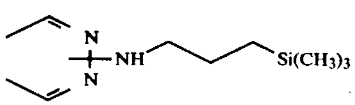 | " | " | " | " | $OSi(CH_3)_3$ |

| | | | | | | |
|---|---|---|---|---|---|---|
| (737) | 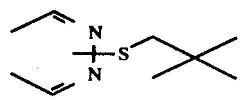 | " | " | " | " | $OSi(C_2H_5)_3$ |
| (738) | 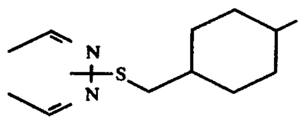 | " | " | " | " | $OSi(C_4H_9)_3$ |
| (739) | 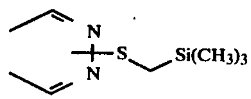 | " | " | " | " | $OSi(C_6H_{13})_3$ |
| (740) | 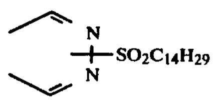 | " | " | " | " | $OSi(C_4H_9)_3$ |
| (741) | 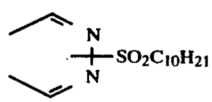 | $= A^1$ | $= A^1$ | $= A^1$ | Si | $OSi(C_6H_{13})_3$ |
| (742) | 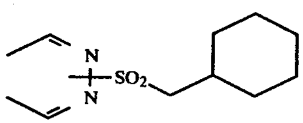 | " | " | " | " | $OSi(C_4H_9)_3$ |
| (743) | 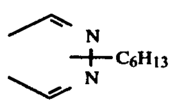 | " | " | " | " | OSi 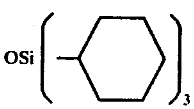 |
| (744) | 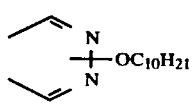 | " | " | " | " | $OSi(CH_3)_2$ 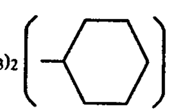 |

-continued
| | | | | | |
|---|---|---|---|---|---|
| (745) | 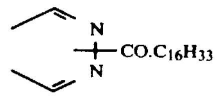 | " | " | " | " $OSi(CH_3)_2(t\text{-}C_4H_9)$ |
| (746) | 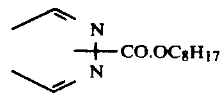 | " | " | " | " OSi 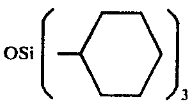 |
| (747) | 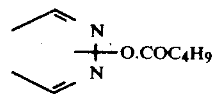 | " | " | " | " OSi 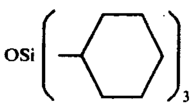 |
| (748) | 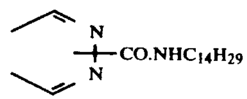 | " | " | " | " $OSi(CH_3)_2$ 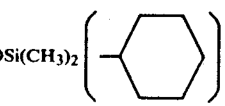 |
| (749) | 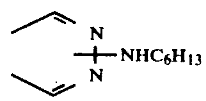 | " | " | " | " OSi 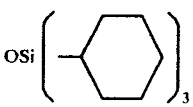 |
| (750) | 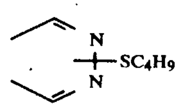 | " | " | " | " OSi 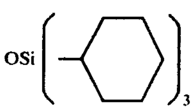 |
| (751) | 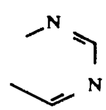 | $= A^1$ | $= A^1$ | $= A^1$ | Si $OSi(C_6H_{13})_3$ |
| (752) | " | " | " | " | " $OSi(C_4H_9)_3$ |
| (753) | " | " | " | " | " $OSi(C_3H_7)_3$ |
| (754) | " | " | " | " | " $OSi(C_2H_5)_3$ |
| (755) | 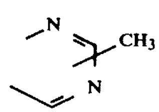 | " | " | " | " $OSi(C_6H_{13})_3$ |

-continued
| | | | | | | |
|---|---|---|---|---|---|---|
| (756) | 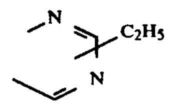 | ″ | ″ | ″ | ″ | $OSi(C_4H_9)_3$ |
| (757) | 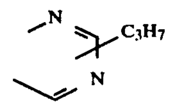 | ″ | ″ | ″ | ″ | $OSi(C_3H_7)_3$ |
| (758) | 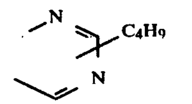 | ″ | ″ | ″ | ″ | $OSi(C_2H_5)_3$ |
| (759) | 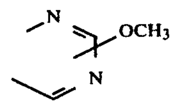 | ″ | ″ | ″ | ″ | $OSi(C_6H_{13})_3$ |
| (760) | 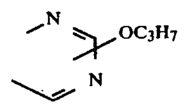 | ″ | ″ | ″ | ″ | $OSi(C_4H_9)_3$ |
| (761) | 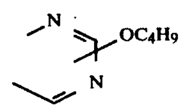 | $=A^1$ | $=A^1$ | $=A^1$ | Si | $OSi(C_3H_7)_3$ |
| (762) | 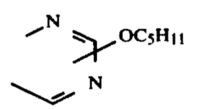 | ″ | ″ | ″ | ″ | $OSi(C_2H_5)_3$ |
| (763) | 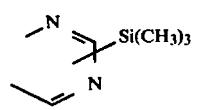 | ″ | ″ | ″ | ″ | $OSi(C_4H_9)_3$ |
| (764) | 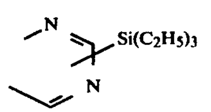 | ″ | ″ | ″ | ″ | $OSi(C_3H_7)_3$ |

-continued
| | | | | | |
|---|---|---|---|---|---|
| (765) | 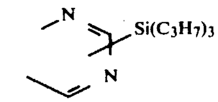 | " | " | " | " $OSi(C_2H_5)_3$ |
| (766) | 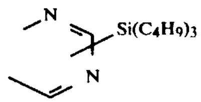 | " | " | " | " $OSi(CH_3)_3$ |
| (767) | 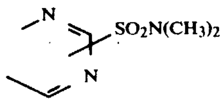 | " | " | " | " $OSi(C_6H_{13})_3$ |
| (768) | 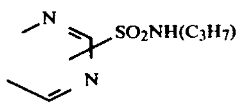 | " | " | " | " $OSi(C_4H_9)_3$ |
| (769) | 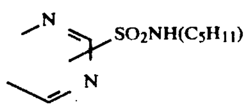 | " | " | " | " $OSi(C_3H_7)_3$ |
| (770) | 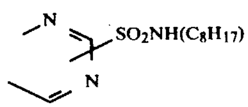 | " | " | " | " $OSi(C_2H_5)_3$ |
| (771) | 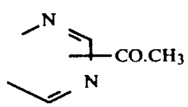 | $= A^1$ | $= A^1$ | $= A^1$ | Si $OSi(C_6H_{13})_3$ |
| (772) | 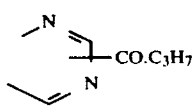 | " | " | " | " $OSi(C_4H_9)_3$ |
| (773) | 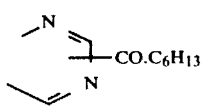 | " | " | " | " $OSi(C_3H_7)_3$ |

-continued
| | | | | | |
|---|---|---|---|---|---|
| (774) | 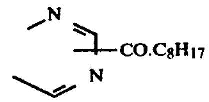 | " | " | " | " $OSi(C_2H_5)_3$ |
| (775) | 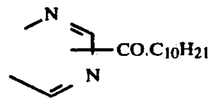 | " | " | " | " $OSi(CH_3)_3$ |
| (776) | 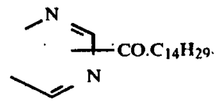 | " | " | " | " $OSi(CH_3)_3$ |
| (777) | 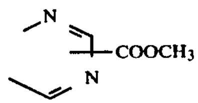 | " | " | " | " $OSi(C_6H_{13})_3$ |
| (778) | 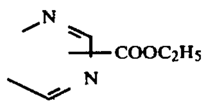 | " | " | " | " $OSi(C_4H_9)_3$ |
| (779) | 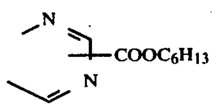 | " | " | " | " $OSi(C_3H_7)_3$ |
| (780) | 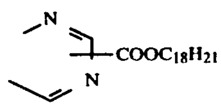 | " | " | " | " $OSi(C_2H_5)_3$ |
| (781) | 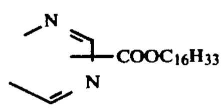 | $= A^1$ | $= A^1$ | $= A^1$ | Si $OSi(CH_3)_3$ |
| (782) | 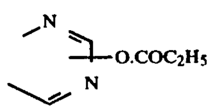 | " | " | " | " $OSi(C_6H_{13})_3$ |

-continued
| | | | | | |
|---|---|---|---|---|---|
| (783) | 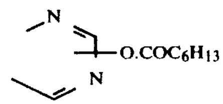 | " | " | " | " $OSi(C_4H_9)_3$ |
| (784) | 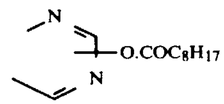 | " | " | " | " $OSi(C_3H_7)_3$ |
| (785) | 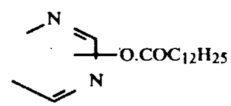 | " | " | " | " $OSi(C_2H_5)_3$ |
| (786) | 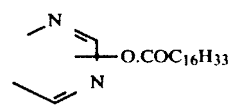 | " | " | " | " $OSi(CH_3)_3$ |
| (787) | 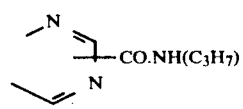 | " | " | " | " $OSi(C_6H_{13})_3$ |
| (788) | 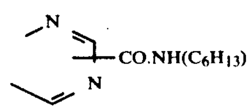 | " | " | " | " $OSi(C_4H_9)_3$ |
| (789) | 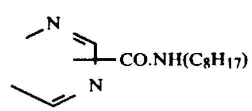 | " | " | " | " $OSi(C_3H_7)_3$ |
| (790) | 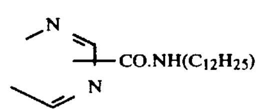 | " | " | " | " $OSi(C_2H_5)_3$ |
| (791) | 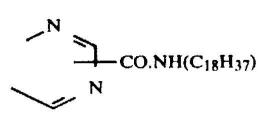 | $= A^1$ | $= A^1$ | $= A^1$ | Si $OSi(CH_3)_3$ |

-continued
| | | | | | |
|---|---|---|---|---|---|
| (792) | 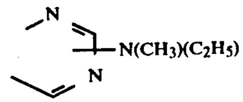 | " | " | " | " $OSi(C_6H_{13})_3$ |
| (793) | 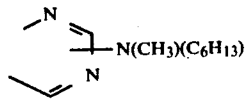 | " | " | " | " $OSi(C_4H_9)_3$ |
| (794) | 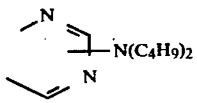 | " | " | " | " $OSi(C_3H_7)_3$ |
| (795) | 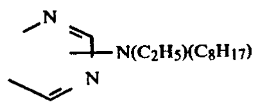 | " | " | " | " $OSi(C_2H_5)_3$ |
| (796) | 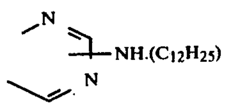 | " | " | " | " $OSi(CH_3)_3$ |
| (797) | 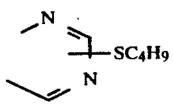 | " | " | " | " $OSi(C_6H_{13})_3$ |
| (798) | 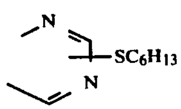 | " | " | " | " $OSi(C_4H_9)_3$ |
| (799) | 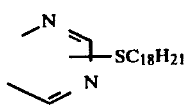 | " | " | " | " $OSi(C_3H_7)_3$ |
| (800) | 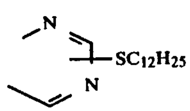 | " | " | " | " $OSi(C_2H_5)_3$ |

-continued
| | | | | | |
|---|---|---|---|---|---|
| (801) | 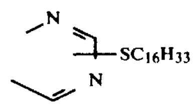 | = $A^1$ | = $A^1$ | = $A^1$ | Si $OSi(CH_3)_3$ |
| (802) | 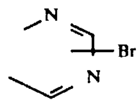 | " | " | " | " $OSi(C_6H_{13})_3$ |
| (803) | 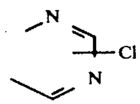 | " | " | " | " $OSi(C_4H_9)_3$ |
| (804) | 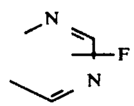 | " | " | " | " $OSi(C_3H_7)_3$ |
| (805) | 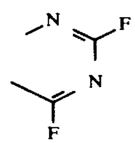 | " | " | " | " $OSi(C_2H_5)_3$ |
| (806) | 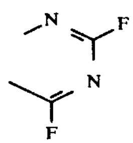 | " | " | " | " $OSi(CH_3)_3$ |
| (807) | 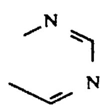 | " | " | " | Ge $OSi(C_4H_9)_3$ |
| (808) | " | " | " | " | " $OSi(C_2H_5)_3$ |
| (809) | 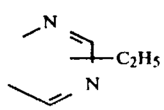 | " | " | " | " $OSi(C_4H_9)_3$ |

-continued
| | | | | | |
|---|---|---|---|---|---|
| (810) | 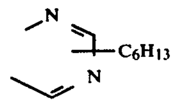 | " | " | " | " $OSi(C_2H_5)_3$ |
| (811) | 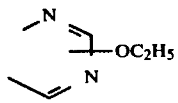 | $= A^1$ | $= A^1$ | $= A^1$ | Ge $OSi(C_4H_9)_3$ |
| (812) | 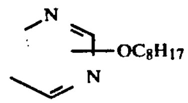 | " | " | " | " $OSi(C_2H_5)_3$ |
| (813) | 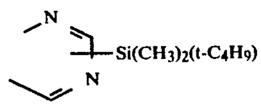 | " | " | " | " $OSi(C_4H_9)_3$ |
| (814) | 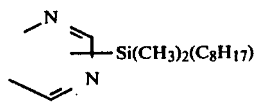 | " | " | " | " $OSi(C_2H_5)_3$ |
| (815) | 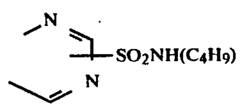 | " | " | " | " $OSi(C_4H_9)_3$ |
| (816) | 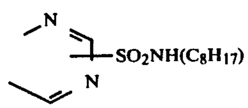 | " | " | " | " $OSi(C_2H_5)_3$ |
| (817) | 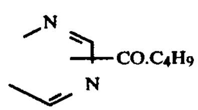 | " | " | " | " $OSi(C_4H_9)_3$ |
| (818) | 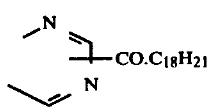 | " | " | " | " $OSi(C_2H_5)_3$ |

-continued
| | | | | | |
|---|---|---|---|---|---|
| (819) | 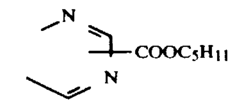 | " | " | " | " $OSi(C_4H_9)_3$ |
| (820) | 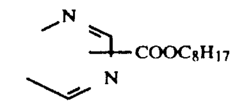 | " | " | " | " $OSi(C_2H_5)_3$ |
| (821) | 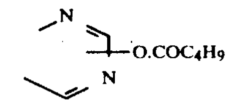 | $= A^1$ | $= A^1$ | $= A^1$ | Ge $OSi(C_4H_9)_3$ |
| (822) | 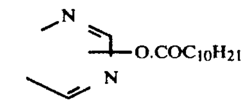 | " | " | " | " $OSi(C_2H_5)_3$ |
| (823) | 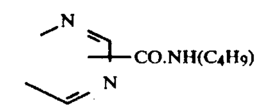 | " | " | " | " $OSi(C_4H_9)_3$ |
| (824) | 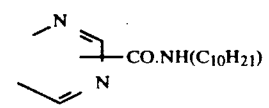 | " | " | " | " $OSi(C_2H_5)_3$ |
| (825) | 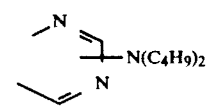 | " | " | " | " $OSi(C_4H_9)_3$ |
| (826) | 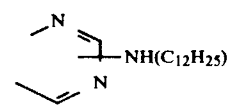 | " | " | " | " $OSi(C_2H_5)_3$ |
| (827) | 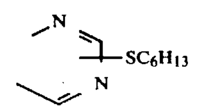 | " | " | " | " $OSi(C_4H_9)_3$ |

-continued
| | | | | | | |
|---|---|---|---|---|---|---|
| (828) | 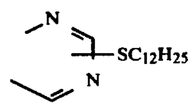 | " | " | " | " | $OSi(C_2H_5)_3$ |
| (829) | 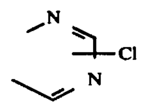 | " | " | " | " | $OSi(C_4H_9)_3$ |
| (830) | 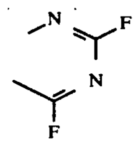 | " | " | " | " | $OSi(C_2H_5)_3$ |
| (831) | 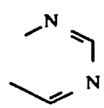 | $= A^1$ | $= A^1$ | $= A^1$ | Sn | $OSi(C_4H_9)_3$ |
| (832) | 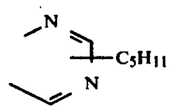 | " | " | " | " | $OSi(C_4H_9)_3$ |
| (833) | 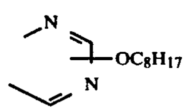 | " | " | " | " | $OSi(C_2H_5)_3$ |
| (834) | 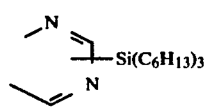 | " | " | " | " | $OSi(C_2H_5)_3$ |
| (835) | 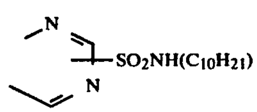 | " | " | " | " | $OSi(C_4H_9)_3$ |

-continued
| | | | | | |
|---|---|---|---|---|---|
| (836) | 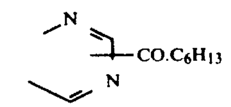 | " | " | " | " $OSi(C_4H_9)_3$ |
| (837) | 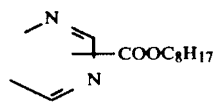 | " | " | " | " $OSi(C_2H_5)_3$ |
| (838) | 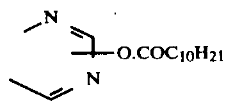 | " | " | " | " $OSi(C_2H_5)_3$ |
| (839) | 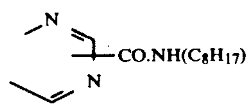 | " | " | " | " $OSi(C_4H_9)_3$ |
| (840) | 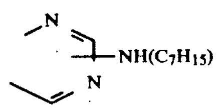 | " | " | " | " $OSi(C_4H_9)_3$ |
| (841) | 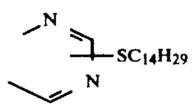 | $= A^1$ | $= A^1$ | $= A^1$ | Sn $OSi(C_2H_5)_3$ |
| (842) | 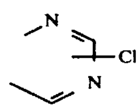 | " | " | " | " $OSi(C_2H_5)_3$ |
| (843) | 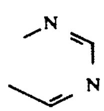 | " | " | " | Si $OSi(CH_3)_2(OC_2H_4OCH_3)$ |
| (844) | " | " | " | " | " $OSi(CH_3)_2(OC_2H_4O.COCH_3)$ |

-continued
| | | | | | |
|---|---|---|---|---|---|
| (845) | 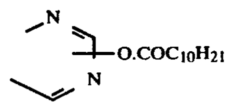 | " | " | " | " $OC_{16}H_{33}$ |
| (846) | 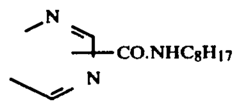 | " | " | " | " $OC_{22}H_{45}$ |
| (847) | 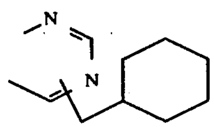 | " | " | " | " $OSi(C_6H_{13})_3$ |
| (848) | 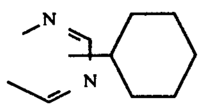 | " | " | " | " $OSi(C_2H_5)_3$ |
| (849) | 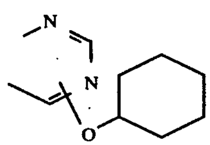 | " | " | " | " $OSi(C_6H_{13})_3$ |
| (850) | 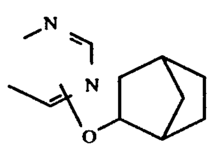 | " | " | " | " $OSi(C_4H_9)_3$ |
| (851) | 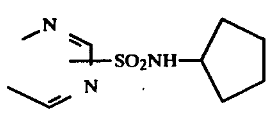 | $= A^1$ | $= A^1$ | $= A^1$ | Si $OSi(C_6H_{13})_3$ |
| (852) | 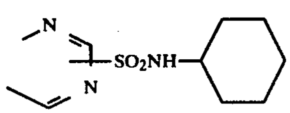 | " | " | " | " $OSi(C_2H_5)_3$ |

-continued
| | | | | | | |
|---|---|---|---|---|---|---|
| (853) | 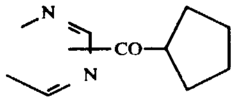 | " | " | " | " | $OSi(C_4H_9)_3$ |
| (854) | 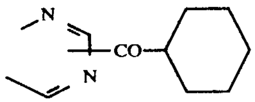 | " | " | " | " | $OSi(C_3H_7)_3$ |
| (855) | 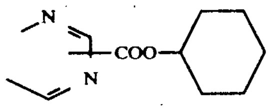 | " | " | " | " | $OSi(C_3H_7)_3$ |
| (856) | 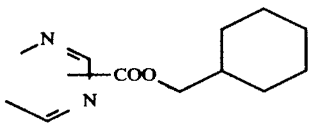 | " | " | " | " | $OSi(C_2H_5)_3$ |
| (857) | 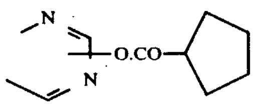 | " | " | " | " | $OSi(C_4H_9)_3$ |
| (858) | 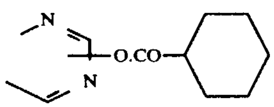 | " | " | " | " | $OSi(C_3H_7)_3$ |
| (859) | 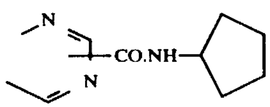 | " | " | " | " | $OSi(C_6H_{13})_3$ |
| (860) | 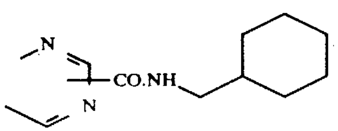 | " | " | " | " | $OSi(C_4H_9)_3$ |

-continued
| | | | | | | |
|---|---|---|---|---|---|---|
| (861) | 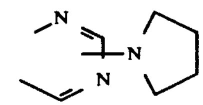 | = A[1] | = A[1] | = A[1] | Si | $OSi(C_4H_9)_3$ |
| (862) | 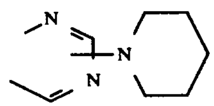 | " | " | " | " | $OSi(C_3H_7)_3$ |
| (863) | 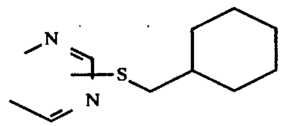 | " | " | " | " | $OSi(C_2H_5)_3$ |
| (864) | 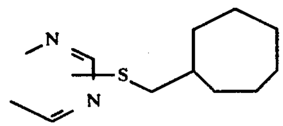 | " | " | " | " | $OSi(CH_3)_3$ |
| (865) | 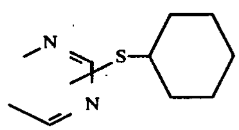 | " | " | " | " | $OSi(C_4H_9)_3$ |
| (866) | 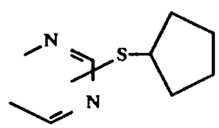 | " | " | " | " | $OSi(C_6H_{13})_3$ |
| (867) | 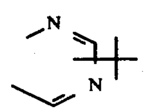 | " | " | " | " | $OSi(C_6H_{13})_3$ |
| (868) | 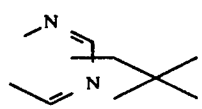 | " | " | " | " | $OSi(C_4H_9)_3$ |

-continued
| | | | | | | |
|---|---|---|---|---|---|---|
| (869) | 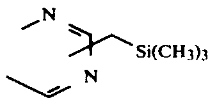 | " | " | " | " | $OSi(C_3H_7)_3$ |
| (870) | 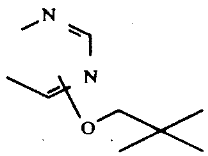 | " | " | " | " | $OSi(C_2H_5)_3$ |
| (871) | 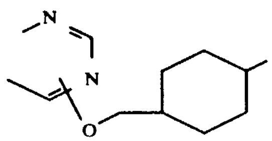 | $= A^1$ | $= A^1$ | $= A^1$ | Si | $OSi(C_2H_5)_3$ |
| (872) | 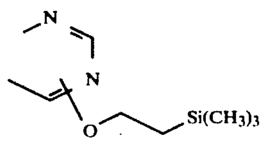 | " | " | " | " | $OSi(C_2H_5)_3$ |
| (873) | 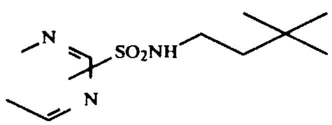 | " | " | " | " | $OSi(C_4H_9)_3$ |
| (874) | 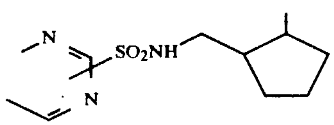 | " | " | " | " | $OSi(C_6H_{13})_3$ |
| (875) | 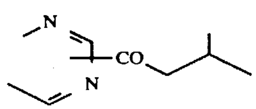 | " | " | " | " | $OSi(C_4H_9)_3$ |

-continued
| | | | | | |
|---|---|---|---|---|---|
| (876) | 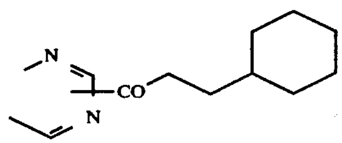 | " | " | " | " $OSi(C_3H_7)_3$ |
| (877) | 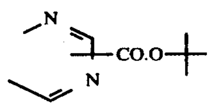 | " | " | " | " $OSi(C_4H_9)_3$ |
| (878) | 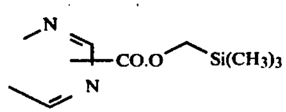 | " | " | " | " $OSi(C_2H_5)_3$ |
| (879) | 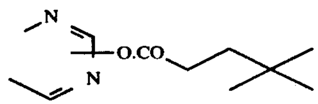 | " | " | " | " $OSi(CH_3)_3$ |
| (880) | 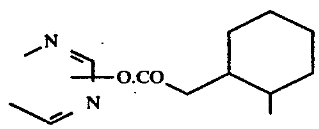 | " | " | " | " $OSi(C_2H_5)_3$ |
| (881) | 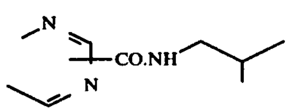 | = A[1] | = A[1] | = A[1] | Si $OSi(C_6H_{13})_3$ |
| (882) | 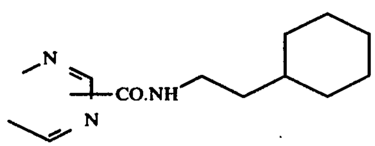 | " | " | " | " $OSi(C_4H_9)_3$ |
| (883) | 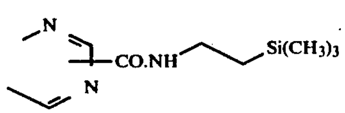 | " | " | " | " $OSi(C_2H_5)_3$ |

-continued
| | | | | | |
|---|---|---|---|---|---|
| (884) | 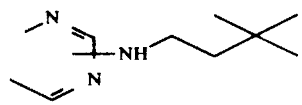 | " | " | " | " $OSi(C_3H_7)_3$ |
| (885) | 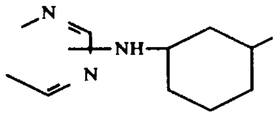 | " | " | " | " $OSi(C_4H_9)_3$ |
| (886) | 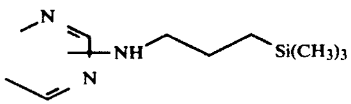 | " | " | " | " $OSi(CH_3)_3$ |
| (887) | 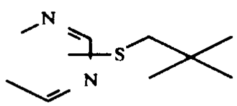 | " | " | " | " $OSi(C_3H_7)_3$ |
| (888) | 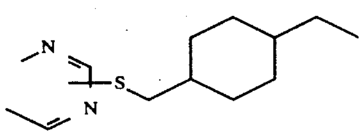 | " | " | " | " $OSi(C_3H_7)_3$ |
| (889) | 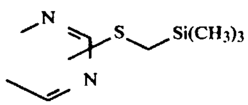 | " | " | " | " $OSi(C_2H_5)_3$ |
| (890) | 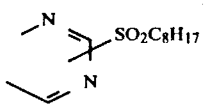 | " | " | " | " $OSi(C_6H_{13})_3$ |
| (891) | 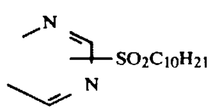 | $= A^1$ | $= A^1$ | $= A^1$ | Si $OSi(C_4H_9)_3$ |

-continued
| | | | | | |
|---|---|---|---|---|---|
| (892) | 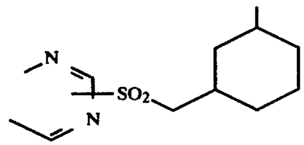 | " | " | " | " $OSi(C_6H_{13})_3$ |
| (893) | 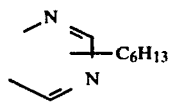 | " | " | " | " 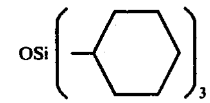 |
| (894) | 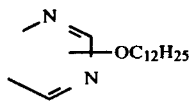 | " | " | " | " 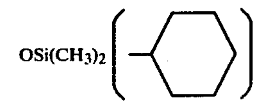 |
| (895) | 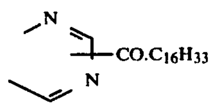 | " | " | " | " $OSi(CH_3)_2(t\text{-}C_4H_9)$ |
| (896) | 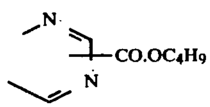 | " | " | " | " 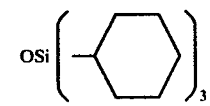 |
| (897) | 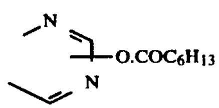 | " | " | " | " 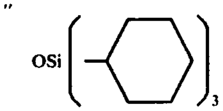 |
| (898) | 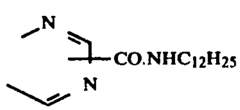 | " | " | " | " 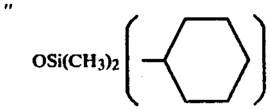 |
| (899) | 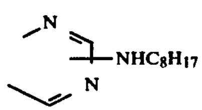 | " | " | " | " 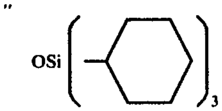 |

-continued
| | | | | | | |
|---|---|---|---|---|---|---|
| (900) | 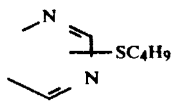 | " | " | " | " | 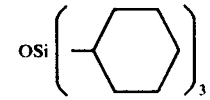 |
| (901) | 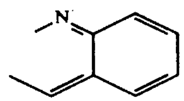 | $=A^1$ | $=A^1$ | $=A^1$ | Si | $OSi(C_6H_{13})_3$ |
| (902) | " | " | " | " | " | $OSi(C_4H_9)_3$ |
| (903) | " | " | " | " | " | $OSi(C_3H_7)_3$ |
| (904) | " | " | " | " | " | $OSi(C_2H_5)_3$ |
| (905) | " | " | " | " | " | $OSi(CH_3)_2(C_{18}H_{37})$ |
| (906) | " | " | " | " | " | $OSi(CH_3)_2)(t\text{-}C_4H_9)$ |
| (907) | " | " | " | " | " | $OSi(CH_3)_2(OC_8H_{17})$ |
| (908) | " | " | " | " | " | $OSi(CH_3)_2(OC_{10}H_{21})$ |
| (909) | " | " | " | " | " | $OSi(CH_3)_2)OC_{12}H_{25})$ |
| (910) | " | " | " | " | " | $OSi(CH_3)_2(OC_{14}H_{29})$ |
| (911) | 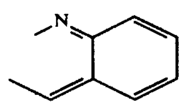 | $=A^1$ | $=A^1$ | $=A^1$ | Si | $OSi(CH_3)_2(OCH_6H_5)$ |
| (912) | " | " | " | " | " | $OSi(OCH_3)_3$ |
| (913) | " | " | " | " | " | $OSi(C_6H_5)_3$ |
| (914) | " | " | " | " | " | $OSi(CH_3)_2C_6H_5$ |
| (915) | " | " | " | " | " | $OSi(OC_6H_5)_3$ |
| (916) | 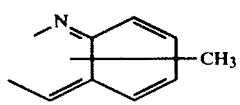 | " | " | " | " | $OSi(C_6H_{13})_3$ |
| (917) | 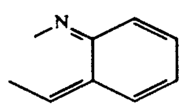 | " | " | " | " | $OSi(OC_6H_{13})_3$ |
| (918) | 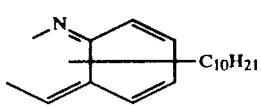 | " | " | " | " | $OC(C_6H_5)_3$ |

-continued
| | | | | | | |
|---|---|---|---|---|---|---|
| (919) | 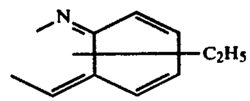 | " | " | " | " | $OSi(C_6H_{13})_3$ |
| (920) | 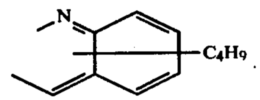 | " | " | " | " | $OSi(CH_3)_2(OC_{18}H_{37})$ |
| (921) | 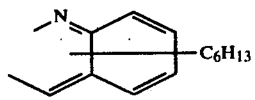 | $= A^1$ | $= A^1$ | $= A^1$ | Si | $OSi(CH_3)_2(C_6H_5)$ |
| (922) | 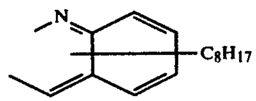 | " | " | " | " | $OSi(C_6H_5)_3$ |
| (923) | 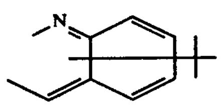 | " | " | " | " | $OSi(CH_3)_2(OC_6H_5)$ |
| (924) | 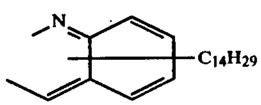 | " | " | " | " | $OC(C_3H_7)_3$ |
| (925) | 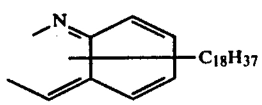 | " | " | " | " | $OC_{18}H_{37}$ |
| (926) | 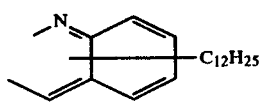 | " | " | " | " | $OC(C_6H_5)_3$ |
| (927) | 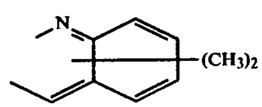 | " | " | " | " | $OSi(C_6H_{13})_3$ |

-continued
| | | | | | |
|---|---|---|---|---|---|
| (928) | 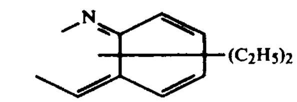 | " | " | " | " $OSi(C_6H_{13})_3$ |
| (929) | 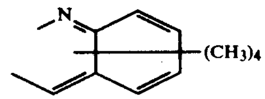 | " | " | " | " $OSi(C_3H_7)_3$ |
| (930) | 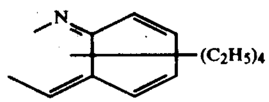 | " | " | " | " $OSi(C_2H_5)_3$ |
| (931) | 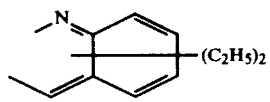 | $= A^1$ | $= A^1$ | $= A^1$ | Si $OSi(CH_3)_2(C_8H_{17})$ |
| (932) | 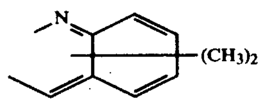 | " | " | " | " $OSi(CH_3)_2(OC_{18}H_{37})$ |
| (933) | 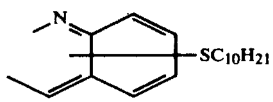 | " | " | " | " $OSi(C_4H_9)_3$ |
| (934) | 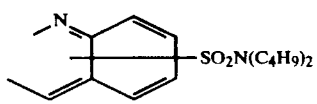 | " | " | " | " $OSi(C_4H_9)_3$ |
| (935) | 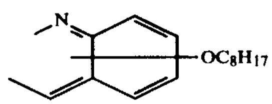 | " | " | " | " $OSi(C_3H_7)_3$ |
| (936) | 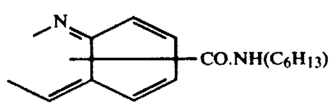 | " | " | " | " $OSi(C_6H_{13})_3$ |

-continued
| | | | | | | |
|---|---|---|---|---|---|---|
| (937) | 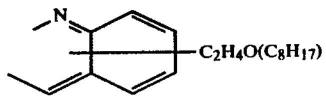 | " | " | " | " | $OSi(C_2H_5)_3$ |
| (938) | 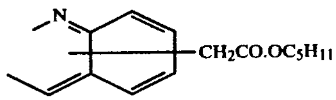 | " | " | " | " | $OSi(C_3H_7)_3$ |
| (939) | 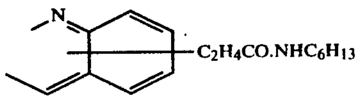 | " | " | " | " | $OSi(C_4H_9)_3$ |
| (940) | 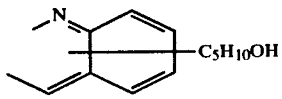 | " | " | " | " | $OSi(C_2H_5)_3$ |
| (941) | 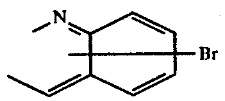 | = $A^1$ | = $A^1$ | = $A^1$ | Si | $OSi(C_4H_9)_3$ |
| (942) | 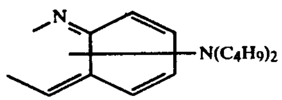 | " | " | " | " | $OSi(C_6H_{13})_3$ |
| (943) | 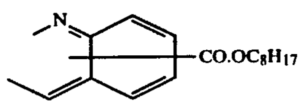 | " | " | " | " | $OSi(C_4H_9)_3$ |
| (944) | 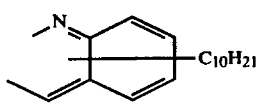 | 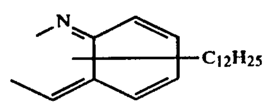 | 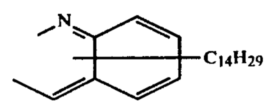 | 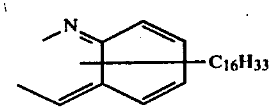 | Ge | $OC(C_6H_5)_3$ |
| (945) | 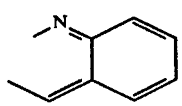 | = $A^1$ | = $A^1$ | = $A^1$ | " | $OSi(C_2H_5)_3$ |

-continued
| | | | | | | |
|---|---|---|---|---|---|---|
| (946) | " | " | " | " | " | $OSi(C_4H_9)_3$ |
| (947) | " | " | " | " | " | $OSi(C_6H_5)_3$ |
| (948) | 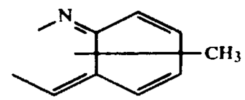 | " | " | " | " | $OSi(C_2H_5)_3$ |
| (949) | 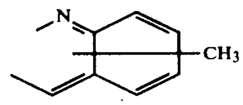 | " | " | " | " | $OSi(C_4H_9)_3$ |
| (950) | 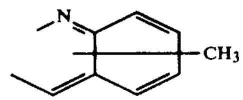 | " | " | " | " | $OC_{10}H_{21}$ |
| (951) | 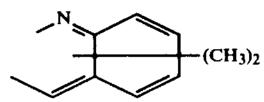 | $= A^1$ | $= A^1$ | $= A^1$ | Ge | $OSi(C_2H_5)_3$ |
| (952) | " | " | " | " | " | $OSi(C_4H_9)_3$ |
| (953) | " | " | " | " | " | $OC_{14}H_{29}$ |
| (954) | 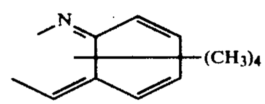 | " | " | " | " | $OSi(C_2H_5)_3$ |
| (955) | 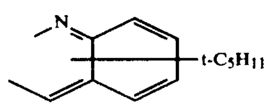 | " | " | " | " | $O(t-C_5H_{11})$ |
| (956) | 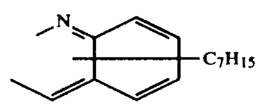 | " | " | " | " | $OSi(C_4H_9)_3$ |
| (957) | 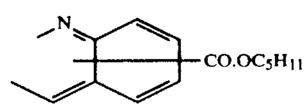 | " | " | " | " | $OSi(C_2H_5)_3$ |

-continued
| | | | | | |
|---|---|---|---|---|---|
| (958) | 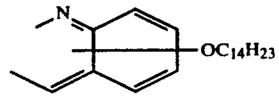  | " | " | " | " $OSi(C_4H_9)_3$ |
| (959) | 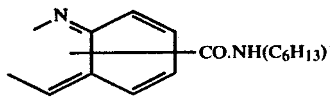  | " | " | " | " $OSi(C_4H_9)_3$ |
| (960) | 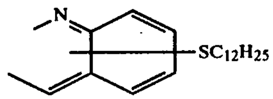  | " | " | " | " $OSi(C_3H_7)_3$ |
| (961) | 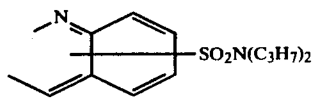  | $= A^1$ | $= A^1$ | $= A^1$ | Ge $OSi(CH_3)_2(C_8H_{17})$ |
| (962) | 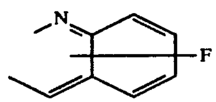  | " | " | " | " $OSi(C_6H_{13})_3$ |
| (963) | 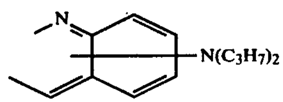  | " | " | " | " $OSi(CH_3)_2(t\text{-}C_4H_9)$ |
| (964) | 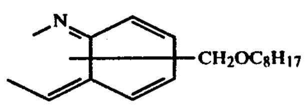  | " | " | " | " $OSi(C_4H_9)_3$ |
| (965) | 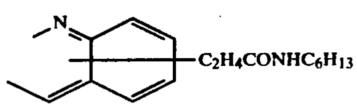  | " | " | " | " $OSi(C_2H_5)_3$ |
| (966) | 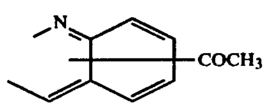  | " | " | " | " $OSi(C_6H_{13})_3$ |

-continued
| | | | | | | |
|---|---|---|---|---|---|---|
| (967) | 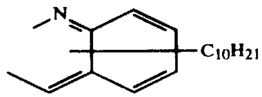 | " | " | " | Sn | $OSi(C_2H_5)_3$ |
| (968) | 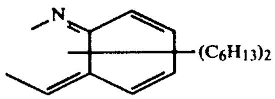 | " | " | " | " | $OSi(C_4H_9)_3$ |
| (969) | 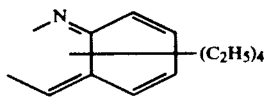 | " | " | " | " | $OC_{18}H_{37}$ |
| (970) | 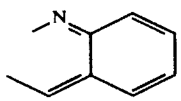 | " | " | " | " | $OSi(C_2H_5)_3$ |
| (971) | 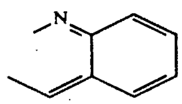 | $= A^1$ | $= A^1$ | $= A^1$ | Sn | $OSi(C_6H_5)_3$ |
| (972) | " | " | " | " | " | $OSi(C_4H_9)_3$ |
| (973) | 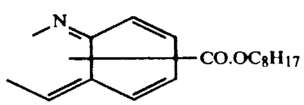 | " | " | " | " | $OSi(C_4H_9)_3$ |
| (974) | 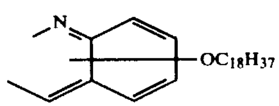 | " | " | " | " | $OSi(C_2H_5)_3$ |
| (975) | 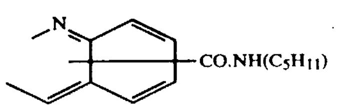 | " | " | " | " | $OSi(C_6H_{13})_3$ |

-continued
| | | | | | | |
|---|---|---|---|---|---|---|
| (976) | 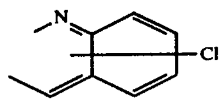 | " | " | " | " | $OSi(C_4H_9)_3$ |
| (977) | 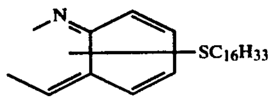 | " | " | " | " | $OSi(C_2H_5)_3$ |
| (978) | 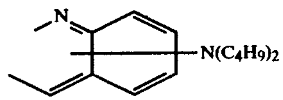 | " | " | " | " | $OSi(C_6H_5)_3$ |
| (979) | 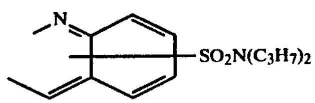 | " | " | " | " | $OSi(C_6H_{13})_3$ |
| (980) | 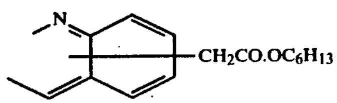 | " | " | " | " | $OSi(C_4H_9)_3$ |
| (981) | 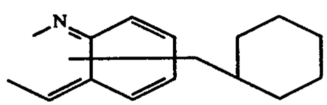 | $= A^1$ | $= A^1$ | $= A^1$ | Si | $OSi(C_3H_7)_3$ |
| (982) | 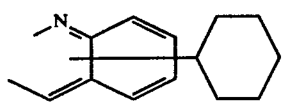 | " | " | " | " | $OSi(C_2H_5)_3$ |
| (983) | 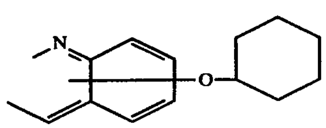 | " | " | " | " | $OSi(C_6H_{13})_3$ |

-continued
| | | | | | | |
|---|---|---|---|---|---|---|
| (984) | 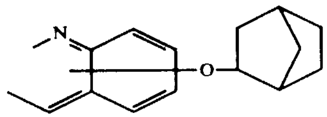 | " | " | " | " | $OSi(C_4H_9)_3$ |
| (985) | 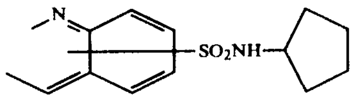 | " | " | " | " | $OSi(C_3H_7)_3$ |
| (986) | 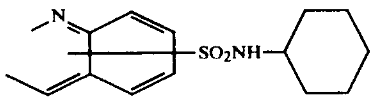 | " | " | " | " | $OSi(C_2H_5)_3$ |
| (987) | 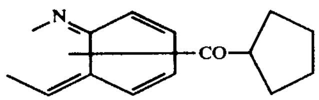 | " | " | " | " | $OSi(C_6H_{13})_3$ |
| (988) | 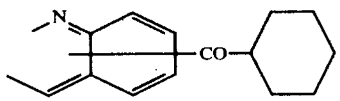 | " | " | " | " | $OSi(C_4H_9)_3$ |
| (989) | 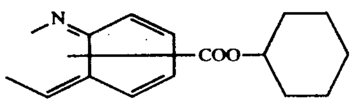 | " | " | " | " | $OSi(C_3H_7)_3$ |
| (990) | 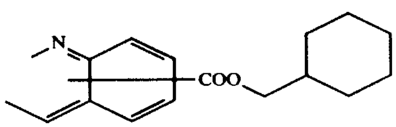 | " | " | " | " | $OSi(C_4H_9)_3$ |
| (991) | 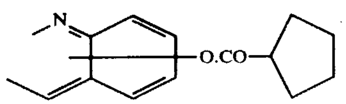 | $= A^1$ | $= A^1$ | $= A^1$ | Si | $OSi(C_4H_9)_3$ |

-continued
| | | | | | |
|---|---|---|---|---|---|
| (992) | 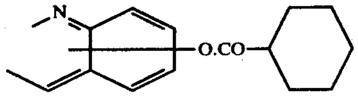 | " | " | " | " $OSi(C_3H_7)_3$ |
| (993) | 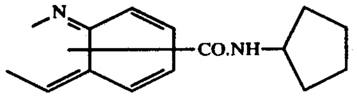 | " | " | " | " $OSi(C_6H_{13})_3$ |
| (994) | 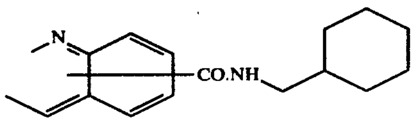 | " | " | " | " $OSi(C_4H_9)_3$ |
| (995) | 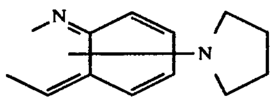 | " | " | " | " $OSi(C_4H_9)_3$ |
| (996) | 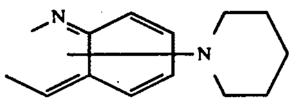 | " | " | " | " $OSi(C_3H_7)_3$ |
| (997) | 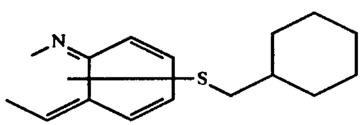 | " | " | " | " $OSi(C_2H_5)_3$ |
| (998) | 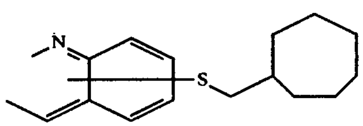 | " | " | " | " $OSi(CH_3)_3$ |
| (999) | 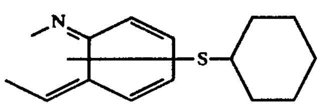 | " | " | " | " $OSi(C_6H_{13})_3$ |

-continued
| | | | | | | |
|---|---|---|---|---|---|---|
| (1000) | 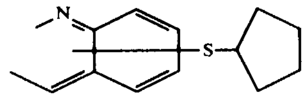 | " | " | " | " | $OSi(C_4H_9)_3$ |
| (1001) | 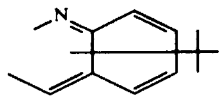 | $= A^1$ | $= A^1$ | $= A^1$ | Si | $OSi(C_4H_9)_3$ |
| (1002) | 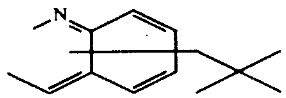 | " | " | " | " | $OSi(C_6H_{13})_3$ |
| (1003) | 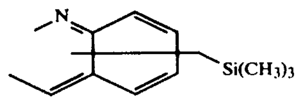 | " | " | " | " | $OSi(C_4H_9)_3$ |
| (1004) | 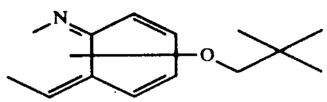 | " | " | " | " | $OSi(C_3H_7)_3$ |
| (1005) | 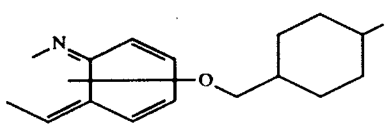 | " | " | " | " | $OSi(C_2H_5)_3$ |
| (1006) | 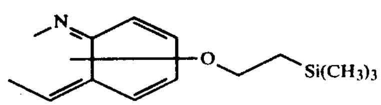 | " | " | " | " | $OSi(C_2H_5)_3$ |
| (1007) | 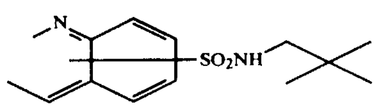 | " | " | " | " | $OSi(C_6H_{13})_3$ |
| (1008) | 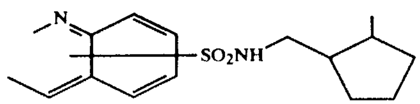 | " | " | " | " | $OSi(C_4H_9)_3$ |

-continued
| | | | | | | |
|---|---|---|---|---|---|---|
| (1009) | 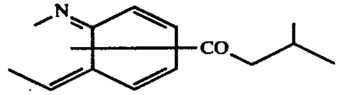 | " | " | " | " | $OSi(C_6H_{13})_3$ |
| (1010) | 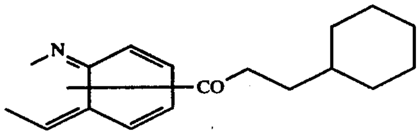 | " | " | " | " | $OSi(C_3H_7)_3$ |
| (1011) | 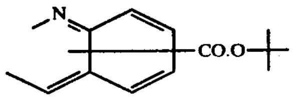 | $= A^1$ | $= A^1$ | $= A^1$ | Si | $OSi(C_6H_{13})_3$ |
| (1012) | 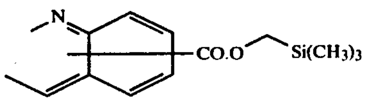 | " | " | " | " | $OSi(C_2H_5)_3$ |
| (1013) | 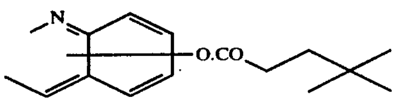 | " | " | " | " | $OSi(C_3H_7)_3$ |
| (1014) | 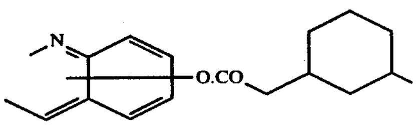 | " | " | " | " | $OSi(C_2H_5)_3$ |
| (1015) | 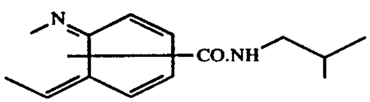 | " | " | " | " | $OSi(C_6H_{13})_3$ |
| (1016) | 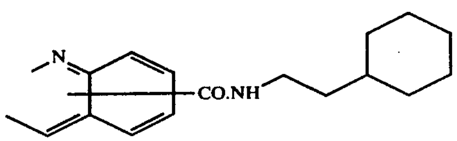 | " | " | " | " | $OSi(C_4H_9)_3$ |

-continued
| | | | | | | |
|---|---|---|---|---|---|---|
| (1017) | 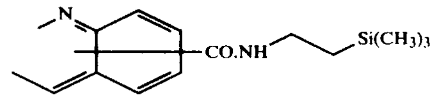 | " | " | " | " | $OSi(C_2H_5)_3$ |
| (1018) | 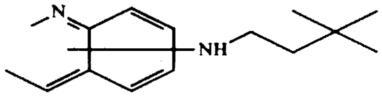 | " | " | " | " | $OSi(C_3H_7)_3$ |
| (1019) | 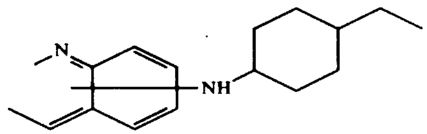 | " | " | " | " | $OSi(C_4H_9)_3$ |
| (1020) | 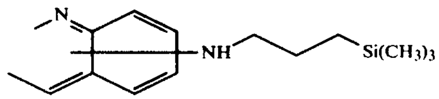 | " | " | " | " | $OSi(C_2H_5)_3$ |
| (1021) | 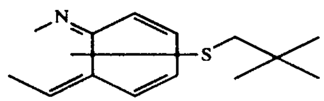 | $= A^1$ | $= A^1$ | $= A^1$ | Si | $OSi(C_4H_9)_3$ |
| (1022) | 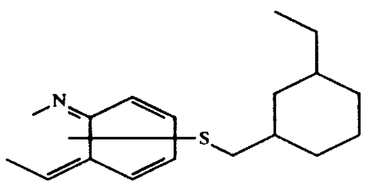 | " | " | " | " | $OSi(C_3H_7)_3$ |
| (1023) | 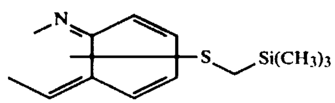 | " | " | " | " | $OSi(C_2H_5)_3$ |
| (1024) | 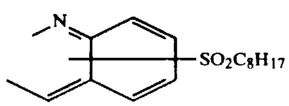 | " | " | " | " | $OSi(C_6H_{13})_3$ |

-continued
| | | | | | |
|---|---|---|---|---|---|
| (1025) | 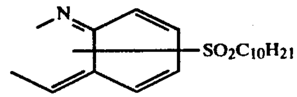 | " | " | " | " $OSi(C_4H_9)_3$ |
| (1026) | 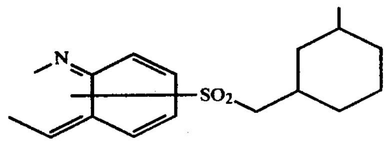 | " | " | " | " $OSi(C_4H_9)_3$ |
| (1027) | 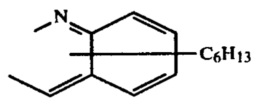 | " | " | " | " OSi 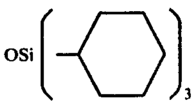 |
| (1028) | 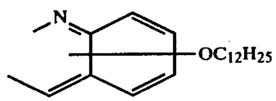 | " | " | " | " $OSi(CH_3)_2$ 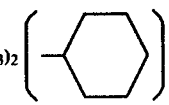 |
| (1029) | 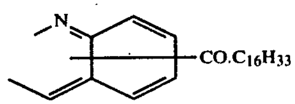 | " | " | " | " $OSi(CH_3)_2(t\text{-}C_4H_9)$ |
| (1030) | 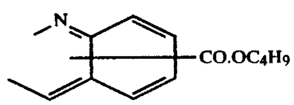 | " | " | " | " OSi 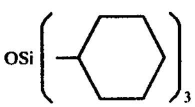 |
| (1031) | 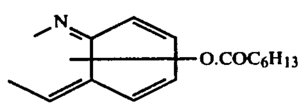 | $= A^1$ | $= A^1$ | $= A^1$ | Si OSi 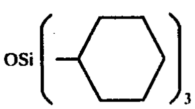 |
| (1032) | 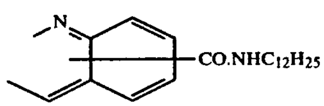 | " | " | " | " $OSi(CH_3)_2$ 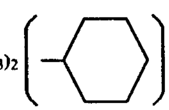 |

-continued
| | | | | | |
|---|---|---|---|---|---|
| (1033) | 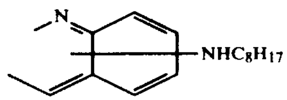 | " | " | " | " 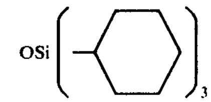 |
| (1034) | 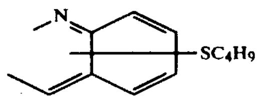 | " | " | " | " 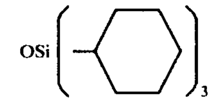 |
| (1035) | 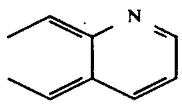 | " | " | " | " $OSi(C_2H_5)_3$ |
| (1036) | " | " | " | " | " $OSi(C_3H_7)_3$ |
| (1037) | " | " | " | " | " $OSi(C_4H_9)_3$ |
| (1038) | " | " | " | " | " $OSi(C_6H_{13})_3$ |
| (1039) | " | " | " | " | " $OSi(CH_3)_2(C_{18}H_{37})$ |
| (1040) | " | " | " | " | " $OC_{18}H_{37}$ |
| (1041) | 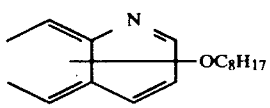 | $= A^1$ | $= A^1$ | $= A^1$ | Si $OSi(C_3H_7)_3$ |
| (1042) | 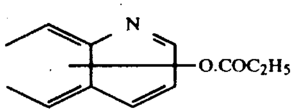 | " | " | " | " $OSi(C_6H_{13})_3$ |
| (1043) | 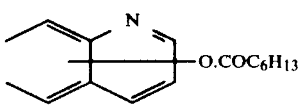 | " | " | " | " $OSi(C_4H_9)_3$ |
| (1044) | 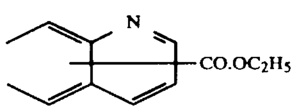 | " | " | " | " $OSi(C_6H_{13})_3$ |
| (1045) | 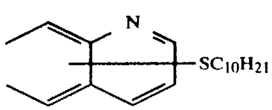 | " | " | " | " $OSi(C_4H_9)_3$ |

-continued
| | | | | | | |
|---|---|---|---|---|---|---|
| (1046) | 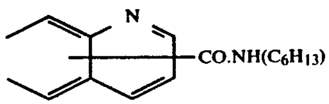 | " | " | " | " | $OSi(C_2H_5)_3$ |
| (1047) | 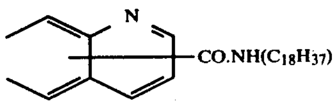 | " | " | " | " | $OSi(C_3H_7)_3$ |
| (1048) | 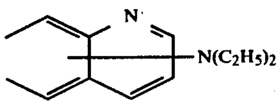 | " | " | " | " | $OSi(C_6H_{13})_3$ |
| (1049) | 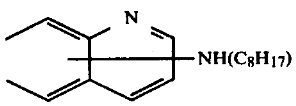 | " | " | " | " | $OC_{18}H_{37}$ |
| (1050) | 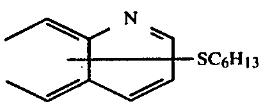 | " | " | " | " | $OSi(C_3H_7)_3$ |
| (1051) | 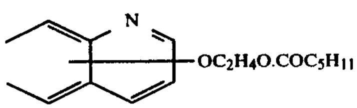 | $= A^1$ | $= A^1$ | $= A^1$ | Si | $OSi(C_6H_5)_3$ |
| (1052) | 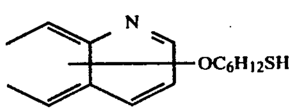 | " | " | " | " | $OSi(C_6H_{13})_3$ |
| (1053) | 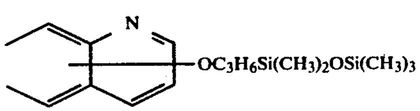 | " | " | " | " | $OSi(C_2H_5)_3$ |
| (1054) | 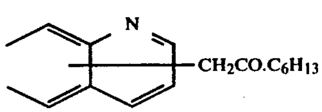 | " | " | " | " | $OSi(C_3H_7)_3$ |

-continued
| | | | | | |
|---|---|---|---|---|---|
| (1055) | 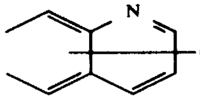 $CH_2NH.COC_8H_{17}$ | " | " | " | " $OSi(C_4H_9)_3$ |
| (1056) | 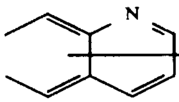 $CH_2N(C_4H_9)_2$ | " | " | " | " $OSi(C_6H_{13})_3$ |
| (1057) | 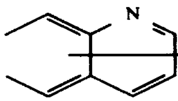 $Si(C_6H_5)_3$ | " | " | " | " $OSi(C_6H_5)_3$ |
| (1058) | 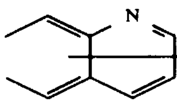 $Si(CH_3)_2(t\text{-}C_4H_9)$ | " | " | " | " $OSi(CH_3)_2(C_3H_7)$ |
| (1059) | 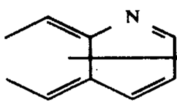 $OSi(C_6H_{13})_3$ | " | " | " | " $OSi(CH_3)_2(C_6H_5)$ |
| (1060) | 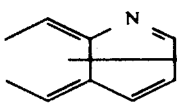 $SO_2C_2H_5$ | " | " | " | " $OSi(CH_3)_2(C_8H_{17})$ |
| (1061) | 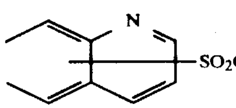 $SO_2C_3H_7$ | $= A^1$ | $= A^1$ | $= A^1$ | Si $OSi(CH_3)(C_5H_{11})(OC_8H_{17})$ |
| (1062) | 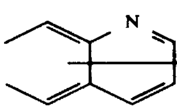 $SO_2NH(C_4H_9)$ | " | " | " | " $OSi(CH_3)(C_6H_{13})(OC_8H_{17})$ |
| (1063) | 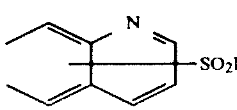 $SO_2N(CH_3)_2$ | " | " | " | " $OSi(CH_3)(C_{10}H_{21})(OCH_3)$ |

-continued
| | | | | | |
|---|---|---|---|---|---|
| (1064) | 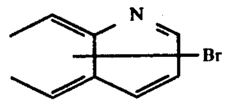 | " | " | " | " $OSi(CH_3)(C_{12}H_{25})(OC_{16}H_{33})$ |
| (1065) | 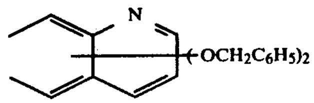 | " | " | " | " $OSi(C_2H_5)_3$ |
| (1066) | 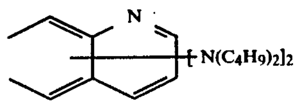 | " | " | " | " $OSi(C_3H_7)_3$ |
| (1067) | 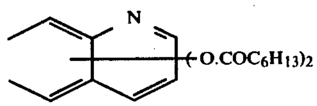 | " | " | " | " $OSi(C_4H_9)_3$ |
| (1068) | 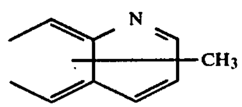 | " | " | " | " $OSi(C_4H_9)_3$ |
| (1069) | 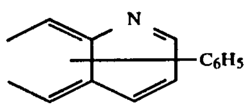 | " | " | " | " $OSi(C_4H_9)_3$ |
| (1070) | 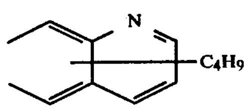 | " | " | " | " $OSi(C_6H_{13})_3$ |
| (1071) | 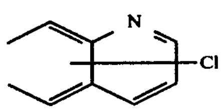 | $= A^1$ | $= A^1$ | $= A^1$ | Si $OSi(C_6H_{13})_3$ |
| (1072) | 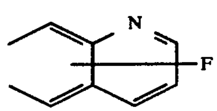 | " | " | " | " $OSi(C_2H_5)_3$ |

-continued
| | | | | | | |
|---|---|---|---|---|---|---|
| (1073) | 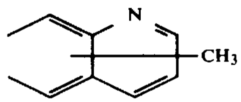 | " | " | " | Ge | $OSi(C_6H_5)_3$ |
| (1074) | 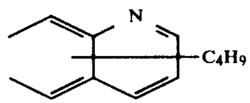 | " | " | " | " | $OSi(CH_3)_2(C_3H_7)$ |
| (1075) | 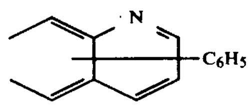 | " | " | " | " | $OSi(CH_3)_2(C_6H_5)$ |
| (1076) | 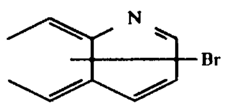 | " | " | " | " | $OSi(CH_3)_2(C_8H_{17})$ |
| (1077) | 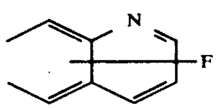 | " | " | " | " | $OSi(CH_3)_2(C_3H_7)$ |
| (1078) | 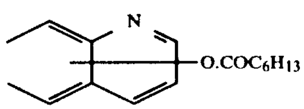 | " | " | " | " | $OSi(CH_3)_2C_6H_5$ |
| (1079) | 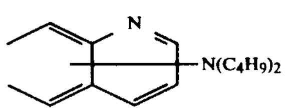 | " | " | " | " | $OSi(CH_3)_2(C_8H_{17})$ |
| (1080) | 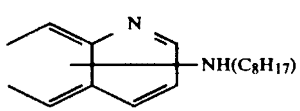 | " | " | " | " | $OSi(CH_3)_2OC_3H_6Si(CH_3)_2$— $OSi(CH)_2C_3H_6OH$ |
| (1081) | 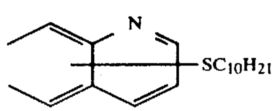 | $= A^1$ | $= A^1$ | $= A^1$ | Ge | $OSi(C_4H_9)_2(OC_8H_{17})$ |

-continued
| | | | | | |
|---|---|---|---|---|---|
| (1082) | 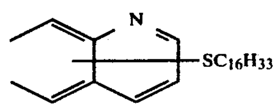 | " | " | " | " $OSi(C_6H_{13})_2(OC_{14}H_{29})$ |
| (1083) | 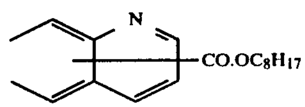 | " | " | " | " $OSi(C_2H_5)_3$ |
| (1084) | 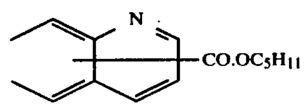 | " | " | " | " $OSi(C_3H_7)_3$ |
| (1085) | 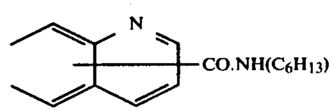 | " | " | " | " $OSi(C_6H_5)_3$ |
| (1086) | 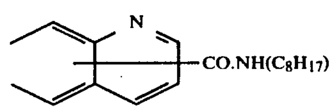 | " | " | " | " $OSi(C_6H_{13})_3$ |
| (1087) | 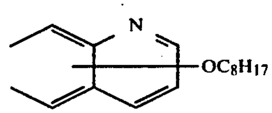 | " | " | " | " $OSi(C_4H_9)_3$ |
| (1088) | 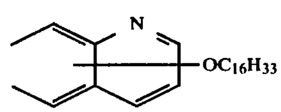 | " | " | " | " $OSi(CH_3)_2C_6H_5$ |
| (1089) | 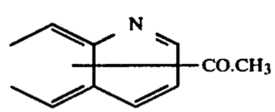 | " | " | " | " $OC_{16}H_{33}$ |
| (1090) | 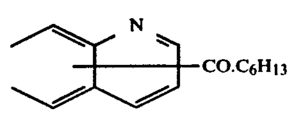 | " | " | " | " $OC_{14}H_{29}$ |

-continued
| | | | | | | |
|---|---|---|---|---|---|---|
| (1091) | 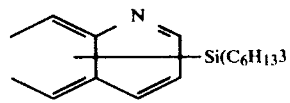  | = A[1] | = A[1] | = A[1] | Ge | OSi(CH$_3$)$_2$(C$_8$H$_{17}$) |
| (1092) | 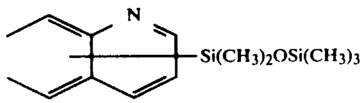  | " | " | " | " | OSi(CH$_3$)(C$_6$H$_{13}$)(OC$_8$H$_{17}$) |
| (1093) | 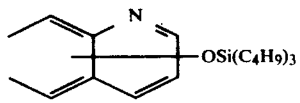  | " | " | " | " | OSi(CH$_3$)(C$_8$H$_{17}$)OSi(C$_4$H$_9$)$_3$ |
| (1094) | 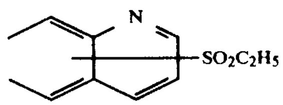  | " | " | " | " | OSi(C$_4$H$_9$)$_3$ |
| (1095) | 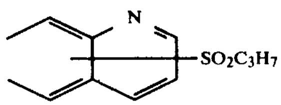  | " | " | " | " | OSi(C$_6$H$_{13}$)$_3$ |
| (1096) | 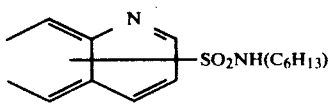  | " | " | " | " | OSi(C$_6$H$_{13}$)$_2$(OC$_6$H$_{13}$) |
| (1097) | 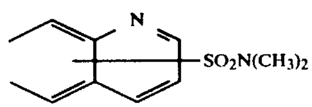  | " | " | " | " | OSi(CH$_3$)$_2$(C$_3$H$_7$) |
| (1098) | 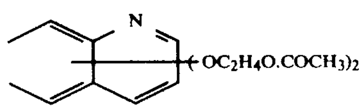  | " | " | " | " | OSi(CH$_3$)$_2$(C$_6$H$_5$) |

| | | | | | |
|---|---|---|---|---|---|
| (1098) | 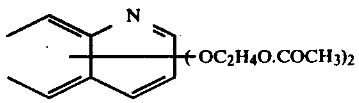 | " | " | " | " $OSi(CH_3)_2(C_6H_5)$ |
| (1099) | 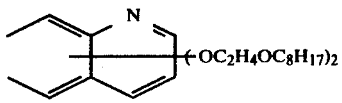 | " | " | " | " $OSi(CH_3)_2(C_8H_{17})$ |
| (1100) | 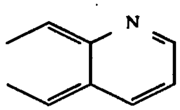 | " | " | " | " $OSi(C_2H_5)_3$ |
| (1101) | 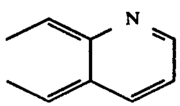 | $= A^1$ | $= A^1$ | $= A^1$ | Ge $OSi(C_3H_7)_3$ |
| (1102) | " | " | " | " | " $OSi(C_4H_9)_3$ |
| (1103) | " | " | " | " | Sn $OSi(C_6H_{13})_3$ |
| (1104) | " | " | " | " | " $OSi(C_6H_5)_3$ |
| (1105) | 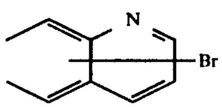 | " | " | " | " $OSi(CH_3)_2C_3H_7$ |
| (1106) | 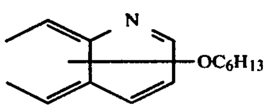 | " | " | " | " $OSi(CH_3)_2C_6H_5$ |
| (1107) | 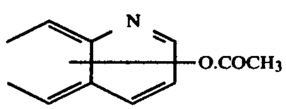 | " | " | " | " $OSi(CH_3)_2C_8H_{17}$ |

-continued
| | | | | | | |
|---|---|---|---|---|---|---|
| (1108) | 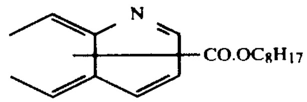 | " | " | " | " | $OSi(CH_3)(C_{12}H_{25})(OC_6H_{13})$ |
| (1109) | 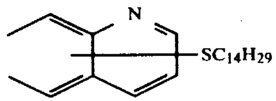 | " | " | " | " | $OSi(CH_3)(C_8H_{17})(OC_8H_{17})$ |
| (1110) | 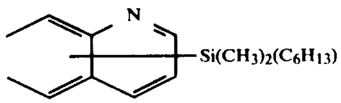 | " | " | " | " | $OSi(OC_8H_{17})_2(C_4H_9)$ |
| (1111) | 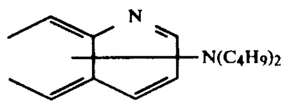 | $= A^1$ | $= A^1$ | $= A^1$ | Sn | $OSi(OC_{16}H_{33})_2(C_4H_9)$ |
| (1112) | 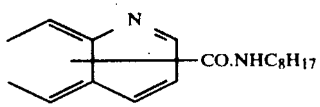 | " | " | " | " | $OSi(OC_{12}H_{25})_2(C_6H_{13})$ |
| (1113) | 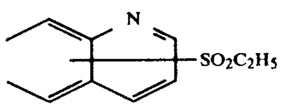 | " | " | " | " | $OSi(C_2H_5)_3$ |
| (1114) | 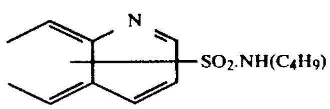 | " | " | " | " | $OSi(C_3H_7)_3$ |
| (1115) | 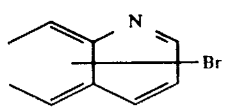 | " | " | " | " | $OSi(C_4H_9)_3$ |

-continued
| | | | | | |
|---|---|---|---|---|---|
| (1116) | 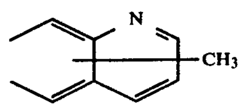 | " | " | " | " $OSi(C_6H_5)_3$ |
| (1117) | 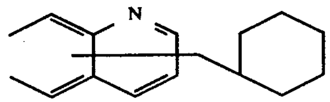 | " | " | " | " $OSi(C_4H_9)_3$ |
| (1118) | 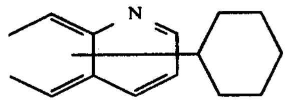 | " | " | " | " $OSi(C_6H_{13})_3$ |
| (1119) | 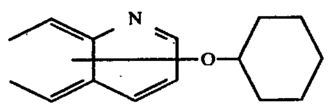 | " | " | " | " $OSi(C_3H_7)_3$ |
| (1120) | 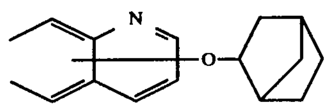 | " | " | " | " $OSi(C_4H_9)_3$ |
| (1121) | 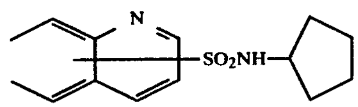 | $= A^1$ | $= A^1$ | $= A^1$ | Sn $OSi(C_3H_7)_3$ |
| (1122) | 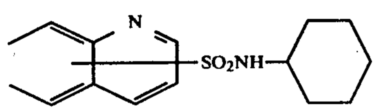 | " | " | " | " $OSi(C_2H_5)_3$ |

-continued
| | | | | | |
|---|---|---|---|---|---|
| (1123) | 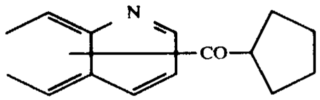 | " | " | " | " $OSi(C_6H_{13})_3$ |
| (1124) | 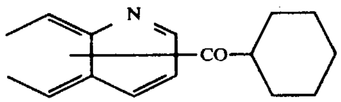 | " | " | " | " $OSi(C_4H_9)_3$ |
| (1125) | 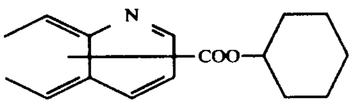 | " | " | " | Si $OSi(C_3H_7)_3$ |
| (1126) | 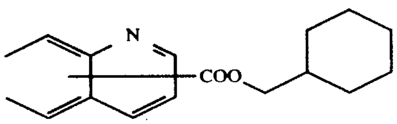 | " | " | " | " $OSi(C_2H_5)_2$ |
| (1127) | 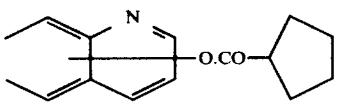 | " | " | " | " $OSi(C_4H_9)_3$ |
| (1128) | 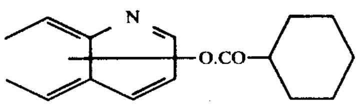 | " | " | " | " $OSi(C_3H_7)_3$ |
| (1129) | 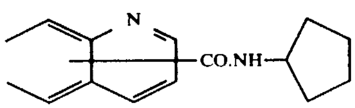 | " | " | " | " $OSi(C_6H_{13})_3$ |

-continued
| | | | | | | |
|---|---|---|---|---|---|---|
| (1130) | 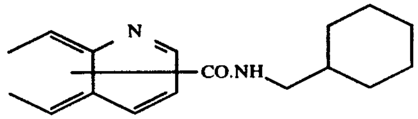 | " | " | " | " | $OSi(C_4H_9)_3$ |
| (1131) | 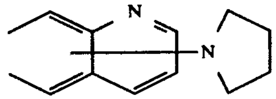 | $= A^1$ | $= A^1$ | $= A^1$ | Si | $OSi(C_6H_{13})_3$ |
| (1132) | 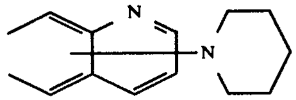 | " | " | " | " | $OSi(C_4H_9)_3$ |
| (1133) | 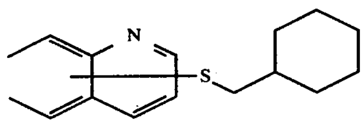 | " | " | " | " | $OSi(C_6H_{13})_3$ |
| (1134) | 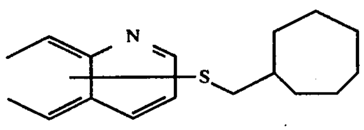 | " | " | " | " | $OSi(C_4H_9)_3$ |
| (1135) | 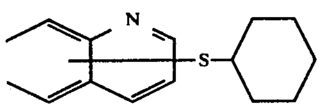 | " | " | " | " | $OSi(C_6H_{13})_3$ |
| (1136) | 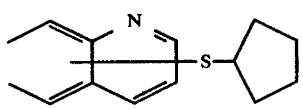 | " | " | " | " | $OSi(C_4H_9)_3$ |

-continued
| | | | | | |
|---|---|---|---|---|---|
| (1137) | 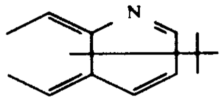 | " | " | " | " $OSi(C_6H_{13})_3$ |
| (1138) | 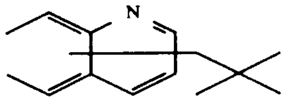 | " | " | " | " $OSi(C_4H_9)_3$ |
| (1139) | 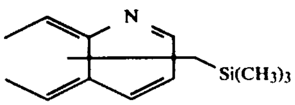 | " | " | " | " $OSi(C_3H_7)_3$ |
| (1140) | 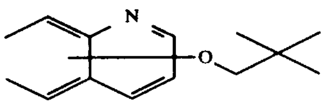 | " | " | " | " $OSi(C_2H_5)_3$ |
| (1141) | 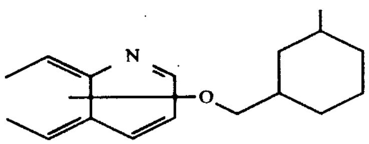 | $= A^1$ | $= A^1$ | $= A^1$ | Si $OSi(C_3H_7)_3$ |
| (1142) | 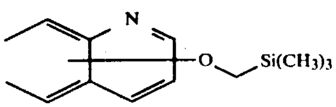 | " | " | " | " $OSi(C_4H_9)_3$ |
| (1143) | 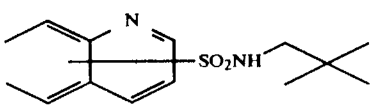 | " | " | " | " $OSi(C_3H_7)_3$ |
| (1144) | 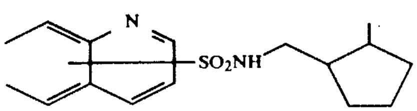 | " | " | " | " $OSi(C_6H_{13})_3$ |

-continued
| | | | | | |
|---|---|---|---|---|---|
| (1145) | 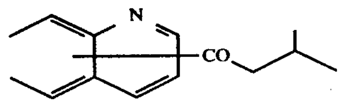 | " | " | " | " $OSi(C_4H_9)_3$ |
| (1146) | 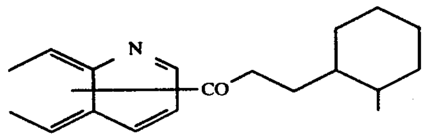 | " | " | " | " $OSi(C_3H_7)_3$ |
| (1147) | 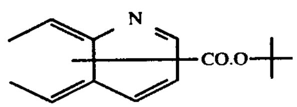 | " | " | " | " $OSi(C_6H_{13})_3$ |
| (1148) | 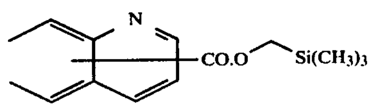 | " | " | " | " $OSi(C_3H_7)_3$ |
| (1149) | 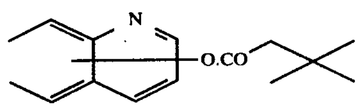 | " | " | " | " $OSi(C_4H_9)_3$ |
| (1150) | 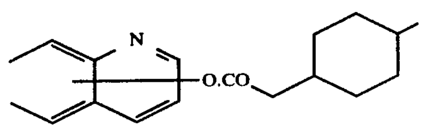 | " | " | " | " $OSi(C_2H_5)_3$ |
| (1151) | 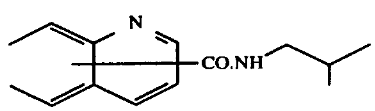 | $= A^1$ | $= A^1$ | $= A^1$ | Si $OSi(C_6H_{13})_3$ |
| (1152) | 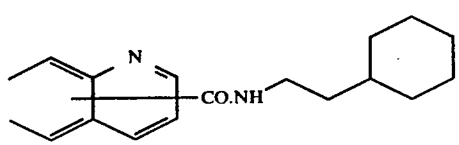 | " | " | " | " $OSi(C_4H_9)_3$ |

-continued
| | | | | | |
|---|---|---|---|---|---|
| (1153) | 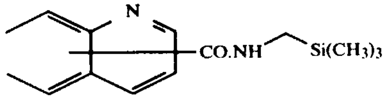 | " | " | " | " $OSi(C_3H_7)_3$ |
| (1154) | 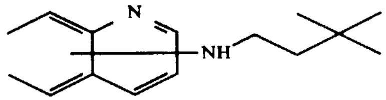 | " | " | " | " $OSi(C_2H_5)_3$ |
| (1155) | 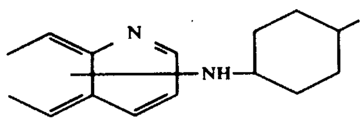 | " | " | " | " $OSi(C_4H_9)_3$ |
| (1156) | 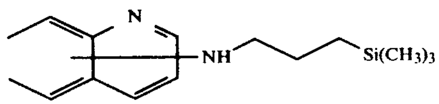 | " | " | " | " $OSi(CH_3)_3$ |
| (1157) | 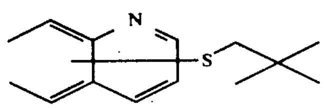 | " | " | " | " $OSi(C_4H_9)_3$ |
| (1158) | 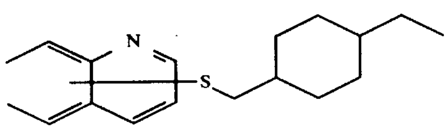 | " | " | " | " $OSi(C_3H_7)_3$ |
| (1159) | 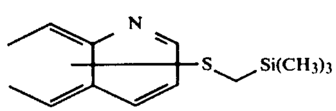 | " | " | " | " $OSi(C_2H_5)_3$ |
| (1160) | 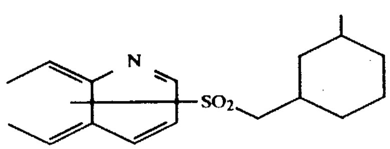 | " | " | " | " $OSi(C_4H_9)_3$ |

-continued
| | | | | | |
|---|---|---|---|---|---|
| (1161) | 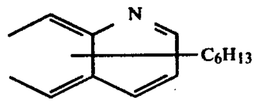 | = A[1] | = A[1] | = A[1] | Si 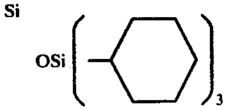 |
| (1162) | 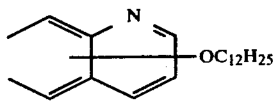 | " | " | " | " 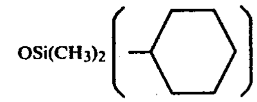 |
| (1163) | 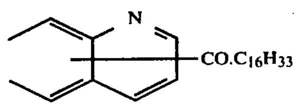 | " | " | " | " $OSi(CH_3)_2(t\text{-}C_4H_9)$ |
| (1164) | 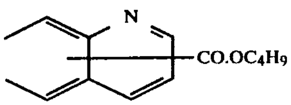 | " | " | " | " 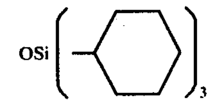 |
| (1165) | 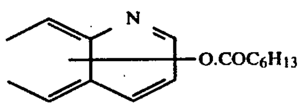 | " | " | " | " 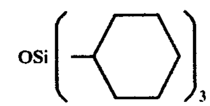 |
| (1166) | 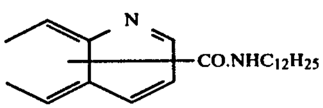 | " | " | " | " 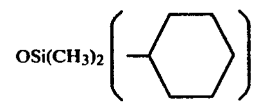 |
| (1167) | 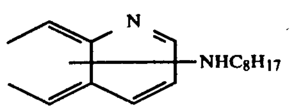 | " | " | " | " 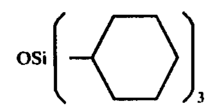 |
| (1168) | 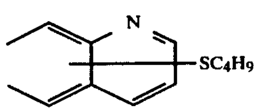 | " | " | " | " 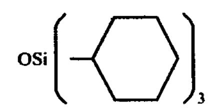 |

-continued
| | | | | | | |
|---|---|---|---|---|---|---|
| (1169) | 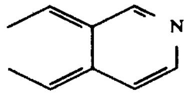 | " | " | " | " | $OSi(C_2H_5)_3$ |
| (1170) | " | " | " | " | " | $OSi(C_3H_7)_3$ |
| (1171) | 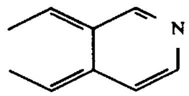 | $= A^1$ | $= A^1$ | $= A^1$ | Si | $OSi(C_4H_9)_3$ |
| (1172) | " | " | " | " | " | $OSi(C_6H_{13})_3$ |
| (1173) | " | " | " | " | " | $OSi(CH_3)_2)C_{18}H_{37})$ |
| (1174) | " | " | " | " | " | $OC_{18}H_{37}$ |
| (1175) | 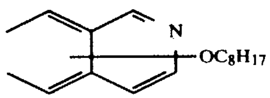 | " | " | " | " | $OSi(C_3H_7)_3$ |
| (1176) | 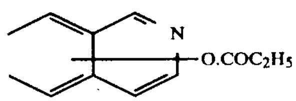 | " | " | " | " | $OSi(C_6H_{13})_3$ |
| (1177) | 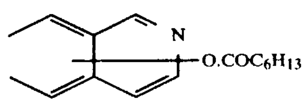 | " | " | " | " | $OSi(C_4H_9)_3$ |
| (1178) | 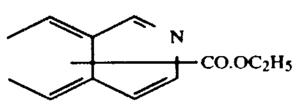 | " | " | " | " | $OSi(C_6H_{13})_3$ |
| (1179) | 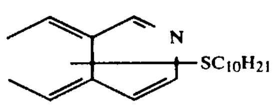 | " | " | " | " | $OSi(C_4H_9)_3$ |
| (1180) | 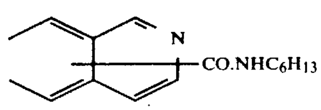 | " | " | " | " | $OSi(C_2H_5)_3$ |

-continued
| | | | | | | |
|---|---|---|---|---|---|---|
| (1181) | 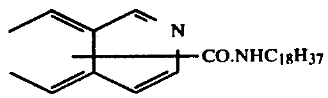 | = A[1] | = A[1] | = A[1] | Si | $OSi(C_3H_7)_3$ |
| (1182) | 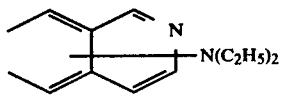 | " | " | " | " | $OSi(C_6H_{13})_3$ |
| (1183) | 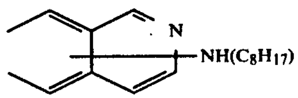 | " | " | " | " | $OC_{18}H_{37}$ |
| (1184) | 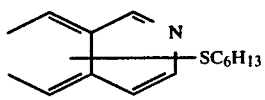 | " | " | " | " | $OSi(C_3H_7)_3$ |
| (1185) | 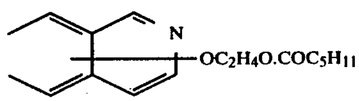 | " | " | " | " | $OSi(C_6H_5)_3$ |
| (1186) | 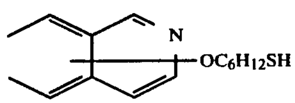 | " | " | " | " | $OSi(OC_6H_{13})_3$ |
| (1187) | 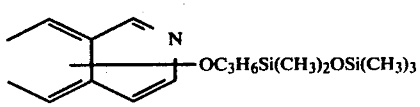 | " | " | " | " | $OSi(C_2H_5)_3$ |
| (1188) | 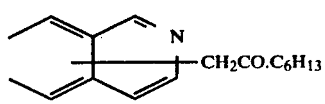 | " | " | " | " | $OSi(C_3H_7)_3$ |
| (1189) | 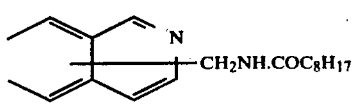 | " | " | " | " | $OSi(C_4H_9)_3$ |

-continued
| | | | | | | |
|---|---|---|---|---|---|---|
| (1190) | 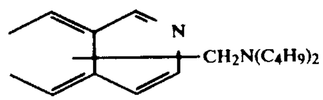 | " | " | " | " | $OSi(C_6H_{13})_3$ |
| (1191) | 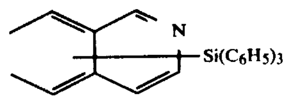 | $= A^1$ | $= A^1$ | $= A^1$ | Si | $OSi(C_6H_5)_3$ |
| (1192) | 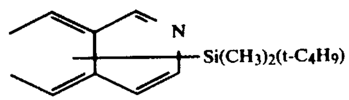 | " | " | " | " | $OSi(CH_3)_2C_3H_7$ |
| (1193) | 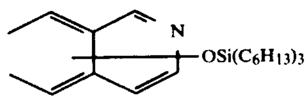 | " | " | " | " | $OSi(CH_3)_2C_6H_5$ |
| (1194) | 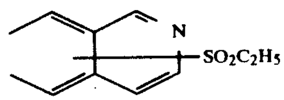 | " | " | " | " | $OSi(CH_3)_2C_8H_{17}$ |
| (1195) | 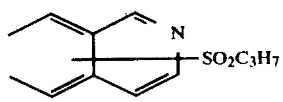 | " | " | " | " | $OSi(CH_3)(C_5H_{11})(OC_8H_{17})$ |
| (1196) | 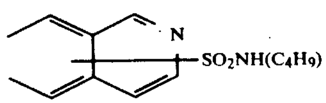 | " | " | " | " | $OSi(CH_3)(C_6H_{13})(OC_8H_{17})$ |
| (1197) | 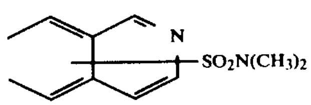 | " | " | " | " | $OSi(CH_3)(C_{10}H_{21})(OCH_3)$ |
| (1198) | 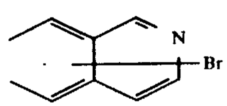 | " | " | " | " | $OSi(CH_3)(C_{12}H_{25})(OC_{16}H_{33})$ |

-continued
| | | | | | | |
|---|---|---|---|---|---|---|
| (1199) | 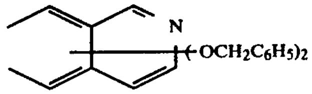 | " | " | " | " | $OSi(C_2H_5)_3$ |
| (1200) | 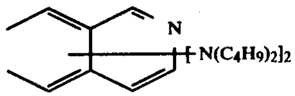 | " | " | " | " | $OSi(C_3H_7)_3$ |
| (1201) | 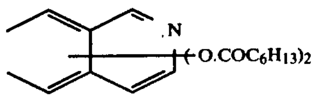 | $= A^1$ | $= A^1$ | $= A^1$ | Si | $OSi(C_4H_9)_3$ |
| (1202) | 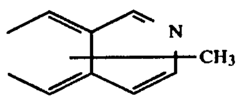 | " | " | " | " | $OSi(C_4H_9)_3$ |
| (1203) | 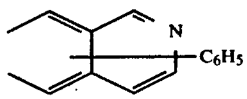 | " | " | " | " | $OSi(C_4H_9)_3$ |
| (1204) | 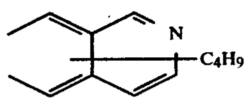 | " | " | " | " | $OSi(C_6H_{13})_3$ |
| (1205) | 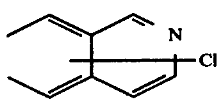 | " | " | " | " | $OSi(C_6H_{13})_3$ |
| (1206) | 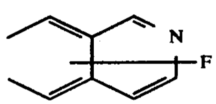 | " | " | " | " | $OSi(C_2H_5)_3$ |
| (1207) | 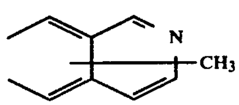 | " | " | " | " | $OSi(C_6H_5)_3$ |

-continued
| | | | | | | |
|---|---|---|---|---|---|---|
| (1208) | 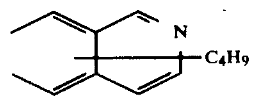 | ″ | ″ | ″ | ″ | $OSi(CH_3)_2C_3H_7$ |
| (1209) | 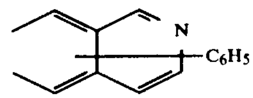 | ″ | ″ | ″ | Ge | $OSi(CH_3)_2C_6H_5$ |
| (1210) | 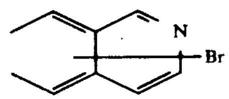 | ″ | ″ | ″ | ″ | $OSi(CH_3)_2C_8H_{17}$ |
| (1211) | 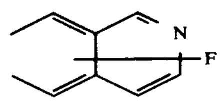 | $= A^1$ | $= A^1$ | $= A^1$ | Ge | $OSi(CH_3)_2C_3H_7$ |
| (1212) | 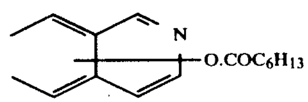 | ″ | ″ | ″ | ″ | $OSi(CH_3)_2C_6H_5$ |
| (1213) | 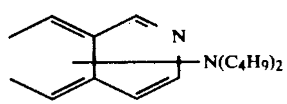 | ″ | ″ | ″ | ″ | $OSi(CH_3)_2C_8H_{17}$ |
| (1214) | 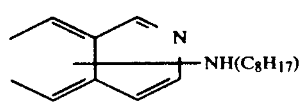 | ″ | ″ | ″ | ″ | $OSi(CH_3)_2OC_3H_6Si(CH_3)_2$-<br>$OSi(CH_3)_2C_3H_6OH$ |
| (1215) | 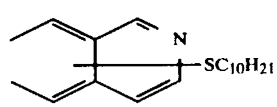 | ″ | ″ | ″ | ″ | $OSi(C_4H_9)_2(OC_8H_{17})$ |

| | | | | | |
|---|---|---|---|---|---|
| (1216) | 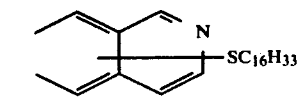 | " | " | " | " $OSi(C_6H_{13})_2(OC_{14}H_{29})$ |
| (1217) | 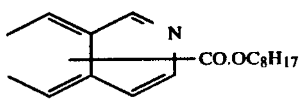 | " | " | " | " $OSi(C_2H_5)_3$ |
| (1218) | 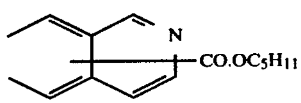 | " | " | " | " $OSi(C_3H_7)_3$ |
| (1219) | 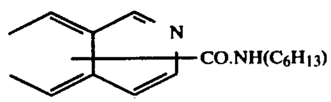 | " | " | " | " $OSi(C_6H_5)_3$ |
| (1220) | 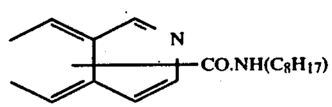 | " | " | " | " $OSi(C_6H_{13})_3$ |
| (1221) | 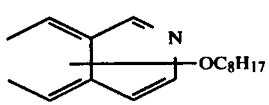 | $= A^1$ | $= A^1$ | $= A^1$ | Ge $OSi(C_4H_9)_3$ |
| (1222) | 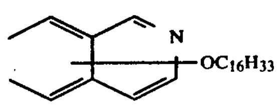 | " | " | " | " $OSi(CH_3)_2C_6H_5$ |
| (1223) | 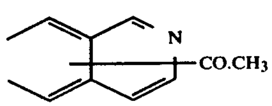 | " | " | " | " $OC_{16}H_{33}$ |

-continued
| | | | | | | |
|---|---|---|---|---|---|---|
| (1224) | 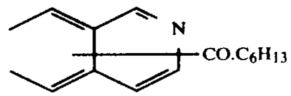 | " | " | " | " | $OC_{14}H_{29}$ |
| (1225) | 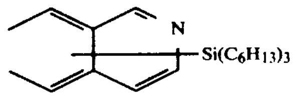 | " | " | " | " | $OSi(CH_3)_2(C_8H_{17})$ |
| (1226) | 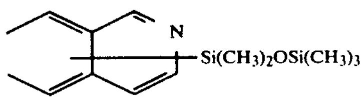 | " | " | " | " | $OSi(CH_3)(C_6H_{13})(OC_8H_{17})$ |
| (1227) | 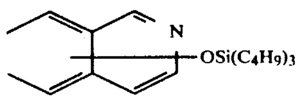 | " | " | " | " | $OSi(CH_3)(C_8H_{17})[OSi(C_4H_9)_3]$ |
| (1228) | 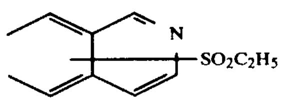 | " | " | " | " | $OSi(C_4H_9)_3$ |
| (1229) | 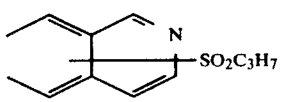 | " | " | " | " | $OSi(C_6H_{13})_3$ |
| (1230) | 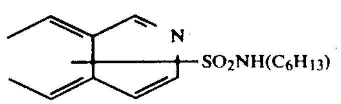 | " | " | " | " | $OSi(C_6H_{13})_2(OC_6H_{13})$ |

-continued
| | | | | | |
|---|---|---|---|---|---|
| (1231) | 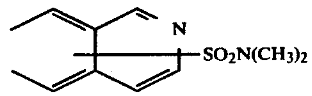 | $=A^1$ | $=A^1$ | $=A^1$ | Ge $OSi(CH_3)_2(C_3H_7)$ |
| (1232) | 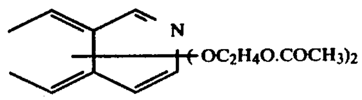 | " | " | " | " $OSi(CH_3)_2(C_3H_7)$ |
| (1233) | 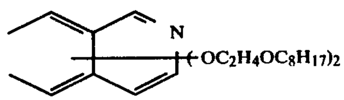 | " | " | " | " $OSi(CH_3)_2(C_8H_{17})$ |
| (1234) | 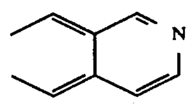 | " | " | " | " $OSi(C_2H_5)_3$ |
| (1235) | " | " | " | " | " $OSi(C_3H_7)_3$ |
| (1236) | " | " | " | " | " $OSi(C_4H_9)_3$ |
| (1237) | " | " | " | " | Sn $OSi(C_6H_{13})_3$ |
| (1238) | " | " | " | " | " $OSi(C_6H_5)_3$ |
| (1239) | 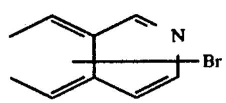 | " | " | " | " $OSi(CH_3)_2C_3H_7$ |
| (1240) | 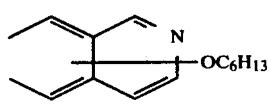 | " | " | " | " $OSi(CH_3)_2C_6H_5$ |
| (1241) | 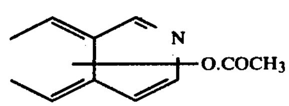 | $=A^1$ | $=A^1$ | $=A^1$ | Sn $OSi(CH_3)_2(C_8H_{17})$ |

-continued
| | | | | | | |
|---|---|---|---|---|---|---|
| (1242) | 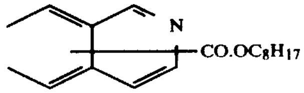 | " | " | " | " | $OSi(CH_3)(C_{12}H_{25})(OC_6H_5)$ |
| (1243) | 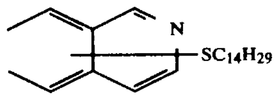 | " | " | " | " | $OSi(CH_3)(C_8H_{17})(OC_8H_{17})$ |
| (1244) | 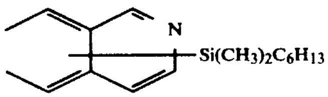 | " | " | " | " | $OSi(OC_8H_{17})_2(C_4H_9)$ |
| (1245) | 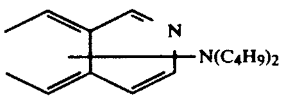 | " | " | " | " | $OSi(OC_{16}H_{13})_2C_4H_9$ |
| (1246) | 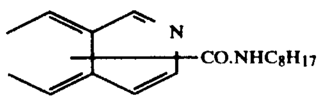 | " | " | " | " | $OSi(OC_{12}H_{25})_2(C_6H_{13})$ |
| (1247) | 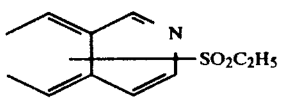 | " | " | " | " | $OSi(C_2H_5)_3$ |
| (1248) | 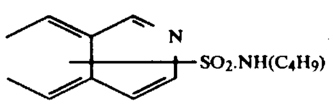 | " | " | " | " | $OSi(C_3H_7)_3$ |

-continued
| | | | | | |
|---|---|---|---|---|---|
| (1249) | 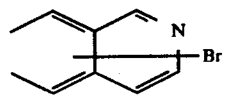 | " | " | " | " $OSi(C_4H_9)_3$ |
| (1250) | 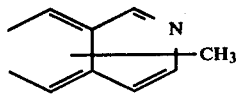 | " | " | " | " $OSi(C_6H_5)_3$ |
| (1251) | 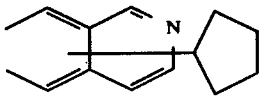 | = A[1] | = A[1] | = A[1] | Si $OSi(C_3H_7)_3$ |
| (1252) | 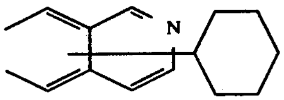 | " | " | " | " $OSi(C_3H_9)_3$ |
| (1253) | 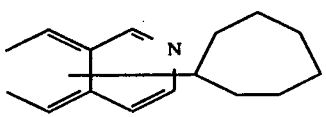 | " | " | " | " $OSi(C_3H_7)_3$ |
| (1254) | 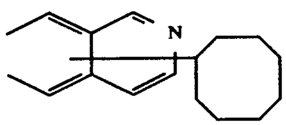 | " | " | " | " $OSi(C_4H_9)_3$ |
| (1255) | 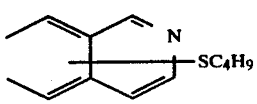 | " | " | " | " $OSi(C_3H_7)_2$ 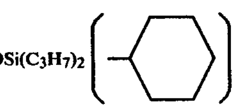 |

-continued
| | | | | | |
|---|---|---|---|---|---|
| (1256) | 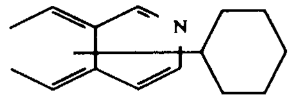 | " | " | " | " $OSi(C_4H_9)_2$ 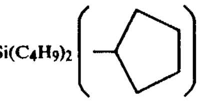 |
| (1257) | 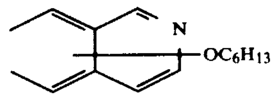 | " | " | " | " $OSi(C_2H_5)$ 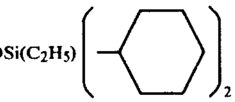 |
| (1258) | 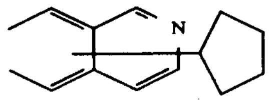 | " | " | " | " $OSi(C_4H_9)$ 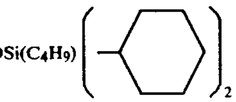 |
| (1259) | 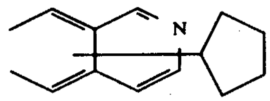 | " | " | " | Ge $OSi(C_3H_7)_3$ |
| (1260) | 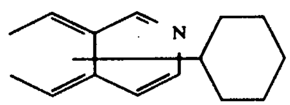 | " | " | " | " $OSi(C_4H_9)_3$ |
| (1261) | 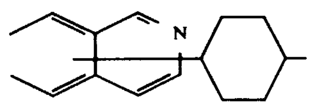 | $= A^1$ | $= A^1$ | $= A^1$ | Si $OSi(C_3H_7)_3$ |
| (1262) | 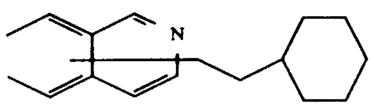 | " | " | " | " $OSi(C_4H_9)_3$ |
| (1263) | 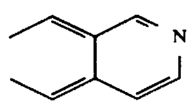 | " | " | " | " OSi 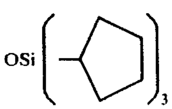 |

-continued
| | | | | | |
|---|---|---|---|---|---|
| (1264) | " | " | " | " | " OSi 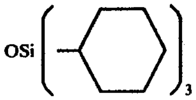 |
| (1265) | " | " | " | " | " OSi($CH_3$)$_2$ 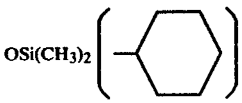 |
| (1266) | 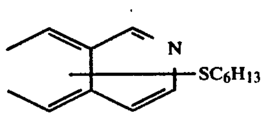 | " | " | " | " OSi 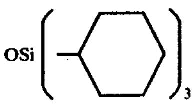 |
| (1267) | 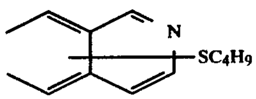 | " | " | " | " OSi($C_2H_5$)$_2$ 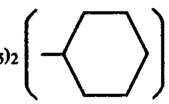 |
| (1268) | 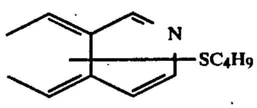 | " | " | " | " OSi($C_4H_9$) 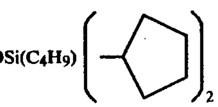 |
| (1269) | 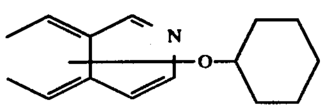 | " | " | " | " OSi($C_4H_9$)$_3$ |
| (1270) | 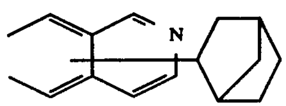 | " | " | " | " OSi($C_6H_{13}$)$_3$ |
| (1271) | 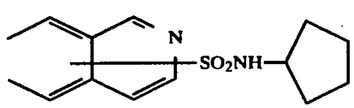 | = A[1] | = A[1] | = A[1] | Si OSi($C_4H_9$)$_3$ |

-continued
| | | | | | |
|---|---|---|---|---|---|
| (1272) | 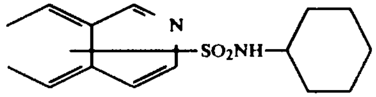 | " | " | " | " $OSi(C_3H_7)_3$ |
| (1273) | 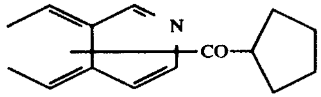 | " | " | " | " $OSi(C_4H_9)_3$ |
| (1274) | 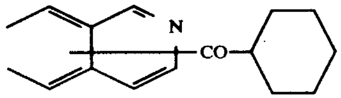 | " | " | " | " $OSi(C_2H_5)_3$ |
| (1275) | 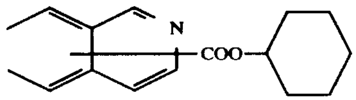 | " | " | " | " $OSi(C_3H_7)_3$ |
| (1276) | 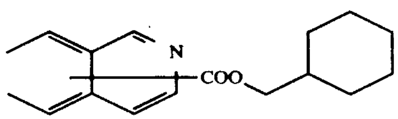 | " | " | " | " $OSi(C_2H_5)_3$ |
| (1277) | 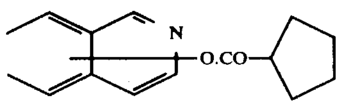 | " | " | " | " $OSi(C_4H_9)_3$ |
| (1278) | 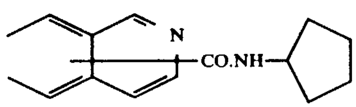 | " | " | " | " $OSi(C_6H_{13})_3$ |
| (1279) | 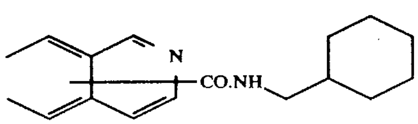 | " | " | " | " $OSi(C_4H_9)_3$ |

-continued
| | | | | | |
|---|---|---|---|---|---|
| (1280) | 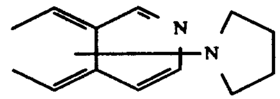 | " | " | " | " $OSi(C_6H_{13})_3$ |
| (1281) | 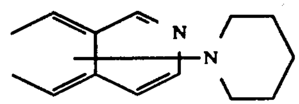 | = $A^1$ | = $A^1$ | = $A^1$ | Si $OSi(C_3H_7)_3$ |
| (1282) | 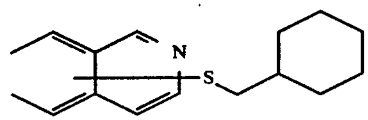 | " | " | " | " $OSi(C_2H_5)_3$ |
| (1283) | 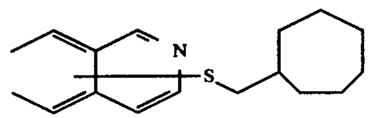 | " | " | " | " $OSi(C_3H_7)_3$ |
| (1284) | 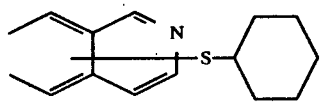 | " | " | " | " $OSi(C_4H_9)_3$ |
| (1285) | 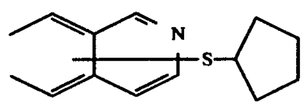 | " | " | " | " $OSi(C_6H_{13})_3$ |
| (1286) | 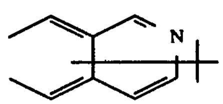 | " | " | " | " $OSi(C_4H_9)_3$ |
| (1287) | 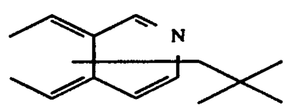 | " | " | " | " $OSi(C_4H_9)_3$ |

-continued
| | | | | | | |
|---|---|---|---|---|---|---|
| (1288) | 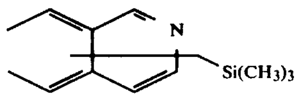 | " | " | " | " | $OSi(C_3H_7)_3$ |
| (1289) | 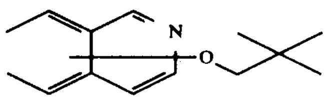 | " | " | " | " | $OSi(C_3H_7)_3$ |
| (1290) | 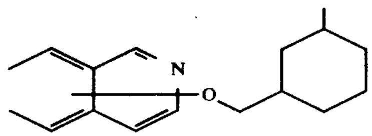 | " | " | " | " | $OSi(C_2H_5)_3$ |
| (1291) | 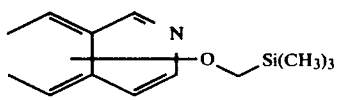 | $= A^1$ | $= A^1$ | $= A^1$ | Si | $OSi(C_4H_9)_3$ |
| (1292) | 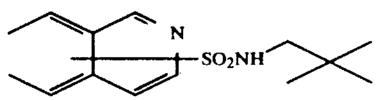 | " | " | " | " | $OSi(C_4H_9)_3$ |
| (1293) | 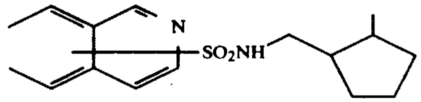 | " | " | " | " | $OSi(C_6H_{13})_3$ |
| (1294) | 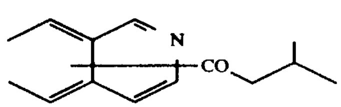 | " | " | " | " | $OSi(C_3H_7)_3$ |
| (1295) | 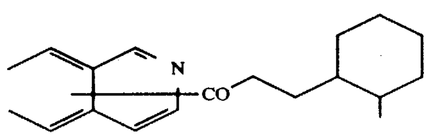 | " | " | " | " | $OSi(C_2H_5)_3$ |

-continued
| | | | | | |
|---|---|---|---|---|---|
| (1296) | 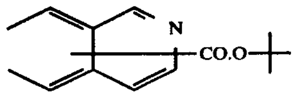 | " | " | " | " $OSi(C_4H_9)_3$ |
| (1297) | 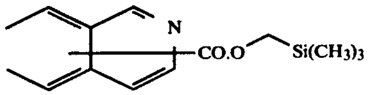 | " | " | " | " $OSi(C_6H_{13})_3$ |
| (1298) | 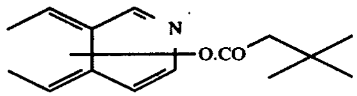 | " | " | " | " $OSi(C_3H_7)_3$ |
| (1299) | 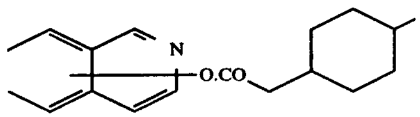 | " | " | " | " $OSi(CH_3)_3$ |
| (1300) | 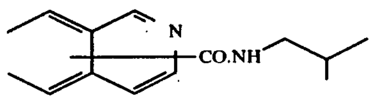 | " | " | " | " $OSi(C_6H_{13})_3$ |
| (1301) | 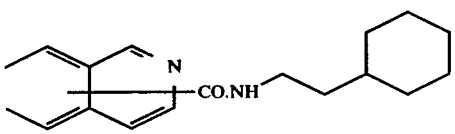 | $= A^1$ | $= A^1$ | $= A^1$ | Si $OSi(C_4H_9)_3$ |
| (1302) | 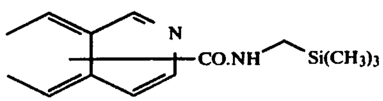 | " | " | " | " $OSi(C_3H_7)_3$ |
| (1303) | 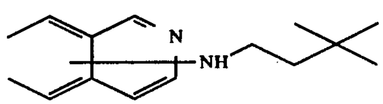 | " | " | " | " $OSi(C_2H_5)_3$ |

-continued
| | | | | | |
|---|---|---|---|---|---|
| (1304) | 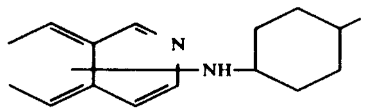 | " | " | " | " $OSi(C_4H_9)_3$ |
| (1305) | 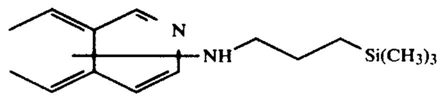 | " | " | " | " $OSi(CH_3)_3$ |
| (1306) | 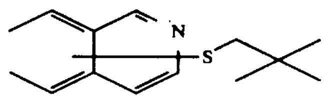 | " | " | " | " $OSi(C_2H_5)_3$ |
| (1307) | 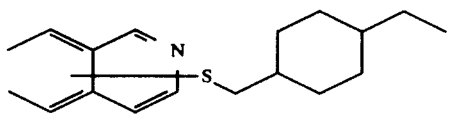 | " | " | " | " $OSi(C_3H_7)_3$ |
| (1308) | 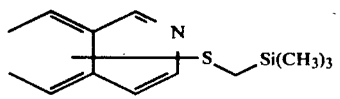 | " | " | " | " $OSi(CH_3)_3$ |
| (1309) | 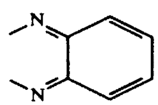 | " | " | " | " $OSi(C_6H_{13})_3$ |
| (1310) | " | " | " | " | " $OSi(C_4H_9)_3$ |
| (1311) | 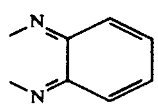 | $= A^1$ | $= A^1$ | $= A^1$ | Si $OSi(C_3H_7)_3$ |
| (1312) | " | " | " | " | " $OSi(C_2H_5)_3$ |
| (1313) | " | " | " | " | " $OSi(CH_3)_2(C_{18}H_{37})$ |
| (1314) | " | " | " | " | " $OSi(CH_3)_2(t\text{-}C_4H_9)$ |
| (1315) | " | " | " | " | " $OSi(CH_3)_2(OC_8H_{17})$ |
| (1316) | " | " | " | " | " $OSi(CH_3)_2(OC_{10}H_{21})$ |
| (1317) | " | " | " | " | " $OSi(CH_3)_2(OC_{12}H_{25})$ |
| (1318) | " | " | " | " | " $OSi(CH_3)_2(OC_{14}H_{29})$ |
| (1319) | " | " | " | " | " $OSi(CH_3)_2(OC_6H_5)$ |

-continued
| | | | | | | |
|---|---|---|---|---|---|---|
| (1320) | " | " | " | " | " | $OSi(OCH_3)_3$ |
| (1321) | 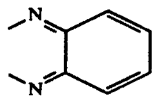 | $= A^1$ | $= A^1$ | $= A^1$ | Si | $OSi(C_6H_5)_3$ |
| (1322) | " | " | " | " | " | $OSi(CH_3)_2(C_6H_5)$ |
| (1323) | " | " | " | " | " | $OSi(OC_6H_5)_3$ |
| (1324) | 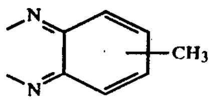 | " | " | " | " | $OSi(C_6H_{13})_3$ |
| (1325) | 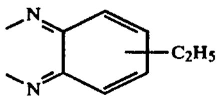 | " | " | " | " | $OSi(CH_6H_{13})_3$ |
| (1326) | 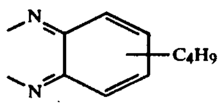 | " | " | " | " | $OSi(CH_3)_2(OC_{18}H_{37})$ |
| (1327) | 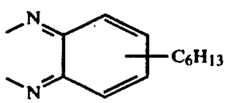 | " | " | " | " | $OSi(CH_3)_2(C_6H_5)$ |
| (1328) | 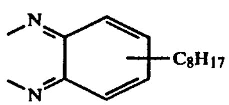 | " | " | " | " | $OSi(C_6H_5)_3$ |
| (1329) | 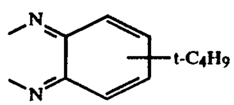 | " | " | " | " | $OSi(CH_3)_2(OC_6H_5)$ |
| (1330) | 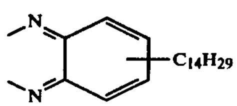 | " | " | " | " | $OC(C_3H_7)_3$ |

-continued
| | | | | | | |
|---|---|---|---|---|---|---|
| (1331) | 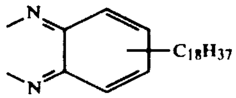 | = $A^1$ | = $A^1$ | = $A^1$ | Si | $OC_{18}H_{37}$ |
| (1332) | 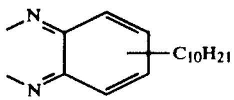 | 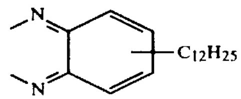 | 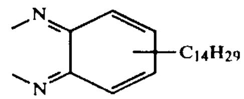 | 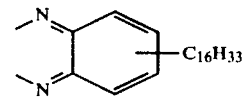 | " | $OC(C_6H_5)_3$ |
| (1333) | 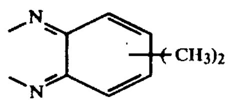 | = $A^1$ | = $A^1$ | = $A^1$ | " | $OSi(C_6H_{13})_3$ |
| (1334) | 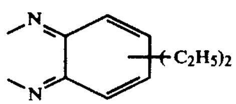 | " | " | " | " | $OSi(C_4H_9)_3$ |
| (1335) | 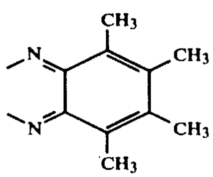 | " | " | " | " | $OSi(C_3H_7)_3$ |
| (1336) | 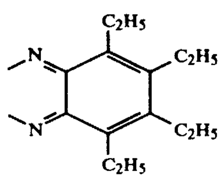 | " | " | " | " | $OSi(C_2H_5)_3$ |
| (1337) | 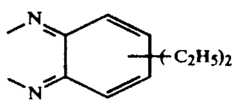 | " | " | " | " | $OSi(CH_3)_2(C_8H_{17})$ |

| | | | | | | |
|---|---|---|---|---|---|---|
| (1338) | 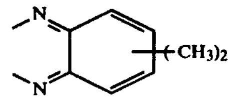 | " | " | " | " | $OSi(CH_3)_2(OC_{18}H_{37})$ |
| (1339) | 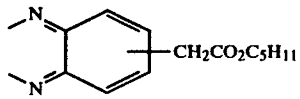 | " | " | " | " | $OSi(C_3H_7)_3$ |
| (1340) | 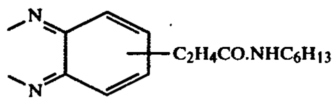 | " | " | " | " | $Si(C_4H_9)_3$ |
| (1341) | 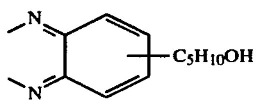 | $= A^1$ | $= A^1$ | $= A^1$ | Si | $OSi(C_6H_{13})_3$ |
| (1342) | 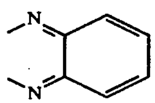 | " | " | " | Ge | $OSi(C_2H_5)_3$ |
| (1343) | " | " | " | " | " | $OSi(C_4H_9)_3$ |
| (1344) | " | " | " | " | " | $OSi(C_6H_5)_3$ |
| (1345) | 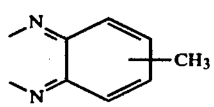 | " | " | " | " | $OSi(C_2H_5)_3$ |
| (1346) | " | " | " | " | " | $OSi(C_4H_9)_3$ |
| (1347) | " | " | " | " | " | $OC_{10}H_{21}$ |
| (1348) | 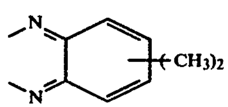 | " | " | " | " | $OSi(C_2H_5)_3$ |
| (1349) | " | " | " | " | " | $OSi(C_4H_9)_3$ |
| (1350) | " | " | " | " | " | $OC_{14}H_{29}$ |

-continued
(1351) 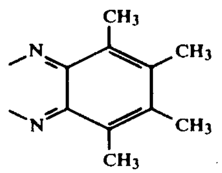
= $A^1$ | = $A^1$ | = $A^1$ | Ge | $OSi(C_2H_5)_3$
(1352) 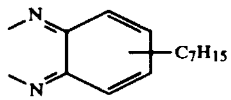
" | " | " | " | $OSi(C_4H_9)_3$
(1353) 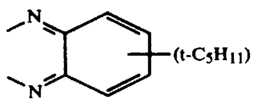
" | " | " | " | $O(t\text{-}C_5H_{11})$
(1354) 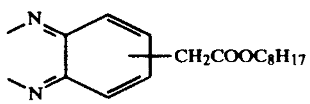
" | " | " | " | $OSi(C_2H_5)_3$
(1355) 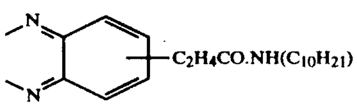
" | " | " | " | $OSi(C_4H_9)_3$
(1356) 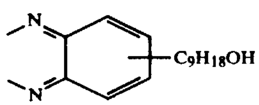
" | " | " | " | $OSi(C_4H_9)_3$
(1357) 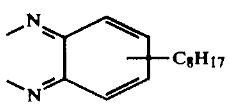
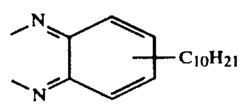
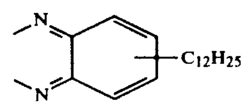
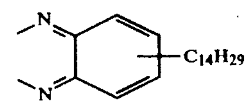
" | $OSi(C_2H_5)_3$
(1358) 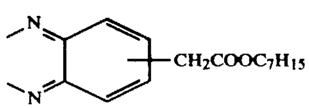
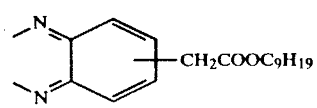
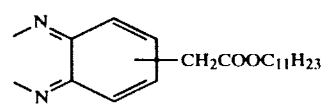
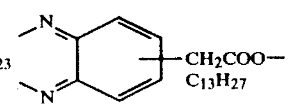
" | $OSi(C_4H_9)_3$ -continued
| | | | | | | |
|---|---|---|---|---|---|---|
| (1359) | 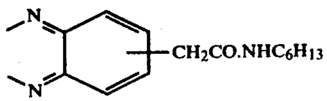 | 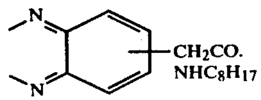 | 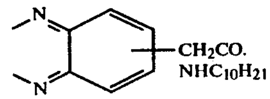 | 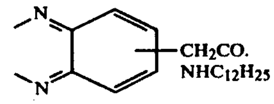 | " | $OSi(C_4H_9)_3$ |
| (1360) | 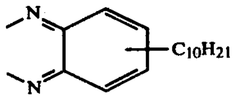 | = $A^1$ | = $A^1$ | = $A^1$ | Sn | $OSi(C_2H_5)_3$ |
| (1361) | 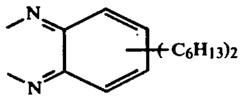 | = $A^1$ | = $A^1$ | = $A^1$ | Sn | $OSi(C_4H_9)_3$ |
| (1362) | 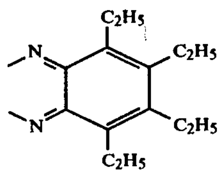 | " | " | " | " | $OC_{18}H_{37}$ |
| (1363) | 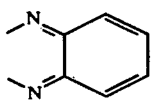 | " | " | " | " | $OSi(C_2H_5)_3$ |
| (1364) | " | " | " | " | " | $OSi(C_4H_9)_3$ |
| (1365) | " | " | " | " | " | $OSi(C_6H_5)_3$ |
| (1366) | 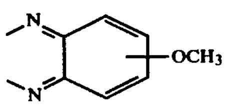 | " | " | " | Si | $OSi(C_6H_{13})_3$ |
| (1367) | 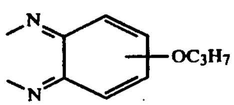 | " | " | " | " | $OSi(C_4H_9)_3$ |
| (1368) | 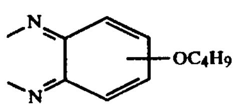 | " | " | " | " | $OSi(C_3H_7)_3$ |

-continued
| | | | | | | |
|---|---|---|---|---|---|---|
| (1369) | 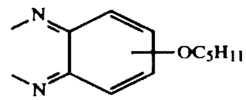 | " | " | " | " | $OSi(C_3H_7)_3$ |
| (1370) | 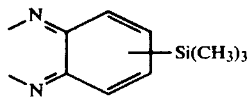 | " | " | " | " | $OSi(C_4H_9)_3$ |
| (1371) | 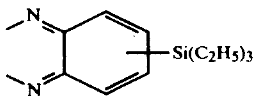 | $= A^1$ | $= A^1$ | $= A^1$ | Si | $OSi(C_3H_7)_3$ |
| (1372) | 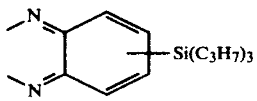 | " | " | " | " | $OSi(C_2H_5)_3$ |
| (1373) | 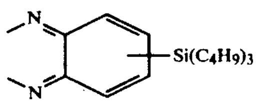 | " | " | " | " | $OSi(CH_3)_3$ |
| (1374) | 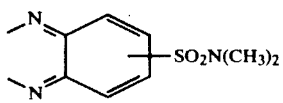 | " | " | " | " | $OSi(C_6H_{13})_3$ |
| (1375) | 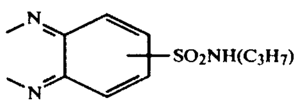 | " | " | " | " | $OSi(C_4H_9)_3$ |
| (1376) | 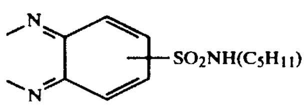 | " | " | " | " | $OSi(C_3H_7)_3$ |
| (1377) | 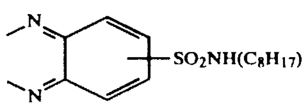 | " | " | " | " | $OSi(C_2H_5)_3$ |

-continued
| | | | | | |
|---|---|---|---|---|---|
| (1378) | 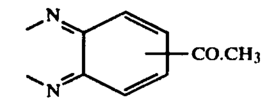 | " | " | " | " $OSi(C_6H_{13})_3$ |
| (1379) | 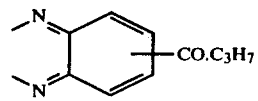 | " | " | " | " $OSi(C_4H_9)_3$ |
| (1380) | 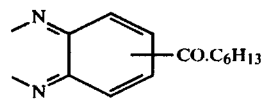 | " | " | " | " $OSi(C_3H_7)_3$ |
| (1381) | 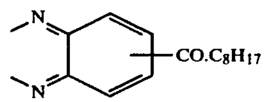 | $= A^1$ | $= A^1$ | $= A^1$ | Si $OSi(C_2H_5)_3$ |
| (1382) | 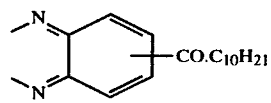 | " | " | " | " $OSi(CH_3)_3$ |
| (1383) | 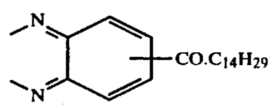 | " | " | " | " $OSi(CH_3)_3$ |
| (1384) | 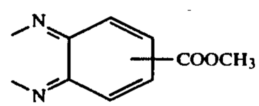 | " | " | " | " $OSi(C_6H_{13})_3$ |
| (1385) | 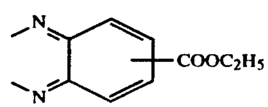 | " | " | " | " $OSi(C_4H_9)_3$ |
| (1386) | 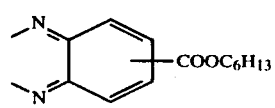 | " | " | " | " $OSi(C_3H_7)_3$ |

-continued
| | | | | | | |
|---|---|---|---|---|---|---|
| (1387) | 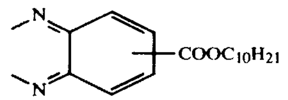 | " | " | " | " | $OSi(C_2H_5)_3$ |
| (1388) | 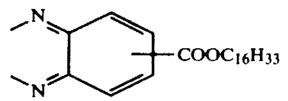 | " | " | " | " | $OSi(CH_3)_3$ |
| (1389) | 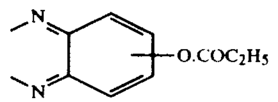 | " | " | " | " | $OSi(C_6H_{13})_3$ |
| (1390) | 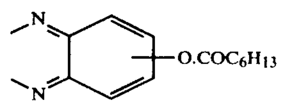 | " | " | " | " | $OSi(C_4H_9)_3$ |
| (1391) | 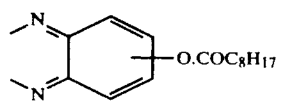 | $= A^1$ | $= A^1$ | $= A^1$ | Si | $OSi(C_3H_7)_3$ |
| (1392) | 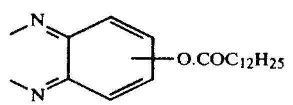 | " | " | " | " | $OSi(C_2H_5)_3$ |
| (1393) | 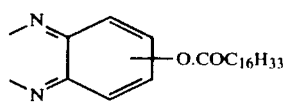 | " | " | " | " | $OSi(CH_3)_3$ |
| (1394) | 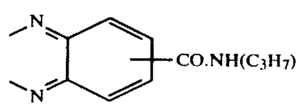 | " | " | " | " | $OSi(C_6H_{13})_3$ |
| (1395) | 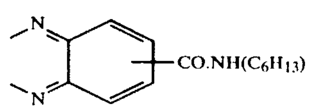 | " | " | " | " | $OSi(C_4H_9)_3$ |

-continued
| | | | | | |
|---|---|---|---|---|---|
| (1396) | 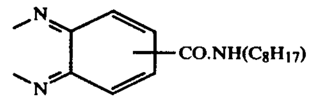 | " | " | " | " $OSi(C_3H_7)_3$ |
| (1397) | 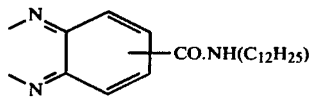 | " | " | " | " $OSi(C_2H_5)_3$ |
| (1398) | 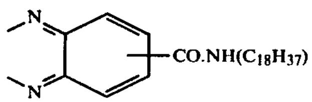 | " | " | " | " $OSi(CH_3)_3$ |
| (1399) | 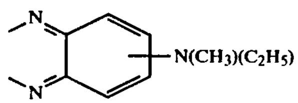 | " | " | " | " $OSi(C_6H_{13})_3$ |
| (1400) | 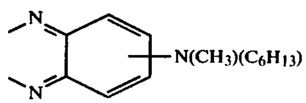 | " | " | " | " $OSi(C_4H_9)_3$ |
| (1401) | 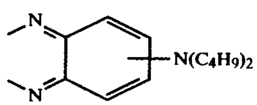 | $=A^1$ | $=A^1$ | $=A^1$ | Si $OSi(C_3H_7)_3$ |
| (1402) | 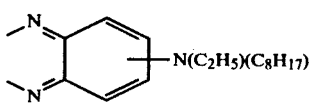 | " | " | " | " $OSi(C_2H_5)_3$ |
| (1403) | 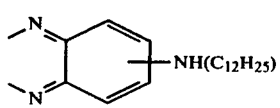 | " | " | " | " $OSi(CH_3)_3$ |
| (1404) | 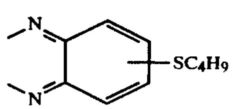 | " | " | " | " $OSi(C_6H_{13})_3$ |

-continued
| | | | | | | |
|---|---|---|---|---|---|---|
| (1405) | 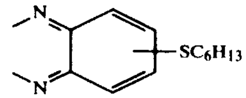 | " | " | " | " | $OSi(C_4H_9)_3$ |
| (1406) | 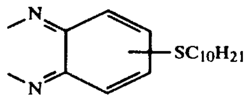 | " | " | " | " | $OSi(C_3H_7)_3$ |
| (1407) | 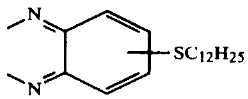 | " | " | " | " | $OSi(C_2H_5)_3$ |
| (1408) | 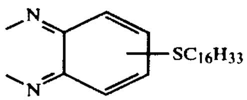 | " | " | " | " | $OSi(CH_3)_3$ |
| (1409) | 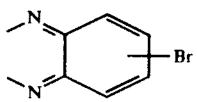 | " | " | " | " | $OSi(C_6H_{13})_3$ |
| (1410) | 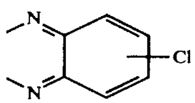 | " | " | " | " | $OSi(C_4H_9)_3$ |
| (1411) | 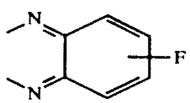 | $= A^1$ | $= A^1$ | $= A^1$ | Si | $OSi(C_3H_7)_3$ |
| (1412) | 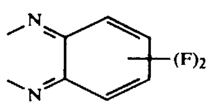 | " | " | " | " | $OSi(C_2H_5)_3$ |
| (1413) | 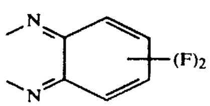 | " | " | " | " | $OSi(CH_3)_3$ |

-continued
| | | | | | |
|---|---|---|---|---|---|
| (1414) | 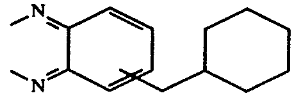 | " | " | " | " $OSi(C_3H_7)_3$ |
| (1415) | 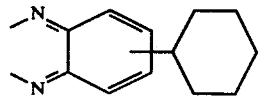 | " | " | " | " $OSi(C_4H_9)_3$ |
| (1416) | 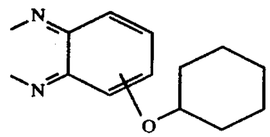 | " | " | " | " $OSi(C_6H_{13})_3$ |
| (1417) | 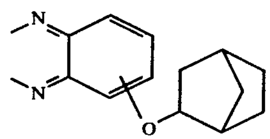 | " | " | " | " $OSi(C_4H_9)_3$ |
| (1418) | 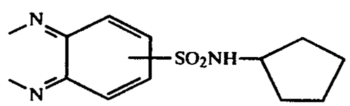 | " | " | " | " $OSi(C_6H_{13})_3$ |
| (1419) | 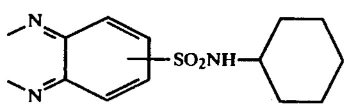 | " | " | " | " $OSi(C_4H_9)_3$ |
| (1420) | 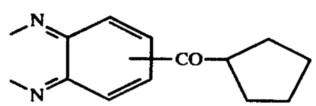 | " | " | " | " $OSi(C_6H_{13})_3$ |
| (1421) | 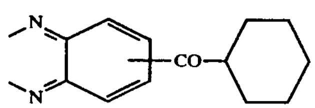 | $= A^1$ | $= A^1$ | $= A^1$ | Si $OSi(C_4H_9)_3$ |

-continued
| | | | | | | |
|---|---|---|---|---|---|---|
| (1422) | 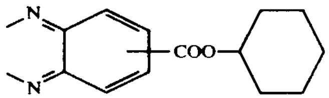 | " | " | " | " | $OSi(C_3H_7)_3$ |
| (1423) | 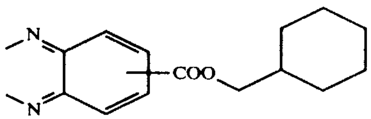 | " | " | " | " | $OSi(C_2H_5)_3$ |
| (1424) | 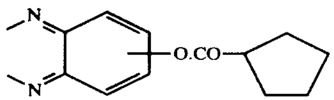 | " | " | " | " | $OSi(C_4H_9)_3$ |
| (1425) | 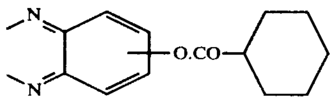 | " | " | " | " | $OSi(C_3H_7)_3$ |
| (1426) | 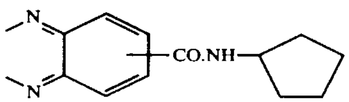 | " | " | " | " | $OSi(C_6H_{13})_3$ |
| (1427) | 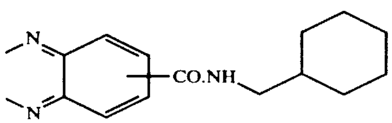 | " | " | " | " | $OSi(C_4H_9)_3$ |
| (1428) | 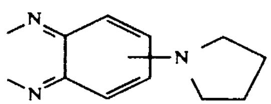 | " | " | " | " | $OSi(C_4H_9)_3$ |
| (1429) | 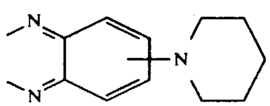 | " | " | " | " | $OSi(C_3H_7)_3$ |

-continued
| | | | | | |
|---|---|---|---|---|---|
| (1430) | 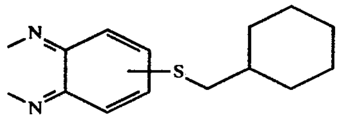 | " | " | " | " $OSi(C_2H_5)_3$ |
| (1431) | 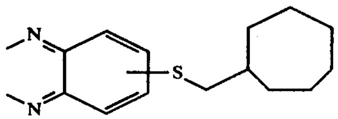 | $= A^1$ | $= A^1$ | $= A^1$ | Si $OSi(CH_3)_3$ |
| (1432) | 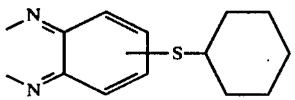 | " | " | " | " $OSi(C_6H_{13})_3$ |
| (1433) | 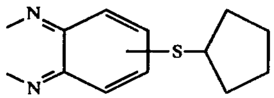 | " | " | " | " $OSi(C_4H_9)_3$ |
| (1434) | 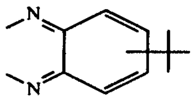 | " | " | " | " $OSi(C_6H_{13})_3$ |
| (1435) | 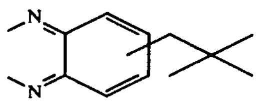 | " | " | " | " $OSi(C_4H_9)_3$ |
| (1436) | 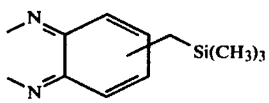 | " | " | " | " $OSi(C_3H_7)_3$ |
| (1437) | 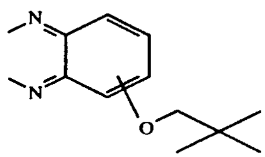 | " | " | " | " $OSi(C_2H_5)_3$ |

-continued
| | | | | | |
|---|---|---|---|---|---|
| (1438) | 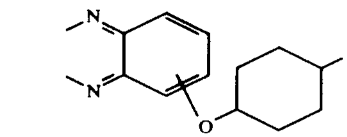 | " | " | " | " $OSi(C_2H_5)_3$ |
| (1439) | 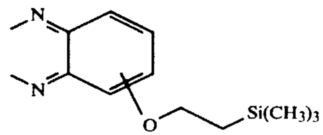 | " | " | " | " $OSi(C_2H_5)_3$ |
| (1440) | 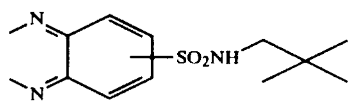 | " | " | " | " $OSi(C_6H_{13})_3$ |
| (1441) | 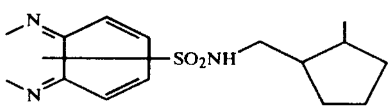 | $= A^1$ | $= A^1$ | $= A^1$ | Si $OSi(C_4H_9)_3$ |
| (1442) | 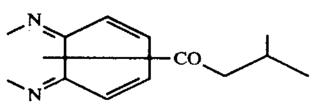 | " | " | " | " $OSi(C_4H_9)_3$ |
| (1443) | 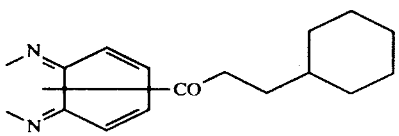 | " | " | " | " $OSi(C_3H_7)_3$ |
| (1444) | 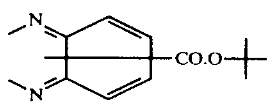 | " | " | " | " $OSi(C_4H_9)_3$ |
| (1445) | 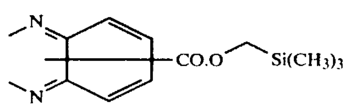 | " | " | " | " $OSi(C_2H_5)_3$ |

-continued
| | | | | | |
|---|---|---|---|---|---|
| (1446) | 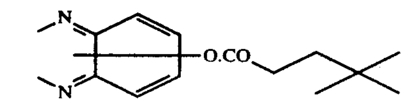 | " | " | " | " $OSi(CH_3)_3$ |
| (1447) | 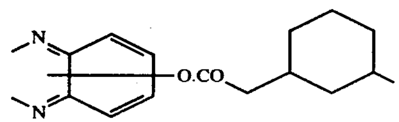 | " | " | " | " $OSi(C_2H_5)_3$ |
| (1448) | 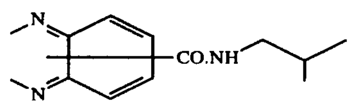 | " | " | " | " $OSi(C_6H_{13})_3$ |
| (1449) | 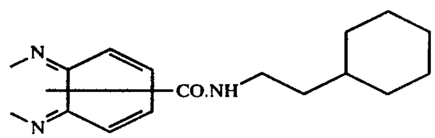 | " | " | " | " $OSi(C_4H_9)_3$ |
| (1450) | 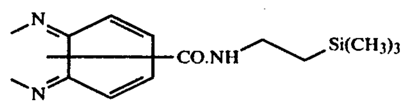 | " | " | " | " $OSi(C_2H_5)_3$ |
| (1451) | 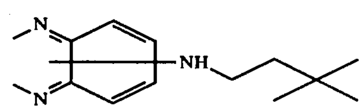 | $= A^1$ | $= A^1$ | $= A^1$ | Si $OSi(C_3H_7)_3$ |
| (1452) | 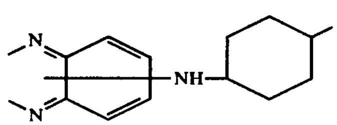 | " | " | " | " $OSi(C_4H_9)_3$ |
| (1453) | 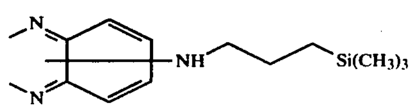 | " | " | " | " $OSi(CH_3)_3$ |

-continued
| | | | | | |
|---|---|---|---|---|---|
| (1454) | 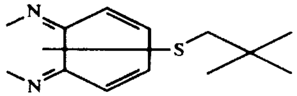 | " | " | " | " $OSi(C_2H_5)_3$ |
| (1455) | 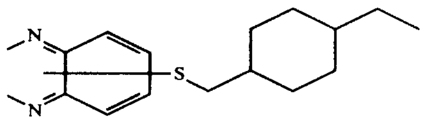 | " | " | " | " $OSi(C_3H_7)_3$ |
| (1456) | 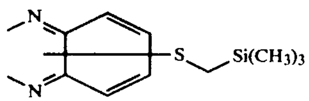 | " | " | " | " $OSi(C_2H_5)_3$ |
| (1457) | 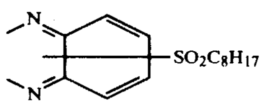 | " | " | " | " $OSi(C_6H_{13})_3$ |
| (1458) | 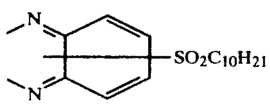 | " | " | " | " $OSi(C_4H_9)_3$ |
| (1459) | 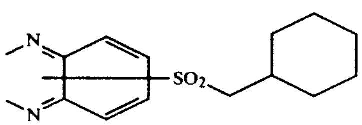 | " | " | " | " $OSi(C_3H_7)_3$ |
| (1460) | 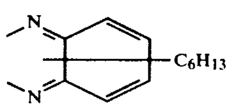 | " | " | " | " 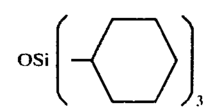 |

| | | | | | |
|---|---|---|---|---|---|
| (1461) | 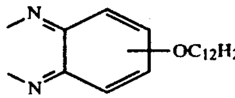 $-OC_{12}H_{25}$ | $= A^1$ | $= A^1$ | $= A^1$ | Si $OSi(CH_3)_2$ 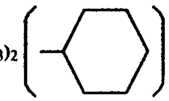 |
| (1462) | 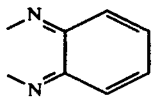 | " | " | " | " OSi 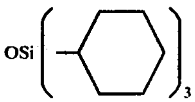 |
| (1463) | 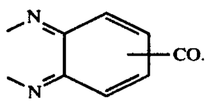 $-CO.OC_{14}H_{29}$ | " | " | " | " OSi 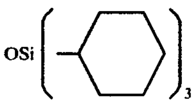 |
| (1464) | 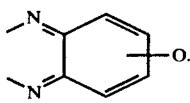 $-O.COC_8H_{17}$ | " | " | " | " OSi 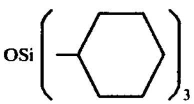 |
| (1465) | 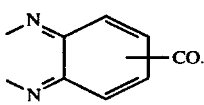 $-CO.NHC_{12}H_{25}$ | " | " | " | " $OSi(CH_3)_2$ 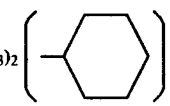 |
| (1466) | 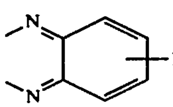 $-NHC_{10}H_{21}$ | " | " | " | " $OSi(CH_3)_2$ 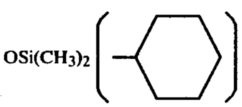 |
| (1467) | 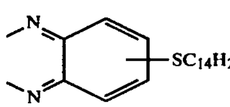 $-SC_{14}H_{29}$ | " | " | " | " $OSi(CH_3)_2$ 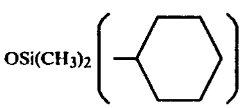 |
| (1468) | 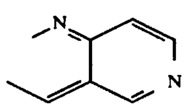 | " | " | " | " $OSi(C_6H_{13})_3$ |
| (1469) | " | " | " | " | " $OSi(C_4H_9)_3$ |
| (1470) | " | " | " | " | " $OSi(C_3H_7)_3$ |

-continued
| | | | | | | |
|---|---|---|---|---|---|---|
| (1471) | 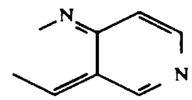 | $=A^1$ | $=A^1$ | $=A^1$ | Si | $OSi(C_2H_5)_3$ |
| (1472) | 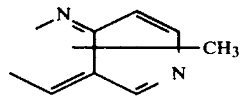 | " | " | " | " | $OSi(C_6H_{13})_3$ |
| (1473) | 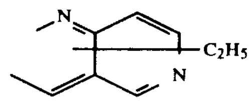 | " | " | " | " | $OSi(C_4H_9)_3$ |
| (1474) | 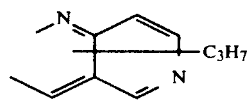 | " | " | " | " | $OSi(C_3H_7)_3$ |
| (1475) | 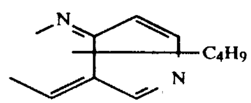 | " | " | " | " | $OSi(C_2H_5)_3$ |
| (1476) | 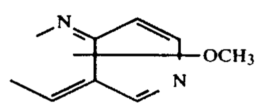 | " | " | " | " | $OSi(C_6H_{13})_3$ |
| (1477) | 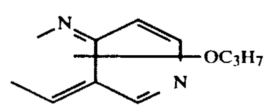 | " | " | " | " | $OSi(C_4H_9)_3$ |
| (1478) | 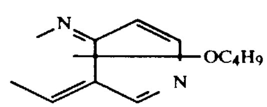 | " | " | " | " | $OSi(C_2H_5)_3$ |
| (1479) | " | " | " | " | " | $OSi(C_6H_5)_3$ |

-continued
| | | | | | |
|---|---|---|---|---|---|
| (1480) | 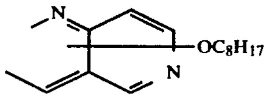 | " | " | " | " $OC_8H_{17}$ |
| (1481) | 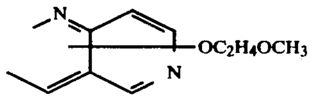 | $= A^1$ | $= A^1$ | $= A^1$ | Si $OSi(C_4H_9)_3$ |
| (1482) | 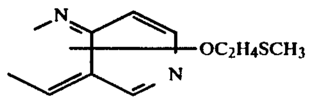 | " | " | " | " $OSi(C_4H_9)_3$ |
| (1483) | 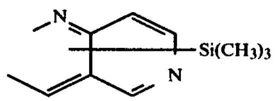 | " | " | " | " $OSi(C_4H_9)_3$ |
| (1484) | 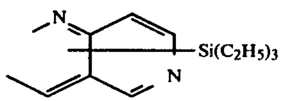 | " | " | " | " $OSi(C_3H_7)_3$ |
| (1485) | 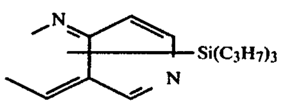 | " | " | " | " $OSi(C_2H_5)_3$ |
| (1486) | 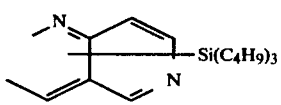 | " | " | " | " $OSi(CH_3)_3$ |
| (1487) | 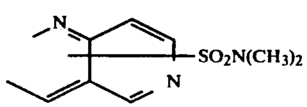 | " | " | " | " $OSi(C_6H_{13})_3$ |
| (1488) | 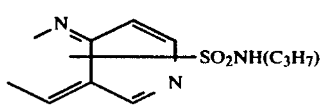 | " | " | " | " $OSi(C_4H_9)_3$ |

-continued
| | | | | | | |
|---|---|---|---|---|---|---|
| (1489) | 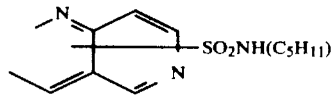 | " | " | " | " | $OSi(C_3H_7)_3$ |
| (1490) | 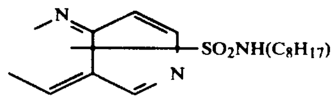 | " | " | " | " | $OSi(C_2H_5)_3$ |
| (1491) | 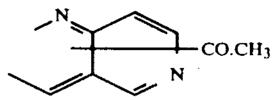 | $= A^1$ | $= A^1$ | $= A^1$ | Si | $OSi(C_6H_{13})_3$ |
| (1492) | 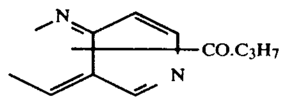 | " | " | " | " | $OSi(C_4H_9)_3$ |
| (1493) | 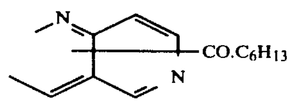 | " | " | " | " | $OSi(C_3H_7)_3$ |
| (1494) | 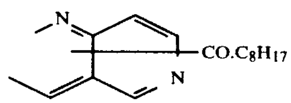 | " | " | " | " | $OSi(C_2H_5)_3$ |
| (1495) | 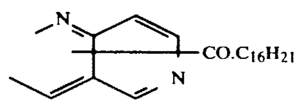 | " | " | " | " | $OSi(CH_3)_3$ |
| (1496) | 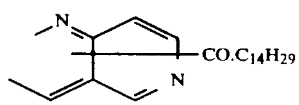 | " | " | " | " | $OSi(CH_3)_3$ |
| (1497) | 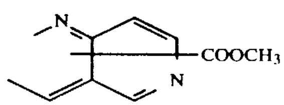 | " | " | " | " | $OSi(C_6H_{13})_3$ |

-continued
| | | | | | | |
|---|---|---|---|---|---|---|
| (1498) | 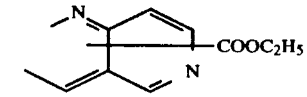 | " | " | " | " | $OSi(C_4H_9)_3$ |
| (1499) | 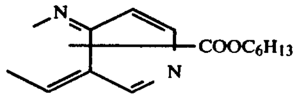 | " | " | " | " | $OSi(C_3H_7)_3$ |
| (1450) | 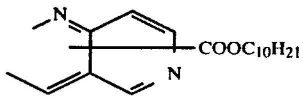 | " | " | " | " | $OSi(C_2H_5)_3$ |
| (1501) | 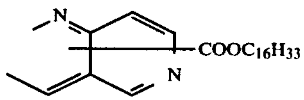 | $= A^1$ | $= A^1$ | $= A^1$ | Si | $OSi(CH_3)_3$ |
| (1502) | 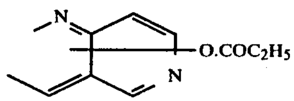 | " | " | " | " | $OSi(C_6H_{13})_3$ |
| (1503) | 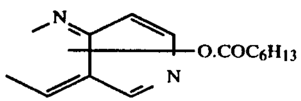 | " | " | " | " | $OSi(C_4H_9)_3$ |
| (1504) | 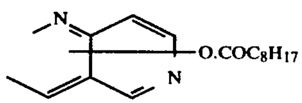 | " | " | " | " | $OSi(C_3H_7)_3$ |
| (1505) | 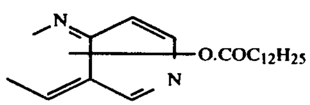 | " | " | " | " | $OSi(C_2H_5)_3$ |
| (1506) | 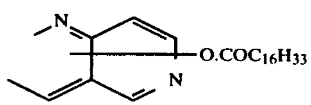 | " | " | " | " | $OSi(CH_3)_3$ |

-continued
| | | | | | | |
|---|---|---|---|---|---|---|
| (1507) | 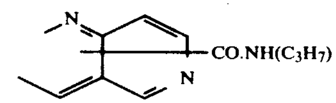 | " | " | " | " | $OSi(C_6H_{13})_3$ |
| (1508) | 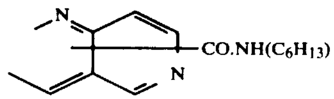 | " | " | " | " | $OSi(C_4H_9)_3$ |
| (1509) | 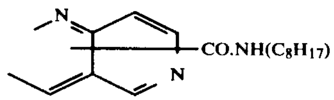 | " | " | " | " | $OSi(C_3H_7)_3$ |
| (1510) | 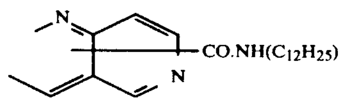 | " | " | " | " | $OSi(C_2H_5)_3$ |
| (1511) | 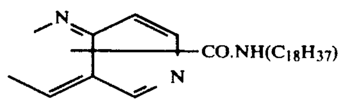 | $= A^1$ | $= A^1$ | $= A^1$ | Si | $OSi(CH_3)_3$ |
| (1512) | 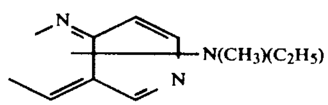 | " | " | " | " | $OSi(C_6H_{13})_3$ |
| (1513) | 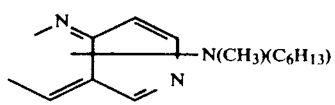 | " | " | " | " | $OSi(C_4H_9)_3$ |
| (1514) | 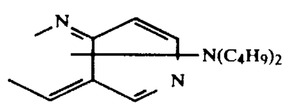 | " | " | " | " | $OSi(C_3H_7)_3$ |
| (1515) | 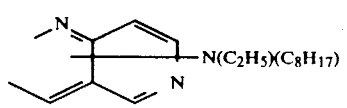 | " | " | " | " | $OSi(C_2H_5)_3$ |

-continued
| | | | | | | |
|---|---|---|---|---|---|---|
| (1516) | 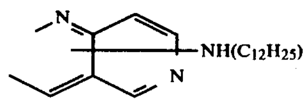 | " | " | " | " | $OSi(CH_3)_3$ |
| (1517) | 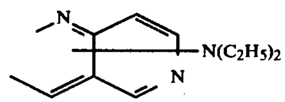 | " | " | " | " | $OSi(C_4H_9)_3$ |
| (1518) | 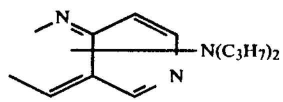 | " | " | " | " | $OSi(C_4H_9)_3$ |
| (1519) | 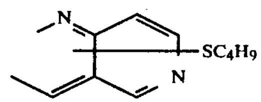 | " | " | " | " | $OSi(C_4H_9)_3$ |
| (1520) | 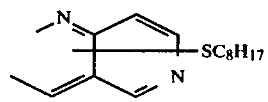 | " | " | " | " | $OSi(C_3H_7)_3$ |
| (1521) | 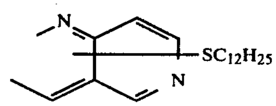 | $= A^1$ | $= A^1$ | $= A^1$ | Si | $OSi(C_2H_5)_3$ |
| (1522) | 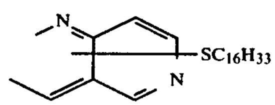 | " | " | " | " | $OSi(CH_3)_3$ |
| (1523) | 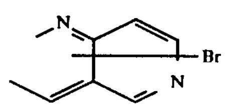 | " | " | " | " | $OSi(C_6H_{13})_3$ |
| (1524) | 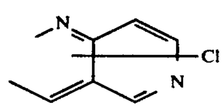 | " | " | " | " | $OSi(C_4H_9)_3$ |

-continued
| | | | | | | |
|---|---|---|---|---|---|---|
| (1525) | 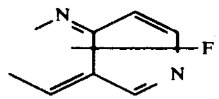 | " | " | " | " | $OSi(C_3H_7)_3$ |
| (1526) | 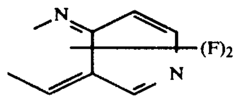 | " | " | " | " | $OSi(C_2H_5)_3$ |
| (1527) | 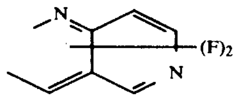 | " | " | " | " | $OSi(CH_3)_3$ |
| (1528) | 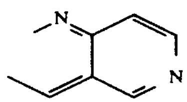 | " | " | " | Ge | $OSi(C_6H_{13})_3$ |
| (1529) | " | " | " | " | " | $OSi(C_4H_9)_3$ |
| (1530) | 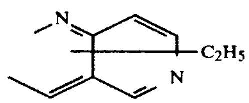 | " | " | " | " | $OSi(C_6H_{13})_3$ |
| (1531) | 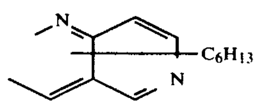 | $=A^1$ | $=A^1$ | $=A^1$ | Ge | $OSi(C_2H_5)_3$ |
| (1532) | 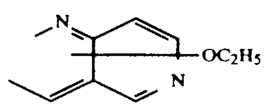 | " | " | " | " | $OSi(C_4H_9)_3$ |
| (1533) | 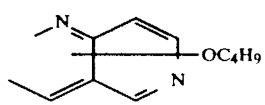 | " | " | " | " | $OSi(C_2H_5)_3$ |

-continued
| | | | | | | |
|---|---|---|---|---|---|---|
| (1534) | 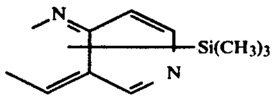 | " | " | " | " | $OSi(C_4H_9)_3$ |
| (1535) | 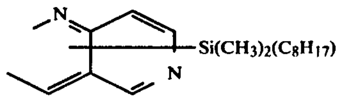 | " | " | " | " | $OSi(C_2H_5)_3$ |
| (1536) | 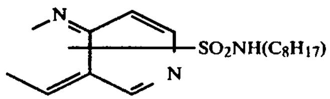 | " | " | " | " | $OSi(C_2H_5)_3$ |
| (1537) | 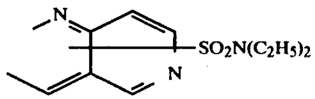 | " | " | " | " | $OSi(C_6H_{13})_3$ |
| (1538) | 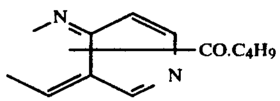 | " | " | " | " | $OSi(C_4H_9)_3$ |
| (1539) | 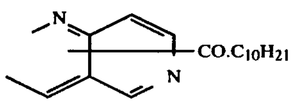 | " | " | " | " | $OSi(C_2H_5)_3$ |
| (1540) | 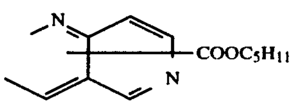 | " | " | " | " | $OSi(C_4H_9)_3$ |
| (1541) | 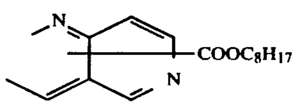 | $= A^1$ | $= A^1$ | $= A^1$ | Ge | $OSi(C_3H_7)_3$ |
| (1542) | 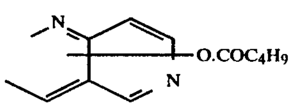 | " | " | " | " | $OSi(C_4H_9)_3$ |

-continued
| | | | | | |
|---|---|---|---|---|---|
| (1543) | 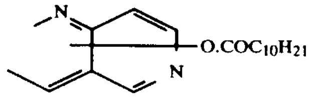 | " | " | " | " $OSi(C_2H_5)_3$ |
| (1544) | 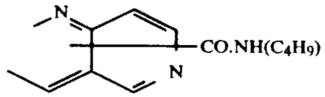 | " | " | " | " $OSi(C_4H_9)_3$ |
| (1545) | 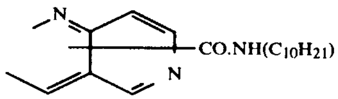 | " | " | " | " $OSi(C_2H_5)_3$ |
| (1546) | 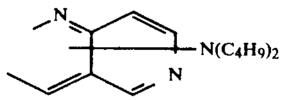 | " | " | " | " $OSi(C_4H_9)_3$ |
| (1547) | 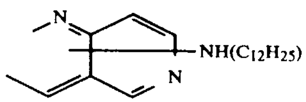 | " | " | " | " $OSi(C_2H_5)_3$ |
| (1548) | 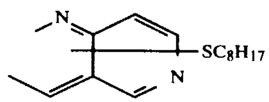 | " | " | " | " $OSi(C_2H_5)_3$ |
| (1549) | 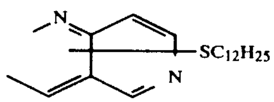 | " | " | " | " $OSi(C_2H_5)_3$ |
| (1550) | 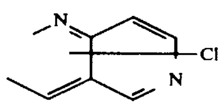 | " | " | " | " $OSi(C_4H_9)_3$ |
| (1551) | 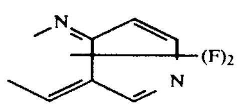 | $= A^1$ | $= A^1$ | $= A^1$ | Ge $OSi(C_2H_5)_3$ |

-continued
| | | | | | | |
|---|---|---|---|---|---|---|
| (1552) | 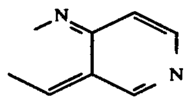 | " | " | " | Sn | $OSi(C_4H_9)_3$ |
| (1553) | 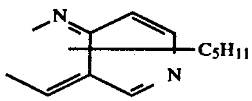 | " | " | " | " | $OSi(C_4H_9)_3$ |
| (1554) | 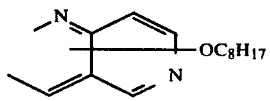 | " | " | " | " | $OSi(C_2H_5)_3$ |
| (1555) | 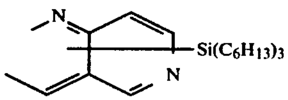 | " | " | " | " | $OSi(C_2H_5)_3$ |
| (1556) | 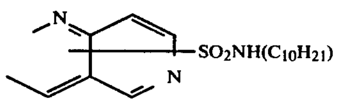 | " | " | " | " | $OSi(C_4H_9)_3$ |
| (1557) | 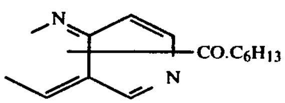 | " | " | " | " | $OSi(C_4H_9)_3$ |
| (1558) | 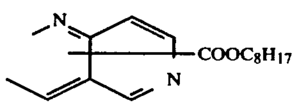 | " | " | " | " | $OSi(C_2H_5)_3$ |
| (1559) | 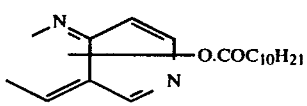 | " | " | " | " | $OSi(C_2H_5)_3$ |
| (1560) | 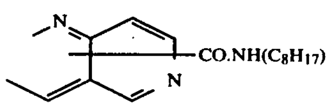 | " | " | " | " | $OSi(C_4H_9)_3$ |

-continued
| | | | | | | |
|---|---|---|---|---|---|---|
| (1561) | 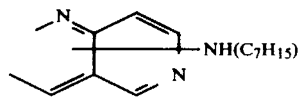 | $= A^1$ | $= A^1$ | $= A^1$ | Sn | $OSi(C_4H_9)_3$ |
| (1562) | 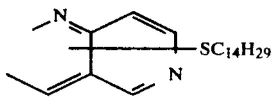 | " | " | " | " | $OSi(C_2H_5)_3$ |
| (1563) | 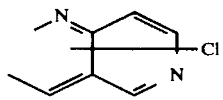 | " | " | " | " | $OSi(C_2H_5)_3$ |
| (1564) | 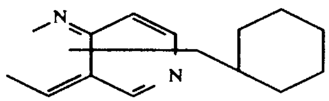 | " | " | " | Si | $OSi(C_3H_7)_3$ |
| (1565) | 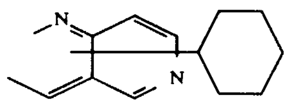 | " | " | " | " | $OSi(C_4H_9)_3$ |
| (1566) | " | " | " | " | " | $OSi(C_3H_7)_3$ |
| (1567) | 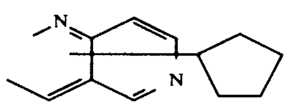 | " | " | " | " | $OSi(C_4H_9)_3$ |
| (1568) | 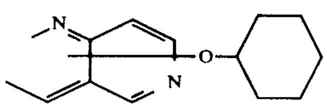 | " | " | " | " | $OSi(C_6H_{13})_3$ |
| (1569) | 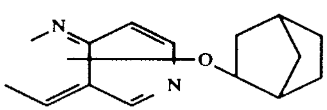 | " | " | " | " | $OSi(C_4H_9)_3$ |

-continued
| | | | | | | |
|---|---|---|---|---|---|---|
| (1570) | 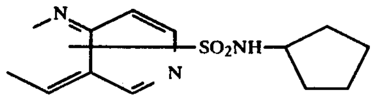 | " | " | " | " | $OSi(C_3H_7)_3$ |
| (1571) | 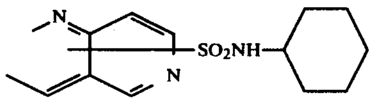 | = $A^1$ | = $A^1$ | = $A^1$ | Si | $OSi(C_2H_5)_3$ |
| (1572) | 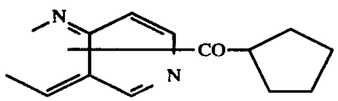 | " | " | " | " | $OSi(C_6H_{13})_3$ |
| (1573) | 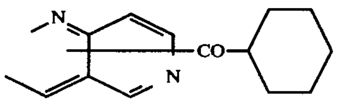 | " | " | " | " | $OSi(C_4H_9)_3$ |
| (1574) | 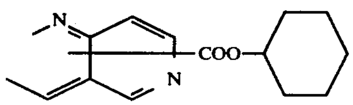 | " | " | " | " | $OSi(C_3H_7)_3$ |
| (1575) | 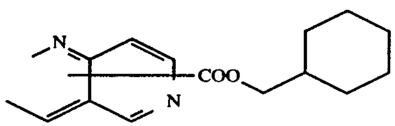 | " | " | " | " | $OSi(C_2H_5)_3$ |
| (1576) | 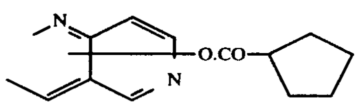 | " | " | " | " | $OSi(C_4H_9)_3$ |
| (1577) | 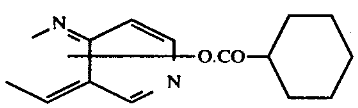 | " | " | " | " | $OSi(C_3H_7)_3$ |

-continued
| | | | | | |
|---|---|---|---|---|---|
| (1578) | 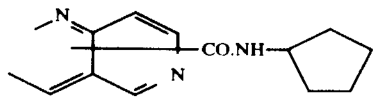 | " | " | " | Si $OSi(C_6H_{13})_3$ |
| (1579) | 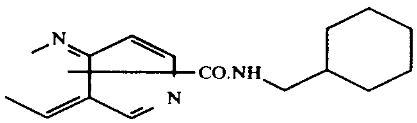 | " | " | " | " $OSi(C_4H_9)_3$ |
| (1580) | 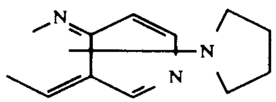 | " | " | " | " $OSi(C_4H_9)_3$ |
| (1581) | 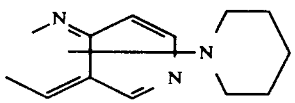 | $= A^1$ | $= A^1$ | $= A^1$ | Si $OSi(C_3H_7)_3$ |
| (1582) | 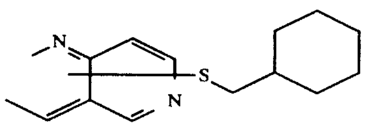 | " | " | " | " $OSi(C_2H_5)_3$ |
| (1583) | 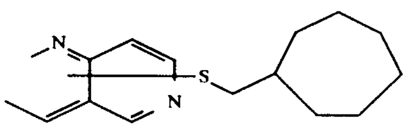 | " | " | " | " $OSi(CH_3)_3$ |
| (1584) | 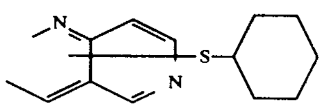 | " | " | " | " $OSi(C_6H_{13})_3$ |
| (1585) | 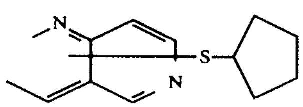 | " | " | " | " $OSi(C_4H_9)_3$ |

| | | | | | |
|---|---|---|---|---|---|
| (1586) | 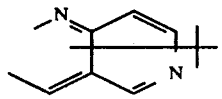 | " | " | " | " $OSi(C_4H_8)_3$ |
| (1587) | " | " | " | " | " $OC_2H_5$ |
| (1588) | 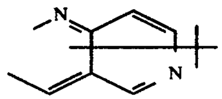 | " | " | " | " $OC_4H_8OCH_3$ |
| (1589) | 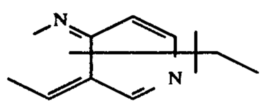 | " | " | " | " $OSi(C_4H_9)_3$ |
| (1590) | 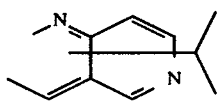 | " | " | " | " $OSi(C_4H_9)_3$ |
| (1591) | 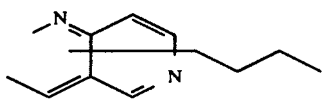 | $= A^1$ | $= A^1$ | $= A^1$ | Si $OSi(C_4H_9)_3$ |
| (1592) | 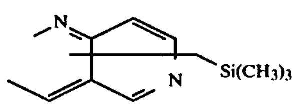 | " | " | " | " $OSi(C_3H_7)_3$ |
| (1593) | 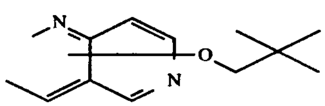 | " | " | " | " $OSi(C_2H_5)_3$ |
| (1594) | 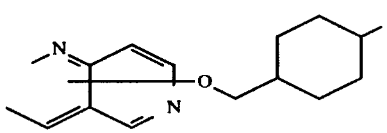 | " | " | " | " $OSi(C_2H_5)_3$ |

-continued
| | | | | | |
|---|---|---|---|---|---|
| (1595) | 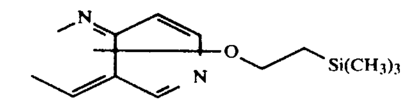 | " | " | " | " $OSi(C_2H_5)_3$ |
| (1596) | 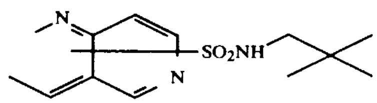 | " | " | " | " $OSi(C_6H_{13})_3$ |
| (1597) | 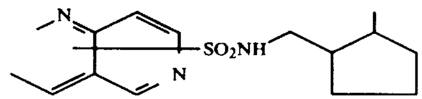 | " | " | " | " $OSi(C_6H_{13})_3$ |
| (1598) | 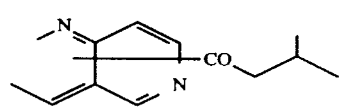 | " | " | " | " $OSi(C_4H_9)_3$ |
| (1599) | 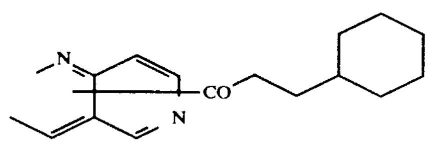 | " | " | " | " $OSi(C_3H_7)_3$ |
| (1600) | 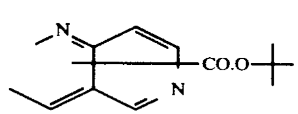 | " | " | " | " $OSi(C_4H_9)_3$ |
| (1601) | 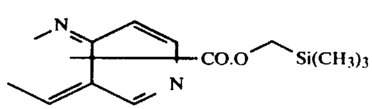 | $= A^1$ | $= A^1$ | $= A^1$ | Si $OSi(C_2H_5)_3$ |
| (1602) | 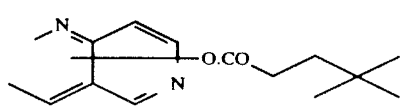 | " | " | " | " $OSi(CH_3)_3$ |

-continued
| | | | | | |
|---|---|---|---|---|---|
| (1603) | 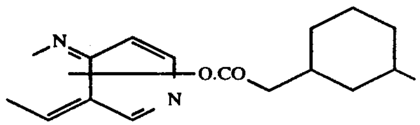 | " | " | " | " $OSi(C_2H_5)_3$ |
| (1604) | 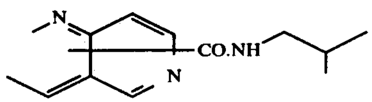 | " | " | " | " $OSi(C_6H_{13})_3$ |
| (1605) | 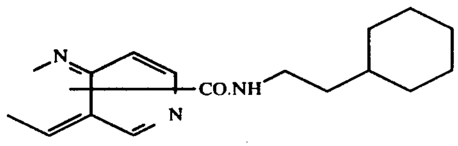 | " | " | " | " $OSi(C_4H_9)_3$ |
| (1606) |  | " | " | " | " $OSi(C_2H_5)_3$ |
| (1607) | 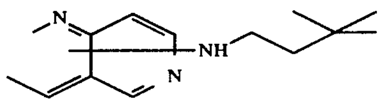 | " | " | " | " $OSi(C_3H_7)_3$ |
| (1608) | 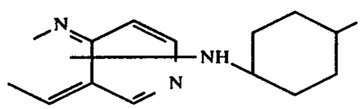 | " | " | " | " $OSi(C_4H_9)_3$ |
| (1609) | 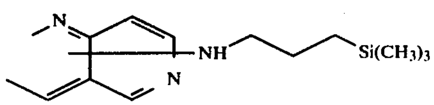 | " | " | " | " $OSi(CH_3)_3$ |
| (1610) | 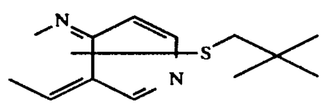 | " | " | " | " $OSi(C_2H_5)_3$ |

-continued
| | | | | | | |
|---|---|---|---|---|---|---|
| (1611) | 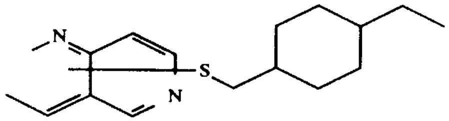 | = A[1] | = A[1] | = A[1] | Si | $OSi(C_3H_7)_3$ |
| (1612) | 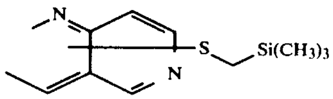 | " | " | " | " | $OSi(C_2H_5)_3$ |
| (1613) | 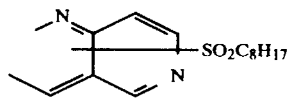 | " | " | " | " | $OSi(C_4H_9)_3$ |
| (1614) | 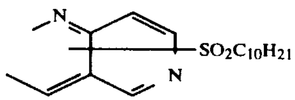 | " | " | " | " | $OSi(C_3H_7)_3$ |
| (1615) | 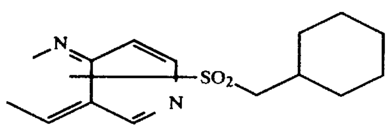 | " | " | " | " | $OSi(C_6H_{13})_3$ |
| (1616) | 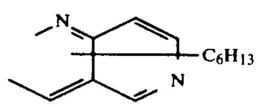 | " | " | " | " | OSi 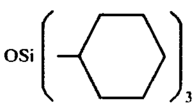 |
| (1617) | 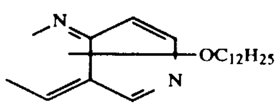 | " | " | " | " | $OSi(CH_3)_2$ 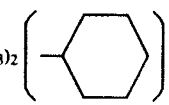 |
| (1618) | 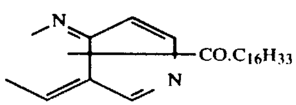 | " | " | " | " | $OSi(CH_3)_2(t\text{-}C_4H_9)$ |

-continued
| | | | | | |
|---|---|---|---|---|---|
| (1619) | 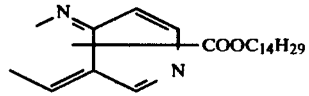 | " | " | " | " OSi 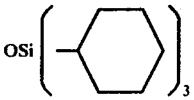 |
| (1620) | 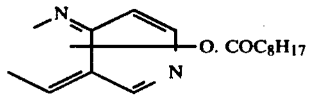 | " | " | " | " OSi 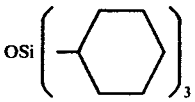 |
| (1621) | 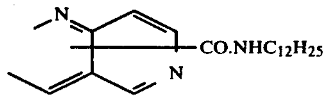 | = $A^1$ | = $A^1$ | = $A^1$ | Si $OSi(CH_3)_2$ 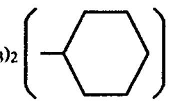 |
| (1622) | 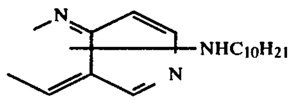 | " | " | " | " $OSi(CH_3)_2$ 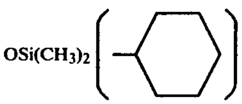 |
| (1623) | 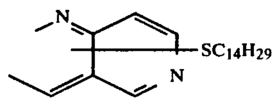 | " | " | " | " $OSi(CH_3)_2$ 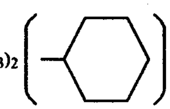 |
| (1624) | 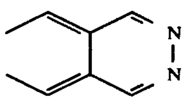 | " | " | " | " $OSi(C_6H_{13})_3$ |
| (1625) | " | " | " | " | " $OSi(C_4H_9)_3$ |
| (1626) | " | " | " | " | " $OSi(C_3H_7)_3$ |
| (1627) | " | " | " | " | " $OSi(C_2H_5)_3$ |
| (1628) | 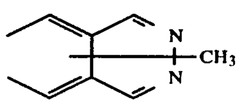 | " | " | " | " $OSi(C_6H_{13})_3$ |
| (1629) | 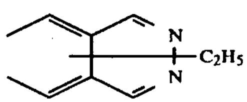 | " | " | " | " $OSi(C_4H_9)_3$ |

-continued
| | | | | | | |
|---|---|---|---|---|---|---|
| (1630) | 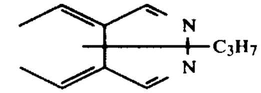 | " | " | " | " | $OSi(C_3H_7)_3$ |
| (1631) | 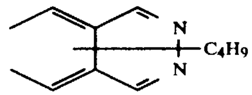 | $= A^1$ | $= A^1$ | $= A^1$ | Si | $OSi(C_2H_5)_3$ |
| (1632) | 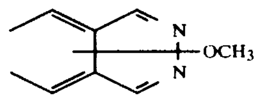 | " | " | " | " | $OSi(C_6H_{13})_3$ |
| (1633) | 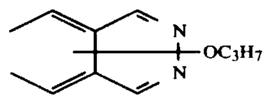 | " | " | " | " | $OSi(C_4H_9)_3$ |
| (1634) | 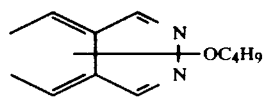 | " | " | " | " | $OSi(C_3H_7)_3$ |
| (1635) | 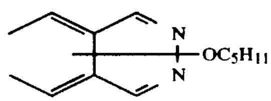 | " | " | " | " | $OSi(C_2H_5)_3$ |
| (1636) | 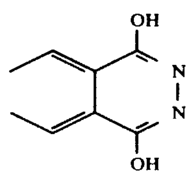 | " | " | " | " | $OSi(C_4H_9)_3$ |
| (1637) | 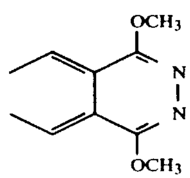 | " | " | " | " | $OSi(C_2H_5)_3$ |

-continued
| | | | | | | |
|---|---|---|---|---|---|---|
| (1638) | 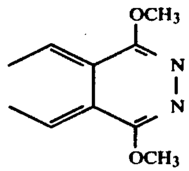 | " | " | " | " | $OSi(C_4H_9)_3$ |
| (1639) | 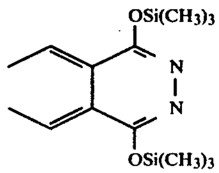 | " | " | " | " | $OSi(C_4H_9)_3$ |
| (1640) | 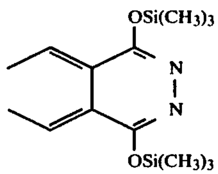 | " | " | " | " | $OSi(C_2H_5)_3$ |
| (1641) | 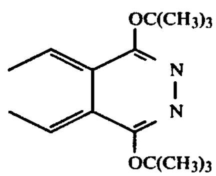 | $= A^1$ | $= A^1$ | $= A^1$ | Si | $OSi(C_2H_5)_3$ |
| (1642) | 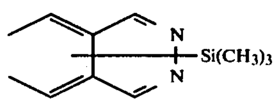 | " | " | " | " | $OSi(C_4H_9)_3$ |
| (1643) | 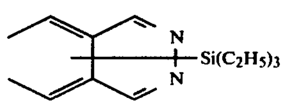 | " | " | " | " | $OSi(C_3H_7)_3$ |
| (1644) | 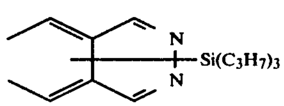 | " | " | " | " | $OSi(C_2H_5)_3$ |

-continued
| | | | | | | |
|---|---|---|---|---|---|---|
| (1645) | 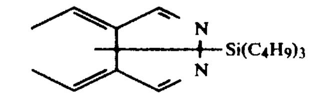 | " | " | " | " | $OSi(CH_3)_3$ |
| (1646) | 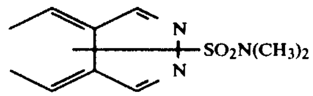 | " | " | " | " | $OSi(C_6H_{13})_3$ |
| (1647) | 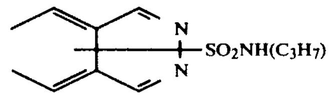 | " | " | " | " | $OSi(C_4H_9)_3$ |
| (1648) | 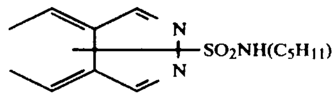 | " | " | " | " | $OSi(C_3H_7)_3$ |
| (1649) | 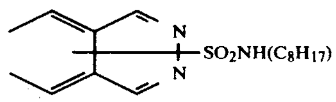 | " | " | " | " | $OSi(C_2H_5)_3$ |
| (1650) | 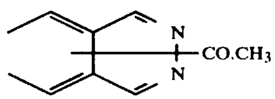 | " | " | " | " | $OSi(C_6H_{13})_3$ |
| (1651) | 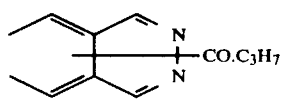 | $= A^1$ | $= A^1$ | $= A^1$ | Si | $OSi(C_4H_9)_3$ |
| (1652) | 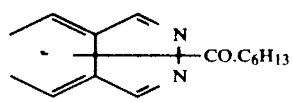 | " | " | " | " | $OSi(C_3H_7)_3$ |
| (1653) | 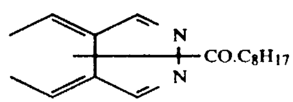 | " | " | " | " | $OSi(C_2H_5)_3$ |

-continued
| | | | | | |
|---|---|---|---|---|---|
| (1654) | 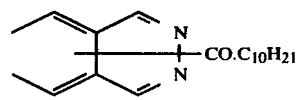 | " | " | " | " OSi(CH$_3$)$_3$ |
| (1655) | 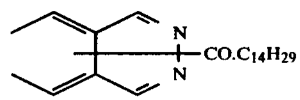 | " | " | " | " OSi(CH$_3$)$_3$ |
| (1656) | 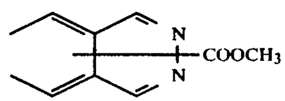 | " | " | " | " OSi(C$_6$H$_{13}$)$_3$ |
| (1657) | 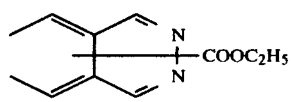 | " | " | " | " OSi(C$_4$H$_9$)$_3$ |
| (1658) | 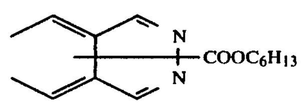 | " | " | " | " OSi(C$_3$H$_7$)$_3$ |
| (1659) | 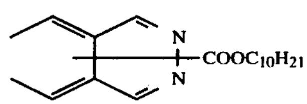 | " | " | " | " OSi(C$_2$H$_5$)$_3$ |
| (1660) | 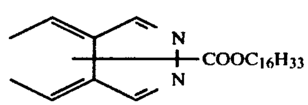 | " | " | " | " OSi(CH$_3$)$_3$ |
| (1661) | 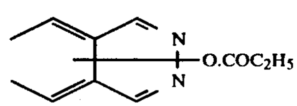 | = A$^1$ | = A$^1$ | = A$^1$ | Si OSi(C$_6$H$_{13}$)$_3$ |
| (1662) | 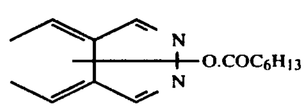 | " | " | " | " OSi(C$_4$H$_9$)$_3$ |

-continued
| | | | | | | |
|---|---|---|---|---|---|---|
| (1663) | 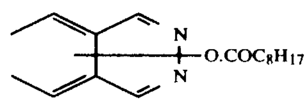 | " | " | " | " | $OSi(C_3H_7)_3$ |
| (1664) | 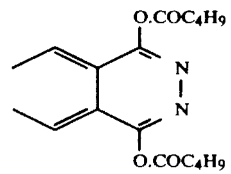 | " | " | " | " | $OSi(C_4H_9)_3$ |
| (1665) | 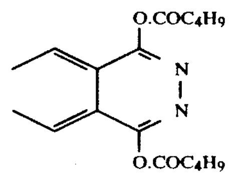 | " | " | " | " | $OSi(C_2H_5)_3$ |
| (1666) | 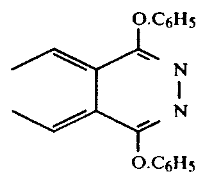 | " | " | " | " | $OSi(C_4H_9)_3$ |
| (1667) | 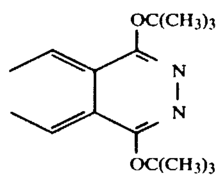 | " | " | " | " | $OSi(C_4H_9)_3$ |
| (1668) | 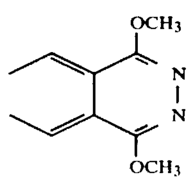 | " | " | " | " | $OC_8H_{17}$ |

-continued
| | | | | | | |
|---|---|---|---|---|---|---|
| (1669) | 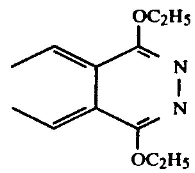 | " | " | " | " | " |
| (1670) | 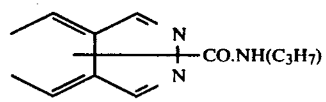 | " | " | " | " | $OSi(C_6H_{13})_3$ |
| (1671) | 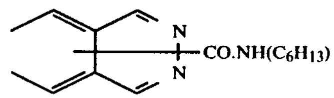 | $= A^1$ | $= A^1$ | $= A^1$ | Si | $OSi(C_4H_9)_3$ |
| (1672) | 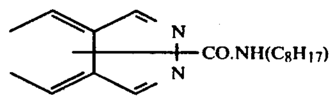 | " | " | " | " | $OSi(C_3H_7)_3$ |
| (1673) | 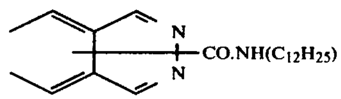 | " | " | " | " | $OSi(C_2H_5)_3$ |
| (1674) | 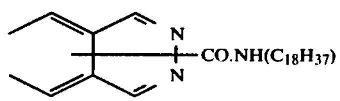 | " | " | " | " | $OSi(CH_3)_3$ |
| (1675) | 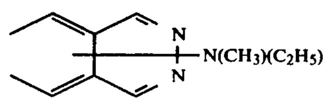 | " | " | " | " | $OSi(C_6H_{13})_3$ |
| (1676) | 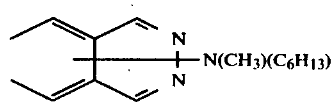 | " | " | " | " | $OSi(C_4H_9)_3$ |

-continued
| | | | | | |
|---|---|---|---|---|---|
| (1677) | 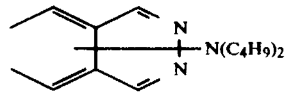 | " | " | " | " $OSi(C_3H_7)_3$ |
| (1678) | 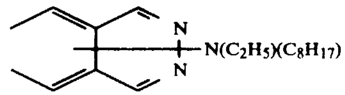 | " | " | " | " $OSi(C_2H_5)_3$ |
| (1679) | 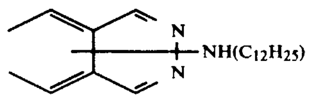 | " | " | " | " $OSi(CH_3)_3$ |
| (1680) | 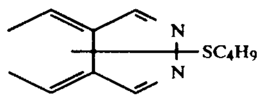 | " | " | " | " $OSi(C_6H_{13})_3$ |
| (1681) | 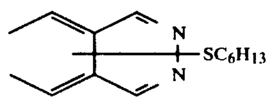 | $= A^1$ | $= A^1$ | $= A^1$ | Si $OSi(C_4H_9)_3$ |
| (1682) | 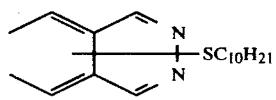 | " | " | " | " $OSi(C_3H_7)_3$ |
| (1683) | 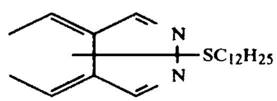 | " | " | " | " $OSi(C_2H_5)_3$ |
| (1684) | 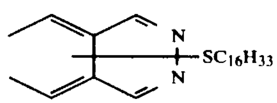 | " | " | " | " $OSi(CH_3)_3$ |
| (1685) | 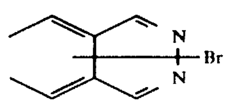 | " | " | " | " $OSi(C_6H_{13})_3$ |

-continued
| | | | | | |
|---|---|---|---|---|---|
| (1686) | 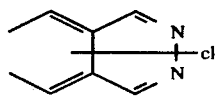 | ″ | ″ | ″ | ″ $OSi(C_4H_9)_3$ |
| (1687) | 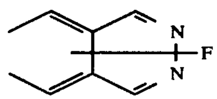 | ″ | ″ | ″ | ″ $OSi(C_3H_7)_3$ |
| (1688) | 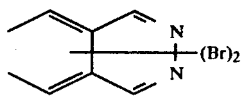 | ″ | ″ | ″ | ″ $OSi(C_6H_{13})_3$ |
| (1689) | 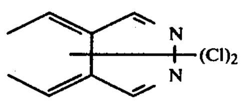 | ″ | ″ | ″ | ″ ″ |
| (1690) | 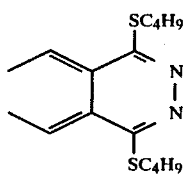 | ″ | ″ | ″ | ″ $OSi(C_4H_9)_3$ |
| (1691) | 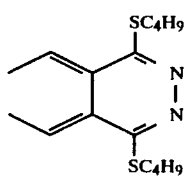 | $= A^1$ | $= A^1$ | $= A^1$ | Si $OSi(C_2H_5)_3$ |
| (1692) | 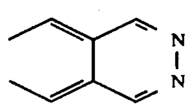 | ″ | ″ | ″ | Ge $OSi(C_6H_{13})_3$ |
| (1693) | ″ | ″ | ″ | ″ | ″ $OSi(C_4H_9)_3$ |

-continued
| | | | | | | |
|---|---|---|---|---|---|---|
| (1694) | 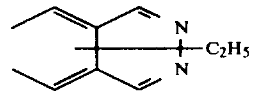 | " | " | " | " | $OSi(C_4H_9)_3$ |
| (1695) | 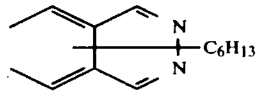 | " | " | " | " | $OSi(C_2H_5)_3$ |
| (1696) | 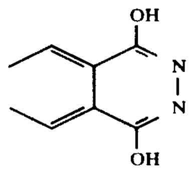 | " | " | " | " | $OSi(C_4H_9)_3$ |
| (1697) | 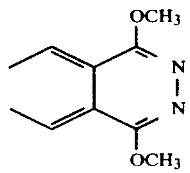 | " | " | " | " | $OSi(C_2H_5)_3$ |
| (1698) | 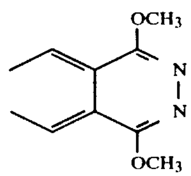 | " | " | " | " | $OSi(C_4H_9)_3$ |
| (1699) | 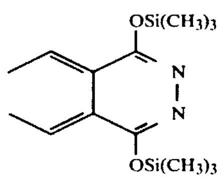 | " | " | " | " | " |
| (1700) | " | " | " | " | " | $OSi(C_2H_5)_3$ |

| | | | | | | |
|---|---|---|---|---|---|---|
| (1701) | 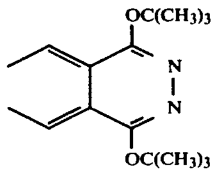 | = $A^1$ | = $A^1$ | = $A^1$ | Ge | $OSi(C_2H_5)_3$ |
| (1702) | 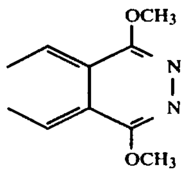 | " | " | " | " | $OC_8H_{17}$ |
| (1703) | 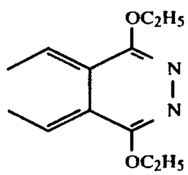 | " | " | " | " | " |
| (1704) | 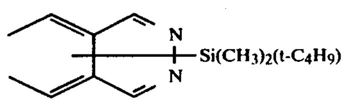 | " | " | " | " | $OSi(C_4H_9)_3$ |
| (1705) | 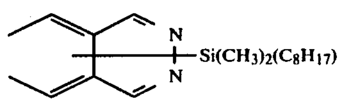 | " | " | " | " | $OSi(C_2H_5)_3$ |
| (1706) | 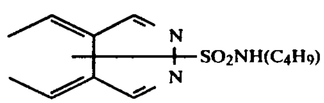 | " | " | " | " | $OSi(C_4H_9)_3$ |
| (1707) | 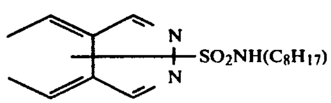 | " | " | " | " | $OSi(C_2H_5)_3$ |

-continued
| | | | | | | |
|---|---|---|---|---|---|---|
| (1708) | 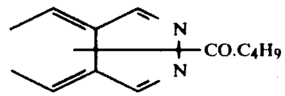 | ″ | ″ | ″ | ″ | $OSi(C_4H_9)_3$ |
| (1709) | 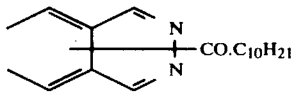 | ″ | ″ | ″ | ″ | $OSi(C_2H_5)_3$ |
| (1710) | 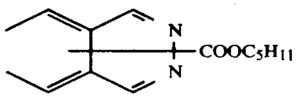 | ″ | ″ | ″ | ″ | $OSi(C_4H_9)_3$ |
| (1711) | 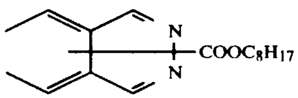 | $= A^1$ | $= A^1$ | $= A^1$ | Ge | $OSi(C_2H_5)_3$ |
| (1712) | 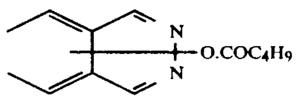 | ″ | ″ | ″ | ″ | $OSi(C_4H_9)_3$ |
| (1713) | 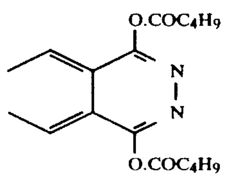 | ″ | ″ | ″ | ″ | $OSi(C_4H_9)_3$ |
| (1714) | ″ | ″ | ″ | ″ | ″ | $OSi(C_2H_5)_3$ |
| (1715) | 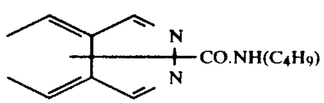 | ″ | ″ | ″ | ″ | $OSi(C_4H_9)_3$ |
| (1716) | 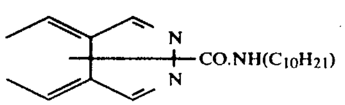 | ″ | ″ | ″ | ″ | $OSi(C_2H_5)_3$ |

-continued
| | | | | | | |
|---|---|---|---|---|---|---|
| (1717) | 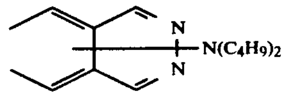 | " | " | " | " | $OSi(C_4H_9)_3$ |
| (1718) | 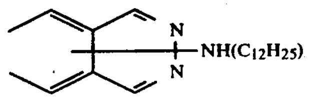 | " | " | " | " | $OSi(C_2H_5)_3$ |
| (1719) | 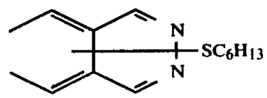 | " | " | " | " | $OSi(C_4H_9)_3$ |
| (1720) | 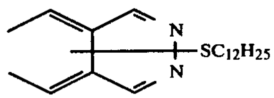 | " | " | " | " | $OSi(C_2H_5)_3$ |
| (1721) | 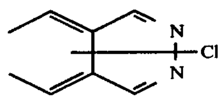 | $= A^1$ | $= A^1$ | $= A^1$ | Ge | $OSi(C_4H_9)_3$ |
| (1722) | 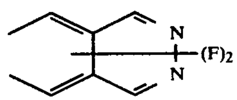 | " | " | " | " | $OSi(C_2H_5)_3$ |
| (1723) | 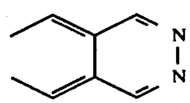 | " | " | " | Sn | $OSi(C_4H_9)_3$ |
| (1724) | 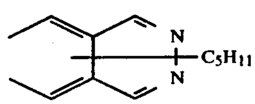 | " | " | " | " | " |
| (1725) | 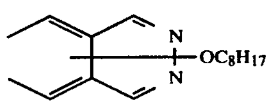 | " | " | " | " | $OSi(C_2H_5)_3$ |

-continued
| | | | | | | |
|---|---|---|---|---|---|---|
| (1726) | 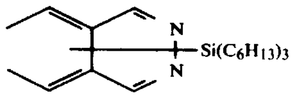 | " | " | " | " | " |
| (1727) | 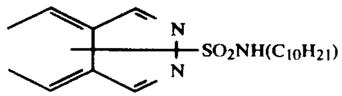 | " | " | " | " | $OSi(C_4H_9)_3$ |
| (1728) | 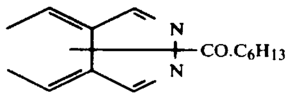 | " | " | " | " | $OSi(C_4H_9)_3$ |
| (1729) | 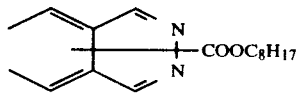 | " | " | " | " | $OSi(C_2H_5)_3$ |
| (1730) | 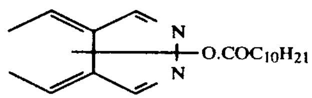 | " | " | " | " | " |
| (1731) | 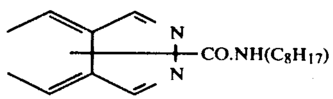 | $=A^1$ | $=A^1$ | $=A^1$ | Sn | $OSi(C_4H_9)_3$ |
| (1732) | 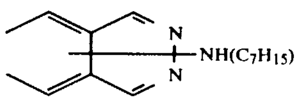 | " | " | " | " | " |
| (1733) | 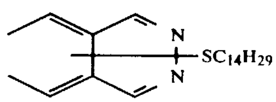 | " | " | " | " | $OSi(C_2H_5)_3$ |
| (1734) | 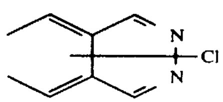 | " | " | " | " | " |

-continued
| | | | | | |
|---|---|---|---|---|---|
| (1735) | 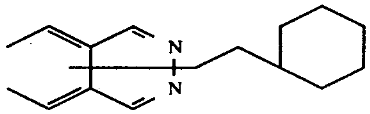 | " | " | " | Si $OSi(C_3H_7)_3$ |
| (1736) | 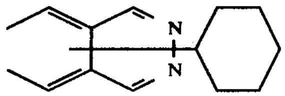 | " | " | " | " $OSi(C_2H_5)_3$ |
| (1737) | 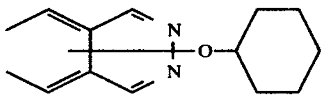 | " | " | " | " $OSi(C_6H_{13})_3$ |
| (1738) | 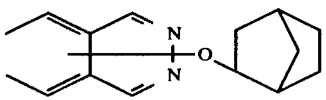 | " | " | " | " $OSi(C_4H_9)_3$ |
| (1739) | 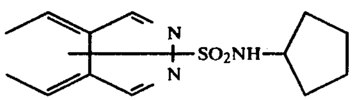 | " | " | " | " $OSi(C_3H_7)_3$ |
| (1740) | 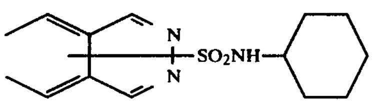 | " | " | " | " $OSi(C_2H_5)_3$ |
| (1741) | 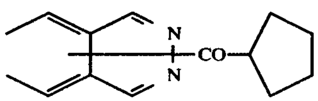 | $= A^1$ | $= A^1$ | $= A^1$ | Si $OSi(C_6H_{13})_3$ |
| (1742) | 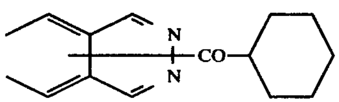 | " | " | " | " $OSi(C_4H_9)_3$ |
| (1743) | 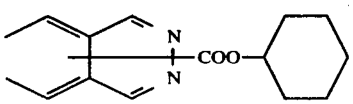 | " | " | " | " $OSi(C_3H_7)_3$ |

-continued
| | | | | | | |
|---|---|---|---|---|---|---|
| (1744) | 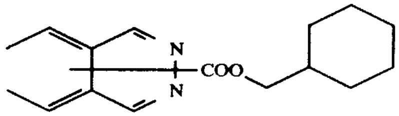 | " | " | " | " | $OSi(C_2H_5)_3$ |
| (1745) | 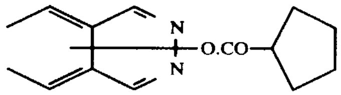 | " | " | " | " | $OSi(C_4H_9)_3$ |
| (1746) | 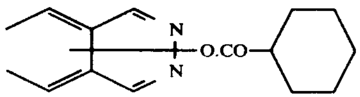 | " | " | " | " | $OSi(C_3H_7)_3$ |
| (1747) | 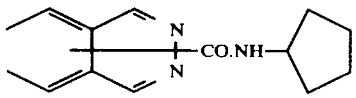 | " | " | " | " | $OSi(C_6H_{13})_3$ |
| (1748) | 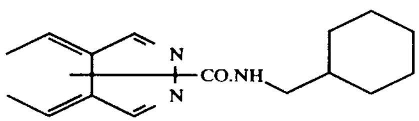 | " | " | " | " | $OSi(C_4H_9)_3$ |
| (1749) | 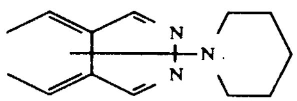 | " | " | " | " | $OSi(C_4H_9)_3$ |
| (1750) | 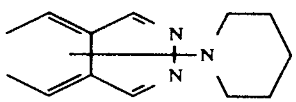 | " | " | " | " | $OSi(C_3H_7)_3$ |
| (1751) | 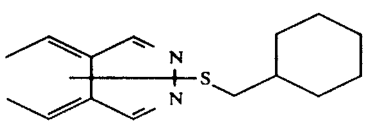 | $= A^1$ | $= A^1$ | $= A^1$ | Si | $OSi(C_2H_5)_3$ |

-continued
| | | | | | | |
|---|---|---|---|---|---|---|
| (1752) | 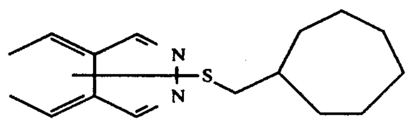 | " | " | " | " | $OSi(CH_3)_3$ |
| (1753) | 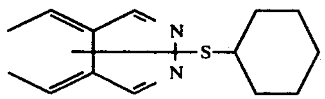 | " | " | " | " | $OSi(C_6H_{13})_3$ |
| (1754) | 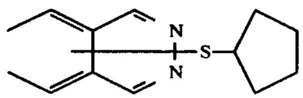 | " | " | " | " | $OSi(C_4H_9)_3$ |
| (1755) | 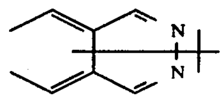 | " | " | " | " | " |
| (1756) | 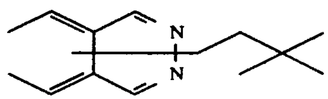 | " | " | " | " | " |
| (1757) | 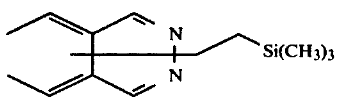 | " | " | " | " | $OSi(C_3H_7)_3$ |
| (1758) | 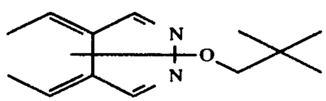 | " | " | " | " | $OSi(C_2H_5)_3$ |
| (1759) | 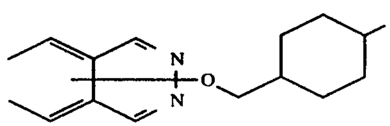 | " | " | " | " | " |

-continued
| | | | | | |
|---|---|---|---|---|---|
| (1760) | 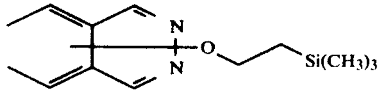 | " | " | " | " $OSi(C_2H_5)_3$ |
| (1761) | 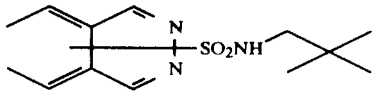 | $= A^1$ | $= A^1$ | $= A^1$ | Si $OSi(C_6H_{13})_3$ |
| (1762) | 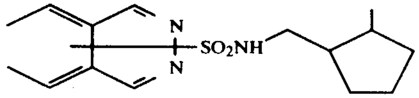 | " | " | " | " " |
| (1763) | 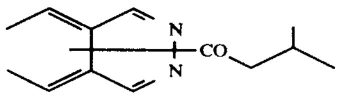 | " | " | " | " $OSi(C_4H_9)_3$ |
| (1764) | 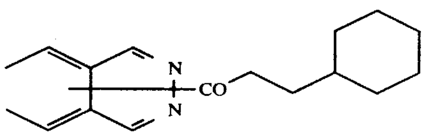 | " | " | " | " $OSi(C_3H_7)_3$ |
| (1765) | 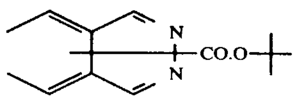 | " | " | " | " $OSi(C_4H_9)_3$ |
| (1766) | 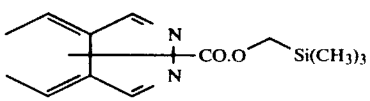 | " | " | " | " $OSi(C_2H_5)_3$ |
| (1767) | 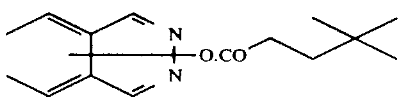 | " | " | " | " $OSi(CH_3)_3$ |

-continued
| | | | | | | |
|---|---|---|---|---|---|---|
| (1768) | 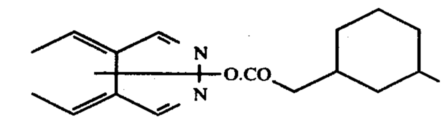 | " | " | " | " | $OSi(C_2H_5)_3$ |
| (1769) | 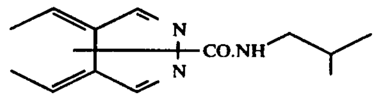 | " | " | " | " | $OSi(C_6H_{13})_3$ |
| (1770) | 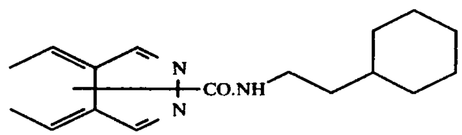 | " | " | " | " | $OSi(C_4H_9)_3$ |
| (1771) | 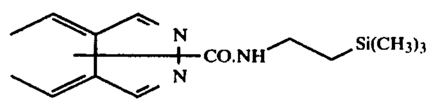 | $= A^1$ | $= A^1$ | $= A^1$ | Si | $OSi(C_2H_5)_3$ |
| (1772) | 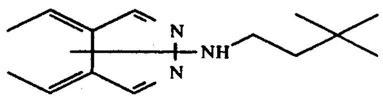 | " | " | " | " | $OSi(C_3H_7)_3$ |
| (1773) | 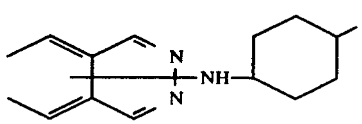 | " | " | " | " | $OSi(C_4H_9)_3$ |
| (1774) | 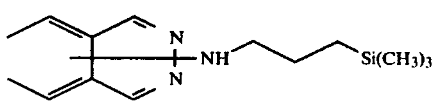 | " | " | " | " | $OSi(CH_3)_3$ |
| (1775) | 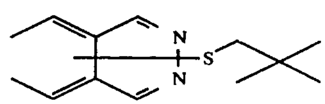 | " | " | " | " | $OSi(C_2H_5)_3$ |

-continued
| | | | | | |
|---|---|---|---|---|---|
| (1776) | 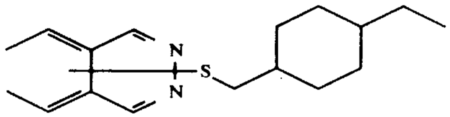 | " | " | " | " $OSi(C_3H_7)_3$ |
| (1777) | 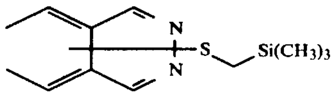 | " | " | " | " $OSi(C_2H_5)_3$ |
| (1778) | 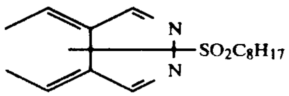 | " | " | " | " $OSi(C_4H_9)_3$ |
| (1779) | 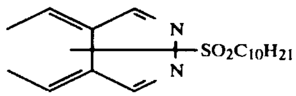 | " | " | " | " $OSi(C_3H_7)_3$ |
| (1780) | 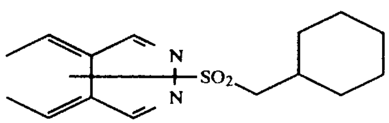 | " | " | " | " $OSi(C_6H_{13})_3$ |
| (1781) | 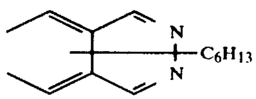 | $= A^1$ | $= A^1$ | $= A^1$ | Si<br>OSi 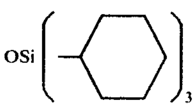 |
| (1782) | 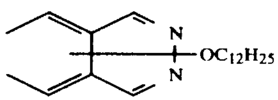 | " | " | " | "<br>$OSi(CH_3)_2$ 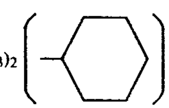 |
| (1783) | 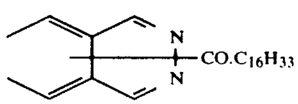 | " | " | " | " $OSi(CH_3)_2(t\text{-}C_4H_9)$ |

-continued
| | | | | | |
|---|---|---|---|---|---|
| (1784) | 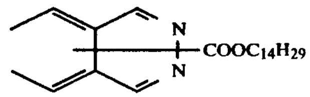 | " | " | " | " OSi 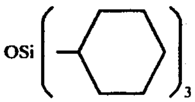 |
| (1785) | 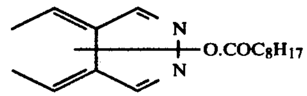 | " | " | " | " OSi 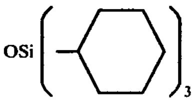 |
| (1786) | 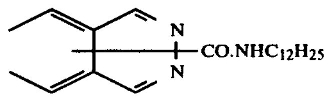 | " | " | " | " $OSi(CH_3)_2$ 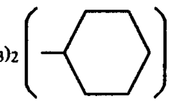 |
| (1787) | 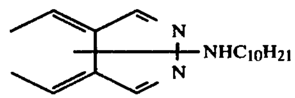 | " | " | " | " $OSi(CH_3)_2$ 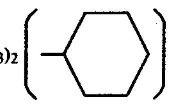 |
| (1788) | 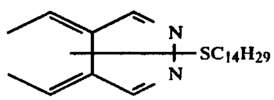 | " | " | " | " $OSi(CH_3)_2$ 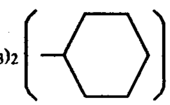 |
| (1789) | 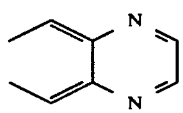 | " | " | " | " $OSi(C_6H_{13})_3$ |
| (1890) | " | " | " | " | " $OSi(C_4H_9)_3$ |
| (1791) | 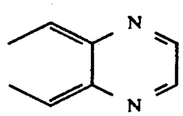 | $= A^1$ | $= A^1$ | $= A^1$ | Si $OSi(C_3H_7)_3$ |
| (1792) | " | " | " | " | " $OSi(C_2H_5)_3$ |
| (1793) | 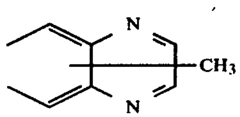 | " | " | " | " $OSi(C_6H_{13})_3$ |

-continued
| | | | | | | |
|---|---|---|---|---|---|---|
| (1794) | 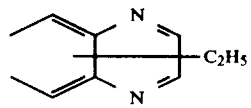 | " | " | " | " | $OSi(C_4H_9)_3$ |
| (1795) | 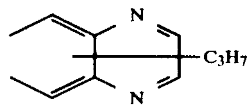 | " | " | " | " | $OSi(C_3H_7)_3$ |
| (1796) | 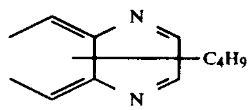 | " | " | " | " | $OSi(C_4H_9)_3$ |
| (1797) | 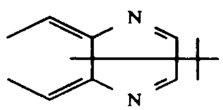 | " | " | " | " | $OSi(C_4H_9)_3$ |
| (1798) | " | " | " | " | " | $OSi(C_2H_5)_3$ |
| (1799) | 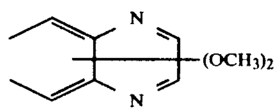 | " | " | " | " | $OSi(C_4H_9)_3$ |
| (1800) | 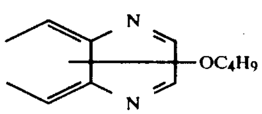 | " | " | " | " | $OSi(C_4H_9)_3$ |
| (1801) | 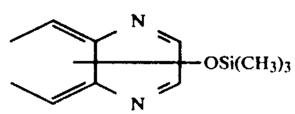 | $= A^1$ | $= A^1$ | $= A^1$ | Si | $OSi(C_4H_9)_3$ |
| (1802) | 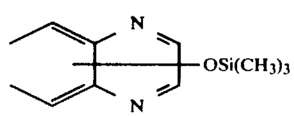 | " | " | " | " | $OSi(C_3H_7)_3$ |

-continued
| | | | | | |
|---|---|---|---|---|---|
| (1803) | 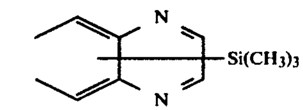 | " | " | " | " OSi($C_4H_9$)$_3$ |
| (1804) | 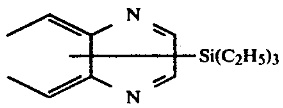 | " | " | " | " OSi($C_3H_7$)$_3$ |
| (1805) | 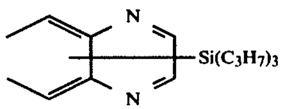 | " | " | " | " OSi($C_2H_5$)$_3$ |
| (1806) | 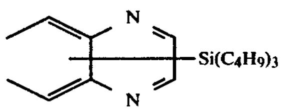 | " | " | " | " OSi($CH_3$)$_3$ |
| (1807) | 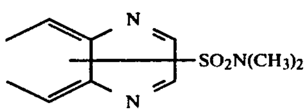 | " | " | " | " OSi($C_6H_{13}$)$_3$ |
| (1808) | 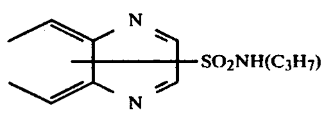 | " | " | " | " OSi($C_4H_9$)$_3$ |
| (1809) | 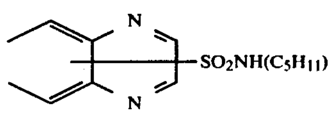 | " | " | " | " OSi($C_3H_7$)$_3$ |
| (1810) | 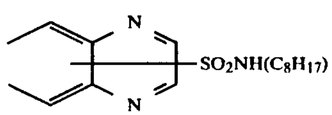 | " | " | " | " OSi($C_2H_5$)$_3$ |

-continued
| | | | | | | |
|---|---|---|---|---|---|---|
| (1811) | 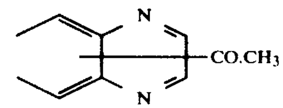 | = $A^1$ | = $A^1$ | = $A^1$ | Si | $OSi(C_6H_{13})_3$ |
| (1812) | 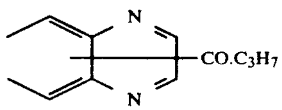 | " | " | " | " | $OSi(C_4H_9)_3$ |
| (1813) | 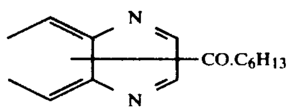 | " | " | " | " | $OSi(C_3H_7)_3$ |
| (1814) | 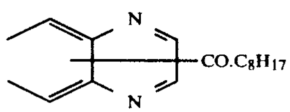 | " | " | " | " | $OSi(C_2H_5)_3$ |
| (1815) | 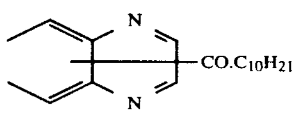 | " | " | " | " | $OSi(CH_3)_3$ |
| (1816) | 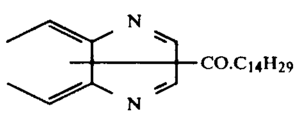 | " | " | " | " | $OSi(CH_3)_3$ |
| (1817) | 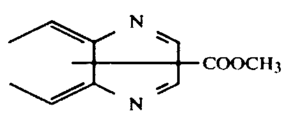 | " | " | " | " | $OSi(C_6H_{13})_3$ |
| (1818) | 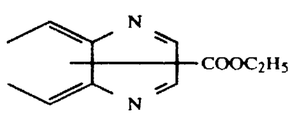 | " | " | " | " | $OSi(C_4H_9)_3$ |

-continued
| | | | | | |
|---|---|---|---|---|---|
| (1819) | 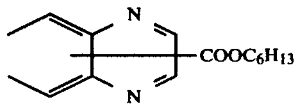 | " | " | " | " $OSi(C_3H_7)_3$ |
| (1820) | 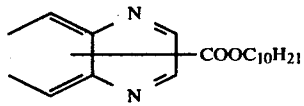 | " | " | " | " $OSi(C_2H_5)_3$ |
| (1821) | 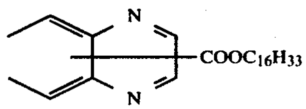 | $= A^1$ | $= A^1$ | $= A^1$ | Si $OSi(CH_3)_3$ |
| (1822) | 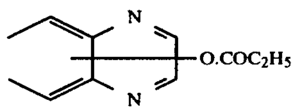 | " | " | " | " $OSi(C_6H_{13})_3$ |
| (1823) | 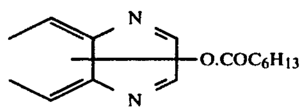 | " | " | " | " $OSi(C_4H_9)_3$ |
| (1824) | 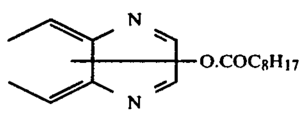 | " | " | " | " $OSi(C_3H_7)_3$ |
| (1825) | 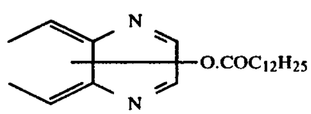 | " | " | " | " $OSi(C_2H_5)_3$ |
| (1826) | 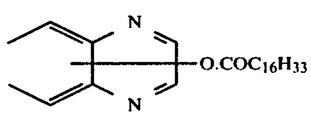 | " | " | " | " $OSi(CH_3)_3$ |
| (1827) | 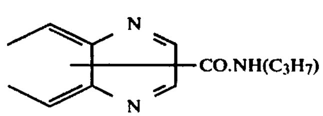 | " | " | " | " $OSi(C_6H_{13})_3$ |

| | | | | | |
|---|---|---|---|---|---|
| (1828) | 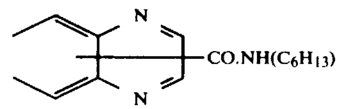 | " | " | " | " OSi($C_4H_9$)$_3$ |
| (1829) | 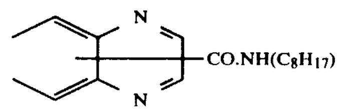 | " | " | " | " OSi($C_3H_7$)$_3$ |
| (1830) | 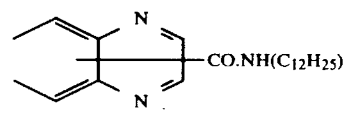 | " | " | " | " OSi($C_2H_5$)$_3$ |
| (1831) | 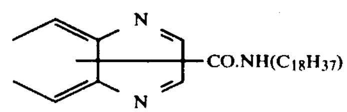 | $= A^1$ | $= A^1$ | $= A^1$ | Si OSi($CH_3$)$_3$ |
| (1832) | 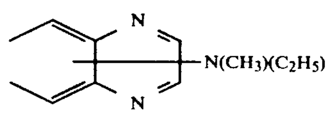 | " | " | " | " OSi($C_6H_{13}$)$_2$ |
| (1833) | 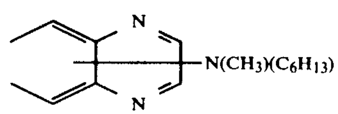 | " | " | " | " OSi($C_4H_9$)$_3$ |
| (1834) | 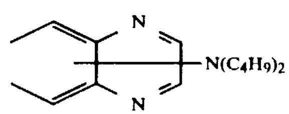 | " | " | " | " OSi($C_3H_7$)$_3$ |
| (1835) | 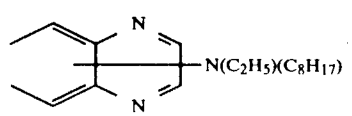 | " | " | " | " OSi($C_2H_5$)$_3$ |

-continued
| | | | | | | |
|---|---|---|---|---|---|---|
| (1836) | 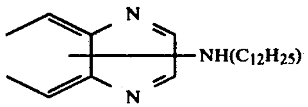 | " | " | " | " | $OSi(CH_3)_3$ |
| (1837) | 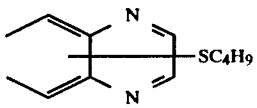 | " | " | " | " | $OSi(C_6H_{13})_3$ |
| (1838) | 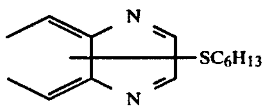 | " | " | " | " | $OSi(C_4H_9)_3$ |
| (1839) | 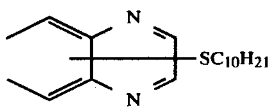 | " | " | " | " | $OSi(C_3H_7)_3$ |
| (1840) | 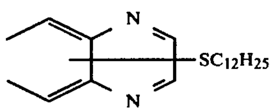 | " | " | " | " | $OSi(C_2H_5)_3$ |
| (1841) | 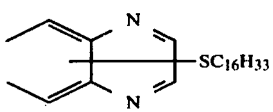 | $= A^1$ | $= A^1$ | $= A^1$ | Si | $OSi(CH_3)_3$ |
| (1842) | 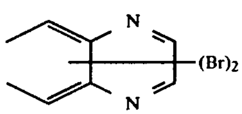 | " | " | " | " | $OSi(C_6H_{13})_3$ |
| (1843) | 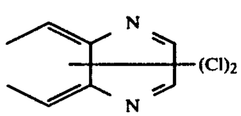 | " | " | " | " | $OSi(C_6H_{13})_3$ |

-continued
| | | | | | | |
|---|---|---|---|---|---|---|
| (1844) | 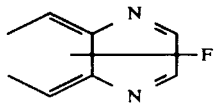 | " | " | " | " | $OSi(C_3H_7)_3$ |
| (1845) | 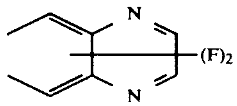 | " | " | " | " | $OSi(C_2H_5)_3$ |
| (1846) | 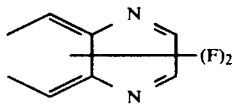 | " | " | " | " | $OSi(CH_3)_3$ |
| (1847) | 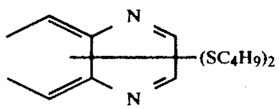 | " | " | " | " | $OSi(C_2H_5)_3$ |
| (1848) | 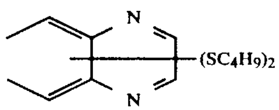 | " | " | " | " | $OSi(C_4H_9)_3$ |
| (1849) | 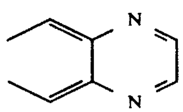 | " | " | " | Ge | $OSi(C_4H_9)_3$ |
| (1850) | " | " | " | " | " | $OSi(C_2H_5)_3$ |
| (1851) | 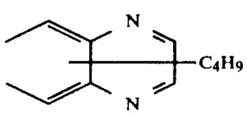 | $= A^1$ | $= A^1$ | $= A^1$ | Ge | $OC_8H_{17}$ |
| (1852) | 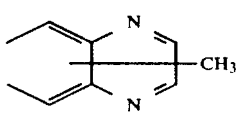 | " | " | " | " | $OSi(C_6H_{13})_3$ |

-continued
| | | | | | |
|---|---|---|---|---|---|
| (1853) | 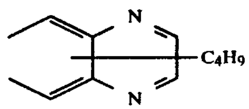  | " | " | " | " $OSi(C_4H_9)_3$ |
| (1854) | 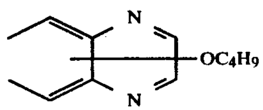  | " | " | " | " $OC_8H_{17}$ |
| (1855) | 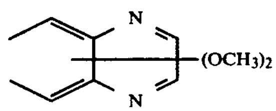  | " | " | " | " $OSi(C_4H_9)_3$ |
| (1856) | 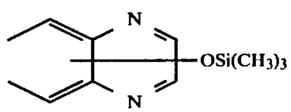  | " | " | " | " $OSi(C_2H_5)_3$ |
| (1857) | 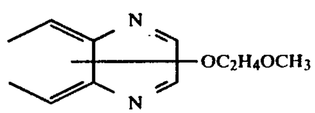  | " | " | " | " $OSi(C_4H_9)_3$ |
| (1858) | 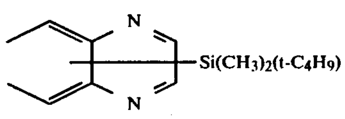  | " | " | " | " $OSi(C_4H_9)_3$ |
| (1859) | 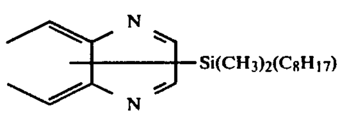  | " | " | " | " $OSi(C_2H_5)_3$ |
| (1860) | 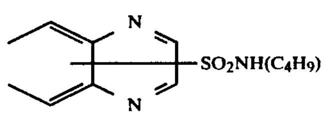  | " | " | " | " $OSi(C_4H_9)_3$ |

-continued
| | | | | | |
|---|---|---|---|---|---|
| (1861) | 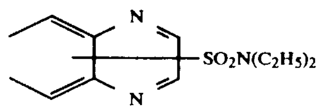 | = $A^1$ | = $A^1$ | = $A^1$ | Ge $OSi(C_4H_9)_3$ |
| (1862) | 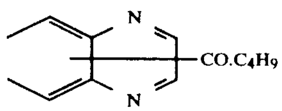 | " | " | " | " " |
| (1863) | 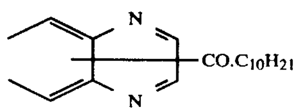 | " | " | " | " $OSi(C_2H_5)_3$ |
| (1864) | 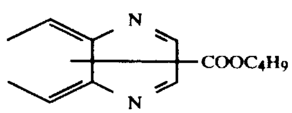 | " | " | " | " $OSi(C_4H_9)_3$ |
| (1865) | 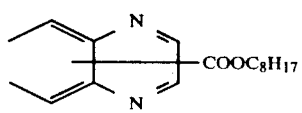 | " | " | " | " $OSi(C_2H_5)_3$ |
| (1866) | 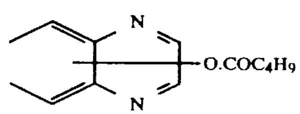 | " | " | " | " $OSi(C_4H_9)_3$ |
| (1867) | 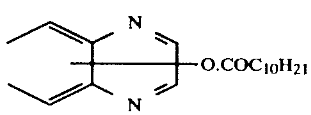 | " | " | " | " $OSi(C_2H_5)_3$ |
| (1868) | 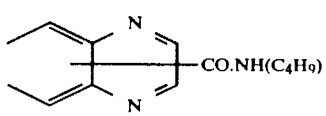 | " | " | " | " $OSi(C_4H_9)_3$ |

-continued
| | | | | | |
|---|---|---|---|---|---|
| (1869) | 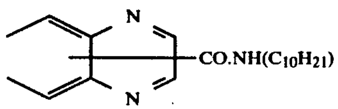 | " | " | " | " $OSi(C_2H_5)_3$ |
| (1870) | 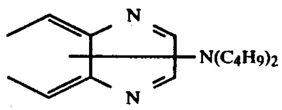 | " | " | " | " $OSi(C_4H_9)_3$ |
| (1871) | 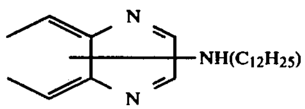 | $= A^1$ | $= A^1$ | $= A^1$ | Ge $OSi(C_2H_5)_3$ |
| (1872) | 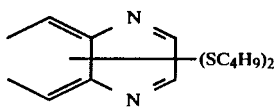 | " | " | " | " $OSi(C_2H_5)_3$ |
| (1873) | 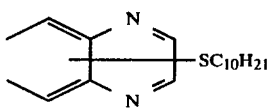 | " | " | " | " " |
| (1874) | 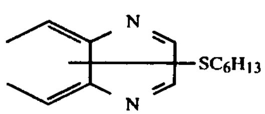 | " | " | " | " $OSi(C_4H_9)_3$ |
| (1875) | 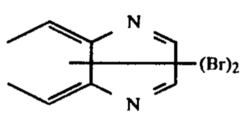 | " | " | " | " $OSi(C_6H_{13})_3$ |
| (1876) | 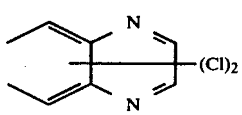 | " | " | " | " " |

-continued
| | | | | | |
|---|---|---|---|---|---|
| (1877) | 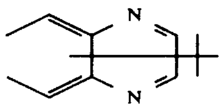 | " | " | " | " $OSi(C_2H_5)_3$ |
| (1878) | 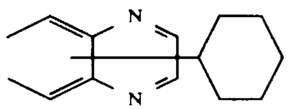 | " | " | " | " " |
| (1879) | 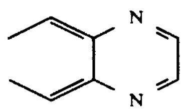 | " | " | " | Sn $OSi(C_4H_9)_3$ |
| (1880) | 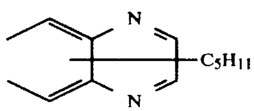 | " | " | " | " $OSi(C_4H_9)_3$ |
| (1881) | 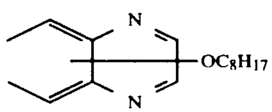 | $= A^1$ | $= A^1$ | $= A^1$ | Sn $OSi(C_2H_5)_3$ |
| (1882) | 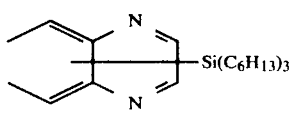 | " | " | " | " " |
| (1883) | 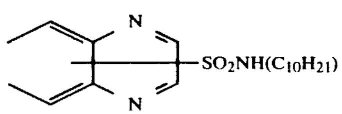 | " | " | " | " $OSi(C_4H_9)_3$ |
| (1884) | 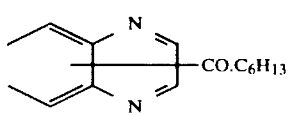 | " | " | " | " " |

-continued
| | | | | | | |
|---|---|---|---|---|---|---|
| (1885) | 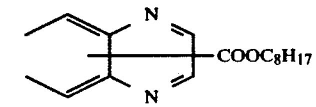 | " | " | " | " | $OSi(C_2H_5)_3$ |
| (1886) | 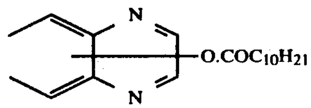 | " | " | " | " | " |
| (1887) | 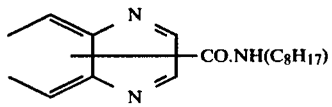 | " | " | " | " | $OSi(C_4H_9)_3$ |
| (1888) | 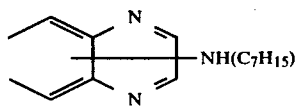 | " | " | " | " | " |
| (1889) | 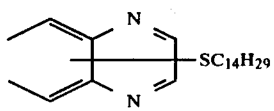 | " | " | " | " | $OSi(C_2H_5)_3$ |
| (1890) | 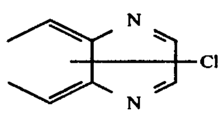 | " | " | " | " | " |
| (1891) | 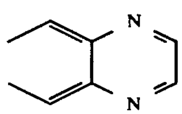 | $= A^1$ | $= A^1$ | $= A^1$ | Si | $OSi(CH_3)_2(OC_2H_4OCH_3)$ |
| (1892) | " | " | " | " | " | $OSi(CH_3)_2(OC_2H_4OCOCH_3)$ |
| (1893) | 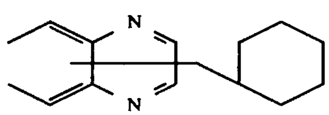 | " | " | " | " | $OSi(C_3H_7)_3$ |

-continued
| | | | | | |
|---|---|---|---|---|---|
| (1894) | 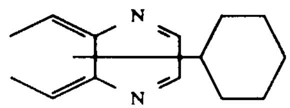 | " | " | " | " $OSi(C_2H_5)_3$ |
| (1895) | 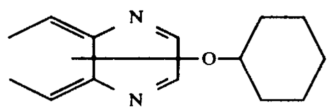 | " | " | " | " $OSi(C_6H_{13})_3$ |
| (1896) | 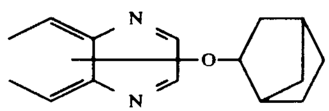 | " | " | " | " $OSi(C_4H_9)_3$ |
| (1897) | 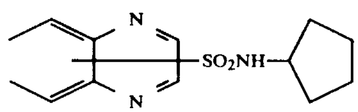 | " | " | " | " $OSi(C_3H_7)_3$ |
| (1898) | 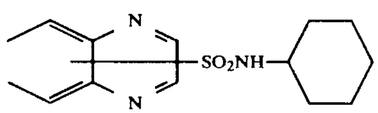 | " | " | " | " $OSi(C_2H_5)_3$ |
| (1899) | 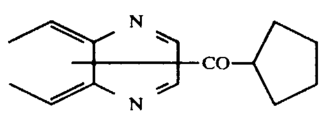 | " | " | " | " $OSi(C_6H_{13})_3$ |
| (1900) | 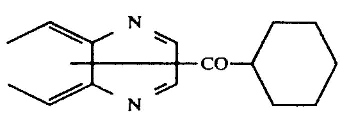 | " | " | " | " $OSi(C_4H_9)_3$ |
| (1901) | 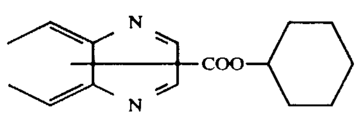 | $= A^1$ | $= A^1$ | $= A^1$ | Si $OSi(C_3H_7)_3$ |

-continued
| | | | | | | |
|---|---|---|---|---|---|---|
| (1902) | 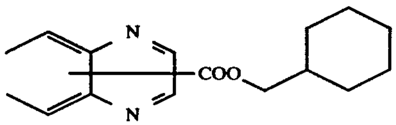 | " | " | " | " | $OSi(C_2H_5)_3$ |
| (1903) | 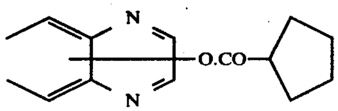 | " | " | " | " | $OSi(C_4H_9)_3$ |
| (1904) | 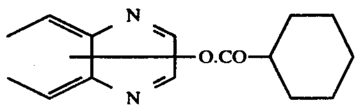 | " | " | " | " | $OSi(C_3H_7)_3$ |
| (1905) | 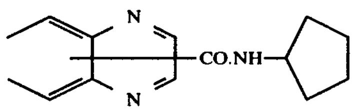 | " | " | " | " | $OSi(C_6H_{13})_3$ |
| (1906) | 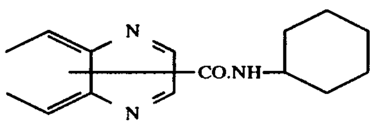 | " | " | " | " | $OSi(C_4H_9)_3$ |
| (1907) | 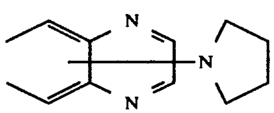 | " | " | " | " | " |
| (1908) | 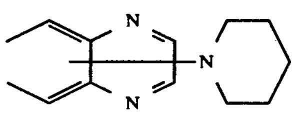 | " | " | " | " | $OSi(C_3H_7)_3$ |
| (1909) | 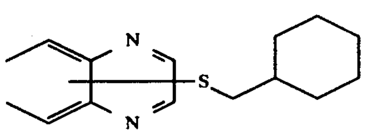 | " | " | " | " | $OSi(C_2H_5)_3$ |

-continued
| | | | | | |
|---|---|---|---|---|---|
| (1910) | 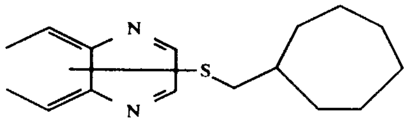 | " | " | " | " $OSi(CH_3)_3$ |
| (1911) | 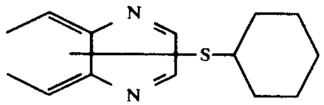 | $= A^1$ | $= A^1$ | $= A^1$ | Si $OSi(C_6H_{13})_3$ |
| (1912) | 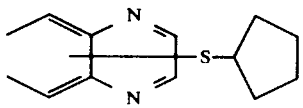 | " | " | " | " $OSi(C_4H_9)_3$ |
| (1913) | 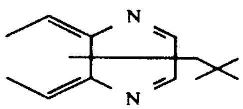 | " | " | " | " " |
| (1914) | 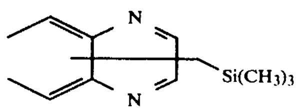 | " | " | " | " $OSi(C_3H_7)_3$ |
| (1915) | 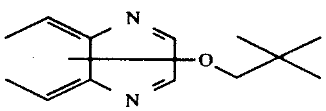 | " | " | " | " $OSi(C_2H_5)_3$ |
| (1916) | 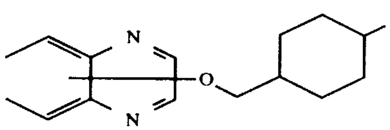 | " | " | " | " " |
| (1917) | 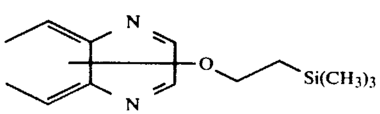 | " | " | " | " $OSi(C_2H_5)_3$ |

-continued
| | | | | | |
|---|---|---|---|---|---|
| (1918) | 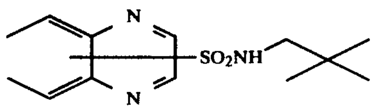 | " | " | " | " $OSi(C_6H_{13})_3$ |
| (1919) | 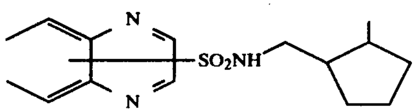 | " | " | " | " $OSi(C_6H_{13})_3$ |
| (1920) | 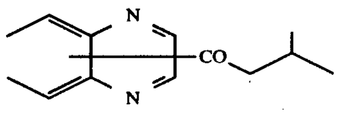 | " | " | " | " $OSi(C_4H_9)_3$ |
| (1921) | 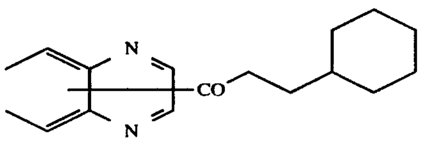 | $= A^1$ | $= A^1$ | $= A^1$ | Si $OSi(C_3H_7)_3$ |
| (1922) | 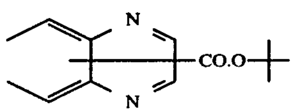 | " | " | " | " $OSi(C_4H_9)_3$ |
| (1923) | 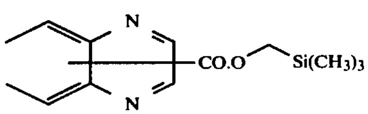 | " | " | " | " $OSi(C_2H_5)_3$ |
| (1924) | 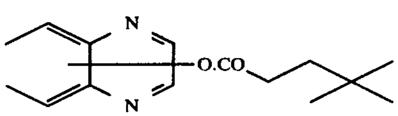 | " | " | " | " $OSi(CH_3)_3$ |
| (1925) | 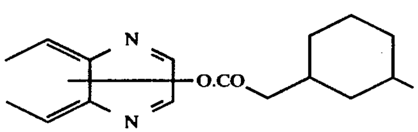 | " | " | " | " $OSi(C_2H_5)_3$ |

-continued
| | | | | | |
|---|---|---|---|---|---|
| (1926) | 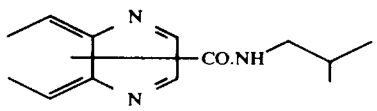 | " | " | " | " $OSi(C_6H_{13})_3$ |
| (1927) | 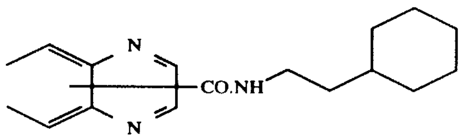 | " | " | " | " $OSi(C_4H_9)_3$ |
| (1928) | 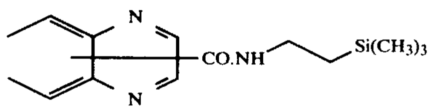 | " | " | " | " $OSi(C_2H_5)_3$ |
| (1929) | 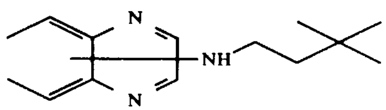 | " | " | " | " $OSi(C_3H_7)_3$ |
| (1930) | 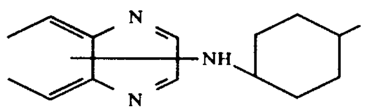 | " | " | " | " $OSi(C_4H_9)_3$ |
| (1931) | 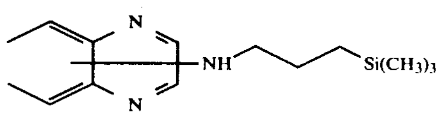 | $= A^1$ | $= A^1$ | $= A^1$ | Si $OSi(CH_3)_3$ |
| (1932) | 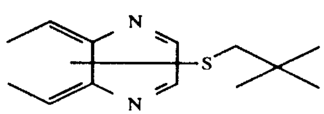 | " | " | " | " $OSi(C_2H_5)_3$ |
| (1933) | 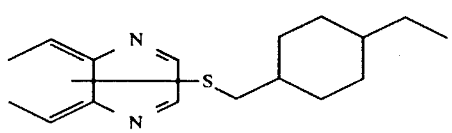 | " | " | " | " $OSi(C_3H_7)_3$ |

-continued
| | | | | | |
|---|---|---|---|---|---|
| (1934) | 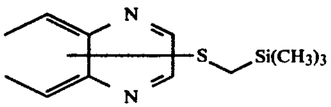 | " | " | " | " $OSi(C_2H_5)_3$ |
| (1935) | 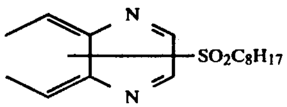 | " | " | " | " $OSi(C_4H_9)_3$ |
| (1936) | 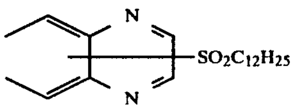 | " | " | " | " $OSi(C_3H_7)_3$ |
| (1937) | 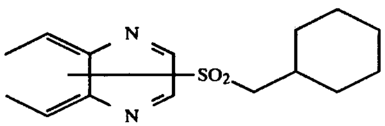 | " | " | " | " $OSi(C_6H_{13})_3$ |
| (1938) | 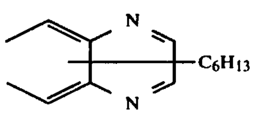 | " | " | " | " OSi 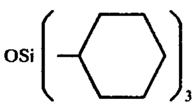 |
| (1939) | 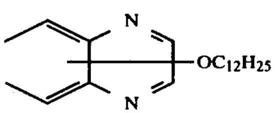 | " | " | " | " $OSi(CH_3)_3$ |
| (1940) | 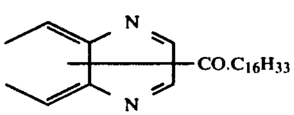 | " | " | " | " $OSi(CH_3)_2(t\text{-}C_4H_9)$ |
| (1941) | 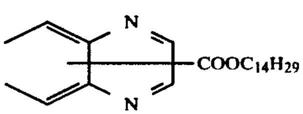 | $= A^1$ | $= A^1$ | $= A^1$ | Si OSi 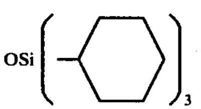 |

-continued
| | | | | | | |
|---|---|---|---|---|---|---|
| (1942) | 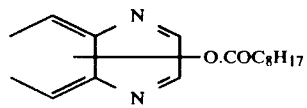 | " | " | " | " | OSi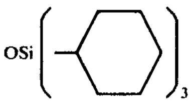 |
| (1943) | 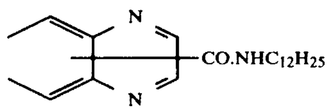 | " | " | " | " | $OSi(CH_3)_2$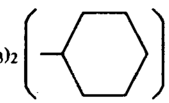 |
| (1944) | 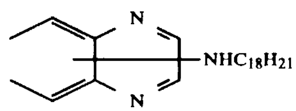 | " | " | " | " | $OSi(CH_3)_2$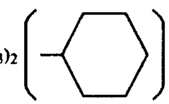 |
| (1945) | 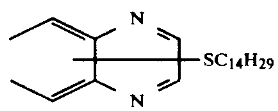 | " | " | " | " | $OSi(CH_3)_2$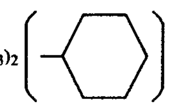 |
| (1946) | 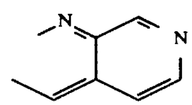 | " | " | " | " | $OSi(C_6H_{13})_3$ |
| (1947) | " | " | " | " | " | $OSi(C_4H_9)_3$ |
| (1948) | " | " | " | " | " | $OSi(C_3H_7)_3$ |
| (1949) | " | " | " | " | " | $OSi(C_2H_5)_3$ |
| (1950) | " | " | " | " | " | $OSi(CH_3)_2(C_{18}H_{37})$ |
| (1951) | 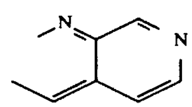 | $= A^1$ | $= A^1$ | $= A^1$ | Si | $OSi(CH_3)_2(t\text{-}C_4H_9)$ |
| (1952) | " | " | " | " | " | $OSi(CH_3)_2(OC_8H_{17})$ |
| (1953) | " | " | " | " | " | $OSi(CH_3)_2(OC_{18}H_{21})$ |
| (1954) | " | " | " | " | " | $OSi(CH_3)_2(OC_{12}H_{25})$ |
| (1955) | " | " | " | " | " | $OSi(CH_3)_2(OC_{14}H_{29})$ |
| (1956) | " | " | " | " | " | $OSi(CH_3)_2(OC_6H_5)$ |
| (1957) | " | " | " | " | " | $OSi(OCH_3)_3$ |
| (1958) | " | " | " | " | " | $OSi(C_6H_5)_3$ |
| (1959) | " | " | " | " | " | $OSi(CH_3)_2(C_6H_5)$ |
| (1960) | " | " | " | " | " | $OSi(OC_6H_5)_3$ |

-continued
| | | | | | |
|---|---|---|---|---|---|
| (1961) | 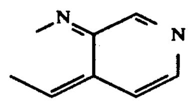 | = $A^1$ | = $A^1$ | = $A^1$ | Si $OSi(OC_6H_{13})_3$ |
| (1962) | 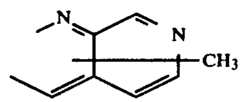 | " | " | " | " $OSi(C_6H_{13})_3$ |
| (1963) | 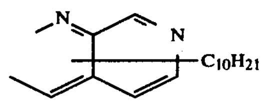 | 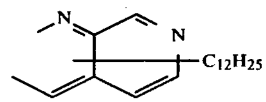 | 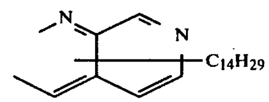 | 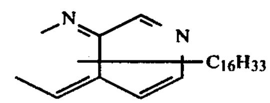 | " $OC(C_6H_{13})_3$ |
| (1964) | 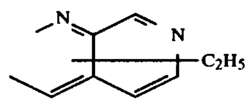 | = $A^1$ | = $A^1$ | = $A^1$ | " $OSi(C_6H_5)_3$ |
| (1965) | 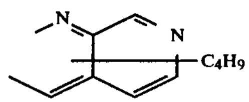 | " | " | " | " $OSi(CH_3)_2(OC_{18}H_{37})$ |
| (1966) | 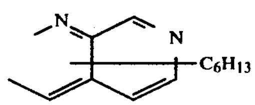 | " | " | " | " $OSi(CH_3)_2(C_6H_5)$ |
| (1967) | 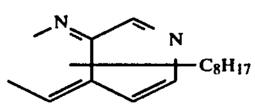 | " | " | " | " $OSi(C_6H_5)_3$ |
| (1968) | 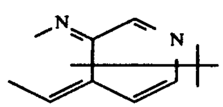 | " | " | " | " $OSi(CH_3)_2(OC_6H_5)$ |
| (1969) | 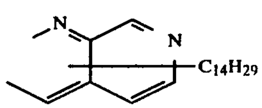 | " | " | " | " $OC(C_3H_7)_3$ |

-continued
| | | | | | |
|---|---|---|---|---|---|
| (1970) | 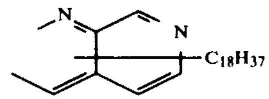 | " | " | " | " $OC_{18}H_{37}$ |
| (1971) | 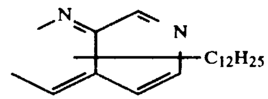 | $=A^1$ | $=A^1$ | $=A^1$ | Si $OC(C_6H_5)_3$ |
| (1972) | 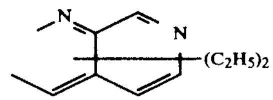 | " | " | " | " $OSi(C_6H_{13})_3$ |
| (1973) | 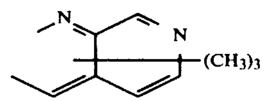 | " | " | " | " $OSi(C_3H_7)_3$ |
| (1974) | 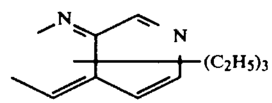 | " | " | " | " $OSi(C_2H_5)_3$ |
| (1975) | 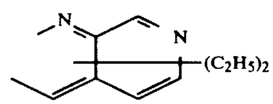 | " | " | " | " $OSi(CH_3)_2(C_8H_{17})$ |
| (1976) | 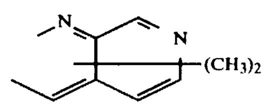 | " | " | " | " $OSi(CH_3)_2(OC_{18}H_{37})$ |
| (1977) | 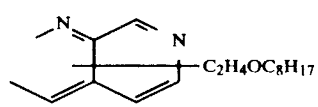 | " | " | " | " $OSi(C_2H_5)_3$ |
| (1978) | 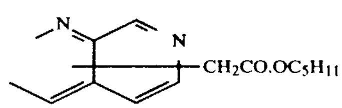 | " | " | " | " $OSi(C_3H_7)_3$ |

-continued
| | | | | | | |
|---|---|---|---|---|---|---|
| (1979) | 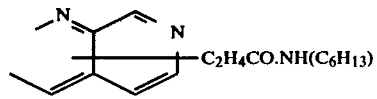 | ″ | ″ | ″ | ″ | $OSi(C_2H_5)_3$ |
| (1980) | 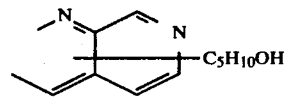 | ″ | ″ | ″ | ″ | $OSi(C_2H_5)_3$ |
| (1981) | 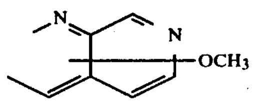 | $= A^1$ | $= A^1$ | $= A^1$ | Si | $OSi(C_6H_{13})_3$ |
| (1982) | 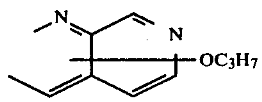 | ″ | ″ | ″ | ″ | $OSi(C_4H_9)_3$ |
| (1683) | 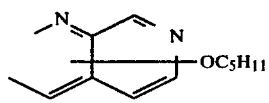 | ″ | ″ | ″ | ″ | $OSi(C_2H_5)_3$ |
| (1984) | 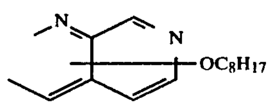 | ″ | ″ | ″ | ″ | $OSi(C_3H_7)_3$ |
| (1985) | 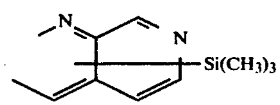 | ″ | ″ | ″ | ″ | $OSi(C_4H_9)_3$ |
| (1986) | 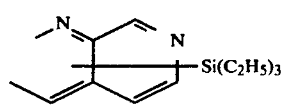 | ″ | ″ | ″ | ″ | $OSi(C_3H_7)_3$ |
| (1987) | 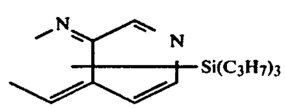 | ″ | ″ | ″ | ″ | $OSi(C_2H_5)_3$ |

-continued
| | | | | | |
|---|---|---|---|---|---|
| (1988) | 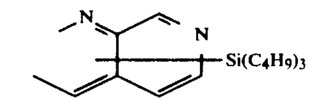 | " | " | " | " $OSi(CH_3)_3$ |
| (1989) | 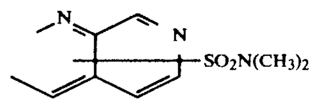 | " | " | " | " $OSi(C_6H_{13})_3$ |
| (1990) | 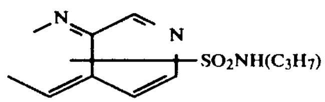 | " | " | " | " $OSi(C_4H_9)_3$ |
| (1991) | 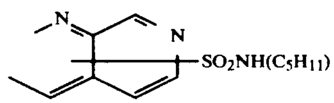 | $= A^1$ | $= A^1$ | $= A^1$ | Si $OSi(C_3H_7)_3$ |
| (1992) | 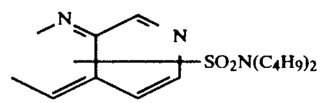 | " | " | " | " $OSi(C_4H_9)_3$ |
| (1993) | 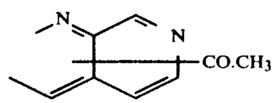 | " | " | " | " $OSi(C_6H_{13})_3$ |
| (1994) | 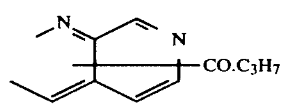 | " | " | " | " $OSi(C_4H_9)_3$ |
| (1995) | 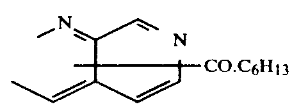 | " | " | " | " $OSi(C_3H_7)_3$ |
| (1996) | 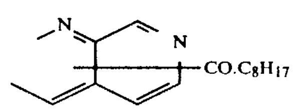 | " | " | " | " $OSi(C_2H_5)_3$ |

-continued
| | | | | | |
|---|---|---|---|---|---|
| (1997) | 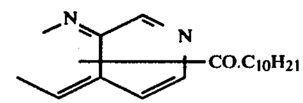 | " | " | " | " $OSi(CH_3)_3$ |
| (1998) | 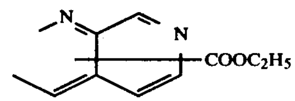 | " | " | " | " $OSi(C_4H_9)_3$ |
| (1999) | 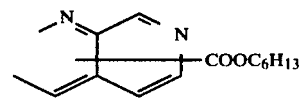 | " | " | " | " $OSi(C_3H_7)_3$ |
| (2000) | 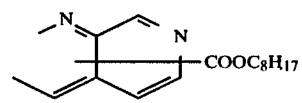 | " | " | " | " $OSi(C_4H_9)_3$ |
| (2001) | 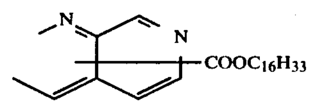 | $= A^1$ | $= A^1$ | $= A^1$ | Si $OSi(CH_3)_3$ |
| (2002) | 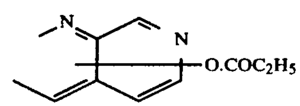 | " | " | " | " $OSi(C_6H_{13})_3$ |
| (2003) | 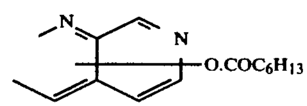 | " | " | " | " $OSi(C_4H_9)_3$ |
| (2004) | 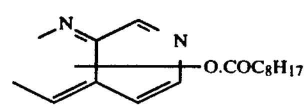 | " | " | " | " $OSi(C_3H_7)_3$ |
| (2005) | 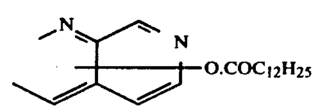 | " | " | " | " $OSi(C_2H_5)_3$ |

-continued
| | | | | | |
|---|---|---|---|---|---|
| (2006) | 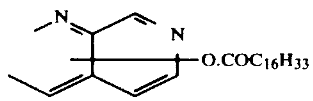 | " | " | " | " OSi(CH3)3 |
| (2007) | 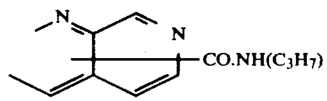 | " | " | " | " OSi(C6H13)3 |
| (2008) | 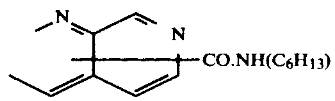 | " | " | " | " " |
| (2009) | 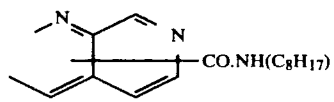 | " | " | " | " OSi(C3H7)3 |
| (2010) | 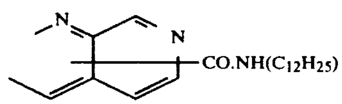 | " | " | " | " OSi(C2H5)3 |
| (2011) | 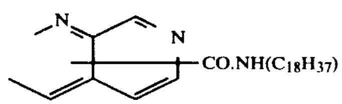 | = A[1] | = A[1] | = A[1] | Si OSi(CH3)3 |
| (2012) | 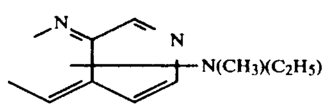 | " | " | " | " OSi(C6H13)3 |
| (2013) | 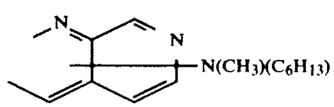 | " | " | " | " OSi(C4H9)3 |
| (2014) | 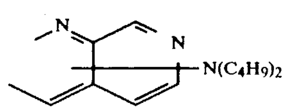 | " | " | " | " OSi(C6H13)3 |

-continued
| | | | | | | |
|---|---|---|---|---|---|---|
| (2015) | 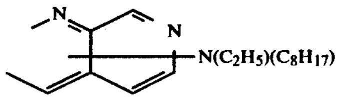 | " | " | " | " | $OSi(C_2H_5)_3$ |
| (2016) | 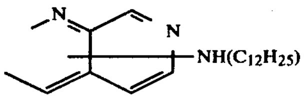 | " | " | " | " | $OSi(CH_3)_3$ |
| (2017) | 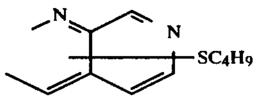 | " | " | " | " | $OSi(C_6H_{13})_3$ |
| (2018) | 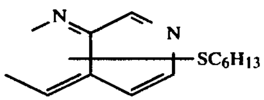 | " | " | " | " | $OSi(C_4H_9)_3$ |
| (2019) | 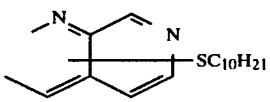 | " | " | " | " | $OSi(C_4H_9)_3$ |
| (2020) | 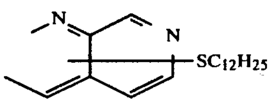 | " | " | " | " | $OSi(C_2H_5)_3$ |
| (2021) | 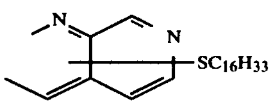 | $= A^1$ | $= A^1$ | $= A^1$ | Si | $OSi(CH_3)_3$ |
| (2022) | 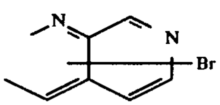 | " | " | " | " | $OSi(C_4H_9)_3$ |
| (2023) | 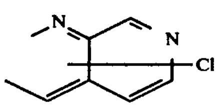 | " | " | " | " | $OSi(C_6H_{13})_3$ |

-continued
| | | | | | | |
|---|---|---|---|---|---|---|
| (2024) | 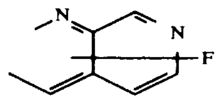 | " | " | " | " | $OSi(C_3H_7)_3$ |
| (2025) | 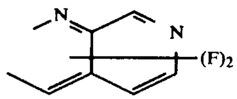 | " | " | " | " | $OSi(C_2H_5)_3$ |
| (2026) | 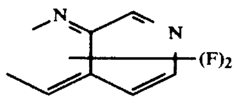 | " | " | " | " | $OSi(CH_3)_3$ |
| (2027) | 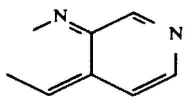 | " | " | " | Ge | $OSi(C_4H_9)_3$ |
| (2028) | " | " | " | " | " | $OSi(C_2H_5)_3$ |
| (2029) | " | " | " | " | " | $OSi(C_6H_5)_3$ |
| (2030) | 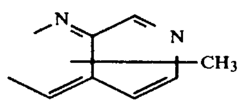 | " | " | " | " | $OSi(C_2H_5)_3$ |
| (2031) | 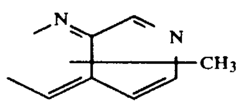 | $= A^1$ | $= A^1$ | $= A^1$ | Ge | $OSi(C_4H_9)_3$ |
| (2032) | " | " | " | " | " | $OC_{10}H_{21}$ |
| (2033) | " | " | " | " | " | $OC_{14}H_{29}$ |
| (2034) | 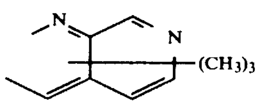 | " | " | " | " | $OSi(C_2H_5)_3$ |
| (2035) | 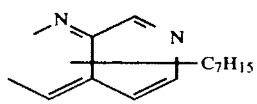 | " | " | " | " | $OSi(C_4H_9)_3$ |

-continued
| | | | | | |
|---|---|---|---|---|---|
| (2036) | 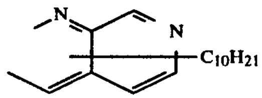 | " | " | " | " $OC(C_6H_5)_3$ |
| (2037) | 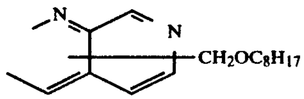 | " | " | " | " $OSi(C_4H_9)_3$ |
| (2038) | 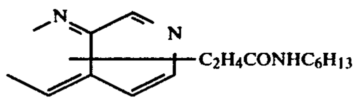 | " | " | " | " $OSi(C_2H_5)_3$ |
| (2039) | 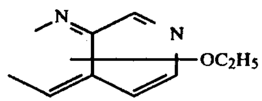 | " | " | " | " $OSi(C_6H_{13})_3$ |
| (2040) | 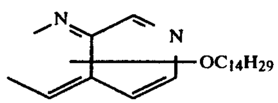 | " | " | " | " $OSi(C_4H_9)_3$ |
| (2041) | 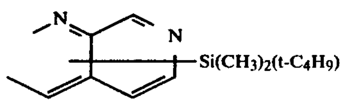 | $= A^1$ | $= A^1$ | $= A^1$ | Ge $OSi(C_4H_9)_3$ |
| (2042) | 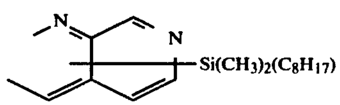 | " | " | " | " $OSi(C_2H_5)_3$ |
| (2043) | 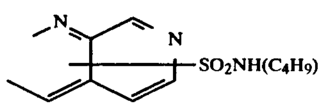 | " | " | " | " $OSi(C_4H_9)_3$ |
| (2044) | 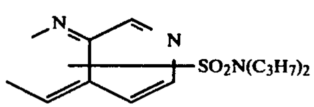 | " | " | " | " $OSi(CH_3)_2(C_8H_{17})$ |

-continued
| | | | | | |
|---|---|---|---|---|---|
| (2045) | 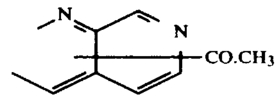 | " | " | " | " $OSi(C_6H_{13})_3$ |
| (2046) | 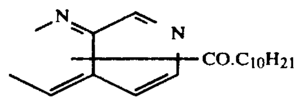 | " | " | " | " $OSi(C_2H_5)_3$ |
| (2047) | 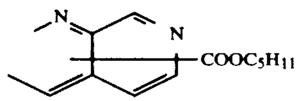 | " | " | " | " $OSi(C_2H_5)_3$ |
| (2048) | 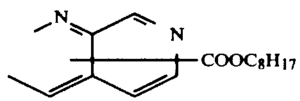 | " | " | " | " " |
| (2049) | 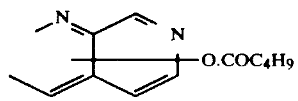 | " | " | " | " $OSi(C_4H_9)_3$ |
| (2050) | 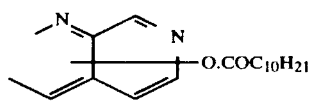 | " | " | " | " $OSi(C_2H_5)_3$ |
| (2051) | 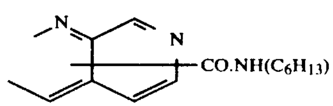 | $=A^1$ | $=A^1$ | $=A^1$ | Ge $OSi(C_4H_9)_3$ |
| (2052) | 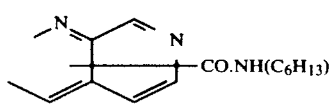 | " | " | " | " $OSi(C_2H_5)_3$ |
| (2053) | 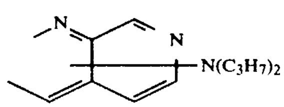 | " | " | " | " $OSi(CH_3)_2(t\text{-}C_4H_9)$ |

-continued
| | | | | | | |
|---|---|---|---|---|---|---|
| (2054) | 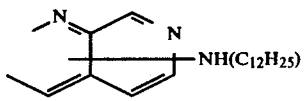 | " | " | " | " | $OSi(C_2H_5)_3$ |
| (2055) | 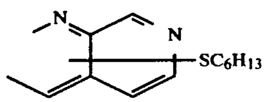 | " | " | " | " | $OSi(C_4H_9)_3$ |
| (2056) | 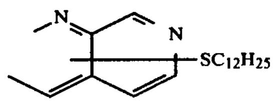 | " | " | " | " | $OSi(C_3H_7)_3$ |
| (2057) | 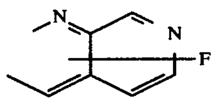 | " | " | " | " | $OSi(C_6H_{13})_3$ |
| (2058) | 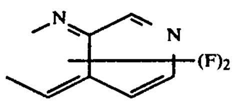 | " | " | " | " | $OSi(C_2H_5)_3$ |
| (2059) | 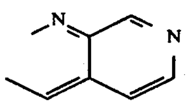 | " | " | " | Sn | $OSi(C_2H_5)_3$ |
| (2060) | " | " | " | " | " | $OSi(C_6H_5)_3$ |
| (2061) | 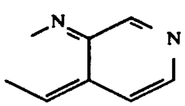 | $= A^1$ | $= A^1$ | $= A^1$ | Sn | $OSi(C_4H_9)_3$ |
| (2062) | 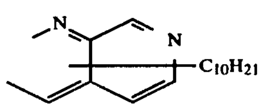 | " | " | " | " | $OSi(C_2H_5)_3$ |

-continued
| | | | | | |
|---|---|---|---|---|---|
| (2063) | 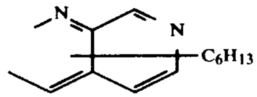 | " | " | " | " OSi($C_4H_9)_3$ |
| (2064) | 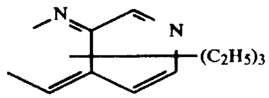 | " | " | " | " $OC_{18}H_{37}$ |
| (2065) | 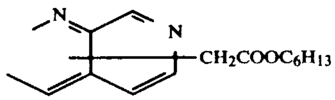 | " | " | " | " OSi($C_4H_9)_3$ |
| (2066) | 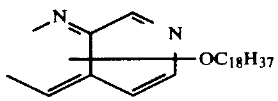 | " | " | " | " OSi($C_2H_5)_3$ |
| (2067) | 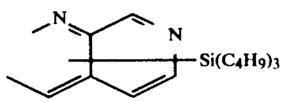 | " | " | " | " OSi($C_3H_7)_3$ |
| (2068) | 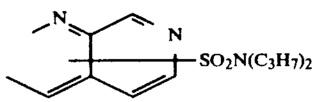 | " | " | " | " OSi($C_6H_{13})_3$ |
| (2069) | 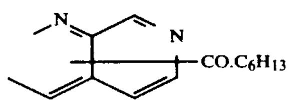 | " | " | " | " OSi($C_4H_9)_3$ |
| (2070) | 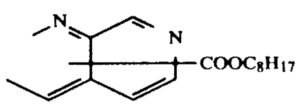 | " | " | " | " OSi($C_4H_9)_3$ |
| (2071) | 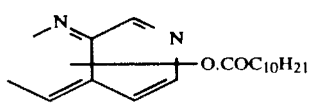 | = $A^1$ | = $A^1$ | = $A^1$ | Ge OSi($C_2H_5)_3$ |

-continued
| | | | | | | |
|---|---|---|---|---|---|---|
| (2072) | 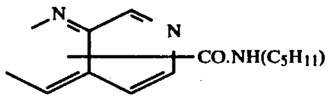 | " | " | " | " | $OSi(C_6H_{13})_3$ |
| (2073) | 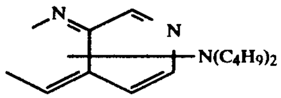 | " | " | " | " | $OSi(C_6H_5)_3$ |
| (2074) | 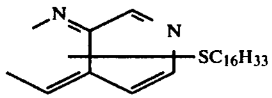 | " | " | " | " | $OSi(C_2H_5)_3$ |
| (2075) | 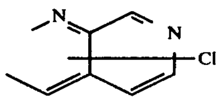 | " | " | " | " | $OSi(C_4H_9)_3$ |
| (2076) | 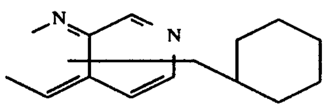 | " | " | " | " | $OSi(C_3H_7)_3$ |
| (2077) | 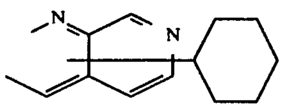 | " | " | " | " | $OSi(C_2H_5)_3$ |
| (2078) | 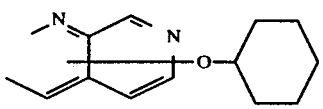 | " | " | " | " | $OSi(C_6H_{13})_3$ |
| (2079) | 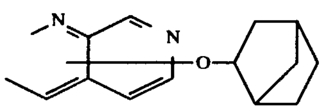 | " | " | " | " | $OSi(C_4H_9)_3$ |
| (2080) | 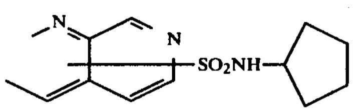 | " | " | " | " | $OSi(C_3H_7)_3$ |

-continued
| | | | | | |
|---|---|---|---|---|---|
| (2081) | 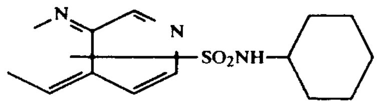 | $= A^1$ | $= A^1$ | $= A^1$ | Si $OSi(C_2H_5)_3$ |
| (2082) | 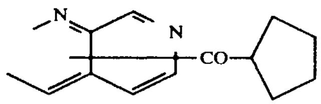 | " | " | " | " $OSi(C_6H_{13})_3$ |
| (2083) | 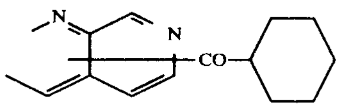 | " | " | " | " $OSi(C_4H_9)_3$ |
| (2084) | 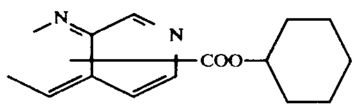 | " | " | " | " $OSi(C_3H_7)_3$ |
| (2085) | 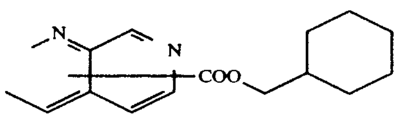 | " | " | " | " $OSi(C_2H_5)_3$ |
| (2086) | 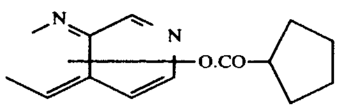 | " | " | " | " $OSi(C_4H_9)_3$ |
| (2087) | 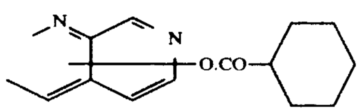 | " | " | " | " $OSi(C_3H_7)_3$ |
| (2088) | 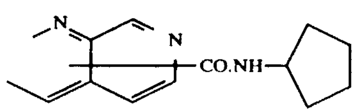 | " | " | " | " $OSi(C_6H_{13})_3$ |

-continued
| | | | | | | |
|---|---|---|---|---|---|---|
| (2089) | 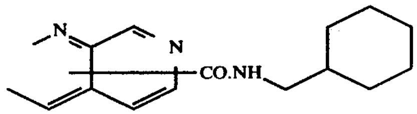 | " | " | " | " | OSi(C$_4$H$_9$)$_3$ |
| (2090) | 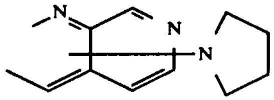 | " | " | " | " | " |
| (2091) | 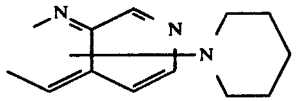 | = A[1] | = A[1] | = A[1] | Si | OSi(C$_3$H$_7$)$_3$ |
| (2092) | 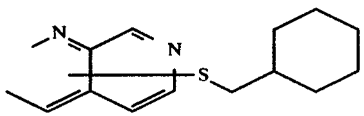 | " | " | " | " | OSi(C$_2$H$_5$)$_3$ |
| (2093) | 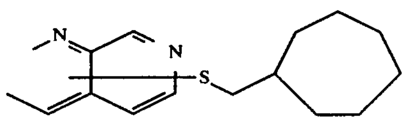 | " | " | " | " | OSi(CH$_3$)$_3$ |
| (2094) | 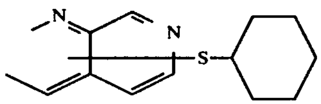 | " | " | " | " | OSi(C$_6$H$_{13}$)$_3$ |
| (2095) | 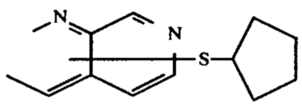 | " | " | " | " | OSi(C$_4$H$_9$)$_3$ |
| (2096) | 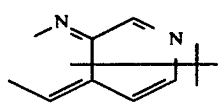 | " | " | " | " | O(t-C$_5$H$_{11}$) |
| (2097) | " | " | " | " | " | OSi(C$_4$H$_9$)$_3$ |

-continued
| | | | | | | |
|---|---|---|---|---|---|---|
| (2098) | 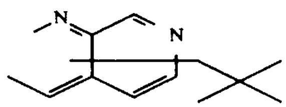 | " | " | " | " | $OSi(C_4H_9)_3$ |
| (2099) | 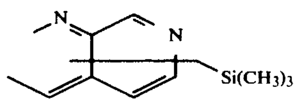 | " | " | " | " | $OSi(C_3H_7)_3$ |
| (2100) | 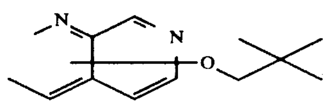 | " | " | " | " | $OSi(C_2H_5)_3$ |
| (2101) | 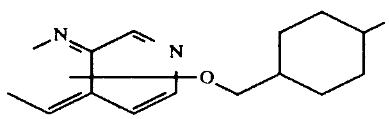 | $= A^1$ | $= A^1$ | $= A^1$ | Si | $OSi(C_2H_5)_3$ |
| (2102) | 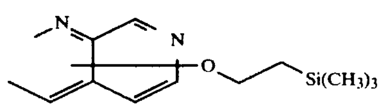 | " | " | " | " | " |
| (2103) | 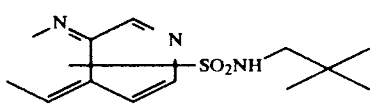 | " | " | " | " | $OSi(C_6H_{13})_3$ |
| (2104) | 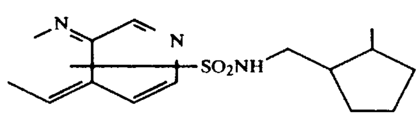 | " | " | " | " | " |
| (2105) | 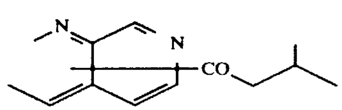 | " | " | " | " | $OSi(C_4H_9)_3$ |

-continued
| | | | | | |
|---|---|---|---|---|---|
| (2106) | 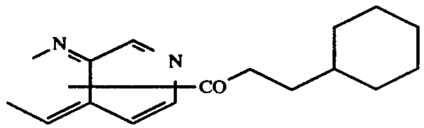 | " | " | " | " $OSi(C_3H_7)_3$ |
| (2107) | 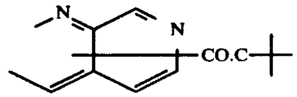 | " | " | " | " $OSi(C_4H_9)_3$ |
| (2108) | 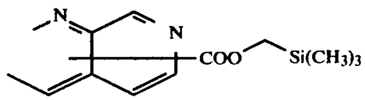 | " | " | " | " $OSi(C_2H_5)_3$ |
| (2109) | 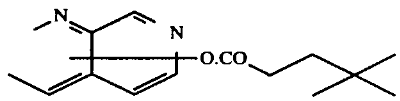 | " | " | " | " $OSi(CH_3)_3$ |
| (2110) | 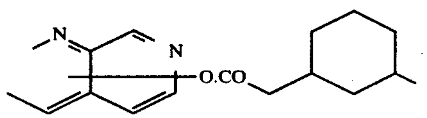 | " | " | " | " $OSi(C_2H_5)_3$ |
| (2111) | 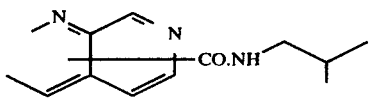 | $= A^1$ | $= A^1$ | $= A^1$ | Si $OSi(C_6H_{13})_3$ |
| (2112) | 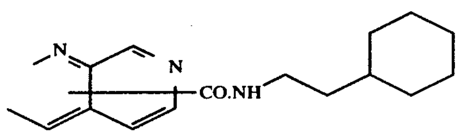 | " | " | " | " $OSi(C_4H_9)_3$ |
| (2113) | 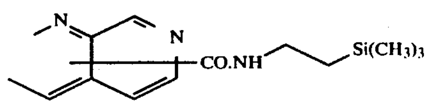 | " | " | " | " $OSi(C_2H_5)_3$ |

-continued
| | | | | | |
|---|---|---|---|---|---|
| (2114) | 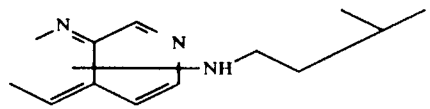 | " | " | " | " $OSi(C_3H_7)_3$ |
| (2115) | 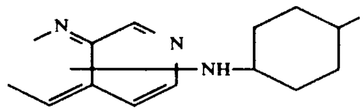 | " | " | " | " $OSi(C_4H_9)_3$ |
| (2116) | 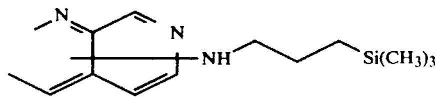 | " | " | " | " $OSi(CH_3)_3$ |
| (2117) | 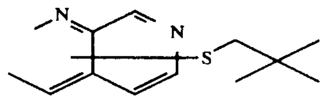 | " | " | " | " $OSi(C_2H_5)_3$ |
| (2118) | 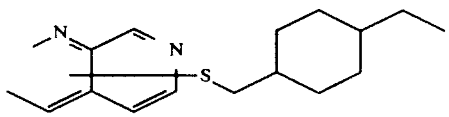 | " | " | " | " $OSi(C_3H_7)_3$ |
| (2119) | 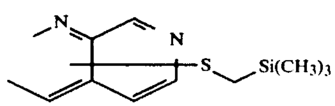 | " | " | " | " $OSi(C_2H_5)_3$ |
| (2120) | 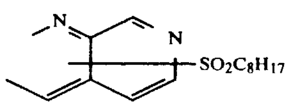 | " | " | " | " $OSi(C_4H_9)_3$ |
| (2121) | 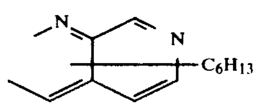 | $= A^1$ | $= A^1$ | $= A^1$ | Si OSi 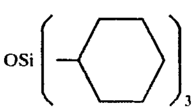 |

-continued
| | | | | | |
|---|---|---|---|---|---|
| (2122) | 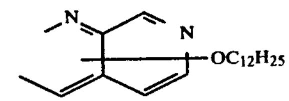 | " | " | " | " OSi(CH3)2 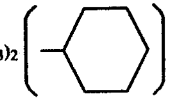 |
| (2123) | 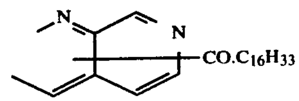 | " | " | " | " OSi(CH3)2(t-C4H9) |
| (2124) | 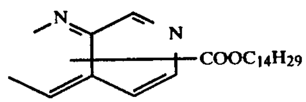 | " | " | " | " OSi 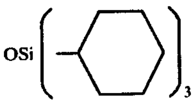 |
| (2125) | 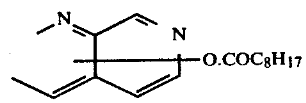 | " | " | " | " " |
| (2126) | 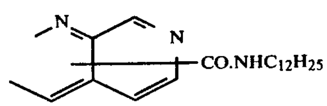 | " | " | " | " OSi(CH3)2 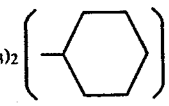 |
| (2127) | 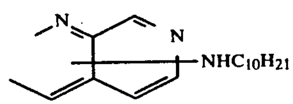 | " | " | " | " OSi(CH3)2 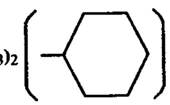 |
| (2128) | 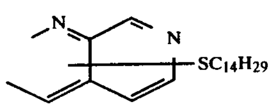 | " | " | " | " " |
| (2129) | 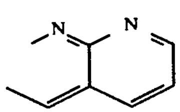 | " | " | " | " OSi(C6H13)3 |
| (2130) | " | " | " | " | " OSi(C4H9)3 |

-continued
| | | | | | | |
|---|---|---|---|---|---|---|
| (2131) | 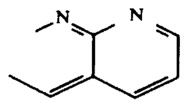 | $= A^1$ | $= A^1$ | $= A^1$ | Si | $OSi(C_3H_7)_3$ |
| (2132) | " | " | " | " | " | $OSi(C_2H_5)_3$ |
| (2133) | " | " | " | " | " | $OSi(CH_3)_2(C_{18}H_{37})$ |
| (2134) | " | " | " | " | " | $OSi(CH_3)_2(t\text{-}C_4H_9)$ |
| (2135) | " | " | " | " | " | $OSi(CH_3)_2(OC_8H_{17})$ |
| (2136) | " | " | " | " | " | $OSi(CH_3)_2(OC_{10}H_{21})$ |
| (2137) | " | " | " | " | " | $OSi(CH_3)_2(OC_{12}H_{25})$ |
| (2138) | " | " | " | " | " | $OSi(CH_3)_2(OC_{14}H_{29})$ |
| (2139) | " | " | " | " | " | $OSi(CH_3)_2(OC_6H_5)$ |
| (2140) | " | " | " | " | " | $OSi(OCH_3)_3$ |
| (2141) | 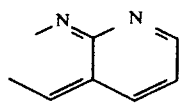 | $= A^1$ | $= A^1$ | $= A^1$ | Si | $OSi(C_6H_5)_3$ |
| (2142) | " | " | " | " | " | $OSi(CH_3)_2C_6H_5$ |
| (2143) | " | " | " | " | " | $OSi(OC_6H_5)_3$ |
| (2144) | " | " | " | " | " | $OSi(OC_6H_{13})_3$ |
| (2145) | 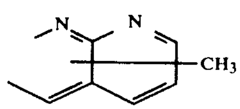 | " | " | " | " | $OSi(C_6H_{13})_3$ |
| (2146) | 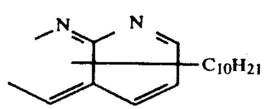 | 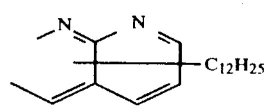 | 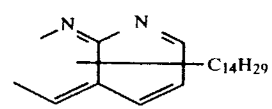 | 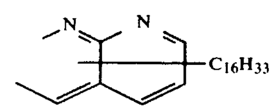 | " | $OC(C_6H_5)_3$ |
| (2147) | 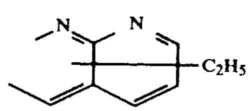 | $= A^1$ | $= A^1$ | $= A^1$ | " | $OSi(C_6H_{13})_3$ |
| (2148) | 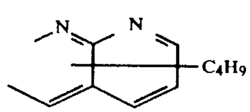 | " | " | " | " | $OSi(CH_3)_2(OC_{18}H_{37})$ |

-continued
| | | | | | | |
|---|---|---|---|---|---|---|
| (2149) | 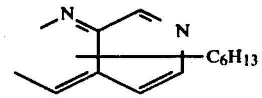 | " | " | " | " | $OSi(CH_3)_2(C_6H_5)$ |
| (2150) | 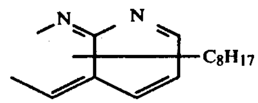 | " | " | " | " | $OSi(C_6H_5)_3$ |
| (2151) | 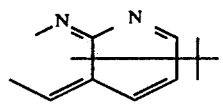 | $= A^1$ | $= A^1$ | $= A^1$ | Si | $OSi(CH_3)_2(C_6H_5)$ |
| (2152) | 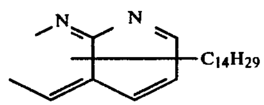 | " | " | " | " | $OC(C_3H_7)_3$ |
| (2153) | 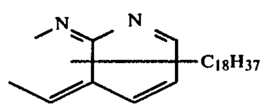 | " | " | " | " | $OC_{18}H_{37}$ |
| (2154) | 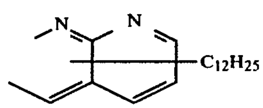 | " | " | " | " | $OC(C_6H_5)_3$ |
| (2155) | 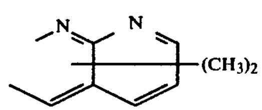 | " | " | " | " | $OSi(C_6H_{13})_3$ |
| (2156) | 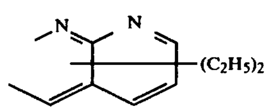 | " | " | " | " | $OSi(C_6H_{13})_3$ |
| (2157) | 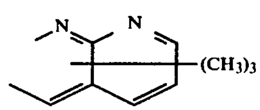 | " | " | " | " | $OSi(C_3H_7)_3$ |

-continued
| | | | | | |
|---|---|---|---|---|---|
| (2158) | 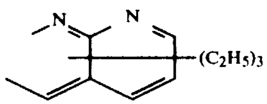 | " | " | " | " $OSi(C_2H_5)_3$ |
| (2159) | 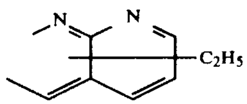 | " | " | " | " $OSi(CH_3)_2(C_8H_{17})$ |
| (2160) | 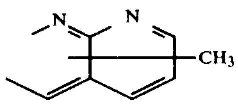 | " | " | " | " $OSi(CH_3)_2(OC_{18}H_{37})$ |
| (2161) | 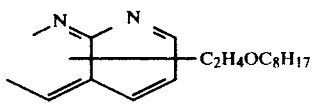 | $= A^1$ | $= A^1$ | $= A^1$ | Si $OSi(C_2H_5)_3$ |
| (2162) | 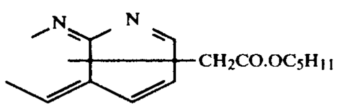 | " | " | " | " $OSi(C_3H_7)_3$ |
| (2163) | 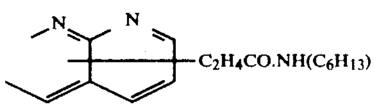 | " | " | " | " $OSi(C_4H_9)_3$ |
| (2164) | 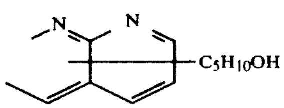 | " | " | " | " $OSi(C_2H_5)_3$ |
| (2165) | 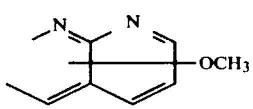 | " | " | " | " $OSi(C_6H_{13})_3$ |
| (2166) | 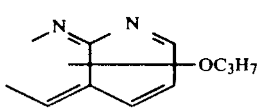 | " | " | " | " $OSi(C_4H_9)_3$ |

-continued
| | | | | | |
|---|---|---|---|---|---|
| (2167) | 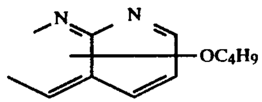 | " | " | " | " OSi(C3H7)3 |
| (2168) | 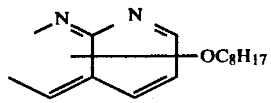 | " | " | " | " OSi(C3H7)3 |
| (2169) | 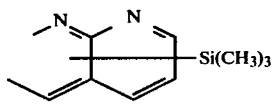 | " | " | " | " OSi(C4H9)3 |
| (2170) | 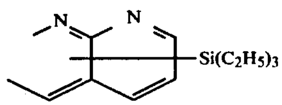 | " | " | " | " OSi(C3H7)3 |
| (2171) | 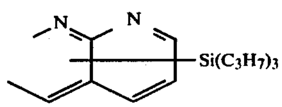 | = A[1] | = A[1] | = A[1] | Si OSi(C2H5)3 |
| (2172) | 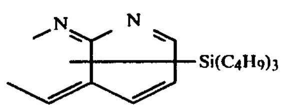 | " | " | " | " OSi(CH3)3 |
| (2173) | 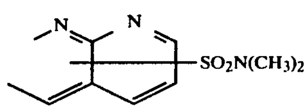 | " | " | " | " OSi(C6H13)3 |
| (2174) | 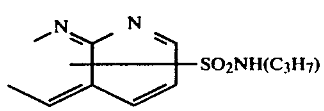 | " | " | " | " OSi(C4H9)3 |
| (2175) | 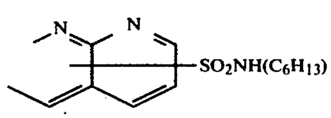 | " | " | " | " OSi(C3H7)3 |

-continued
| | | | | | |
|---|---|---|---|---|---|
| (2176) | 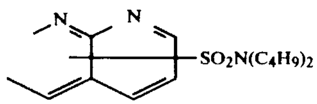 | " | " | " | " $OSi(C_4H_9)_3$ |
| (2177) | 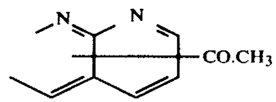 | " | " | " | " $OSi(C_6H_{13})_3$ |
| (2178) | 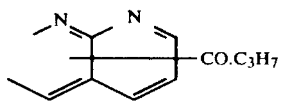 | " | " | " | " $OSi(C_4H_9)_3$ |
| (2179) | 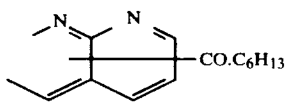 | " | " | " | " $OSi(C_3H_7)_3$ |
| (2180) | 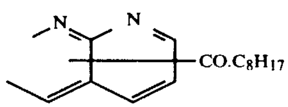 | " | " | " | " $OSi(C_2H_5)_3$ |
| (2181) | 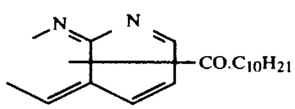 | $=A^1$ | $=A^1$ | $=A^1$ | Si $OSi(CH_3)_3$ |
| (2182) | 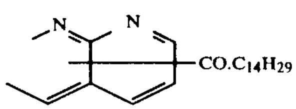 | " | " | " | " $OSi(CH_3)_3$ |
| (2183) | 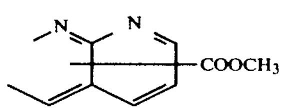 | " | " | " | " $OSi(C_6H_{13})_3$ |
| (2184) | 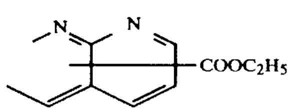 | " | " | " | " $OSi(C_4H_9)_3$ |

| | | | | | |
|---|---|---|---|---|---|
| (2185) | 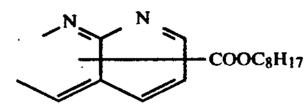 | " | " | " | " $OSi(C_4H_9)_3$ |
| (2186) | 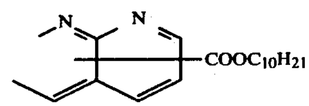 | " | " | " | " $OSi(C_3H_7)_3$ |
| (2187) | 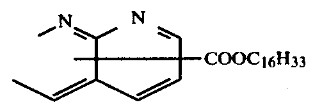 | " | " | " | " $OSi(C_2H_5)_3$ |
| (2188) | 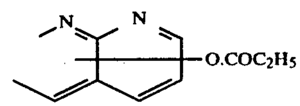 | " | " | " | " $OSi(C_6H_{13})_3$ |
| (2189) | 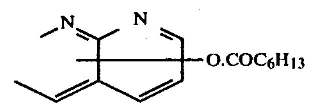 | " | " | " | " $OSi(C_4H_9)_3$ |
| (2190) | 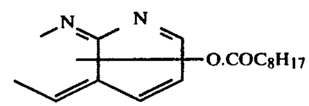 | " | " | " | " $OSi(C_3H_7)_3$ |
| (2191) | 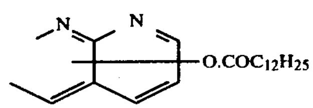 | $= A^1$ | $= A^1$ | $= A^1$ | Si $OSi(C_2H_5)_3$ |
| (2192) | 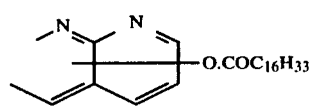 | " | " | " | " $OSi(CH_3)_3$ |
| (2193) | 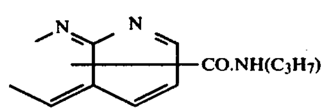 | " | " | " | " $OSi(C_6H_{13})_3$ |

-continued
| | | | | | |
|---|---|---|---|---|---|
| (2194) | 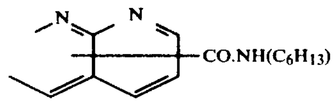  | " | " | " | " $OSi(C_6H_{13})_3$ |
| (2195) | 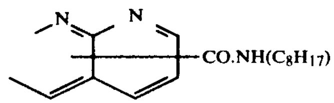  | " | " | " | " $OSi(C_3H_7)_3$ |
| (2196) | 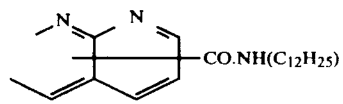  | " | " | " | " $OSi(C_2H_5)_3$ |
| (2197) | 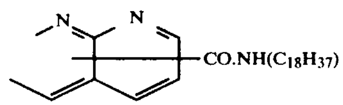  | " | " | " | " $OSi(CH_3)_3$ |
| (2198) | 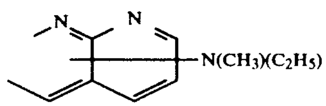  | " | " | " | " $OSi(C_6H_{13})_3$ |
| (2199) | 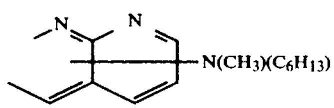  | " | " | " | " $OSi(C_4H_9)_3$ |
| (2200) | 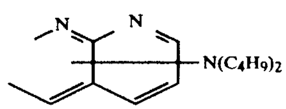  | " | " | " | " $OSi(C_6H_{13})_3$ |
| (2201) | 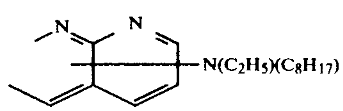  | $= A^1$ | $= A^1$ | $= A^1$ | Si $OSi(C_2H_5)_3$ |
| (2202) | 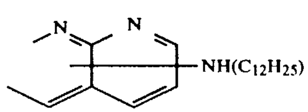  | " | " | " | " $OSi(CH_3)_3$ |

-continued
| | | | | | | |
|---|---|---|---|---|---|---|
| (2203) | 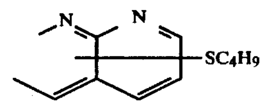 | " | " | " | " | $OSi(C_6H_{13})_3$ |
| (2204) | 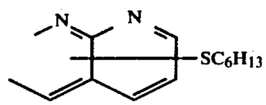 | " | " | " | " | $OSi(C_4H_9)_3$ |
| (2205) | 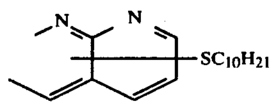 | " | " | " | " | $OSi(C_4H_9)_3$ |
| (2206) | 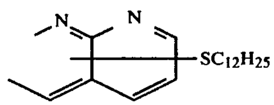 | " | " | " | " | $OSi(C_2H_5)_3$ |
| (2207) | 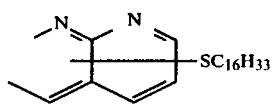 | " | " | " | " | $OSi(CH_3)_3$ |
| (2208) | 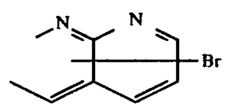 | " | " | " | " | $OSi(C_4H_9)_3$ |
| (2209) | 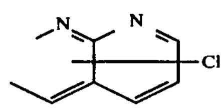 | " | " | " | " | $OSi(C_4H_9)_3$ |
| (2210) | 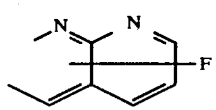 | " | " | " | " | $OSi(C_3H_7)_3$ |
| (2211) | 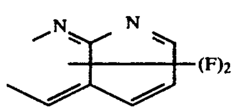 | $= A^1$ | $= A^1$ | $= A^1$ | Si | $OSi(C_2H_5)_3$ |

-continued
| | | | | | | |
|---|---|---|---|---|---|---|
| (2212) | 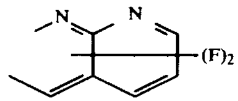 | " | " | " | " | OSi(CH$_3$)$_3$ |
| (2213) | 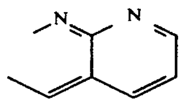 | " | " | " | Ge | OSi(C$_2$H$_5$)$_3$ |
| (2214) | " | " | " | " | " | OSi(C$_4$H$_9$)$_3$ |
| (2215) | " | " | " | " | " | OSi(C$_6$H$_5$)$_2$ |
| (2216) | 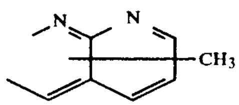 | " | " | " | " | OSi(C$_2$H$_5$)$_3$ |
| (2217) | " | " | " | " | " | OSi(C$_4$H$_9$)$_3$ |
| (2218) | " | " | " | " | " | OC$_{10}$H$_{21}$ |
| (2219) | 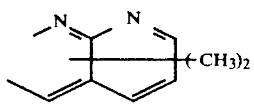 | " | " | " | " | OSi(C$_2$H$_5$)$_3$ |
| (2220) | " | " | " | " | " | OSi(C$_4$H$_9$)$_3$ |
| (2221) | 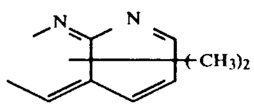 | = A[1] | = A[1] | = A[1] | Ge | OC$_{14}$H$_{29}$ |
| (2222) | 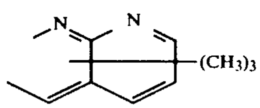 | " | " | " | " | OSi(C$_2$H$_5$)$_3$ |
| (2223) | 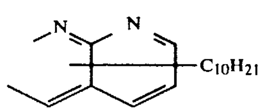 | 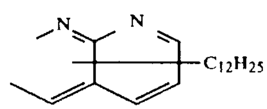 | 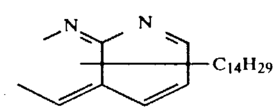 | 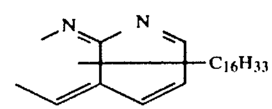 | " | OC(C$_6$H$_5$)$_3$ |

-continued
| | | | | | |
|---|---|---|---|---|---|
| (2224) | 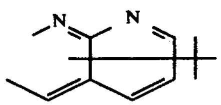 | = $A^1$ | = $A^1$ | = $A^1$ | " $O(t\text{-}C_5H_{11})$ |
| (2225) | 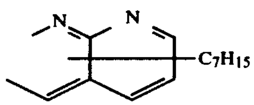 | " | " | " | " $OSi(C_4H_9)_3$ |
| (2226) | 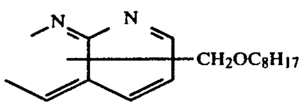 | " | " | " | " $OSi(C_4H_9)_3$ |
| (2227) | 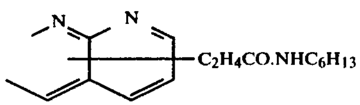 | " | " | " | " $OSi(C_2H_5)_3$ |
| (2228) | 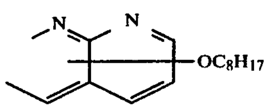 | " | " | " | " $OSi(C_2H_5)_3$ |
| (2229) | 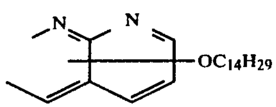 | " | " | " | " $OSi(C_4H_9)_3$ |
| (2230) | 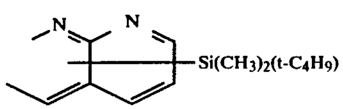 | " | " | " | " $OSi(C_4H_9)_3$ |
| (2231) | 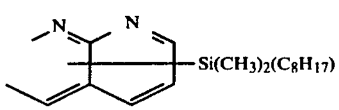 | = $A^1$ | = $A^1$ | = $A^1$ | Ge $OSi(C_2H_5)_3$ |
| (2232) | 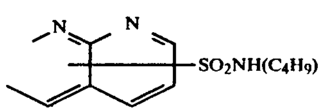 | " | " | " | " $OSi(C_4H_9)_3$ |

-continued
| | | | | | | |
|---|---|---|---|---|---|---|
| (2233) | 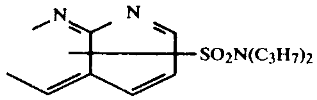 | " | " | " | " | $OSi(CH_3)_2(C_8H_{17})$ |
| (2234) | 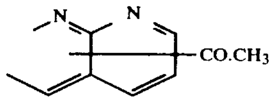 | " | " | " | " | $OSi(C_6H_{13})_3$ |
| (2235) | 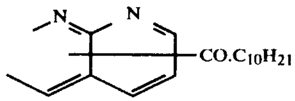 | " | " | " | " | $OSi(C_2H_5)_3$ |
| (2236) | 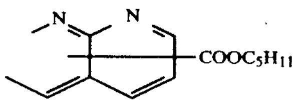 | " | " | " | " | $OSi(C_2H_5)_3$ |
| (2237) | 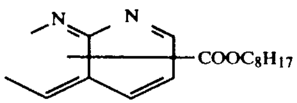 | " | " | " | " | " |
| (2238) | 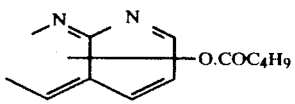 | " | " | " | " | $OSi(C_4H_9)_3$ |
| (2239) | 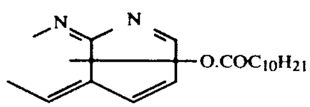 | " | " | " | " | $OSi(C_2H_5)_3$ |
| (2240) | 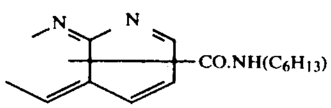 | " | " | " | " | $OSi(C_4H_9)_3$ |
| (2241) | 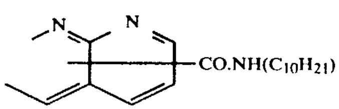 | $= A^1$ | $= A^1$ | $= A^1$ | Ge | $OSi(C_2H_5)_3$ |

-continued
| | | | | | |
|---|---|---|---|---|---|
| (2242) | 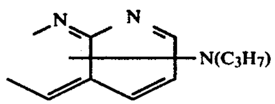 | " | " | " | " $OSi(CH_3)_2(t\text{-}C_4H_9)$ |
| (2243) | 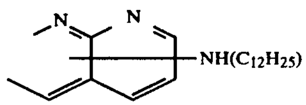 | " | " | " | " $OSi(C_2H_5)_3$ |
| (2244) | 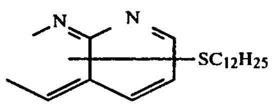 | " | " | " | " $OSi(C_3H_7)_3$ |
| (2245) | 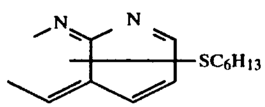 | " | " | " | " $OSi(C_4H_9)_3$ |
| (2246) | 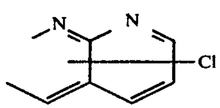 | " | " | " | " $OSi(C_4H_9)_3$ |
| (2247) | 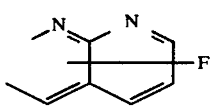 | " | " | " | " $OSi(C_6H_{13})_3$ |
| (2248) | 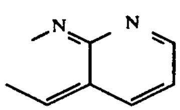 | " | " | " | Sn $OSi(C_2H_5)_3$ |
| (2249) | " | " | " | " | " $OSi(C_6H_5)_3$ |
| (2250) | " | " | " | " | " $OSi(C_4H_9)_3$ |
| (2251) | 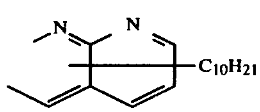 | $= A^1$ | $= A^1$ | $= A^1$ | Sn $OSi(C_2H_5)_3$ |

-continued
| | | | | | | |
|---|---|---|---|---|---|---|
| (2252) | 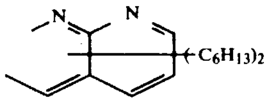 | " | " | " | " | $OSi(C_4H_9)_3$ |
| (2253) | 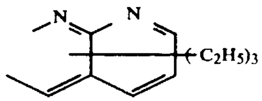 | " | " | " | " | $OC_{18}H_{37}$ |
| (2254) | 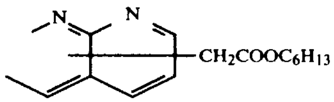 | " | " | " | " | $OSi(C_4H_9)_3$ |
| (2255) | 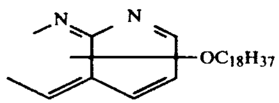 | " | " | " | " | $OSi(C_2H_5)_3$ |
| (2256) | 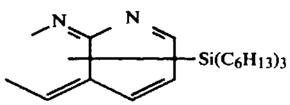 | " | " | " | " | $OSi(C_2H_5)_3$ |
| (2257) | 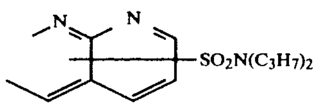 | " | " | " | " | $OSi(C_6H_{13})_3$ |
| (2258) | 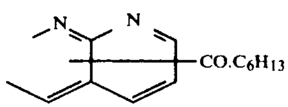 | " | " | " | " | $OSi(C_4H_9)_3$ |
| (2259) | 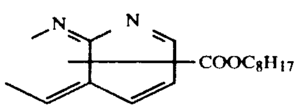 | " | " | " | " | $OSi(C_4H_9)_3$ |
| (2260) | 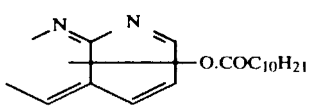 | " | " | " | " | $OSi(C_2H_5)_3$ |

-continued
| | | | | | | |
|---|---|---|---|---|---|---|
| (2261) | 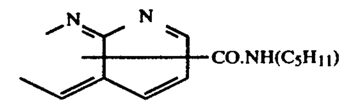 | $=A^1$ | $=A^1$ | $=A^1$ | Sn | $OSi(C_6H_{13})_3$ |
| (2262) | 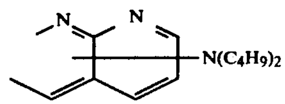 | " | " | " | " | $OSi(C_6H_5)_3$ |
| (2263) | 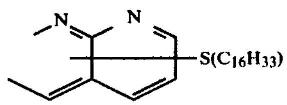 | " | " | " | " | $OSi(C_2H_5)_3$ |
| (2264) | 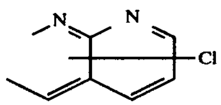 | " | " | " | " | $OSi(C_4H_9)_3$ |
| (2265) | 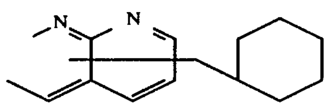 | " | " | " | Si | $OSi(C_3H_7)_3$ |
| (2266) | 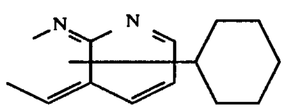 | " | " | " | " | $OSi(C_2H_5)_3$ |
| (2267) | 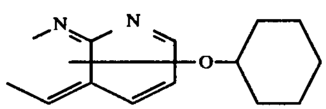 | " | " | " | " | $OSi(C_6H_{13})_3$ |
| (2268) | 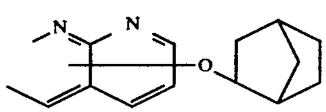 | " | " | " | " | $OSi(C_4H_9)_3$ |
| (2269) | 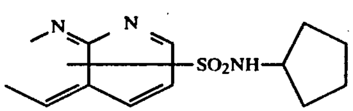 | " | " | " | " | $OSi(C_6H_{13})_3$ |

-continued
| | | | | | | |
|---|---|---|---|---|---|---|
| (2270) | 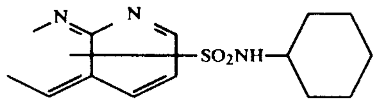 | " | " | " | " | $OSi(C_4H_9)_3$ |
| (2271) | 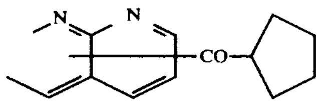 | = A[1] | = A[1] | = A[1] | Si | $OSi(C_4H_9)_3$ |
| (2272) | 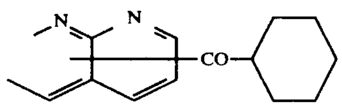 | " | " | " | " | $OSi(C_3H_7)_3$ |
| (2273) | 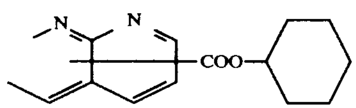 | " | " | " | " | $OSi(C_4H_9)_3$ |
| (2274) | 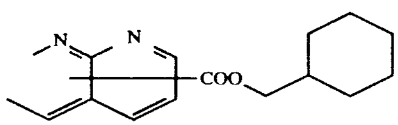 | " | " | " | " | $OSi(C_2H_5)_3$ |
| (2275) | 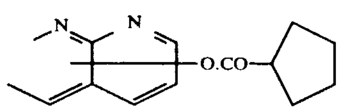 | " | " | " | " | $OSi(C_3H_7)_3$ |
| (2276) | 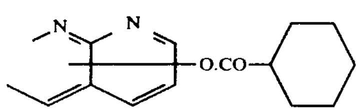 | " | " | " | " | $OSi(C_2H_5)_3$ |
| (2277) | 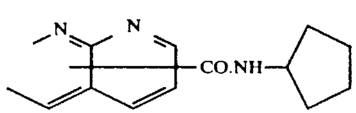 | " | " | " | " | $OSi(C_6H_{13})_3$ |

-continued
| | | | | | | |
|---|---|---|---|---|---|---|
| (2278) | 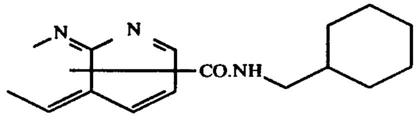 | " | " | " | " | $OSi(C_4H_9)_3$ |
| (2279) | 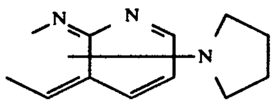 | " | " | " | " | $OSi(C_4H_9)_3$ |
| (2280) | 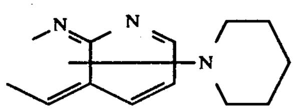 | " | " | " | " | $OSi(C_3H_7)_3$ |
| (2281) | 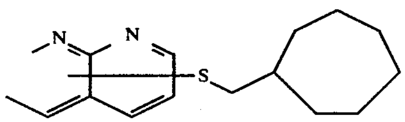 | $= A^1$ | $= A^1$ | $= A^1$ | Si | $OSi(CH_3)_3$ |
| (2282) | 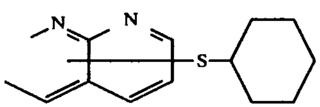 | " | " | " | " | $OSi(C_4H_9)_3$ |
| (2283) | 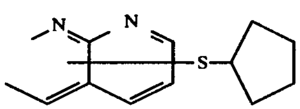 | " | " | " | " | $OSi(C_3H_7)_3$ |
| (2284) | 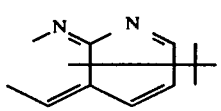 | " | " | " | " | $OSi(C_6H_{13})_3$ |
| (2285) | 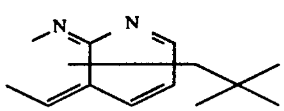 | " | " | " | " | $OSi(C_4H_9)_3$ |

-continued
| | | | | | |
|---|---|---|---|---|---|
| (2286) | 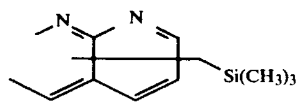 | ″ | ″ | ″ | ″ $OSi(C_3H_7)_3$ |
| (2287) | 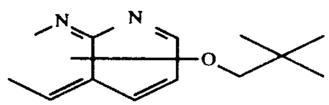 | ″ | ″ | ″ | ″ $OSi(C_2H_5)_3$ |
| (2288) | 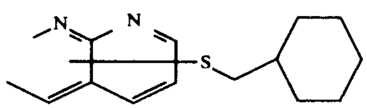 | ″ | ″ | ″ | ″ $OSi(C_3H_7)_3$ |
| (2289) | 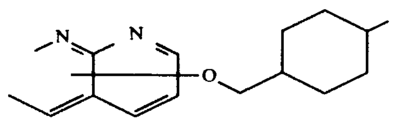 | ″ | ″ | ″ | ″ $OSi(C_2H_5)_3$ |
| (2290) | 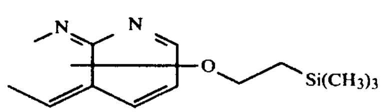 | ″ | ″ | ″ | ″ $OSi(C_3H_7)_3$ |
| (2291) | 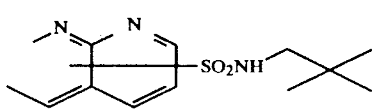 | $= A^1$ | $= A^1$ | $= A^1$ | Si $OSi(C_6H_{13})_3$ |
| (2292) | 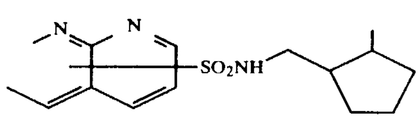 | ″ | ″ | ″ | ″ $OSi(C_4H_9)_3$ |
| (2293) | 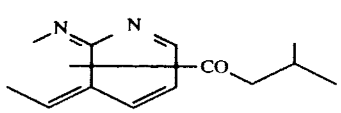 | ″ | ″ | ″ | ″ $OSi(C_3H_7)_3$ |

-continued
| | | | | | |
|---|---|---|---|---|---|
| (2294) | 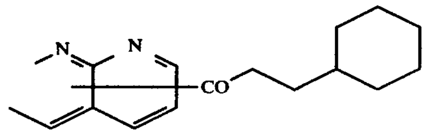 | " | " | " | " $OSi(C_2H_5)_3$ |
| (2295) | 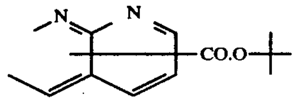 | " | " | " | " $OSi(C_4H_9)_3$ |
| (2296) | 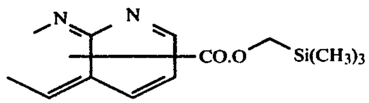 | " | " | " | " $OSi(C_3H_7)_3$ |
| (2297) | 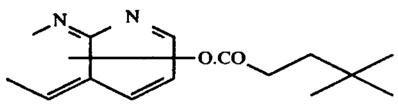 | " | " | " | " $OSi(C_2H_5)_3$ |
| (2298) | 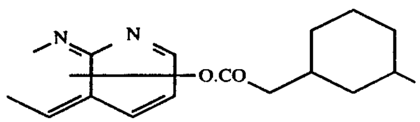 | " | " | " | " $OSi(C_3H_7)_3$ |
| (2299) | 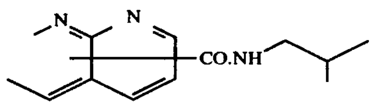 | " | " | " | " $OSi(C_6H_{13})_3$ |
| (2300) | 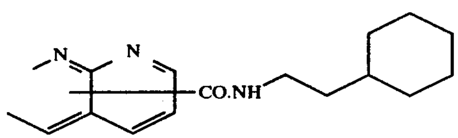 | " | " | " | " $OSi(C_4H_9)_3$ |
| (2301) | 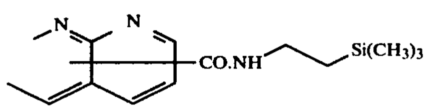 | $= A^1$ | $= A^1$ | $= A^1$ | Si $OSi(C_3H_7)_3$ |

| | | | | | |
|---|---|---|---|---|---|
| (2302) | 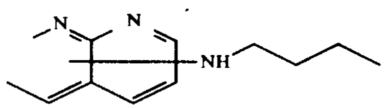 | " | " | " | " $OSi(C_2H_5)_3$ |
| (2303) | 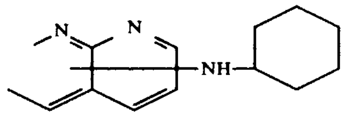 | " | " | " | " $OSi(C_4H_9)_3$ |
| (2304) | 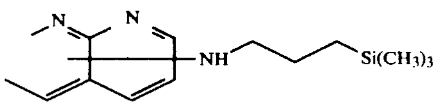 | " | " | " | " $OSi(C_2H_5)_3$ |
| (2305) | 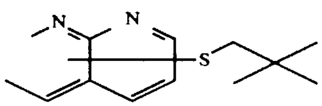 | " | " | " | " $OSi(C_3H_7)_3$ |
| (2306) | 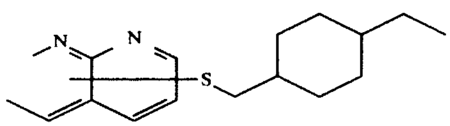 | " | " | " | " $OSi(C_2H_5)_3$ |
| (2307) | 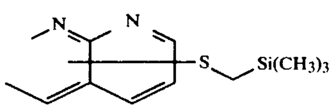 | " | " | " | " $OSi(C_3H_7)_3$ |
| (2308) | 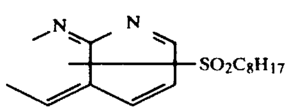 | " | " | " | " $OSi(C_4H_9)_3$ |
| (2309) | 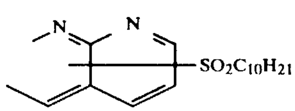 | " | " | " | " $OSi(C_3H_7)_3$ |

-continued
| | | | | | |
|---|---|---|---|---|---|
| (2310) | 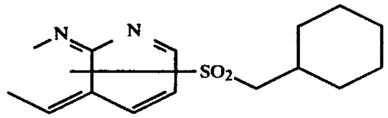 | " | " | " | " $OSi(C_4H_9)_3$ |
| (2311) | 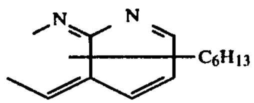 | $= A^1$ | $= A^1$ | $= A^1$ | Si OSi 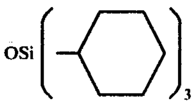 |
| (2312) | 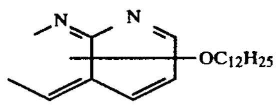 | " | " | " | " $OSi(CH_3)_2$ 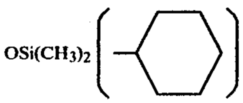 |
| (2313) | 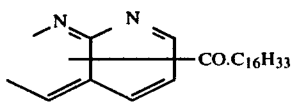 | " | " | " | " $OSi(CH_3)_2(t\text{-}C_4H_9)$ |
| (2314) | 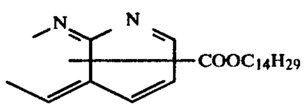 | " | " | " | " OSi 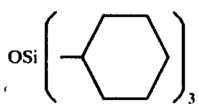 |
| (2315) | 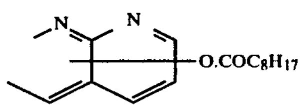 | " | " | " | " OSi 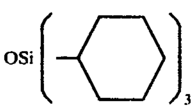 |
| (2316) | 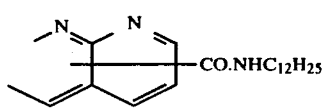 | " | " | " | " $OSi(CH_3)_2$ 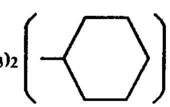 |
| (2317) | 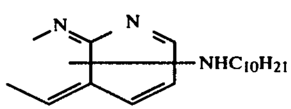 | " | " | " | " $OSi(CH_3)_2$ 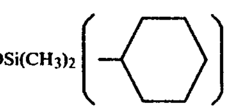 |

-continued
| | | | | | | |
|---|---|---|---|---|---|---|
| (2318) | 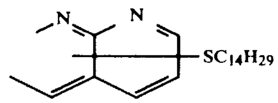 | " | " | " | " | $OSi(CH_3)_2$ 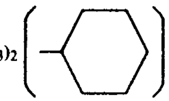 |
| (2319) | 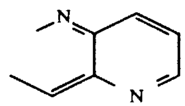 | " | " | " | " | $OSi(C_6H_{13})_3$ |
| (2320) | " | " | " | " | " | $OSi(C_4H_9)_3$ |
| (2321) | 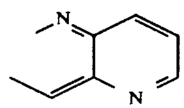 | $= A^1$ | $= A^1$ | $= A^1$ | Si | $OSi(C_3H_7)_3$ |
| (2322) | " | " | " | " | " | $OSi(C_2H_5)_3$ |
| (2323) | " | " | " | " | " | $OSi(CH_3)_2(C_{18}H_{37})$ |
| (2324) | " | " | " | " | " | $OSi(CH_3)_2(t\text{-}C_4H_9)$ |
| (2325) | " | " | " | " | " | $OSi(CH_3)_2(OC_8H_{17})$ |
| (2326) | " | " | " | " | " | $OSi(CH_3)_2(OC_{10}H_{21})$ |
| (2327) | " | " | " | " | " | $OSi(CH_3)_2(OC_{12}H_{25})$ |
| (2328) | " | " | " | " | " | $OSi(CH_3)_2(OC_{14}H_{29})$ |
| (2329) | " | " | " | " | " | $OSi(CH_3)_2(OC_6H_5)$ |
| (2330) | " | " | " | " | " | $OSi(OCH_3)_3$ |
| (2331) | 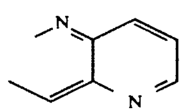 | $= A^1$ | $= A^1$ | $= A^1$ | Si | $OSi(C_6H_5)_3$ |
| (2332) | " | " | " | " | " | $OSi(CH_3)_2(C_6H_5)$ |
| (2333) | " | " | " | " | " | $OSi(C_6H_5)_3$ |
| (2334) | 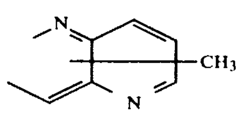 | " | " | " | " | $osi(C_6H_{13})_3$ |
| (2335) | 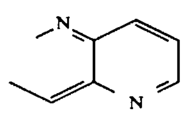 | " | " | " | " | $OSi(OC_6H_{13})_3$ |

-continued
| | | | | | | |
|---|---|---|---|---|---|---|
| (2336) | 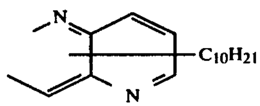 | 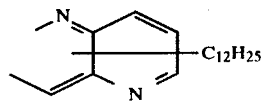 | 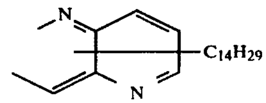 | 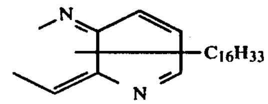 | " | $OC(C_6H_5)_3$ |
| (2337) | 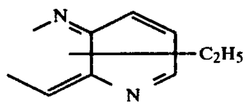 | $= A^1$ | $= A^1$ | $= A^1$ | " | $OSi(C_6H_{13})_3$ |
| (2338) | 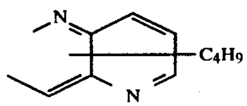 | " | " | " | " | $OSi(CH_3)_2(OC_{18}H_{37})$ |
| (2339) | 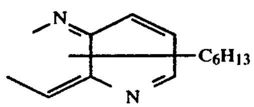 | " | " | " | " | $OSi(CH_3)_2(C_6H_5)$ |
| (2340) | 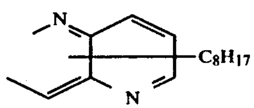 | " | " | " | " | $OSi(C_6H_5)_3$ |
| (2341) | 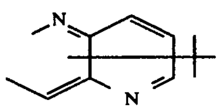 | $= A^1$ | $= A^1$ | $= A^1$ | Si | $OSi(CH_3)_2(OC_6H_5)$ |
| (2342) | 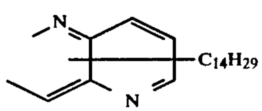 | " | " | " | " | $OC(C_3H_7)_3$ |
| (2343) | 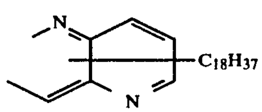 | " | " | " | " | $OC_{18}H_{37}$ |

-continued
| | | | | | |
|---|---|---|---|---|---|
| (2344) | 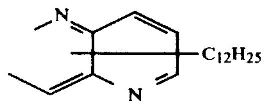 | " | " | " | " $OC(C_6H_5)_3$ |
| (2345) | 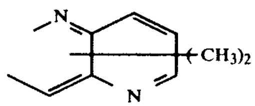 | " | " | " | " $OSi(C_6H_{13})_3$ |
| (2346) | 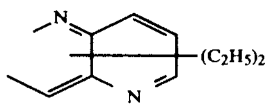 | " | " | " | " " |
| (2347) | 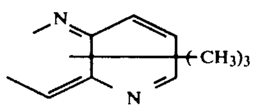 | " | " | " | " $OSi(C_3H_7)_3$ |
| (2348) | 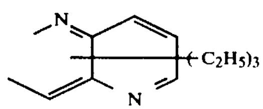 | " | " | " | " $OSi(C_2H_5)_3$ |
| (2349) | 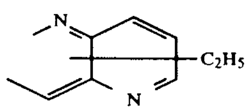 | " | " | " | " $OSi(CH_3)_2(C_8H_{17})$ |
| (2350) | 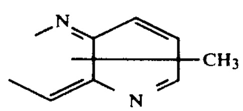 | " | " | " | " $OSi(CH_3)_2(OC_{18}H_{37})$ |
| (2351) | 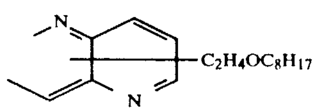 | $=A^1$ | $=A^1$ | $=A^1$ | Si $OSi(C_2H_5)_3$ |

-continued
| | | | | | | |
|---|---|---|---|---|---|---|
| (2352) | 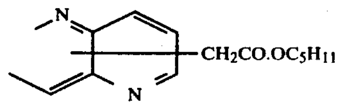 | " | " | " | " | $OSi(C_3H_7)_3$ |
| (2353) | 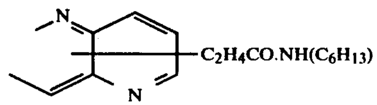 | " | " | " | " | $OSi(C_4H_9)_3$ |
| (2354) | 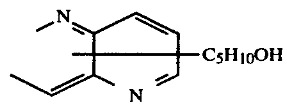 | " | " | " | " | $OSi(C_2H_5)_3$ |
| (2355) | 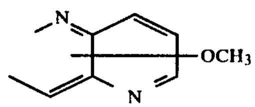 | " | " | " | " | $OSi(C_6H_{13})_3$ |
| (2356) | 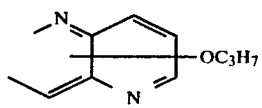 | " | " | " | " | $OSi(C_4H_9)_3$ |
| (2357) | 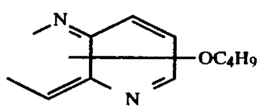 | " | " | " | " | $OSi(C_3H_7)_3$ |
| (2358) | 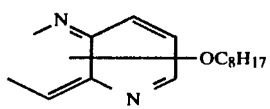 | " | " | " | " | " |
| (2359) | 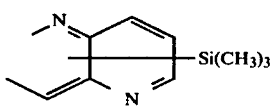 | " | " | " | " | $OSi(C_4H_9)_3$ |

-continued
| | | | | | |
|---|---|---|---|---|---|
| (2360) | 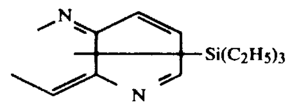 | " | " | " | " $OSi(C_3H_7)_3$ |
| (2361) | 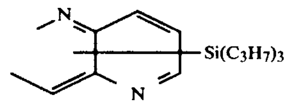 | $=A^1$ | $=A^1$ | $=A^1$ | Si $OSi(C_2H_5)_3$ |
| (2362) | 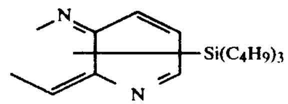 | " | " | " | " $OSi(CH_3)_3$ |
| (2363) | 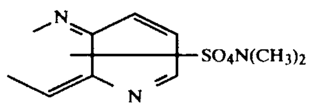 | " | " | " | " $OSi(C_6H_{13})_3$ |
| (2364) | 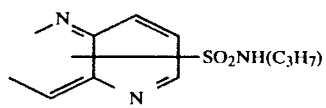 | " | " | " | " $OSi(C_4H_9)_3$ |
| (2365) | 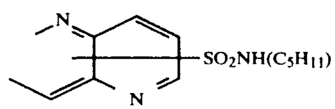 | " | " | " | " $OSi(C_3H_7)_3$ |
| (2366) | 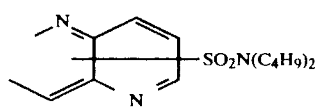 | " | " | " | " $OSi(C_4H_9)_3$ |
| (2367) | 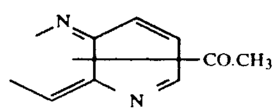 | " | " | " | " $OSi(C_6H_{13})_3$ |

-continued
| | | | | | |
|---|---|---|---|---|---|
| (2368) | 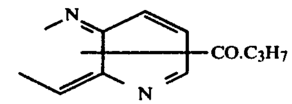  | " | " | " | " $OSi(C_4H_9)_3$ |
| (2369) | 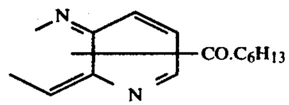  | " | " | " | " $OSi(C_3H_7)_3$ |
| (2370) | 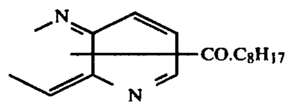  | " | " | " | " $OSi(C_2H_5)_3$ |
| (2371) | 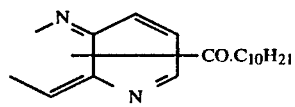  | $= A^1$ | $= A^1$ | $= A^1$ | Si $OSi(CH_3)_3$ |
| (2372) | 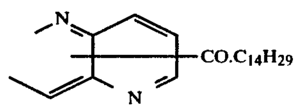  | " | " | " | " " |
| (2373) | 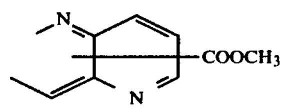  | " | " | " | " $OSi(C_6H_{13})_3$ |
| (2374) | 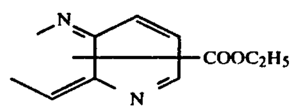  | " | " | " | " $OSi(C_4H_9)_3$ |
| (2375) | 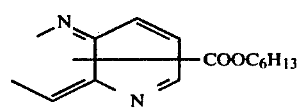  | " | " | " | " $OSi(C_3H_7)_3$ |

-continued
| | | | | | |
|---|---|---|---|---|---|
| (2376) | 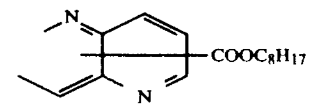 | " | " | " | " $OSi(C_4H_9)_3$ |
| (2377) | 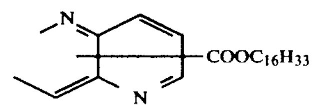 | " | " | " | " $OSi(C_2H_5)_3$ |
| (2378) | 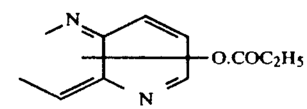 | " | " | " | " $OSi(C_6H_{13})_3$ |
| (2379) | 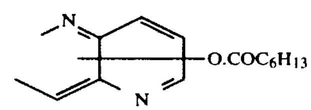 | " | " | " | " $OSi(C_4H_9)_3$ |
| (2380) | 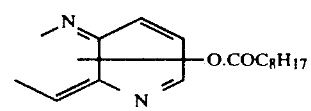 | " | " | " | " $OSi(C_3H_7)_3$ |
| (2381) | 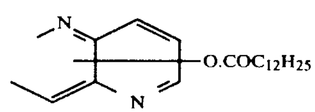 | $= A^1$ | $= A^1$ | $= A^1$ | Si $OSi(C_2H_5)_3$ |
| (2382) | 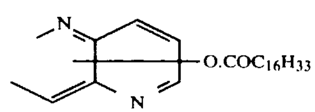 | " | " | " | " $OSi(CH_3)_3$ |
| (2383) | 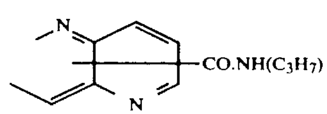 | " | " | " | " $OSi(C_6H_{13})_3$ |

-continued
| | | | | | |
|---|---|---|---|---|---|
| (2384) | 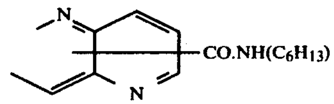 | " | " | " | " " |
| (2385) | 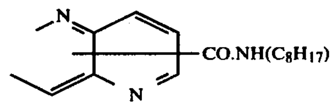 | " | " | " | " $OSi(C_3H_7)_3$ |
| (2386) | 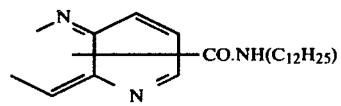 | " | " | " | " $OSi(C_2H_5)_3$ |
| (2387) | 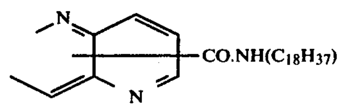 | " | " | " | " $OSi(CH_3)_3$ |
| (2388) | 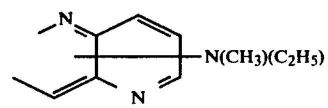 | " | " | " | " $OSi(C_6H_{13})_3$ |
| (2389) | 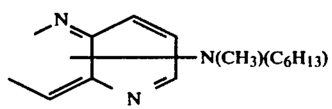 | " | " | " | " $OSi(C_4H_9)_3$ |
| (2390) | 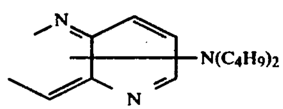 | " | " | " | " $OSi(C_6H_{13})_3$ |
| (2391) | 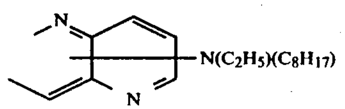 | $= A^1$ | $= A^1$ | $= A^1$ | Si $OSi(C_2H_5)_3$ |

-continued
| | | | | | | |
|---|---|---|---|---|---|---|
| (2392) | 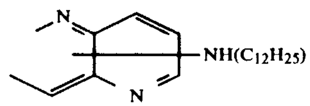 | " | " | " | " | $OSi(CH_3)_3$ |
| (2393) | 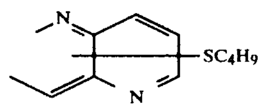 | " | " | " | " | $OSi(C_6H_{13})_3$ |
| (2394) | 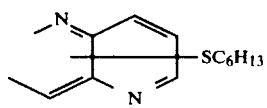 | " | " | " | " | $OSi(C_4H_9)_3$ |
| (2395) | 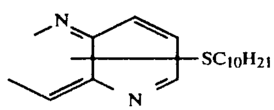 | " | " | " | " | " |
| (2396) | 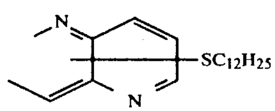 | " | " | " | " | $OSi(C_2H_5)_3$ |
| (2397) | 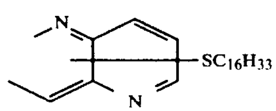 | " | " | " | " | $OSi(CH_3)_3$ |
| (2398) | 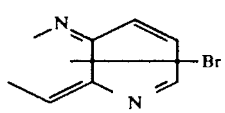 | " | " | " | " | $OSi(C_4H_9)_3$ |
| (2399) | 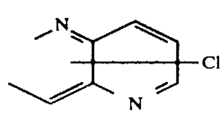 | " | " | " | " | $OSi(C_4H_9)_3$ |

-continued
| | | | | | | |
|---|---|---|---|---|---|---|
| (2400) | 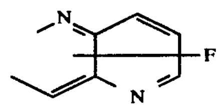 | " | " | " | " | $OSi(C_3H_7)_3$ |
| (2401) | 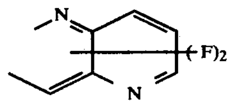 | $= A^1$ | $= A^1$ | $= A^1$ | Si | $OSi(C_2H_5)_3$ |
| (2402) | " | " | " | " | " | $OSi(CH_3)_3$ |
| (2403) | 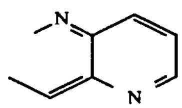 | " | " | " | Ge | $OSi(C_2H_5)_3$ |
| (2404) | " | " | " | " | " | $OSi(C_4H_9)_3$ |
| (2405) | " | " | " | " | " | $OSi(C_6H_5)_3$ |
| (2406) | 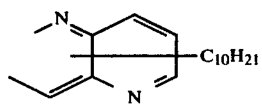 | 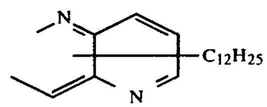 | 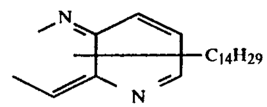 | 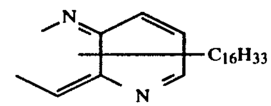 | " | $OC(C_6H_5)_3$ |
| (2407) | 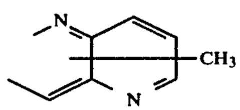 | $= A^1$ | $= A^1$ | $= A^1$ | " | $OSi(C_2H_5)_3$ |
| (2408) | " | " | " | " | " | $OSi(C_4H_9)_3$ |
| (2409) | " | " | " | " | " | $OSi(C_4H_9)_3$ |
| (2410) | " | " | " | " | " | $OC_{10}H_{21}$ |
| (2411) | 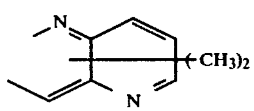 | $= A^1$ | $= A^1$ | $= A^1$ | Ge | $OSi(C_2H_5)_3$ |
| (2412) | " | " | " | " | " | $OSi(C_4H_9)_3$ |
| (2413) | " | " | " | " | " | $OC_{14}H_{29}$ |

-continued
| | | | | | | |
|---|---|---|---|---|---|---|
| (2414) | 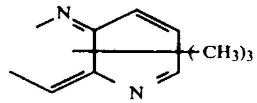 | " | " | " | " | $OSi(C_2H_5)_3$ |
| (2415) | 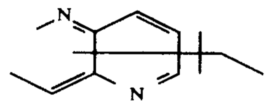 | " | " | " | " | $O(t\text{-}C_5H_{11})$ |
| (2416) | 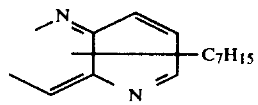 | " | " | " | " | $OSi(C_4H_9)_3$ |
| (2417) | 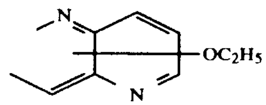 | " | " | " | " | $OSi(C_6H_{13})_3$ |
| (2418) | 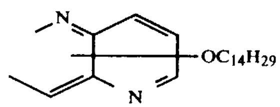 | " | " | " | " | $OSi(C_4H_9)_3$ |
| (2419) | 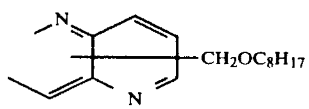 | " | " | " | " | $OSi(C_4H_9)_3$ |
| (2420) | 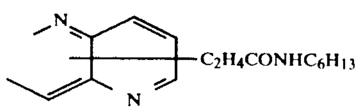 | " | " | " | " | $OSi(C_2H_5)_3$ |
| (2421) | 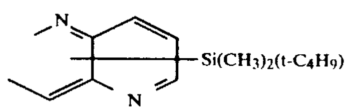 | $= A^1$ | $= A^1$ | $= A^1$ | Ge | $OSi(C_4H_9)_3$ |

| | | | | | | |
|---|---|---|---|---|---|---|
| (2422) | 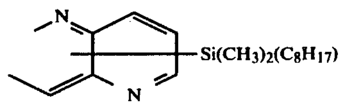 | " | " | " | " | $OSi(C_2H_5)_3$ |
| (2423) | 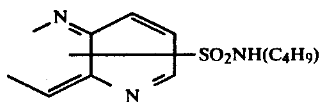 | " | " | " | " | $OSi(C_4H_9)_3$ |
| (2424) | 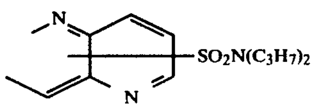 | " | " | " | " | $OSi(CH_3)_2(C_8H_{17})$ |
| (2425) | 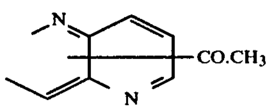 | " | " | " | " | $OSi(C_6H_{13})_3$ |
| (2426) | 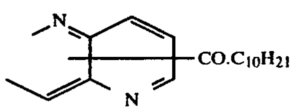 | " | " | " | " | $OSi(C_2H_5)_3$ |
| (2427) | 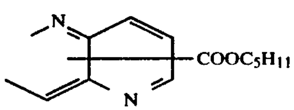 | " | " | " | " | $OSi(C_2H_5)_3$ |
| (2428) | 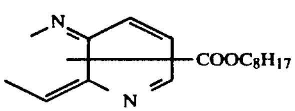 | " | " | " | " | " |
| (2429) | 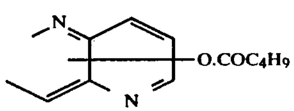 | " | " | " | " | $OSi(C_4H_9)_3$ |

-continued
| | | | | | |
|---|---|---|---|---|---|
| (2430) | 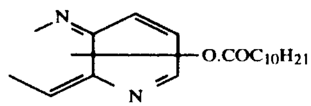 | " | " | " | " $OSi(C_2H_5)_3$ |
| (2431) | 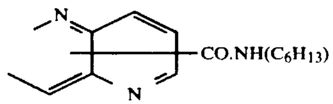 | $= A^1$ | $= A^1$ | $= A^1$ | Ge $OSi(C_4H_9)_3$ |
| (2432) | 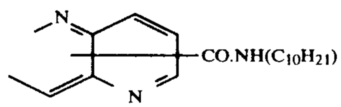 | " | " | " | " $OSi(C_{10}H_{21})_3$ |
| (2433) | 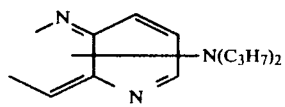 | " | " | " | " $OSi(CH_3)_2(t\text{-}C_4H_9)$ |
| (2434) | 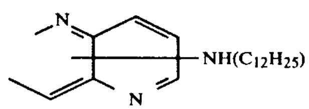 | " | " | " | " $OSi(C_2H_5)_3$ |
| (2435) | 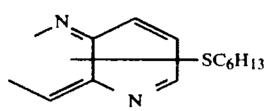 | " | " | " | " $OSi(C_4H_9)_3$ |
| (2436) | 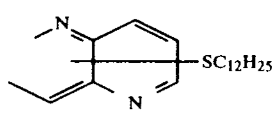 | " | " | " | " $OSi(C_3H_7)_3$ |
| (2437) | 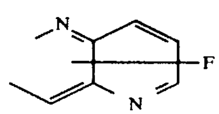 | " | " | " | " $OSi(C_6H_{13})_3$ |

-continued
| | | | | | | |
|---|---|---|---|---|---|---|
| (2438) | 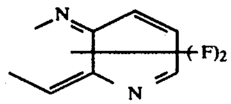 | " | " | " | " | $OSi(C_2H_5)_3$ |
| (2439) | 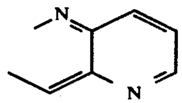 | " | " | " | Sn | $OSi(C_6H_5)_3$ |
| (2440) | " | " | " | " | " | $OSi(C_4H_9)_3$ |
| (2441) | 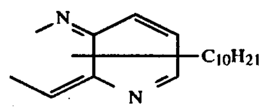 | $= A^1$ | $= A^1$ | $= A^1$ | Sn | $OSi(C_2H_5)_3$ |
| (2442) | 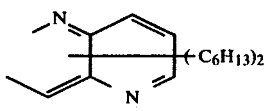 | " | " | " | " | $OSi(C_4H_9)_3$ |
| (2443) | 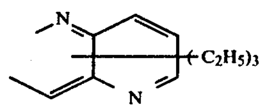 | " | " | " | " | $OC_{18}H_{37}$ |
| (2444) | 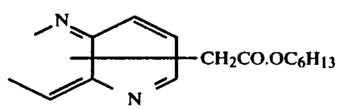 | " | " | " | " | $OSi(C_4H_9)_3$ |
| (2445) | 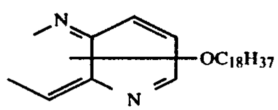 | " | " | " | " | $OSi(C_2H_5)_3$ |
| (2446) | 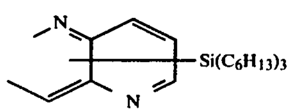 | " | " | " | " | $OSi(C_2H_5)_3$ |

-continued
| | | | | | | |
|---|---|---|---|---|---|---|
| (2447) | 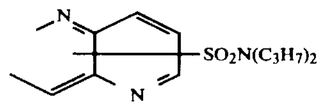 | " | " | " | " | $OSi(C_6H_{13})_3$ |
| (2448) | 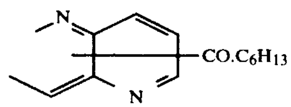 | " | " | " | " | $OSi(C_4H_9)_3$ |
| (2449) | 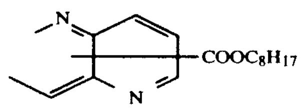 | " | " | " | " | " |
| (2450) | 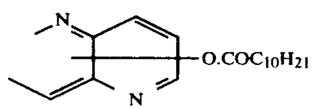 | " | " | " | " | $OSi(C_2H_5)_3$ |
| (2451) | 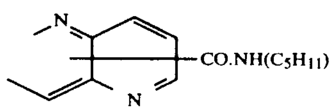 | $= A^1$ | $= A^1$ | $= A^1$ | Sn | $OSi(C_6H_{13})_3$ |
| (2452) | 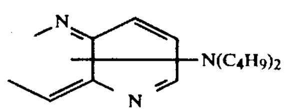 | " | " | " | " | $OSi(C_6H_5)_3$ |
| (2453) | 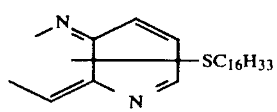 | " | " | " | " | $OSi(C_2H_5)_3$ |
| (2454) | 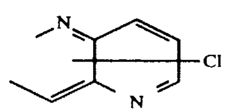 | " | " | " | " | $OSi(C_4H_9)_3$ |

-continued
| | | | | | |
|---|---|---|---|---|---|
| (2455) | 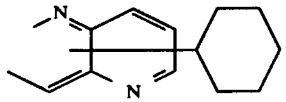 | " | " | " | Si OSi 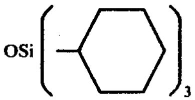 |
| (2456) | 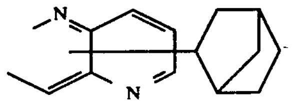 | " | " | " | " $OSi(C_2H_5)_3$ |
| (2457) | 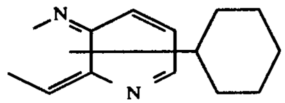 | " | " | " | " $OSi(C_2H_5)_3$ |
| (2458) | 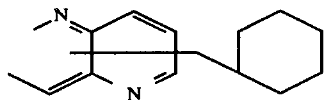 | " | " | " | " $OSi(C_3H_7)_3$ |
| (2459) | 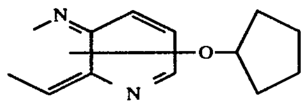 | " | " | " | " $OSi(C_3H_7)_3$ |
| (2460) | 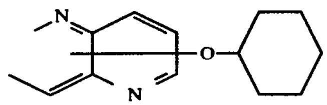 | " | " | " | " $OSi(C_6H_{13})_3$ |
| (2461) | 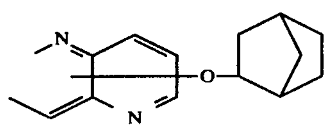 | $= A^1$ | $= A^1$ | $= A^1$ | Si $OSi(C_4H_9)_3$ |
| (2462) | 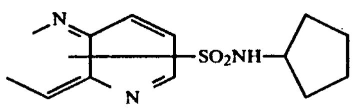 | " | " | " | " $OSi(C_3H_7)_3$ |

-continued
| | | | | | |
|---|---|---|---|---|---|
| (2463) | 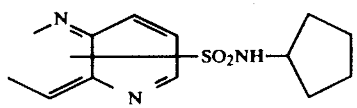 | " | " | " | " OSi($C_2H_5$)$_3$ |
| (2464) | 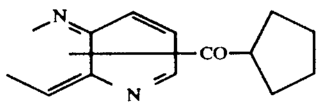 | " | " | " | " OSi($C_6H_{13}$)$_3$ |
| (2465) | 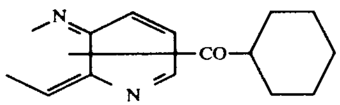 | " | " | " | " OSi($C_4H_9$)$_3$ |
| (2466) | 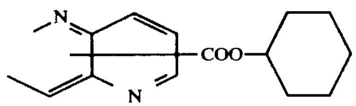 | " | " | " | " OSi($C_3H_7$)$_3$ |
| (2467) | 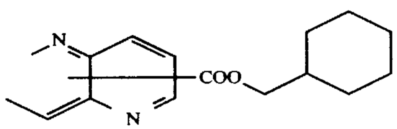 | " | " | " | " OSi($C_2H_5$)$_3$ |
| (2468) | 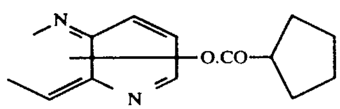 | " | " | " | " OSi($C_4H_9$)$_3$ |
| (2469) | 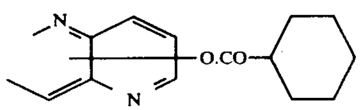 | " | " | " | " OSi($C_3H_7$)$_3$ |
| (2470) | 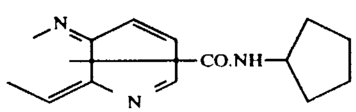 | " | " | " | " OSi($C_6H_{13}$)$_3$ |

-continued
| | | | | | |
|---|---|---|---|---|---|
| (2471) | 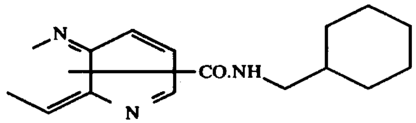 | = $A^1$ | = $A^1$ | = $A^1$ | Si $OSi(C_4H_9)_3$ |
| (2472) | 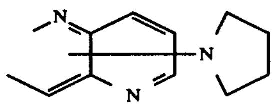 | " | " | " | " " |
| (2473) | 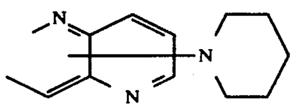 | " | " | " | " $OSi(C_3H_7)_3$ |
| (2474) | 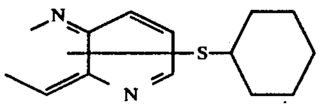 | " | " | " | " $OSi(C_4H_9)_3$ |
| (2475) | " | " | " | " | " $OSi(C_4H_9)_2$ 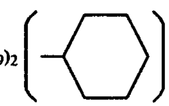 |
| (2476) | 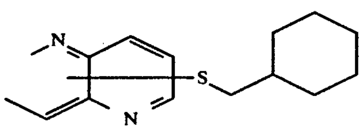 | " | " | " | " $OSi(C_2H_5)_3$ |
| (2477) | 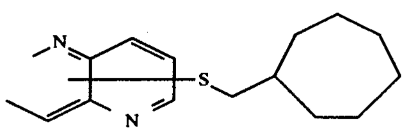 | " | " | " | " $OSi(CH_3)_3$ |
| (2478) | 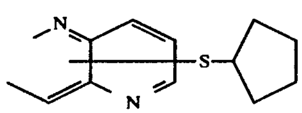 | " | " | " | " $OSi(C_4H_9)_3$ |

-continued
| | | | | | | |
|---|---|---|---|---|---|---|
| (2479) | 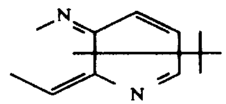 | " | " | " | " | " |
| (2480) | 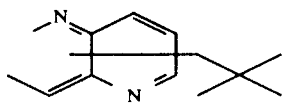 | " | " | " | " | " |
| (2481) | 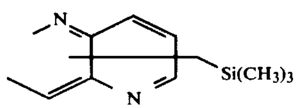 | $= A^1$ | $= A^1$ | $= A^1$ | Si | $OSi(C_3H_7)_3$ |
| (2482) | 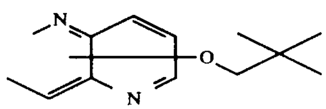 | " | " | " | " | $OSi(C_2H_5)_3$ |
| (2483) | 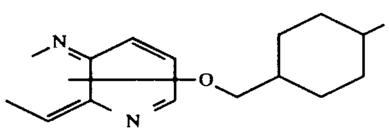 | " | " | " | " | " |
| (2484) | 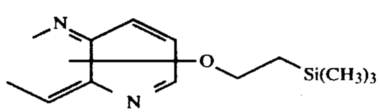 | " | " | " | " | " |
| (2485) | 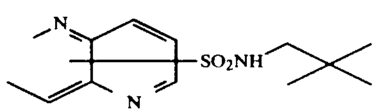 | " | " | " | " | $OSi(C_6H_{13})_3$ |
| (2486) | 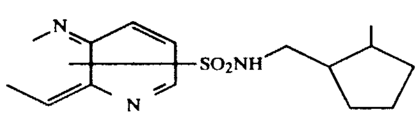 | " | " | " | " | " |

-continued
| | | | | | |
|---|---|---|---|---|---|
| (2487) | 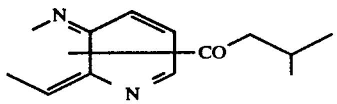 | " | " | " | " $OSi(C_4H_9)_3$ |
| (2488) | 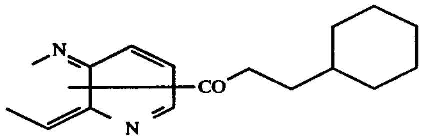 | " | " | " | " $OSi(C_3H_7)_3$ |
| (2489) | 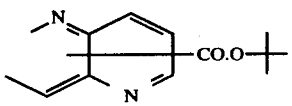 | " | " | " | " $OSi(C_4H_9)_3$ |
| (2490) | 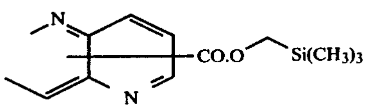 | " | " | " | " $OSi(C_2H_5)_3$ |
| (2491) | 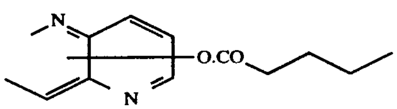 | $= A^1$ | $= A^1$ | $= A^1$ | Si $OSi(CH_3)_3$ |
| (2492) | 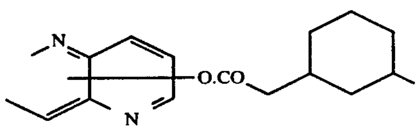 | " | " | " | " $OSi(C_2H_5)_3$ |
| (2493) | 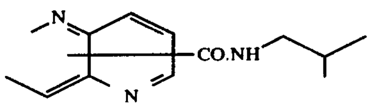 | " | " | " | " $OSi(C_6H_{13})_3$ |
| (2494) | 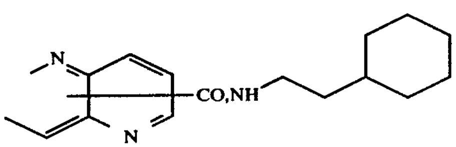 | " | " | " | " $OSi(C_4H_9)_3$ |

-continued
| | | | | | |
|---|---|---|---|---|---|
| (2495) | 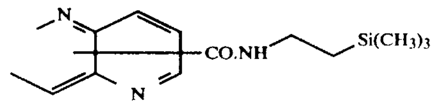 | " | " | " | " $OSi(C_2H_5)_3$ |
| (2496) | 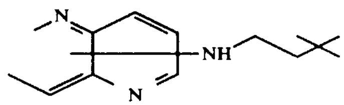 | " | " | " | " $OSi(C_3H_7)_3$ |
| (2497) | 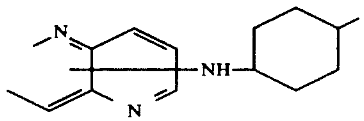 | " | " | " | " $OSi(C_4H_9)_3$ |
| (2498) | 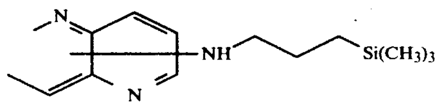 | " | " | " | " $OSi(CH_3)_3$ |
| (2499) | 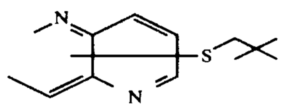 | " | " | " | " $OSi(C_2H_5)_3$ |
| (2500) | 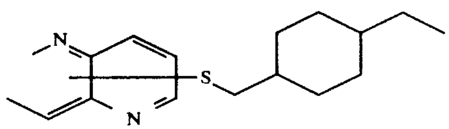 | " | " | " | " $OSi(C_3H_7)_3$ |
| (2501) | 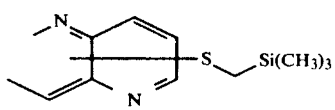 | $= A^1$ | $= A^1$ | $= A^1$ | Si $OSi(C_2H_5)_3$ |
| (2502) | 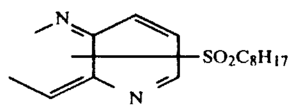 | " | " | " | " $OSi(C_4H_9)_3$ |

-continued
| | | | | | |
|---|---|---|---|---|---|
| (2503) | 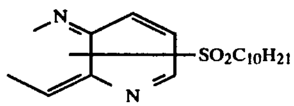 | " | " | " | " $OSi(C_3H_7)_3$ |
| (2504) | 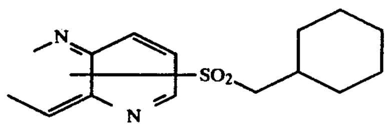 | " | " | " | " $OSi(C_6H_{13})_3$ |
| (2505) | 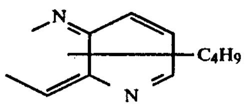 | " | " | " | " 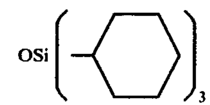 |
| (2506) | 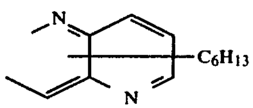 | " | " | " | " 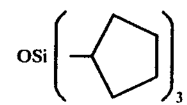 |
| (2507) | 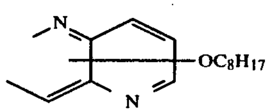 | " | " | " | " 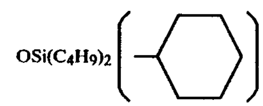 |
| (2508) | 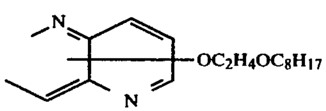 | " | " | " | " 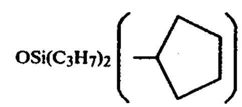 |
| (2509) | 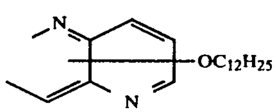 | " | " | " | " 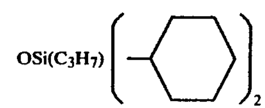 |
| (2510) | 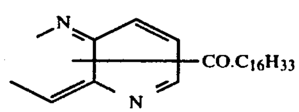 | " | " | " | " $OSi(CH_3)_2(t\text{-}C_4H_9)$ |

-continued
| | | | | | |
|---|---|---|---|---|---|
| (2511) | 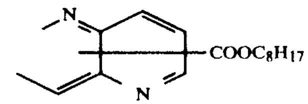 | = A[1] | = A[1] | = A[1] | Si OSi($C_4H_9$) 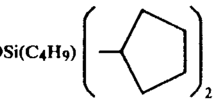 |
| (2512) | 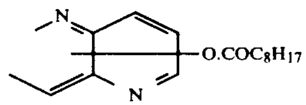 | " | " | " | " OSi 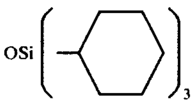 |
| (2513) | 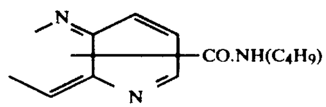 | " | " | " | " OSi($C_3H_7$)$_2$ 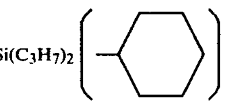 |
| (2514) | 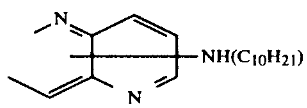 | " | " | " | " OSi($CH_3$)$_2$ 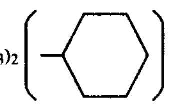 |
| (2515) | 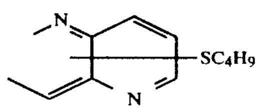 | " | " | " | " OSi($C_4H_9$)$_2$ 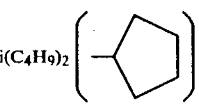 |
| (2516) | 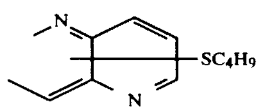 | " | " | " | " OSi($C_3H_7$) 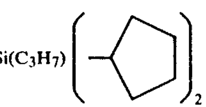 |
| (2517) | 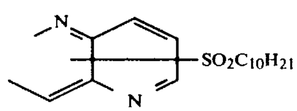 | " | " | " | " OSi($C_4H_9$) 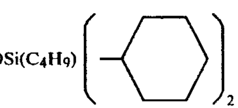 |
| (2518) | 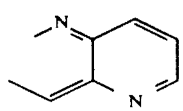 | " | " | " | Ge OSi 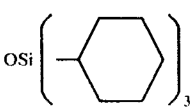 |

-continued
| | | | | | | |
|---|---|---|---|---|---|---|
| (2519) | " | " | " | " | " | OSi($C_2H_5$) 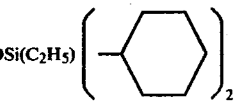 |
| (2520) | 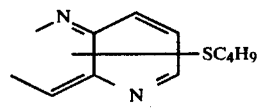 | " | " | " | " | OSi$(C_4H_9)_2$ 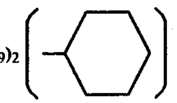 |
| (2521) | 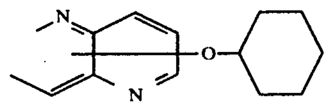 | = $A^1$ | = $A^1$ | = $A^1$ | Si | OSi$(C_2H_5)_3$ |
| (2522) | 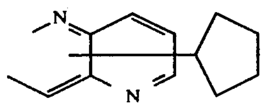 | " | " | " | " | OSi$(C_4H_9)_3$ |
| (2523) | 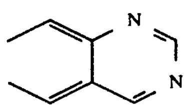 | " | " | " | " | OSi$(C_6H_{13})_3$ |
| (2524) | " | " | " | " | " | OSi$(C_4H_9)_3$ |
| (2525) | " | " | " | " | " | OSi$(C_3H_7)_3$ |
| (2526) | " | " | " | " | " | OSi$(C_2H_5)_3$ |
| (2527) | " | " | " | " | " | OSi$(CH_3)_2(C_{18}H_{37})$ |
| (2528) | " | " | " | " | " | OSi$(CH_3)_2$(t-$C_4H_9$) |
| (2529) | " | " | " | " | " | OSi$(CH_3)_2(OC_8H_{17})$ |
| (2530) | " | " | " | " | " | OSi$(CH_3)_2(OC_{10}H_{21})$ |
| (2531) | 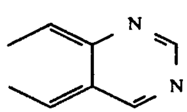 | = $A^1$ | = $A^1$ | = $A^1$ | Si | OSi$(CH_3)_2(OC_{12}H_{25})$ |
| (2532) | " | " | " | " | " | OSi$(CH_3)_2(OC_{14}H_{29})$ |
| (2533) | " | " | " | " | " | OSi$(CH_3)_2(OC_6H_5)$ |
| (2534) | " | " | " | " | " | OSi$(OCH_3)_3$ |
| (2535) | " | " | " | " | " | OSi$(C_6H_5)_3$ |
| (2536) | " | " | " | " | " | OSi$(CH_3)_2(C_6H_5)$ |
| (2537) | " | " | " | " | " | OSi$(OC_6H_5)_3$ |
| (2538) | " | " | " | " | " | OSi$(OC_6H_{13})_3$ |

-continued
| | | | | | | |
|---|---|---|---|---|---|---|
| (2539) | 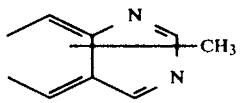 | ″ | ″ | ″ | ″ | $OSi(C_6H_{13})_3$ |
| (2540) | 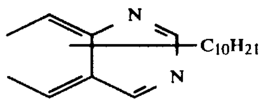 | 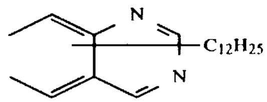 | 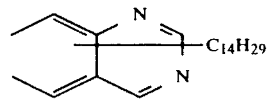 | 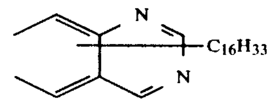 | ″ | $OC(C_6H_5)_3$ |
| (2541) | 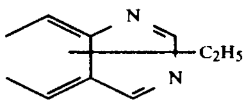 | $= A^1$ | $= A^1$ | $= A^1$ | Si | $OSi(C_6H_{13})_3$ |
| (2542) | 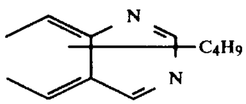 | ″ | ″ | ″ | ″ | $OSi(CH_3)_2(OC_{18}H_{27})$ |
| (2543) | 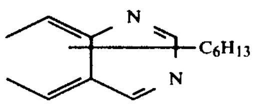 | ″ | ″ | ″ | ″ | $OSi(CH_3)_2(C_6H_5)$ |
| (2544) | 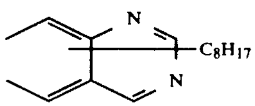 | ″ | ″ | ″ | ″ | $OSi(C_6H_5)_3$ |
| (2545) | 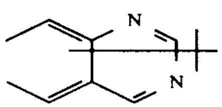 | ″ | ″ | ″ | ″ | $OSi(CH_3)_2(OC_6H_5)$ |
| (2546) | 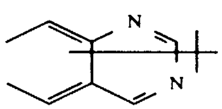 | ″ | ″ | ″ | ″ | $OC(C_3H_7)_3$ |

| | | | | | | |
|---|---|---|---|---|---|---|
| (2547) | 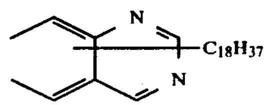 | " | " | " | " | $OC_{18}H_{37}$ |
| (2548) | 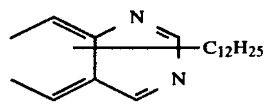 | " | " | " | " | $OC(C_6H_5)_3$ |
| (2549) | 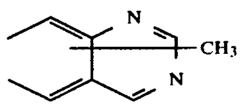 | " | " | " | " | $OSi(C_3H_7)_3$ |
| (2550) | 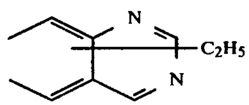 | " | " | " | " | $OSi(C_2H_5)_3$ |
| (2551) | 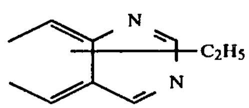 | $= A^1$ | $= A^1$ | $= A^1$ | Si | $OSi(CH_3)_2(C_8H_{17})$ |
| (2552) | 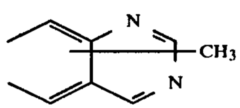 | " | " | " | " | $OSi(CH_3)_2(OC_{18}H_{37})$ |
| (2553) | 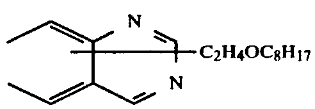 | " | " | " | " | $OSi(C_2H_5)_3$ |
| (2554) | 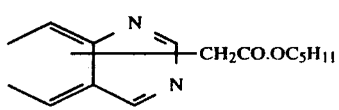 | " | " | " | " | $OSi(C_3H_7)_3$ |
| (2555) | 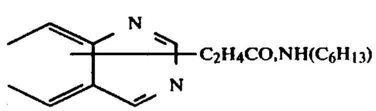 | " | " | " | " | $OSi(C_4H_9)_3$ |

-continued
| | | | | | | |
|---|---|---|---|---|---|---|
| (2556) | 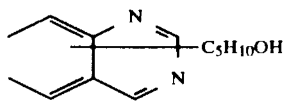 | " | " | " | " | $OSi(C_2H_5)_3$ |
| (2557) | 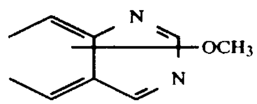 | " | " | " | " | $OSi(C_6H_{13})_3$ |
| (2558) | 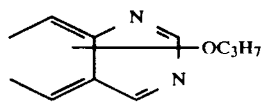 | " | " | " | " | $OSi(C_4H_9)_3$ |
| (2559) | 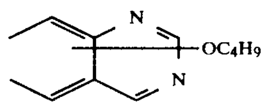 | " | " | " | " | $OSi(C_3H_7)_3$ |
| (2560) | 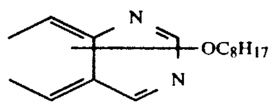 | " | " | " | " | " |
| (2561) | 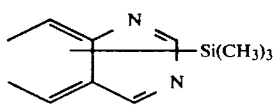 | $= A^1$ | $= A^1$ | $= A^1$ | Si | $OSi(C_4H_9)_3$ |
| (2562) | 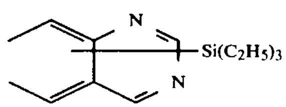 | " | " | " | " | $OSi(C_3H_7)_3$ |
| (2563) | 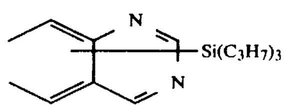 | " | " | " | " | $OSi(C_2H_5)_3$ |
| (2564) | 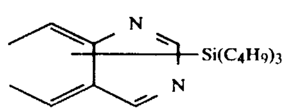 | " | " | " | " | $OSi(CH_3)_3$ |

-continued
| | | | | | |
|---|---|---|---|---|---|
| (2565) | 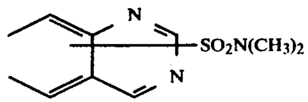 | " | " | " | " $OSi(C_6H_{13})_3$ |
| (2566) | 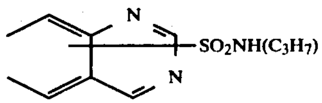 | " | " | " | " $OSi(C_4H_9)_3$ |
| (2567) | 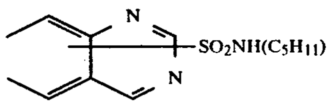 | " | " | " | " $OSi(C_3H_7)_3$ |
| (2568) | 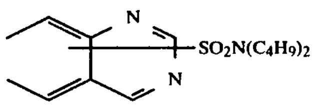 | " | " | " | " $OSi(C_4H_9)_3$ |
| (2569) | 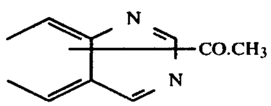 | " | " | " | " $OSi(C_6H_{13})_3$ |
| (2570) | 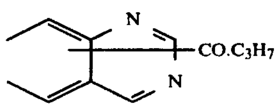 | " | " | " | " $OSi(C_4H_9)_3$ |
| (2571) | 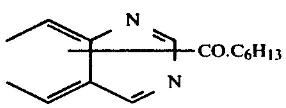 | $= A^1$ | $= A^1$ | $= A^1$ | Si $OSi(C_3H_7)_3$ |
| (2572) | 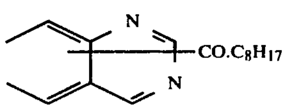 | " | " | " | " $OSi(C_2H_5)_3$ |
| (2573) | 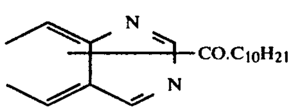 | " | " | " | " $OSi(CH_3)_3$ |

-continued
| | | | | | |
|---|---|---|---|---|---|
| (2574) | 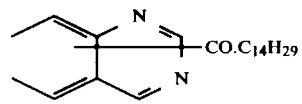 | " | " | " | " OSi($(CH_3)_3$) |
| (2575) | 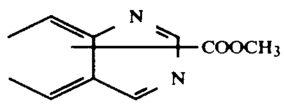 | " | " | " | " OSi$(C_6H_{13})_3$ |
| (2576) | 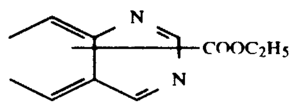 | " | " | " | " OSi$(C_4H_9)_3$ |
| (2577) | 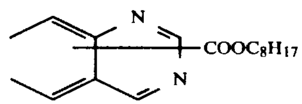 | " | " | " | " " |
| (2578) | 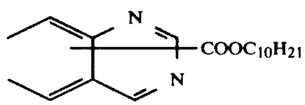 | " | " | " | " OSi$(C_3H_7)_3$ |
| (2579) | 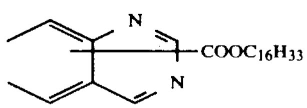 | " | " | " | " OSi$(C_2H_5)_3$ |
| (2580) | 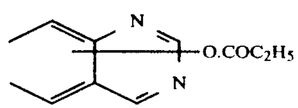 | " | " | " | " OSi$(C_6H_{13})_3$ |
| (2581) | 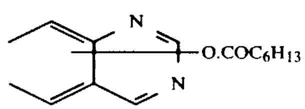 | $= A^1$ | $= A^1$ | $= A^1$ | Si OSi$(C_4H_9)_3$ |
| (2582) | 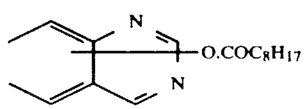 | " | " | " | " OSi$(C_3H_7)_3$ |

-continued
| | | | | | |
|---|---|---|---|---|---|
| (2583) | 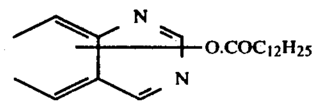 | " | " | " | " $OSi(C_2H_5)_3$ |
| (2584) | 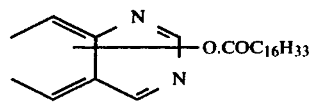 | " | " | " | " $OSi(CH_3)_3$ |
| (2585) | 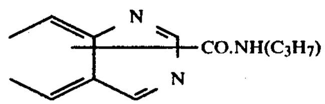 | " | " | " | " $OSi(C_6H_{13})_3$ |
| (2586) | 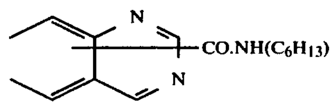 | " | " | " | " " |
| (2587) | 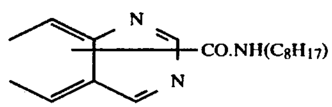 | " | " | " | " $OSi(C_3H_7)_3$ |
| (2588) | 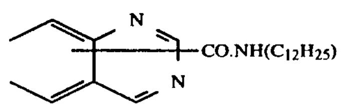 | " | " | " | " $OSi(C_2H_5)_3$ |
| (2589) | 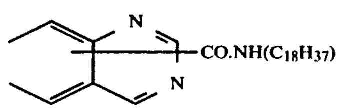 | " | " | " | " $OSi(CH_3)_3$ |
| (2590) | 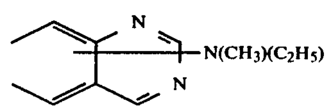 | " | " | " | " $OSi(C_6H_{13})_3$ |
| (2591) | 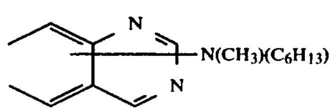 | $=A^1$ | $=A^1$ | $=A^1$ | Si $OSi(C_4H_9)_3$ |

-continued
| | | | | | |
|---|---|---|---|---|---|
| (2592) | 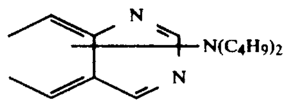  | " | " | " | " $OSi(C_6H_{13})_3$ |
| (2593) | 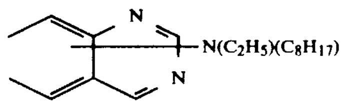  | " | " | " | " $OSi(C_3H_7)_3$ |
| (2594) | 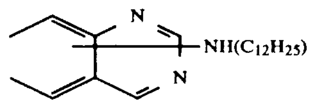  | " | " | " | " $OSi(C_2H_5)_3$ |
| (2595) | 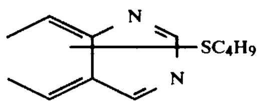  | " | " | " | " $OSi(C_6H_{13})_3$ |
| (2596) | 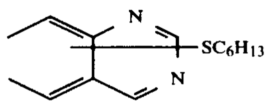  | " | " | " | " $OSi(C_4H_9)_3$ |
| (2597) | 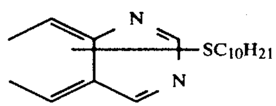  | " | " | " | " " |
| (2598) | 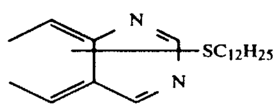  | " | " | " | " $OSi(C_2H_5)_3$ |
| (2599) | 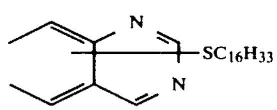  | " | " | " | " $OSi(CH_3)_3$ |
| (2600) | 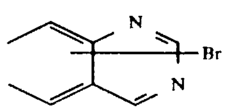  | " | " | " | " $OSi(C_4H_9)_3$ |

-continued
| | | | | | | |
|---|---|---|---|---|---|---|
| (2601) | 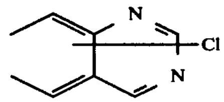 | $= A^1$ | $= A^1$ | $= A^1$ | Si | $OSi(C_4H_9)_3$ |
| (2602) | 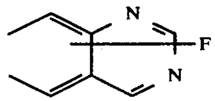 | " | " | " | " | $OSi(C_3H_7)_3$ |
| (2603) | 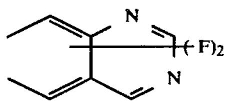 | " | " | " | " | $OSi(C_2H_5)_3$ |
| (2604) | 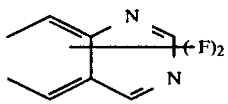 | " | " | " | " | $OSi(CH_3)_3$ |
| (2605) | 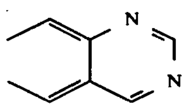 | " | " | " | " | $OSi(C_2H_5)_3$ |
| (2606) | " | " | " | " | " | $OSi(C_4H_9)_3$ |
| (2607) | " | " | " | " | " | $OSi(C_6H_5)_3$ |
| (2608) | 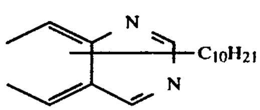 | 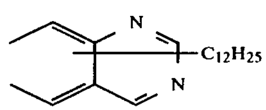 | 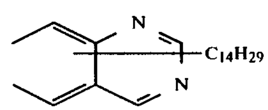 | 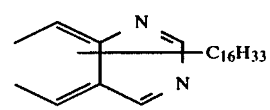 | " | $OC(C_6H_5)_3$ |
| (2609) | 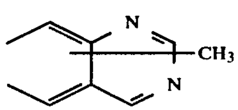 | $= A^1$ | $= A^1$ | $= A^1$ | " | $OSi(C_6H_5)_3$ |
| (2610) | " | " | " | " | " | $OC_{10}H_{21}$ |
| (2611) | 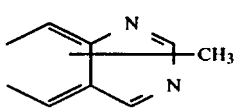 | $= A^1$ | $= A^1$ | $= A^1$ | Ge | $OSi(C_4H_9)_3$ |

-continued
| | | | | | | |
|---|---|---|---|---|---|---|
| (2612) | " | " | " | " | " | $OC_{14}H_{29}$ |
| (2613) | 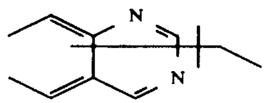 | " | " | " | " | $O(t\text{-}C_5H_{11})$ |
| (2614) | 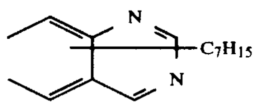 | " | " | " | " | $OSi(C_4H_9)_3$ |
| (2615) | 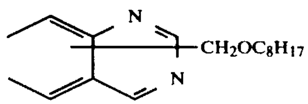 | " | " | " | " | " |
| (2616) | 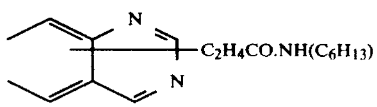 | " | " | " | " | $OSi(C_2H_5)_3$ |
| (2617) | 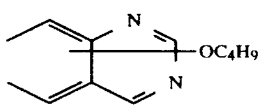 | " | " | " | " | $OSi(C_4H_9)_3$ |
| (2618) | 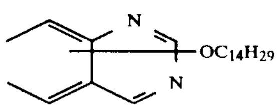 | " | " | " | " | " |
| (2619) | 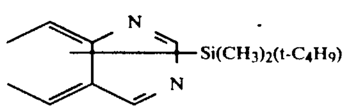 | " | " | " | " | $OSi(C_4H_9)_3$ |
| (2620) | 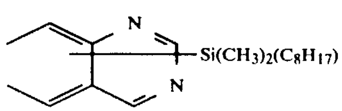 | " | " | " | " | $OSi(C_2H_5)_3$ |

-continued
| | | | | | | |
|---|---|---|---|---|---|---|
| (2621) | 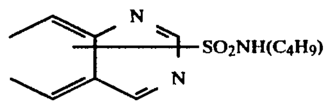 | = A[1] | = A[1] | = A[1] | Ge | $OSi(C_4H_9)_3$ |
| (2622) | 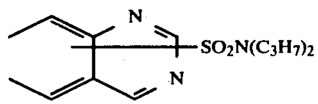 | " | " | " | " | $OSi(CH_3)_2(C_8H_{17})$ |
| (2623) | 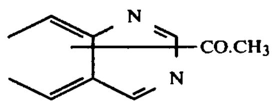 | " | " | " | " | $OSi(C_6H_{13})_3$ |
| (2624) | 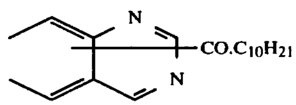 | " | " | " | " | $OSi(C_2H_5)_3$ |
| (2625) | 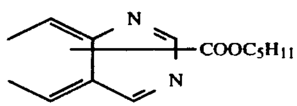 | " | " | " | " | " |
| (2626) | 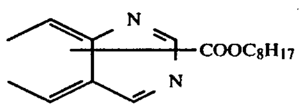 | " | " | " | " | " |
| (2627) | 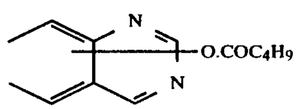 | " | " | " | " | $OSi(C_4H_9)_3$ |
| (2628) | 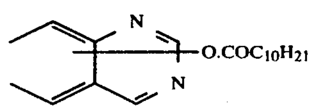 | " | " | " | " | $OSi(C_2H_5)_3$ |
| (2629) | 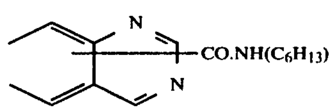 | " | " | " | " | $OSi(C_4H_9)_3$ |

-continued
| | | | | | |
|---|---|---|---|---|---|
| (2630) | 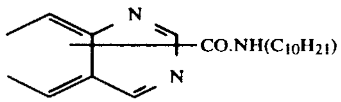 | " | " | " | " $OSi(C_2H_5)_3$ |
| (2631) | 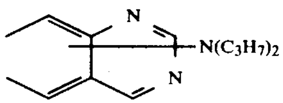 | = $A^1$ | = $A^1$ | = $A^1$ | Ge $OSi(CH_3)_2(t\text{-}C_4H_9)$ |
| (2632) | 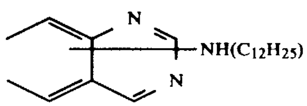 | " | " | " | " $OSi(C_2H_5)_3$ |
| (2633) | 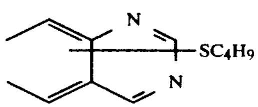 | " | " | " | " $OSi(C_4H_9)_3$ |
| (2634) | 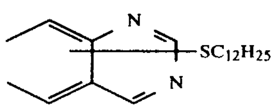 | " | " | " | " $OSi(C_3H_7)_3$ |
| (2635) | 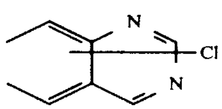 | " | " | " | " $OSi(C_4H_9)_3$ |
| (2636) | 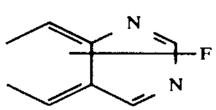 | " | " | " | " $OSi(C_6H_{13})_3$ |
| (2637) | 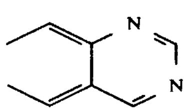 | " | " | " | Sn $OSi(C_2H_5)_3$ |
| (2638) | " | " | " | " | " $OSi(C_6H_5)_3$ |

-continued
| | | | | | |
|---|---|---|---|---|---|
| (2639) | 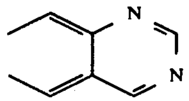 | " | " | " | " OSi(C$_4$H$_9$)$_3$ |
| (2640) | 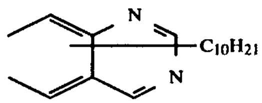 | " | " | " | " OSi(C$_2$H$_5$)$_3$ |
| (2641) | 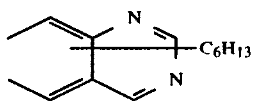 | = A[1] | = A[1] | = A[1] | Sn OSi(C$_4$H$_9$)$_3$ |
| (2642) | 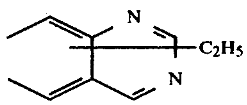 | " | " | " | " OC$_{18}$H$_{37}$ |
| (2643) | 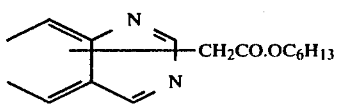 | " | " | " | " OSi(C$_4$H$_9$)$_3$ |
| (2644) | 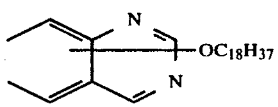 | " | " | " | " OSi(C$_2$H$_5$)$_3$ |
| (2645) | 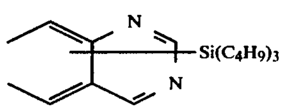 | " | " | " | " OSi(CH$_3$)$_3$ |
| (2646) | 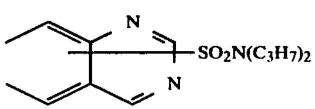 | " | " | " | " OSi(C$_6$H$_{13}$)$_3$ |
| (2647) | 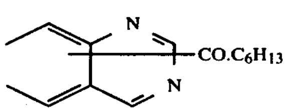 | " | " | " | " OSi(C$_4$H$_9$)$_3$ |

-continued
| | | | | | | |
|---|---|---|---|---|---|---|
| (2648) | 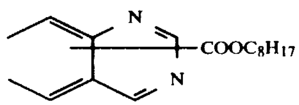 | " | " | " | " | " |
| (2649) | 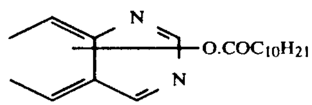 | " | " | " | " | $OSi(C_2H_5)_3$ |
| (2650) | 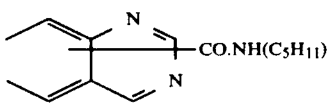 | " | " | " | " | $OSi(C_6H_{13})_3$ |
| (2651) | 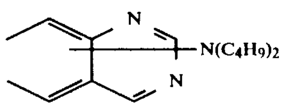 | = $A^1$ | = $A^1$ | = $A^1$ | Sn | $OSi(C_6H_5)_3$ |
| (2652) | 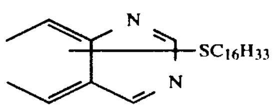 | " | " | " | " | $OSi(C_2H_5)_3$ |
| (2653) | 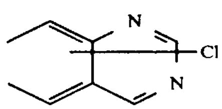 | " | " | " | " | $OSi(C_4H_9)_3$ |
| (2654) | 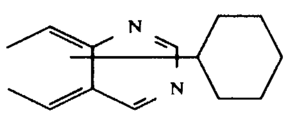 | " | " | " | " | $OSi(CH_3)_2(C_4H_9)$ |
| (2655) | 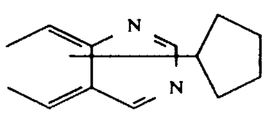 | " | " | " | " | $OSi(C_4H_9)_3$ |

-continued
| | | | | | | |
|---|---|---|---|---|---|---|
| (2656) | 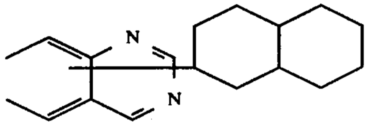 | " | " | " | " | $OSi(C_2H_5)_3$ |
| (2657) | 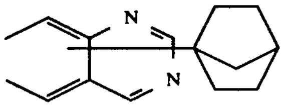 | " | " | " | " | $OSi(C_3H_7)_3$ |
| (2658) | 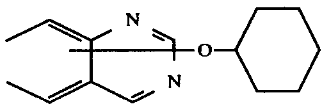 | " | " | " | " | $OSi(C_4H_9)_2$ 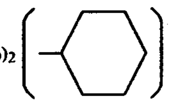 |
| (2659) | 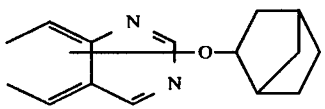 | " | " | " | " | $OSi(C_4H_9)_3$ |
| (2660) | 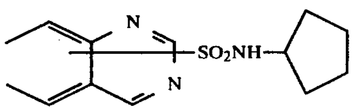 | " | " | " | " | $OSi(C_3H_7)_3$ |
| (2661) | 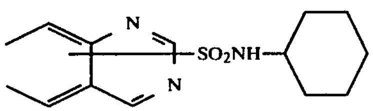 | $= A^1$ | $= A^1$ | $= A^1$ | Si | $OSi(C_2H_5)_3$ |
| (2662) | 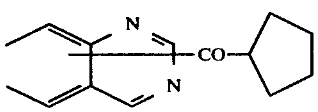 | " | " | " | " | $OSi(C_6H_{13})_3$ |
| (2663) | 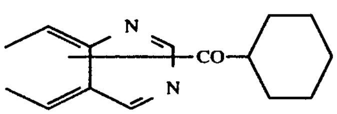 | " | " | " | " | $OSi(C_4H_9)_3$ |

| | | | | | | |
|---|---|---|---|---|---|---|
| (2664) | 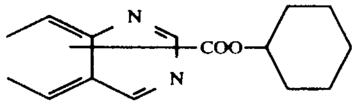 | " | " | " | " | $OSi(C_3H_7)_3$ |
| (2665) | 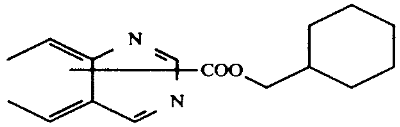 | " | " | " | " | $OSi(C_2H_5)_3$ |
| (2666) | 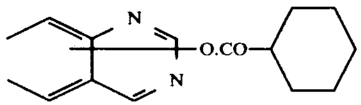 | " | " | " | " | $OSi(C_3H_7)_3$ |
| (2667) | 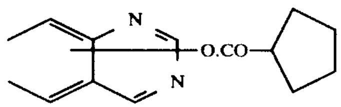 | " | " | " | " | $OSi(C_4H_9)_3$ |
| (2668) | 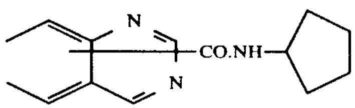 | " | " | " | " | $OSi(C_6H_{13})_3$ |
| (2669) | 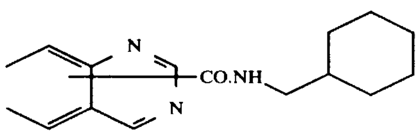 | " | " | " | " | $OSi(C_4H_9)_3$ |
| (2670) | 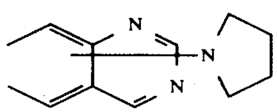 | " | " | " | " | " |
| (2671) | 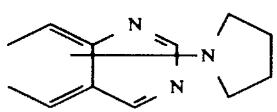 | $= A^1$ | $= A^1$ | $= A^1$ | Si | $OSi(C_3H_7)_3$ |

-continued
| | | | | | | |
|---|---|---|---|---|---|---|
| (2672) | 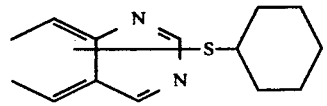 | " | " | " | " | $OSi(C_4H_9)_3$ |
| (2673) | 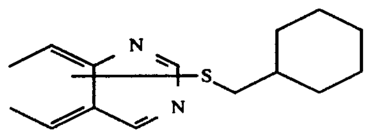 | " | " | " | " | $OSi(C_2H_5)_3$ |
| (2674) | 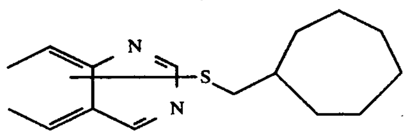 | " | " | " | " | $OSi(CH_3)_3$ |
| (2675) | 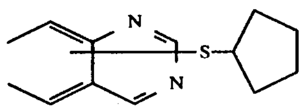 | " | " | " | " | $OSi(C_4H_9)_3$ |
| (2676) | 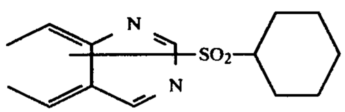 | " | " | " | " | $OSi(C_3H_7)_3$ |
| (2677) | 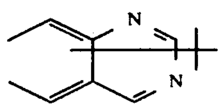 | " | " | " | " | $OSi(C_4H_9)_3$ |
| (2678) | 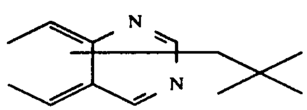 | " | " | " | " | $OSi(C_3H_7)_3$ |
| (2679) | 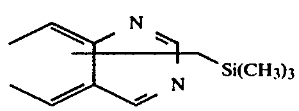 | " | " | " | " | $OSi(C_3H_7)_3$ |

-continued
| | | | | | | |
|---|---|---|---|---|---|---|
| (2680) | 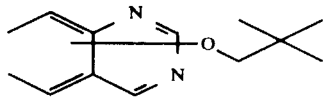 | ″ | ″ | ″ | ″ | $OSi(C_2H_5)_3$ |
| (2681) | 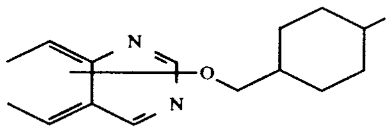 | $= A^1$ | $= A^1$ | $= A^1$ | Si | $OSi(C_2H_5)_3$ |
| (2682) | 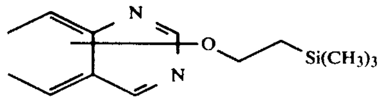 | ″ | ″ | ″ | ″ | $OSi(C_3H_7)_3$ |
| (2683) | 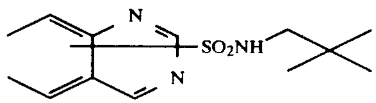 | ″ | ″ | ″ | ″ | $OSi(C_6H_{13})_3$ |
| (2684) | 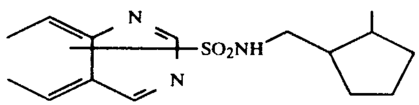 | ″ | ″ | ″ | ″ | $OSi(C_4H_9)_3$ |
| (2685) | 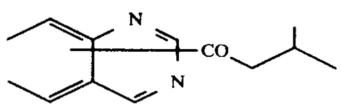 | ″ | ″ | ″ | ″ | ″ |
| (2686) | 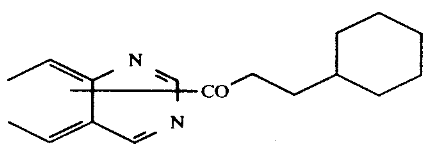 | ″ | ″ | ″ | ″ | $OSi(C_3H_7)_3$ |
| (2687) | 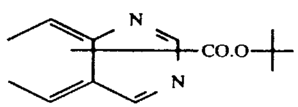 | ″ | ″ | ″ | ″ | $OSi(C_4H_9)_3$ |

-continued
| | | | | | | |
|---|---|---|---|---|---|---|
| (2688) | 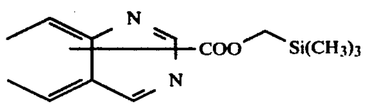 | " | " | " | " | $OSi(C_2H_5)_3$ |
| (2689) | 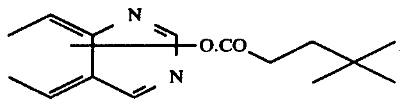 | " | " | " | " | $OSi(CH_3)_3$ |
| (2690) | 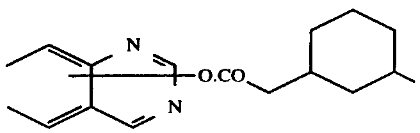 | " | " | " | " | $OSi(C_2H_5)_3$ |
| (2691) | 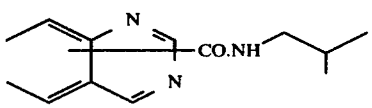 | $= A^1$ | $= A^1$ | $= A^1$ | Si | $OSi(C_4H_9)_3$ |
| (2692) | 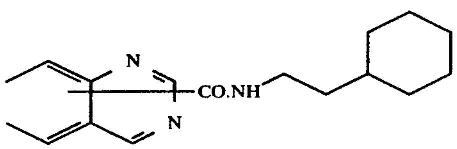 | " | " | " | " | $OSi(C_3H_7)_3$ |
| (2693) | 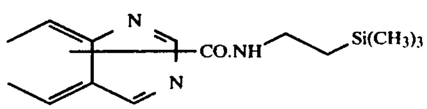 | " | " | " | " | $OSi(C_2H_5)_3$ |
| (2694) | 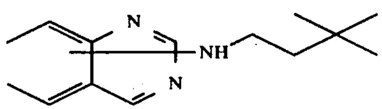 | " | " | " | " | $OSi(C_3H_7)_3$ |
| (2695) | 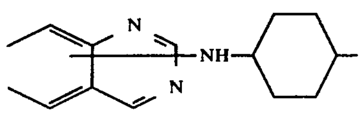 | " | " | " | " | $OSi(C_4H_9)_3$ |

-continued
| | | | | | |
|---|---|---|---|---|---|
| (2696) | 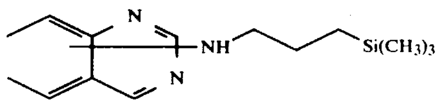 | " | " | " | " $OSi(CH_3)_3$ |
| (2697) | 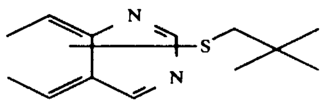 | " | " | " | " $OSi(C_2H_5)_3$ |
| (2698) | 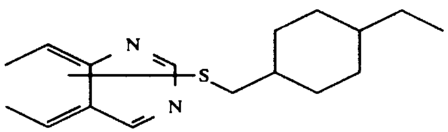 | " | " | " | " $OSi(C_3H_7)_3$ |
| (2699) | 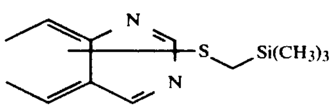 | " | " | " | " $OSi(C_2H_5)_3$ |
| (2700) | 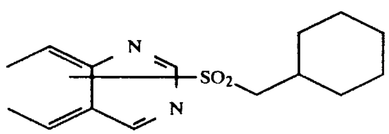 | " | " | " | " $OSi(C_6H_{13})_3$ |
| (2701) | 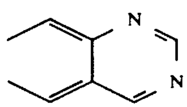 | $= A^1$ | $= A^1$ | $= A^1$ | Si 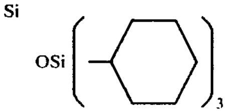 |
| (2702) | 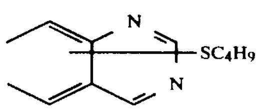 | " | " | " | " 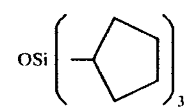 |
| (2703) | 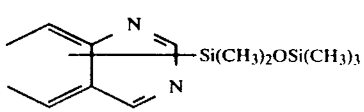 | " | " | " | " 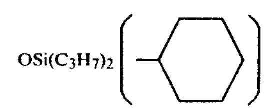 |

-continued
| | | | | | |
|---|---|---|---|---|---|
| (2704) | 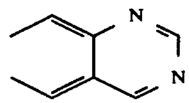 | " | " | " | " OSi($C_2H_5$) 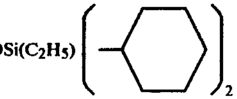 |
| (2705) | 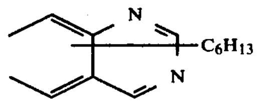 | " | " | " | " OSi 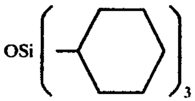 |
| (2706) | 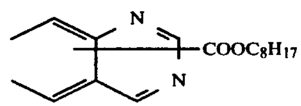 | " | " | " | " OSi 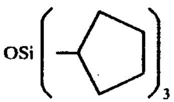 |
| (2707) | 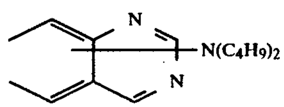 | " | " | " | " OSi($C_4H_9$)$_2$ 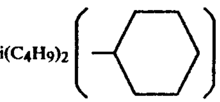 |
| (2708) | 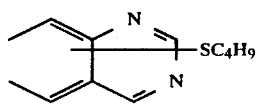 | " | " | " | " OSi 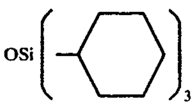 |
| (2709) | 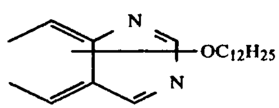 | " | " | " | " OSi($CH_3$)$_2$ 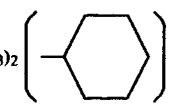 |
| (2710) | 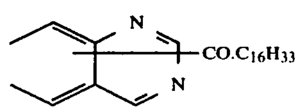 | " | " | " | " OSi($CH_3$)$_2$(t-$C_4H_9$) |
| (2711) | 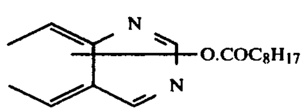 | $= A^1$ | $= A^1$ | $= A^1$ | Si OSi 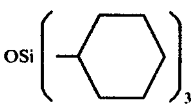 |

-continued
| | | | | | | |
|---|---|---|---|---|---|---|
| (2712) | 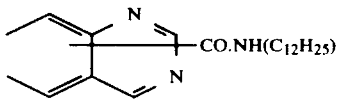 | " | " | " | " | OSi(CH$_3$)$_2$ 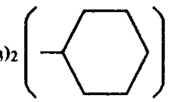 |
| (2713) | 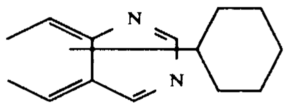 | " | " | " | " | OSi(C$_3$H$_7$)$_2$ 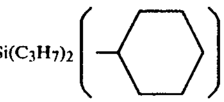 |
| (2714) | 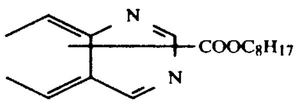 | " | " | " | " | OSi 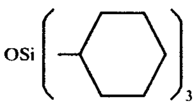 |
| (2715) | 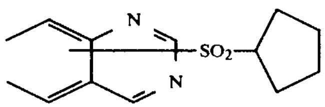 | " | " | " | " | OSi(C$_2$H$_5$)$_3$ |
| (2716) | 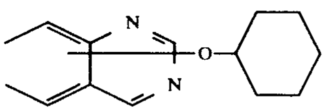 | " | " | " | " | OSi(C$_4$H$_9$)$_3$ |
| (2717) | 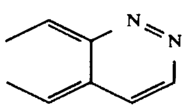 | " | " | " | " | OSi(C$_6$H$_{13}$)$_3$ |
| (2718) | " | " | " | " | " | OSi(C$_4$H$_9$)$_3$ |
| (2719) | " | " | " | " | " | OSi(C$_3$H$_7$)$_3$ |
| (2720) | " | " | " | " | " | OSi(C$_2$H$_5$)$_3$ |
| (2721) | 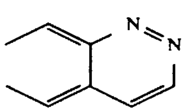 | $=A^1$ | $=A^1$ | $=A^1$ | Si | OSi(CH$_3$)$_2$(C$_{18}$H$_{37}$) |
| (2722) | " | " | " | " | " | OSi(CH$_3$)$_2$(t-C$_4$H$_9$) |
| (2723) | " | " | " | " | " | OSi(CH$_3$)$_2$(OC$_8$H$_{17}$) |

-continued
| | | | | | | |
|---|---|---|---|---|---|---|
| (2724) | " | " | " | " | " | $OSi(CH_3)_2(OC_{10}H_{21})$ |
| (2725) | " | " | " | " | " | $OSi(CH_3)_2(OC_{12}H_{25})$ |
| (2726) | " | " | " | " | " | $OSi(CH_3)_2(OC_{14}H_{29})$ |
| (2727) | " | " | " | " | " | $OSi(CH_3)_2(OC_6H_5)$ |
| (2728) | " | " | " | " | " | $OSi(OCH_3)_3$ |
| (2729) | " | " | " | " | " | $OSi(C_6H_5)_3$ |
| (2730) | " | " | " | " | " | $OSi(CH_3)_2(C_6H_5)$ |
| (2731) | 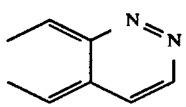 | $= A^1$ | $= A^1$ | $= A^1$ | Si | $OSi(OC_6H_5)_3$ |
| (2732) | " | " | " | " | " | $OSi(OC_6H_{13})_3$ |
| (2733) | 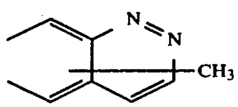 | " | " | " | " | $OSi(C_6H_{13})_3$ |
| (2734) | 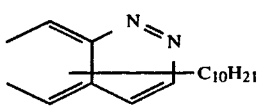 | 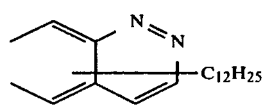 | 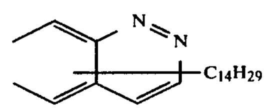 | 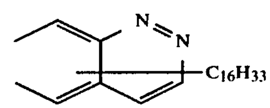 | " | $OC(C_6H_5)_3$ |
| (2735) | 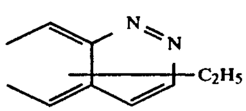 | $= A^1$ | $= A^1$ | $= A^1$ | " | $OSi(OC_6H_{13})_3$ |
| (2736) | 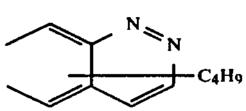 | " | " | " | " | $OSi(CH_3)_2(OC_{18}H_{37})$ |
| (2737) | 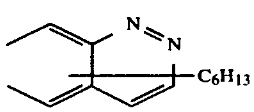 | " | " | " | " | $OSi(CH_3)_2(C_6H_5)$ |

-continued
| | | | | | | |
|---|---|---|---|---|---|---|
| (2738) | 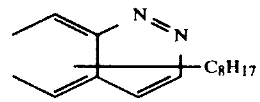 | " | " | " | " | $OSi(C_6H_5)_3$ |
| (2739) | 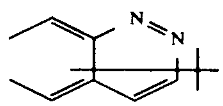 | " | " | " | " | $OSi(CH_3)_2(OC_6H_5)$ |
| (2740) | 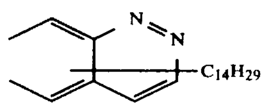 | " | " | " | " | $OC(C_3H_7)_3$ |
| (2741) | 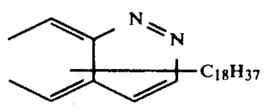 | $= A^1$ | $= A^1$ | $= A^1$ | Si | $OC_{18}H_{37}$ |
| (2742) | 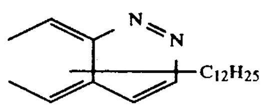 | " | " | " | " | $OC(C_6H_5)_3$ |
| (2743) | 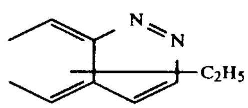 | " | " | " | " | $OSi(C_6H_{13})_3$ |
| (2744) | 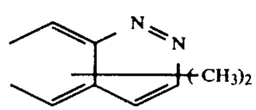 | " | " | " | " | $OSi(C_3H_7)_3$ |
| (2745) | 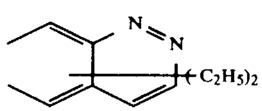 | " | " | " | " | $OSi(C_2H_5)_3$ |
| (2746) | 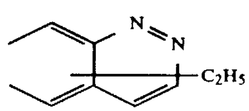 | " | " | " | " | $OSi(CH_3)_2(C_8H_{17})$ |

-continued
| | | | | | | |
|---|---|---|---|---|---|---|
| (2747) | 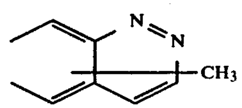 | " | " | " | " | $OSi(CH_3)_2(OC_{18}H_{37})$ |
| (2748) | 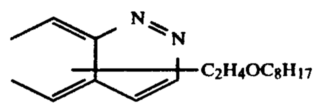 | " | " | " | " | $OSi(C_2H_5)_3$ |
| (2749) | 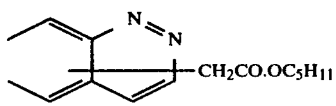 | " | " | " | " | $OSi(C_3H_7)_3$ |
| (2750) | 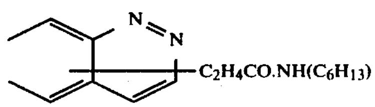 | " | " | " | " | $OC(C_4H_9)_3$ |
| (2751) | 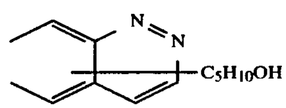 | $= A^1$ | $= A^1$ | $= A^1$ | Si | $OSi(C_2H_5)_3$ |
| (2752) | 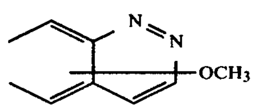 | " | " | " | " | $OSi(C_6H_{13})_3$ |
| (2753) | 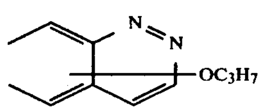 | " | " | " | " | $OSi(C_4H_9)_3$ |
| (2754) | 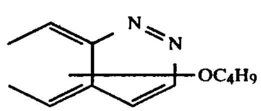 | " | " | " | " | $OSi(C_3H_7)_3$ |
| (2755) | 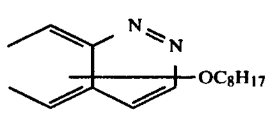 | " | " | " | " | $OSi(C_3H_7)_3$ |

-continued
| | | | | | | |
|---|---|---|---|---|---|---|
| (2756) | 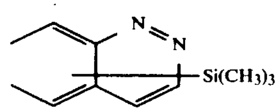 | " | " | " | " | OSi(C₄H₉)₃ |
| (2757) | 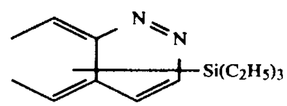 | " | " | " | " | OSi(C₃H₇)₃ |
| (2758) | 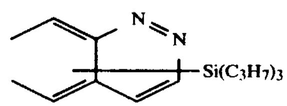 | " | " | " | " | OSi(C₂H₅)₃ |
| (2759) | 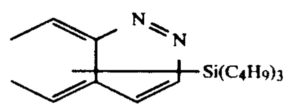 | " | " | " | " | OSi(CH₃)₃ |
| (2760) | 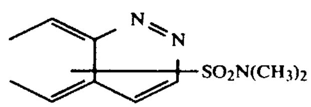 | " | " | " | " | OSi(C₆H₁₃)₃ |
| (2761) | 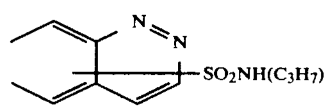 | $=A^1$ | $=A^1$ | $=A^1$ | Si | OSi(C₄H₉)₃ |
| (2762) | 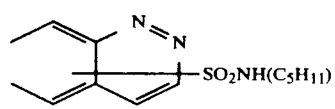 | " | " | " | " | OSi(C₃H₇)₃ |
| (2763) | 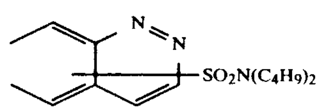 | " | " | " | " | OSi(C₄H₉)₃ |
| (2764) | 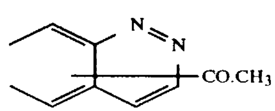 | " | " | " | " | OSi(C₆H₁₃)₃ |

-continued
| | | | | | |
|---|---|---|---|---|---|
| (2765) | 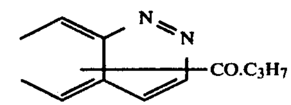 | " | " | " | " $OSi(C_4H_9)_3$ |
| (2766) | 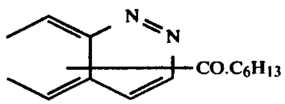 | " | " | " | " $OSi(C_3H_7)_3$ |
| (2767) | 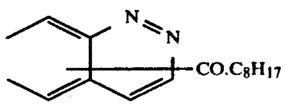 | " | " | " | " $OSi(C_2H_5)_3$ |
| (2768) | 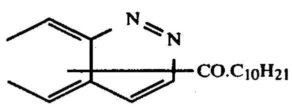 | " | " | " | " $OSi(CH_3)_3$ |
| (2769) | 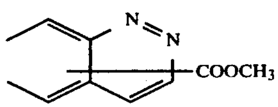 | " | " | " | " $OSi(C_6H_{13})_3$ |
| (2770) | 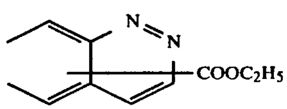 | " | " | " | " $OSi(C_4H_9)_3$ |
| (2771) | 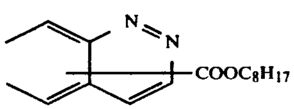 | $= A^1$ | $= A^1$ | $= A^1$ | Si $OSi(C_6H_{13})_3$ |
| (2772) | 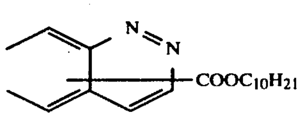 | " | " | " | " $OSi(C_2H_5)_3$ |
| (2773) | 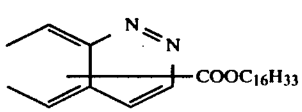 | " | " | " | " $OSi(CH_3)_3$ |

-continued
| | | | | | | |
|---|---|---|---|---|---|---|
| (2774) | 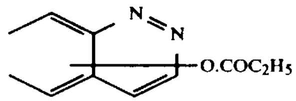 | " | " | " | " | OSi($C_6H_{13}$)$_3$ |
| (2775) | 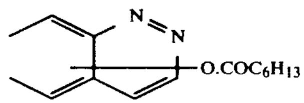 | " | " | " | " | OSi($C_4H_9$)$_3$ |
| (2776) | 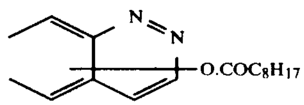 | " | " | " | " | OSi($C_3H_7$)$_3$ |
| (2777) | 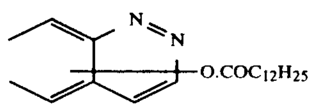 | " | " | " | " | OSi($C_2H_5$)$_3$ |
| (2778) | 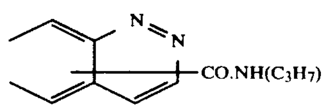 | " | " | " | " | OSi($C_6H_{13}$)$_3$ |
| (2779) | 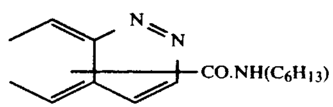 | " | " | " | " | " |
| (2780) | 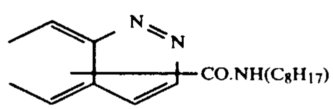 | " | " | " | " | OSi($C_3H_7$)$_3$ |
| (2781) | 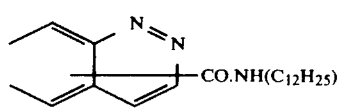 | $=A^1$ | $=A^1$ | $=A^1$ | Si | OSi($C_2H_5$)$_3$ |
| (2782) | 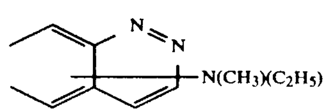 | " | " | " | " | OSi($C_4H_9$)$_3$ |

| | | | | | | |
|---|---|---|---|---|---|---|
| (2783) | 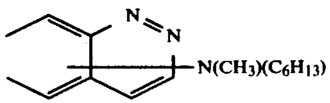 | " | " | " | " | $OSi(C_3H_7)_3$ |
| (2784) | 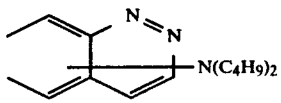 | " | " | " | " | $OSi(C_6H_{13})_3$ |
| (2785) | 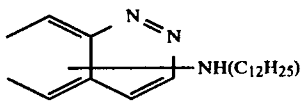 | " | " | " | " | $OSi(C_2H_5)_3$ |
| (2786) | 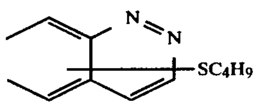 | " | " | " | " | $OSi(C_6H_{13})_3$ |
| (2787) | 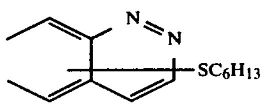 | " | " | " | " | $OSi(C_4H_9)_3$ |
| (2788) | 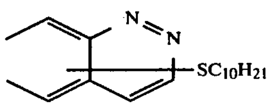 | " | " | " | " | " |
| (2789) | 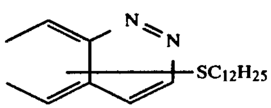 | " | " | " | " | $OSi(C_2H_5)_3$ |
| (2790) | 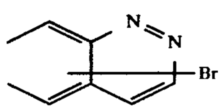 | " | " | " | " | $OSi(C_4H_9)_3$ |
| (2791) | 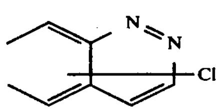 | $= A^1$ | $= A^1$ | $= A^1$ | Si | $OSi(C_4H_9)_3$ |

-continued
| | | | | | | |
|---|---|---|---|---|---|---|
| (2792) | 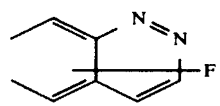 | ″ | ″ | ″ | ″ | $OSi(C_3H_7)_3$ |
| (2793) | 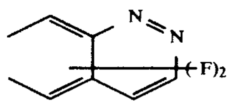 | ″ | ″ | ″ | ″ | $OSi(C_2H_5)_3$ |
| (2794) | 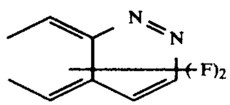 | ″ | ″ | ″ | ″ | $OSi(CH_3)_3$ |
| (2795) | 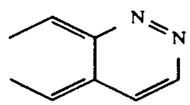 | ″ | ″ | ″ | ″ | $OSi(C_2H_5)_3$ |
| (2796) | ″ | ″ | ″ | ″ | ″ | $OSi(C_4H_9)_3$ |
| (2797) | ″ | ″ | ″ | ″ | ″ | $OSi(C_6H_5)_3$ |
| (2798) | 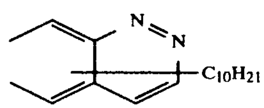 | 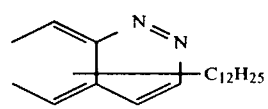 | 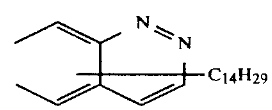 | 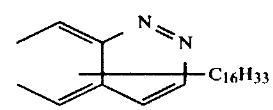 | ″ | $OSi(C_6H_5)_3$ |
| (2799) | 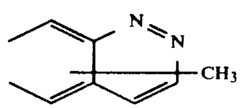 | $= A^1$ | $= A^1$ | $= A^1$ | ″ | $OSi(C_2H_5)_3$ |
| (2800) | ″ | ″ | ″ | ″ | ″ | $OSi(C_4H_9)_3$ |
| (2801) | 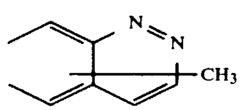 | $= A^1$ | $= A^1$ | $= A^1$ | Ge | $OC_{10}H_{21}$ |
| (2802) | ″ | ″ | ″ | ″ | ″ | $OC_{14}H_{29}$ |

-continued
| | | | | | | |
|---|---|---|---|---|---|---|
| (2803) | 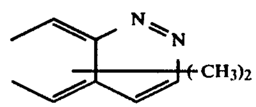 | " | " | " | " | $OSi(C_2H_5)_3$ |
| (2804) | 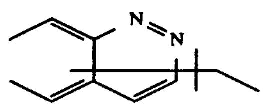 | " | " | " | " | $O(t\text{-}C_5H_{11})$ |
| (2805) | 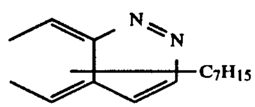 | " | " | " | " | $OSi(C_4H_9)_3$ |
| (2806) | 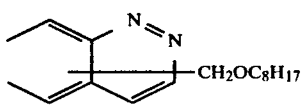 | " | " | " | " | $OSi(CH_3)_2(t\text{-}C_4H_9)$ |
| (2807) | 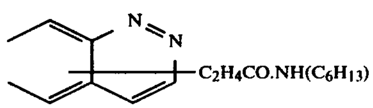 | " | " | " | " | $OSi(C_2H_5)_3$ |
| (2808) | 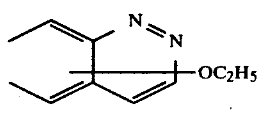 | " | " | " | " | $OSi(C_4H_9)_3$ |
| (2809) | 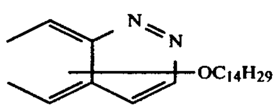 | " | " | " | " | " |
| (2810) | 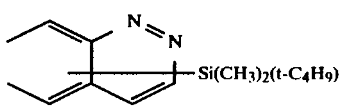 | " | " | " | " | $OSi(C_3H_7)_3$ |
| (2811) | 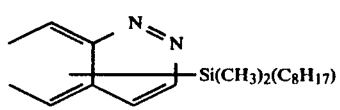 | $= A^1$ | $= A^1$ | $= A^1$ | Ge | $OSi(C_2H_5)_3$ |

-continued
| | | | | | | |
|---|---|---|---|---|---|---|
| (2812) | 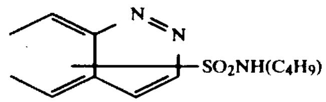 | " | " | " | " | $OSi(C_4H_9)_3$ |
| (2813) | 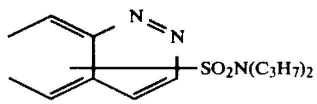 | " | " | " | " | $OSi(CH_3)_2(C_8H_{17})$ |
| (2814) | 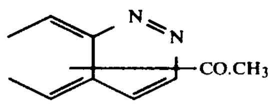 | " | " | " | " | $OSi(C_6H_{13})_3$ |
| (2815) | 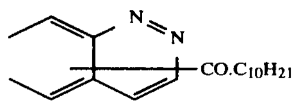 | " | " | " | " | $OSi(C_2H_5)_3$ |
| (2816) | 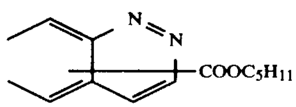 | " | " | " | " | $OSi(C_2H_5)_3$ |
| (2817) | 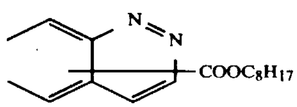 | " | " | " | " | $OSi(C_2H_5)_3$ |
| (2818) | 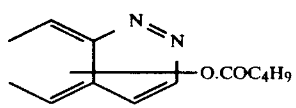 | " | " | " | " | $OSi(C_4H_9)_3$ |
| (2819) | 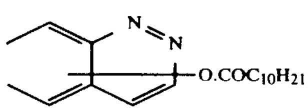 | " | " | " | " | $OSi(C_2H_5)_3$ |
| (2820) | 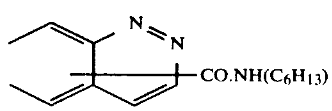 | " | " | " | " | $OSi(C_4H_9)_3$ |

-continued
| | | | | | | |
|---|---|---|---|---|---|---|
| (2821) | 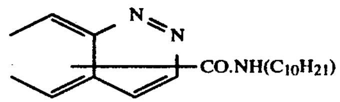 | $= A^1$ | $= A^1$ | $= A^1$ | Ge | $OSi(C_2H_5)_3$ |
| (2822) | 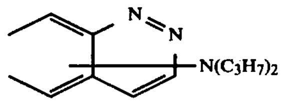 | " | " | " | " | $OSi(CH_3)_2(t\text{-}C_4H_9)$ |
| (2823) | 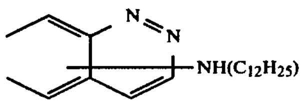 | " | " | " | " | $OSi(C_2H_5)_3$ |
| (2824) | 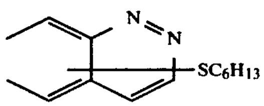 | " | " | " | " | $OSi(C_4H_9)_3$ |
| (2825) | 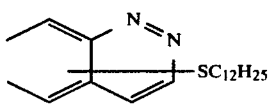 | " | " | " | " | $OSi(C_3H_7)_3$ |
| (2826) | 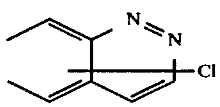 | " | " | " | " | $OSi(C_4H_9)_3$ |
| (2827) | 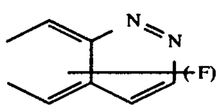 | " | " | " | " | $OSi(C_6H_{13})_3$ |
| (2828) | 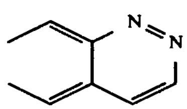 | " | " | " | " | $OSi(C_2H_5)_3$ |
| (2829) | " | " | " | " | " | $OSi(C_6H_5)_3$ |
| (2830) | " | " | " | " | " | $OSi(C_4H_9)_3$ |

-continued
| | | | | | |
|---|---|---|---|---|---|
| (2831) | 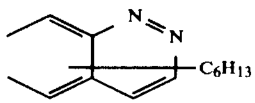 | $= A^1$ | $= A^1$ | $= A^1$ | Sn $OSi(CH_3)_2(t\text{-}C_4H_9)$ |
| (2832) | 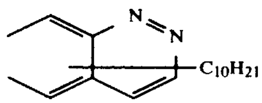 | " | " | " | " $OSi(C_2H_5)_3$ |
| (2833) | 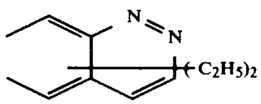 | " | " | " | " $OC_{18}H_{37}$ |
| (2834) | 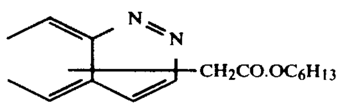 | " | " | " | " $OSi(C_4H_9)_3$ |
| (2835) | 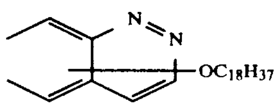 | " | " | " | " $OSi(C_2H_5)_3$ |
| (2836) | 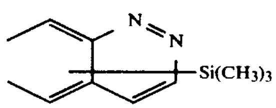 | " | " | " | " $OSi(C_4H_9)_3$ |
| (2837) | 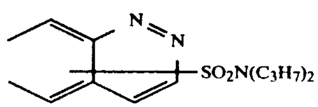 | " | " | " | " $OSi(C_6H_{13})_3$ |
| (2838) | 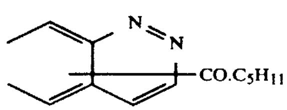 | " | " | " | " $OSi(C_3H_7)_3$ |
| (2839) | 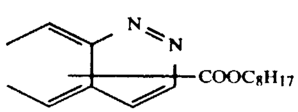 | " | " | " | " $OSi(C_4H_9)_3$ |

-continued
| | | | | | |
|---|---|---|---|---|---|
| (2840) | 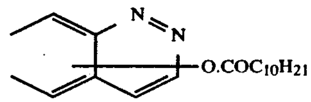 | " | " | " | " $OSi(C_2H_5)_3$ |
| (2841) | 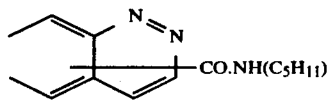 | $= A^1$ | $= A^1$ | $= A^1$ | Sn $OSi(C_6H_{13})_3$ |
| (2842) | 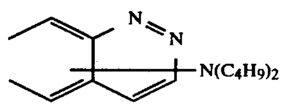 | " | " | " | " $OSi(C_6H_5)_3$ |
| (2843) | 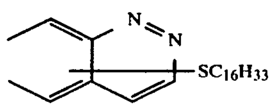 | " | " | " | " $OSi(C_2H_5)_3$ |
| (2844) | 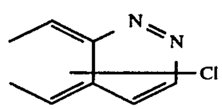 | " | " | " | " $OSi(C_4H_9)_3$ |
| (2845) | 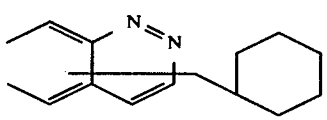 | " | " | " | Si $OSi(C_3H_7)_3$ |
| (2846) | 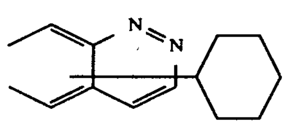 | " | " | " | " " |
| (2847) | 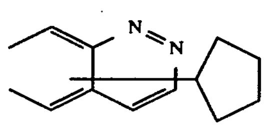 | " | " | " | " $OSi(C_4H_9)_3$ |

-continued
| | | | | | | |
|---|---|---|---|---|---|---|
| (2848) | 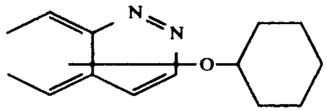 | " | " | " | " | $OSi(C_4H_9)_2$ 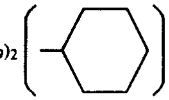 |
| (2849) | 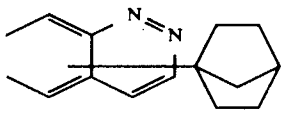 | " | " | " | " | $OSi(C_2H_5)_3$ |
| (2850) | 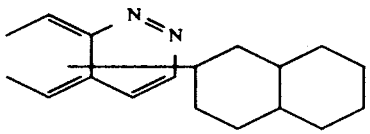 | " | " | " | " | " |
| (2851) | 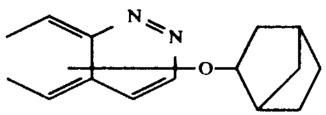 | $= A^1$ | $= A^1$ | $= A^1$ | Si | $OSi(C_4H_9)_3$ |
| (2852) | 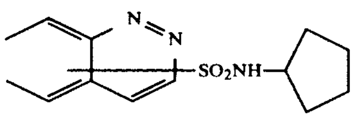 | " | " | " | " | $OSi(C_3H_7)_3$ |
| (2853) | 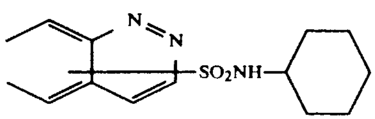 | " | " | " | " | $OSi(C_2H_5)_3$ |
| (2854) | 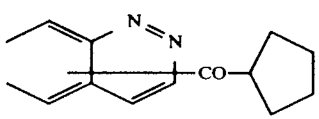 | " | " | " | " | $OSi(C_6H_{13})_3$ |
| (2855) | 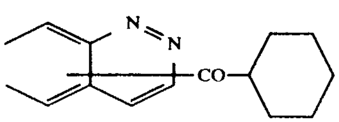 | " | " | " | " | $OSi(C_4H_9)_3$ |

-continued
| | | | | | | |
|---|---|---|---|---|---|---|
| (2856) | 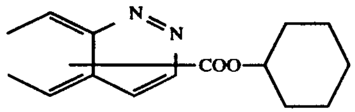 | " | " | " | " | $OSi(C_2H_5)_3$ |
| (2857) | 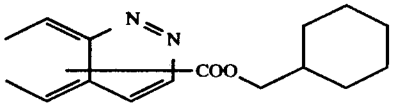 | " | " | " | " | $OSi(C_3H_7)_3$ |
| (2858) | 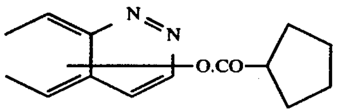 | " | " | " | " | $OSi(C_4H_9)_3$ |
| (2859) | 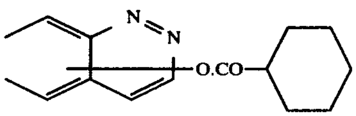 | " | " | " | " | $OSi(C_3H_7)_3$ |
| (2860) | 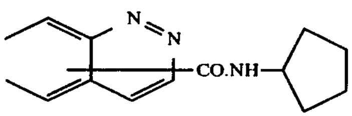 | " | " | " | " | $OSi(C_6H_{13})_3$ |
| (2861) | 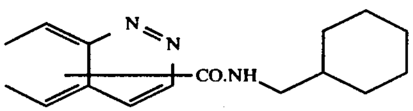 | $= A^1$ | $= A^1$ | $= A^1$ | Si | $OSi(C_4H_9)_3$ |
| (2862) | 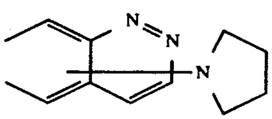 | " | " | " | " | " |
| (2863) | 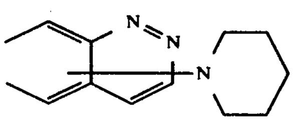 | " | " | " | " | $OSi(C_3H_7)_3$ |

-continued
| | | | | | | |
|---|---|---|---|---|---|---|
| (2864) | 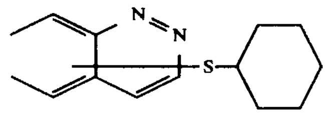 | " | " | " | " | OSi($C_2H_5$)$_2$ 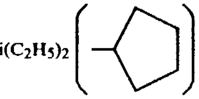 |
| (2865) | " | " | " | " | " | OSi($C_4H_9$) 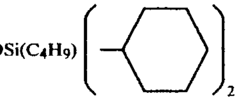 |
| (2866) | 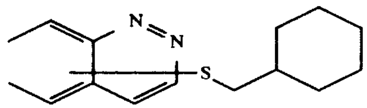 | " | " | " | " | OSi($C_3H_7$)$_3$ |
| (2867) | 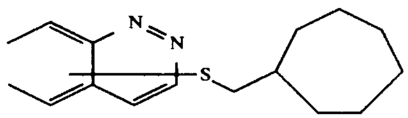 | " | " | " | " | OSi($C_2H_5$)$_3$ |
| (2868) | 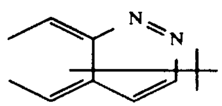 | " | " | " | " | OSi($C_4H_9$)$_3$ |
| (2869) | 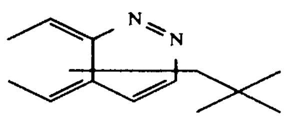 | " | " | " | " | " |
| (2870) | 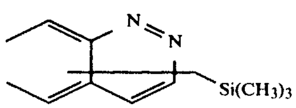 | " | " | " | " | OSi($C_3H_7$)$_3$ |
| (2871) | 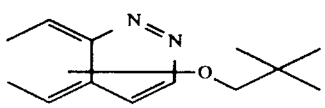 | $= A^1$ | $= A^1$ | $= A^1$ | Si | OSi($C_2H_5$)$_3$ |

-continued
| | | | | | | |
|---|---|---|---|---|---|---|
| (2872) | 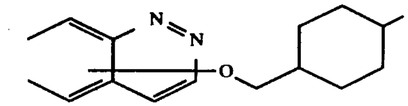 | " | " | " | " | " |
| (2873) | 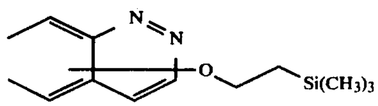 | " | " | " | " | " |
| (2874) | 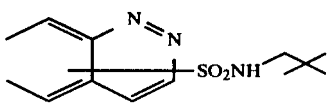 | " | " | " | " | $OSi(C_6H_{13})_3$ |
| (2875) | 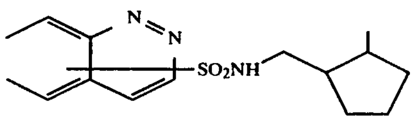 | " | " | " | " | " |
| (2876) | 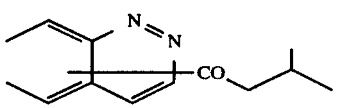 | " | " | " | " | $OSi(C_4H_9)_3$ |
| (2877) | 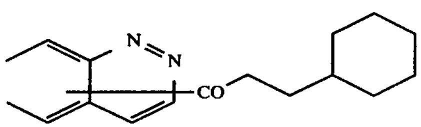 | " | " | " | " | $OSi(C_3H_7)_3$ |
| (2878) | 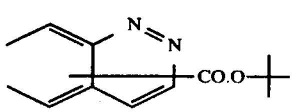 | " | " | " | " | $OSi(C_4H_9)_3$ |
| (2879) | 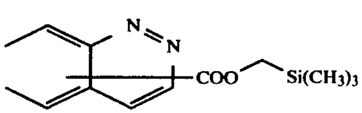 | " | " | " | " | $OSi(C_2H_5)_3$ |

-continued
| | | | | | | |
|---|---|---|---|---|---|---|
| (2880) | 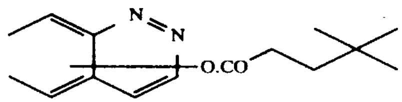 | " | " | " | " | $OSi(CH_3)_3$ |
| (2881) | 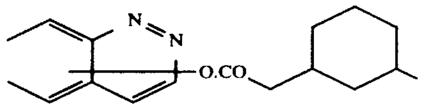 | $= A^1$ | $= A^1$ | $= A^1$ | Si | $OSi(C_2H_5)_3$ |
| (2882) | 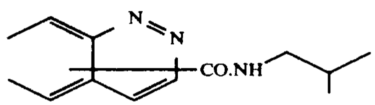 | " | " | " | " | $OSi(C_6H_{13})_3$ |
| (2883) | 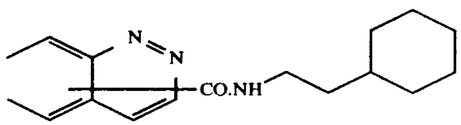 | " | " | " | " | $OSi(C_4H_9)_3$ |
| (2884) | 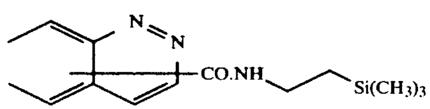 | " | " | " | " | $OSi(C_2H_5)_3$ |
| (2885) | 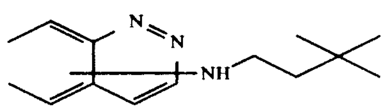 | " | " | " | " | $OSi(C_3H_7)_3$ |
| (2886) | 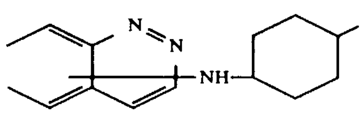 | " | " | " | " | $OSi(C_4H_9)_3$ |
| (2887) | 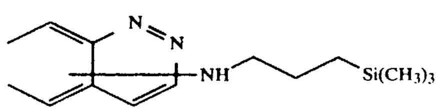 | " | " | " | " | $OSi(CH_3)_3$ |

-continued
| | | | | | |
|---|---|---|---|---|---|
| (2888) | 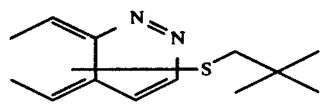 | " | " | " | " $OSi(C_2H_5)_3$ |
| (2889) | 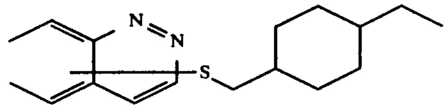 | " | " | " | " $OSi(C_3H_7)_3$ |
| (2890) | 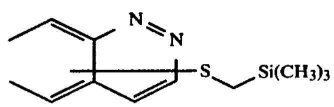 | " | " | " | " $OSi(C_2H_5)_3$ |
| (2891) | 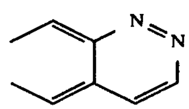 | = $A^1$ | = $A^1$ | = $A^1$ | Si OSi 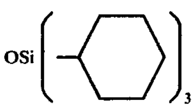 |
| (2892) | " | " | " | " | " OSi 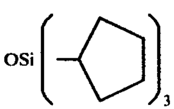 |
| (2893) | " | " | " | " | " $OSi(C_3H_7)_2$ 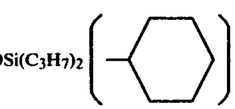 |
| (2894) | " | " | " | " | " $OSi(C_2H_5)$ 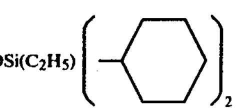 |
| (2895) | 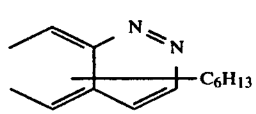 | " | " | " | " OSi 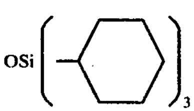 |

-continued
| | | | | | |
|---|---|---|---|---|---|
| (2896) | 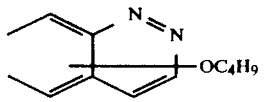 | " | " | " | " OSi$(C_4H_9)_2$ 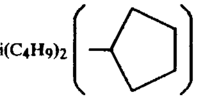 |
| (2897) | 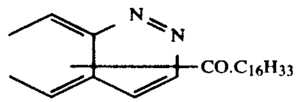 | " | " | " | " OSi$(CH_3)_2$(t-$C_4H_9$) |
| (2898) | 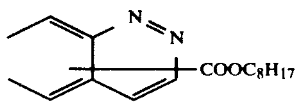 | " | " | " | " OSi$(C_3H_7)$ 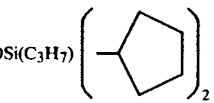 |
| (2899) | 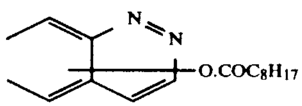 | " | " | " | " OSi 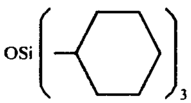 |
| (2900) | 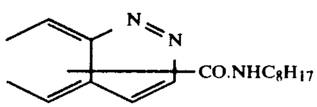 | " | " | " | " OSi$(CH_3)(C_4H_9)$ 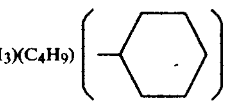 |
| (2901) | 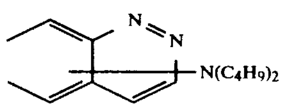 | $=A^1$ | $=A^1$ | $=A^1$ | Si OSi 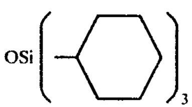 |
| (2902) | 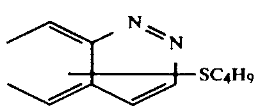 | " | " | " | " OSi$(CH_3)_2$ 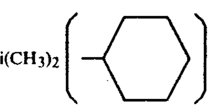 |
| (2903) | 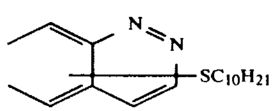 | " | " | " | " OSi$(C_4H_9)_2$ 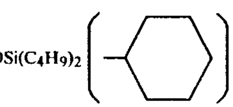 |

-continued
| | | | | | | |
|---|---|---|---|---|---|---|
| (2904) | 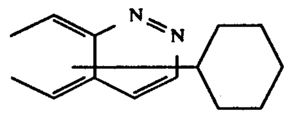 | " | " | " | Ge | $OSi(C_4H_9)_3$ |
| (2905) | 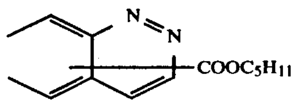 | " | " | " | " | $OSi(C_4H_9)_2$ 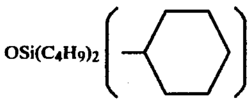 |

The tetraazaporphins of the formula (I) can be produced by reacting a compound of the formula:

(II)

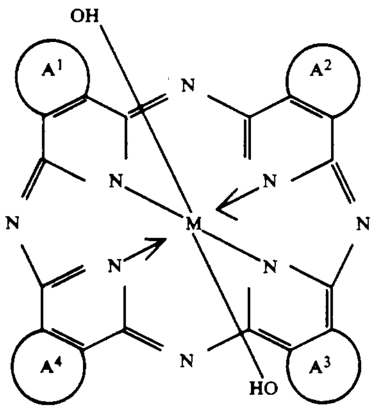

wherein M, $A^1$, $A^2$, $A^3$ and $A^4$ are as defined in the formula (I), with an excess amount of one member selected from the group consisting of:

a chlorosilane of the formula:

$(R^{16})_3SiCl$ (III)

wherein $R^{16}$ is an alkyl group preferably having 1 to 22 carbon atoms, an aryl group such as a phenyl group, a tolyl group, an anisyl group, a halo phenyl group, etc., an alkoxy group preferably having 1 to 22 carbon atoms, or an aryloxy group, a silanol of the formula:

$(R^{17})_3SiOH$ (IV)

wherein $R^{17}$ is the same as defined in $R^{16}$, an alcohol of the formula:

$R^{18}OH$ wherein $R^{18}$ is an alkyl group preferably having 1 to 22 carbon atoms or an aryl group such as a phenyl group, a tolyl group, an anisyl group, a halophenyl group, etc., a compound of the formula:

$R^{19}CO.X^2$ (VI)

wherein $R^{19}$ is an alkyl group preferably having 1 to 22 carbon atoms; and $X^2$ is a halogen atom such as F, Cl, Br or I, a hydroxyl group or an acyloxy group such as an acetoxy group, a propionyloxy group, a butyloxy group, a valeryloxy group, a pivoloyloxy group, a hexanoyloxy group, an octanoyloxy group, etc. with heating.

The reaction is preferably carried out at a temperature of 80° to 250° C. for 30 minutes to 40 hours.

The reaction is carried out preferably in an organic solvent. As the organic solvent, there can be used benzene, toluene, xylene, trimethylbenzene, chlorobenzene, dichlorobenzene, trichlorobenzene, 1-chloronaphthalene, tetralin, pyridine, β-picoline, quinoline, etc. If necessary, the reaction can preferably be carried out in the presence of an aliphatic amine such as triethylamine, tripropylamine, tributylamine, tripentylamine, trihexylamine, or the like.

The resulting tetraazaporphin of the formula (I) can be purified from the reaction mixture by, for example, chromatography, followed by recrystallization.

The compound of the formula (II) can be produced by hydrolysis with heating of a compound of the formula:

(VII)

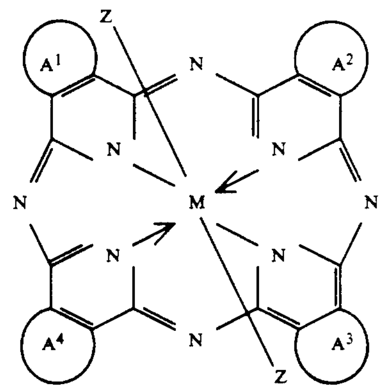

wherein M, $A^1$, $A^2$, $A^3$ and $A^4$ are as defined in the formula (I); and Z is a halogen atom and two Z's may be the same or different.

The hydrolysis reaction is preferably carried out at 50° to 150° C. for 30 minutes to 30 hours. The reaction is preferably carried out in a mixed solvent of pyridine/-water, pyridine/ammonia water, methanol/ammonia water, ethanol/ammonia water, propanol/ammonia water, or the like.

The compound of the formula (VII) can be produced by reacting a compound of the formula:

(VIII)

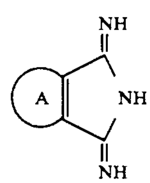

or a compound of the formula:

(IX)

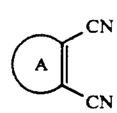

wherein A is an aromatic ring or a nitrogen-containing aromatic ring which may be bound to one or more organic substituents to give $A^1$, $A^2$, $A^3$ and $A^4$ in the formula (VII), with a metal halide of the formula:

$MZ_p$ (X)

wherein Z is a halogen atom; p is a positive integer showing a binding number of Z to a metal M; and M is Si, Ge or Sn, in an amount of preferably 0.1 mole or more per mole of the compound of the formula (VIII) or (IX).

The reaction is preferably carried out at 150° to 300° C. for 30 minutes to 10 hours. The reaction can be carried out in the absence of a solvent or in the presence of an organic solvent. As the organic solvent, there can be used urea, tetralin, quinoline, 1-chloronaphthalene, 1-bromonaphthalene, trimethylbenzene, dichlorobenzene, trichlorobenzene, or the like. If necessary, the reaction can be carried out in the presence of an amine such as triethylamine, tripropylamine, tributylamine, tripentylamine, trihexylamine, or the like.

Examples of the metal halide of the formula (X) are $SiCl_4$, $SiBr_4$, $SiI_4$, $GeCl_4$, $GeBr_4$, $SnCl_2$, $SnI_2$, etc.

The compound of the formula (VIII) can be obtained by refluxing a compound of the formula (IX) in methanol in the presence of a catalyst such as sodium methoxide with introducing ammonia gas for 1 to 10 hours.

The compound of the formula (IX) can be synthesized according to the method described in Liebigs Awn. Chem. p 333 (1981); Chem. Ber. vol. 108, p. 875 (1975); J. Org. Chem. vol. 37, p. 4136 (1972); Khim. Geterotsikl, Soedin, p. 273 (1972); J. Heterocycl, Chem. vol. 7, p. 1403 (1970); Heterocycles vol. 20, p. 489 (1983); Synth. Commun. vol. 16, p. 157 (1986); Bull. Chem. Soc. Jpn., vol. 47, p. 1291 (1974); J. Heterocycl. Chem. vol. 11, p. 79 (1974); J. Chem. Soc., p. 4092 (1962); J. Chem. Soc. (C), p. 2613 (1967); etc. Some of the compounds of the formula (IX) are commercially available from Aldrich Chemical Co. Ltd.

In the production processes as mentioned above, M is preferably Si or Ge in the formulae (I), (II), (VII) and (X).

In the production processes as mentioned above, it is preferable that $R^{15}$ and $R^{16}$ are alkyl groups in the formulae (III) and (IV); and two Y's are trialkylsiloxy groups in the formula (I).

In the production processes as mention above, it is preferable that $A^1$, $A^2$, $A^3$ and $A^4$ are nitrogen-containing aromatic rings in the formulae (I), (II) and (VII); and A is a nitrogen-containing aromatic ring in the formulae (VIII) and (IX). Four A's may be the same or different. In the production processes as mentioned above, it is preferable that all the $A^1$, $A^2$, $A^3$ and $A^4$ are the same nitrogen-containing aromatic rings in the formulae (I), (II) and (VII); and A is a single nitrogen-containing aromatic ring in the formulae (VIII) and (IX), either the compound of the formula (VIII) or (IX) being used.

In the production processes as mentioned above, it is preferable that $A^1$, $A^2$, $A^3$ and $A^4$ in the formulae (I), (II) and (VII) and A in the formulae (VIII) and (IX) are selected from the following rings:

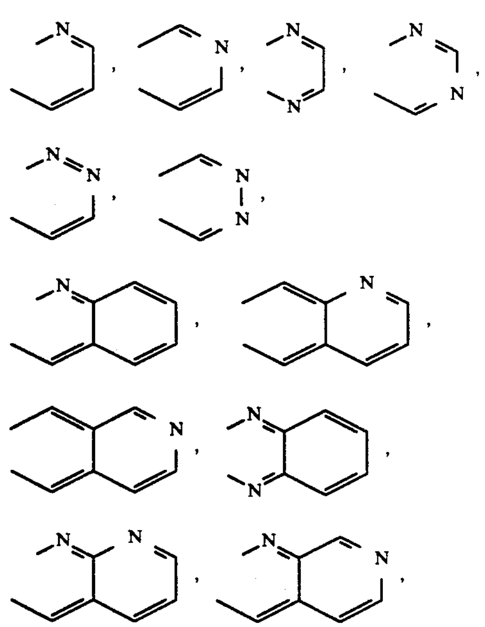

-continued

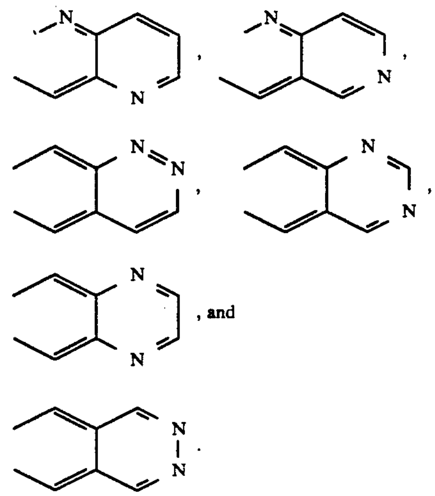

In the production processes as mentioned above, it is preferable that $A^1$, $A^2$, $A^3$ and $A^4$ in the formulae (I), (II) and (VII) and A in the formulae (VIII) and (IX) are selected from the following rings:

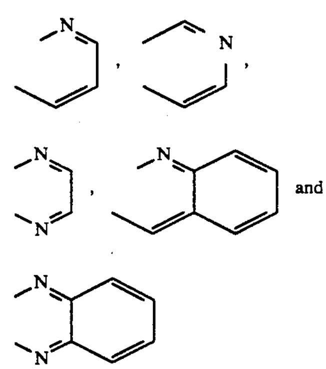

In the production processes as mentioned above, it is preferable that the organic substituents bound to $A^1$, $A^2$, $A^3$ and $A^4$ in the formulae (I), (II) and (VII) and A in the formulae (VIII) and (IX) are selected from the group consisting of:

$-R^1$,
$-OR^2$,
$-SiR^3R^4R^5$,
$-SO_2NR^6R^7$,
$-CO.R^8$,
$-COOR^9$,
$-O.COR^{10}$,
$-CO.NHR^{11}$,
$-NR^{12}R^{13}$,
$-SR^{14}$,
$-SO_2R^{15}$, and
$-X^1$, wherein $R^1$ to $R^{15}$ and $X^1$ are as defined above, at least one of the organic substituents being bound to possible positions of aromatic rings of $A^1$, $A^2$, $A^3$ and $A^4$.

The tetraazaporphin of the formula (I) can preferably be used as a recording layer in an optical recording medium such as an optical disc.

Such an optical recording medium comprises a substrate and formed thereon a recording layer made of a tetraazaporphin of the formula (I) as a major component, wherein information is recorded on the recording layer by irradiation with a laser light to change the recording layer, and the recorded information is read out by differences in optical densities between the recorded portions thus changed and the portions not irradiated with the laser light (thus not changed).

If necessary, the optical recording medium can have an undercoating layer between the recording layer and the substrate, and/or a protective layer on the recording layer.

As the substrate, there can be used conventional materials which are transparent or not transparent to laser light to be used. But, when writing and reading out by the laser light are performed from the substrate side, the substrate should be transparent to the laser light. On the other hand, when writing and reading out by the laser light are performed from the opposite side of the substrate, that is, from the recording layer side, it is not necessary that the substrate is transparent to the laser light.

As the substrate, there can be used inorganic materials such as plates of glass, quartz, mica, ceramics, metals in a plate form or a foil form, and plates of organic materials such as paper, polycarbonates, polyesters, cellulose acetate, nitrocellulose, polyethylene, polypropylene, polyvinyl chloride, polyvinylidene chloride copolymers, polyamides, polystyrenes, poly(methyl methacrylate), methyl methacrylate copolymers, etc.

The use of organic polymers having a low thermal conductivity as a substrate is preferable in order to lower a heat loss at the time of recording and to improve sensitivity. Further, if necessary, the substrate may have a relief introducing groove.

In the optical recording medium, it is preferable that the recording layer is made mainly of a tetraazaporphin of the formula (I) wherein M is Si or Ge.

In the optical recording medium, it is preferable that the recording layer is made mainly of a tetraazaporphin of the formula (I) wherein two Y's are trialkylsiloxy groups.

In the optical recording medium, it is preferable that the recording layer is made mainly of a tetraazaporphin of the formula (I) wherein all the $A^1$, $A^2$, $A^3$ and $A^4$ are nitrogen-containing aromatic rings.

In the optical recording medium, it is preferable that the recording layer is made mainly of a tetraazaporphin of the formula (I) wherein all the $A^1$, $A^2$, $A^3$ and $A^4$ are the same nitrogen-containing aromatic rings.

In the optical recording medium, it is preferable that the recording layer is made mainly of a tetraazaporphin of the formula (I) wherein $A^1$, $A^2$, $A^3$ and $A^4$ are nitrogen-containing aromatic rings selected from the group consisting of:

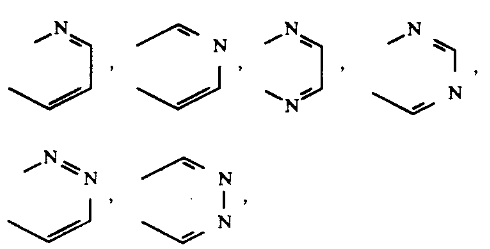

-continued

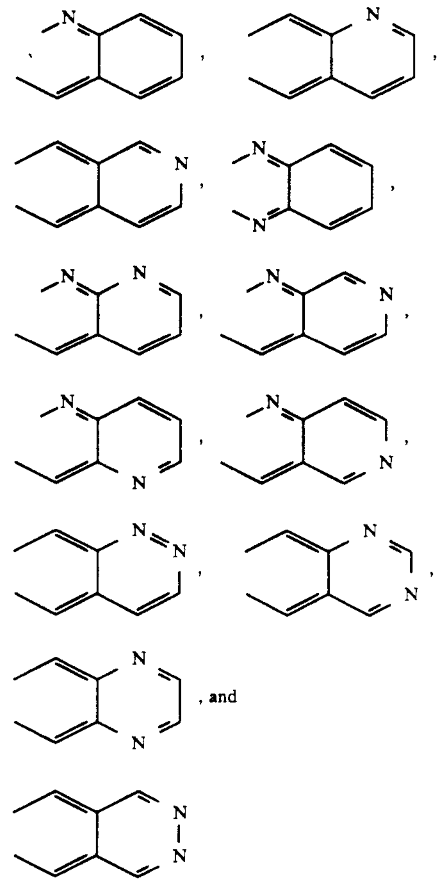

In the optical recording medium, it is preferable that the recording layer is made mainly of a tetraazaporphin of the formula (I) wherein $A^1$, $A^2$, $A^3$ and $A^4$ are nitrogen-containing aromatic rings selected from the group consisting of:

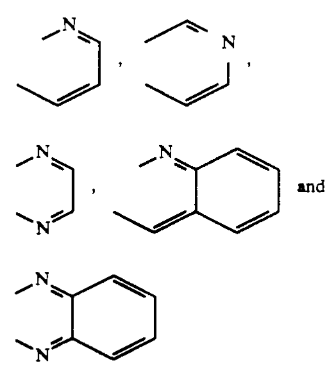

In the optical recording medium, it is preferable that the recording layer is made mainly of a tetraazaporphin of the formula (I) wherein the organic substituents bound to $A^1$, $A^2$, $A^3$ and $A^4$ are selected from the group consisting of:

—$R^1$,
—$OR^2$,
—$SiR^3R^4R^5$,
—$SO_2NR^6R^7$,
—$CO.R^8$,
—$COOR^9$,

—O.COR[10],
—CO.NHR[11],
—$NR^{12}R^{13}$,
—$SR^{14}$,
—$SO_2R^{15}$, and
—$X^1$, wherein $R^1$ to $R^{15}$ and $X^1$ are as defined above, at least one of the organic substituents being bound to possible positions of aromatic rings of $A^1$, $A^2$, $A^3$ and $A^4$.

The optical recording medium such as an optical disc can be produced by coating a solution obtained by dissolving mainly a tetraazaporphine of the formula (I) in an organic solvent on a substrate to form a recording layer.

As the organic solvent, there can be used those which do not attack the substrate including aromatic hydrocarbons such as benzene, toluene, xylene, chlorobenzene, dichlorobenzene, trimethyl benzene, 1-chloronaphthalene, quinoline, etc.; halogen-containing organic solvents such as methylene chloride, carbon tetrachloride, chloroform, trichloroethane, etc.; ethers such as diethyl ether, dibutyl ether, tetrahydrofuran, ethylene glycol monomethyl ether, ethylene glycol dimethyl ether, diethylene glycol monomethyl ether, diethylene glycol dimethyl ether, etc.; ketones such as acetone, methyl ethyl ketone, methyl propyl ketone, cyclopentanone, cyclohexanone, acetone alcohol, etc.; saturated hydrocarbons such as hexane, heptane, octane, nonane, decane, undecane, dodecane, etc.; alicyclic hydrocarbons such as cyclooctane, cyclopentane, cyclohexane, cycloheptane, etc. These solvents can be used alone or as a mixture thereof.

The solution dissolving a tetraazaporphin of the formula (I) can be coated on the substrate by a conventional coating method such as spin coating, roller coating, a printing method, a dipping method, a spraying method, etc. The solution may further contain a binder such as a polymer binder, a stabilizer, etc., depending on purposes. As the polymer binder, there can be used polyimides, polyamides, polystyrenes, epoxy resins, silicone resins, fluorine resins, acrylic resins, polyisoprenes, polybutadienes, polyvinyl butyrals, polyesters, polycarbonate, etc.

The material for recording layer can be used alone or as a mixture of two or more materials. In the case of using two or more materials, there can take a laminated structure or a single layer structure mixing two or more materials.

The thickness of the recording layer is preferably in the range of 50 to 10000 Å, more preferably 100 to 5000 Å.

In the case of reading out recorded information, a reflected light is often used. When writing and reading out are performed from the substrate side, it is possible to form a metal layer having a high reflectance on the surface of recording layer opposite to the substrate in order to enhance contrast effectively. On the other hand, when writing and reading out are performed from the recording layer side, it is possible to form a metal layer having a high reflectance between the substrate and the recording layer. As the metal having high reflectance, there can be used Al, Cr, Au, Pt, Sn, etc. The metal layer having a high reflectance can be formed by a conventional thin film forming technique such as vacuum deposition, sputtering, plasma deposition, etc. The film thickness is preferably in the range of 100 to 10000 Å.

The tetraazaporphin of the formula (I) has high reflectance by itself, so that the formation of the metal layer is not always necessary.

When surface smoothness of the substrate by itself is insufficient, it is effective to form a uniform organic polymer film on the substrate. As the organic polymer, there can be used polyesters, polyvinyl chlorides, etc.

In order to increase stability, protective property and sensitivity due to lowering in surface reflectance, it is possible to form a protective layer as an outermost layer. As the material for forming the protective layer, there can be used polyvinylidene chlorides, polyvinyl chlorides, vinylidene chlorideacrylonitrile copolymers, polyvinyl acetates, polyimides, poly(methyl methacrylate), polystyrenes, polyisoprenes, polybutadienes, polyurethanes, polyvinyl butyrals, fluorine rubber, polyesters, epoxy resins, silicone resins, cellulose acetate, etc. These polymers can be use alone or as a blend thereof.

The protective layer may further contain a silicone oil, an antistatic, a crosslinking agent, etc. in order to enhance film performance.

Furthermore, the protective layer may take a double layer structure. The protective layer can be formed by coating a solution obtained by dissolving the above-mentioned material in a suitable solvent, or by laminating a thin film of the above-mentioned material. The film thickness of the protective layer is preferably 0.1 to 10 μm, more preferably 0.2 to 2 μm.

In the production process of optical recording medium, it is preferable that the recording layer is made mainly of a tetraazaporphin of the formula (I) wherein M is Si or Ge.

In the production process of optical recording medium, it is preferable that the recording layer is made mainly of a tetraazaporphin of the formula (I) wherein two Y's are trialkylsiloxy groups.

In the production process of optical recording medium, it is preferable that the recording layer is made mainly of a tetraazaporphin of the formula (I) wherein all the $A^1$, $A^2$, $A^3$ and $A^4$ are nitrogen-containing aromatic rings.

In the production process of optical recording medium, it is preferable that the recording layer is made mainly of a tetraazaporphin of the formula (I) wherein all the $A^1$, $A^2$, $A^3$ and $A^4$ are the same nitrogen-containing aromatic rings.

In the production process of optical recording medium, it is preferable that the recording layer is made mainly of a tetraazaporphin of the formula (I) wherein $A^1$, $A^2$, $A^3$ and $A^4$ are nitrogen-containing aromatic rings selected from the group consisting of:

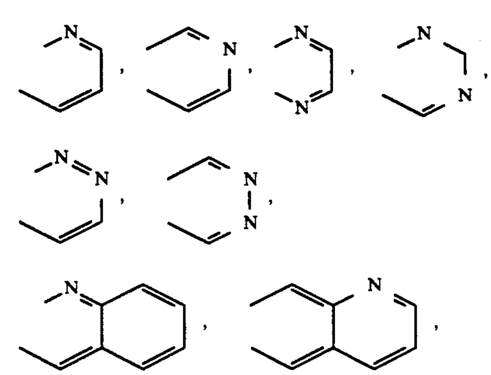

-continued

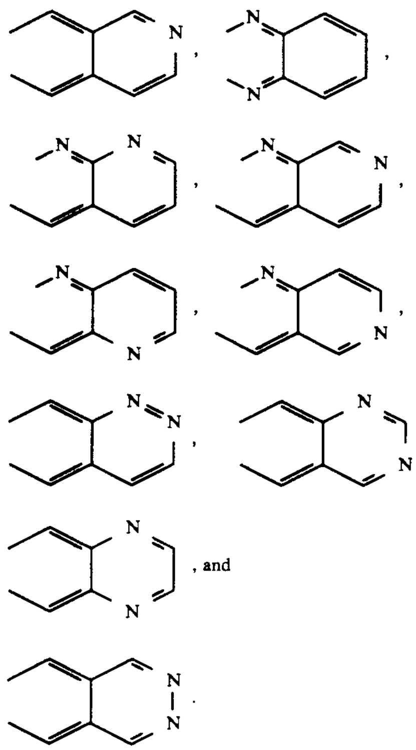

In the production process of optical recording medium, it is preferable that the recording layer is made mainly of a tetraazaporphin of the formula (I) wherein $A^1$, $A^2$, $A^3$ and $A^4$ are nitrogen-containing aromatic rings selected from the group consisting of:

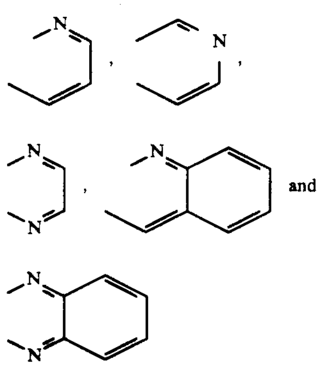

In the optical recording medium, it is preferable that the recording layer is made mainly of a tetraazaporphin of the formula (I) wherein the organic substituents bound to $A^1$, $A^2$, $A^3$ and $A^4$ are selected from the group consisting of:

—$R^1$,
—$OR^2$,
—$SiR^3R^4R^5$,
—$SO_2NR^6R^7$,
—$CO.R^8$,
—$COOR^9$,
—$O.COR^{10}$,
—$CO.NHR^{11}$,
—$NR^{12}R^{13}$,
—$SR^{14}$,
—$SO_2R^{15}$, and
—$X^1$, wherein $R^1$ to $R^{15}$ and $X^1$ are as defined above, at least one of the organic substituents being bound to possible positions of aromatic rings of $A^1$, $A^2$, $A^3$ and $A^4$.

The present invention is illustrated by way of the following Examples.

EXAMPLE 1

Synthesis of Compound No. (3)

2.5 Grams (19.4 mmoles) of 2,3-dicyanopyridine, 4.5 ml (38.8 mmoles) of silicon tetrachloride, 39 mg of ammonium molybdate and 19.4 g of urea were reacted at about 230° to 240° C. for about 3 hours. After cooling, water was added to a solidified reaction mixture and stirred at about 50° C. for 30 minutes. An insoluble solid was filtered and washed with water. Further, the solid was stirred in methanol at about 50° C. for 30 minutes, followed by filtration and washing with methanol to yield a blue solid quantitatively.

The blue solid was subjected to measurement of electronic spectrum (FIG. 1) in a pyridine solution to give an absorption maximum at 642 nm. It was confirmed that a compound of the formula (VII) wherein Z is Cl; M is Si; $A^1$, $A^2$, $A^3$ and $A^4$ are each

Figure 2:
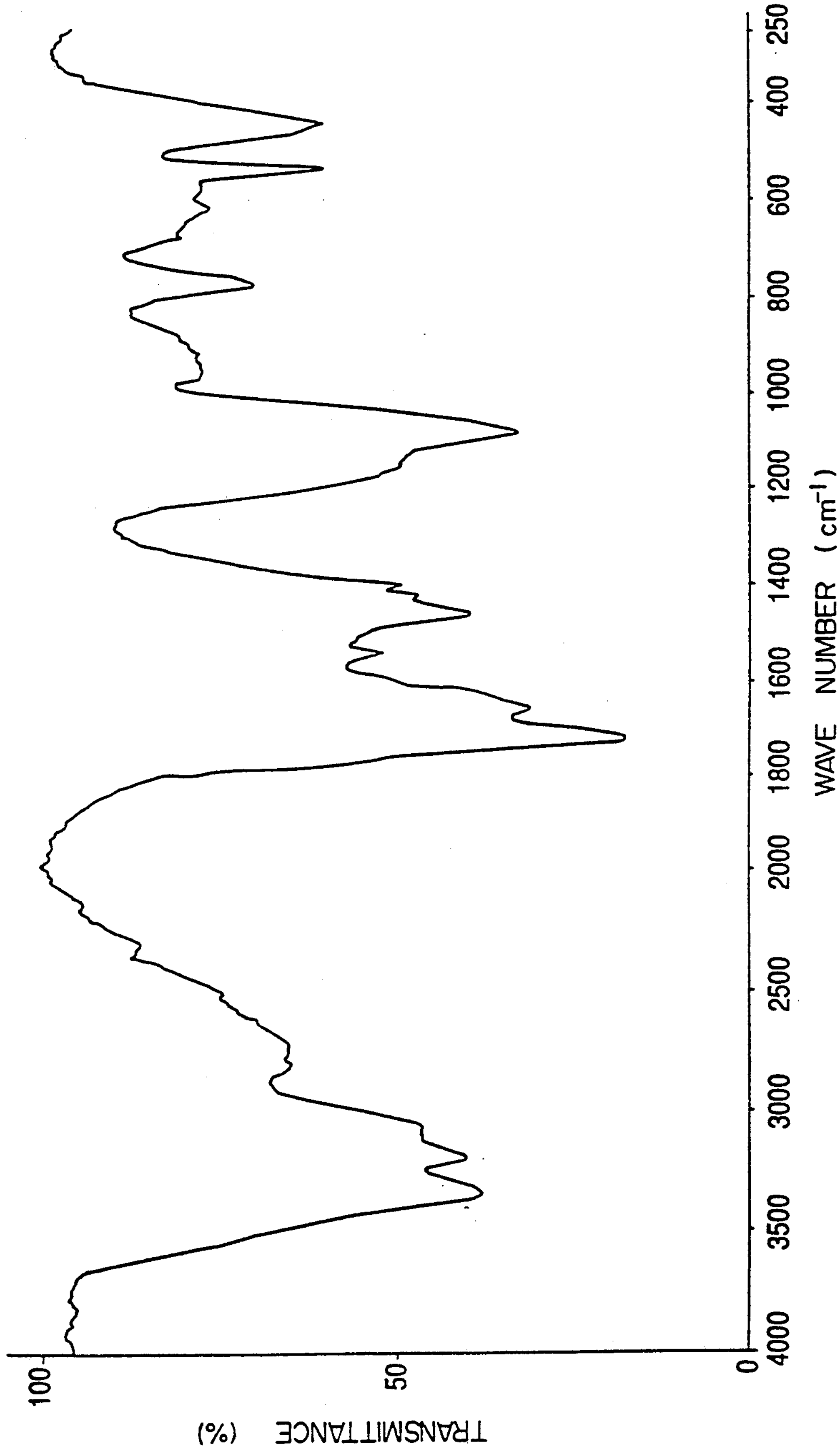
FIGS. 2, 4, 7, 10, 18, 20, 23, 27, 29, 32, 35, 40, 41, 42, 45, 48, 51, 54, 73, 74 and 77 are infrared spectra of compounds used in working examples.

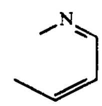

hereinafter referred to as "$Cl_2Si$(2,3-Pric)"] was formed. IR spectrum of this C12Si(2,3-Pric) is shown in FIG. 2. From this spectrum, the presence of urea and the like as impurities was admitted, but $Cl_2Si$(2,3-Pric) was used in the next reaction without further purification.

Figure 3:
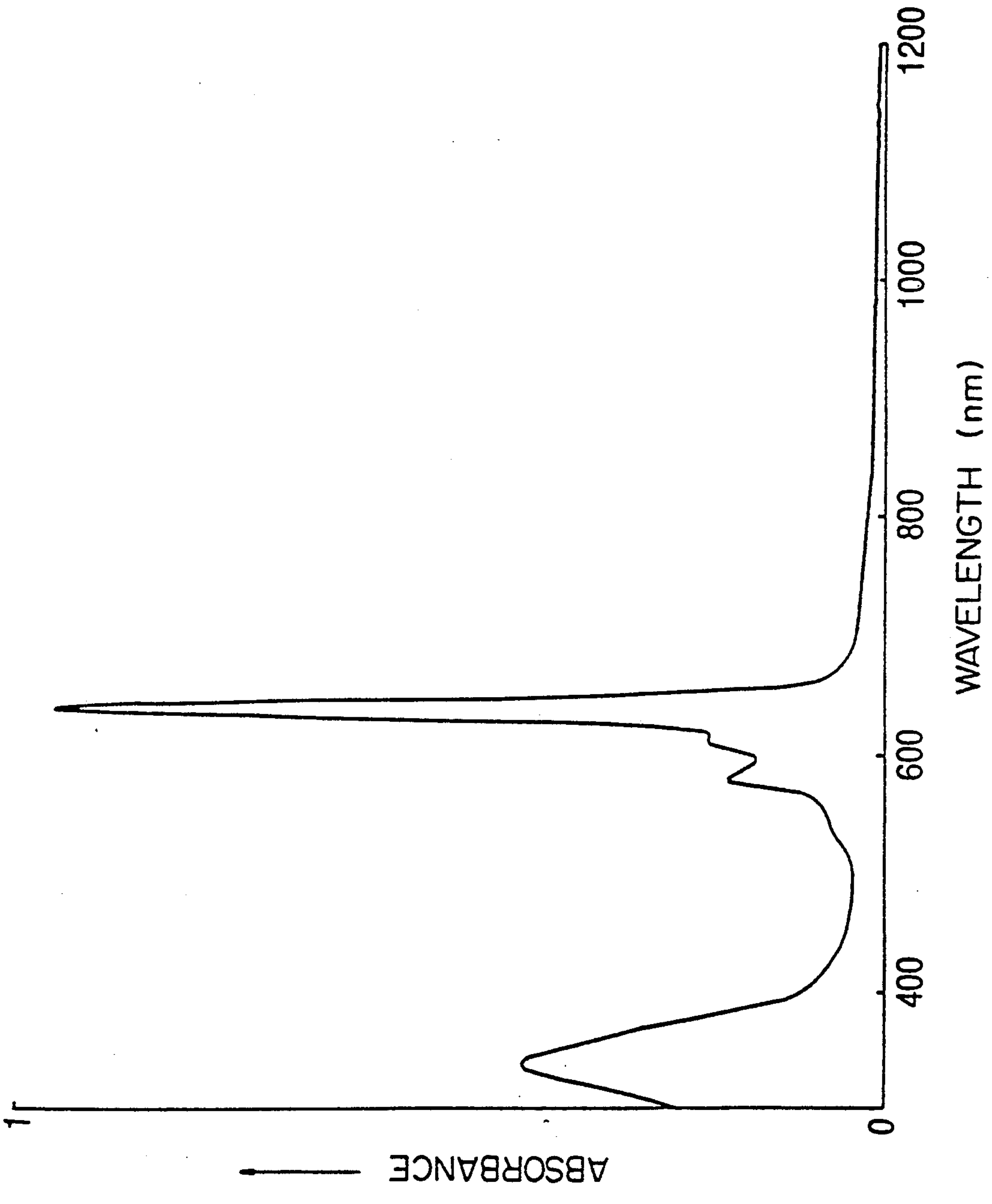

In 57 ml of ethanol, 19 g (30.9 mmoles) of $Cl_2Si$(2,3-Pric) was placed, and 57 ml of ammonia water and 224 ml of water were added thereto, followed by refluxing for about 5 hours. After cooling, the reaction mixture was filtered, washed with water and methanol and dried under reduced pressure to yield 11 g of a blue solid. The blue solid was subjected to measurement of electronic spectrum (FIG. 3) in a pyridine solution to give an absorption maximum at 640 nm. It was found that a compound of the formula (II) wherein M is Si; $A^1$, $A^2$, $A^3$ and $A^4$ are each

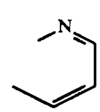

Figure 4:
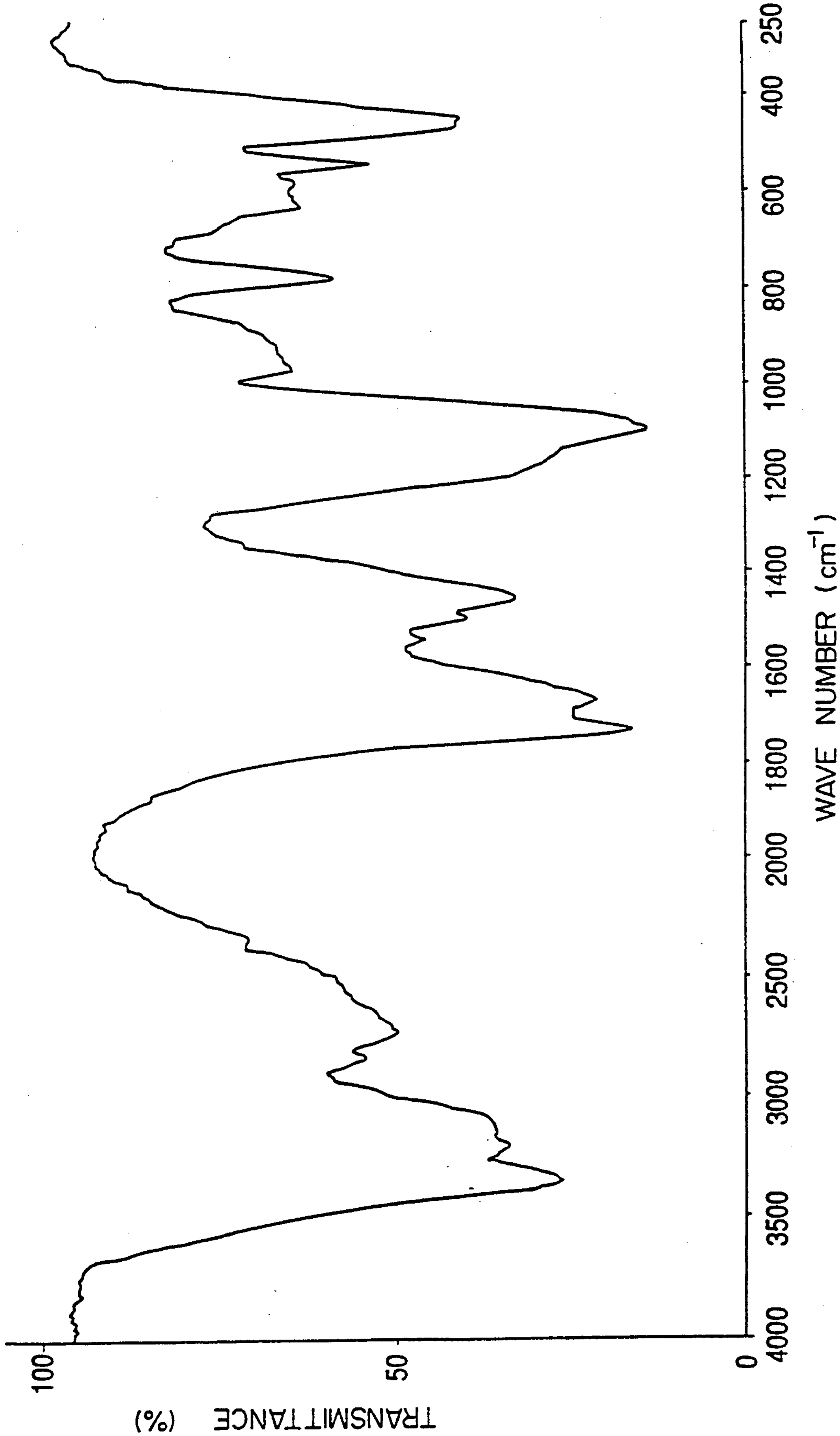

[hereinafter referred to as "$(HO)_2Si$(2,3-Pric)"] was formed. IR spectrum of this $(HO)_2Si$(2,3-Pric) is shown in FIG. 4. From this spectrum, the presence of urea and the like as impurities was admitted, but $(HO)_2Si$(2,3-Pric) was used in the next reaction without further purification.

To a suspension of 3 g (5.2 mmoles) of $(HO)_2Si$(2,3-Pric) in 240 ml of dry pyridine, 7.2 ml (32.9 mmoles) of tripropylchlorosilane was added under a nitrogen atmosphere. The resulting mixture was refluxed for about 6 hours. After cooling, the pyridine was removed by distillation under reduced pressure. To the residue, chloroform was added and filtered to give a filtrate soluble in the chloroform, followed by purification by column chromatography over silica gel. After recrystallization from a mixed solvent of hexane/chloroform, 24 mg of violet crystals were obtained. From the following analytical results, the resulting product was confirmed to be Compound No. (3) listed in Table 1.

(1) Melting point: >300° C.

(2) Elementary analysis:

| (2) Elementary analysis: | C | H | N |
|---|---|---|---|
| Calculated (%) | 61.99 | 6.11 | 18.86 |
| Found (%) | 62.05 | 6.17 | 18.79 |

(3) NMR spectrum: $CDCl_3$

Figure 5:
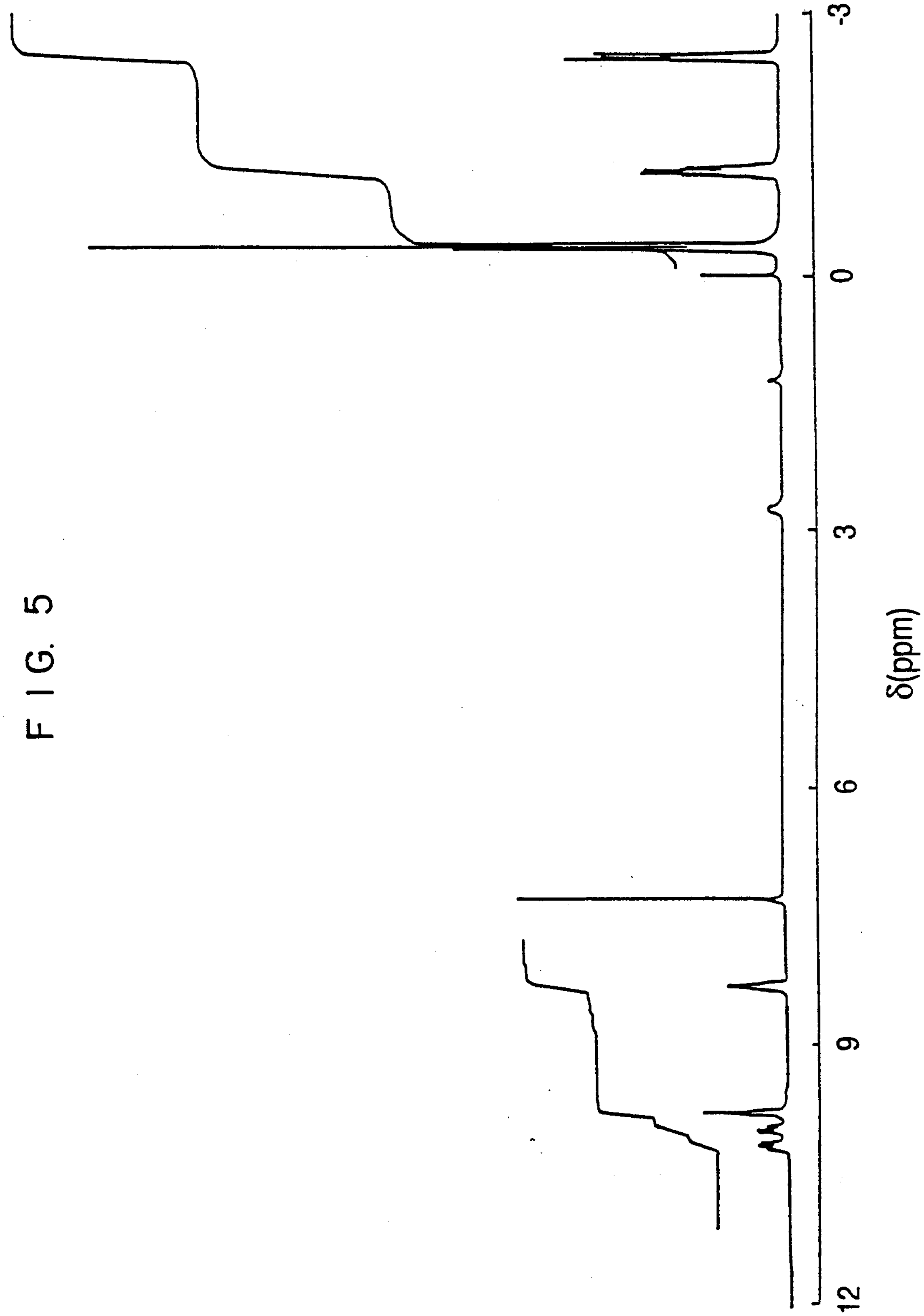
Figure 6:
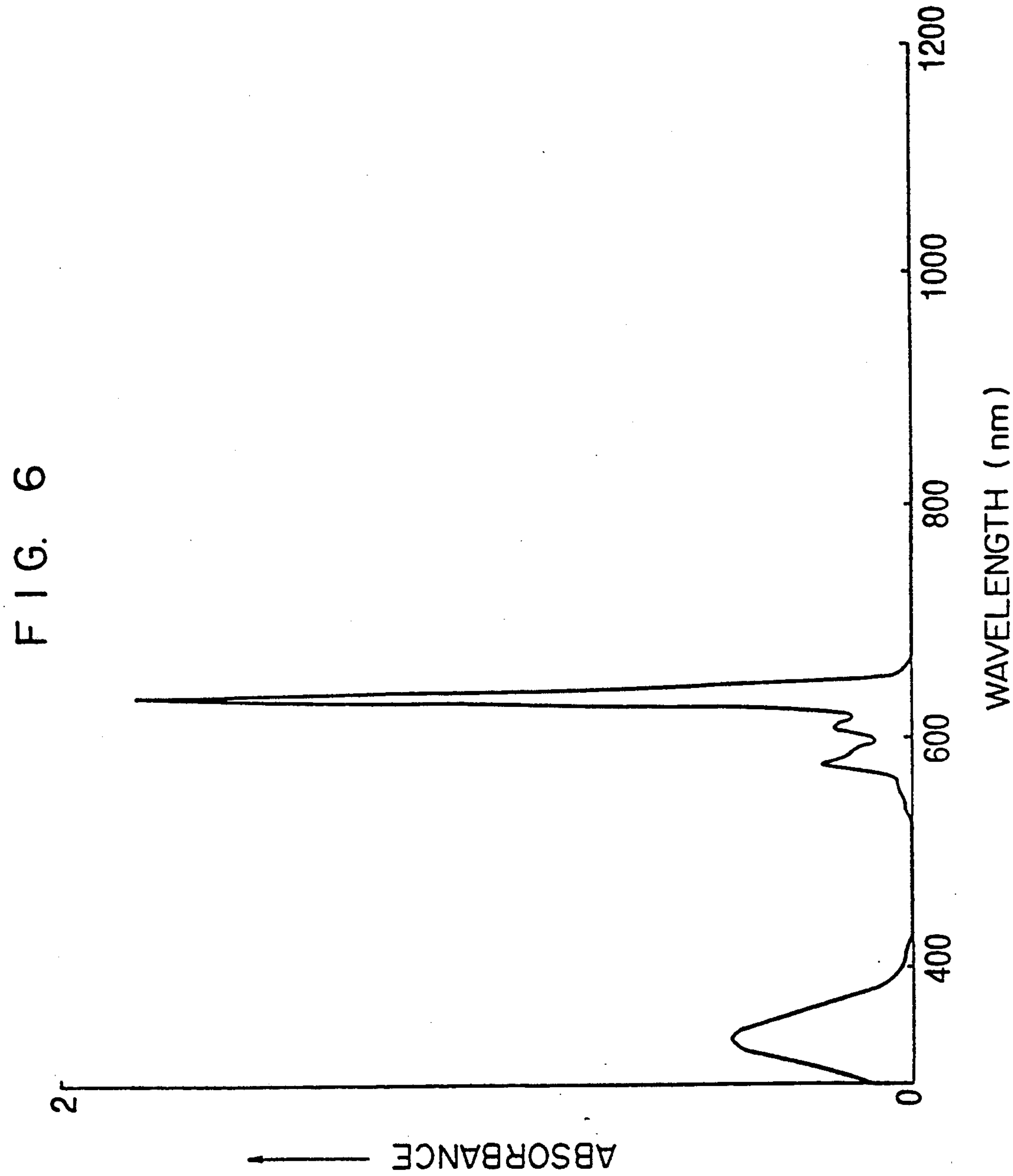

Shown in FIG. 5 which shows a spectrum of a mixture of several isomers caused by differences of directions of 2,3-pyridine rings condensed.

δ Values: 10.10~9.90 (4H, m), 9.79~9.74 (4H, m), 8.34~8.25 (4H, m), −0.33(18H, t, J=7.33 Hz), −1.19(12H, sextet—like m), −2.51(12H, t—like m), (4) Electronic spectrum ($CHCl_3$ solution): Shown in FIG. 6.

Figure 7:
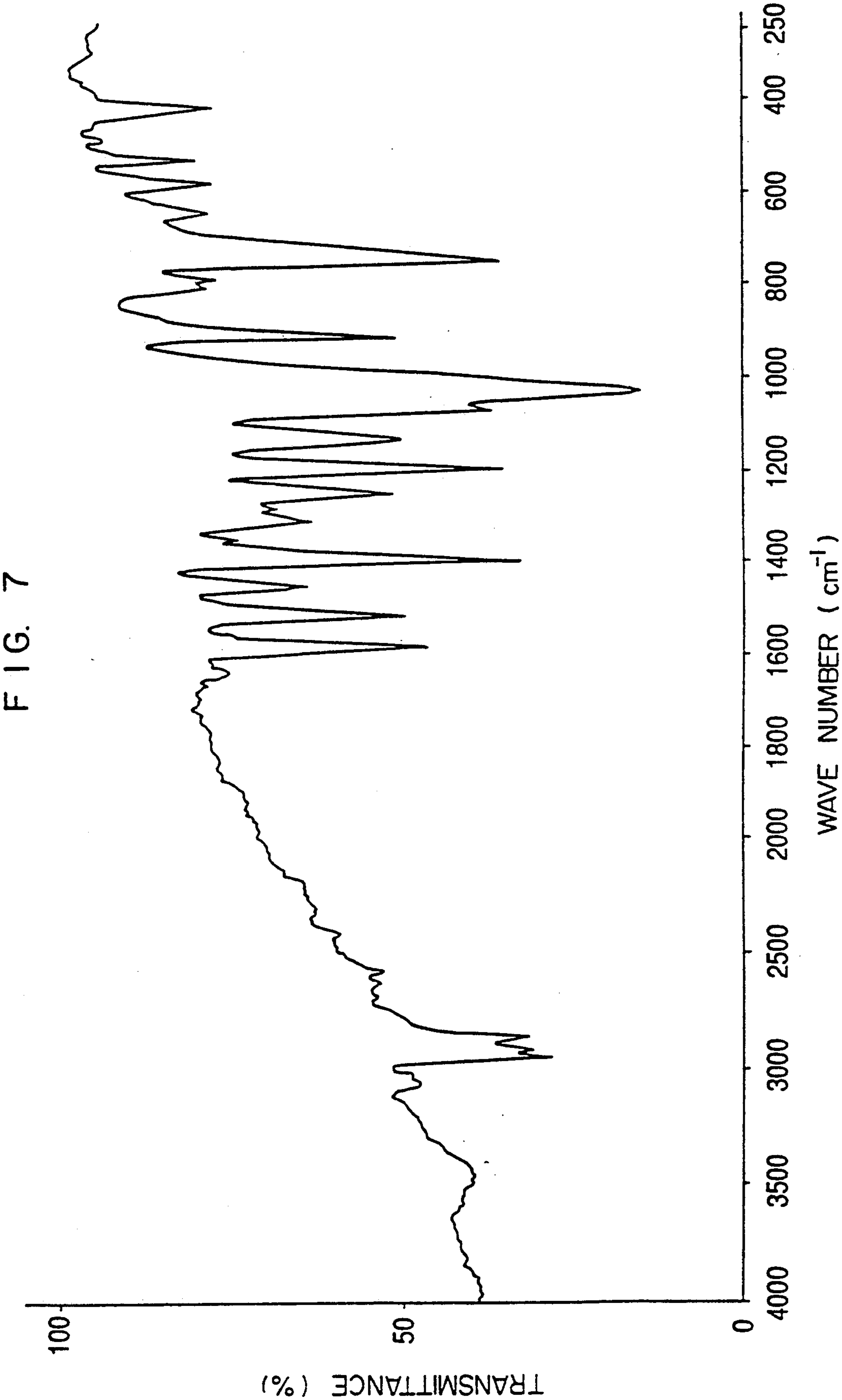

(5) IR spectrum (KBr method): Shown in FIG. 7.

EXAMPLE 2

Synthesis of Compound No. (1)

To a suspension of 5 g (8.7 mmoles) of $(HO)_2Si$(2,3-Pric) synthesized in the same manner as described in Example 1 in 400 ml of dry pyridine, 20 ml (55 mmoles) of trihexylchlorosilane was added under a nitrogen atmosphere. The resulting mixture was refluxed for 6 hours. After cooling, the pyridine was removed by distillation under reduced pressure. To the residue, chloroform was added and filtered to give a filtrate soluble in the chloroform, followed by purification by column chromatography over silica gel. After recrystallization from a mixed solvent of hexane/chloroform, 26 mg of violet crystals were obtained. From the following analytical results, the resulting product was confirmed to be Compound No. (1) listed in Table 1.

(1) Melting point: 230°-232° C., 240°-243° C., 248°-252° C.

The fact that three melting points were measured means that Compound No. (1) is a mixture of several isomers produced by differences of directions of 2,3-pyridine rings condensed.

| (2) Elementary analysis: | C | H | N |
|---|---|---|---|
| Calculated (%) | 67.20 | 7.93 | 14.70 |
| Found (%) | 67.31 | 7.89 | 14.66 |

(3) NMR spectrum: $CDCl_3$.

Figure 8:
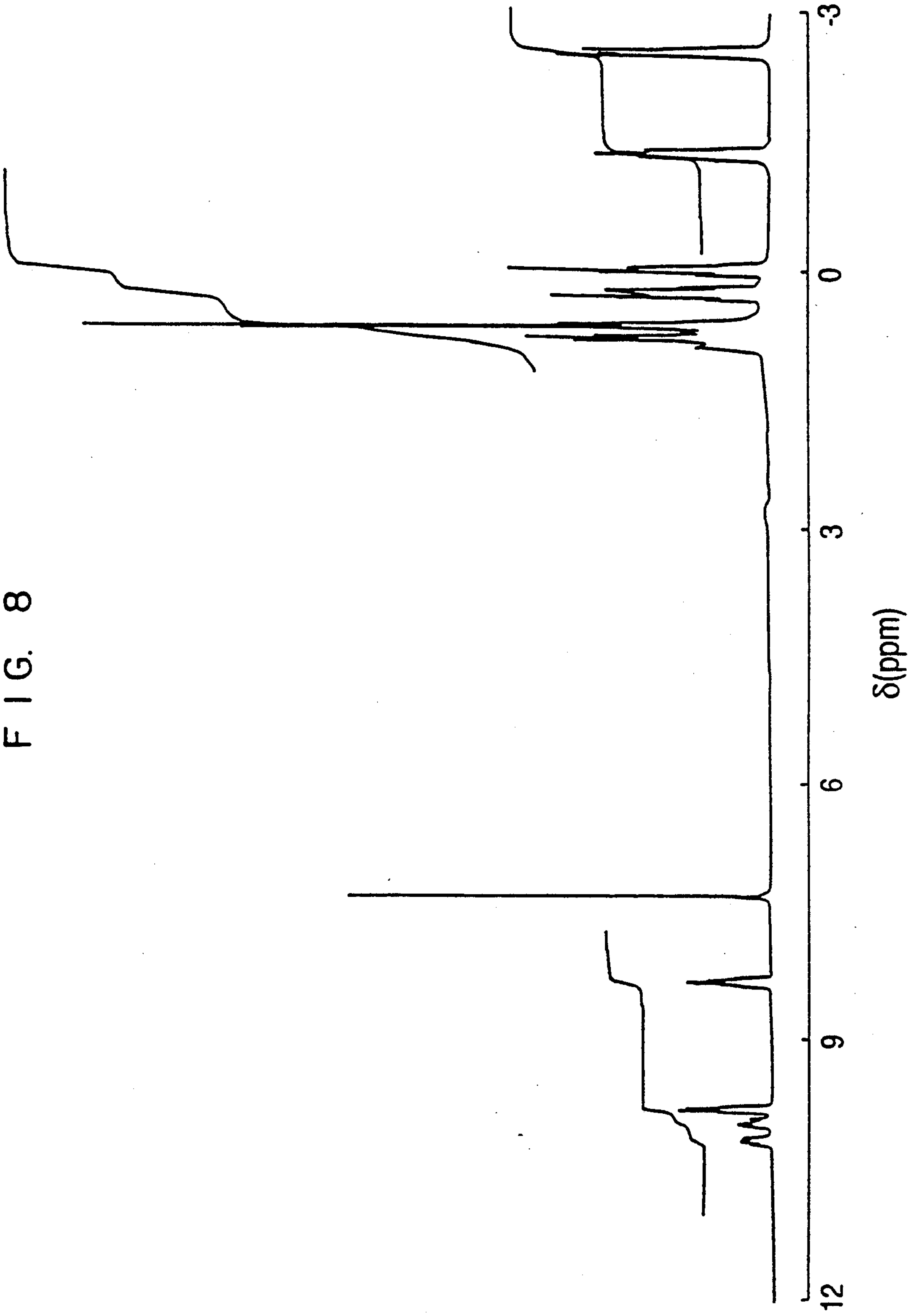

Shown in FIG. 8 which shows a spectrum of a mixture of several isomers caused by differences of directions of 2,3-pyridine rings condensed.

δ values: 10.16~9.91(4H, m), 9.79~9.73(4H, m), 8.33~8.24(4H, m), 0.77(12h, sextet-like m), 0.65(18H, t, J=7.63 Hz), 0.28(12H, quintet, J=7.63 Hz), 0.00(12H, quintet, J=7.63 Hz), −1.32(12H, quintet-like m), −2.52(12H, t-like m).

Figure 9:
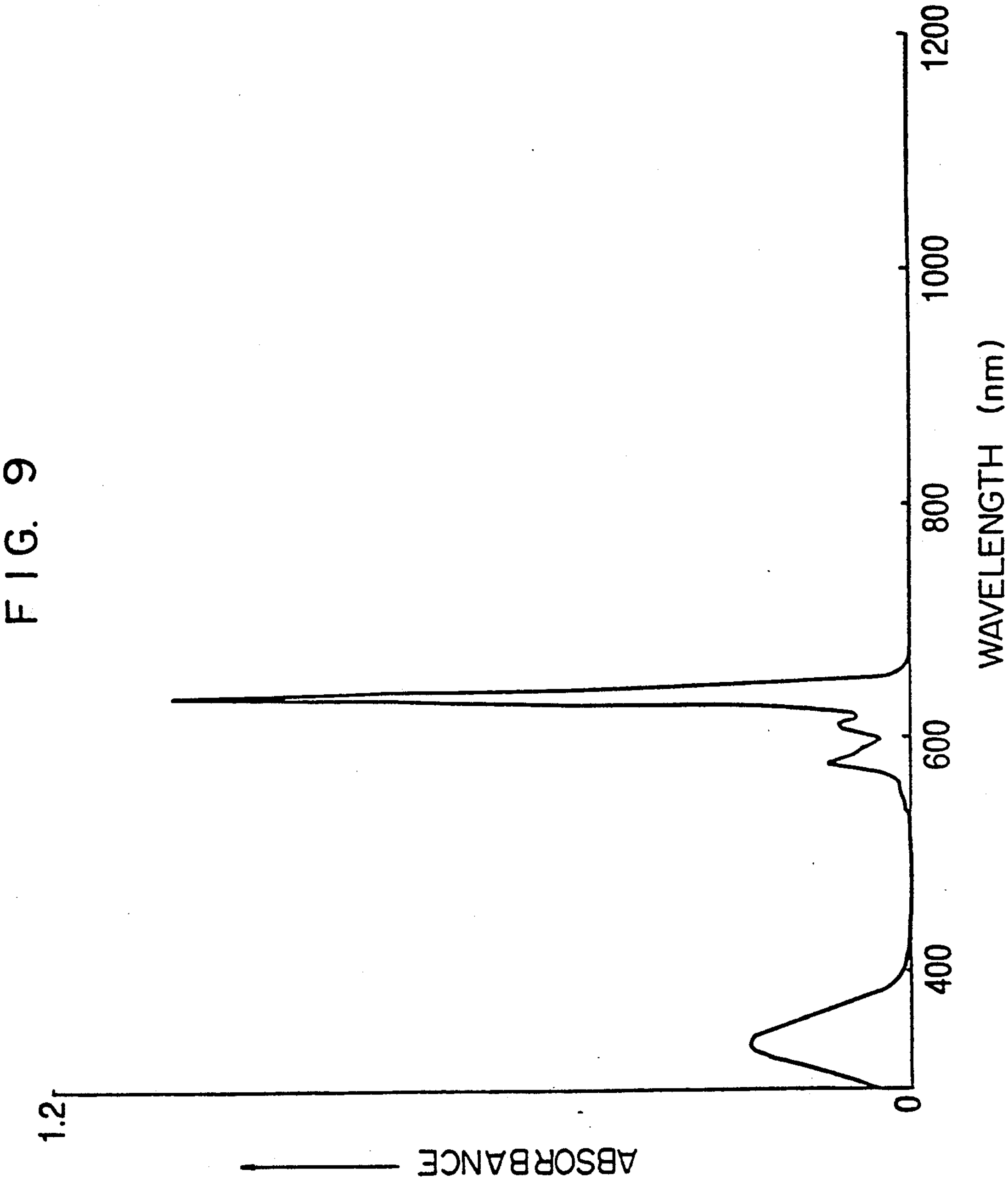

(4) Electronic spectrum ($CHCl_3$ solution): Shown in FIG. 9.

Figure 10:
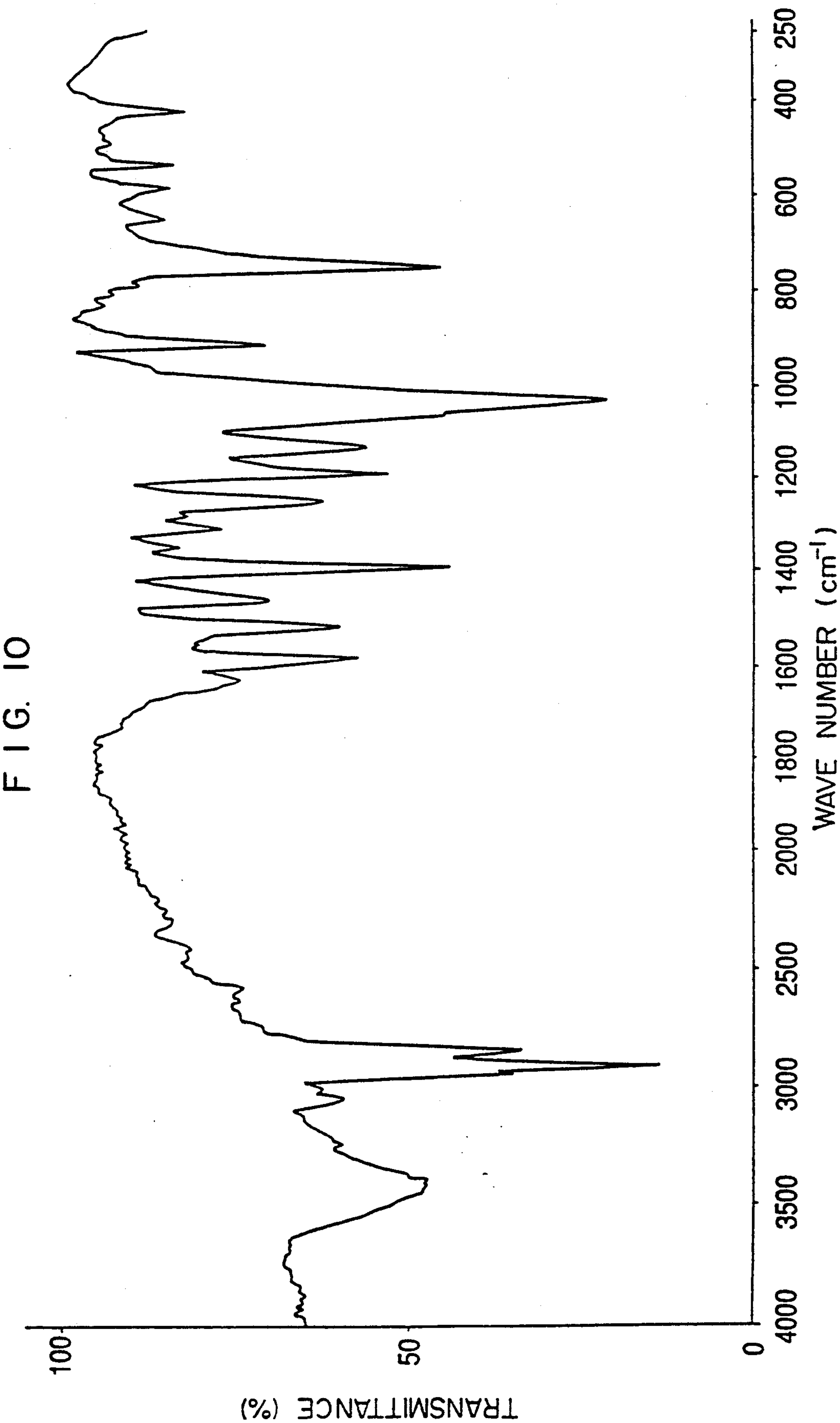

(5) IR spectrum (KBr method): Shown in FIG. 10.

EXPERIMENT 1

Figure 11:
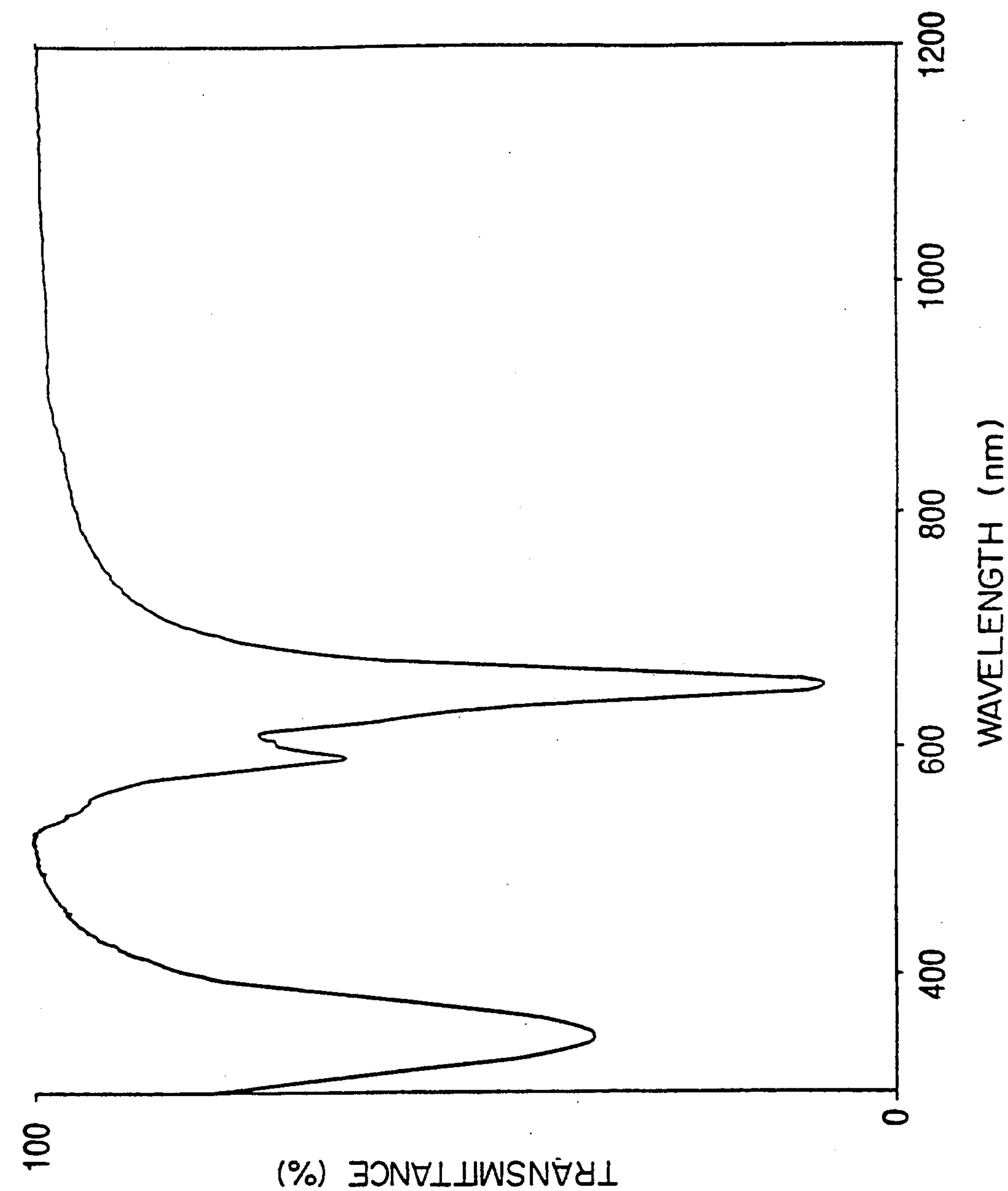
FIGS. 11, 14, 24, 36, 38, 62, 65, 68, 71, 78, 83 and 85 are transmittance spectra of spin coated films of compounds used in working examples.
Figure 12:
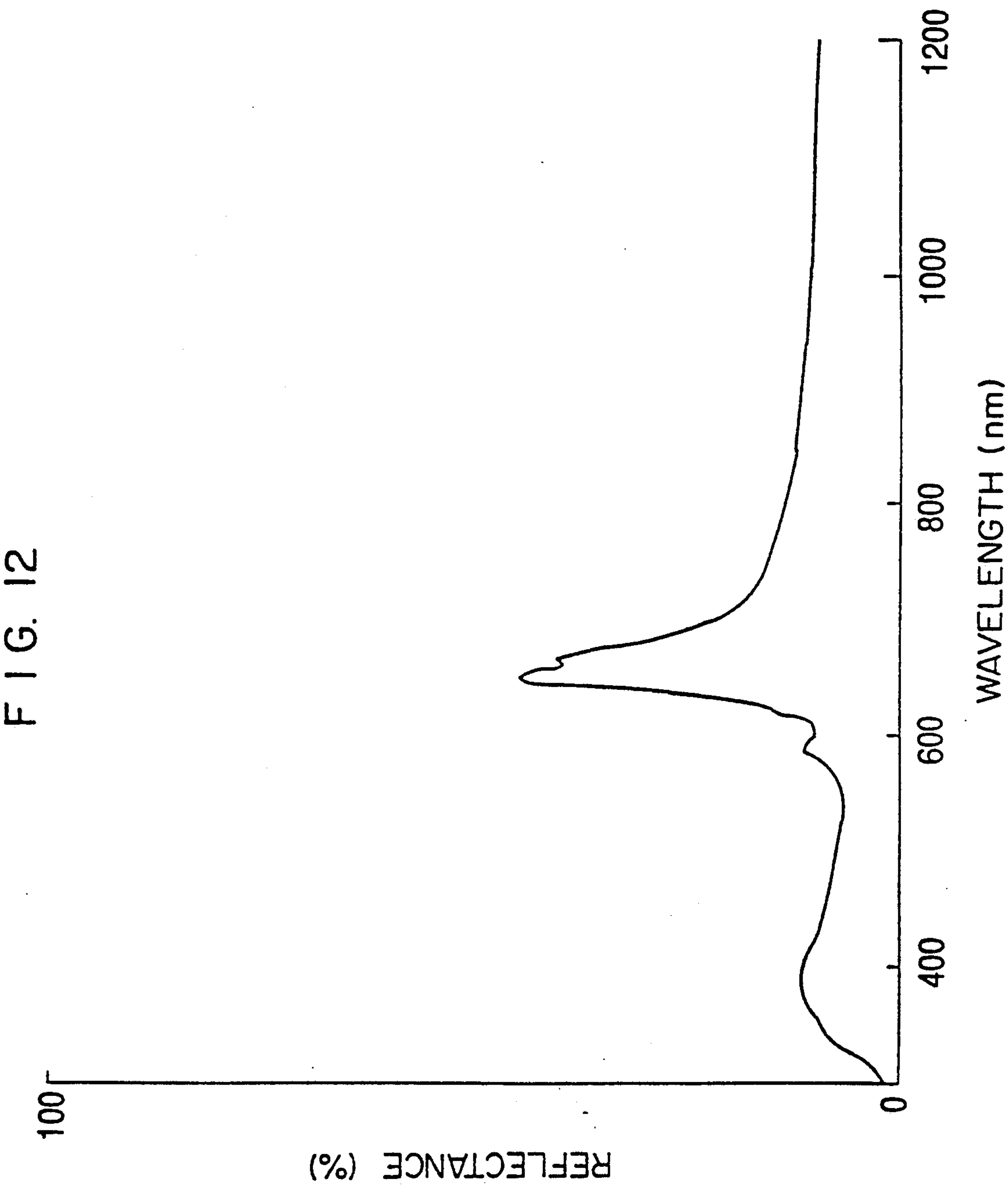
FIGS. 12, 13, 15, 16, 25, 37, 39, 63, 64, 66, 67, 69, 70, 72, 79, 80, 84 and 86 are 5° regular reflection spectra of spin coated films of compounds used in working examples.
Figure 13:
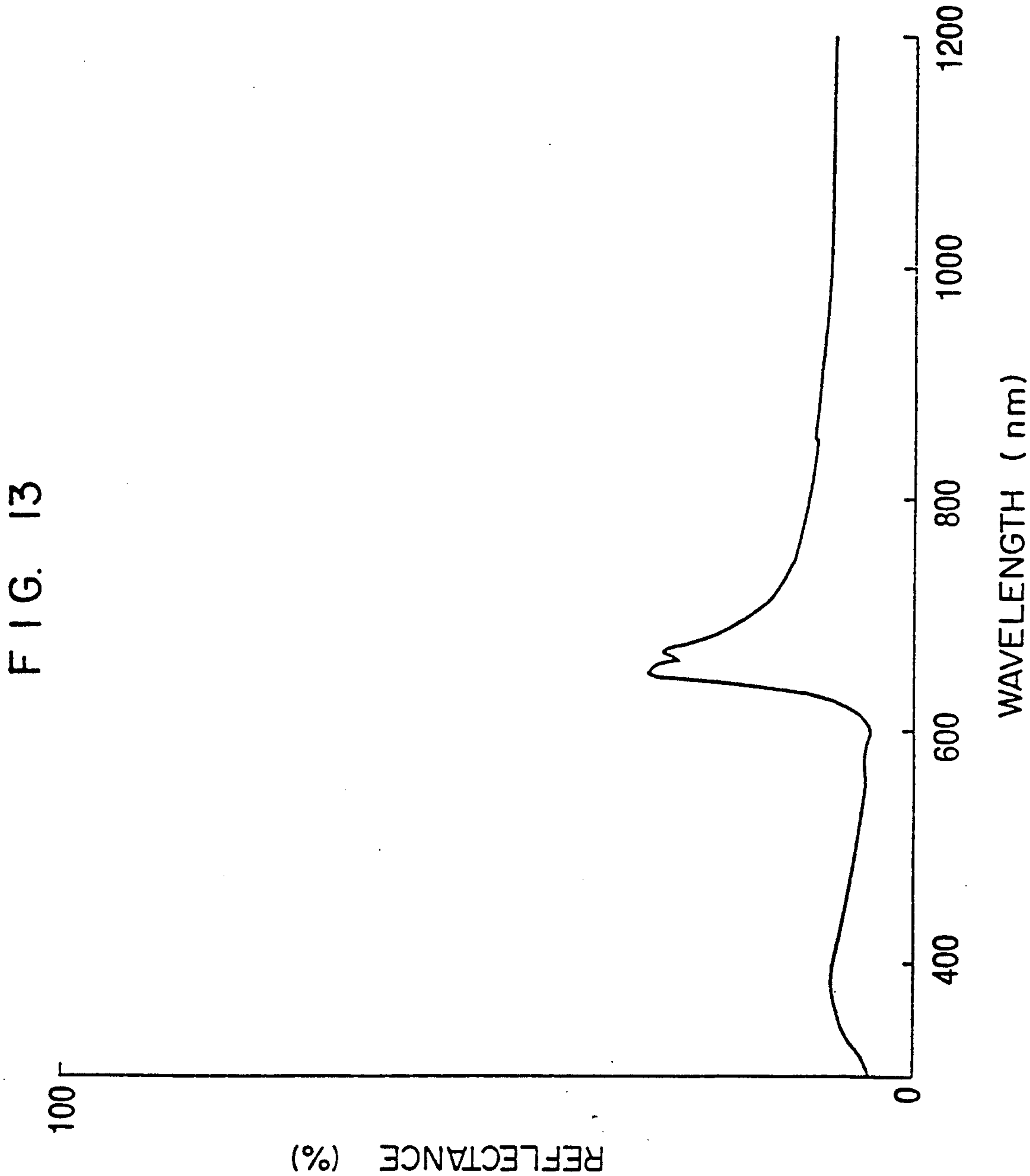

A chloroform solution of Compound No. (3) (0.3% (W/W)) was spin-coated on a glass substrate and dried at about 80° C. for about 15 minutes to form an organic film. The organic film was subjected to measurement of the transmission spectrum (FIG. 11), the 5° regular reflection spectrum from the spin coated film side (FIG. 12) and the 5° regular reflection spectrum from the glass substrate side opposite to the spin coated film (FIG. 13). As shown in FIGS. 11 to 13, high absorbing ability and high reflecting ability are shown at near 650 nm.

EXPERIMENT 2

Figure 14:
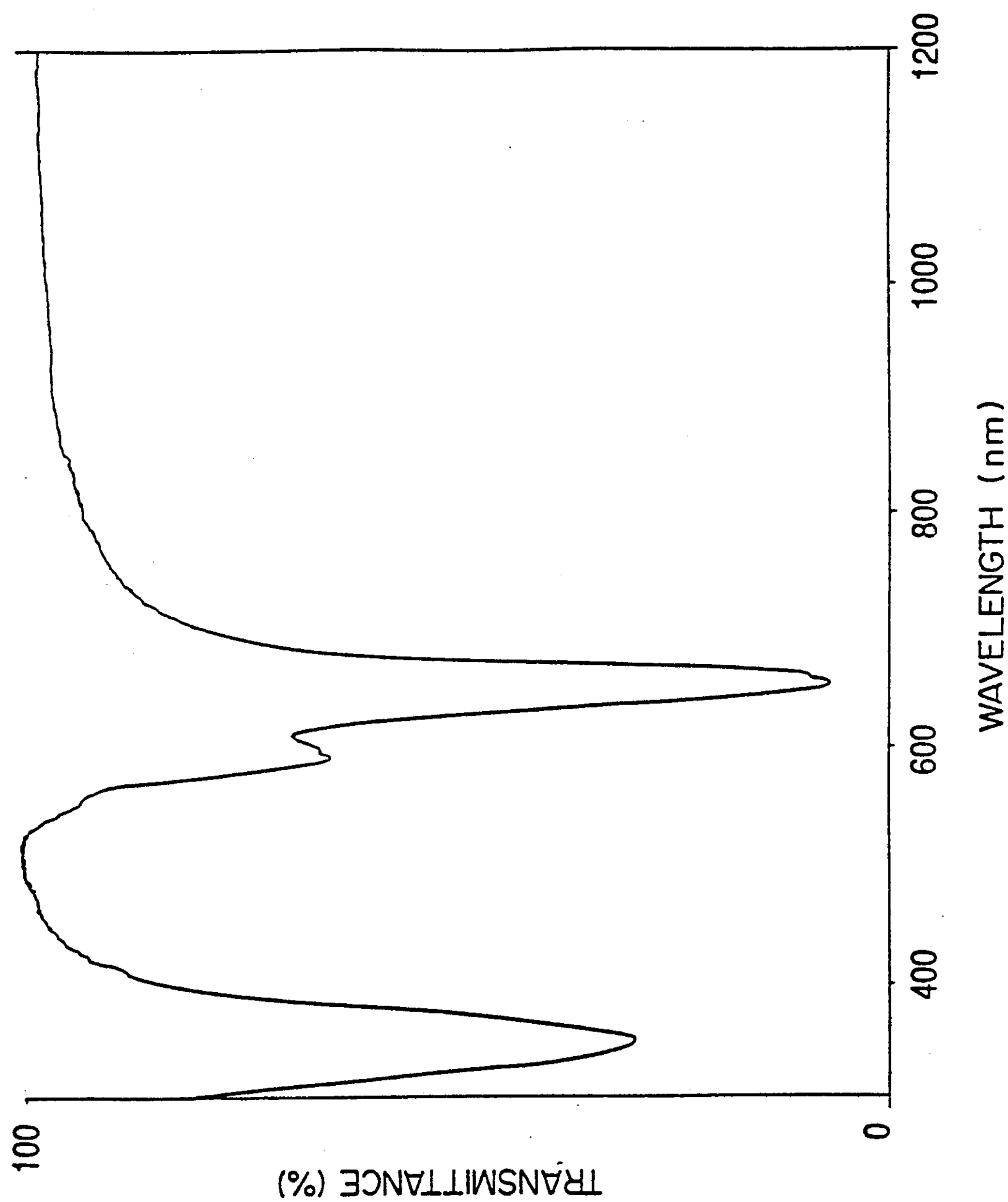
Figure 15:
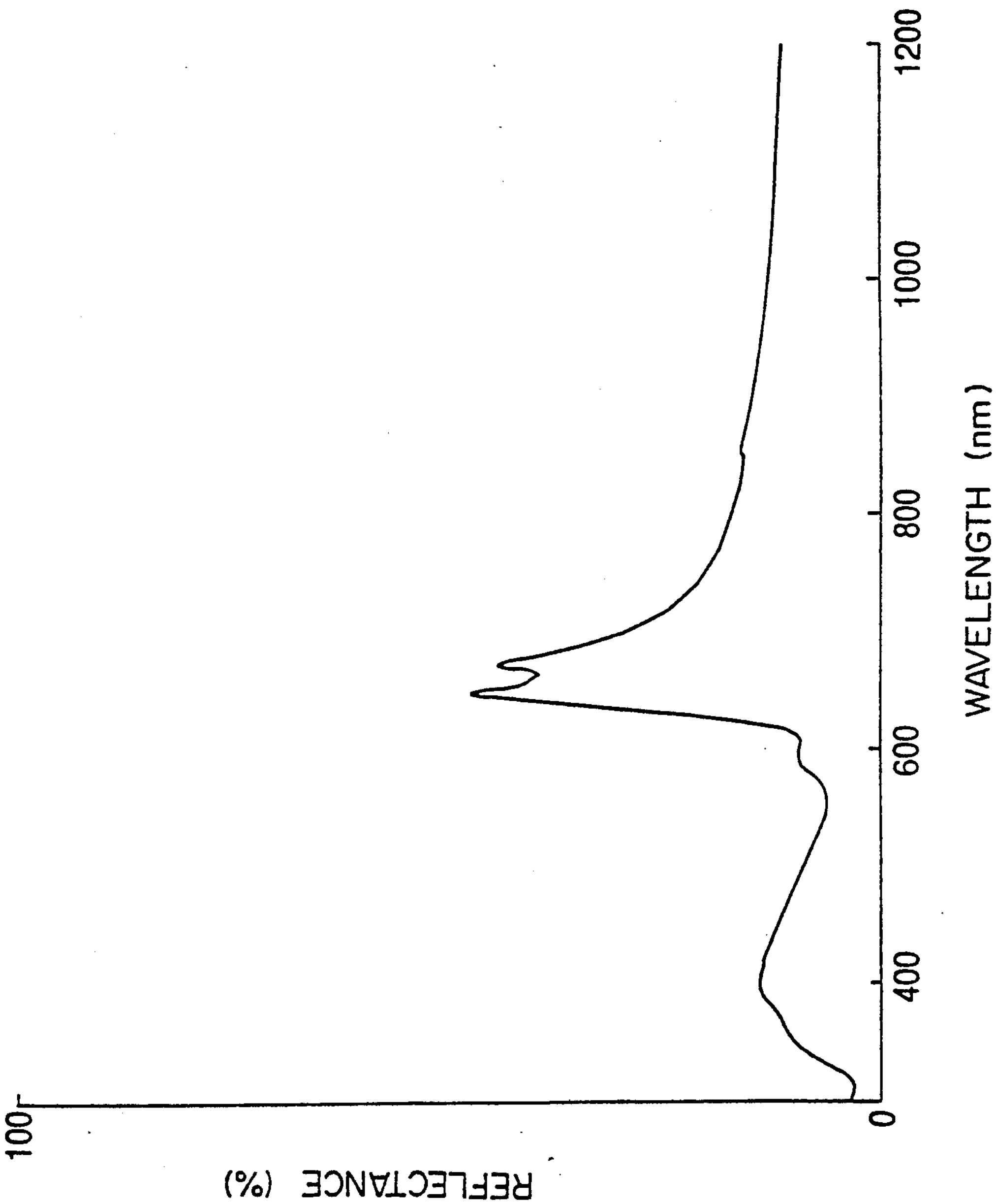
Figure 16:
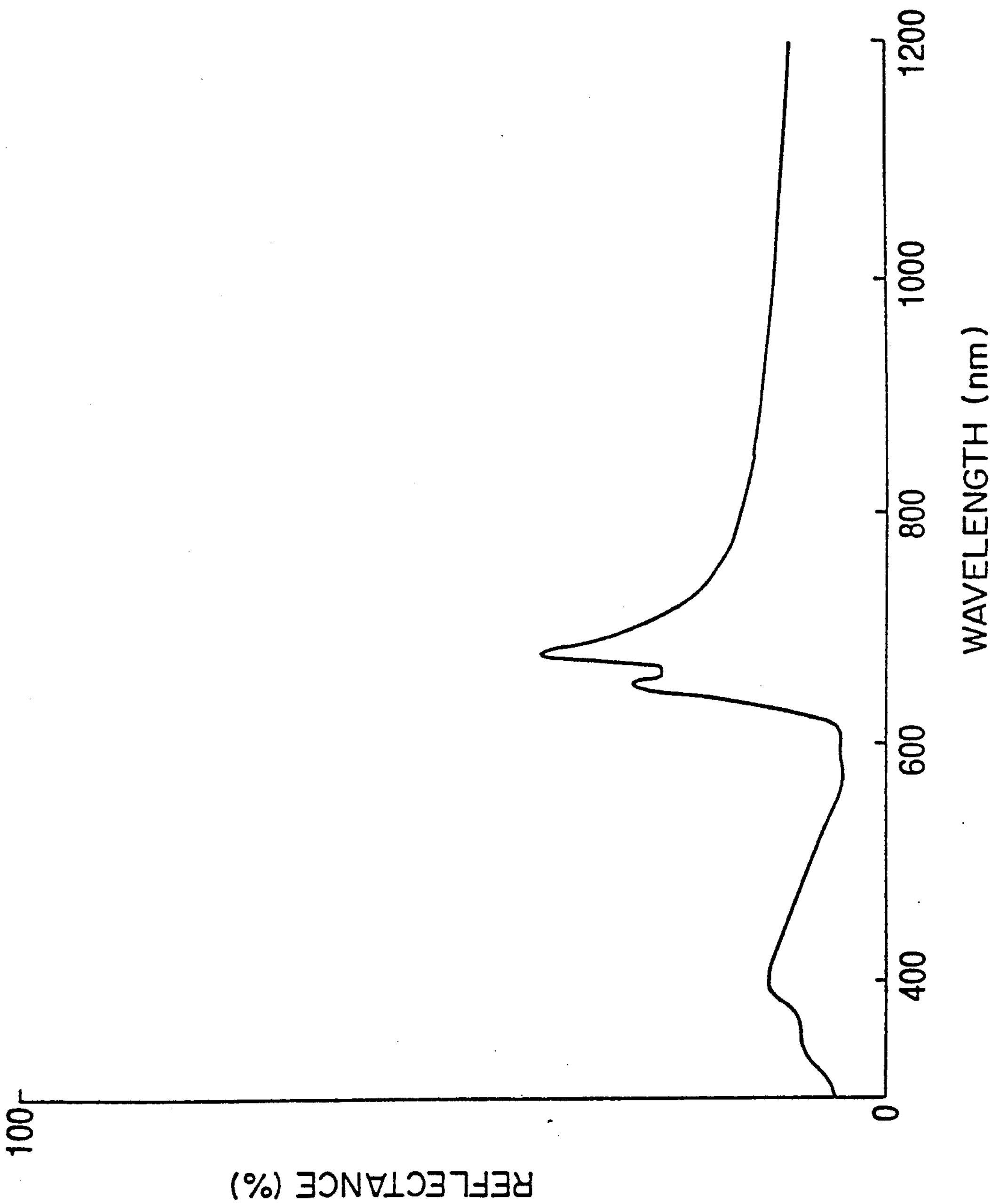

A chloroform solution of Compound No. (1) (0.3% (W/W)) was spin-coated on a glass substrate and dried at about 80° C. for about 15 minutes to form an organic film. The organic film was subjected to measurement of the transmission spectrum (FIG. 14), the 5° regular reflection spectrum from the spin coated film side (FIG. 15) and the 5° regular reflection spectrum from the glass substrate side opposite to the spin coated film (FIG. 16). As shown in FIGS. 14 to 16, high absorbing ability and high reflecting ability are shown at near 650 nm.

EXAMPLE 3

Synthesis of Compound No. (152)

2.5 Grams (19.4 mmoles) of 3,4-diaminopyridine, 4.5 ml (38.8 mmoles) of silicon tetrachloride, 39 mg of ammonium molybdate and 19.4 g of urea were reacted at about 230° to 240° C. for about 3 hours. After cooling, water was added to a solidified reaction mixture and stirred at about 50° C. for 30 minutes. An insoluble solid was filtered and washed with water. Further, the solid was stirred in methanol at about 50° C. for 30 minutes, followed by filtration and washing with methanol to yield a green solid quantitatively.

Figure 17:
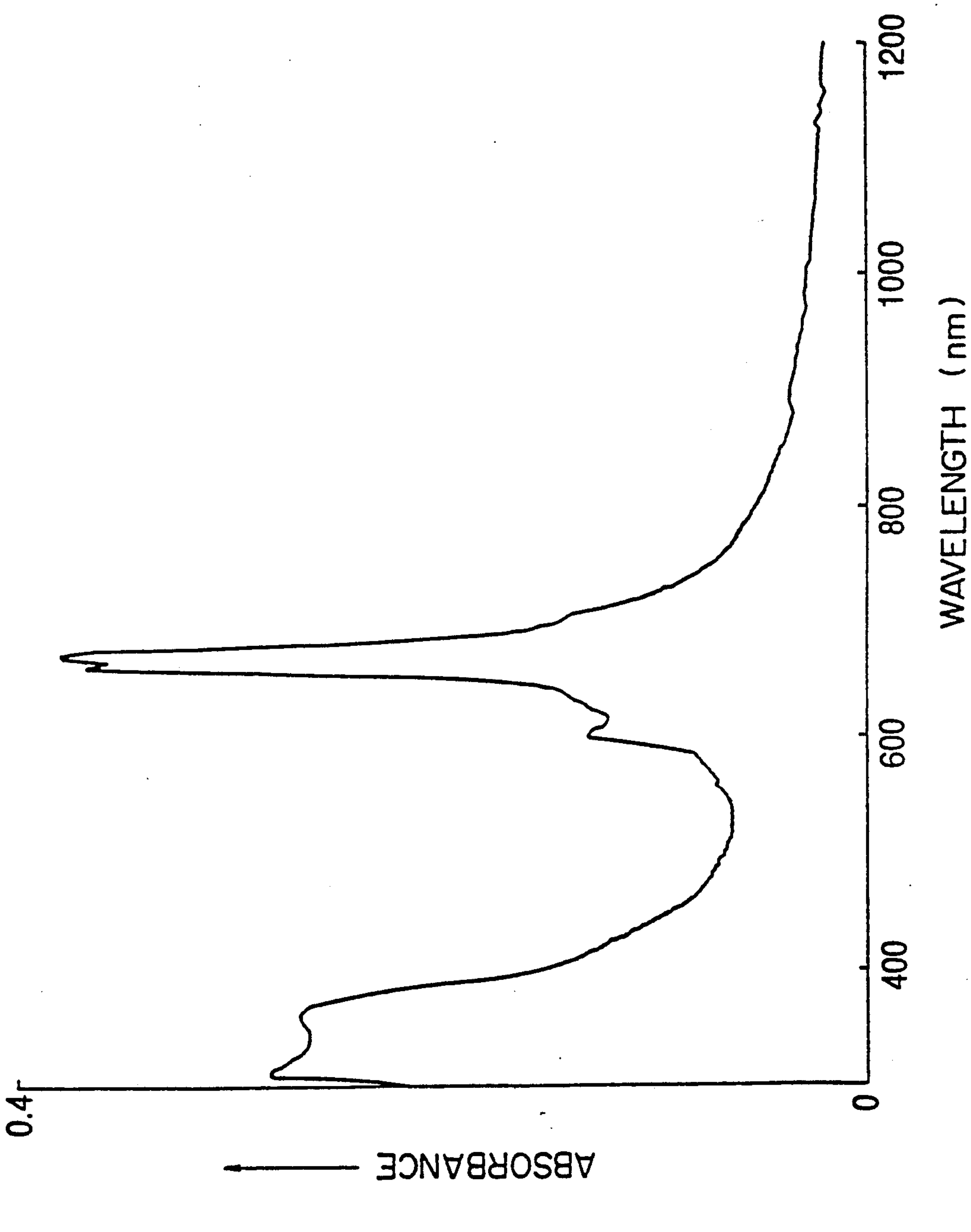

The green solid was subjected to measurement of electronic spectrum (FIG. 17) in a pyridine solution to give an absorption maximum at 662-671 nm. It was found that a compound of the formula (VII) wherein Z is Cl; M is Si; $A^1$, $A^2$, $A^3$ and $A^4$ are each

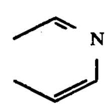

Figure 18:
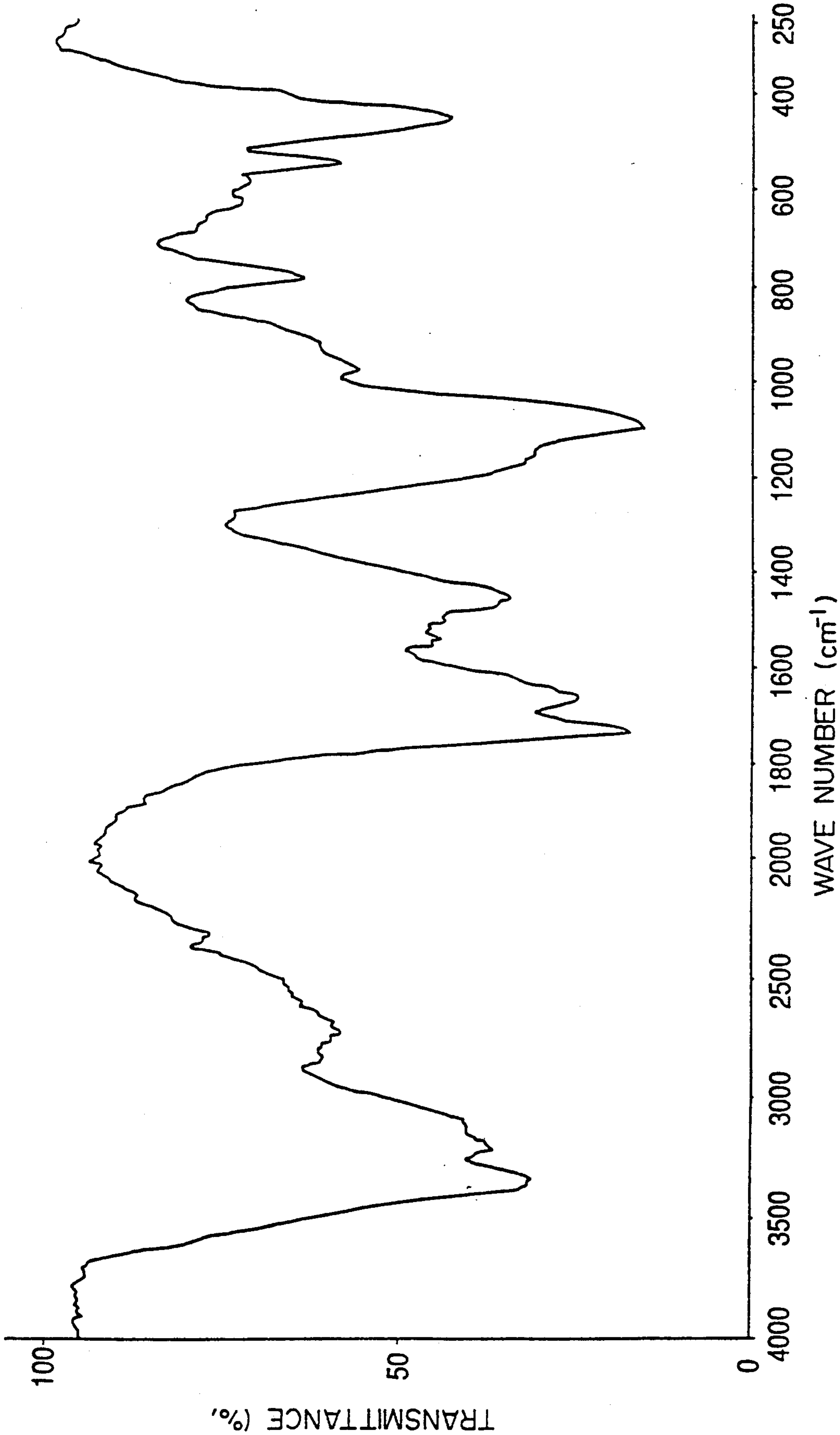

[hereinafter referred to as "$Cl_2Si$(3,4-Pric)"] was formed. IR spectrum of this $Cl_2Si$(3,4-Pric) is shown in FIG. 18. From this spectrum, the presence of urea and the like as impurities was admitted, but $Cl_2Si$(3,4-Pric) was used in the next reaction without further purification.

Figure 19:
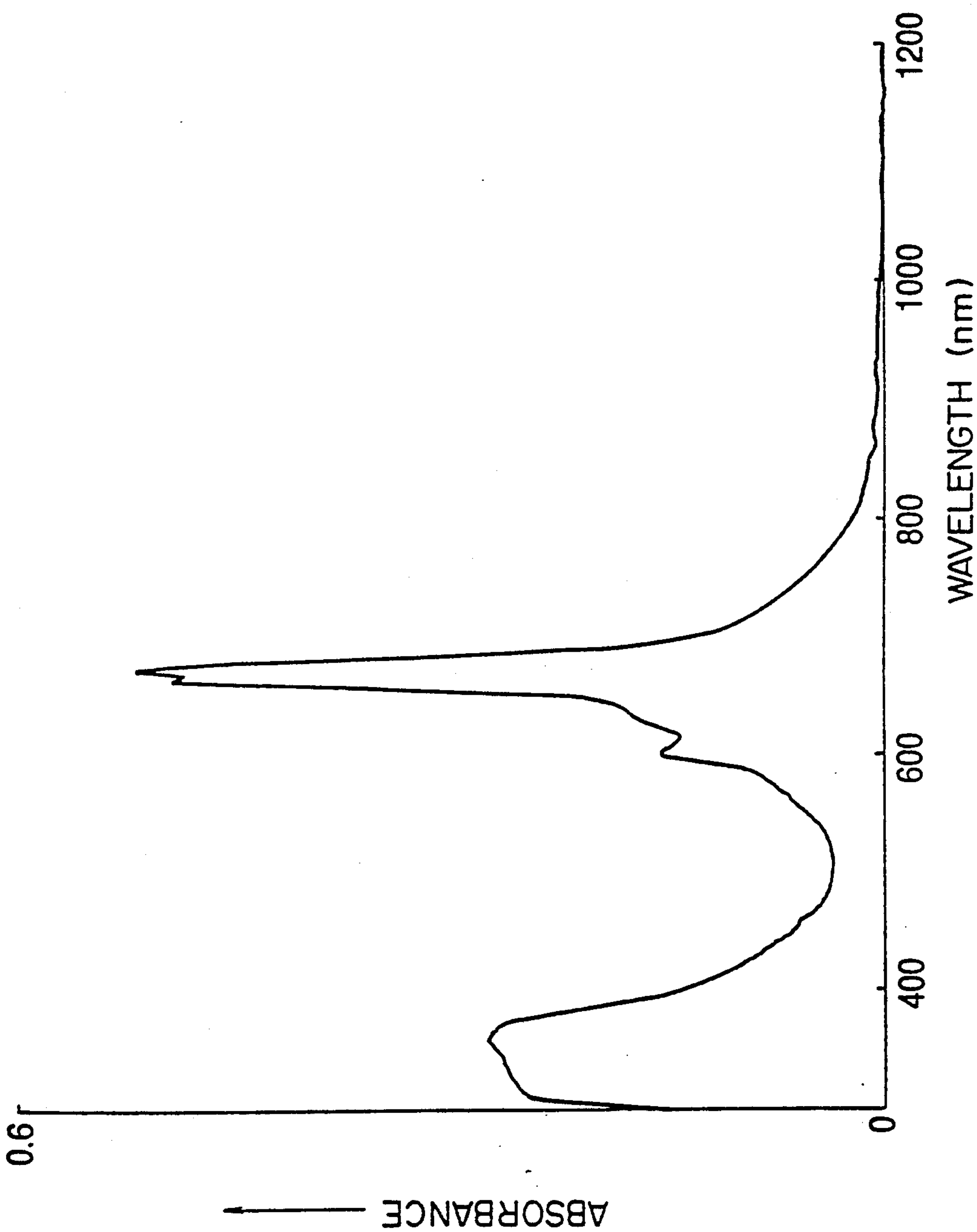

In 57 ml of ethanol, 18 g (29.2 mmoles) of $Cl_2Si$(3,4-Pric) was placed and 57 ml of ammonia water and 224 ml of water were added thereto, followed by refluxing for about 5 hours. After cooling, the reaction mixture was filtered, washed with water and methanol and dried under reduced pressure to yield 10 g of a green solid. The green solid was subjected to measurement of electronic spectrum (FIG. 19) in a pyridine solution to give an absorption maximum at 662-672 nm. It was found that a compound of the formula (II) wherein M is Si; and $A^1$, $A^2$, $A^3$ and $A^4$ are each

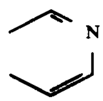

Figure 20:
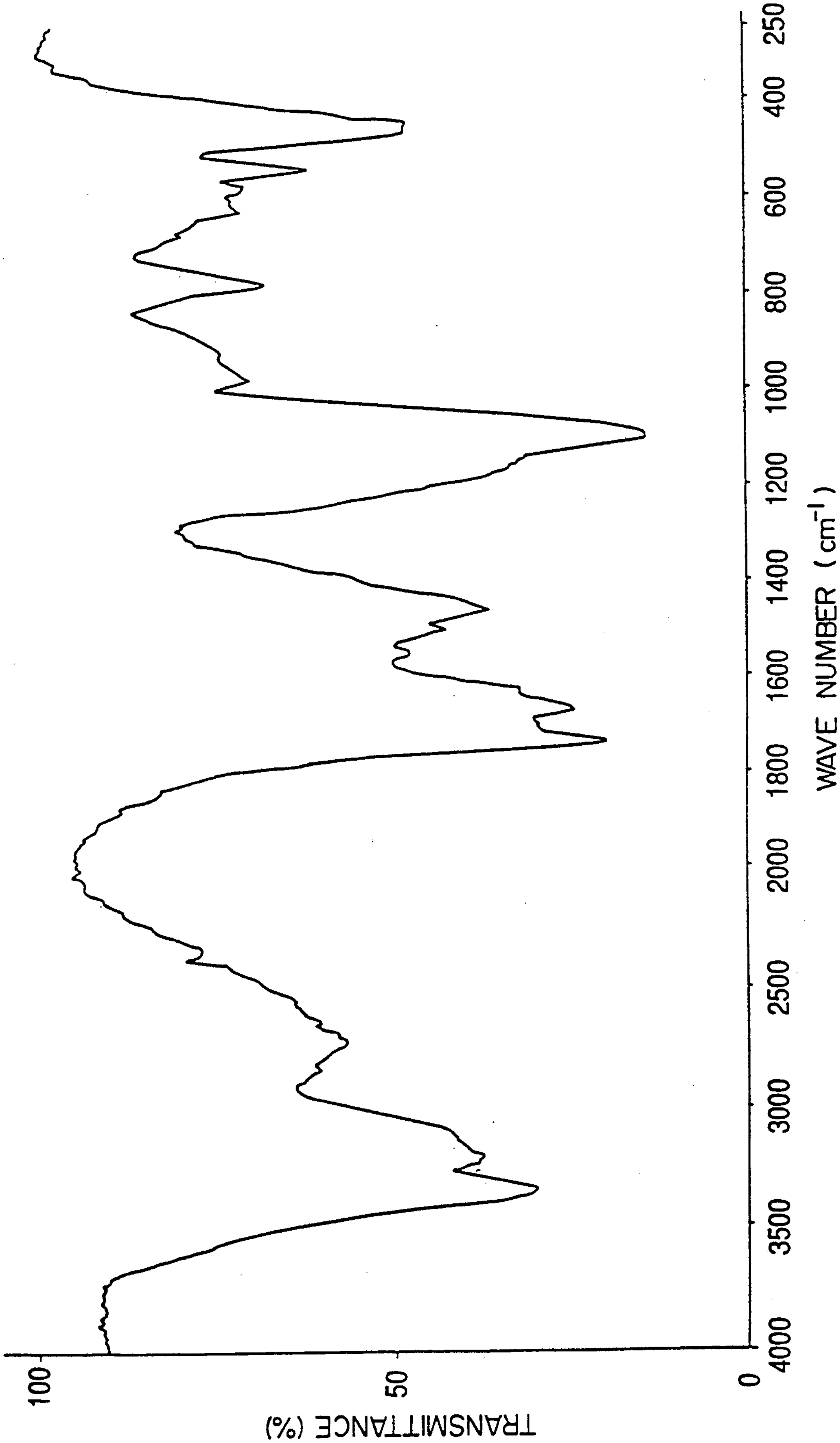
Figure 2I:
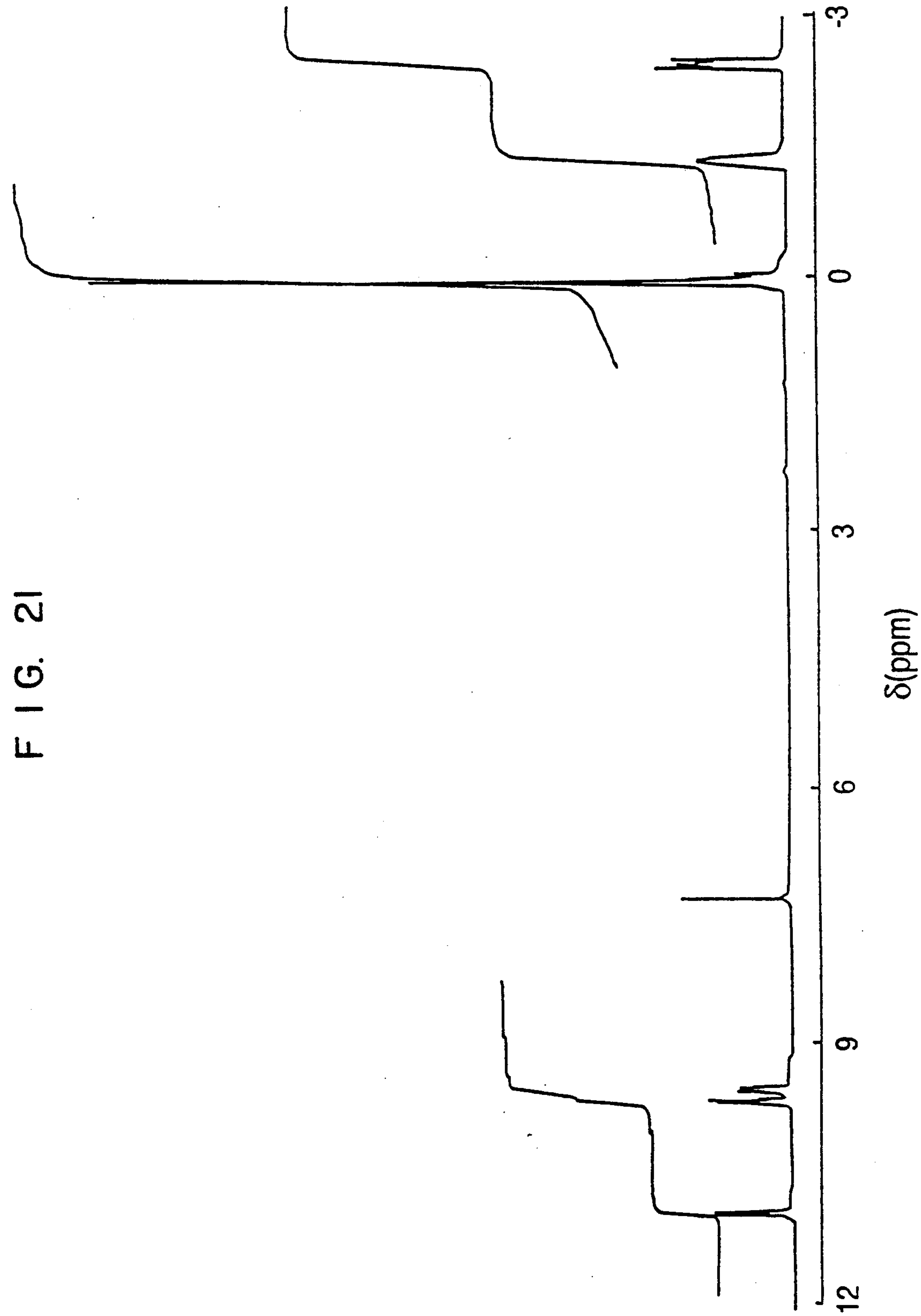

[hereinafter referred to as "$(HO)_2Si(3,4\text{-}Pric)$"] was formed. IR spectrum of $(HO)_2Si(3,4\text{-}Pric)$ is shown in FIG. 20. From this spectrum, the presence of urea and the like as impurities was admitted, but $(HO)_2Si(3,4\text{-}Pric)$ was used in the next reaction without further purification.

To a suspension of 4.5 g (7.8 mmoles) of (HO)2Si(3,4-Pric) in 360 ml of pyridine, 13.2 ml (49.3 mmoles) of tributylchlorosilane was added under a nitrogen atmosphere. The resulting mixture was refluxed for about 6 hours. After cooling, the pyridine was removed by distillation under reduced pressure. To the residue, chloroform was added and filtered to give a filtrate soluble in the chloroform, followed by purification by column chromatography over silica gel. After recrystallization from a mixed solvent of hexane/chloroform, 50 mg of violet crystals were obtained. From the following analytical results, the resulting product was confirmed to be Compound No. (152) listed in Table 1.

(1) Melting point: 289°-290° C., ≧297° C.

Since the melting point measuring apparatus used had an upper limit of measuring at 300° C, the measurement at 300° C. or higher was not carried out. But, Compound No. (152) has at least two melting points due to a mixture of isomers caused by differences of directions of 3,4-pyridine rings condensed.

(2) Elementary analysis:

| | C | H | N |
|---|---|---|---|
| Calculated (%) | 64.02 | 6.82 | 17.24 |
| Found (%) | 64.17 | 6.88 | 17.19 |

(3) NMR spectrum: $CDCl_3$.

Shown in FIG. 21 which shows a spectrum of a mixture of several isomers caused by differences of directions of 3,4-pyridine rings condensed.

δ values: 10.96-10.93 (4H, m), 9.65-9.59 (4H, m), 9.51-9.44 (4H, m), 0.08 (30H, m), −1.32 (12H, quintet—like m), −2.45 (12H, t—like m).

Figure 22:
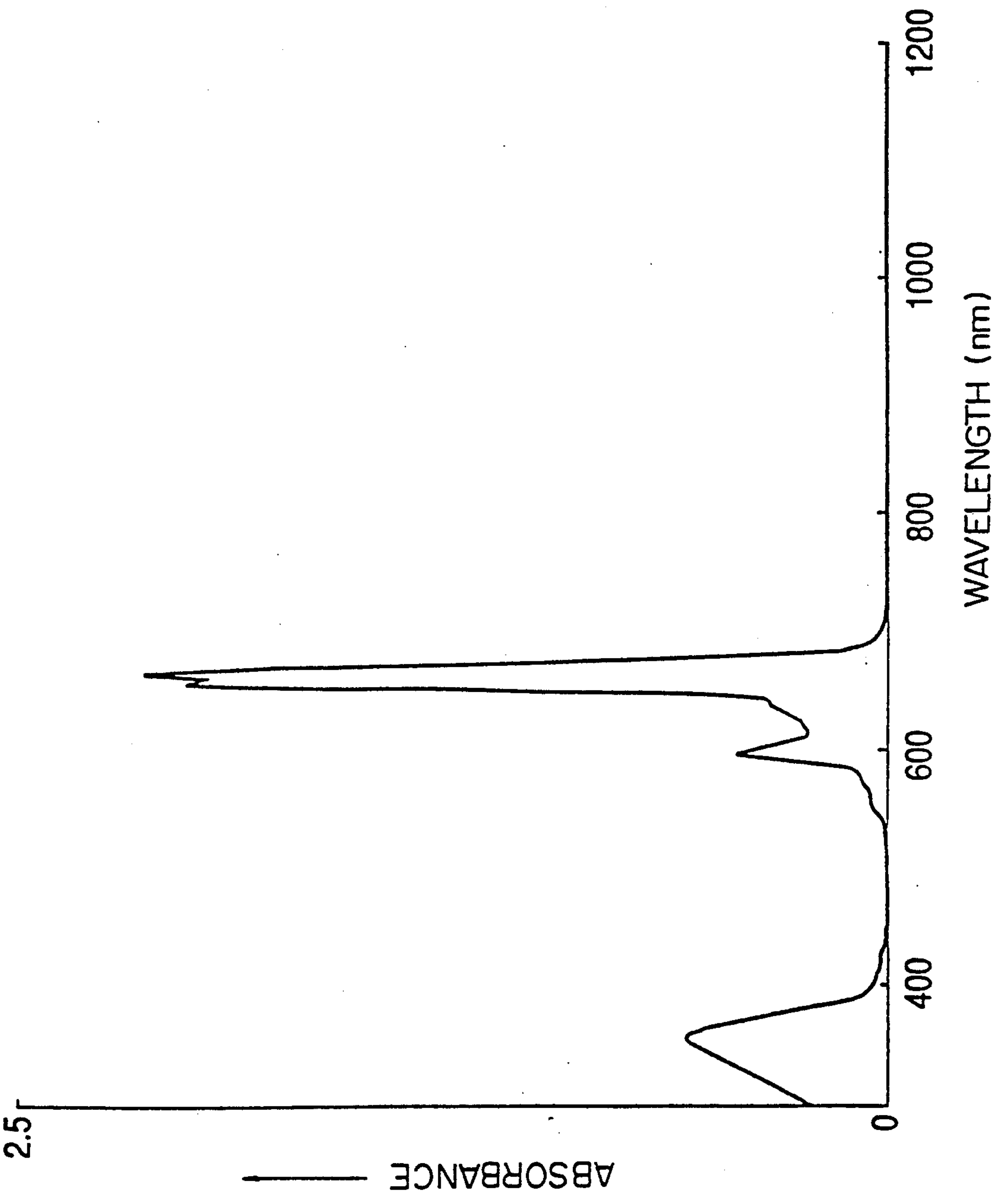

(4) Electronic spectrum ($CHCl_3$ solution): Shown in FIG. 22.

Figure 23:
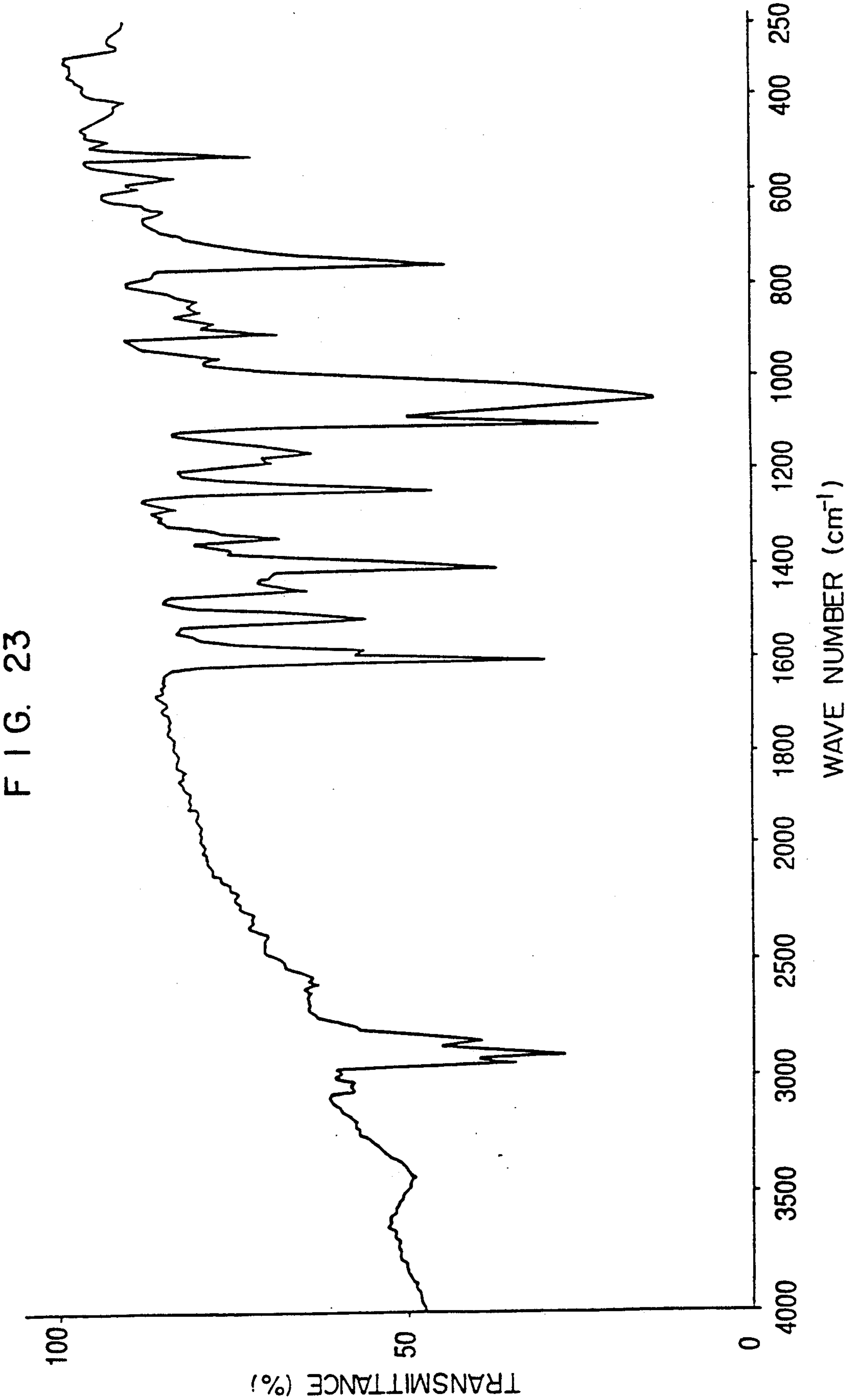

(5) IR spectrum (KBr method): Shown in FIG. 23.

EXPERIMENT 3

Figure 24:
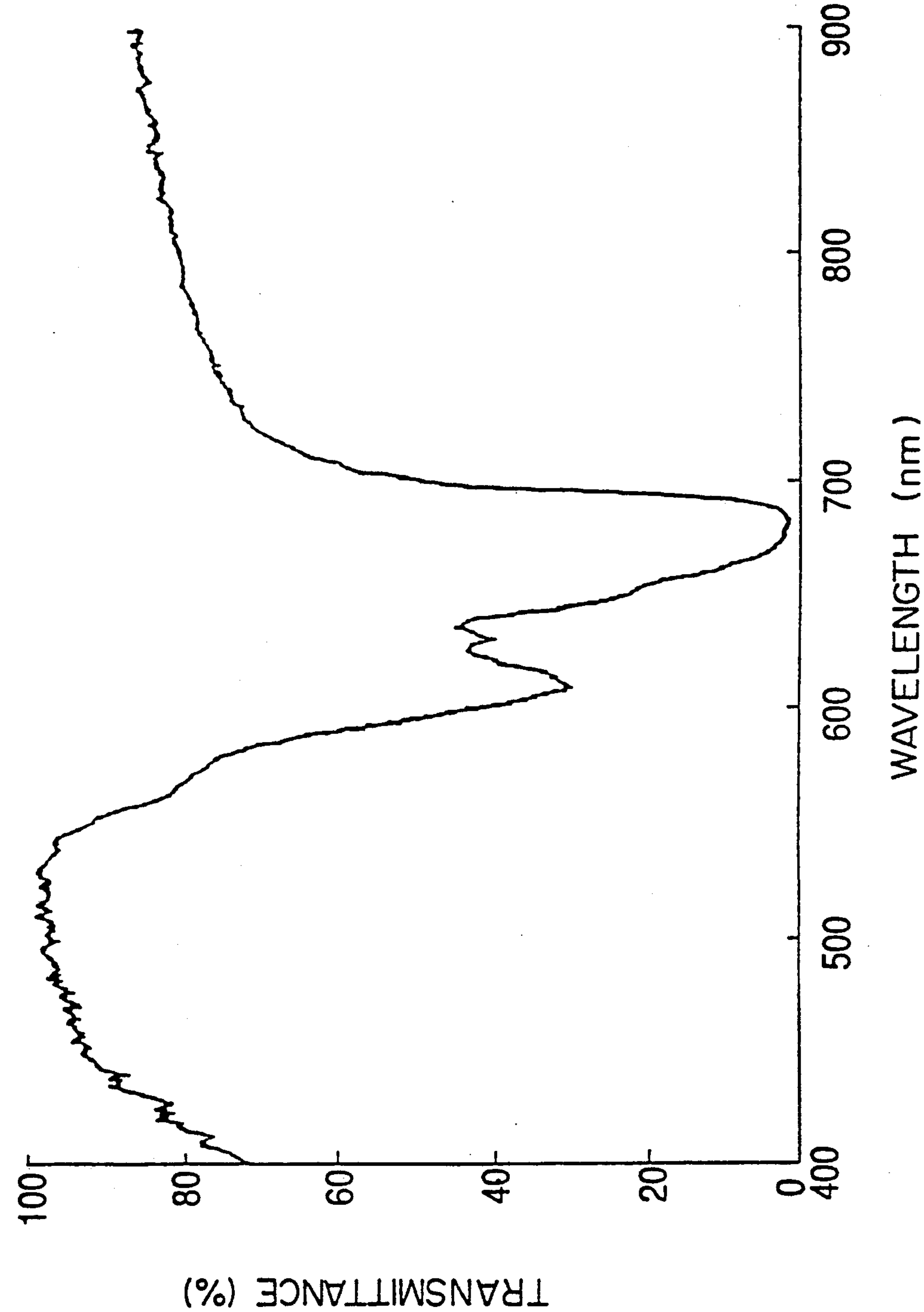
Figure 25:
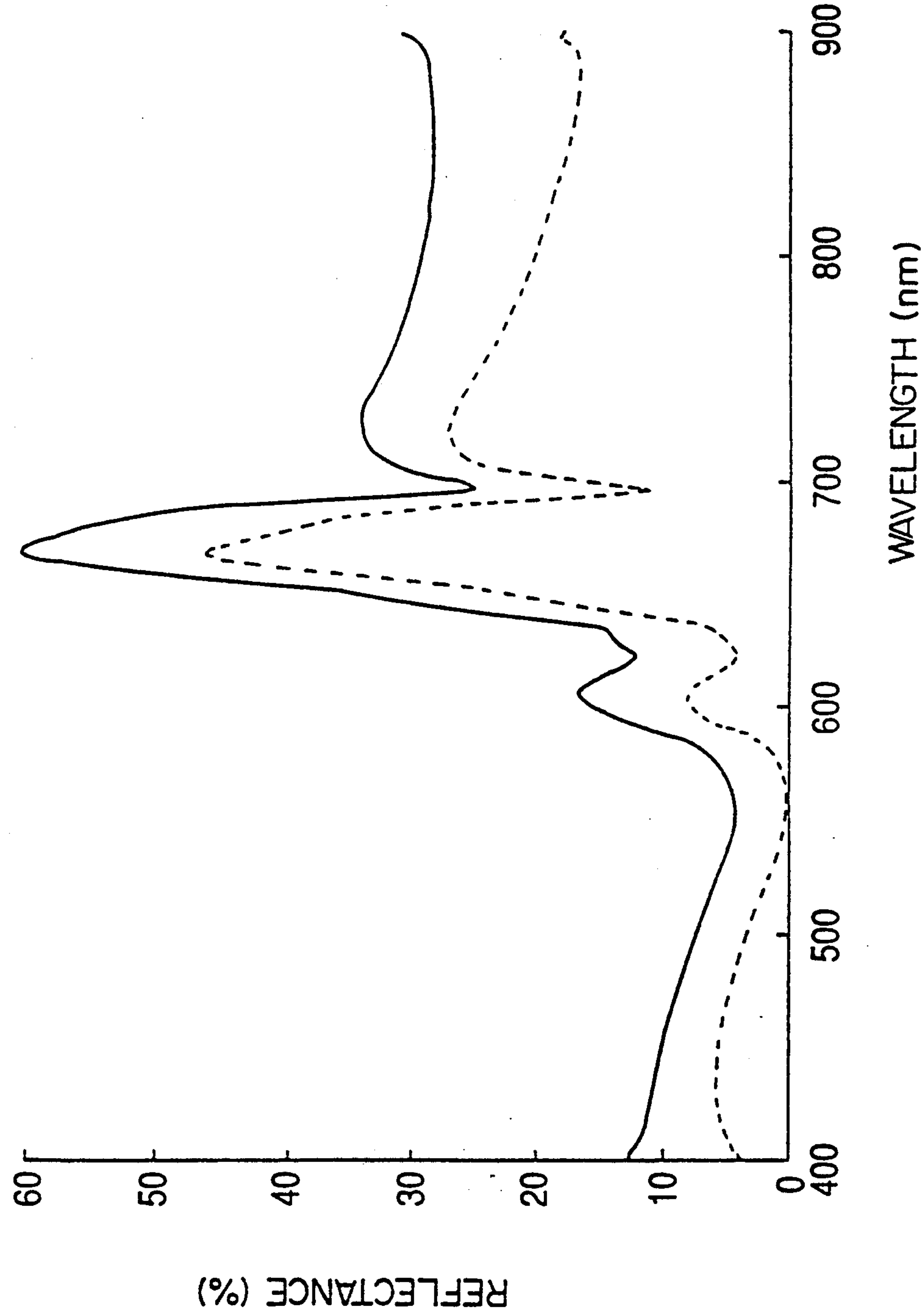

A chloroform solution of Compound No. (152) (0.3% (W/W)) was spin-coated on a glass substrate and dried at about 80° C. for about 15 minutes to form an organic film. The organic film was subjected to measurement of the transmission spectrum (FIG. 24) and the 5° regular reflection spectra (FIG. 25) wherein the curve—exhibited the spectrum measured from the spin coated film side and the curve - - - - the spectrum measured from the glass substrate side. As shown in FIGS. 24 and 25, absorption maximum and reflection maximum are shown at near 670 nm.

EXAMPLE 4

Synthesis of Compound No. (302)

1.3 Grams (10 mmoles) of 2,3-dicyanopyrazine) 11.5 ml (100 mmoles) of silicon tetrachloride, 20 mg of ammonium molybdate and 10 g of urea were reacted at about 230° to 240° C. for about 2 hours. After cooling, water was added to a solidified reaction mixture and stirred at about 50° C. for 30 minutes. An insoluble solid was filtered and washed with water. Further, the solid was stirred in methanol at about 50° C. for 30 minutes, followed by filtration and washing with methanol to yield a green solid quantitatively.

Figure 26:
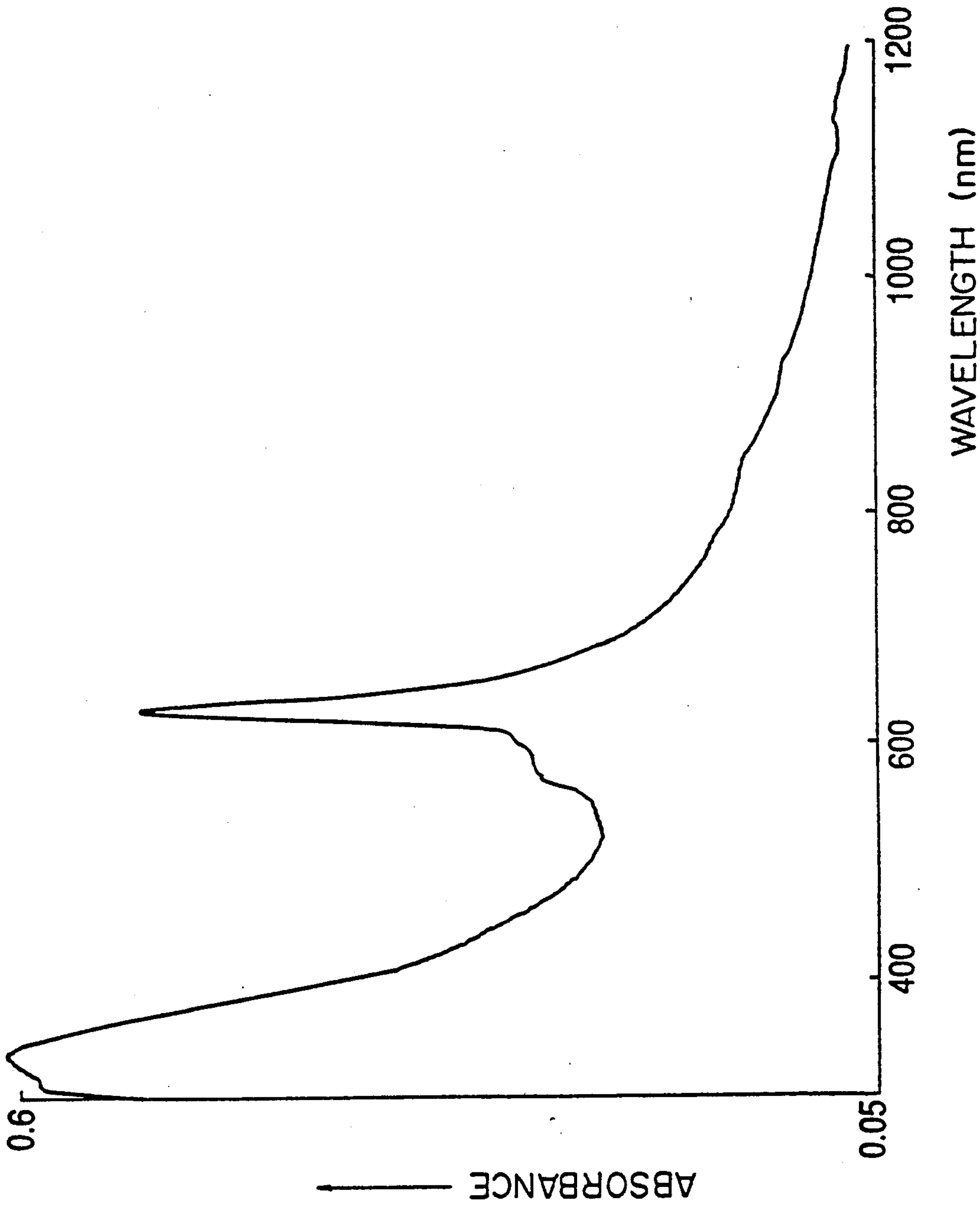

The green solid was subjected to measurement of electronic spectrum (FIG. 26) in a pyridine solution to give an absorption peak at 630 nm. It was found that a compound of the formula (VII) wherein Z is Cl; M is Si; $A^1$, $A^2$, $A^3$ and $A^4$ are each

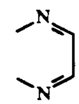

Figure 27:
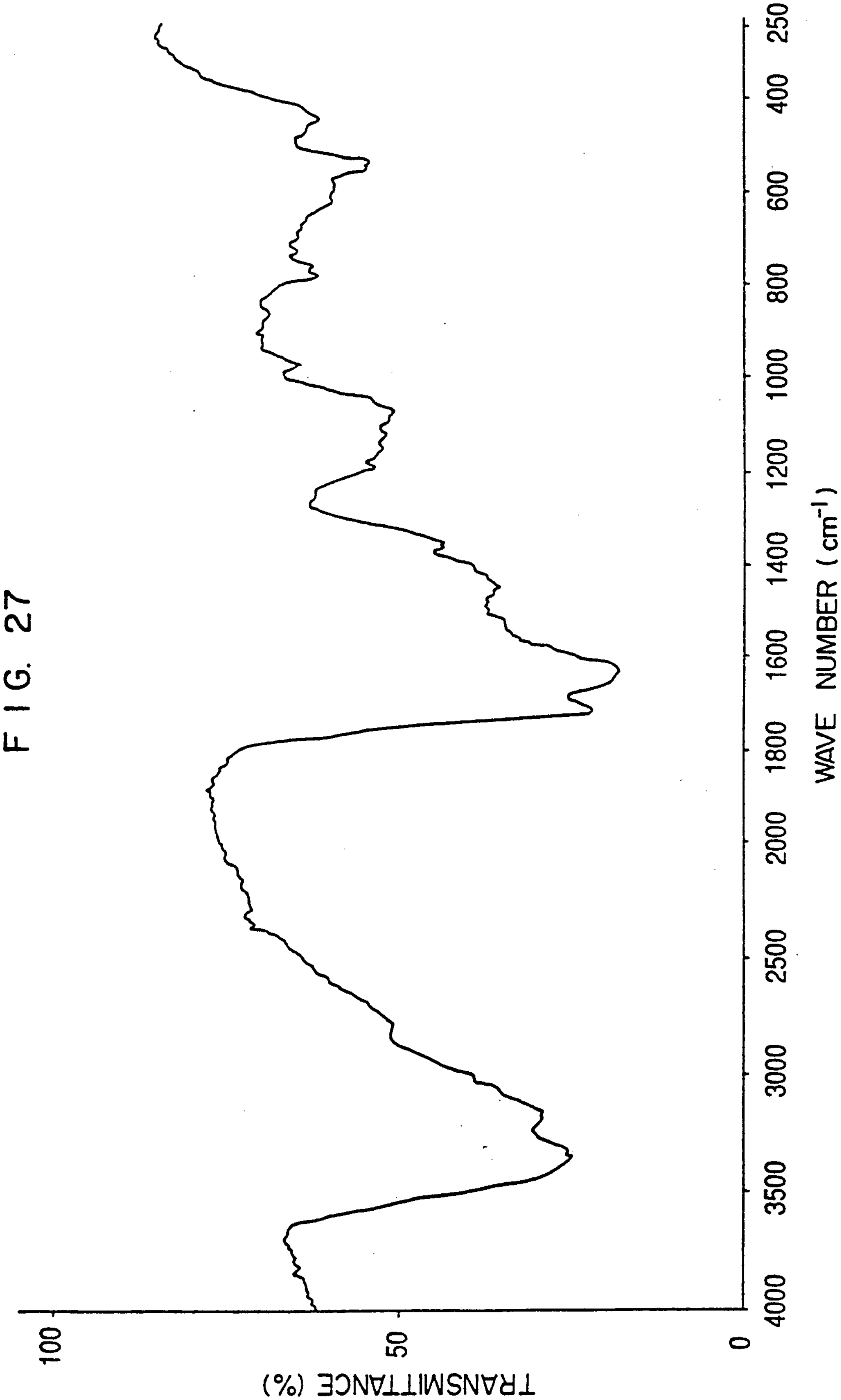

[hereinafter referred to as "$Cl_2Si(Prac)$"] was formed. IR spectrum of this $Cl_2Si(Prac)$ is shown in FIG. 27. From this spectrum, the presence of urea and the like as impurities was admitted, but $Cl_2Si(Prac)$ was used in the next reaction without further purification.

Figure 28:
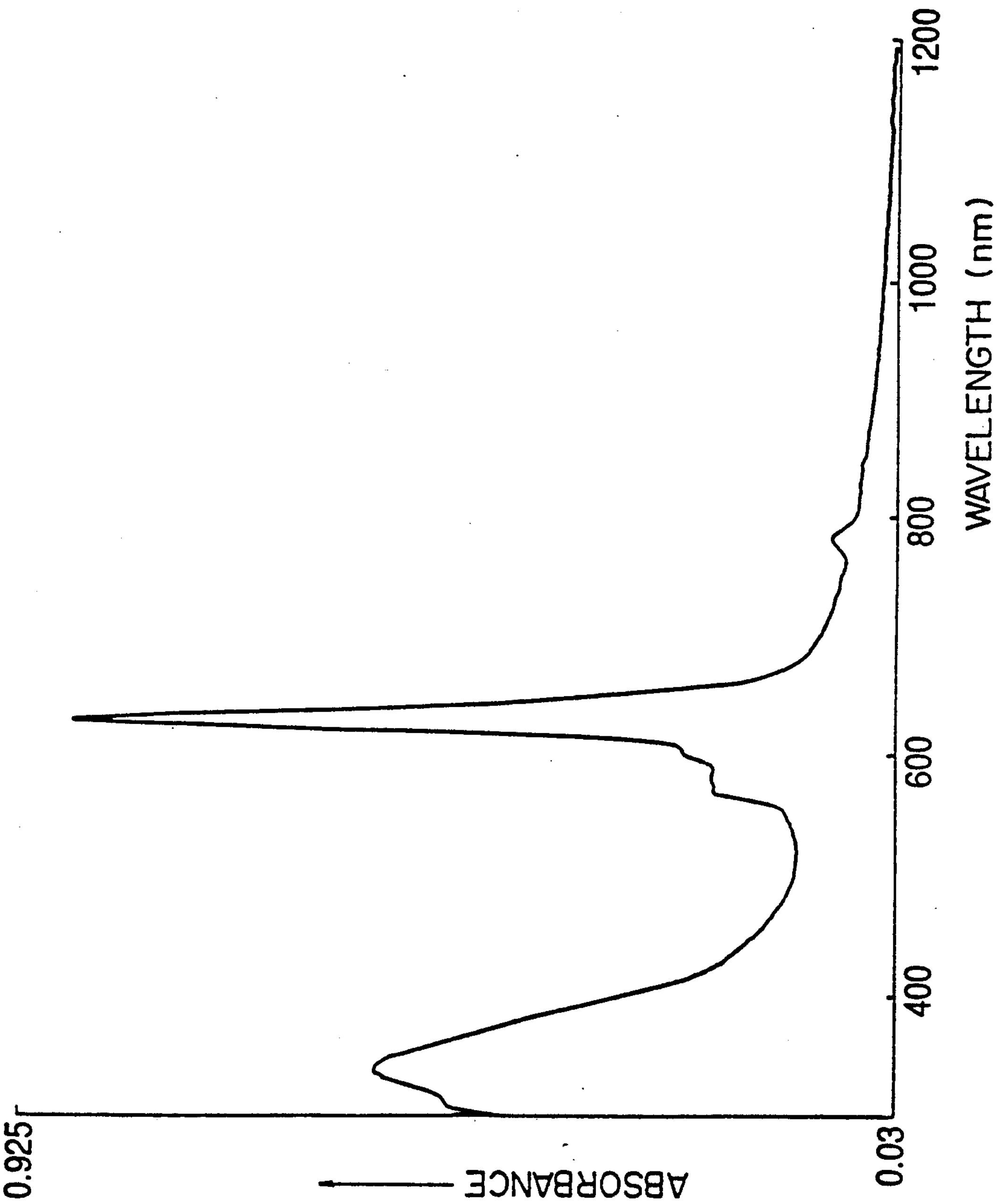

In 50 ml of ethanol, 9.4 g (15.9 mmoles) of $Cl_2Si(\text{-}Prac)$ was placed, and 50 ml of ammonia water and 200 ml of water were added thereto, followed by refluxing for about 18 hours. After cooling, the reaction mixture was filtered, washed with water and methanol and dried under reduced pressure to yield 6 g of a green solid. The green solid was subjected to measurement of electronic spectrum (FIG. 28) in a pyridine solution to give an absorption peak at 629 nm. It was found a compound of the formula (II) wherein M is Si; $A^1$, $A^2$, $A^3$ and $A^4$ are each

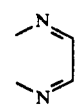

Figure 29:
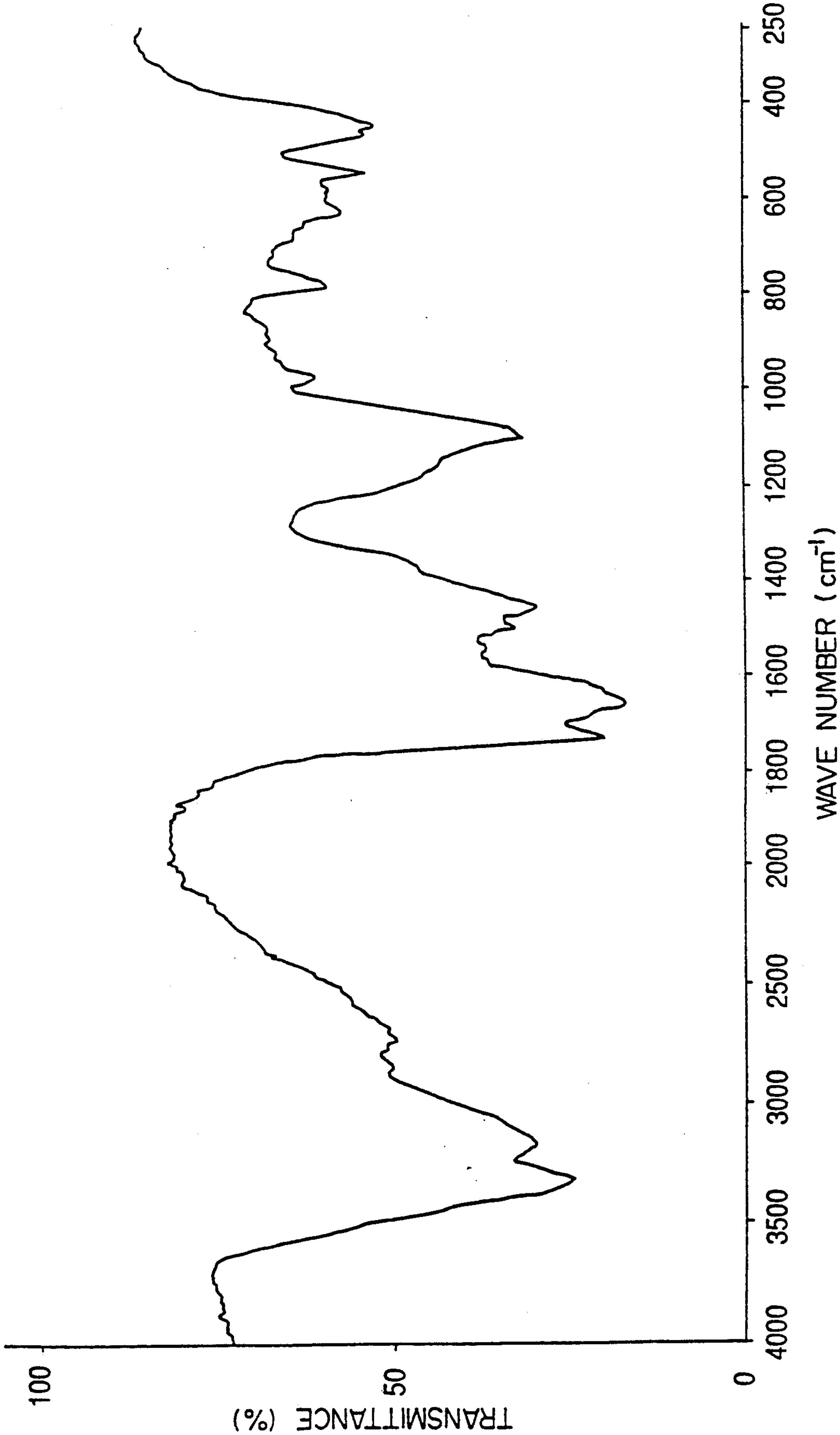

[hereinafter referred to as "$(HO)_2Si(Prac)$"] was formed. IR spectrum of this $(HO)_2Si(Prac)$ is shown in FIG. 29. From this spectrum, the presence of urea and the like as impurities was admitted, but $(HO)_2Si(Prac)$ was used in the next reaction without further purification.

To a suspension of 400 mg (0.69 mmole) of $(HO)_2Si(\text{-}Prac)$ in 40 ml of pyridine, 2.5 ml (10.4 mmoles) of tributylamine and then 2.8 ml (10.4 mmole) of tributylchlorosilane were added under a nitrogen atmosphere. The resulting mixture was refluxed for about 7 hours. After cooling, the pyridine was removed by distillation under reduced pressure, followed by addition of hexane. Precipitated solid was filtered and washed with hexane. The solid was dissolved in chloroform and purified by column chromatography over silica gel. After recrystallization from a mixed solvent of hexane/-chloroform, 5 mg of violet crystals were obtained. From the following analytical results, the resulting product was confirmed to be Compound No. (302) listed in Table 1.

(1) Melting point: >300° C.

(2) Elementary analysis:

| | C | H | N |
|---|---|---|---|
| Calculated (%) | 58.86 | 6.38 | 22.89 |

-continued

| (2) Elementary analysis: | C | H | N |
|---|---|---|---|
| Found (%) | 58.79 | 6.30 | 22.95 |

Figure 30:
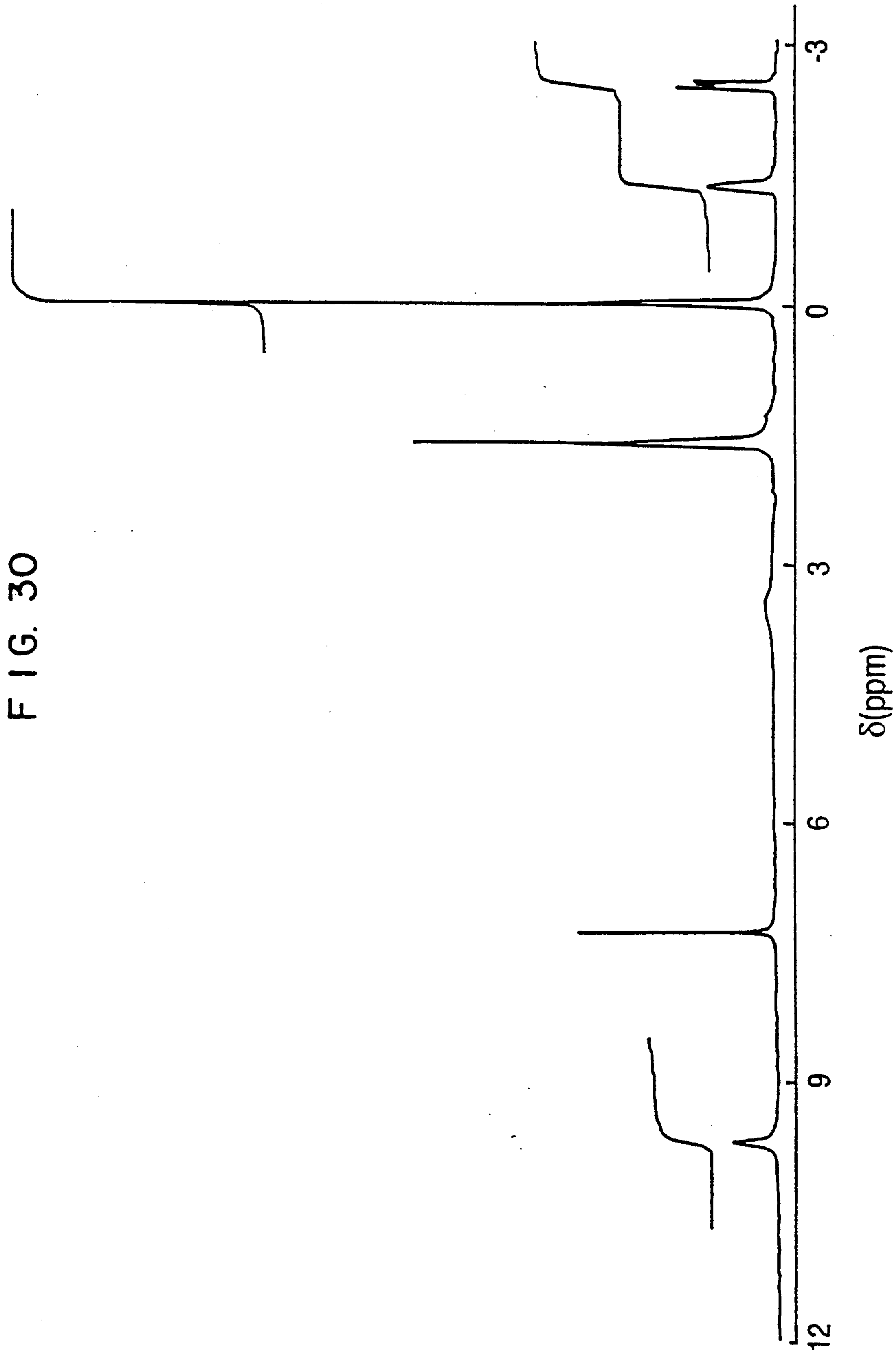

(3) NMR spectrum: $CDCl_3$ Shown in FIG. 30.

δ values: 9.74 (8H, br-s), 0.03 (30H, br-s), −1.26-−1.39 (12H, m), −2.51 (12H, t-like m).

Figure 31:
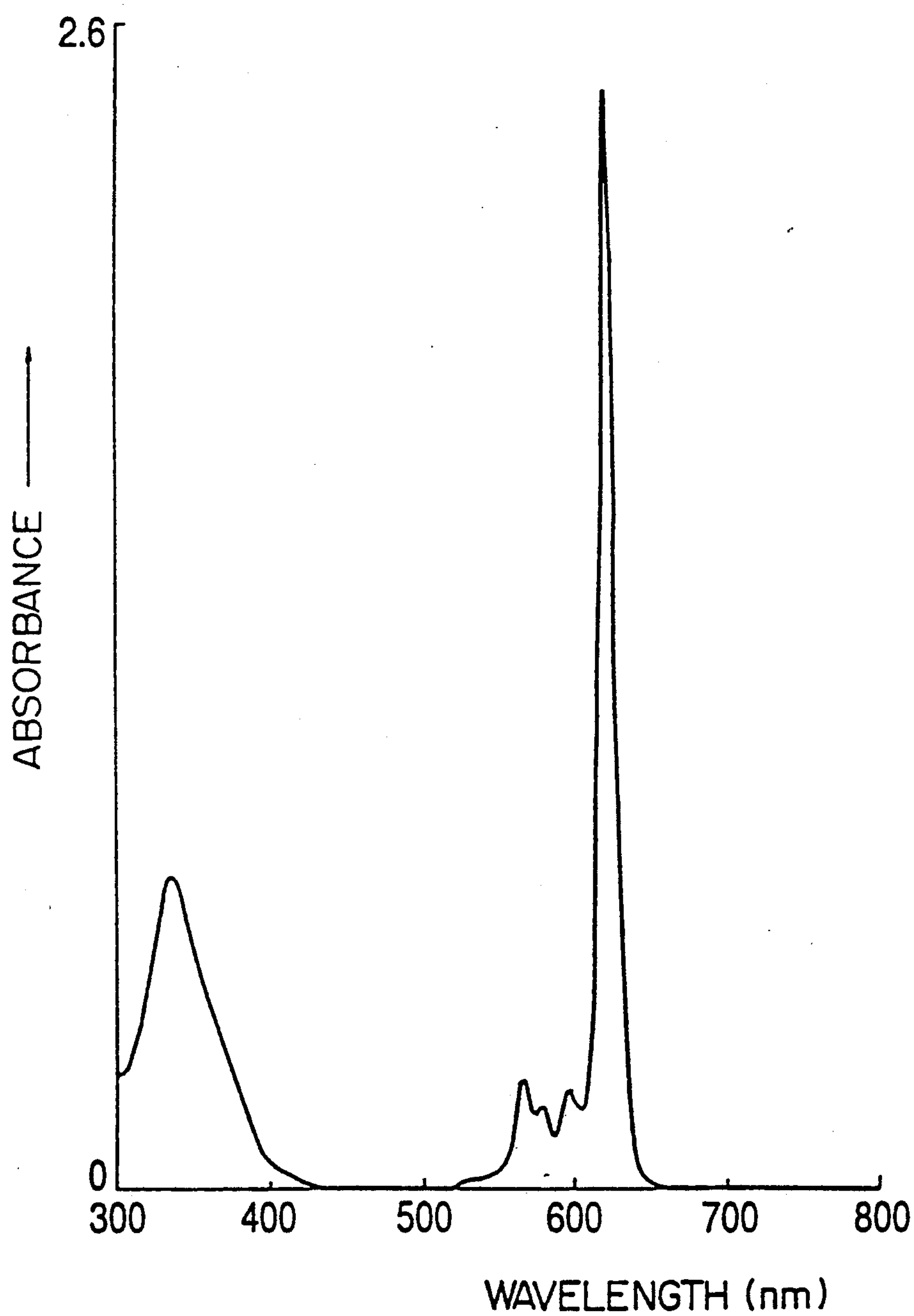

(4) Electronic spectrum ($CHCl_3$ solution): Shown in FIG. 31.

Figure 32:
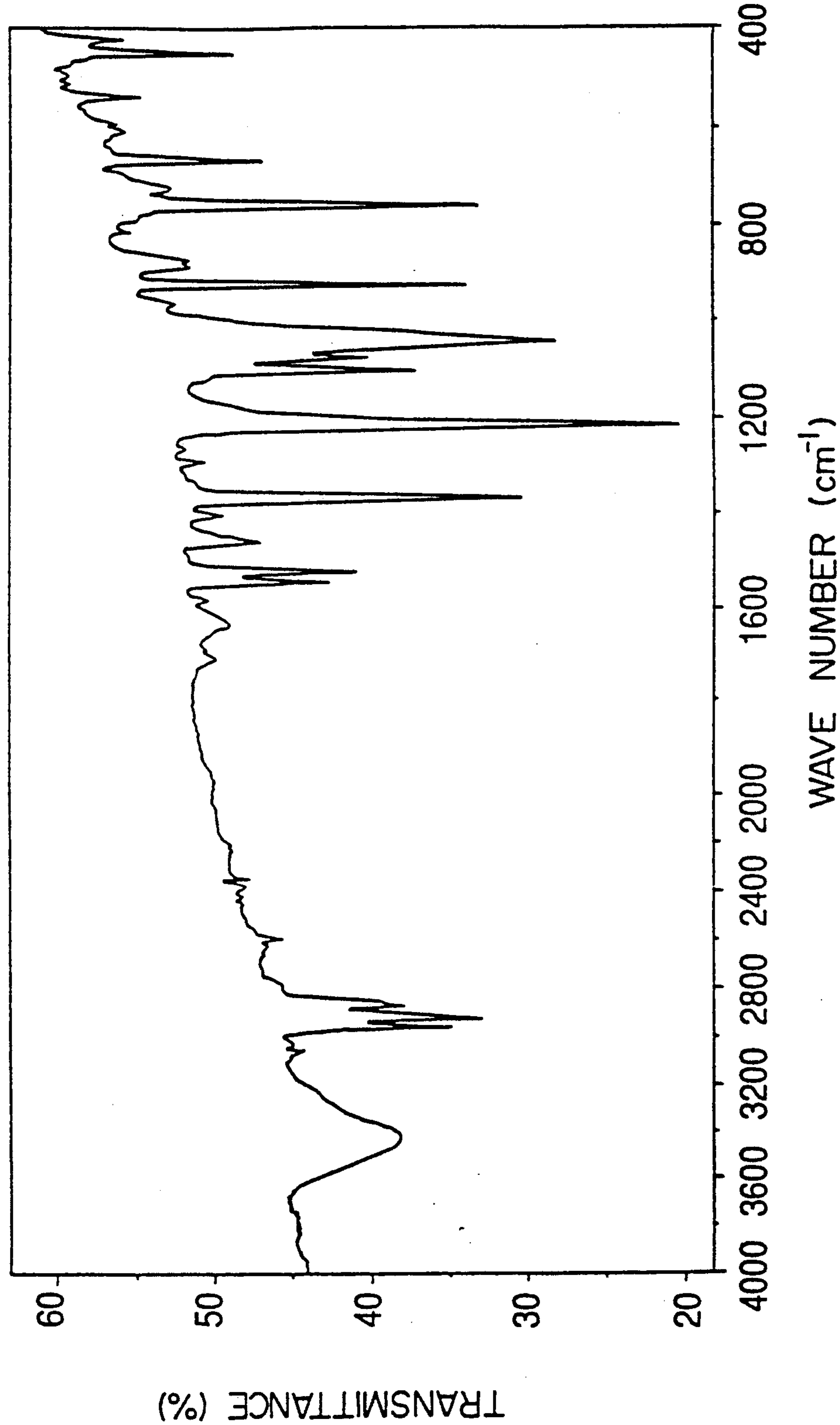

(5) IR spectrum (KBr method): Shown in FIG. 32.

EXAMPLE 5

Synthesis of Compound No. (301)

To a suspension of 400 mg (0.69 mmole) of $(HO)_2Si$(-Prac) synthesized in the same manner as described in Example 4 in 40 ml of pyridine, 2.5 ml (10.4 mmoles) of tributylamine and then 3.8 ml (10.4 mmoles) of trihexylchlorosilane were added under a nitrogen atmosphere, and refluxed for about 7 hours. After cooling, the pyridine was removed by distillation under reduced pressure, followed by addition of hexane. Precipitated solid was filtered and washed with hexane. The solid was dissolved in chloroform and purified by column chromatography over silica gel. After recrystallization from a mixed solvent of hexane/chloroform, 3 mg of violet crystals were obtained. From the following analytical results, the resulting product was confirmed to be Compound No. (301) listed in Table 1.

(1) Softening point: 270°-275° C.

| (2) Elementary analysis: | C | H | N |
|---|---|---|---|
| Calculated (%) | 62.79 | 7.55 | 19.53 |
| Found (%) | 62.69 | 7.51 | 19.58 |

Figure 33:
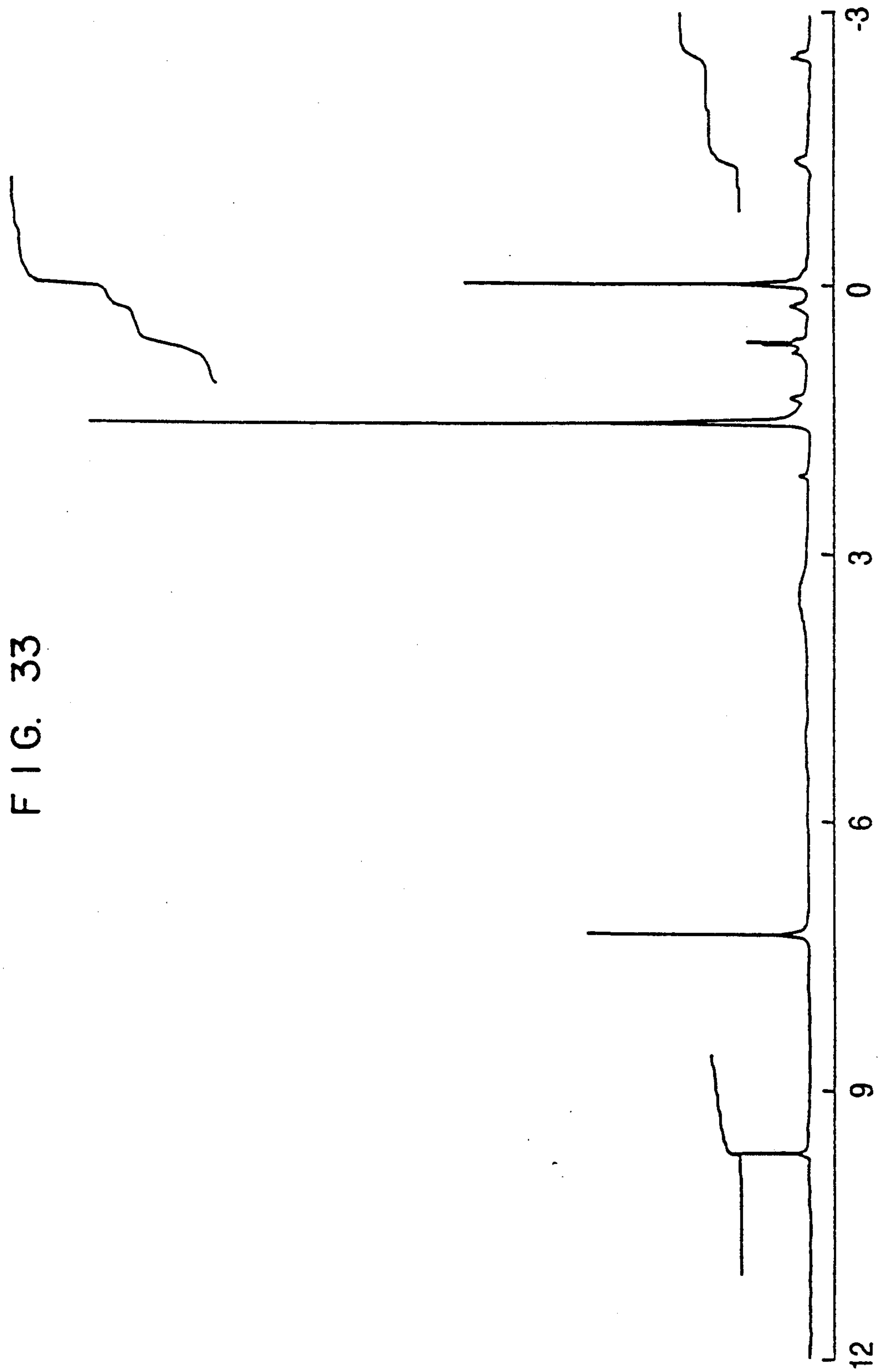

(3) NMR spectrum: $CDCl_3$ Shown in FIG. 33.

δ values: 9.72 (8H, s),
0.80-0.62 (30H, m),
0.28-0.22 (12H, m),
0.20-−0.05 (12H,br-s),
−1.32-−2.56 (12H, m), −2.50-−1.33 (12H, m).

Figure 34:
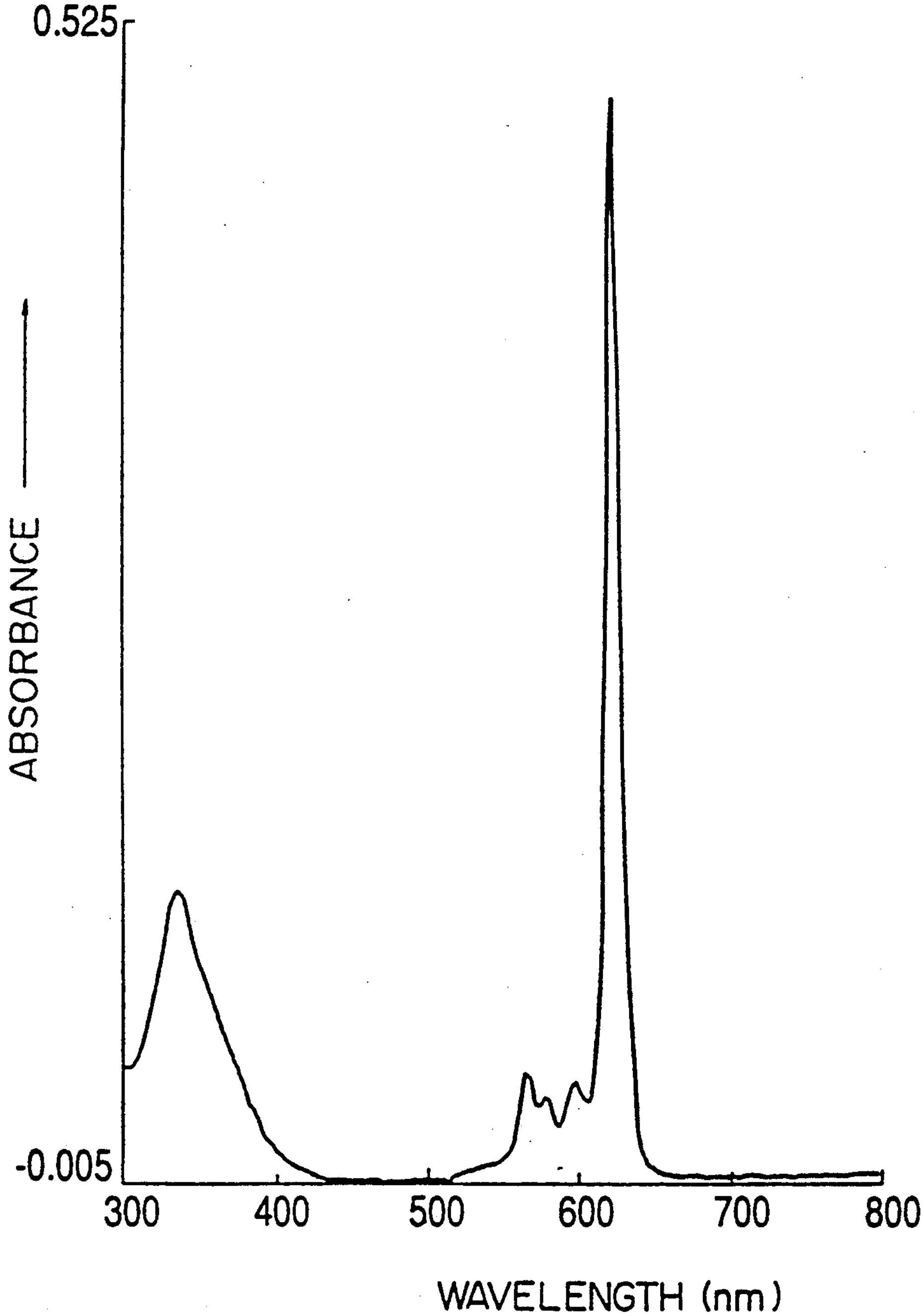

(4) Electronic spectrum ($CHCl_3$ solution): Shown in FIG. 34.

Figure 35:
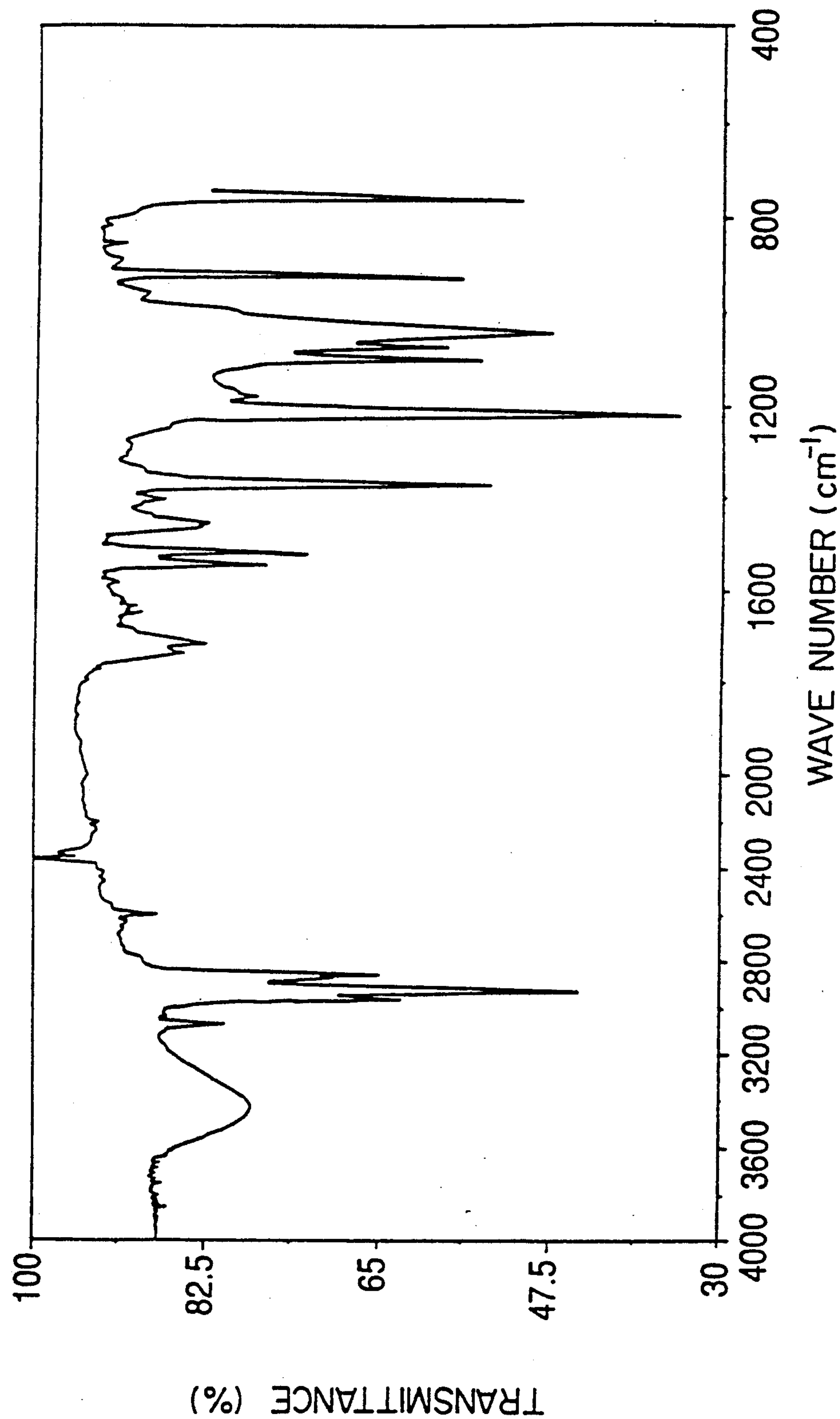

(5) IR spectrum (KBr method): Shown in FIG. 35.

EXPERIMENT 4

Figure 36:
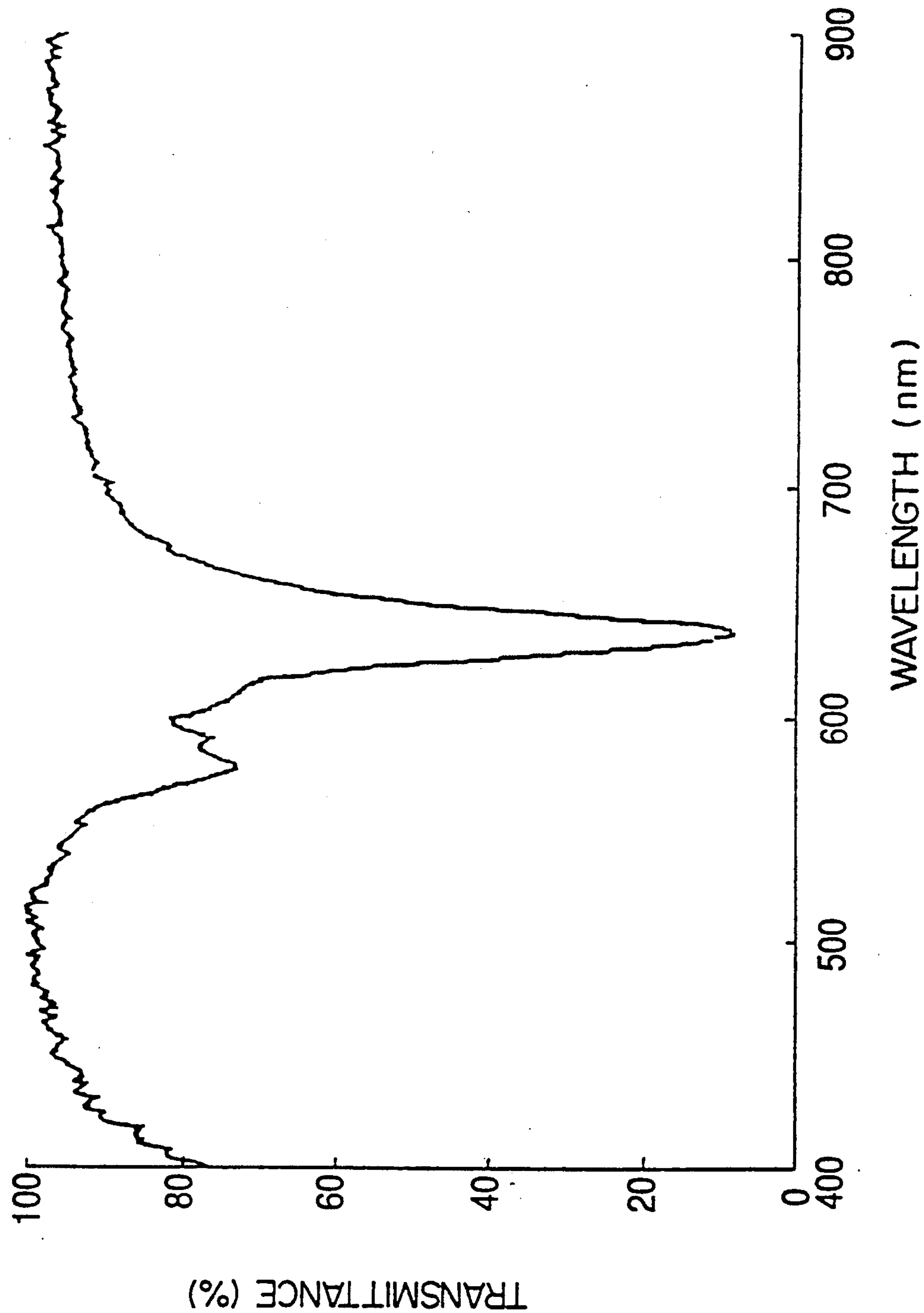
Figure 37:
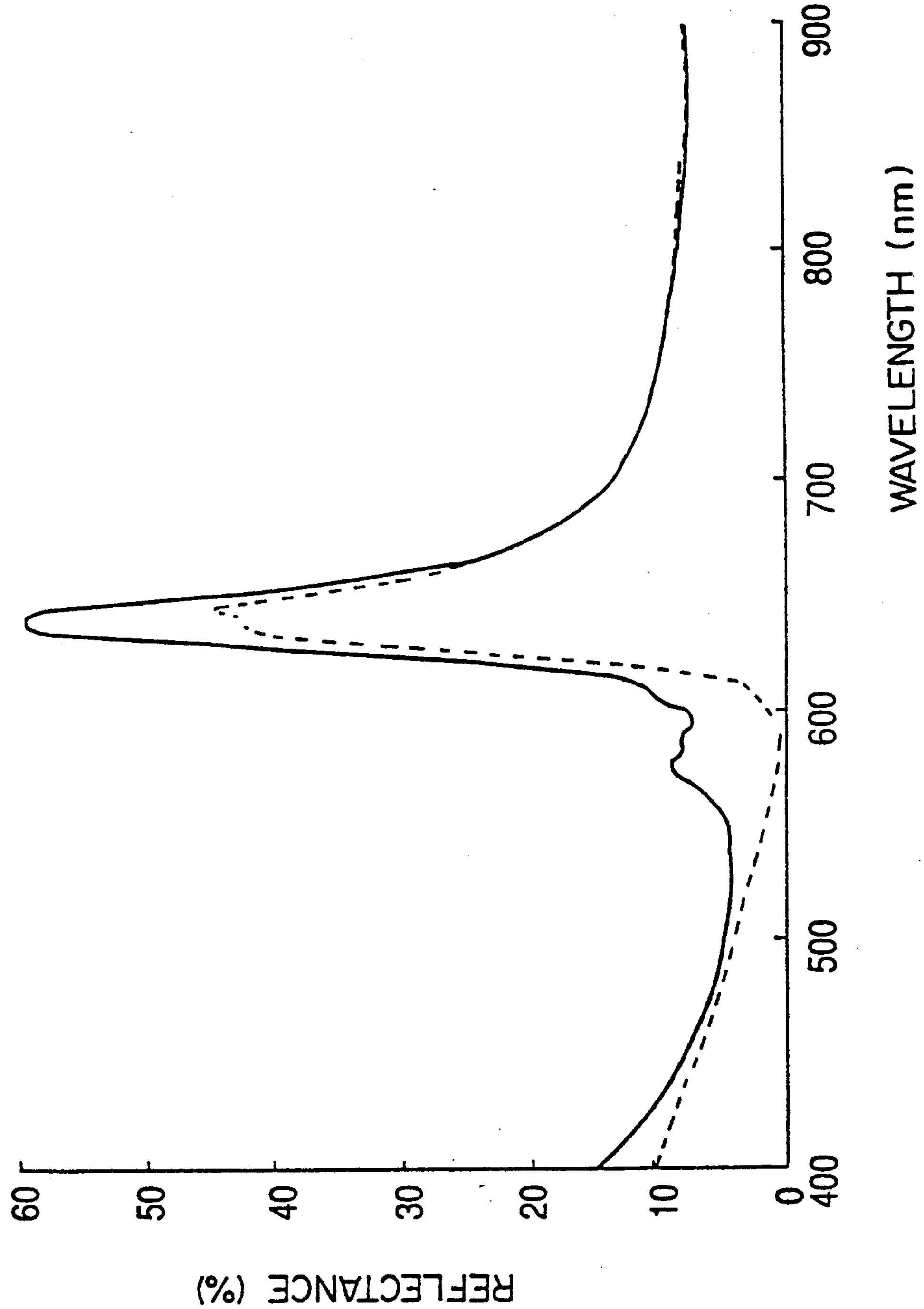

A chloroform solution of Compound No. (302) (0.3% (W/W)) was spin-coated on a glass substrate and dried at about 80° C. for about 15 minutes to form an organic film. The organic film was subjected to measurement of the transmission spectrum (FIG. 36) and the 5° regular reflection spectra (FIG. 37) wherein the curve—revealed the spectrum measured from the spin coated film side and the curve - - - - the spectrum measured from the glass substrate side. As depicted in FIGS. 36 and 37, high absorbing ability and high reflecting ability are shown at near 640 nm.

EXPERIMENT 5

Figure 38:
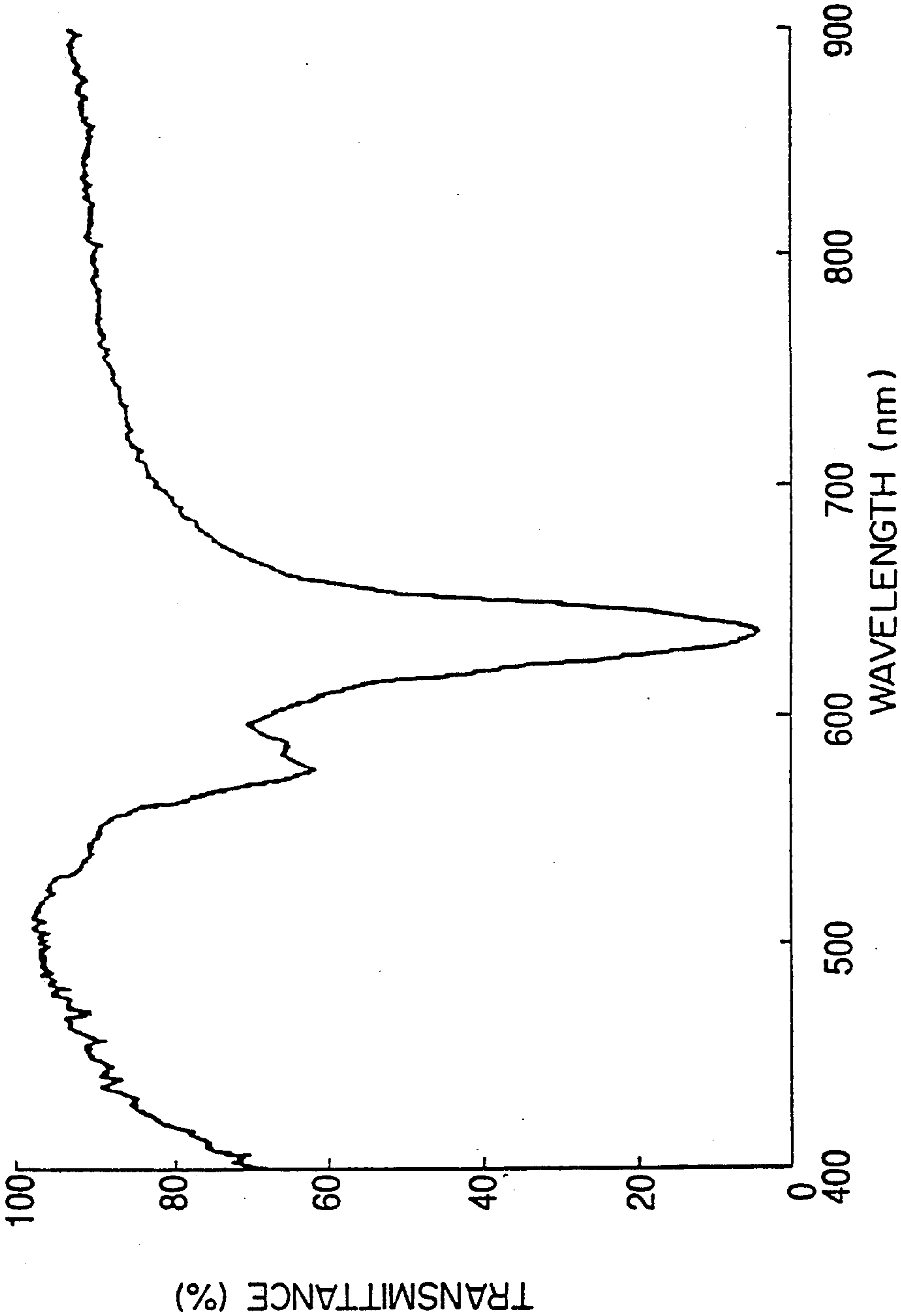
Figure 39:
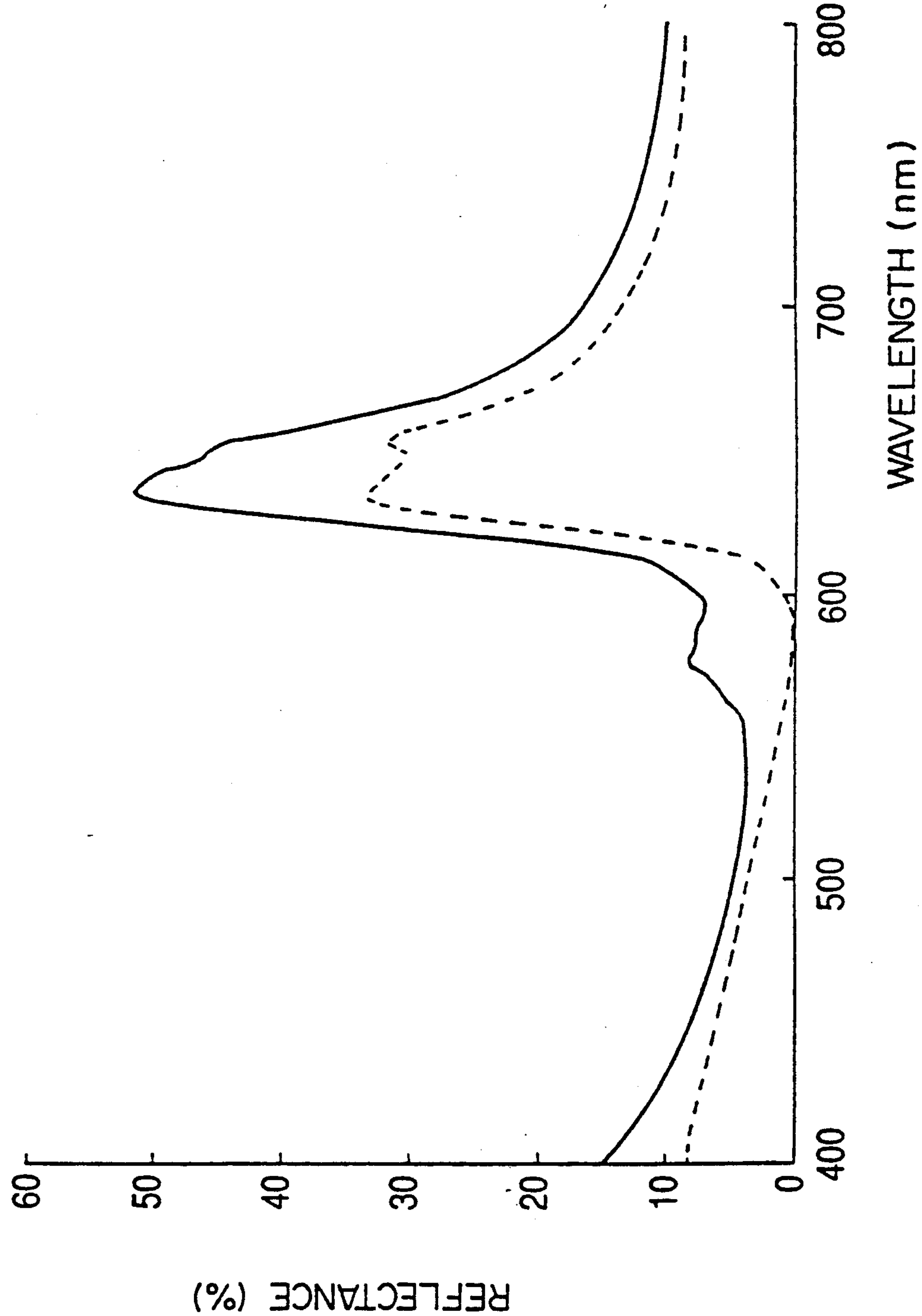

A chloroform solution of Compound No. (301) (0.3% (W/W)) was spin-coated on a glass substrate and dried at about 80° C. for about 15 minutes to form an organic film. The organic film was subjected to measurement of the transmission spectrum (FIG. 38) and the 5° regular reflection spectra (FIG. 39) wherein the curve—revealed the spectrum measured from the spin coated film side and the curve - - - - the spectrum measured from the glass substrate side. As shown in FIGS. 38 and 39, high absorbing ability and high reflecting ability are shown at near 640 nm.

EXAMPLE 6

Synthesis of Compound No. (1312)

To a methanol solution of sodium methoxide prepared by adding 123 mg (5.4 mmoles) of metallic sodium to 72 ml of absolute methanol under a nitrogen atmosphere, 5 g (27.8 mmole) of 2,3-dicyanoquinoxaline was added, and then ammonia gas was slowly bubbled for about 1 hour at room temperature with sufficient stirring. Further, the solution was refluxed for about 3 hours with bubbling ammonia gas. The suspension was filtered. The obtained solid was washed with methanol sufficiently, and dried under reduced pressure to give 4.9 g of a compound of the formula (VIII) wherein A is

Figure 40:
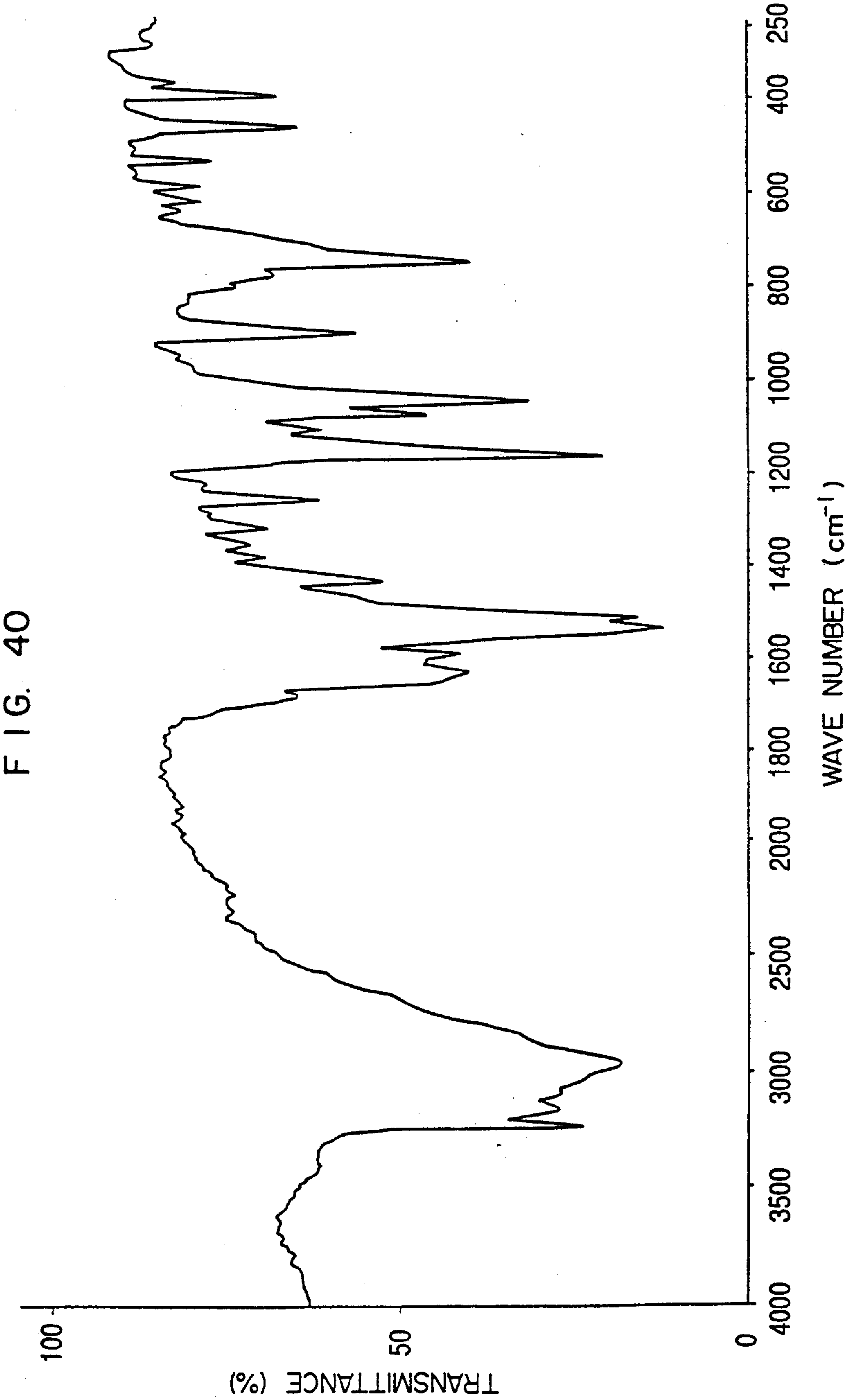

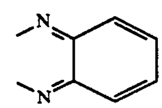

as a pale gray solid. IR spectrum of this compound is shown in FIG. 40. This compound was used in the next reaction without further purification.

To a suspension of 5 g (25.2 mmole) of the compound of the formula (VIII) wherein A is

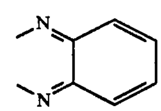

in 108 ml of quinoline, 10 ml (90 mmole) of silicon tetrachloride was added. The reaction mixture was refluxed for about 3 hours. After cooling, the resulting suspension was poured into 300 ml of methanol and allowed to stand. This reaction mixture was filtered, washed with methanol sufficiently and dried under reduced pressure to give a black solid quantitatively. It was found that the black solid was a compound of the formula (VII) wherein Z is Cl; M is Si; $A^1$, $A^2$, $A^3$ and $A^4$ are each

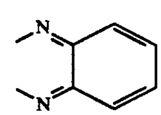

Figure 41:
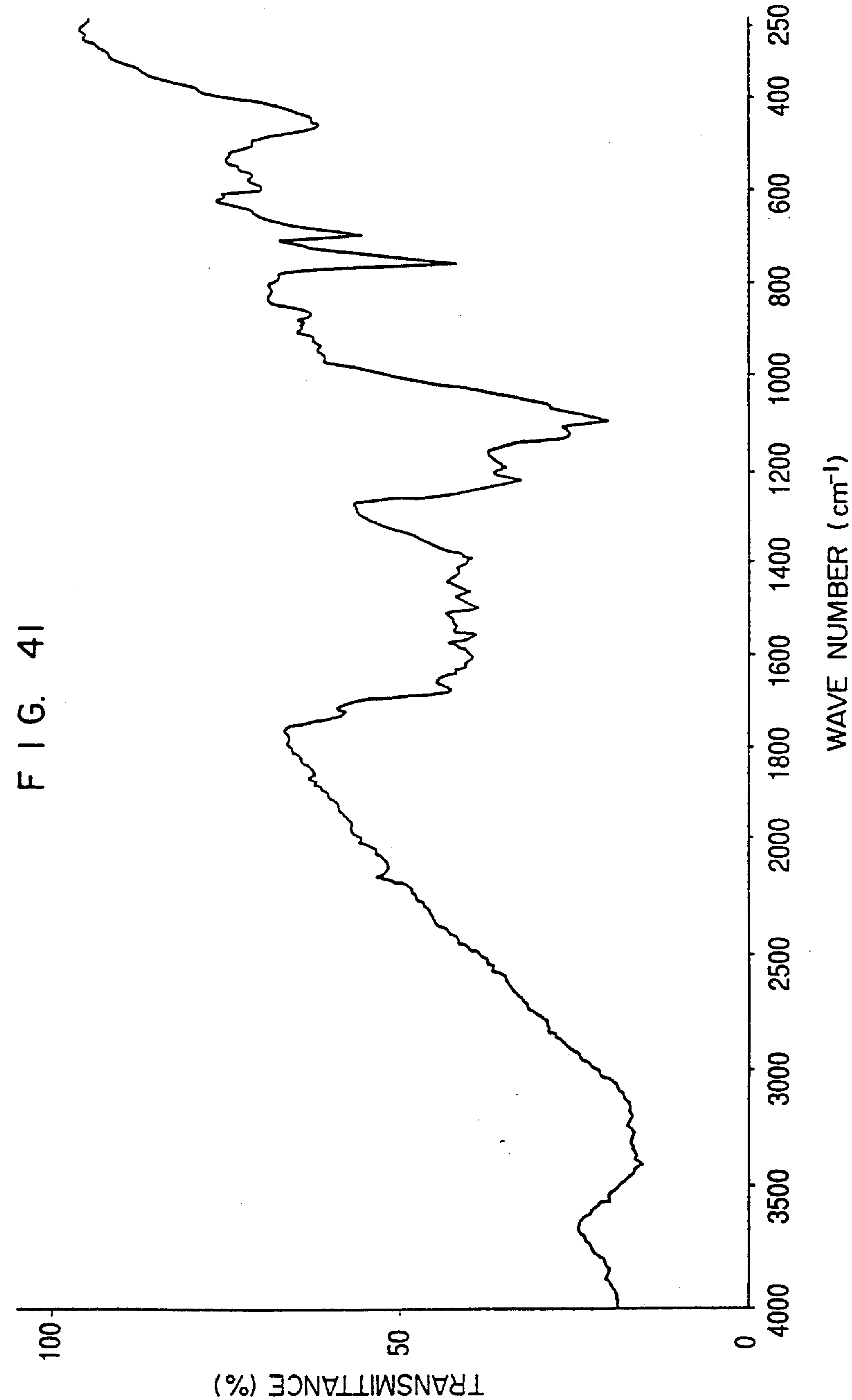

[hereinafter referred to as "$Cl_2SiQc$"]. $Cl_2SiQc$ was used in the next reaction without further purification. IR spectrum of $Cl_2SiQc$ is shown in FIG. 41.

To 123 ml of ethanol, 9.5 g (11.6 mmoles) of $Cl_2SiQc$ was added, followed by addition of 123 ml of ammonia water and 475 ml of water. The reaction mixture was refluxed for about 5 hours. After cooling, the reaction mixture was filtered, washed with water and methanol, and dried under reduced pressure to give 7.3 g of a black solid. It was found that the black solid was a compound of the formula (II) wherein M is Si; $A^1$, $A^2$, $A^3$ and $A^4$ are each

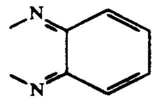

Figure 42:
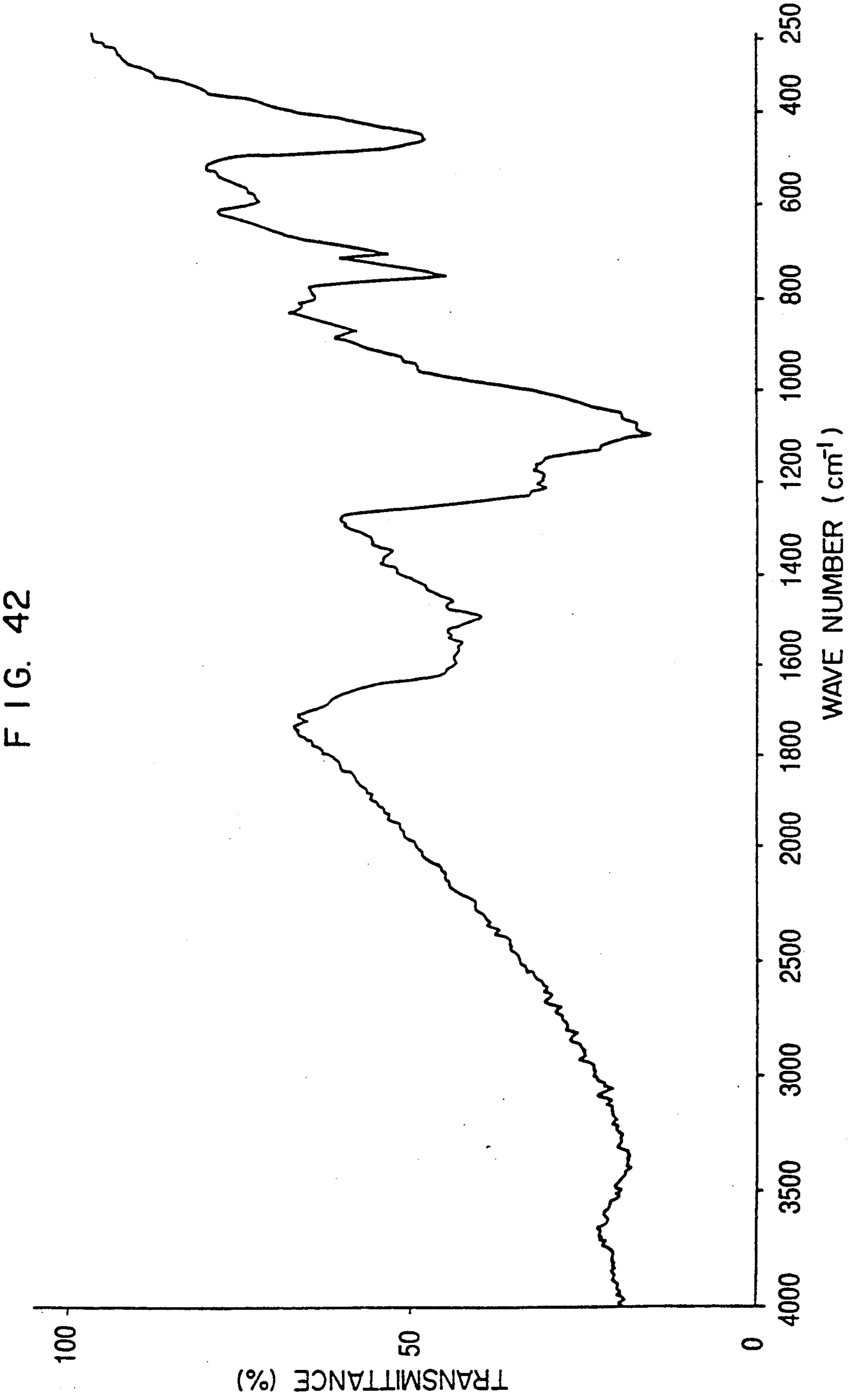

[hereinafter referred to as "$(HO)_2SiQc$"]. This compound was used in the next reaction without further purification. IR spectrum of $(HO)_2SiQc$ is shown in FIG. 42.

To a suspension of 1 g (1.3 mmoles) of $(HO)_2SiQc$ in 141 ml of β-picoline, 3.8 ml (16.1 mmoles) of tributylamine and then 2.7 ml (16.1 mmoles) of triethylchlorosilane were added under a nitrogen atmosphere. The reaction mixture was refluxed for about 2 hours. After cooling, the reaction mixture was poured into 600 ml of ethanol/water (1/1 (V/V)), stirred and allowed to stand. Precipitated solid was filtered, and washed with water, methanol and hexane. Soluble materials in the solid were dissolved i tetrahydrofuran and purified by column chromatography over alumina. After recrystallizing from a mixed solvent of chloroform/methanol, 22 mg of dark green crystals were obtained. From the following analytical results, the resulting product was confirmed to be Compound No. (1312) listed in Table 1.

(1) Melting point: >300° C.

| (2) Elementary analysis: | C | H | N |
|---|---|---|---|
| Calculated (%) | 61.75 | 4.58 | 22.17 |
| Found (%) | 61.81 | 4.63 | 22.13 |

Figure 43:
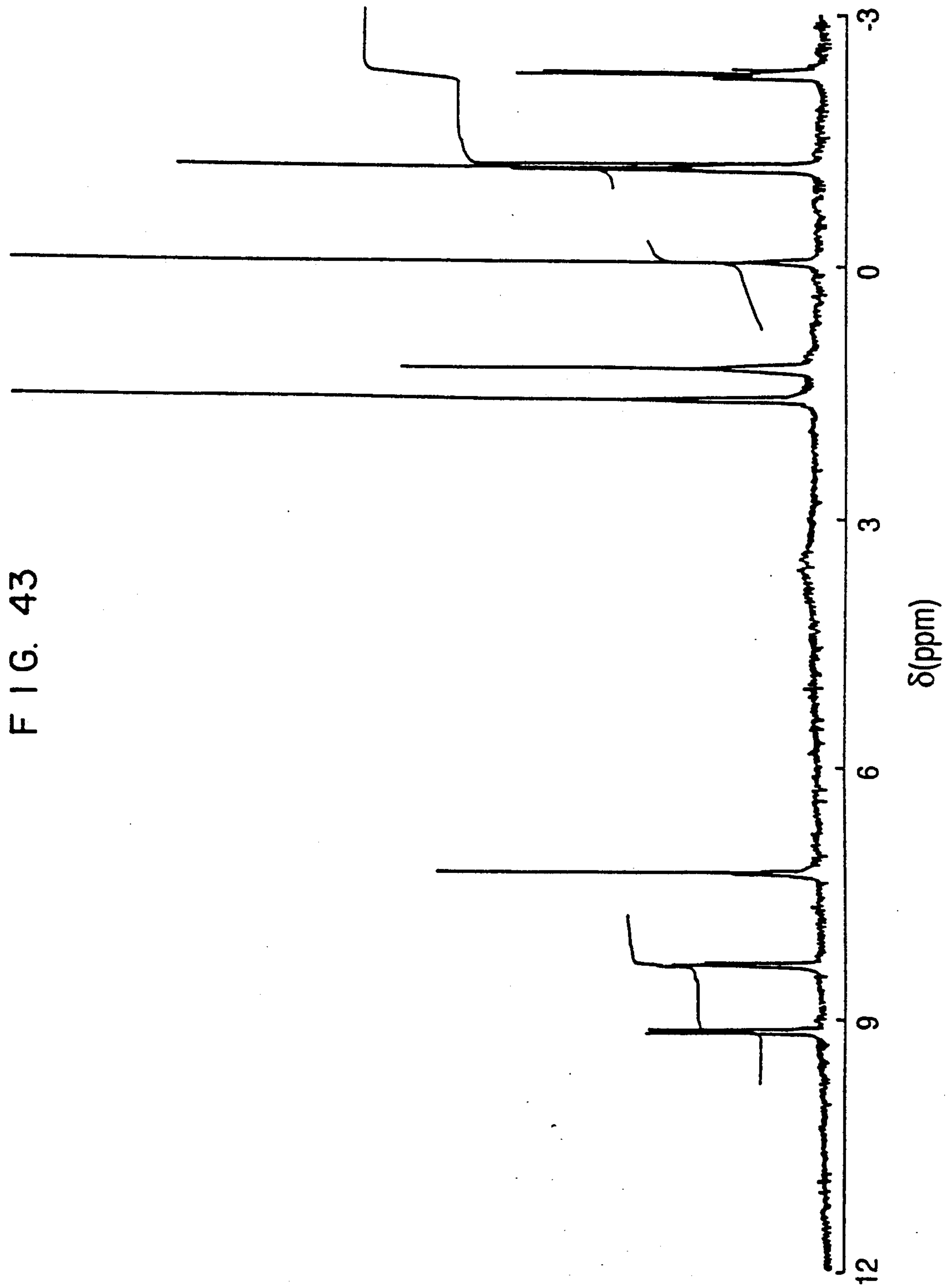

(3) NMR spectrum: $CDCl_3$ Shown in FIG. 43.

δ values: 9.15 (8H, dd, J=6.56, 3.51 Hz), 8.35 (8H, dd, J'6.56, 3.51 Hz), −1.13 (18H, t, J=7.94 Hz), −2.26 (12H, q, J=7.94 Hz).

Figure 44:
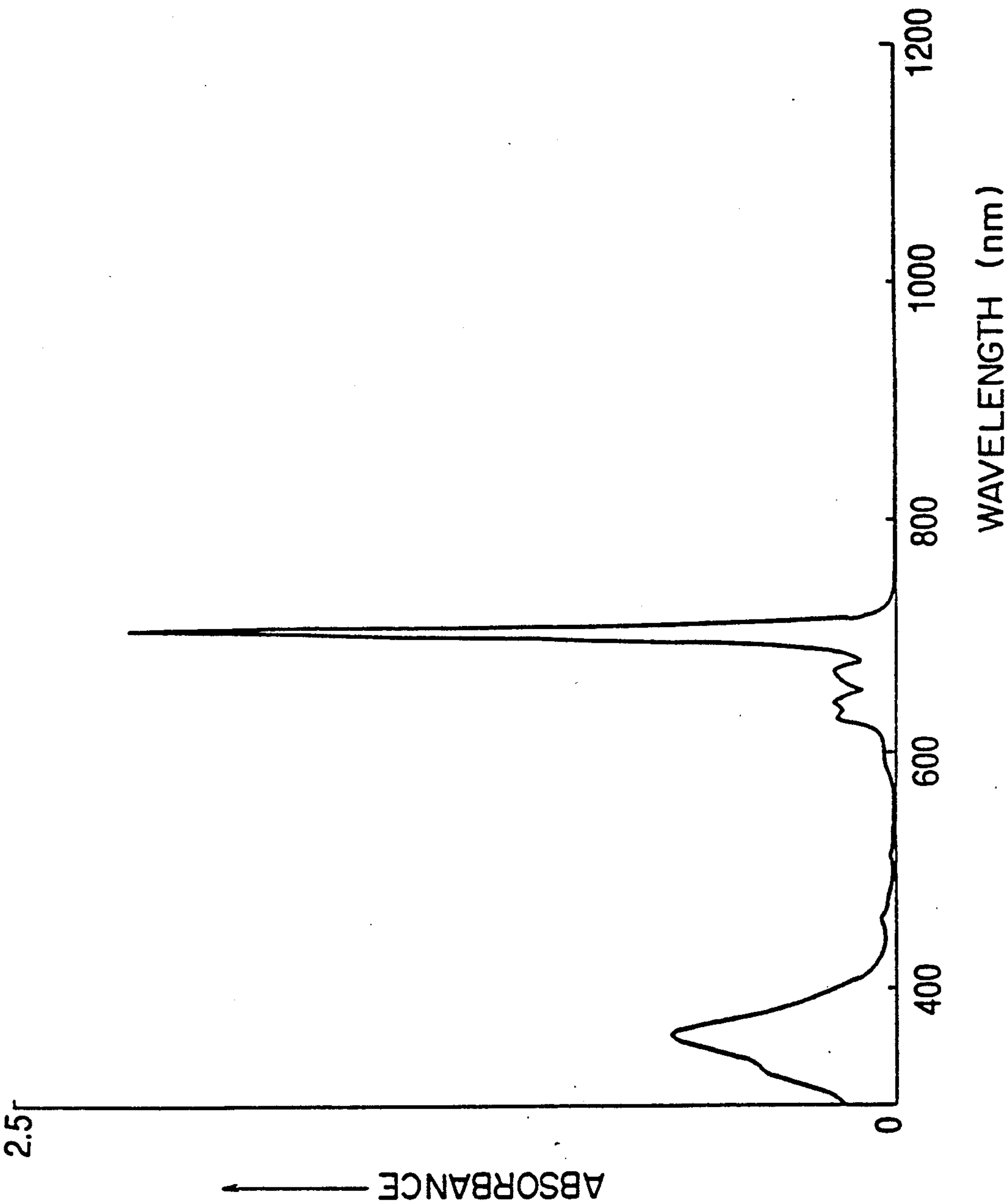

(4) Electronic spectrum ($CHCl_3$ solution): Shown in FIG. 44.

Figure 45:
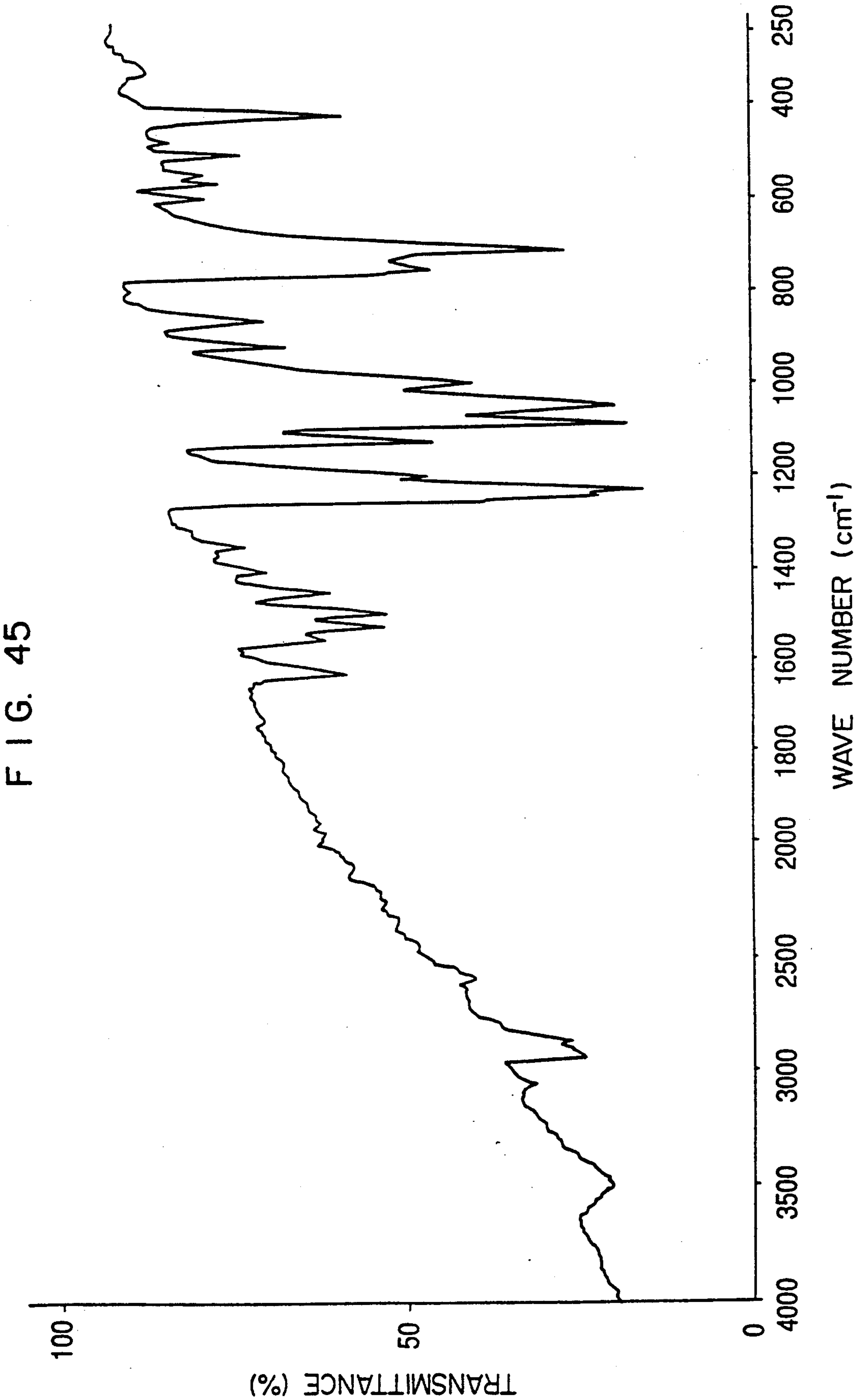

(5) IR spectrum (KBr method): Shown in FIG. 45.

EXAMPLE 7

Synthesis of Compound No. (1311)

To a suspension of 1 g (1.3 mmoles) of $(HO)_2SiQc$ synthesized in the same manner as described in Example 6 in 141 ml of β-picoline, 3.8 ml (16.1 mmoles) of tributylamine and then 3.5 ml (16.1 mmoles) of tripropylchlorosilane were added under a nitrogen atmosphere. The reaction mixture was refluxed for about 2 hours. After cooling, the reaction mixture was treated in the same manner as described in Example 6. After recrystallizing from a mixed solvent of chloroform/methanol, 47 mg of dark green crystals were obtained. From the following analytical results, the dark green crystals were confirmed to be Compound No. (1311) listed in Table 1.

(1) Melting point: >300° C.

| (2) Elementary analysis: | C | H | N |
|---|---|---|---|
| Calculated (%) | 63.59 | 5.34 | 20.46 |
| Found (%) | 63.65 | 5.28 | 20.35 |

Figure 46:
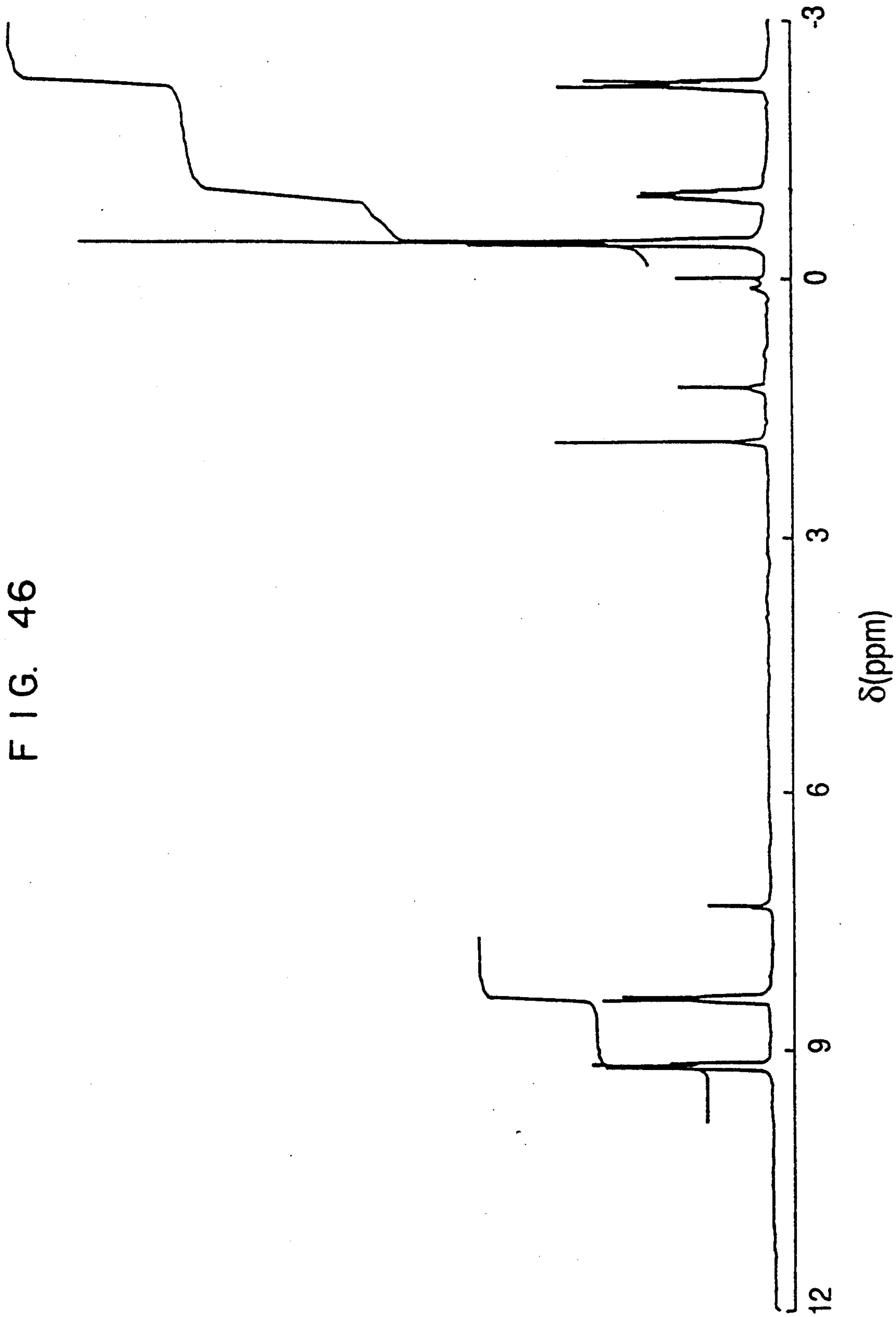

(3) NMR spectrum: $CDCl_3$ Shown in FIG. 46.

δ values: 9.16 (8H, dd, J=6.56, 3.51 Hz), 8.35 (8H, dd, J=6.56, 3.5 Hz), −0.40 (18H, t, J=7.33 Hz), −0.95 (12H, sextet-lime m), −2.24 (12H, t-lime m).

Figure 47:
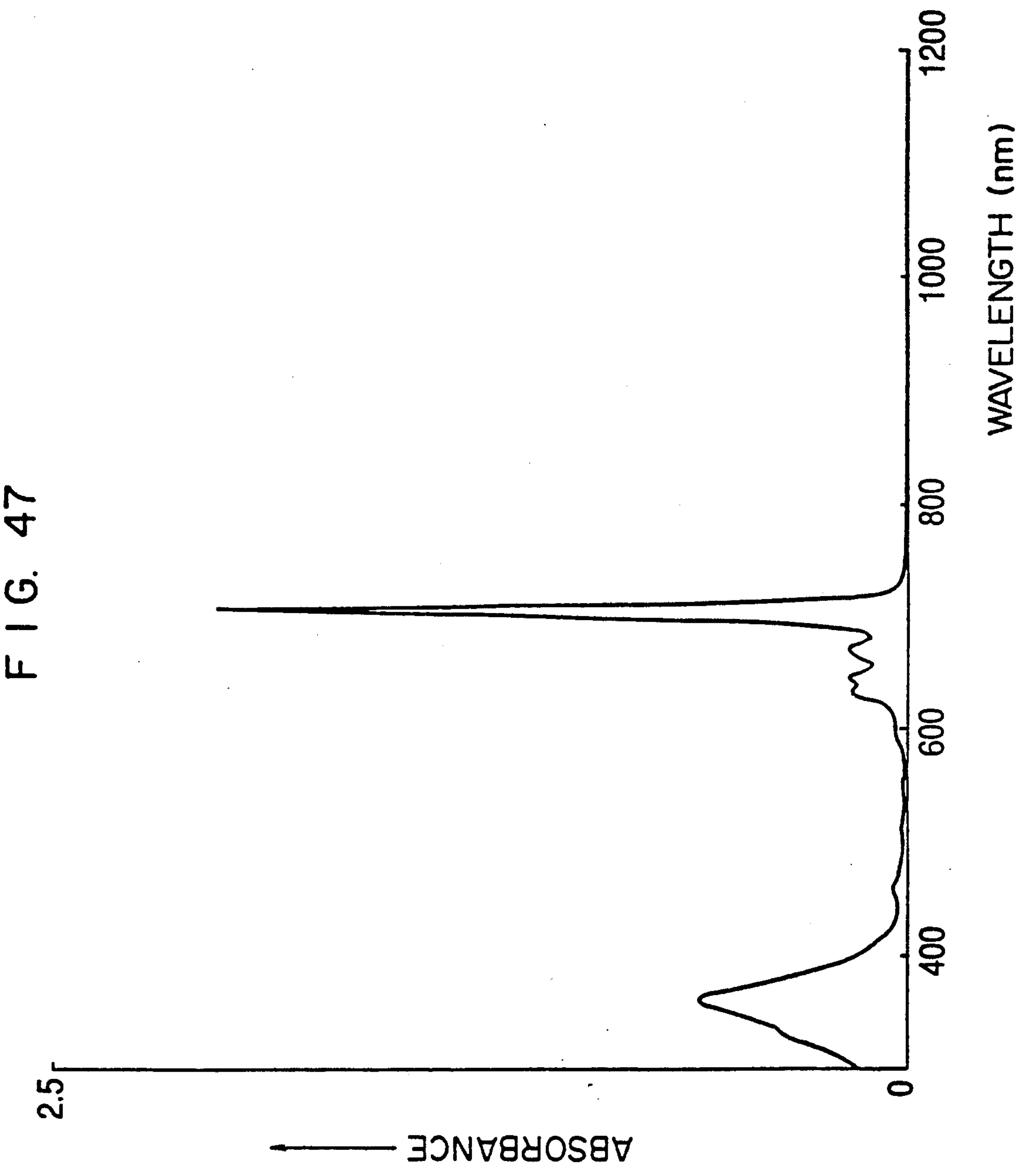

(4) Electronic spectrum ($CHCl_3$ solution): Shown in FIG. 47.

Figure 48:
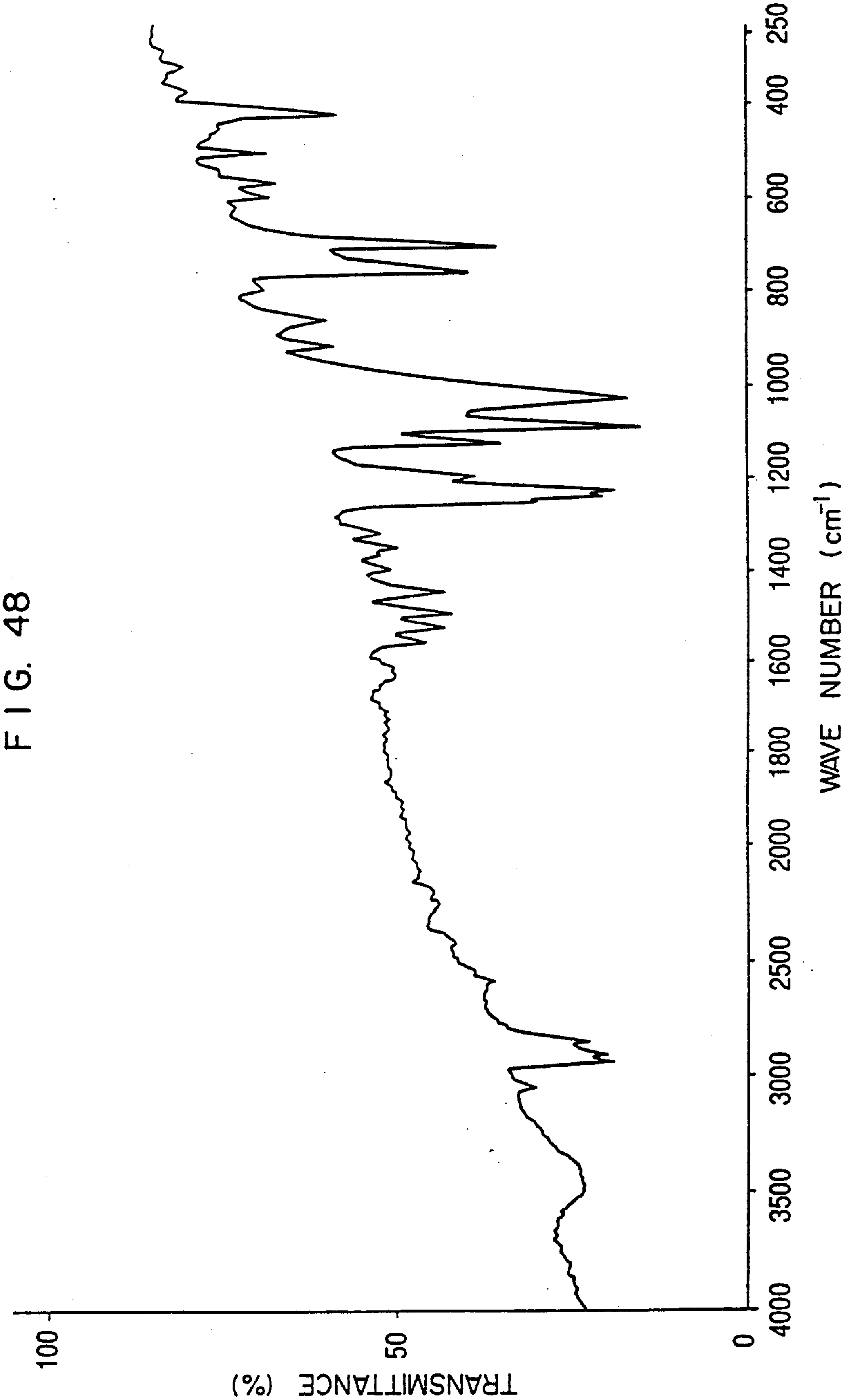

(5) IR spectrum (KBr method): Shown in FIG. 48.

EXAMPLE 8

Synthesis of Compound No. (1310)

To a suspension of 1 g (1.3 mmoles) of $(HO)_2SiQc$ synthesized in the same manner as described in Example 6, in 141 ml of β-picoline, 3.8 ml (16.1 mmoles) of tributylamine and then 4.3 ml (16.1 mmoles) of tributylchlorosilane were added under a nitrogen atmosphere. The reaction mixture was refluxed for about 2 hours. After cooling, the reaction mixture was treated in the same manner as described in Example 6. After recrystallizing from a mixed solvent of chloroform/methanol, 48 mg of dark green crystals were obtained. From the following analytical results, the dark green crystals were confirmed to be Compound No. (1310) listed in Table 1.

(1) Melting point: >300° C.

| (2) Elementary analysis: | C | H | N |
|---|---|---|---|
| Calculated (%) | 65.16 | 5.98 | 19.00 |
| Found (%) | 65.13 | 5.88 | 19.07 |

Figure 49:
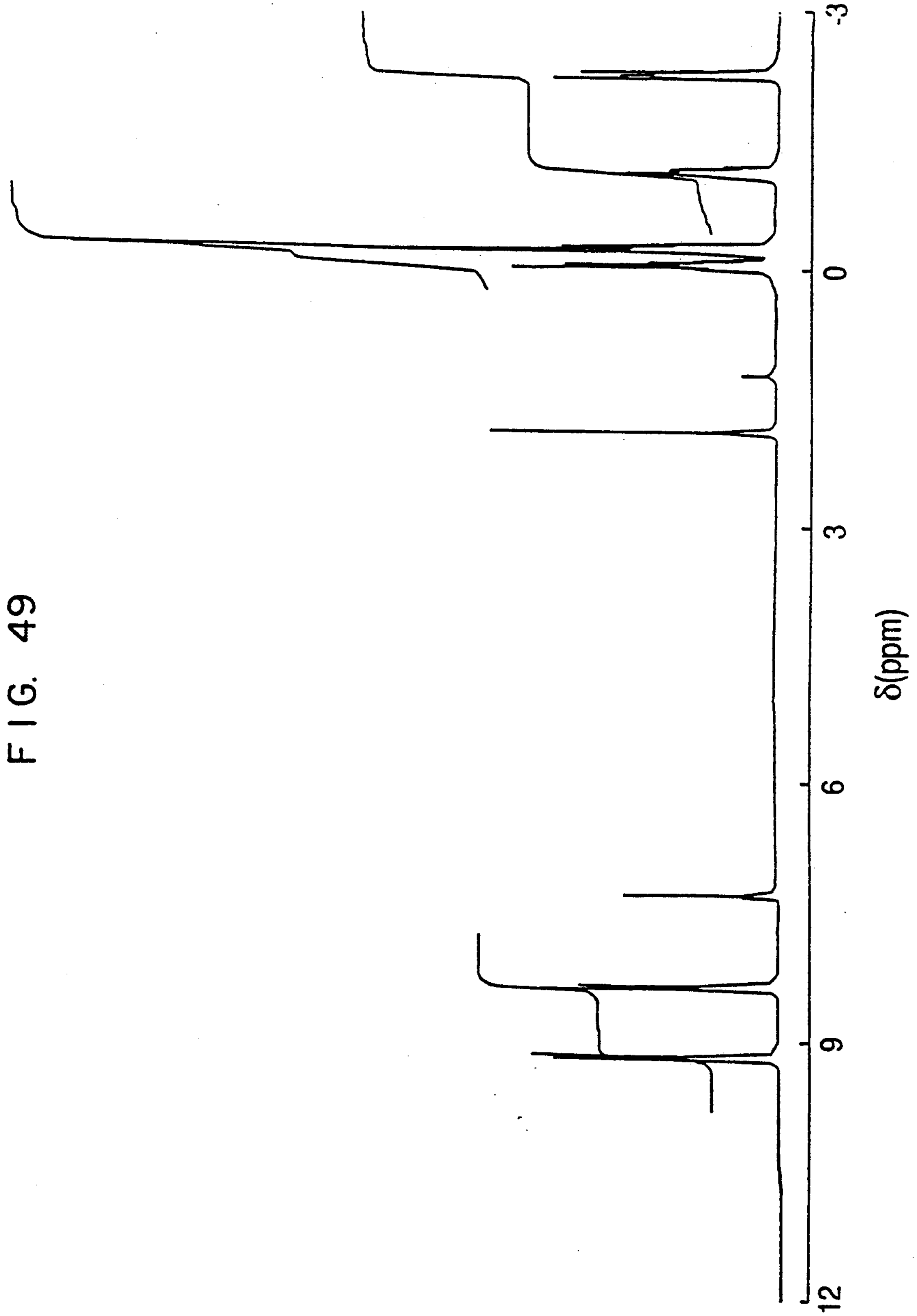

(3) NMR spectrum: $CDCl_3$ Shown in FIG. 49.

δ values: 9.16 (8H, dd, J=6.56, 3.51 Hz), 8.34 (8H, dd, J=6.56, 3.51 Hz), −0.03 (12H, quintet-like m), −0.21 (18H, t, J=7.17 Hz), −1.07 (12H, quintet-lime m), −2.23 (12H, t-like m).

Figure 50:
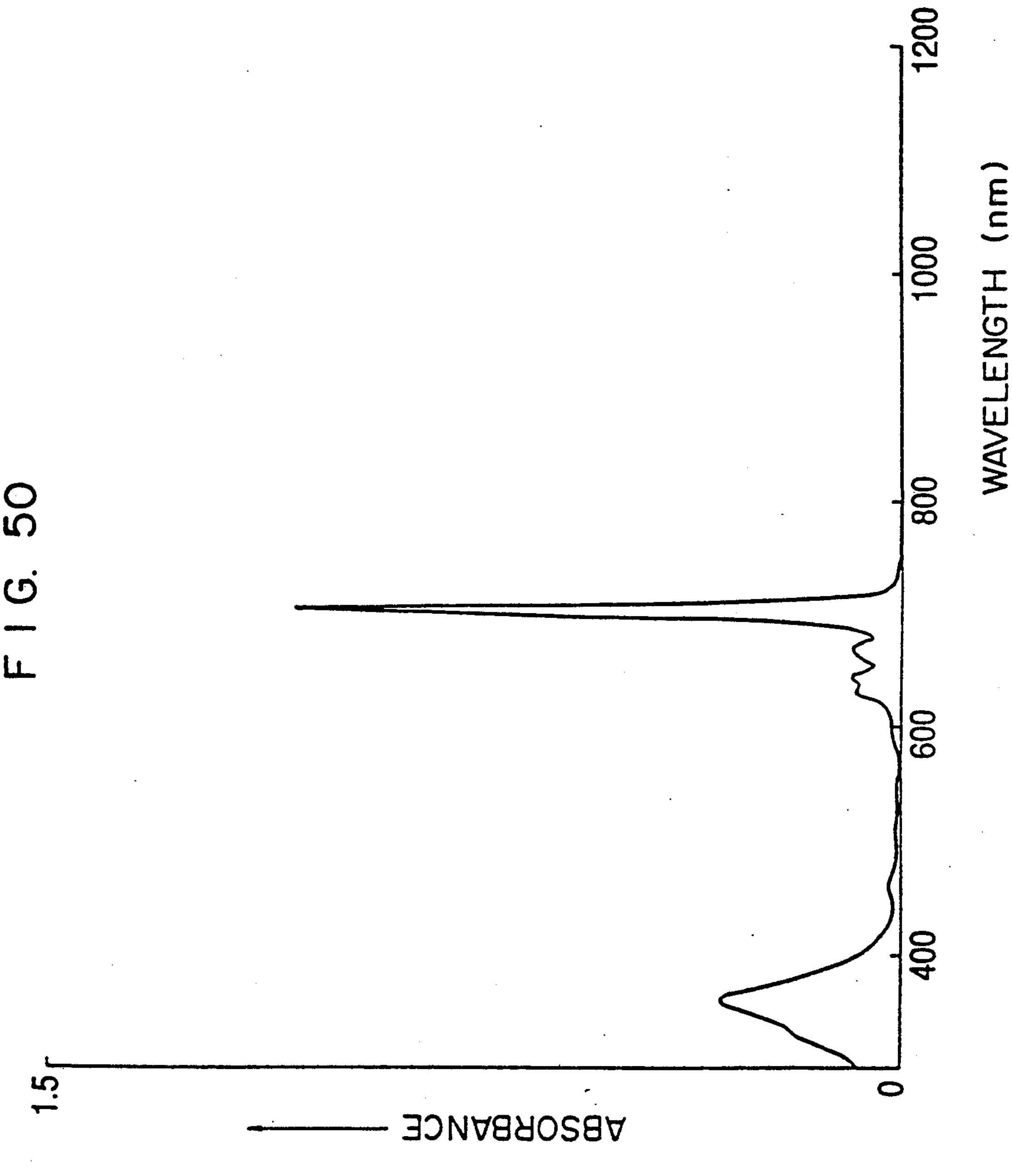

(4) Electronic spectrum ($CHCl_3$ solution): Shown in FIG. 50.

Figure 51:
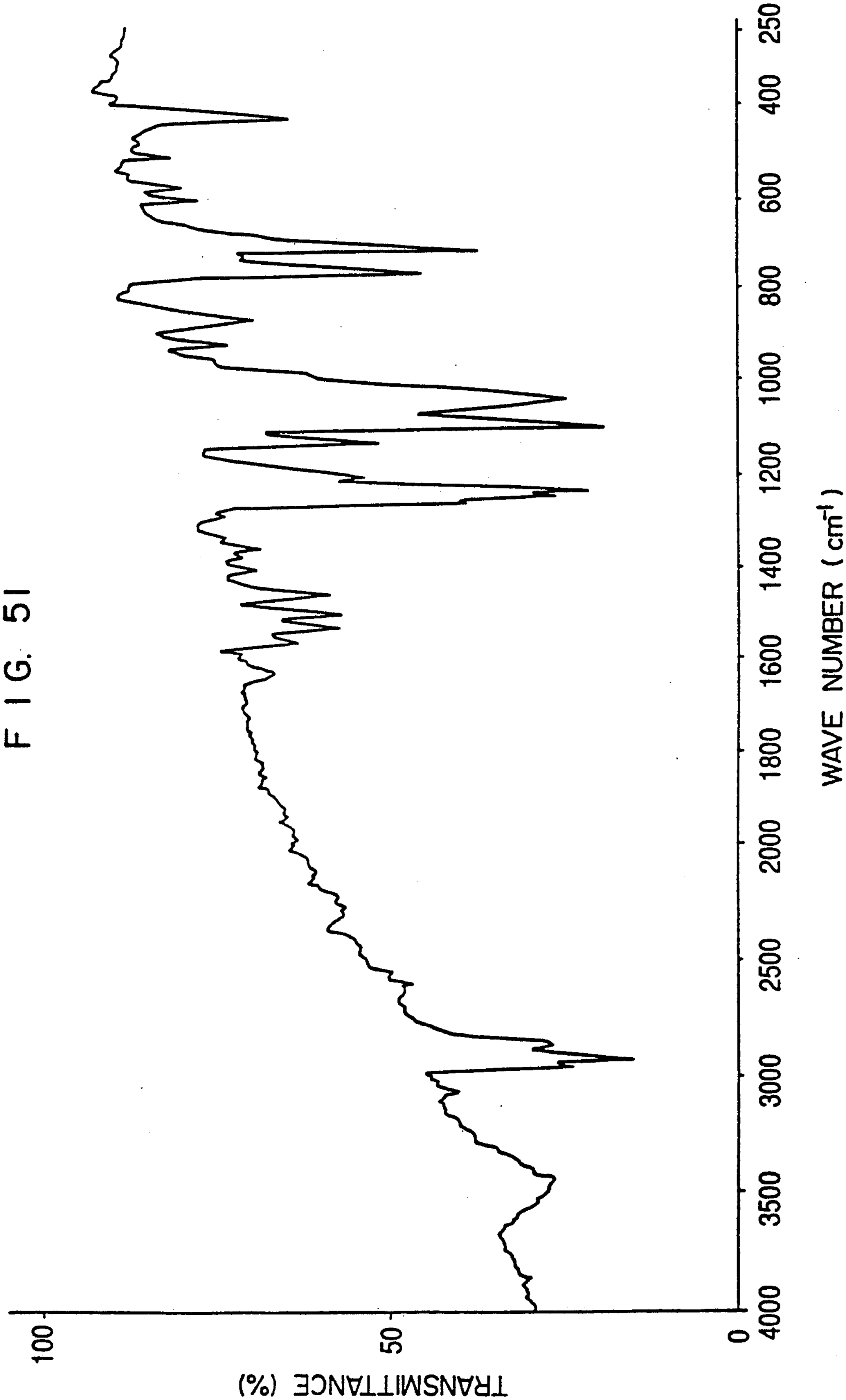

(5) IR spectrum (KBr method): Shown in FIG. 51.

EXAMPLE 9

Synthesis of Compound No. (1309)

To a suspension of 1 g (1.3 mmoles) of $(HO)_2SiQc$ synthesized in the same manner as described in Example 6 in 141 ml of β-picoline, 3.8 ml (16.1 mmoles) of tributylamine and then 5.9 ml (16.1 mmoles) of trihexylchlorosilane were added. The reaction mixture was refluxed for about 2 hours. After cooling, the reaction mixture was treated in the same manner as described in Example 6. After recrystallizing from a mixed solvent of chloroform/methanol, 10 mg of dark green crystals were obtained. From the following analytical results, the dark green crystals were confirmed to be Compound No. (1309) listed in Table 1.

(1) Melting point: >300° C.

| (2) Elementary analysis: | C | H | N |
|---|---|---|---|
| Calculated (%) | 67.72 | 7.03 | 16.63 |
| Found (%) | 67.79 | 6.95 | 16.59 |

Figure 52:
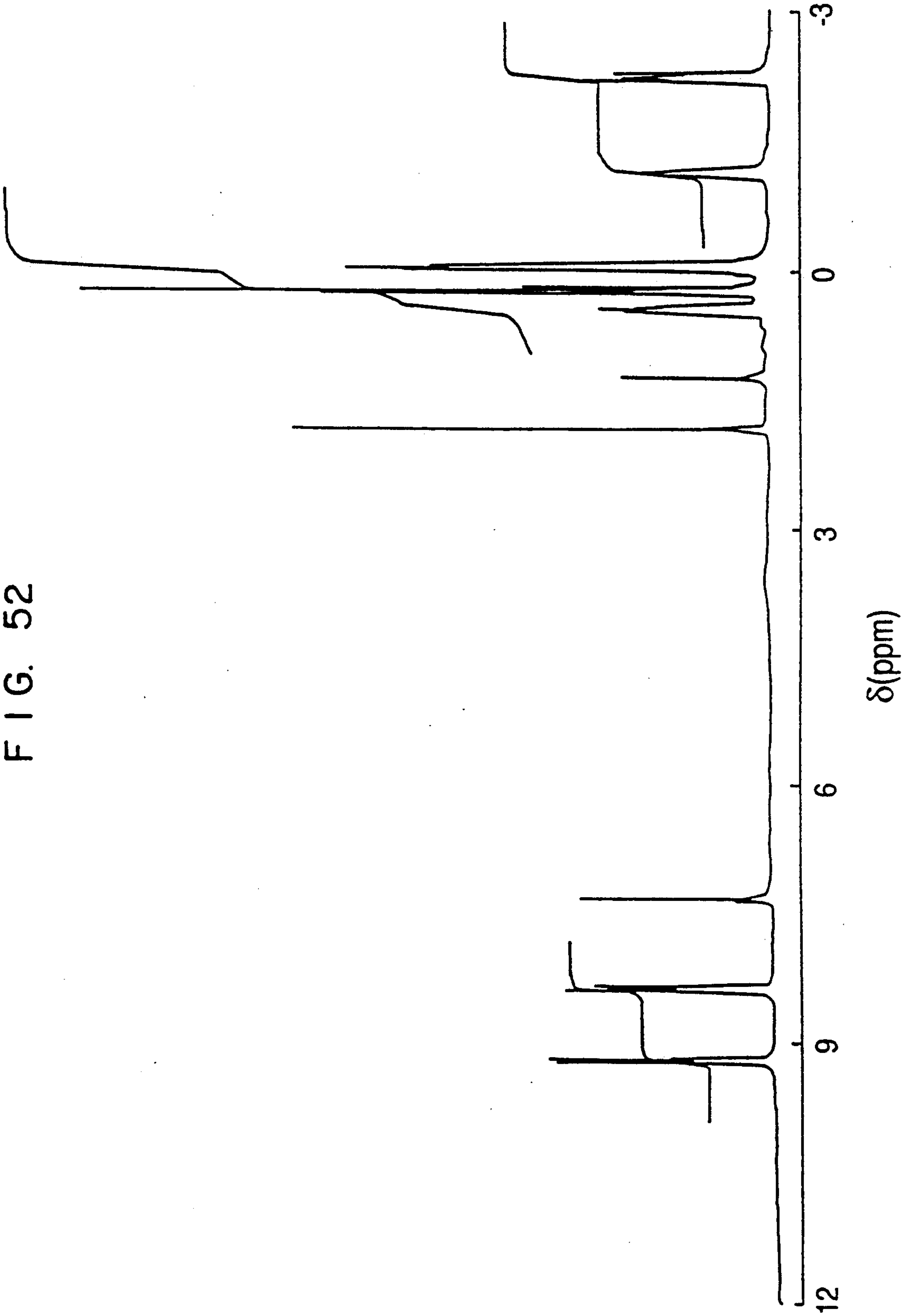

(3) NMR spectrum: $CDCl_3$ Shown in FIG. 52.

δ values: 9.17 (8H, dd, J=6.71, 3.36 Hz), 8.34 (8H, dd, J=6.71, 3.36 Hz), 0.46 (12H, quintet-lime m), 0.25 (18H, t, J=7.18 Hz), −0.02 (24H, t-like m), −1.03-−1.17 (12H, m), −2.23 (12H, t-like m).

Figure 53:
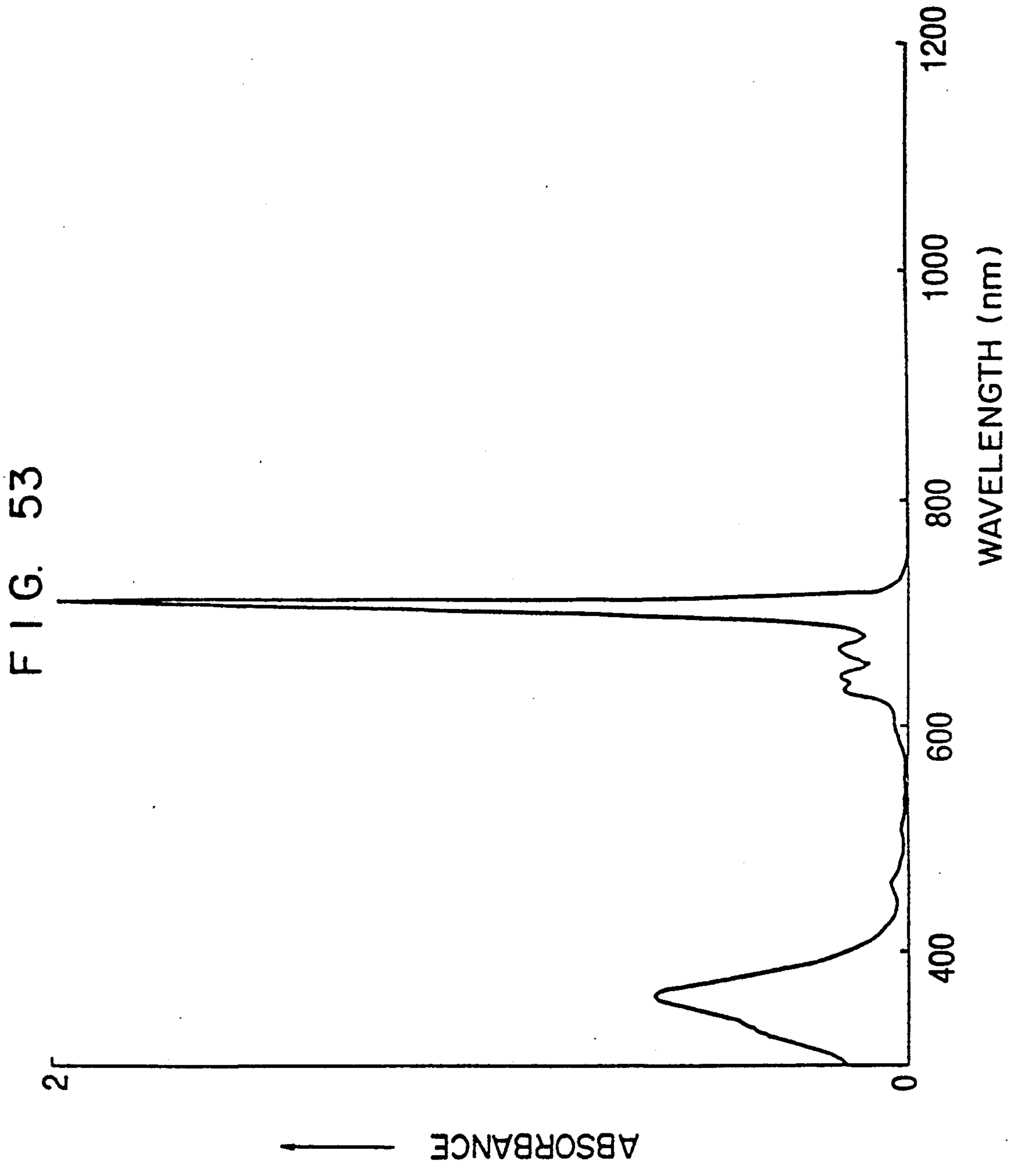

(4) Electronic spectrum ($CHCl_3$ solution): Shown in FIG. 53.

Figure 54:
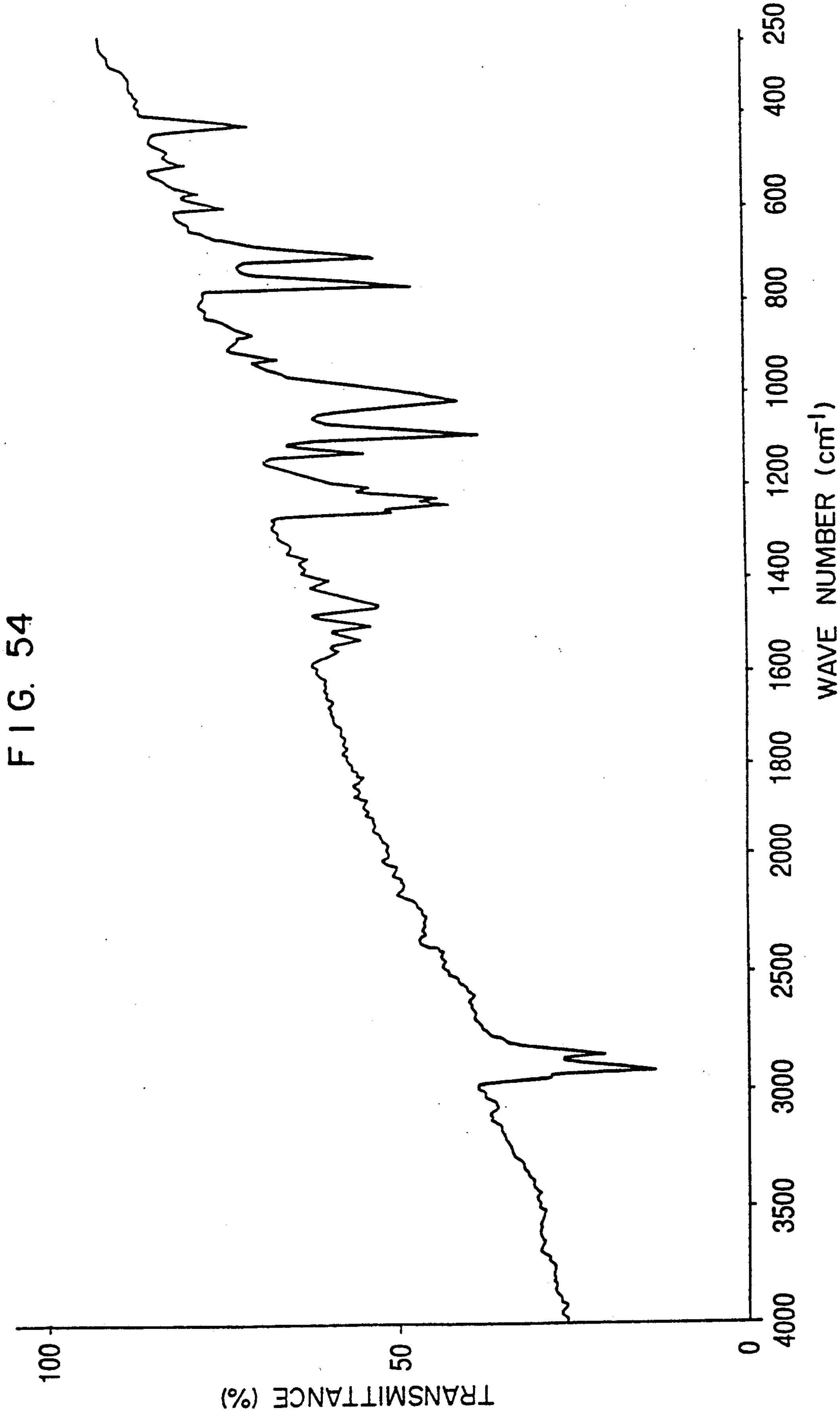

(5) IR spectrum (KBr method): Shown in FIG. 54.

EXAMPLE 10

Synthesis of Compound No. (1462)

Figure 55:
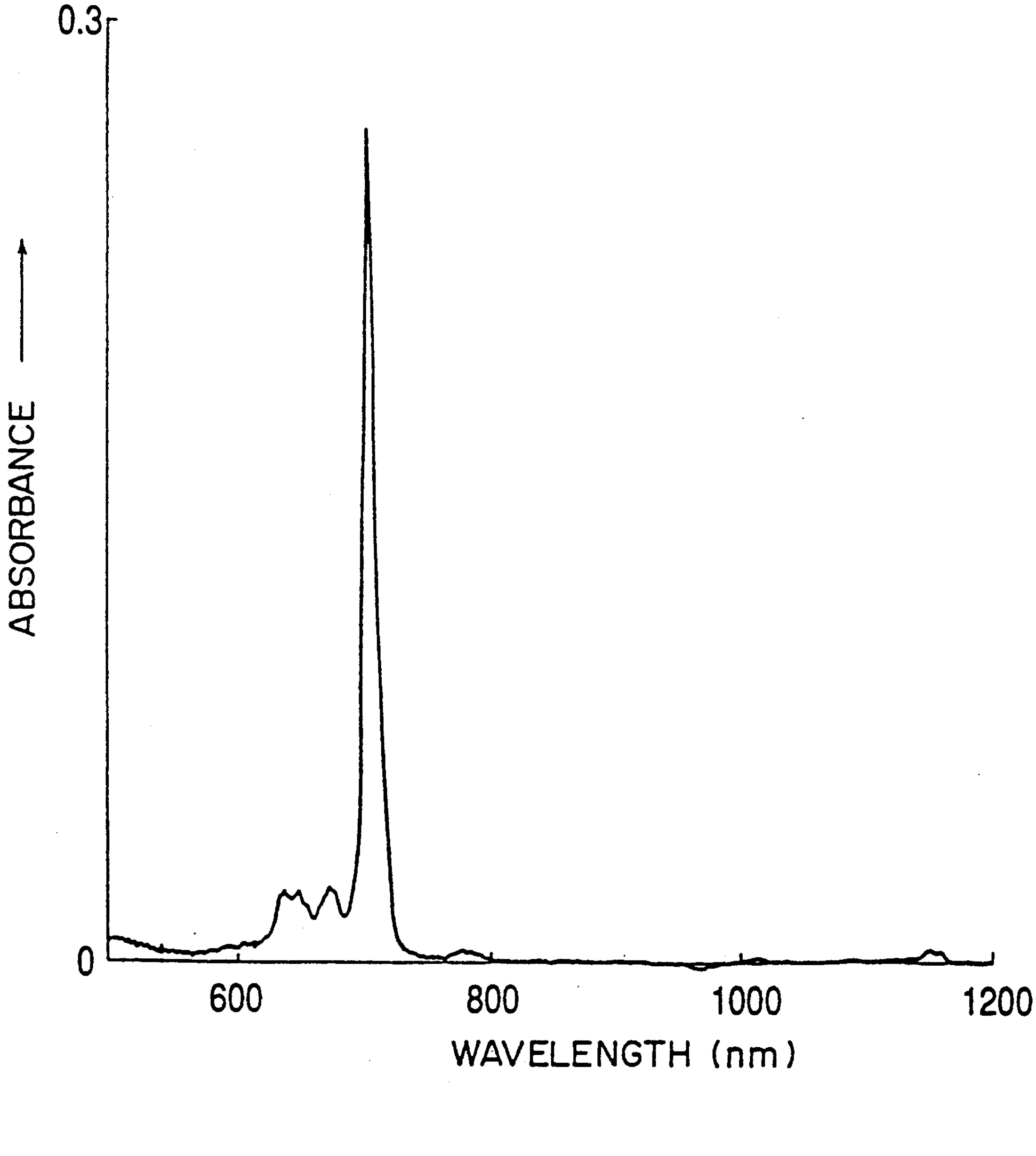
Figure 56:
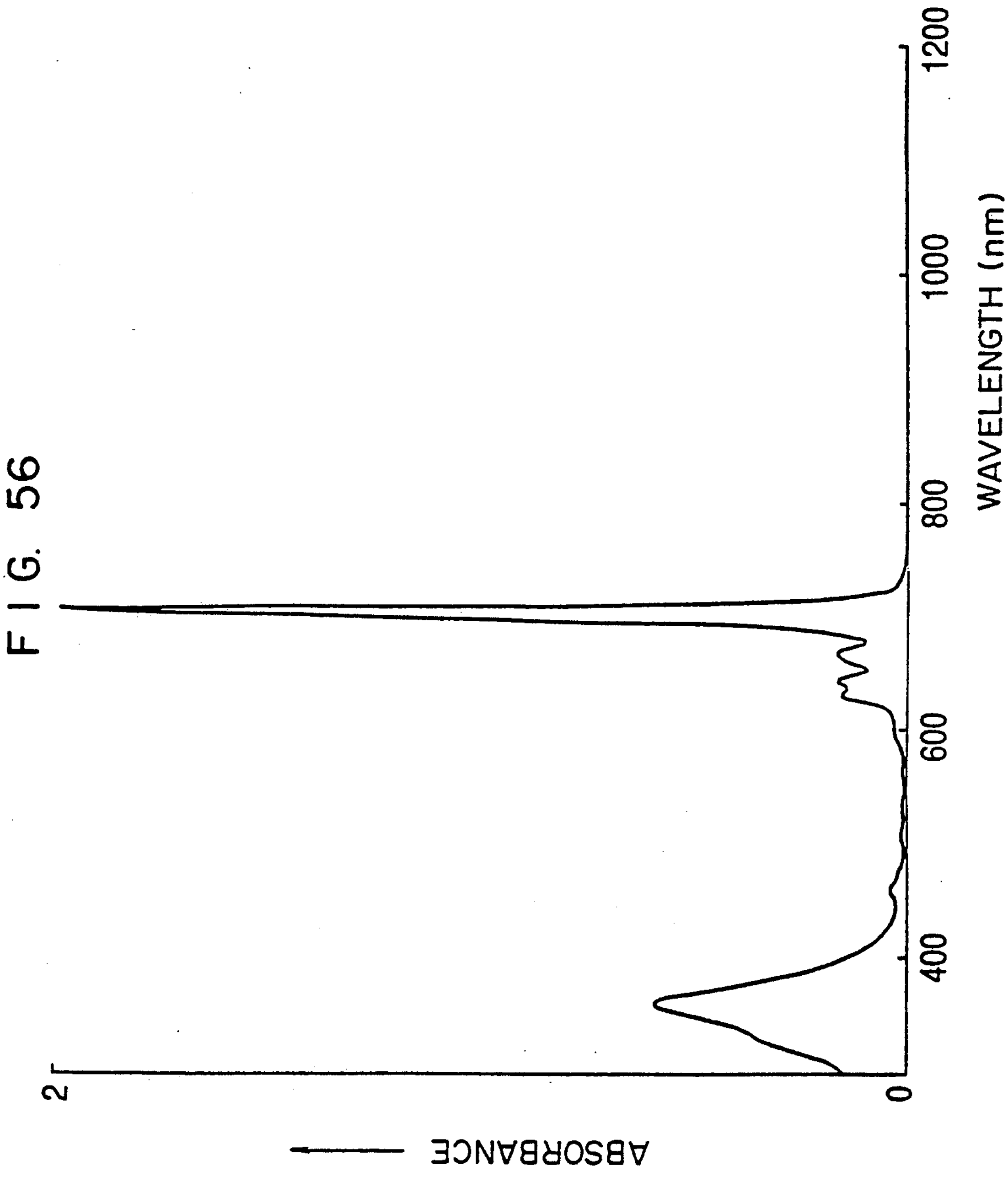
Figure 57:
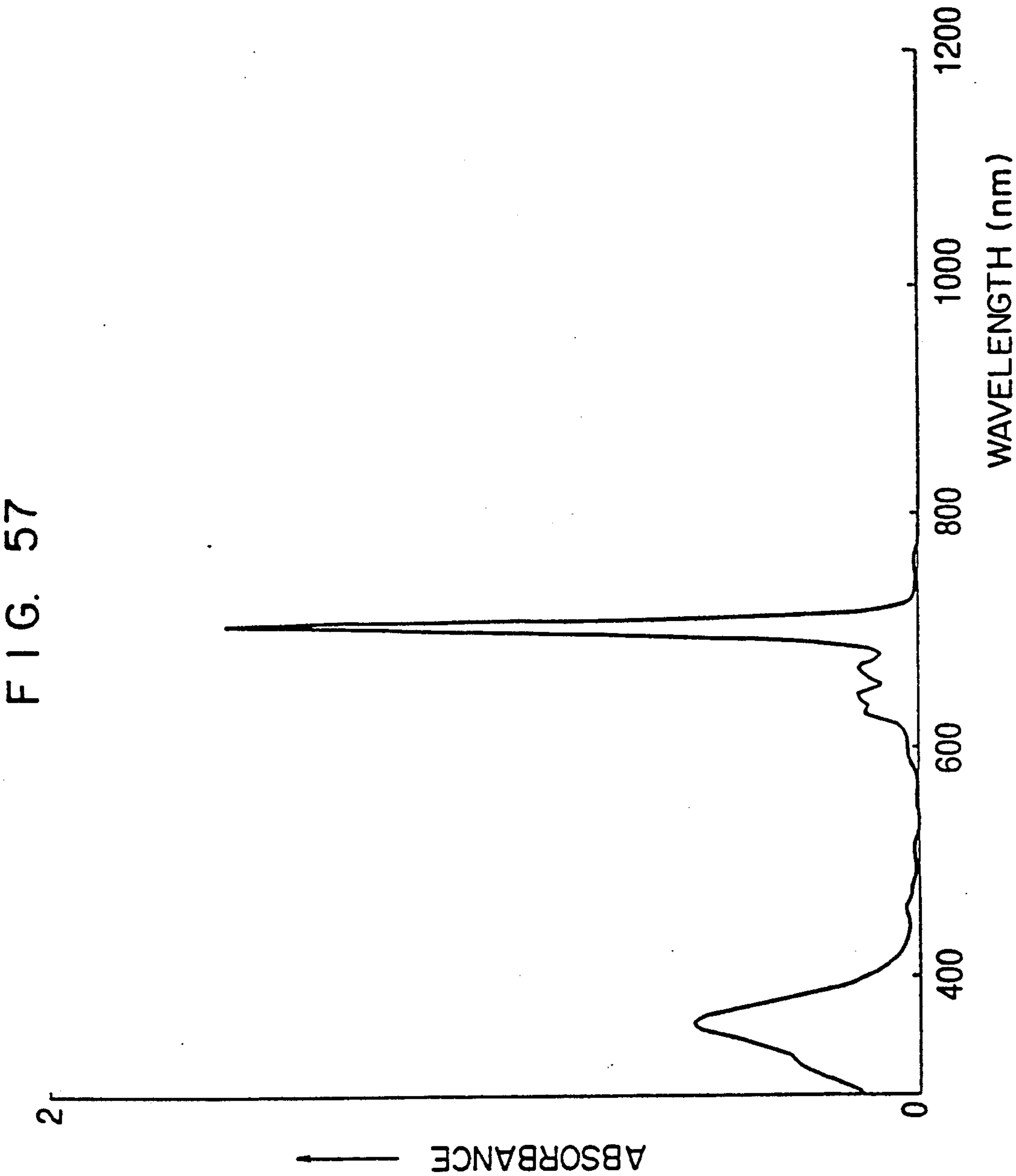
Figure 58:
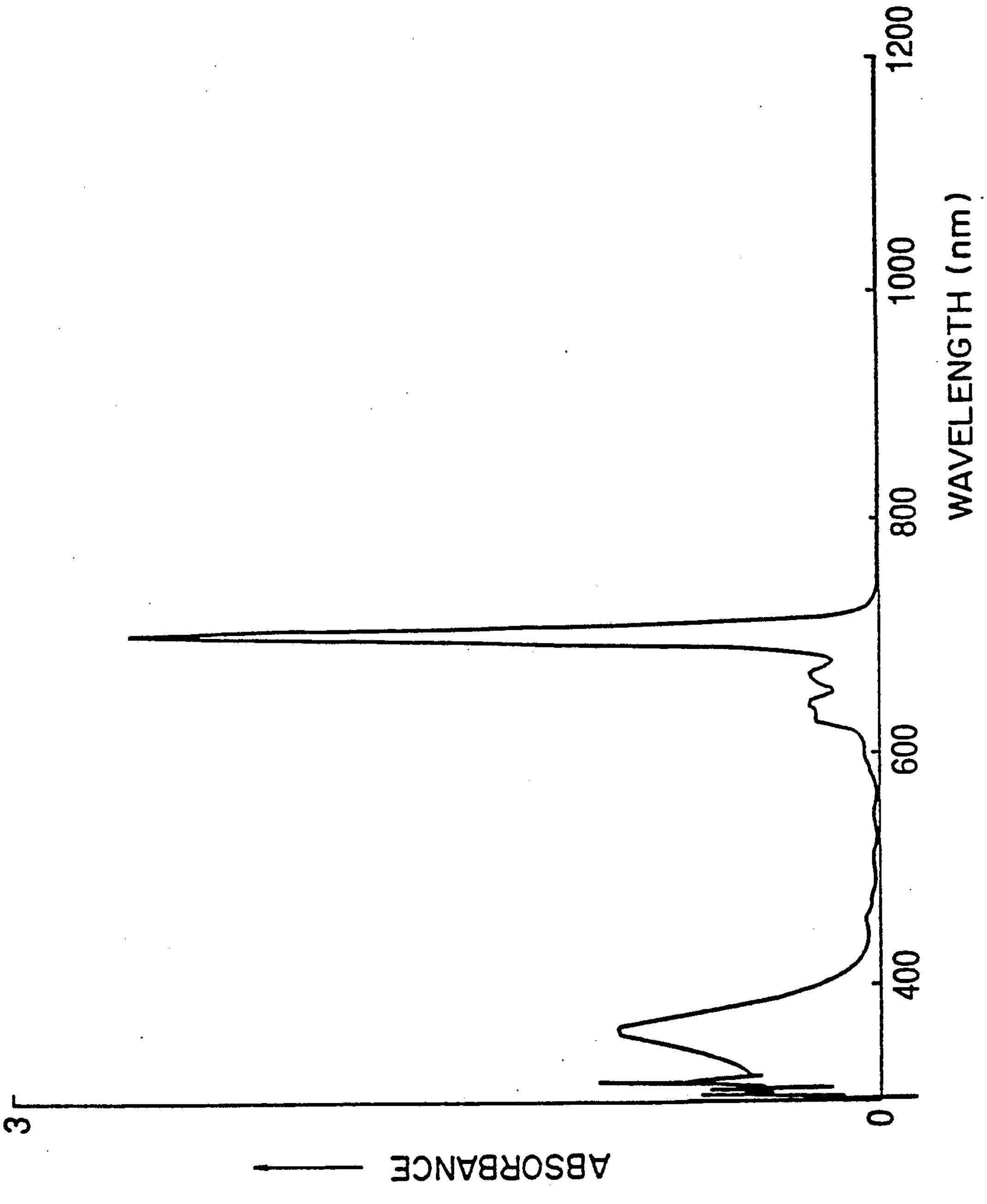
Figure 59:
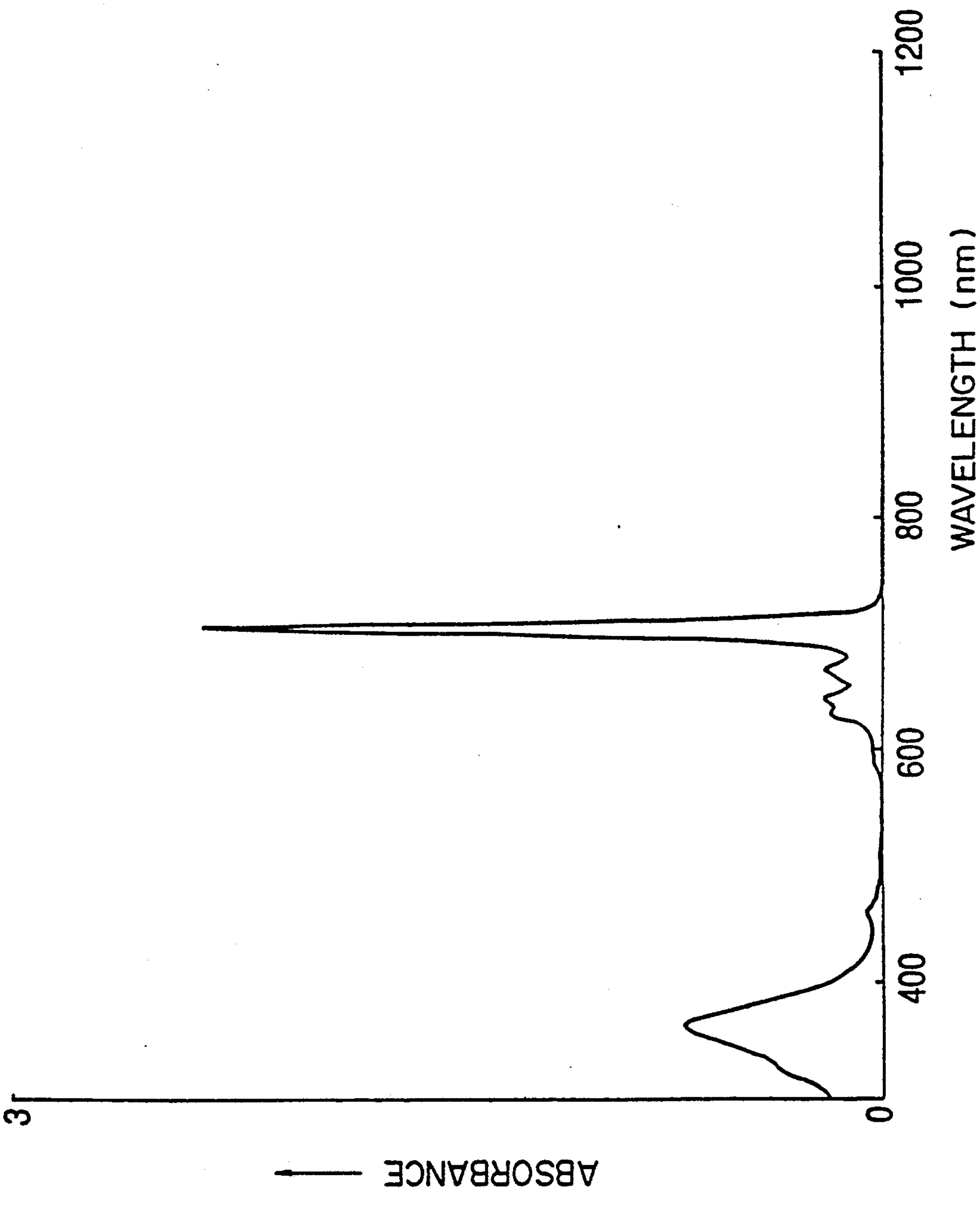
Figure 60:
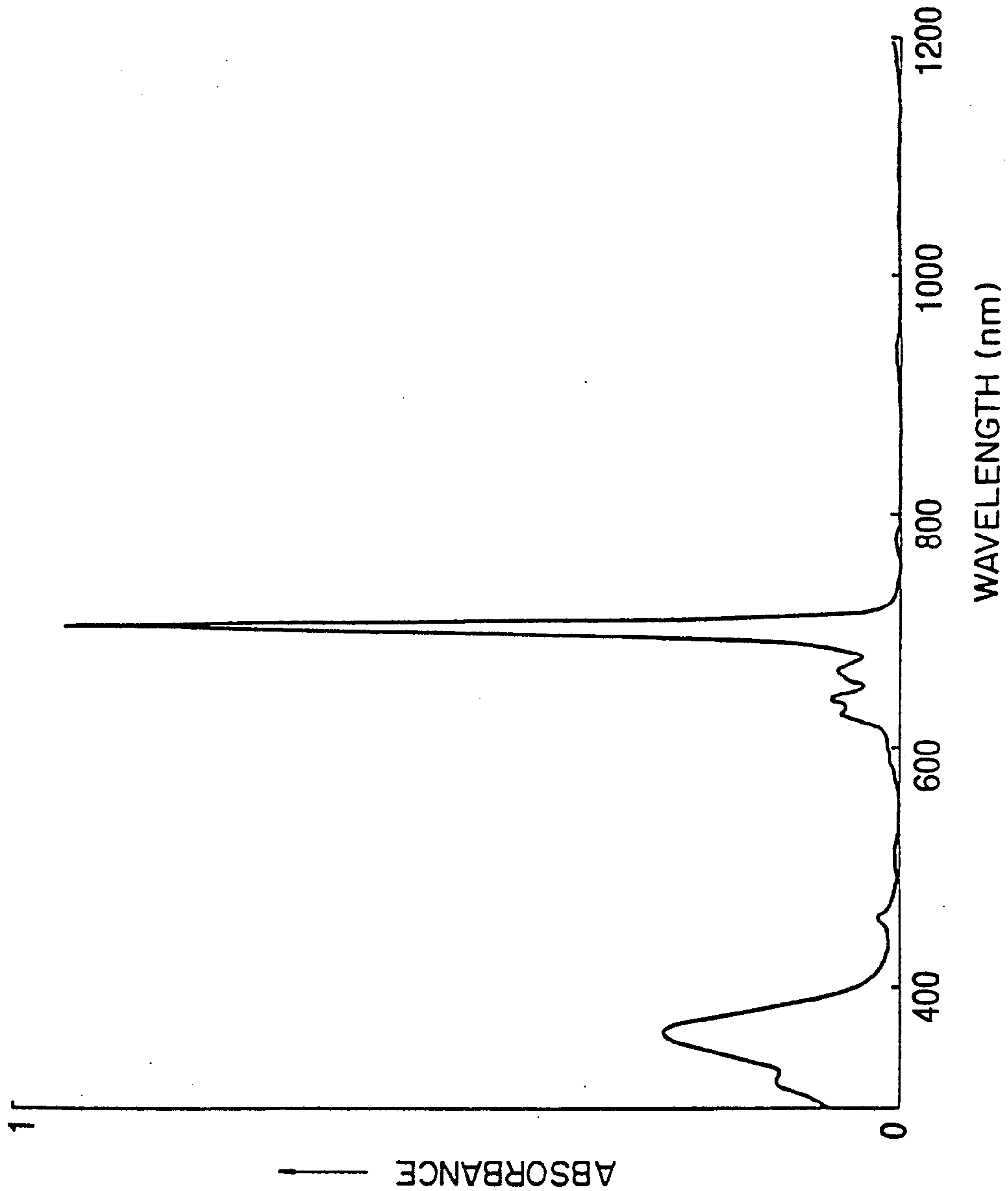
Figure 61:
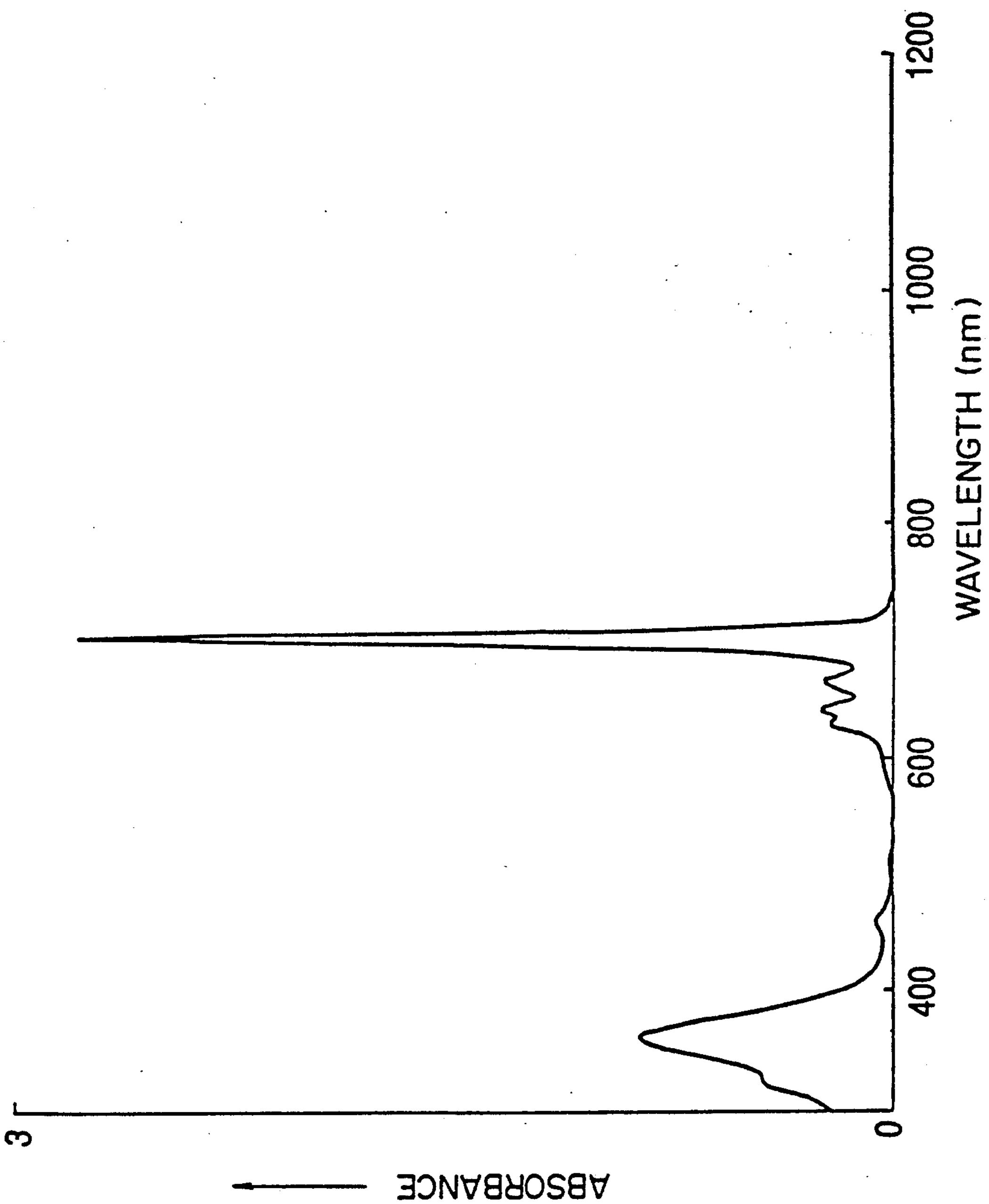

To a suspension of 1 g (1.3 mmoles) of $(HO)_2SiQc$ synthesized in the same manner as described in Example 6 in 40 ml of quinoline, 0.76 g (2.6 mmoles) of tricyclohexylsilanol was added. The resulting mixture was refluxed for about 7 hours. After cooling, the reaction mixture was treated in the same manner as described in Example 6 to give Compound No. (1462) as dark green crystals. Electronic spectrum ($CHCl_3$) of Compound No. (1462) is shown in FIG. 55.

EXPERIMENT 6

Compound No. (1309) was dissolved in various solvents and subjected to measurement of electronic spectra. FIGS. 56, 57, 58, 59, 60 and 61 show electronic spectra in chloroform, tetrahydrofuran, acetone, toluene, cyclohexane and carbon tetrachloride, respectively. As is clear from FIGS. 56 to 61, no change in absorption curves depending on the kinds of solvents and the concentrations of the solutions was observed.

EXPERIMENT 7

Figure 62:
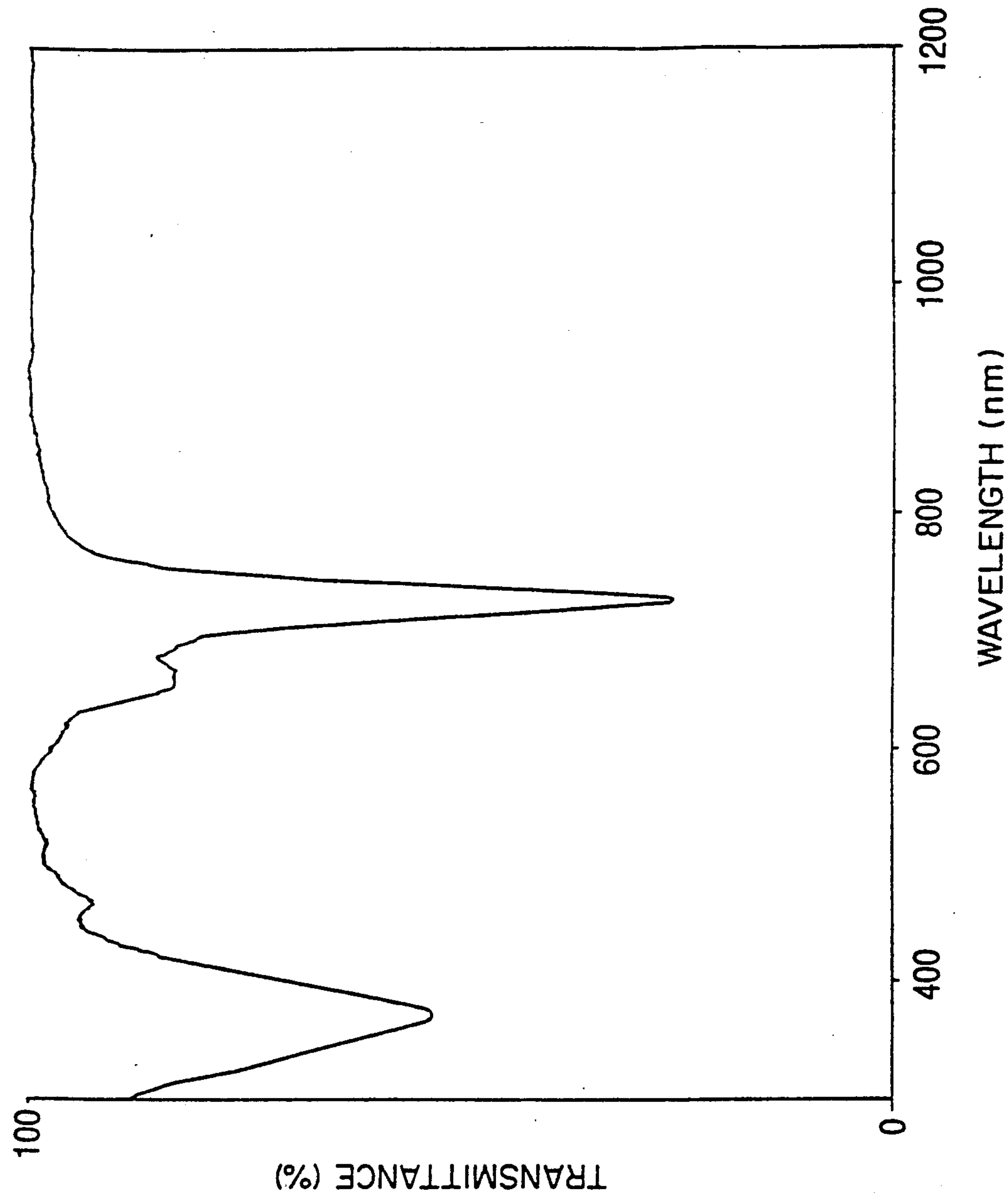
Figure 63:
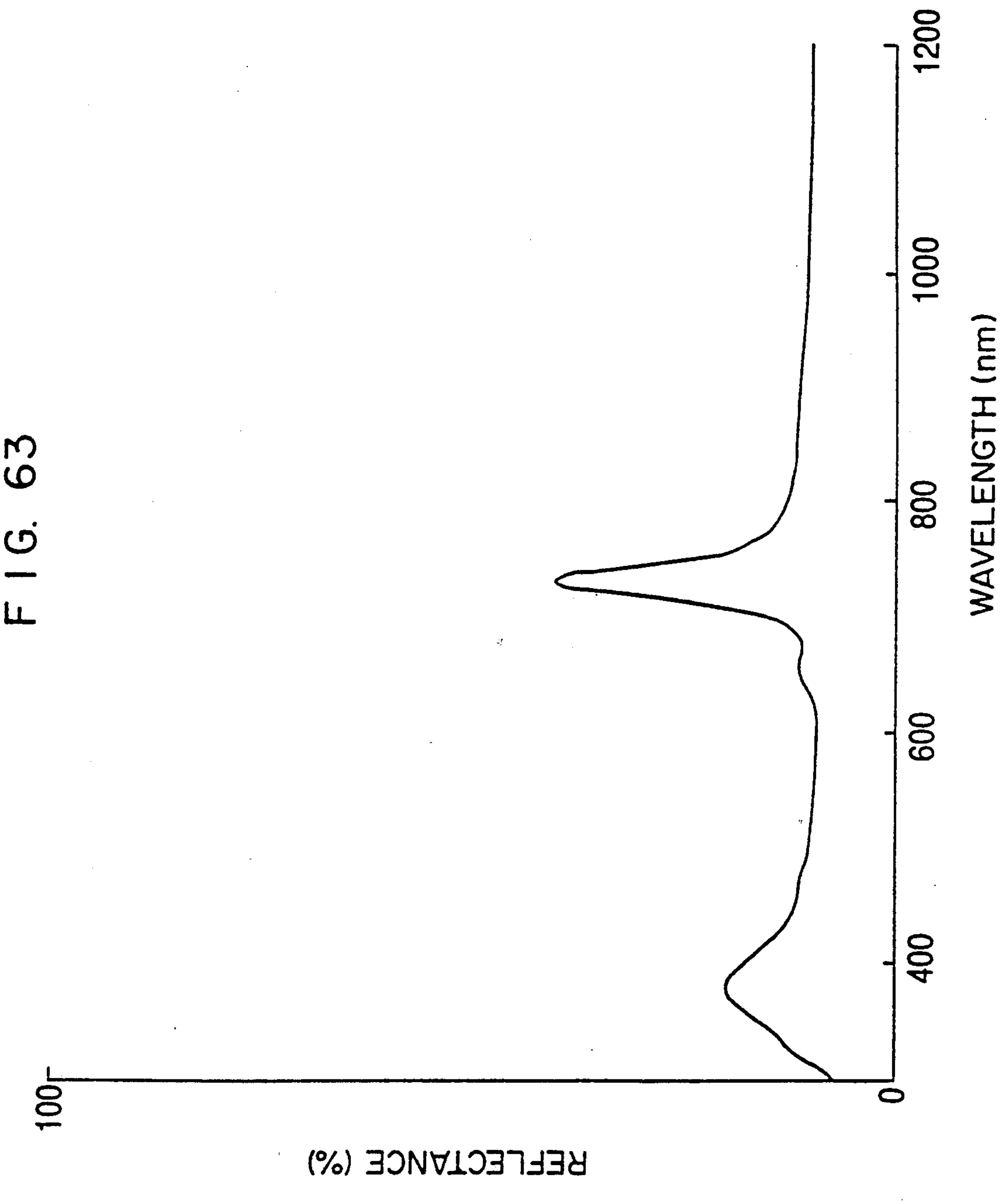
Figure 64:
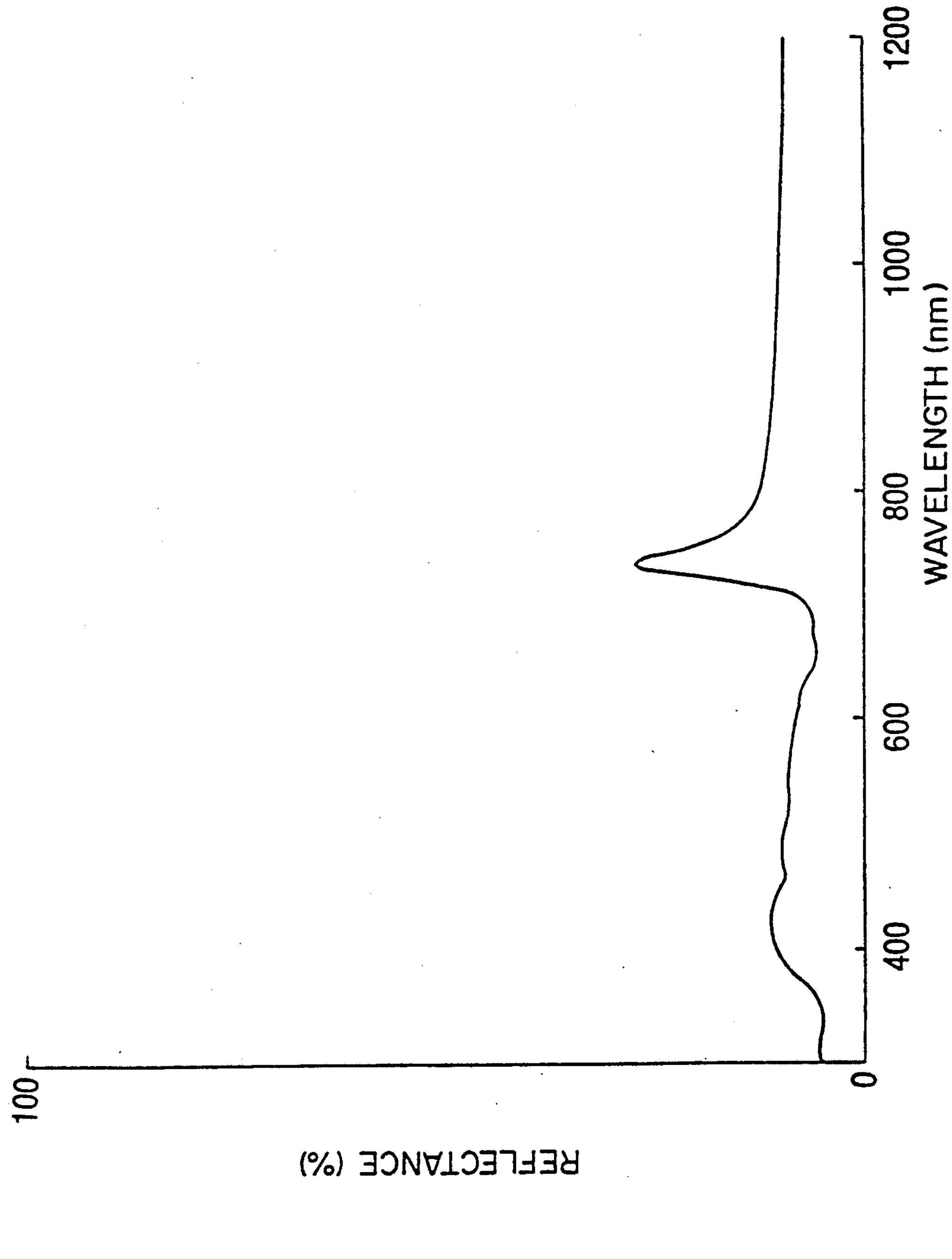
Figure 65:
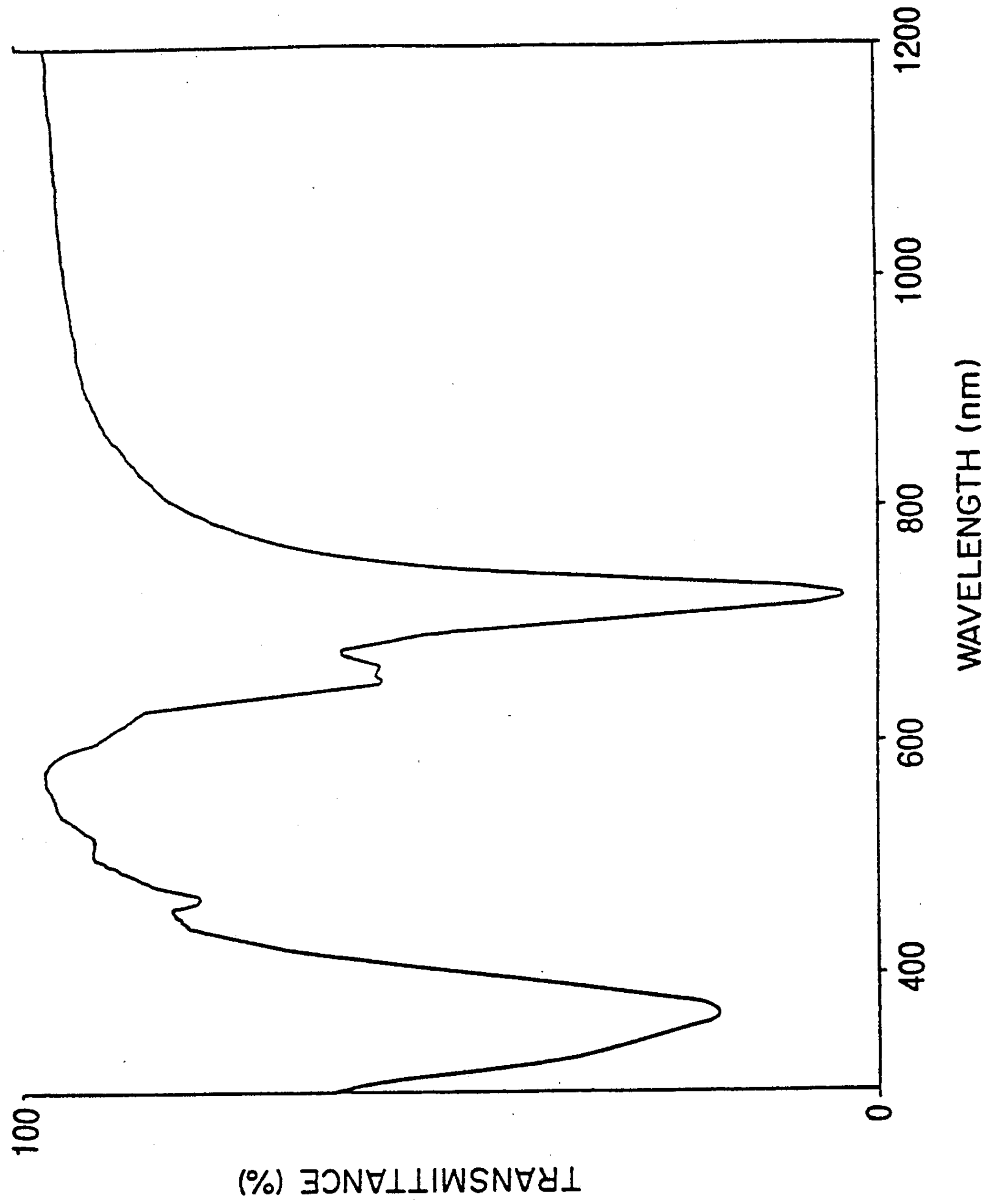
Figure 66:
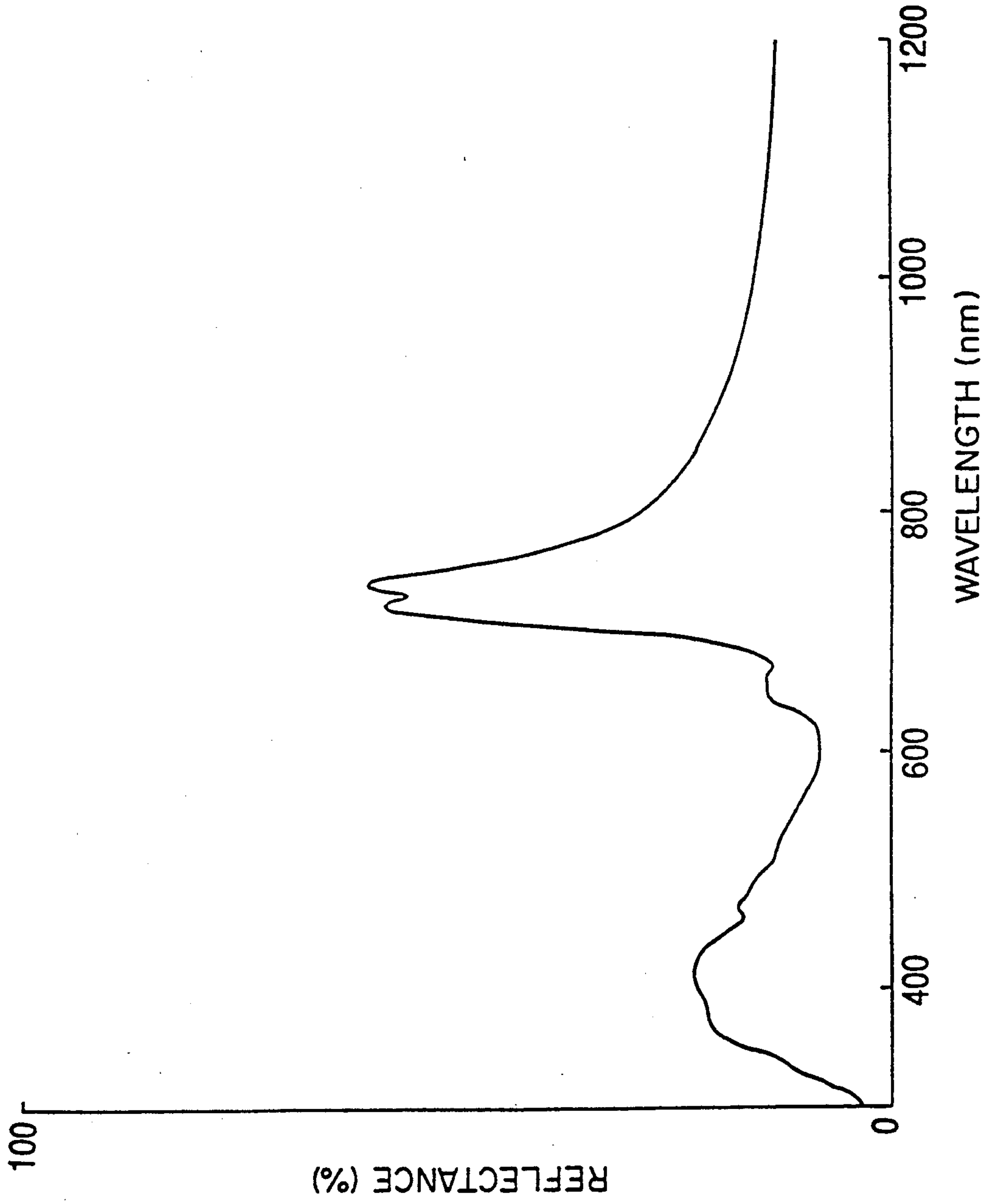
Figure 67:
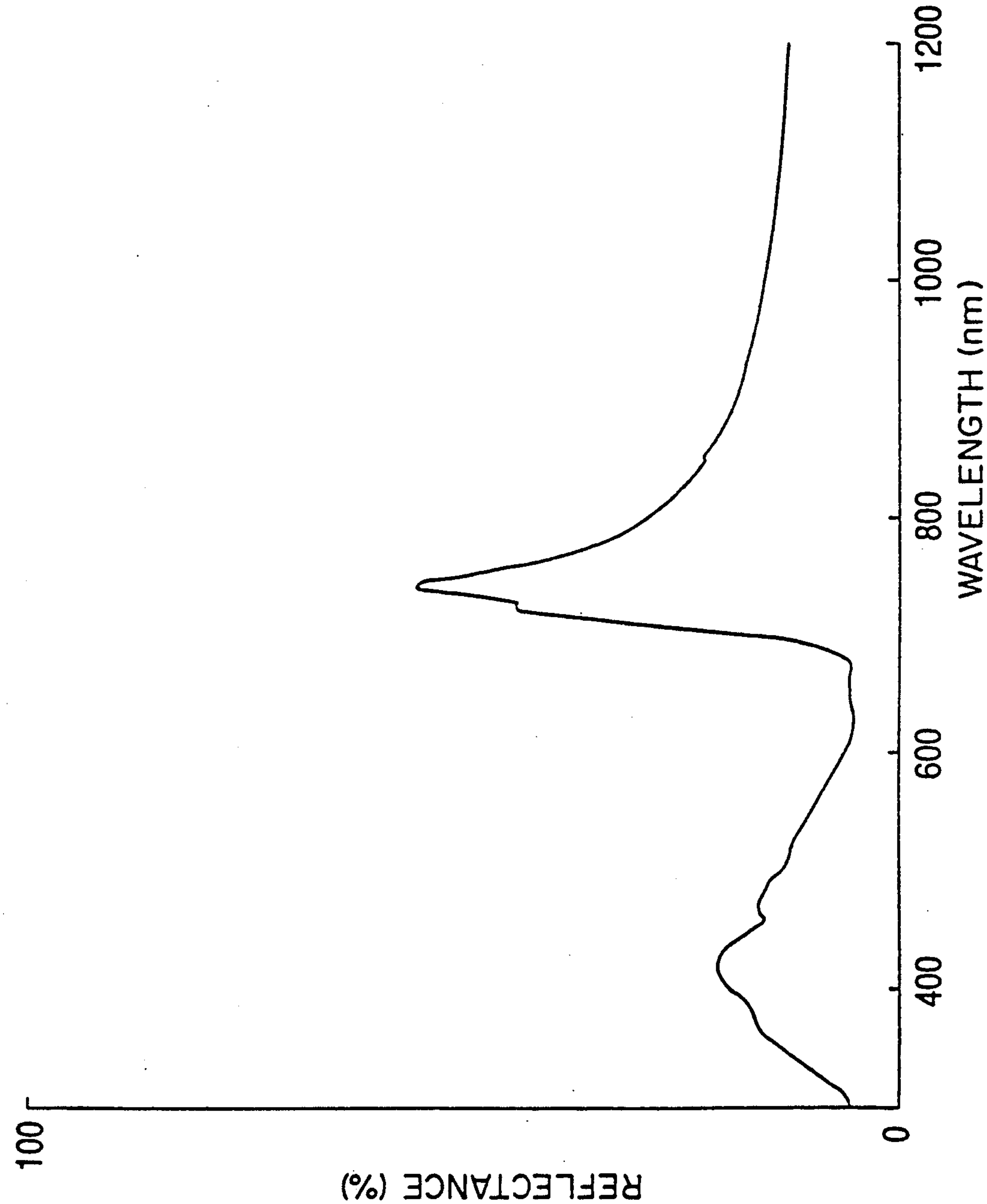
Figure 68:
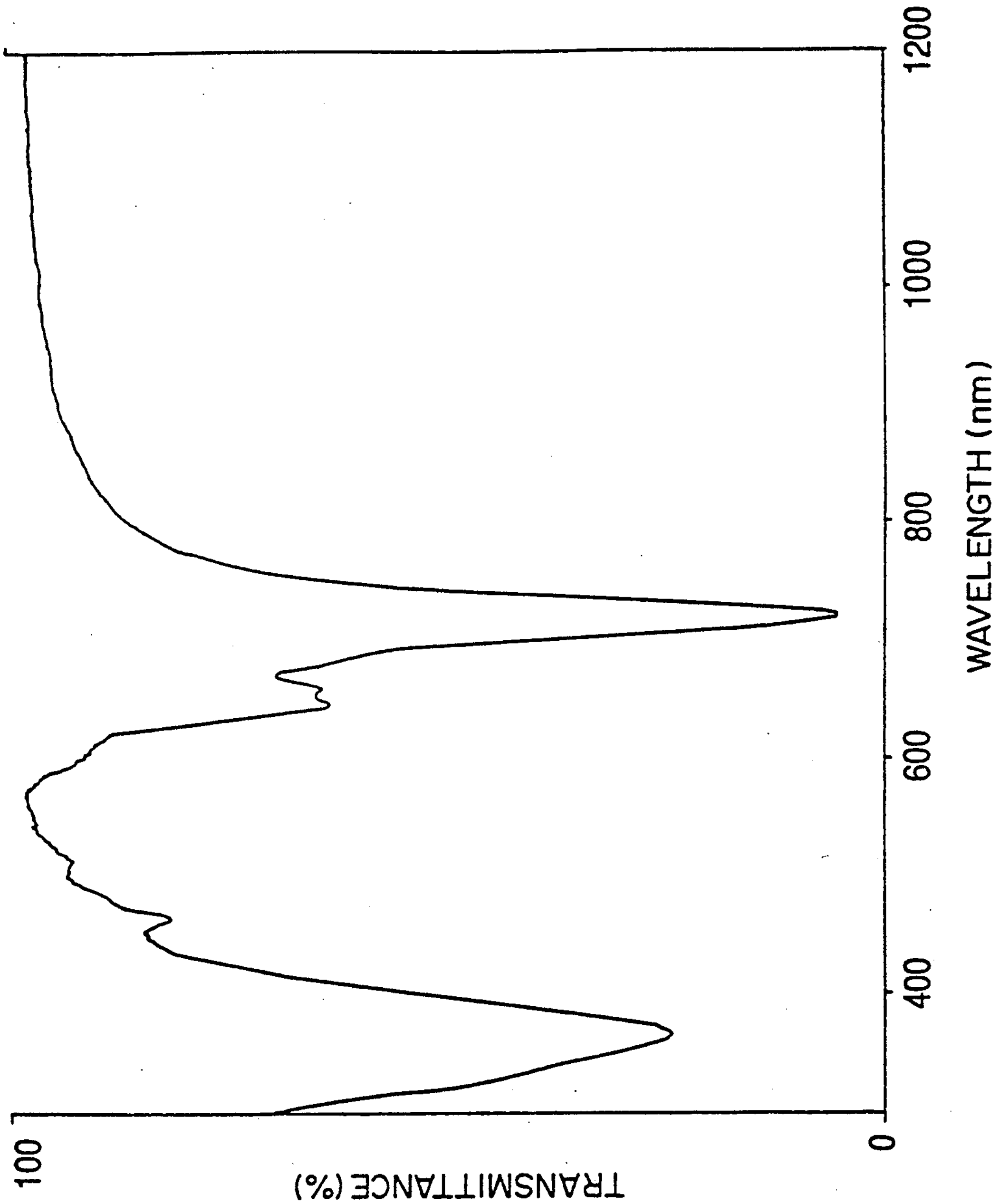
Figure 69:
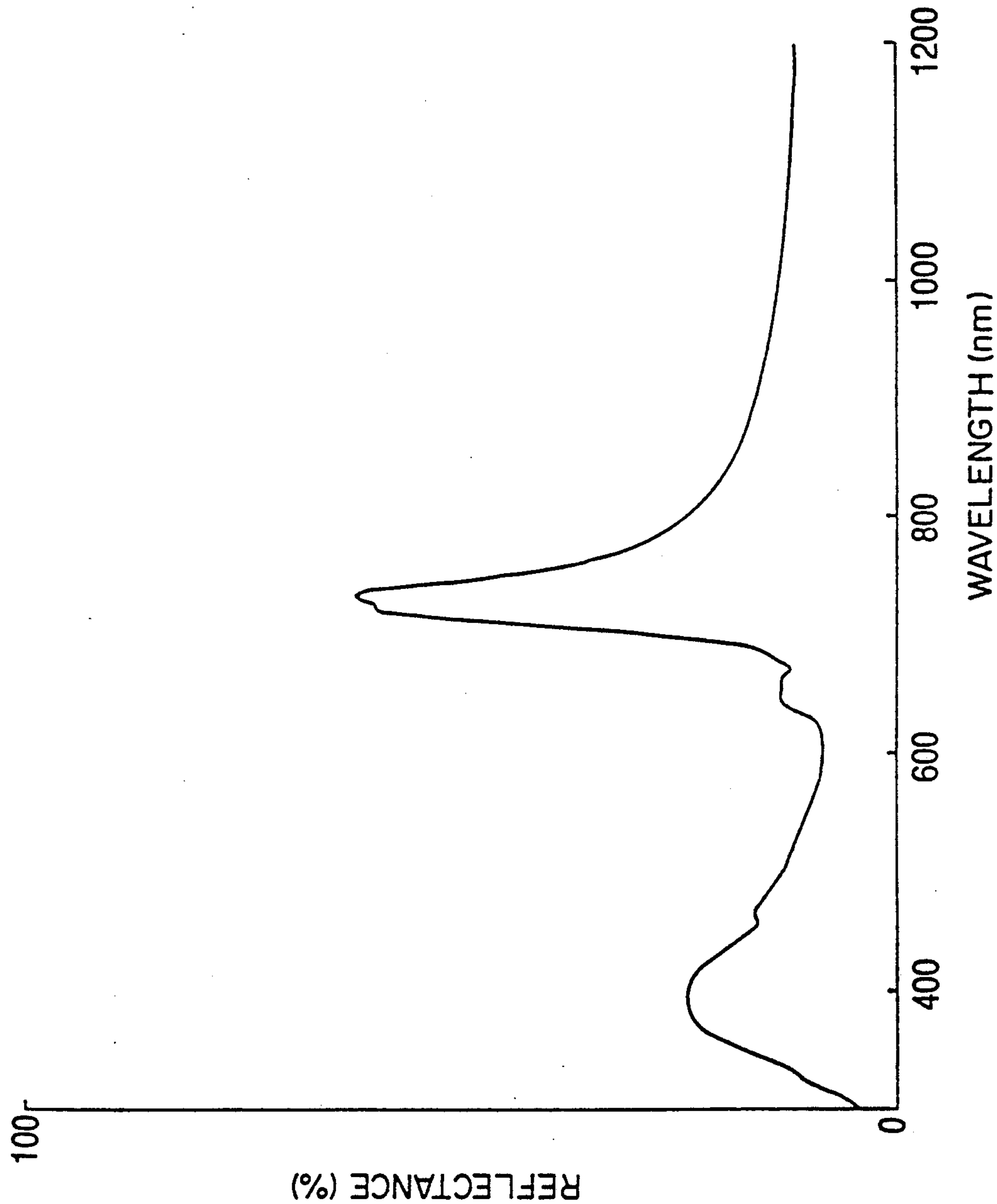
Figure 70:
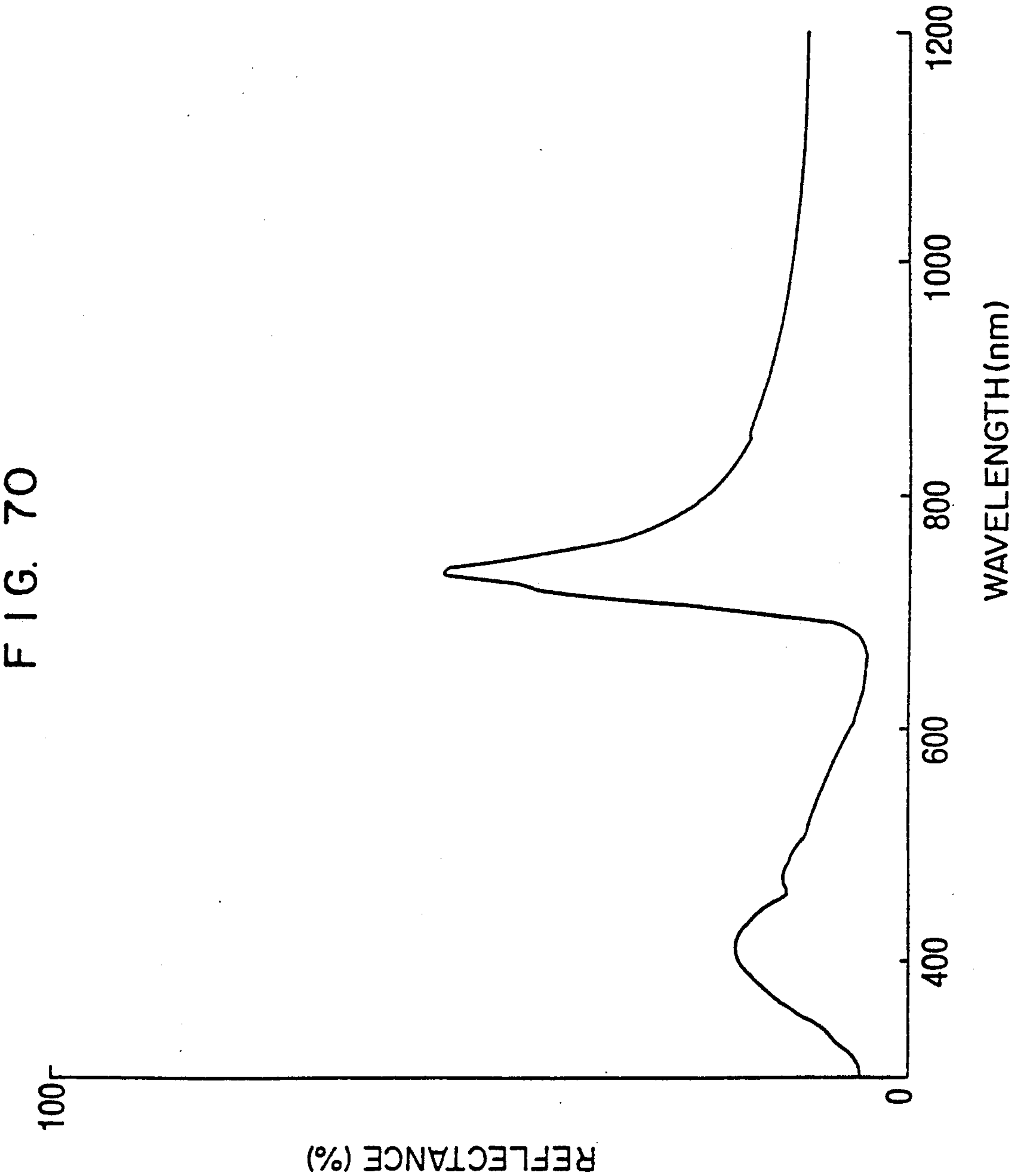

Chloroform solutions of Compound Nos. (1312), (1311) and (1310) (0.3% (W/W)) were prepared. Each solution was spin-coated on a glass substrate, and dried at about 80° C. for about 15 minutes to form an organic film. Organic films were subjected to measurement of transmission spectra, 5° regular reflection spectra from the spin coated film side and 5° regular reflection spectra from the glass substrate side, and shown in FIGS. 62 to 70 as follows:

| Compound No. | Transmission spectra | 5° regular reflection spectra (from spin coated film side) | 5° regular reflection spectra (from glass substrate side) |
|---|---|---|---|
| (1312) | FIG. 62 | FIG. 63 | FIG. 64 |
| (1311) | FIG. 65 | FIG. 66 | FIG. 67 |
| (1310) | FIG. 68 | FIG. 69 | FIG. 70 |

As is clear from FIGS. 62 to 70, high absorbing ability and high reflecting ability are shown near 740 nm.

EXPERIMENT 8

Figure 71:
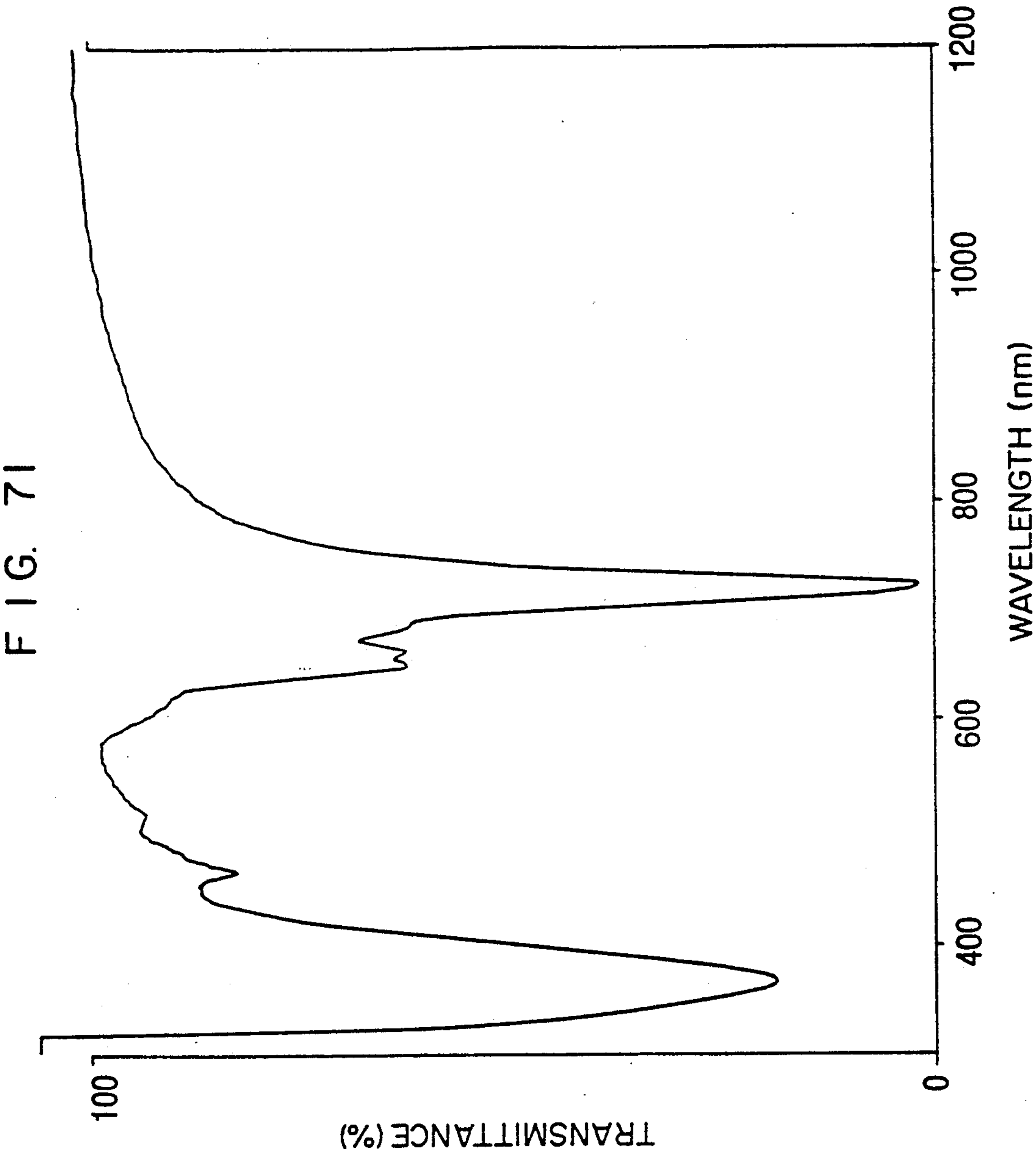
Figure 72:
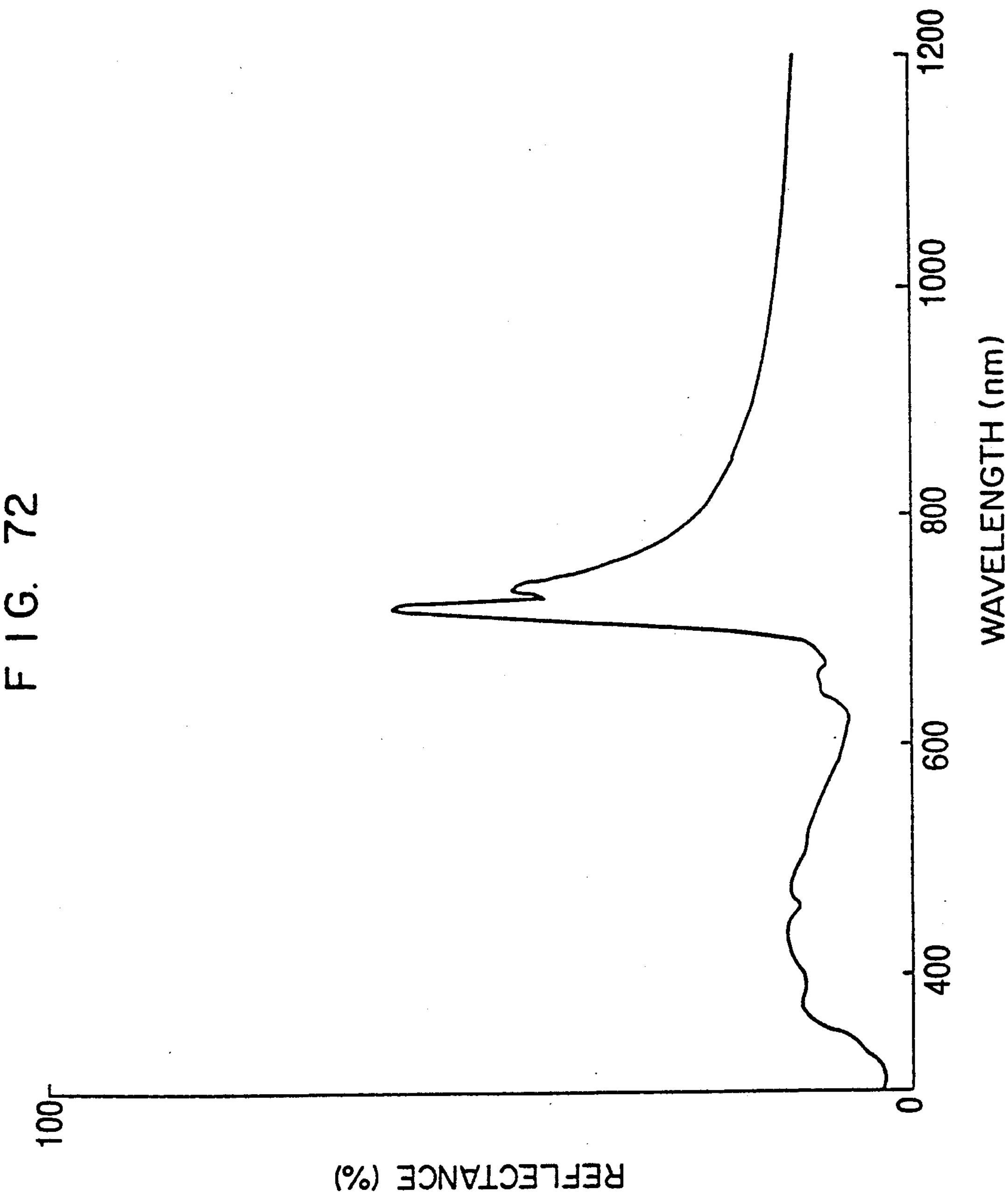

A chloroform solution of Compound No. (1309) (0.5% (W/W)) was spin-coated on a glass substrate and dried at about 80° C. for about 15 minutes to form an organic film. The organic film was subjected to measurement of transmission spectrum (FIG. 71) and 5° regular reflection spectrum (FIG. 72) from the spin coated film side. As is clear from FIGS. 71 and 72, high absorbing ability and high reflecting ability are shown near 740 nm.

EXAMPLE 11

Synthesis of Compound No. (1346)

5 Grams (25.7 mmoles) of 2,3-dicyano-6-methylquinoxaline, 5.9 ml (51.4 mmoles) of silicon tetrachloride, 52 mg of ammonium molybdate and 26 g of urea were reacted at 230° to 240° C. for about 3 hours. After cooling, water was added to a solidified reaction mixture and stirred at about 50° C. for 30 minutes. An insoluble solid was filtered and washed with water. Further, this solid was stirred in methanol at about 50° C. for 30 minutes. Then, the insoluble solid was filtered and washed with methanol to give a compound of the formula (VII) wherein Z is Cl; M is Si; $A^1$, $A^3$ and $A^4$ are each

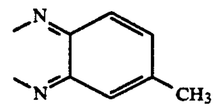

Figure 73:
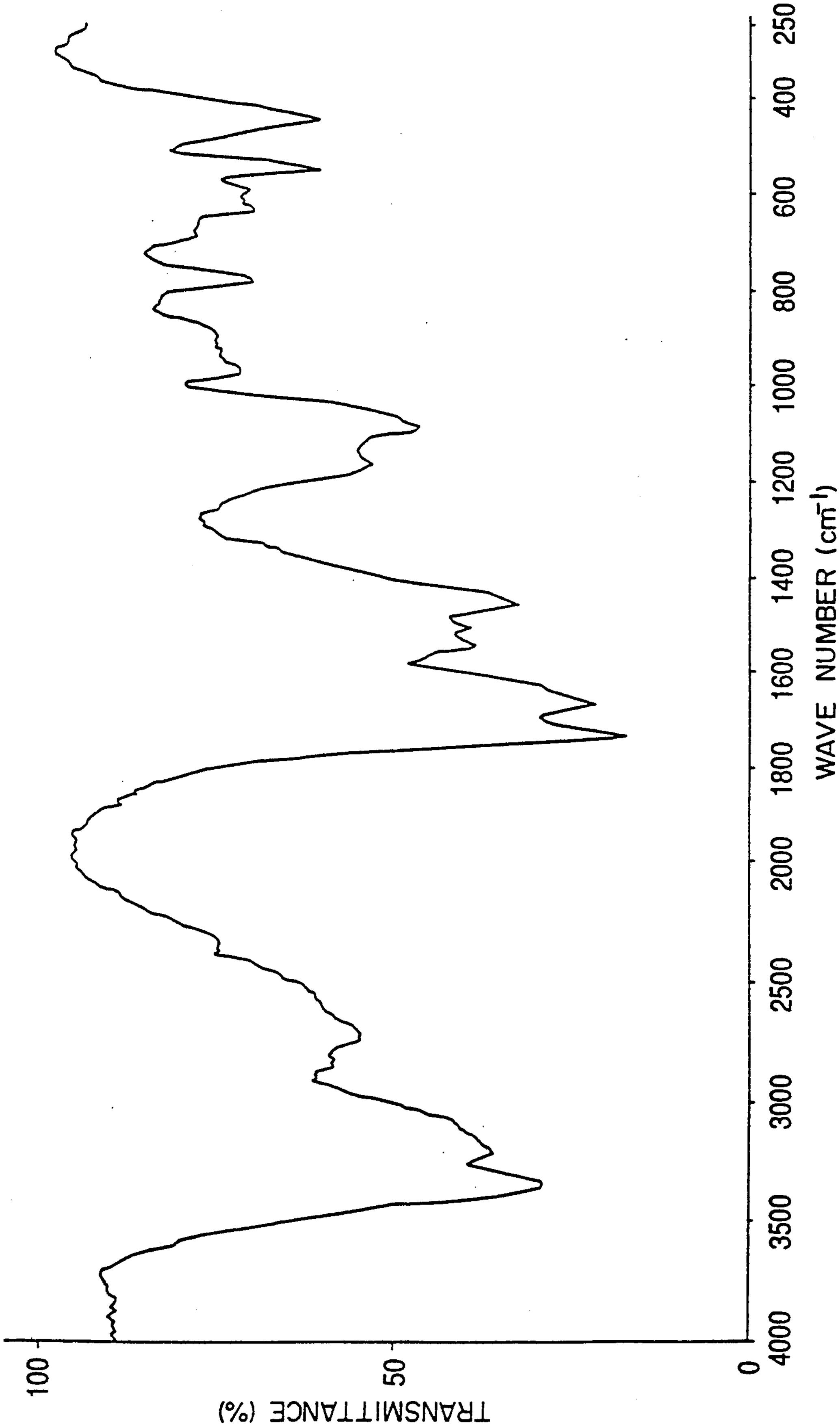

[hereinafter referred to as "$Cl_2SiQc(CH_3)_4$"] as a brown solid quantitatively. IR spectrum of this compound is shown in FIG. 73. From this spectrum, the presence of urea and the like as impurities was admitted, but $Cl_2SiQc(CH_3)_4$ was used in the next reaction without further purification.

To 76 ml of ethanol, 17.6 g (20.1 mmole) of $Cl_2SiQc(Ch_3)_4$ was added, and 76 ml of ammonia water and then 300 ml of water were added, followed by reflux for about 5 hours. After cooling, the reaction mixture was filtered, washed with water and methanol, and dried under reduced pressure to yield a brown solid in an amount of 12 g. It was found that the brown solid was a compound of the formula (II) wherein M is Si; $A^1$, $A^2$, $A^3$ and $A^4$ are each

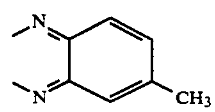

Figure 74:
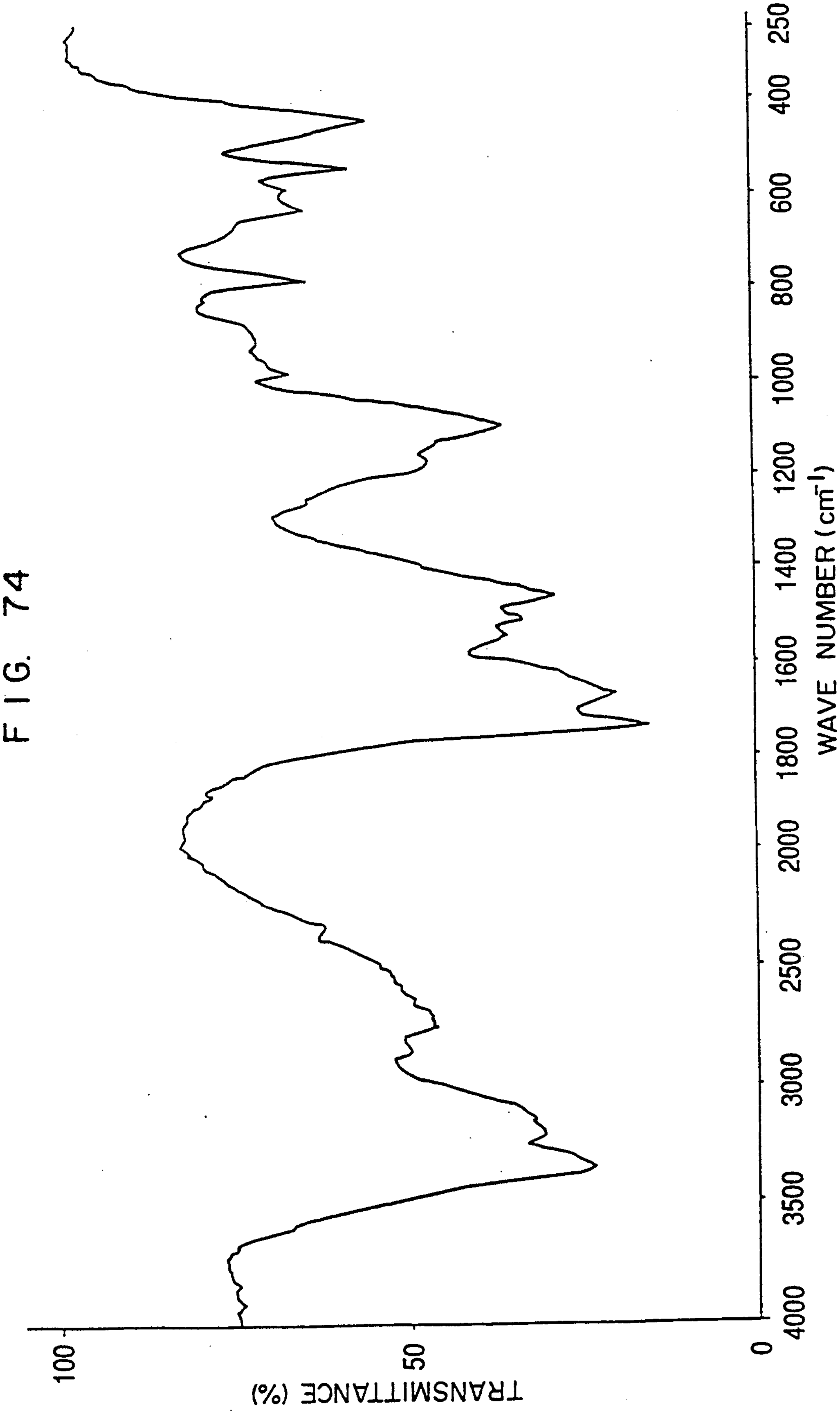

[hereinafter referred to as "$(HO)_2SiQc(CH_3)_4$"].IR spectrum of this compound is shown in FIG. 74. From this spectrum, the presence of urea and the like as impurities was admitted, but $(HO)_2SiQc(CH_3)_4$ was used in the next reaction without further purification.

To a suspension of 12 g (14.3 mmoles) of $(HO)_2SiQc(CH_3)_4$ in 400 ml of $\beta$-picoline, 19.2 ml (80.6 mmoles) of tributylamine and then 21.5 ml (80.5 mmoles) of tributylchlorosilane were added. The resulting mixture was refluxed for about 6 hours. After cooling, the $\beta$-picoline was removed by distillation under reduced pressure. Then, a mixed solvent of methanol/water was added thereto and precipitated solid was filtered and washed with water, methanol and hexane. The solid was dissolved in chloroform and purified by column chromatography over silica gel. After recrystallizing from a mixed solvent of hexane/chloroform, 8 mg of green crystals were obtained. From the following analytical results, the green crystals were confirmed to be Compound No. (1346) listed in Table 1.

(1) Melting point: >300° C.

| (2) Elementary analysis: | C | H | N |
|---|---|---|---|
| Calculated (%) | 66.09 | 6.36 | 18.14 |
| Found (%) | 66.18 | 6.31 | 18.07 |

Figure 75:
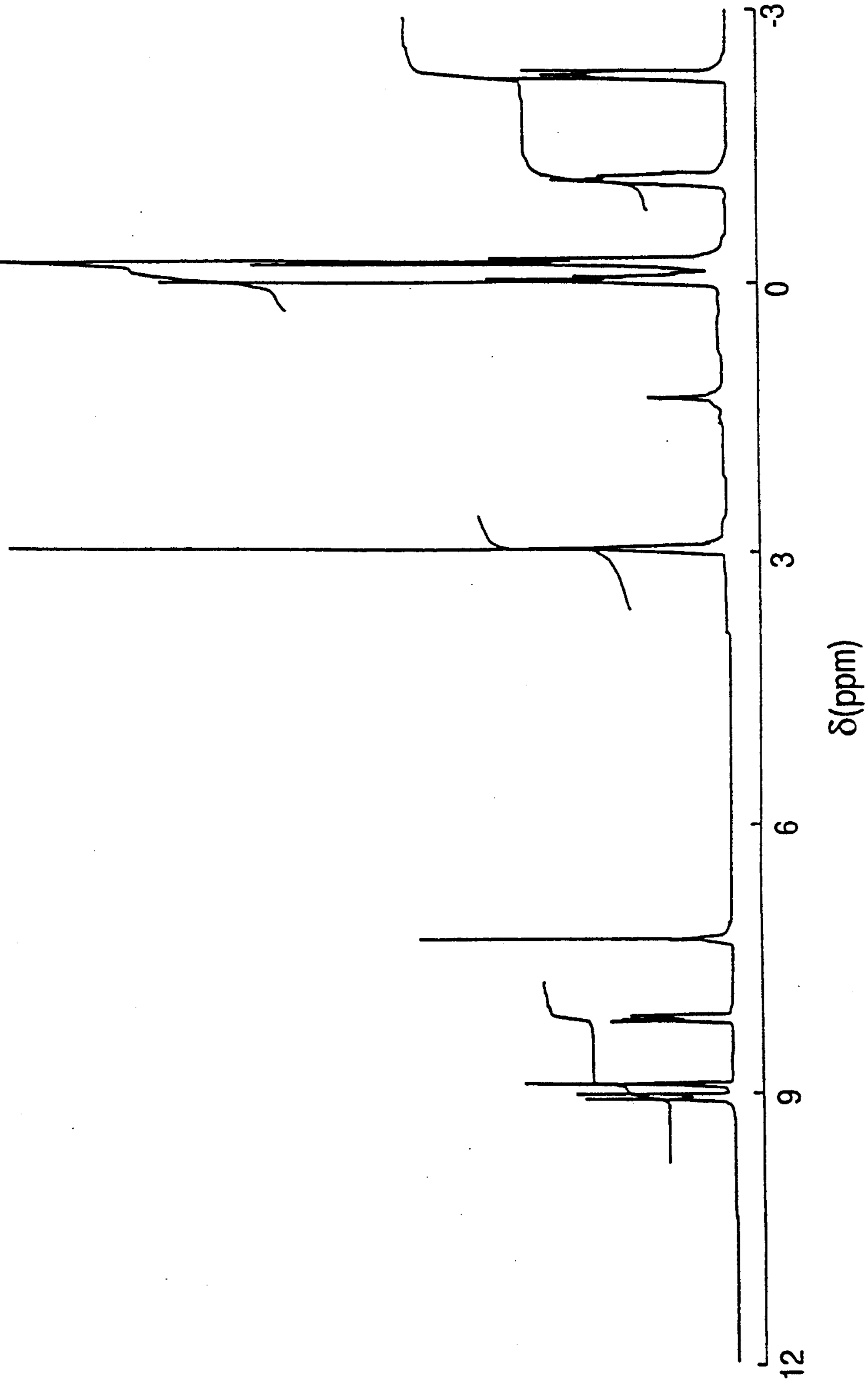

(3) NMR spectrum: $CDCl_3$ Shown in FIG. 75

$\delta$ values: 9.02 (4H, d, J=8.85 Hz) 8.89 (4H, br s), 8.15 (4H, dd, J=8.85, 1.22 Hz), 2.96 (12H, s), −0.02 (12H, sextet-like m), −0.20 (18H, t, J=7.33 Hz), −1.09 (12H, quintet-like m), −2.25 (12H, t-like m).

Figure 76:
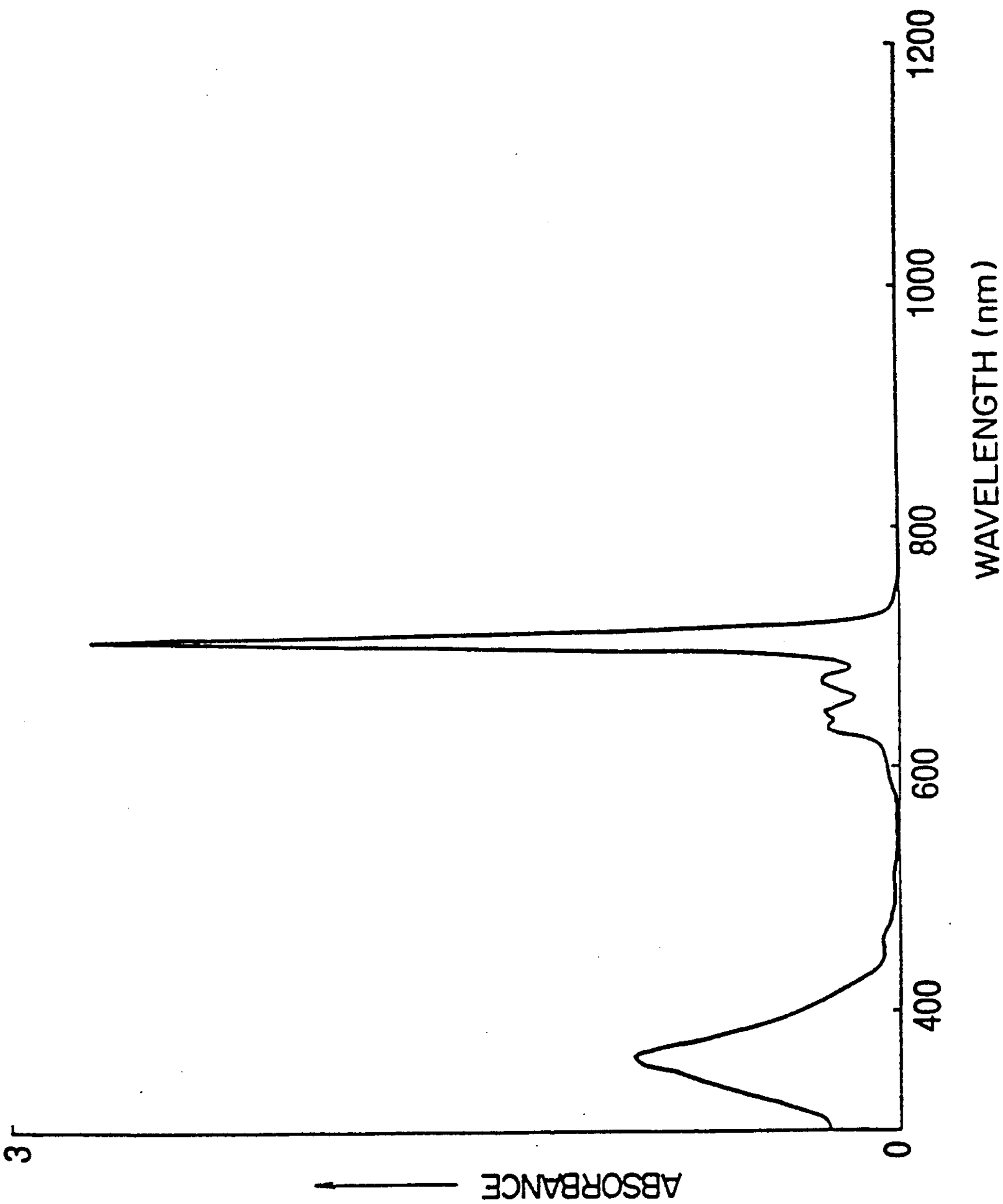

(4) Electronic spectrum ($CHCl_3$ solution): Shown in FIG. 76

Figure 77:
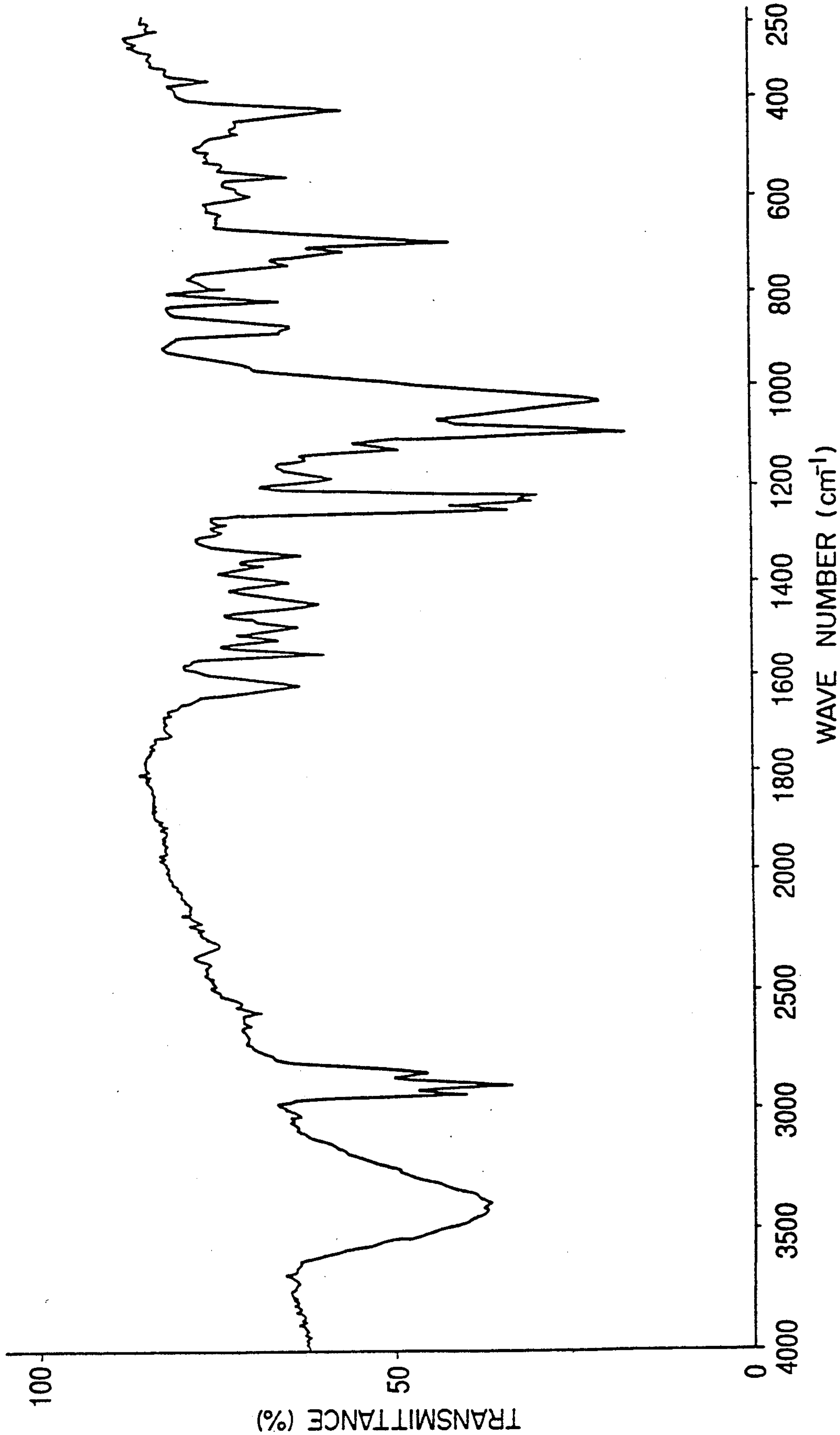

(5) IR spectrum (KBr method) Shown in FIG. 77.

EXPERIMENT 9

Figure 78:
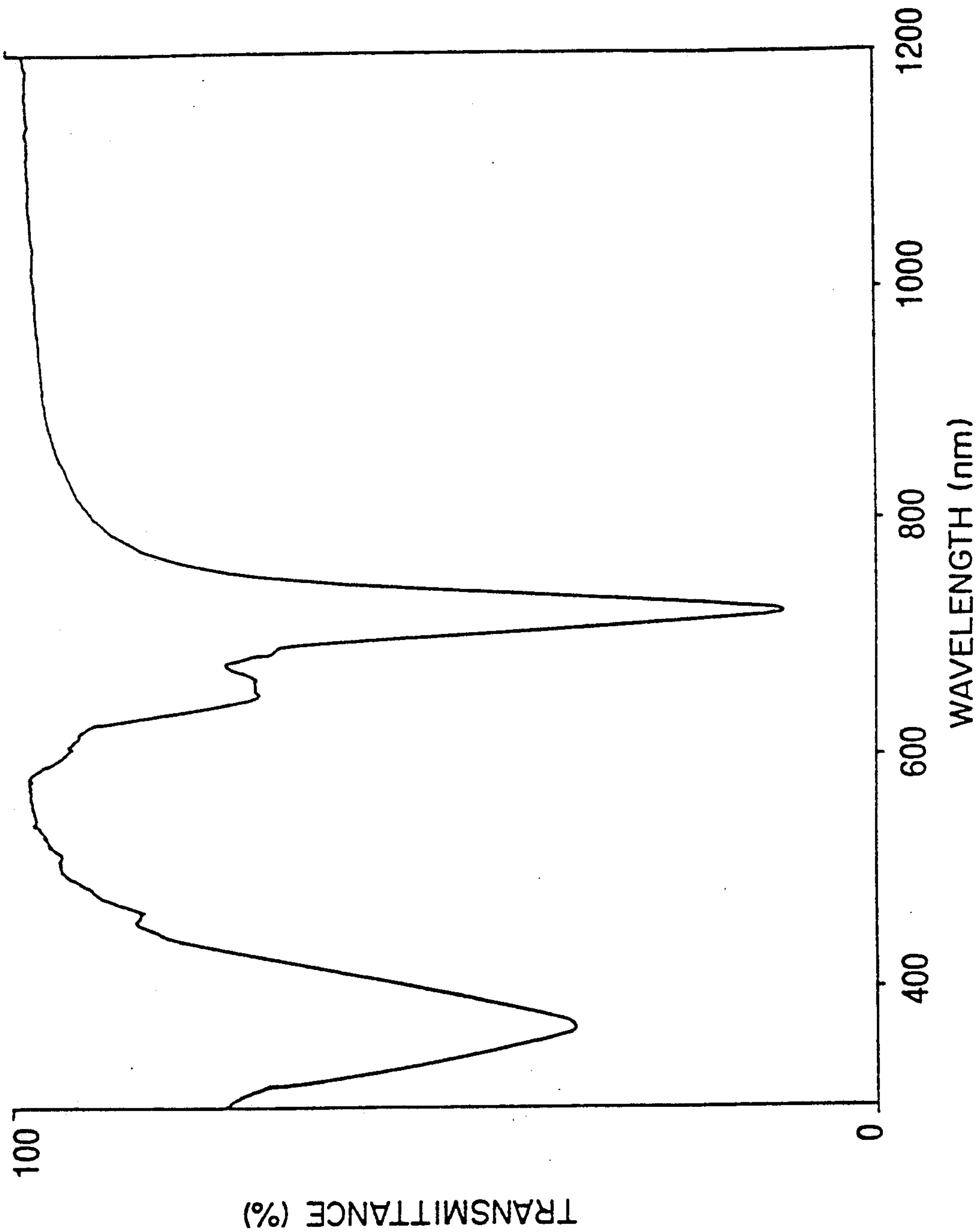
Figure 79:
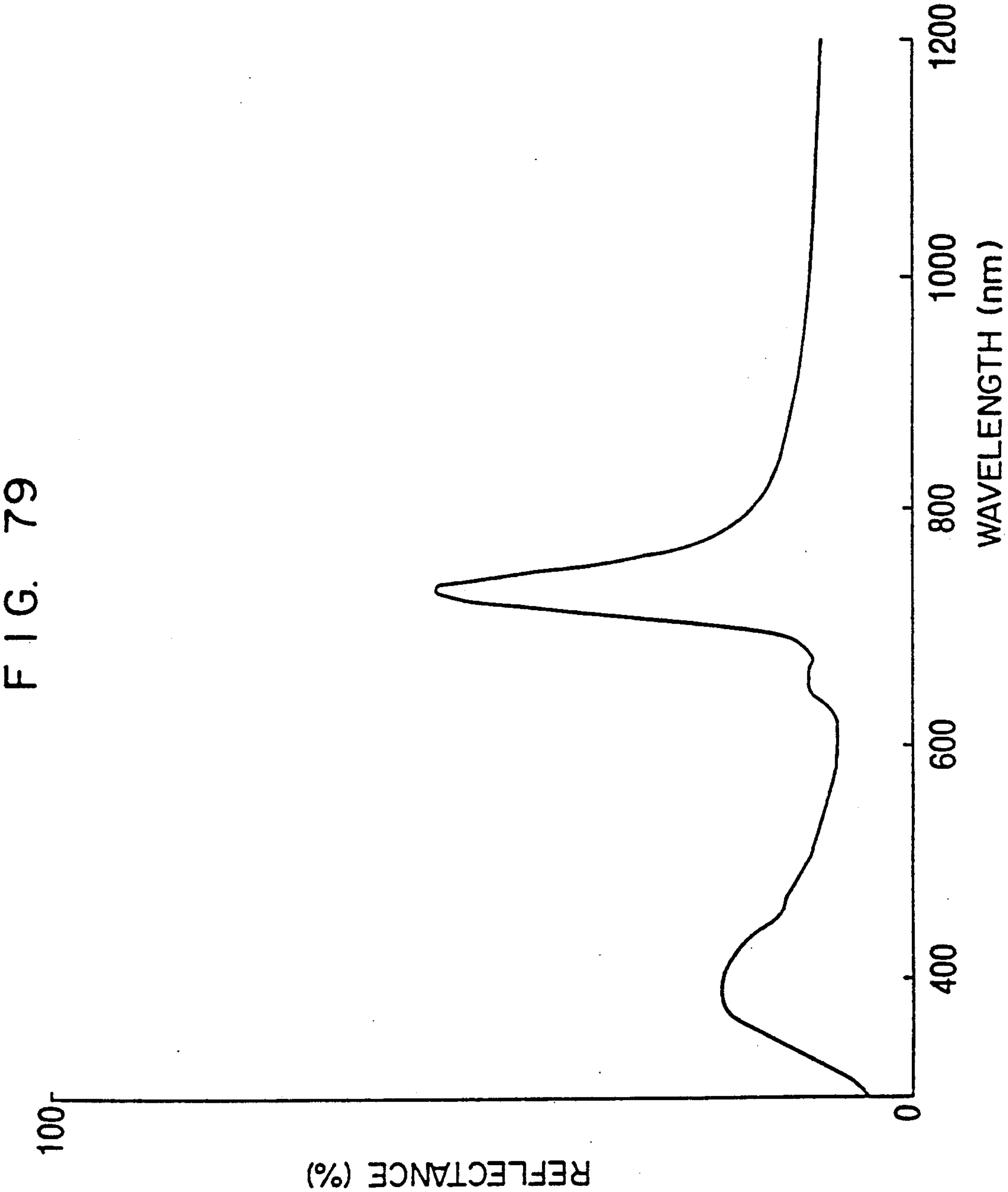
Figure 80:
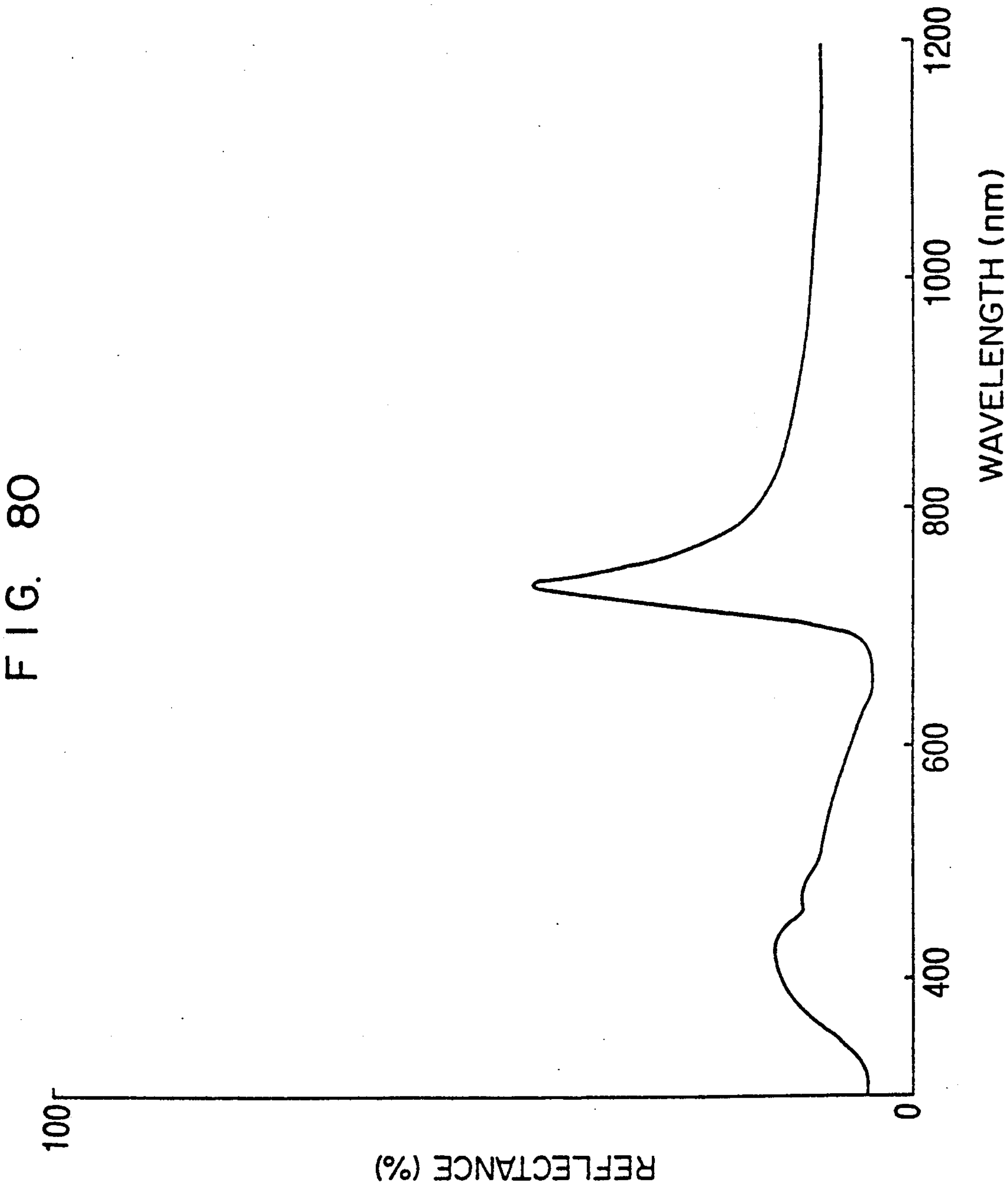

A chloroform solution of Compound No. (1346) (0.3% (W/W)) was spin coated on a glass substrate and dried at about 80° C. for about 15 minutes to from an organic film. The organic film was subjected to measurement of transmission spectrum (FIG. 78), 5° regular reflection spectrum from the spin coated film side (FIG. 79) and 5° regular reflection spectrum from the glass substrate side (FIG. 80). As is clear from FIGS. 78 to 80, high absorbing ability and high reflecting ability are shown near 740 nm.

EXAMPLES 12 to 865

Organic solutions (see Table 2) of the tetraazaporphins synthesized in Examples 1 to 11 or synthesized in the same manner as described in Examples 1 to 11 were spin-coated on poly(methy methacrylate) 2P substrates having a thickness of 1.2 mm and a diameter of 130 mm and dried at about 80° C. for about 15 minutes to form recording layers. The thicknesses of the recording layers were measured using a device (DEKTAK 3030, a trade name, mfd. by Sloan Co., Ltd.) and listed in Table 2.

Each optical recording medium thus produced was placed on a turn table so as to make the recording layer upside and revolved at a speed of 1800 rpm. Recording of pulse signals of 2 MHz was performed on the portion from 40 to 60 mm in radius from the center by irradiating a laser light obtained by combining argon ion laser, dye laser, etc. and adjusting various emission wavelengths from the underside of the optical recording medium, that is, from the substrate side via an optical head, while controlling the laser beam so as to focus on the recording layer through the poly(methyl methacrylate) substrate. Using the same apparatus, reading of recorded signals was performed using a laser light with a weaker output and a carrier-to-noise ratio (C/N) was measured.

The obtained results are shown in Table 2. As is clear from Table 2, the tetraazaporphins of the present invention show high C/N.

TABLE 2

| Example No. | Compound No. | Solvent | Solution concentration (%) (w/w) | Film thickness (Å) | Laser wavelength (nm) | Laser output (mW) Writing | Laser output (mW) Reading | C/N (dB) |
|---|---|---|---|---|---|---|---|---|
| 12 | (1) | Xylene | 1 | 600 | 650 | 10 | 0.5 | 56 |
| 13 | (5) | " | " | 700 | " | " | " | 53 |
| 14 | (12) | " | " | 600 | " | " | " | 55 |
| 15 | (14) | " | " | " | " | " | " | 51 |
| 16 | (18) | Toluene | " | 700 | " | " | " | 53 |
| 17 | (22) | " | " | 500 | " | " | " | 52 |
| 18 | (30) | Xylene | " | 600 | " | " | " | 55 |
| 19 | (34) | " | " | 500 | " | " | " | 51 |
| 20 | (40) | " | " | 700 | " | " | " | 54 |
| 21 | (46) | " | " | " | " | " | " | 55 |
| 22 | (50) | " | " | " | " | " | " | 56 |
| 23 | (52) | " | " | 600 | " | " | " | 53 |
| 24 | (56) | " | " | 700 | " | " | " | 52 |
| 25 | (57) | " | " | 600 | " | " | " | 54 |
| 26 | (60) | " | " | 500 | " | " | " | 55 |
| 27 | (62) | " | " | 600 | " | " | " | 56 |
| 28 | (65) | " | " | " | " | " | " | 54 |
| 29 | (70) | " | " | 700 | " | " | " | 51 |
| 30 | (72) | " | " | 500 | " | " | " | 53 |
| 31 | (74) | " | " | 700 | " | " | " | " |
| 32 | (78) | " | " | 600 | " | " | " | 52 |
| 33 | (82) | " | " | 700 | " | " | " | 54 |
| 34 | (87) | " | " | " | " | " | " | 55 |
| 35 | (93) | " | " | 600 | " | " | " | 56 |
| 36 | (94) | " | " | " | " | " | " | 52 |
| 37 | (95) | " | " | 500 | " | " | " | 55 |
| 38 | (97) | $CCl_4$ | 0.5 | 600 | " | " | " | 54 |
| 39 | (99) | Cyclohexane | 1 | 500 | " | " | " | 53 |
| 40 | (104) | " | " | " | " | " | " | 55 |
| 41 | (108) | Cyclohexane | 1 | 500 | 650 | 10 | 0.7 | 56 |
| 42 | (113) | " | " | 600 | " | " | " | 52 |
| 43 | (117) | $CCl_4$ | 0.5 | 600 | " | " | " | 54 |
| 44 | (119) | Cyclohexane | 1 | 500 | " | " | " | 53 |
| 45 | (120) | " | " | " | " | " | " | 54 |
| 46 | (121) | " | " | " | " | " | " | 52 |
| 47 | (124) | $CCl_4$ | 0.5 | " | " | " | " | 51 |
| 48 | (128) | " | " | 600 | " | " | " | 53 |
| 49 | (132) | " | " | " | " | " | " | 54 |
| 50 | (137) | Cyclohexane | 1 | 500 | " | " | " | 52 |
| 51 | (139) | " | " | 700 | " | " | " | 53 |
| 52 | (142) | $CCl_4$ | 0.5 | 600 | " | " | " | 52 |
| 53 | (143) | " | " | " | " | " | " | 54 |
| 54 | (144) | " | " | 500 | " | " | " | 55 |
| 55 | (147) | " | " | " | " | " | " | 51 |
| 56 | (150) | " | " | " | " | " | " | 53 |
| 57 | (151) | Xylene | 1 | 600 | 670 | " | 0.5 | 56 |
| 58 | (155) | " | " | 700 | " | " | " | 53 |
| 59 | (162) | " | " | 600 | " | " | " | 55 |
| 60 | (164) | " | " | " | " | " | " | 51 |
| 61 | (168) | Toluene | " | 700 | " | " | " | 53 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 62 | (172) | " | " | " | " | " | " | 52 |
| 63 | (180) | Xylene | " | 600 | " | " | " | 55 |
| 64 | (184) | " | " | 500 | " | " | " | 51 |
| 65 | (190) | " | " | 700 | " | " | " | 54 |
| 66 | (196) | " | " | " | " | " | " | 55 |
| 67 | (200) | " | " | " | " | " | " | 56 |
| 68 | (202) | " | " | 600 | " | " | " | 53 |
| 69 | (206) | " | " | 700 | " | " | " | 52 |
| 70 | (207) | Xylene | 1 | 600 | 670 | 10 | 0.5 | 54 |
| 71 | (210) | " | " | 500 | " | " | " | 55 |
| 72 | (212) | " | " | 600 | " | " | " | 56 |
| 73 | (215) | " | " | " | " | " | " | 54 |
| 74 | (220) | " | " | 700 | " | " | " | 51 |
| 75 | (222) | " | " | 500 | " | " | " | 53 |
| 76 | (224) | " | " | 700 | " | " | " | " |
| 77 | (228) | " | " | 600 | " | " | " | 52 |
| 78 | (232) | " | " | 700 | " | " | " | 54 |
| 79 | (237) | " | " | " | " | " | " | 55 |
| 80 | (243) | " | " | 600 | " | " | " | 56 |
| 81 | (244) | " | " | " | " | " | " | 52 |
| 82 | (245) | " | " | " | " | " | " | 55 |
| 83 | (247) | Cyclohexane | " | 500 | " | " | 0.7 | 53 |
| 84 | (249) | " | " | " | " | " | " | 54 |
| 85 | (252) | $CCl_4$ | 0.5 | 600 | " | " | " | 52 |
| 86 | (254) | " | " | 700 | " | " | " | 53 |
| 87 | (256) | Cyclohexane | 1 | 600 | " | " | " | 51 |
| 88 | (258) | " | " | " | " | " | " | 52 |
| 89 | (260) | $CCl_4$ | 0.5 | 500 | " | " | " | 53 |
| 90 | (262) | " | " | 600 | " | " | " | 55 |
| 91 | (263) | Cyclohexane | 1 | " | " | " | " | 54 |
| 92 | (267) | " | " | " | " | " | " | 53 |
| 93 | (270) | " | " | 500 | " | " | " | 52 |
| 94 | (272) | " | " | " | " | " | " | 54 |
| 95 | (279) | " | " | " | " | " | " | 51 |
| 96 | (286) | " | " | 700 | " | " | " | 53 |
| 97 | (289) | " | " | " | " | " | " | 52 |
| 98 | (292) | $CCl_4$ | 0.5 | 600 | " | " | " | 54 |
| 99 | (293) | $CCl_4$ | 0.5 | 500 | 670 | 10 | 0.7 | 53 |
| 100 | (294) | " | " | " | " | " | " | 51 |
| 101 | (297) | " | " | 600 | " | " | " | 52 |
| 102 | (300) | " | " | " | " | " | " | 54 |
| 103 | (301) | Xylene | 1 | 700 | 630 | " | 0.5 | 48 |
| 104 | (304) | " | " | 600 | " | " | " | 47 |
| 105 | (310) | " | " | 700 | " | " | " | " |
| 106 | (317) | " | " | 600 | " | " | " | 46 |
| 107 | (320) | Toluene | " | 500 | " | " | " | 47 |
| 108 | (321) | " | " | 700 | " | " | " | " |
| 109 | (325) | Xylene | " | " | " | " | " | 45 |
| 110 | (336) | " | " | 600 | " | " | " | 48 |
| 111 | (341) | " | " | 500 | " | " | " | " |
| 112 | (343) | " | " | 600 | " | " | " | 46 |
| 113 | (350) | " | " | " | " | " | " | 45 |
| 114 | (355) | " | " | 500 | " | " | " | " |
| 115 | (359) | " | " | 600 | " | " | " | 46 |
| 116 | (362) | " | " | 700 | " | " | " | " |
| 117 | (365) | " | " | 600 | " | " | " | 47 |
| 118 | (368) | " | " | " | " | " | " | 46 |
| 119 | (370) | " | " | 700 | " | " | " | " |
| 120 | (372) | " | " | " | " | " | " | " |
| 121 | (375) | " | " | " | " | " | " | 45 |
| 122 | (376) | " | " | 600 | " | " | " | " |
| 123 | (379) | " | " | 700 | " | " | " | " |
| 124 | (381) | " | " | 500 | " | " | " | " |
| 125 | (386) | " | " | 600 | " | " | " | 46 |
| 126 | (390) | " | " | " | " | " | " | 47 |
| 127 | (393) | " | " | 500 | " | " | " | " |
| 128 | (395) | Xylene | 1 | 700 | 630 | 10 | 0.5 | 48 |
| 129 | (397) | Cyclohexane | " | 600 | " | 7 | 0.6 | 46 |
| 130 | (397) | " | " | " | " | " | " | " |
| 131 | (402) | $CCl_4$ | 0.5 | " | " | " | " | 47 |
| 132 | (404) | Cyclohexane | 1 | 500 | " | " | " | " |
| 133 | (406) | " | " | " | " | " | " | " |
| 134 | (408) | " | " | 600 | " | " | " | 45 |
| 135 | (410) | $CCl_4$ | 0.5 | " | " | " | " | " |
| 136 | (412) | Cyclohexane | 1 | 700 | " | " | " | 46 |
| 137 | (413) | " | " | " | " | " | " | " |
| 138 | (417) | " | " | 600 | " | " | " | 47 |
| 139 | (419) | " | " | " | " | " | " | " |
| 140 | (422) | " | " | 700 | " | " | " | " |

TABLE 2-continued

| Example No. | Compound No. | Solvent | Solution concentration (%) (w/w) | Film thickness (Å) | Laser wavelength (nm) | Laser output (mW) Writing | Laser output (mW) Reading | C/N (dB) |
|---|---|---|---|---|---|---|---|---|
| 141 | (423) | " | " | " | " | " | " | 46 |
| 142 | (429) | " | " | 500 | " | " | " | 45 |
| 143 | (436) | " | " | " | " | " | " | 46 |
| 144 | (437) | " | " | 700 | " | " | " | " |
| 145 | (439) | " | " | 600 | " | " | " | 47 |
| 146 | (443) | $CCl_4$ | 0.5 | " | " | " | " | " |
| 147 | (444) | " | " | 500 | " | " | " | 46 |
| 148 | (447) | " | " | " | " | " | " | " |
| 149 | (450) | " | " | " | " | " | " | " |
| 150 | (451) | Xylene | 1 | 600 | 670 | 10 | 0.5 | 56 |
| 151 | (453) | " | " | " | " | " | " | 54 |
| 152 | (458) | " | " | 500 | " | " | " | 56 |
| 153 | (465) | " | " | 700 | " | " | " | 55 |
| 154 | (468) | Toluene | " | " | " | " | " | 52 |
| 155 | (472) | " | " | 600 | " | " | " | 56 |
| 156 | (476) | Xylene | " | " | " | " | " | 54 |
| 157 | (484) | Xylene | 1 | 700 | 670 | 10 | 0.5 | 52 |
| 158 | (493) | " | " | 600 | " | " | " | 53 |
| 159 | (496) | " | " | 700 | " | " | " | 54 |
| 160 | (502) | " | " | 600 | " | " | " | 56 |
| 161 | (507) | " | " | " | " | " | " | 52 |
| 162 | (511) | " | " | 500 | " | " | " | 56 |
| 163 | (517) | " | " | 600 | " | " | " | 52 |
| 164 | (520) | " | " | 700 | " | " | " | 55 |
| 165 | (522) | " | " | 600 | " | " | " | 51 |
| 166 | (525) | " | " | 500 | " | " | " | 52 |
| 167 | (527) | " | " | 600 | " | " | " | " |
| 168 | (528) | " | " | " | " | " | " | " |
| 169 | (531) | " | " | 500 | " | " | " | " |
| 170 | (535) | " | " | 700 | " | " | " | 51 |
| 171 | (539) | " | " | " | " | " | " | 55 |
| 172 | (541) | " | " | 500 | " | " | " | 51 |
| 173 | (542) | " | " | 700 | " | " | " | 54 |
| 174 | (544) | " | " | 600 | " | " | " | 53 |
| 175 | (546) | " | " | " | " | " | " | 56 |
| 176 | (547) | Cyclohexane | " | 500 | " | 6 | 0.6 | 53 |
| 177 | (550) | " | " | " | " | " | " | 52 |
| 178 | (552) | $CCl_4$ | 0.5 | 600 | " | " | " | 54 |
| 179 | (554) | Cyclohexane | 1 | " | " | " | " | 55 |
| 180 | (555) | " | " | 700 | " | " | " | 53 |
| 181 | (558) | " | " | 600 | " | " | " | 52 |
| 182 | (559) | $CCl_4$ | 0.5 | 700 | " | " | " | 51 |
| 183 | (562) | Cyclohexane | 1 | 500 | " | " | " | 52 |
| 184 | (563) | " | " | " | " | " | " | 54 |
| 185 | (566) | " | " | " | " | " | " | 53 |
| 186 | (568) | Cyclohexane | 1 | 500 | 670 | 6 | 0.6 | 51 |
| 187 | (570) | " | " | 600 | " | " | " | 52 |
| 188 | (572) | " | " | " | " | " | " | 51 |
| 189 | (580) | " | " | 500 | " | " | " | 53 |
| 190 | (584) | " | " | " | " | " | " | 54 |
| 191 | (587) | " | " | 700 | " | " | " | 51 |
| 192 | (589) | " | " | " | " | " | " | 52 |
| 193 | (593) | $CCl_4$ | 0.5 | 600 | " | " | " | 55 |
| 194 | (594) | " | " | " | " | " | " | 54 |
| 195 | (597) | " | " | 500 | " | " | " | 53 |
| 196 | (600) | " | " | 600 | " | " | " | 51 |
| 197 | (601) | Xylene | 1 | " | " | 10 | 0.5 | 54 |
| 198 | (605) | " | " | 700 | " | " | " | 53 |
| 199 | (609) | " | " | " | " | " | " | 51 |
| 200 | (612) | " | " | 600 | " | " | " | 55 |
| 201 | (615) | Toluene | " | 500 | " | " | " | 53 |
| 202 | (618) | " | " | 700 | " | " | " | 52 |
| 203 | (621) | Xylene | " | 600 | " | " | " | 56 |
| 204 | (625) | " | " | 700 | " | " | " | 54 |
| 205 | (632) | " | " | 600 | " | " | " | " |
| 206 | (637) | " | " | " | " | " | " | 52 |
| 207 | (641) | " | " | 700 | " | " | " | 55 |
| 208 | (648) | " | " | 500 | " | " | " | 51 |
| 209 | (658) | " | " | " | " | " | " | 52 |
| 210 | (664) | " | " | 600 | " | " | " | 53 |
| 211 | (666) | " | " | 500 | " | " | " | 52 |
| 212 | (670) | " | " | 600 | " | " | " | " |
| 213 | (673) | " | " | 700 | " | " | " | 55 |
| 214 | (675) | " | " | " | " | " | " | 51 |
| 215 | (678) | Xylene | 1 | 500 | 670 | 10 | 0.5 | 53 |
| 216 | (681) | " | " | 700 | " | " | " | 54 |
| 217 | (683) | " | " | 600 | " | " | " | 52 |
| 218 | (688) | " | " | " | " | " | " | 54 |
| 219 | (689) | " | " | " | " | " | " | 53 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 220 | (690) | " | " | " | " | " | " | 52 |
| 221 | (692) | " | " | " | " | " | " | 54 |
| 222 | (696) | " | " | 700 | " | " | " | 56 |
| 223 | (697) | Cyclohexane | " | " | " | 8 | 0.7 | 52 |
| 224 | (699) | " | " | 500 | " | " | " | 53 |
| 225 | (708) | " | " | " | " | " | " | 51 |
| 226 | (711) | " | " | 600 | " | " | " | 54 |
| 227 | (713) | " | " | 500 | " | " | " | 55 |
| 228 | (718) | " | " | 600 | " | " | " | 53 |
| 229 | (720) | " | " | " | " | " | " | 54 |
| 230 | (722) | " | " | 700 | " | " | " | 52 |
| 231 | (723) | $CCl_4$ | 0.5 | " | " | " | " | " |
| 232 | (726) | " | " | 600 | " | " | " | 51 |
| 233 | (728) | Cyclohexane | 1 | " | " | " | " | 53 |
| 234 | (729) | " | " | 500 | " | " | " | " |
| 235 | (732) | " | " | 700 | " | " | " | 54 |
| 236 | (734) | " | " | " | " | " | " | " |
| 237 | (737) | " | " | 600 | " | " | " | 55 |
| 238 | (739) | " | " | " | " | " | " | 52 |
| 239 | (742) | $CCl_4$ | 0.5 | 500 | " | " | " | 53 |
| 240 | (743) | " | " | " | " | " | " | 51 |
| 241 | (744) | " | " | 600 | " | " | " | 54 |
| 242 | (747) | " | " | " | " | " | " | 53 |
| 243 | (750) | " | " | " | " | " | " | 52 |
| 244 | (751) | Xylene | 1 | 600 | 670 | 10 | 0.5 | 52 |
| 245 | (755) | " | " | 700 | " | " | " | 56 |
| 246 | (757) | " | " | " | " | " | " | 55 |
| 247 | (762) | " | " | 500 | " | " | " | 52 |
| 248 | (765) | Toluene | " | 700 | " | " | " | 54 |
| 249 | (767) | " | " | 500 | " | " | " | 52 |
| 250 | (771) | Xylene | " | 700 | " | " | " | 53 |
| 251 | (775) | " | " | 500 | " | " | " | 52 |
| 252 | (782) | " | " | 700 | " | " | " | " |
| 253 | (787) | " | " | 600 | " | " | " | 56 |
| 254 | (792) | " | " | " | " | " | " | 53 |
| 255 | (799) | " | " | 700 | " | " | " | 54 |
| 256 | (803) | " | " | " | " | " | " | 52 |
| 257 | (807) | " | " | 600 | " | " | " | 53 |
| 258 | (814) | " | " | " | " | " | " | 55 |
| 259 | (817) | " | " | 700 | " | " | " | 52 |
| 260 | (822) | " | " | 500 | " | " | " | 51 |
| 261 | (824) | " | " | " | " | " | " | 54 |
| 262 | (831) | " | " | 600 | " | " | " | 52 |
| 263 | (835) | " | " | 700 | " | " | " | 54 |
| 264 | (836) | " | " | " | " | " | " | 52 |
| 265 | (838) | " | " | 500 | " | " | " | " |
| 266 | (839) | " | " | " | " | " | " | " |
| 267 | (844) | " | " | 600 | " | " | " | 51 |
| 268 | (845) | " | " | 700 | " | " | " | " |
| 269 | (846) | " | " | 600 | " | " | " | 54 |
| 270 | (827) | Cyclohexane | " | " | " | 7 | 0.7 | 53 |
| 271 | (849) | " | " | 500 | " | " | " | " |
| 272 | (851) | $CCl_4$ | 0.5 | " | " | " | " | 52 |
| 273 | (854) | Cyclohexane | 1 | 600 | 670 | 7 | 0.7 | 51 |
| 274 | (856) | " | " | 500 | " | " | " | " |
| 275 | (858) | " | " | " | " | " | " | 54 |
| 276 | (860) | " | " | " | " | " | " | 53 |
| 277 | (862) | " | " | 700 | " | " | " | 52 |
| 278 | (863) | " | " | " | " | " | " | " |
| 279 | (866) | " | " | " | " | " | " | 53 |
| 280 | (868) | " | " | 600 | " | " | " | " |
| 281 | (870) | " | " | " | " | " | " | 52 |
| 282 | (872) | " | " | 700 | " | " | " | 51 |
| 283 | (880) | " | " | 500 | " | " | " | 53 |
| 284 | (885) | " | " | " | " | " | " | 54 |
| 285 | (887) | " | " | 600 | " | " | " | 53 |
| 286 | (889) | " | " | " | " | " | " | 51 |
| 287 | (892) | $CCl_4$ | 0.5 | " | " | " | " | 52 |
| 288 | (893) | " | " | 500 | " | " | " | " |
| 289 | (894) | " | " | " | " | " | " | 54 |
| 290 | (897) | " | " | 700 | " | " | " | 53 |
| 291 | (899) | " | " | 600 | " | " | " | " |
| 292 | (900) | " | " | " | " | " | " | 52 |
| 293 | (901) | Xylene | 1 | 700 | 780 | 10 | 0.5 | 53 |
| 294 | (902) | " | " | 500 | " | " | " | 54 |
| 295 | (903) | " | " | " | " | " | " | 51 |
| 296 | (904) | " | " | 600 | " | " | " | 52 |
| 297 | (907) | " | " | 500 | " | " | " | 53 |
| 288 | (910) | " | " | 600 | " | " | " | 55 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 299 | (912) | " | " | 700 | " | " | " | 54 |
| 300 | (914) | " | " | 600 | " | " | " | 53 |
| 301 | (916) | " | " | 700 | " | " | " | 55 |
| 302 | (917) | Xylene | 1 | 600 | 780 | 10 | 0.5 | 54 |
| 303 | (919) | " | " | " | " | " | " | 52 |
| 304 | (922) | " | " | 500 | " | " | " | 55 |
| 305 | (923) | " | " | " | " | " | " | 54 |
| 306 | (926) | " | " | 700 | " | " | " | 52 |
| 307 | (927) | " | " | " | " | " | " | 55 |
| 308 | (929) | " | " | 600 | " | " | " | 53 |
| 309 | (931) | " | " | 500 | " | " | " | 54 |
| 310 | (933) | " | " | " | " | " | " | 52 |
| 311 | (934) | " | " | 700 | " | " | " | 51 |
| 312 | (935) | " | " | 600 | " | " | " | 55 |
| 313 | (936) | " | " | 700 | " | " | " | 54 |
| 314 | (938) | " | " | 500 | " | " | " | 53 |
| 315 | (939) | " | " | 700 | " | " | " | 54 |
| 316 | (941) | " | " | 600 | " | " | " | 53 |
| 317 | (942) | " | " | " | " | " | " | 52 |
| 318 | (945) | " | " | 500 | " | " | " | 52 |
| 319 | (947) | " | " | 600 | " | " | " | 54 |
| 320 | (948) | " | " | 700 | " | " | " | 55 |
| 321 | (950) | " | " | 600 | " | " | " | 52 |
| 322 | (952) | " | " | 700 | " | " | " | 54 |
| 323 | (955) | " | " | 600 | " | " | " | 53 |
| 324 | (956) | " | " | 500 | " | " | " | 52 |
| 325 | (959) | " | " | " | " | " | " | 54 |
| 326 | (961) | " | " | 600 | " | " | " | 53 |
| 327 | (963) | " | " | 500 | " | " | " | 54 |
| 328 | (967) | " | " | 700 | " | " | " | 53 |
| 329 | (970) | " | " | 600 | " | " | " | 51 |
| 330 | (973) | " | " | 700 | " | " | " | 54 |
| 331 | (976) | Xylene | 1 | 600 | 780 | 10 | 0.5 | 55 |
| 332 | (977) | " | " | " | " | " | " | 52 |
| 333 | (981) | Cyclohexane | " | 700 | " | 8 | 0.6 | 51 |
| 334 | (983) | " | " | 600 | " | " | " | 52 |
| 335 | (986) | $CCl_4$ | 0.5 | " | " | " | " | " |
| 336 | (988) | Cyclohexane | 1 | 500 | " | " | " | 53 |
| 337 | (989) | " | " | " | " | " | " | " |
| 338 | (992) | " | " | 700 | " | " | " | 51 |
| 339 | (994) | " | " | " | " | " | " | " |
| 340 | (996) | " | " | 600 | " | " | " | 52 |
| 341 | (997) | " | " | " | " | " | " | " |
| 342 | (1000) | " | " | " | " | " | " | 54 |
| 343 | (1002) | " | " | 500 | " | " | " | 51 |
| 344 | (1004) | " | " | 600 | " | " | " | " |
| 345 | (1006) | " | " | " | " | " | " | 53 |
| 346 | (1007) | $CCl_4$ | 0.5 | 700 | " | " | " | 52 |
| 347 | (1013) | Cyclohexane | 1 | " | " | " | " | " |
| 348 | (1018) | " | " | 600 | " | " | " | 53 |
| 349 | (1021) | " | " | 500 | " | " | " | " |
| 350 | (1023) | " | " | " | " | " | " | 54 |
| 351 | (1026) | $CCl_4$ | 0.5 | 600 | " | " | " | 51 |
| 352 | (1027) | " | " | " | " | " | " | 53 |
| 353 | (1028) | " | " | " | " | " | " | " |
| 354 | (1031) | " | " | " | " | " | " | 52 |
| 355 | (1034) | " | " | " | " | " | " | 54 |
| 356 | (1035) | Xylene | 1 | " | " | 10 | 0.5 | 53 |
| 357 | (1036) | " | " | " | " | " | " | " |
| 358 | (1038) | " | " | 700 | " | " | " | 52 |
| 359 | (1041) | " | " | 500 | " | " | " | 54 |
| 360 | (1043) | Xylene | 1 | 600 | 780 | 10 | 0.5 | 54 |
| 361 | (1047) | " | " | 700 | " | " | " | 55 |
| 362 | (1049) | " | " | 600 | " | " | " | 53 |
| 363 | (1052) | " | " | 500 | " | " | " | 52 |
| 364 | (1056) | " | " | 600 | " | " | " | 53 |
| 365 | (1059) | " | " | 700 | " | " | " | 51 |
| 366 | (1063) | " | " | " | " | " | " | 52 |
| 367 | (1064) | " | " | 600 | " | " | " | 53 |
| 368 | (1067) | " | " | 500 | " | " | " | 55 |
| 369 | (1071) | " | " | " | " | " | " | 52 |
| 370 | (1075) | " | " | 600 | " | " | " | 51 |
| 371 | (1079) | " | " | 700 | " | " | " | 55 |
| 372 | (1081) | " | " | 500 | " | " | " | 54 |
| 373 | (1086) | " | " | 700 | " | " | " | 53 |
| 374 | (1090) | " | " | 600 | " | " | " | 51 |
| 375 | (1094) | " | " | " | " | " | " | 52 |
| 376 | (1097) | " | " | 700 | " | " | " | 55 |
| 377 | (1101) | " | " | " | " | " | " | 53 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 378 | (1105) | " | " | " | " | " | " | 52 |
| 379 | (1108) | " | " | " | " | " | " | 51 |
| 380 | (1115) | " | " | 600 | " | " | " | 52 |
| 381 | (1117) | Cyclohexane | " | 700 | " | 6 | 0.7 | 51 |
| 382 | (1119) | " | " | 600 | " | " | " | " |
| 383 | (1122) | $CCl_4$ | 0.5 | " | " | " | " | 53 |
| 384 | (1124) | Cyclohexane | 1 | 500 | " | " | " | " |
| 385 | (1126) | " | " | " | " | " | " | 52 |
| 386 | (1128) | " | " | 600 | " | " | " | " |
| 387 | (1129) | " | " | 700 | " | " | " | 51 |
| 388 | (1132) | " | " | " | " | " | " | 53 |
| 389 | (1133) | Cyclohexane | 1 | 600 | 780 | 6 | 0.7 | 53 |
| 390 | (1136) | " | " | 700 | " | " | " | " |
| 391 | (1137) | " | " | " | " | " | " | 52 |
| 392 | (1139) | " | " | 500 | " | " | " | 51 |
| 393 | (1140) | " | " | " | " | " | " | " |
| 394 | (1142) | " | " | " | " | " | " | " |
| 395 | (1143) | $CCl_4$ | 0.5 | 600 | " | " | " | 53 |
| 396 | (1145) | Cyclohexane | 1 | " | " | " | " | " |
| 397 | (1148) | " | " | 500 | " | " | " | 52 |
| 398 | (1149) | " | " | 700 | " | " | " | " |
| 399 | (1153) | " | " | " | " | " | " | 51 |
| 400 | (1156) | " | " | 500 | " | " | " | " |
| 401 | (1157) | " | " | 700 | " | " | " | 54 |
| 402 | (1159) | " | " | " | " | " | " | " |
| 403 | (1161) | $CCl_4$ | 0.5 | " | " | " | " | " |
| 404 | (1162) | " | " | 600 | " | " | " | 52 |
| 405 | (1165) | " | " | " | " | " | " | 53 |
| 406 | (1168) | " | " | " | " | " | " | 51 |
| 407 | (1169) | " | " | 500 | " | 10 | 0.5 | 52 |
| 408 | (1170) | Xylene | 1 | 700 | " | " | " | 51 |
| 409 | (1172) | Toluene | " | 600 | " | " | " | 53 |
| 410 | (1174) | " | " | 500 | " | " | " | 55 |
| 411 | (1176) | $CCl_4$ | 0.5 | " | " | " | " | 53 |
| 412 | (1179) | Chloroform | " | 600 | " | " | " | 52 |
| 413 | (1181) | $CCl_4$ | " | 700 | " | " | " | 54 |
| 414 | (1187) | Chloroform | " | " | " | " | " | 53 |
| 415 | (1190) | $CCl_4$ | " | 600 | " | " | " | 51 |
| 416 | (1194) | Xylene | 1 | 700 | " | " | " | 53 |
| 417 | (1198) | Toluene | " | 600 | " | " | " | 54 |
| 418 | (1201) | Chloroform | 0.5 | 700 | 708 | 10 | 0.5 | 53 |
| 419 | (1205) | Xylene | 1 | " | " | " | " | 52 |
| 420 | (1208) | Toluene | " | 600 | " | " | " | 53 |
| 421 | (1213) | $CCl_4$ | 0.5 | 700 | " | " | " | " |
| 422 | (1215) | Chloroform | " | 500 | " | " | " | 52 |
| 423 | (1221) | Xylene | 1 | " | " | " | " | 54 |
| 424 | (1225) | Toluene | " | 700 | " | " | " | " |
| 425 | (1229) | Xylene | " | 600 | " | " | " | 53 |
| 426 | (1232) | " | " | 700 | " | " | " | 52 |
| 427 | (1236) | $CCl_4$ | 0.5 | " | " | " | " | " |
| 428 | (1240) | " | " | 500 | " | " | " | 53 |
| 429 | (1244) | Chloroform | " | 700 | " | " | " | 52 |
| 430 | (1249) | $CCl_4$ | " | 500 | " | " | " | " |
| 431 | (1252) | Chloroform | " | 600 | " | " | " | 53 |
| 432 | (1255) | $CCl_4$ | " | 700 | " | " | " | 51 |
| 433 | (1256) | Cyclohexane | 1 | 600 | " | " | " | 54 |
| 434 | (1257) | $CCl_4$ | 0.5 | " | " | " | " | 51 |
| 435 | (1260) | Cyclohexane | 1 | 500 | " | " | " | 52 |
| 436 | (1262) | " | " | " | " | " | " | " |
| 437 | (1264) | $CCl_4$ | 0.5 | " | " | " | " | 53 |
| 438 | (1266) | " | " | 600 | " | " | " | 51 |
| 439 | (1268) | " | " | 700 | " | " | " | " |
| 440 | (1270) | Cyclohexane | 1 | " | " | 7 | 0.6 | 52 |
| 441 | (1272) | $CCl_4$ | 0.5 | 600 | " | " | " | 54 |
| 442 | (1274) | Cyclohexane | 1 | 500 | " | " | " | " |
| 443 | (1276) | " | " | " | " | " | " | 53 |
| 444 | (1277) | " | " | " | " | " | " | " |
| 445 | (1279) | " | " | 700 | " | " | " | 52 |
| 446 | (1281) | " | " | " | " | " | " | " |
| 447 | (1282) | Cyclohexane | 1 | 500 | 780 | 7 | 0.6 | 52 |
| 448 | (1287) | " | " | " | " | " | " | " |
| 449 | (1288) | " | " | 700 | " | " | " | 51 |
| 450 | (1289) | " | " | 600 | " | " | " | 53 |
| 451 | (1291) | " | " | " | " | " | " | " |
| 452 | (1298) | " | " | 700 | " | " | " | 54 |
| 453 | (1308) | " | " | 500 | " | " | " | 52 |
| 454 | (1309) | Xylene | " | 700 | 740 | 10 | 0.5 | 46 |
| 455 | (1313) | " | " | 600 | " | " | " | " |
| 456 | (1317) | " | " | " | " | " | " | 45 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 457 | (1318) | " | " | 500 | " | " | " | 47 |
| 458 | (1319) | Toluene | " | 700 | " | " | " | " |
| 459 | (1321) | " | " | " | " | " | " | " |
| 460 | (1323) | Xylene | " | 600 | " | " | " | 45 |
| 461 | (1324) | " | " | " | " | " | " | " |
| 462 | (1325) | " | " | 500 | " | " | " | 46 |
| 463 | (1333) | " | " | " | " | " | " | " |
| 464 | (1334) | " | " | 700 | " | " | " | " |
| 465 | (1335) | " | " | 600 | " | " | " | 47 |
| 466 | (1336) | " | " | " | " | " | " | 45 |
| 467 | (1339) | " | " | 700 | " | " | " | " |
| 468 | (1340) | " | " | " | " | " | " | " |
| 469 | (1341) | " | " | 500 | " | " | " | 47 |
| 470 | (1344) | " | " | " | " | " | " | " |
| 471 | (1346) | " | " | 600 | " | " | " | " |
| 472 | (1349) | " | " | 700 | " | " | " | " |
| 473 | (1351) | " | " | 500 | " | " | " | 46 |
| 474 | (1352) | " | " | " | " | " | " | 45 |
| 475 | (1354) | " | " | 600 | " | " | " | " |
| 476 | (1355) | Xylene | 1 | 700 | 740 | 10 | 0.5 | 46 |
| 477 | (1360) | " | " | " | " | " | " | " |
| 478 | (1364) | " | " | 600 | " | " | " | 47 |
| 469 | (1365) | " | " | 500 | " | " | " | " |
| 480 | (1366) | Toluene | " | " | " | " | " | " |
| 481 | (1368) | " | " | 700 | " | " | " | 45 |
| 482 | (1370) | " | " | " | " | " | " | " |
| 483 | (1377) | " | " | 600 | " | " | " | 46 |
| 484 | (1379) | Xylene | " | " | " | " | " | 45 |
| 485 | (1385) | " | " | 500 | " | " | " | 47 |
| 486 | (1392) | " | " | 700 | " | " | " | " |
| 487 | (1396) | $CCl_4$ | 0.5 | " | " | " | " | 46 |
| 488 | (1403) | " | " | 600 | " | " | " | " |
| 489 | (1405) | " | " | " | " | " | " | 47 |
| 490 | (1406) | " | " | 500 | " | " | " | " |
| 491 | (1412) | " | " | " | " | " | " | " |
| 492 | (1414) | Cyclohexane | 1 | " | " | 6 | 0.6 | 45 |
| 493 | (1416) | " | " | 700 | " | " | " | " |
| 494 | (1419) | $CCl_4$ | 0.5 | 500 | " | " | " | " |
| 495 | (1421) | Cyclohexane | 1 | " | " | " | " | 46 |
| 496 | (1423) | " | " | 600 | " | " | " | " |
| 497 | (1425) | " | " | 700 | " | " | " | 47 |
| 498 | (1427) | " | " | " | " | " | " | " |
| 499 | (1429) | " | " | " | " | " | " | 46 |
| 500 | (1430) | " | " | 500 | " | " | " | " |
| 501 | (1432) | " | " | " | " | " | " | 48 |
| 502 | (1434) | " | " | 600 | " | " | " | 44 |
| 503 | (1436) | " | " | " | " | " | " | 45 |
| 504 | (1437) | " | " | " | " | " | " | " |
| 505 | (1439) | Cyclohexane | 1 | 500 | 740 | 6 | 0.6 | 46 |
| 506 | (1446) | " | " | " | " | " | " | 47 |
| 507 | (1453) | " | " | " | " | " | " | " |
| 508 | (1454) | " | " | 600 | " | " | " | " |
| 509 | (1456) | " | " | 700 | " | " | " | 45 |
| 510 | (1458) | $CCl_4$ | 0.5 | " | " | " | " | " |
| 511 | (1460) | " | " | 500 | " | " | " | 46 |
| 512 | (1461) | " | " | 600 | " | " | " | " |
| 513 | (1464) | " | " | " | " | " | " | " |
| 514 | (1467) | " | " | " | " | " | " | 45 |
| 515 | (1468) | Xylene | 1 | 700 | 730 | 10 | 0.5 | " |
| 516 | (1479) | " | " | " | " | " | " | 51 |
| 517 | (1480) | " | " | " | " | " | " | 53 |
| 518 | (1482) | " | " | 600 | " | " | " | 55 |
| 519 | (1517) | " | " | 700 | " | " | " | 51 |
| 520 | (1518) | " | " | " | " | " | " | 53 |
| 521 | (1528) | " | " | " | " | " | " | 51 |
| 522 | (1530) | " | " | 600 | " | " | " | 56 |
| 523 | (1533) | " | " | " | " | " | " | 52 |
| 524 | (1537) | " | " | " | " | " | " | 51 |
| 525 | (1566) | Toluene | " | " | " | " | " | " |
| 526 | (1567) | " | " | 700 | " | " | " | 54 |
| 527 | (1586) | Xylene | " | " | " | " | " | " |
| 528 | (1588) | " | " | 600 | " | " | " | 55 |
| 529 | (1589) | " | " | " | " | " | " | 52 |
| 530 | (1591) | Cyclohexane | " | 500 | " | 7 | 0.6 | 51 |
| 531 | (1593) | " | " | " | " | " | " | 52 |
| 532 | (1595) | " | " | " | " | " | " | " |
| 533 | (1596) | $CCl_4$ | 0.5 | 600 | " | " | " | 53 |
| 534 | (1599) | Cyclohexane | 1 | 500 | 730 | 7 | 0.6 | 51 |
| 535 | (1601) | " | " | 600 | " | " | " | " |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 536 | (1602) | " | " | " | " | " | " | 53 |
| 537 | (1605) | " | " | 700 | " | " | " | 52 |
| 538 | (1607) | " | " | " | " | " | " | " |
| 539 | (1610) | " | " | " | " | " | " | 53 |
| 540 | (1612) | " | " | 600 | " | " | " | 51 |
| 541 | (1615) | $CCl_4$ | 0.5 | 500 | " | " | " | 53 |
| 542 | (1616) | " | " | " | " | " | " | " |
| 543 | (1617) | " | " | " | " | " | " | 52 |
| 544 | (1620) | " | " | 700 | " | " | " | " |
| 545 | (1623) | " | " | 600 | " | " | " | " |
| 546 | (1624) | Xylene | 1 | 700 | 750 | 10 | 0.5 | 53 |
| 547 | (1637) | " | " | 500 | " | " | " | 51 |
| 548 | (1639) | " | " | 700 | " | " | " | 54 |
| 549 | (1640) | " | " | 600 | " | " | " | 52 |
| 550 | (1665) | Toluene | " | " | " | " | " | 51 |
| 551 | (1666) | " | " | 700 | " | " | " | 54 |
| 552 | (1688) | Xylene | " | " | " | " | " | 51 |
| 553 | (1689) | " | " | 500 | " | " | " | 53 |
| 554 | (1696) | " | " | 600 | " | " | " | 51 |
| 555 | (1697) | " | " | " | " | " | " | 56 |
| 556 | (1699) | " | " | " | " | " | " | 52 |
| 557 | (1702) | " | " | 700 | " | " | " | 53 |
| 558 | (1703) | " | " | 600 | " | " | " | 55 |
| 559 | (1713) | " | " | 700 | " | " | " | 51 |
| 560 | (1714) | " | " | 600 | " | " | " | 55 |
| 561 | (1724) | " | " | " | " | " | " | 52 |
| 562 | (1733) | " | " | 500 | " | " | " | " |
| 563 | (1735) | Cyclohexane | 1 | 500 | 750 | 7 | 0.6 | 51 |
| 564 | (1738) | " | " | " | " | " | " | 52 |
| 565 | (1739) | $CCl_4$ | 0.5 | 600 | " | " | " | " |
| 566 | (1742) | Cyclohexane | 1 | " | " | " | " | 53 |
| 567 | (1744) | " | " | 700 | " | " | " | 51 |
| 568 | (1746) | " | " | 500 | " | " | " | " |
| 569 | (1748) | " | " | 700 | " | " | " | 53 |
| 570 | (1750) | " | " | " | " | " | " | " |
| 571 | (1751) | " | " | " | " | " | " | 52 |
| 572 | (1754) | " | " | 600 | " | " | " | " |
| 573 | (1755) | " | " | " | " | " | " | 51 |
| 574 | (1757) | " | " | 500 | " | " | " | 52 |
| 575 | (1758) | " | " | " | " | " | " | 54 |
| 576 | (1760) | " | " | 700 | " | " | " | 51 |
| 577 | (1761) | $CCl_4$ | 0.5 | 600 | " | " | " | " |
| 578 | (1767) | Cyclohexane | 1 | " | " | " | " | 52 |
| 579 | (1775) | " | " | 500 | " | " | " | 53 |
| 580 | (1777) | " | " | 700 | " | " | " | 52 |
| 581 | (1780) | $CCl_4$ | 0.5 | 600 | " | " | " | " |
| 582 | (1781) | " | " | " | " | " | " | 51 |
| 583 | (1782) | " | " | 500 | " | " | " | " |
| 584 | (1785) | " | " | " | " | " | " | 54 |
| 585 | (1788) | " | " | 700 | " | " | " | 52 |
| 586 | (1789) | Xylene | 1 | " | 730 | 10 | 0.5 | 53 |
| 587 | (1796) | " | " | 500 | " | " | " | 51 |
| 588 | (1797) | " | " | 700 | " | " | " | 54 |
| 589 | (1798) | " | " | 600 | " | " | " | 52 |
| 590 | (1800) | Toluene | " | " | " | " | " | 51 |
| 591 | (1842) | " | " | 700 | " | " | " | 54 |
| 592 | (1851) | Xylene | 1 | 700 | 730 | 10 | 0.5 | 51 |
| 593 | (1854) | " | " | 500 | " | " | " | 53 |
| 594 | (1856) | " | " | 600 | " | " | " | 51 |
| 595 | (1857) | " | " | 700 | " | " | " | " |
| 596 | (1861) | " | " | 600 | " | " | " | 55 |
| 597 | (1864) | " | " | " | " | " | " | 56 |
| 598 | (1873) | " | " | 700 | " | " | " | 53 |
| 599 | (1874) | " | " | 600 | " | " | " | 55 |
| 600 | (1876) | " | " | " | " | " | " | 52 |
| 601 | (1881) | " | " | 700 | " | " | " | " |
| 602 | (1889) | " | " | 500 | " | " | " | 51 |
| 603 | (1893) | Cyclohexane | " | 600 | " | 7 | 0.7 | " |
| 604 | (1895) | " | " | 500 | " | " | " | 53 |
| 605 | (1898) | $CCl_4$ | 0.5 | " | " | " | " | " |
| 606 | (1900) | Cyclohexane | 1 | " | " | " | " | 52 |
| 607 | (1902) | " | " | 600 | " | " | " | 53 |
| 608 | (1904) | " | " | " | " | " | " | " |
| 609 | (1906) | " | " | 700 | " | " | " | 51 |
| 610 | (1908) | " | " | " | " | " | " | " |
| 611 | (1909) | " | " | 500 | " | " | " | 52 |
| 612 | (1912) | " | " | 700 | " | " | " | " |
| 613 | (1914) | " | " | " | " | " | " | " |
| 614 | (1915) | " | " | " | " | " | " | 53 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 615 | (1917) | " | " | 600 | " | " | " | " |
| 616 | (1924) | " | " | 500 | " | " | " | 54 |
| 617 | (1932) | " | " | " | " | " | " | 51 |
| 618 | (1934) | " | " | 700 | " | " | " | 52 |
| 619 | (1937) | $CCl_4$ | 0.5 | " | " | " | " | 53 |
| 620 | (1938) | " | " | 600 | " | " | " | " |
| 621 | (1939) | $CCl_4$ | 0.5 | 500 | 730 | 7 | 0.7 | 51 |
| 622 | (1942) | " | " | " | " | " | " | 53 |
| 623 | (1945) | " | " | 600 | " | " | " | " |
| 624 | (1946) | Xylene | 1 | 700 | 780 | 10 | 0.5 | " |
| 625 | (1947) | Toluene | " | 600 | " | " | " | 54 |
| 626 | (1948) | Xylene | " | 500 | " | " | " | 53 |
| 627 | (1949) | " | " | 600 | " | " | " | 55 |
| 628 | (1952) | " | " | 500 | " | " | " | 53 |
| 629 | (1955) | Toluene | " | 600 | " | " | " | 55 |
| 630 | (1957) | Xylene | " | 700 | " | " | " | 54 |
| 631 | (1959) | " | " | " | " | " | " | 53 |
| 632 | (1961) | Toluene | " | 600 | " | " | " | 54 |
| 633 | (1962) | Xylene | " | 700 | " | " | " | 55 |
| 634 | (1964) | " | " | 600 | " | " | " | 52 |
| 635 | (1967) | " | " | 500 | " | " | " | 55 |
| 636 | (1968) | " | " | 600 | " | " | " | 54 |
| 637 | (1971) | " | " | 700 | " | " | " | 52 |
| 638 | (1972) | " | " | " | " | " | " | 55 |
| 639 | (1973) | Toluene | " | 600 | " | " | " | 53 |
| 640 | (1975) | Xylene | " | " | " | " | " | 54 |
| 641 | (1978) | " | " | 500 | " | " | " | 53 |
| 642 | (1979) | " | " | 700 | " | " | " | 54 |
| 643 | (1984) | " | " | 600 | " | " | " | 55 |
| 644 | (1992) | " | " | 700 | " | " | " | 52 |
| 645 | (2008) | " | " | " | " | " | " | 54 |
| 646 | (2014) | " | " | 500 | " | " | " | 52 |
| 647 | (2019) | " | " | 600 | " | " | " | 52 |
| 648 | (2022) | Toluene | " | 700 | " | " | " | 53 |
| 649 | (2028) | Xylene | " | 600 | " | " | " | 52 |
| 650 | (2029) | Xylene | 1 | 600 | 780 | 10 | 0.5 | 54 |
| 651 | (2030) | " | " | 700 | " | " | " | 55 |
| 652 | (2032) | " | " | 500 | " | " | " | 52 |
| 653 | (2033) | " | " | 700 | " | " | " | 54 |
| 654 | (2034) | " | " | 600 | " | " | " | 53 |
| 655 | (2035) | Toluene | " | 700 | " | " | " | 52 |
| 656 | (2044) | Xylene | " | 600 | " | " | " | 53 |
| 657 | (2051) | " | " | " | " | " | " | 54 |
| 658 | (2053) | Toluene | " | 500 | " | " | " | " |
| 659 | (2059) | Xylene | " | 600 | " | " | " | 51 |
| 660 | (2062) | " | " | 700 | " | " | " | 53 |
| 661 | (2070) | " | " | " | " | " | " | 54 |
| 662 | (2074) | " | " | 600 | " | " | " | 52 |
| 663 | (2075) | " | " | " | " | " | " | 55 |
| 664 | (2076) | Cyclohexane | " | 700 | " | 6 | 0.6 | 52 |
| 665 | (2078) | " | " | " | " | " | " | " |
| 666 | (2081) | $CCl_4$ | 0.5 | 500 | " | " | " | 53 |
| 667 | (2083) | Cyclohexane | 1 | 600 | " | " | " | 51 |
| 668 | (2085) | " | " | " | " | " | " | 52 |
| 669 | (2086) | " | " | 500 | " | " | " | 53 |
| 670 | (2089) | " | " | " | " | " | " | " |
| 671 | (2091) | " | " | 700 | " | " | " | 54 |
| 672 | (2092) | " | " | 500 | " | " | " | 53 |
| 673 | (2094) | " | " | " | " | " | " | 52 |
| 674 | (2097) | " | " | " | " | " | " | " |
| 675 | (2099) | " | " | 700 | " | " | " | 51 |
| 676 | (2100) | " | " | 600 | " | " | " | " |
| 677 | (2102) | " | " | " | " | " | " | 53 |
| 678 | (2109) | " | " | 700 | " | " | " | " |
| 679 | (2117) | Cyclohexane | 1 | 600 | 780 | 6 | 0.6 | 52 |
| 680 | (2119) | " | " | 700 | " | " | " | " |
| 681 | (2121) | $CCl_4$ | 0.5 | 600 | " | " | " | 51 |
| 682 | (2122) | " | " | " | " | " | " | 53 |
| 683 | (2125) | " | " | 500 | " | " | " | " |
| 684 | (2128) | " | " | 600 | " | " | " | 52 |
| 685 | (2129) | Xylene | 1 | 700 | 730 | 10 | 0.5 | 53 |
| 686 | (2130) | " | " | " | " | " | " | 54 |
| 687 | (2131) | " | " | " | " | " | " | 51 |
| 688 | (2132) | " | " | 600 | " | " | " | 52 |
| 689 | (2135) | " | " | 700 | " | " | " | 53 |
| 690 | (2138) | " | " | 600 | " | " | " | 55 |
| 691 | (2140) | " | " | 700 | " | " | " | 54 |
| 692 | (2142) | Toluene | " | 500 | " | " | " | 53 |
| 693 | (2144) | Xylene | " | 600 | " | " | " | 54 |

TABLE 2-continued

| Example No. | Compound No. | Solvent | Solution concentration (%) (w/w) | Film thickness (Å) | Laser wavelength (nm) | Laser output (mW) Writing | Laser output (mW) Reading | C/N (dB) |
|---|---|---|---|---|---|---|---|---|
| 694 | (2145) | " | " | 700 | " | " | " | 55 |
| 695 | (2147) | " | " | 600 | " | " | " | 53 |
| 696 | (2150) | " | " | 500 | " | " | " | 55 |
| 697 | (2151) | " | " | 700 | " | " | " | 54 |
| 698 | (2154) | " | " | " | " | " | " | 52 |
| 699 | (2155) | Toluene | " | 600 | " | " | " | 55 |
| 700 | (2157) | Xylene | " | " | " | " | " | 53 |
| 701 | (2159) | " | " | " | " | " | " | 54 |
| 702 | (2162) | " | " | 500 | " | " | " | 53 |
| 703 | (2163) | " | " | 700 | " | " | " | 54 |
| 704 | (2168) | " | " | 600 | " | " | " | 55 |
| 705 | (2176) | " | " | 700 | " | " | " | 54 |
| 706 | (2194) | " | " | " | " | " | " | " |
| 707 | (2200) | " | " | 500 | " | " | " | 52 |
| 708 | (2205) | Xylene | 1 | 700 | 730 | 10 | 0.5 | 52 |
| 709 | (2208) | " | " | 600 | " | " | " | 53 |
| 710 | (2213) | " | " | " | " | " | " | 54 |
| 711 | (2215) | " | " | " | " | " | " | " |
| 712 | (2216) | Toluene | " | 700 | " | " | " | 55 |
| 713 | (2218) | Xylene | " | 600 | " | " | " | 52 |
| 714 | (2220) | " | " | 700 | " | " | " | 54 |
| 715 | (2224) | " | " | 600 | " | " | " | 53 |
| 716 | (2225) | " | " | 500 | " | " | " | 52 |
| 717 | (2233) | " | " | 600 | " | " | " | 53 |
| 718 | (2240) | Toluene | " | " | " | " | " | 54 |
| 719 | (2242) | Xylene | " | 500 | " | " | " | " |
| 720 | (2248) | " | " | 600 | " | " | " | " |
| 721 | (2251) | " | " | 700 | " | " | " | 53 |
| 722 | (2259) | Toluene | " | " | " | " | " | 54 |
| 723 | (2263) | Xylene | " | 600 | " | " | " | 52 |
| 724 | (2264) | " | " | 500 | " | " | " | 55 |
| 725 | (2265) | Cyclohexane | " | 600 | " | 8 | 0.6 | 51 |
| 726 | (2267) | " | " | " | " | " | " | 52 |
| 727 | (2270) | $CCl_4$ | 0.5 | 500 | " | " | " | " |
| 728 | (2272) | Cyclohexane | 1 | 600 | " | " | " | 53 |
| 729 | (2274) | " | " | " | " | " | " | 51 |
| 730 | (2276) | " | " | 700 | " | " | " | " |
| 731 | (2278) | " | " | 500 | " | " | " | " |
| 732 | (2280) | " | " | " | " | " | " | 53 |
| 733 | (2283) | " | " | 600 | " | " | " | 52 |
| 734 | (2285) | " | " | " | " | " | " | " |
| 735 | (2287) | " | " | 700 | " | " | " | " |
| 736 | (2288) | " | " | 600 | " | " | " | 51 |
| 737 | (2290) | Cyclohexane | 1 | 600 | 730 | 8 | 0.6 | 51 |
| 738 | (2297) | " | " | " | " | " | " | 53 |
| 739 | (2305) | " | " | 500 | " | " | " | " |
| 740 | (2307) | " | " | " | " | " | " | 52 |
| 741 | (2310) | $CCl_4$ | 0.5 | 600 | " | " | " | 51 |
| 742 | (2311) | " | " | 700 | " | " | " | " |
| 743 | (2312) | " | " | " | " | " | " | 53 |
| 744 | (2315) | " | " | 500 | " | " | " | 51 |
| 745 | (2318) | " | " | 600 | " | " | " | 52 |
| 746 | (2319) | Xylene | 1 | 750 | " | 10 | 0.5 | " |
| 747 | (2320) | " | " | 600 | " | " | " | 55 |
| 748 | (2324) | " | " | " | " | " | " | 52 |
| 749 | (2327) | " | " | 700 | " | " | " | 51 |
| 750 | (2331) | Toluene | " | 500 | " | " | " | 52 |
| 751 | (2333) | " | " | 700 | " | " | " | " |
| 752 | (2337) | " | " | " | " | " | " | 53 |
| 753 | (2343) | " | " | 750 | " | " | " | " |
| 754 | (2348) | Xylene | " | 650 | " | " | " | " |
| 755 | (2352) | " | " | 500 | " | " | " | 54 |
| 756 | (2395) | " | " | 750 | " | " | " | " |
| 757 | (2398) | " | " | 600 | " | " | " | 53 |
| 758 | (2403) | " | " | 600 | " | " | " | 52 |
| 759 | (2408) | " | " | 750 | " | " | " | 53 |
| 760 | (2412) | Toluene | " | 600 | " | " | " | " |
| 761 | (2415) | " | " | 750 | " | " | " | " |
| 762 | (2419) | $CCl_4$ | 0.5 | 550 | " | " | " | 52 |
| 763 | (2436) | " | " | " | " | " | " | 54 |
| 764 | (2439) | " | " | 700 | " | " | " | " |
| 765 | (2442) | " | " | " | " | " | " | 53 |
| 766 | (2447) | Toluene | 1 | 650 | 730 | 10 | 0.5 | 53 |
| 767 | (2451) | " | " | 600 | " | " | " | " |
| 768 | (2456) | Xylene | " | 750 | " | " | " | 53 |
| 769 | (2459) | " | " | 700 | " | " | " | 54 |
| 770 | (2505) | Toluene | " | 650 | " | " | " | " |
| 771 | (2509) | Xylene | " | 700 | " | " | " | 52 |
| 772 | (2511) | " | " | 500 | " | " | " | " |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 773 | (2515) | Toluene | " | 600 | " | " | " | 53 |
| 774 | (2518) | Xylene | " | " | " | " | " | 52 |
| 775 | (2519) | $CCl_4$ | 0.5 | 700 | " | " | " | 54 |
| 776 | (2521) | " | " | 750 | " | " | " | 53 |
| 777 | (2522) | " | " | 600 | " | " | " | " |
| 778 | (2322) | " | " | 650 | " | " | " | 54 |
| 779 | (2328) | Xylene | 1 | 750 | " | " | " | 53 |
| 780 | (2338) | " | " | 600 | " | " | " | 54 |
| 781 | (2351) | Toluene | " | 700 | " | " | " | " |
| 782 | (2418) | " | " | 750 | " | " | " | 53 |
| 783 | (2437) | " | " | " | " | " | " | 54 |
| 784 | (2454) | " | " | 700 | " | " | " | 53 |
| 785 | (2444) | " | " | 600 | " | " | " | 52 |
| 786 | (2523) | $CCl_4$ | 0.5 | 500 | 780 | " | " | 53 |
| 787 | (2524) | " | " | 600 | " | " | " | 52 |
| 788 | (2526) | " | " | " | " | " | " | 51 |
| 789 | (2528) | " | " | " | " | " | " | " |
| 790 | (2531) | Toluene | 1 | " | " | " | " | 52 |
| 791 | (2535) | Xylene | " | 700 | " | " | " | 53 |
| 792 | (2539) | " | " | " | " | " | " | 54 |
| 793 | (2542) | " | " | 650 | " | " | " | " |
| 794 | (2543) | $CCl_4$ | 0.5 | " | " | " | " | 55 |
| 795 | (2545) | $CCl_4$ | 0.5 | 600 | 780 | 10 | 0.5 | 52 |
| 796 | (2547) | Xylene | 1 | " | " | " | " | 55 |
| 797 | (2550) | $CCl_4$ | 0.5 | " | " | " | " | 53 |
| 798 | (2555) | " | " | 500 | " | " | " | " |
| 799 | (2568) | " | " | 650 | " | " | " | 55 |
| 800 | (2600) | Xylene | 1 | " | " | " | " | 52 |
| 801 | (2606) | $CCl_4$ | 0.5 | 750 | " | " | " | " |
| 802 | (2608) | " | " | 700 | " | " | " | 55 |
| 803 | (2610) | " | " | 650 | " | " | " | 54 |
| 804 | (2611) | " | " | 600 | " | " | " | " |
| 805 | (2613) | Toluene | 1 | 700 | " | " | " | 52 |
| 806 | (2614) | $CCl_4$ | 0.5 | 600 | " | " | " | 54 |
| 807 | (2616) | Xylene | 1 | 650 | " | " | " | 52 |
| 808 | (2618) | " | " | 750 | " | " | " | 54 |
| 809 | (2636) | " | " | 650 | " | " | " | 53 |
| 810 | (2639) | $CCl_4$ | 0.5 | 600 | " | " | " | 54 |
| 811 | (2641) | Toluene | 1 | 650 | " | " | " | 53 |
| 812 | (2643) | $CCl_4$ | 0.5 | 750 | " | " | " | " |
| 813 | (2650) | " | " | 700 | " | " | " | 54 |
| 814 | (2652) | " | " | 750 | " | " | " | 51 |
| 815 | (2656) | Toluene | 1 | 600 | " | " | " | " |
| 816 | (2658) | " | " | 500 | " | " | " | 53 |
| 817 | (2672) | $CCl_4$ | 0.5 | 600 | " | " | " | 52 |
| 818 | (2702) | Xylene | 1 | " | " | " | " | 53 |
| 819 | (2704) | Toluene | " | " | " | " | " | 55 |
| 820 | (2706) | Xylene | " | 600 | " | " | " | 53 |
| 821 | (2707) | " | " | 700 | " | " | " | 54 |
| 822 | (2708) | $CCl_4$ | 0.5 | 650 | " | " | " | 52 |
| 823 | (2713) | Toluene | 1 | 750 | " | " | " | 55 |
| 824 | (2715) | Toluene | 1 | 600 | 780 | 10 | 0.5 | 52 |
| 825 | (2716) | " | " | 750 | " | " | " | 53 |
| 826 | (2717) | $CCl_4$ | 0.5 | 500 | " | " | " | 54 |
| 827 | (2718) | " | " | 700 | " | " | " | " |
| 828 | (2721) | " | " | " | " | " | " | 53 |
| 829 | (2724) | " | " | 650 | " | " | " | " |
| 830 | (2727) | " | " | 600 | " | " | " | 55 |
| 831 | (2730) | Xylene | 1 | 750 | " | " | " | 53 |
| 832 | (2732) | " | " | 600 | " | " | " | " |
| 833 | (2733) | Toluene | " | " | " | " | " | 54 |
| 834 | (2734) | $CCl_4$ | 0.5 | 700 | " | " | " | " |
| 835 | (2737) | Xylene | 1 | " | " | " | " | 52 |
| 836 | (2740) | $CCl_4$ | 0.5 | " | " | " | " | 54 |
| 837 | (2746) | " | " | 750 | " | " | " | " |
| 838 | (2747) | " | " | 700 | " | " | " | 53 |
| 839 | (2750) | Xylene | 1 | 600 | " | " | " | 52 |
| 840 | (2751) | " | " | 500 | " | " | " | 55 |
| 841 | (2755) | Toluene | " | 700 | " | " | " | " |
| 842 | (2771) | $CCl_4$ | 0.5 | 600 | " | " | " | " |
| 843 | (2796) | " | " | " | " | " | " | 54 |
| 844 | (2799) | " | " | 750 | " | " | " | " |
| 845 | (2801) | Xylene | 1 | 700 | " | " | " | 55 |
| 846 | (2802) | $CCl_4$ | 0.5 | " | " | " | " | 54 |
| 847 | (2805) | " | " | 600 | " | " | " | 55 |
| 848 | (2806) | Xylene | 1 | 750 | " | " | " | 52 |
| 849 | (2820) | " | " | 600 | " | " | " | 53 |
| 850 | (2827) | Cyclohexane | " | " | " | " | " | 51 |
| 851 | (2828) | Toluene | " | 750 | " | " | " | 53 |

TABLE 2-continued

| Example No. | Compound No. | Solvent | Solution concentration (%) (w/w) | Film thickness (Å) | Laser wavelength (nm) | Laser output (mW) Writing | Reading | C/N (dB) |
|---|---|---|---|---|---|---|---|---|
| 852 | (2832) | Xlene | " | 600 | " | " | " | 55 |
| 853 | (2839) | Xylene | 1 | 500 | 780 | 10 | 0.5 | 52 |
| 854 | (2841) | $CCl_4$ | 0.5 | 700 | " | " | " | 53 |
| 855 | (2842) | Xylene | 1 | 600 | " | " | " | 52 |
| 856 | (2846) | " | " | " | " | " | " | 54 |
| 857 | (2849) | " | " | 500 | " | " | " | 55 |
| 858 | (2850) | " | " | 600 | " | " | " | " |
| 859 | (2856) | Toluene | " | 700 | " | " | " | 52 |
| 860 | (2891) | " | " | " | " | " | " | 53 |
| 861 | (2893) | Xylene | " | " | " | " | " | 54 |
| 862 | (2896) | " | " | 650 | " | " | " | 55 |
| 863 | (2902) | $CCl_4$ | 0.5 | 700 | " | " | " | 54 |
| 864 | (2904) | " | " | " | " | " | " | " |
| 865 | (2905) | Toluene | 1 | 500 | " | " | " | 53 |

COMPARATIVE EXAMPLE 1

Figure 81A:
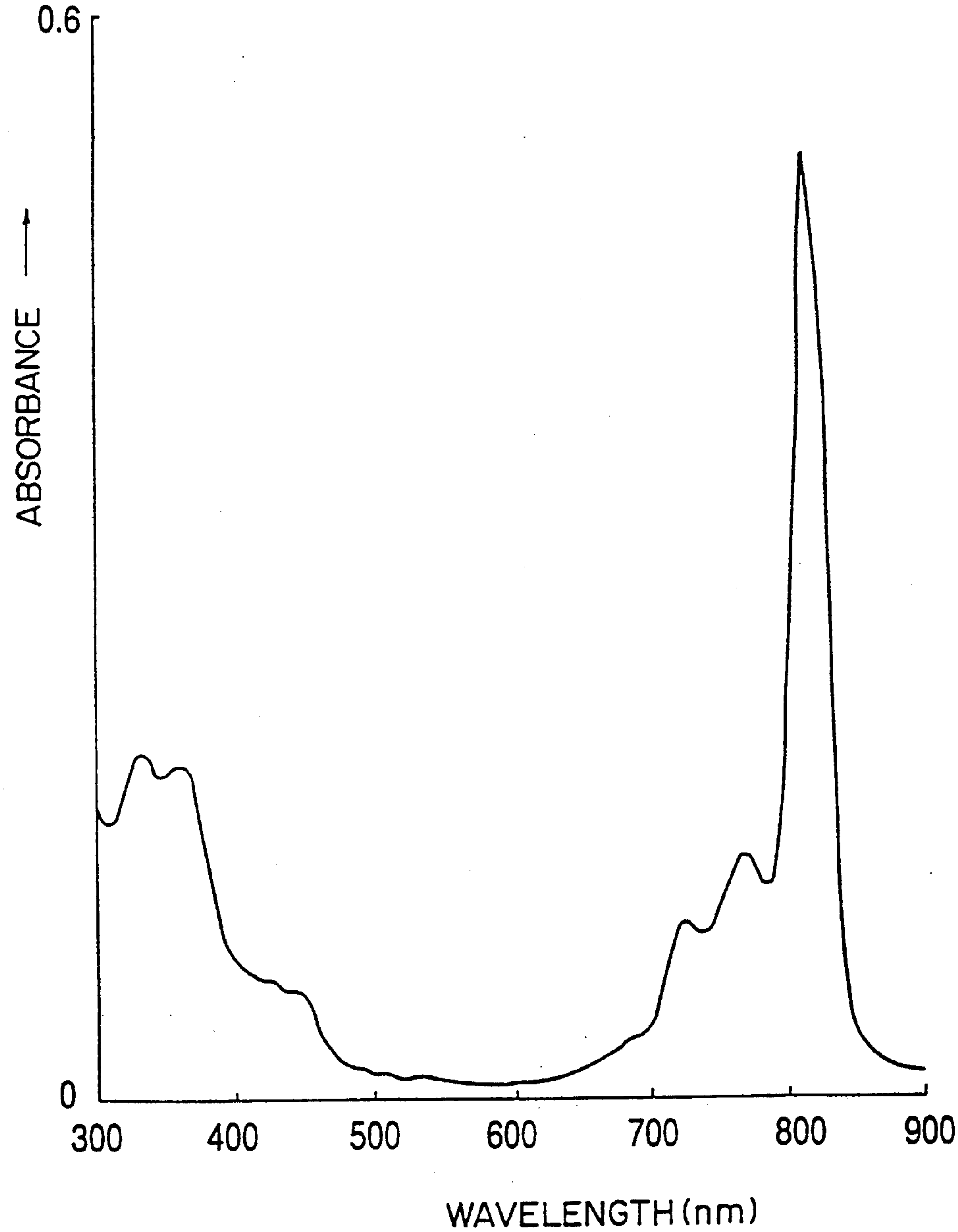
Figure 81B:
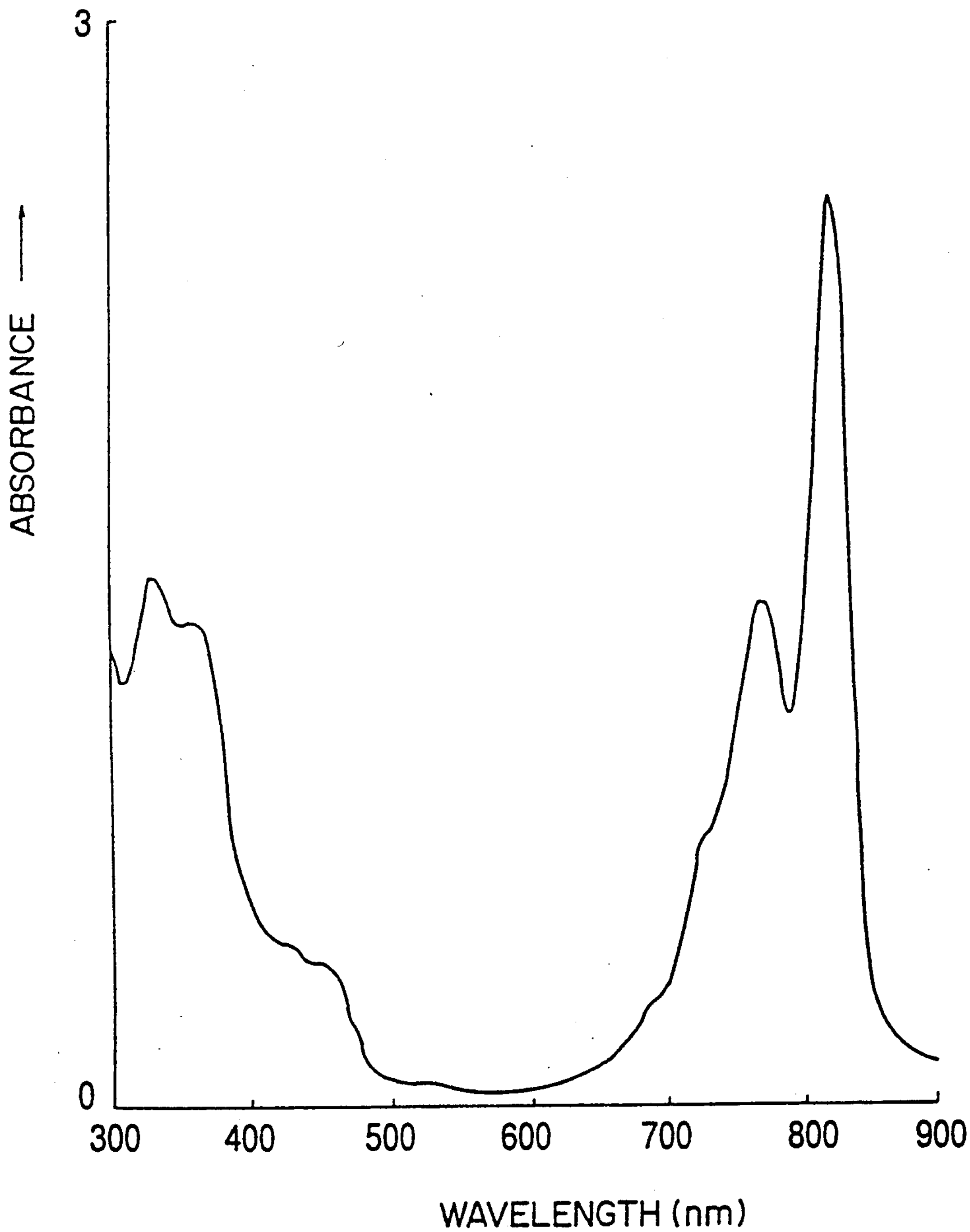
Figure 82:
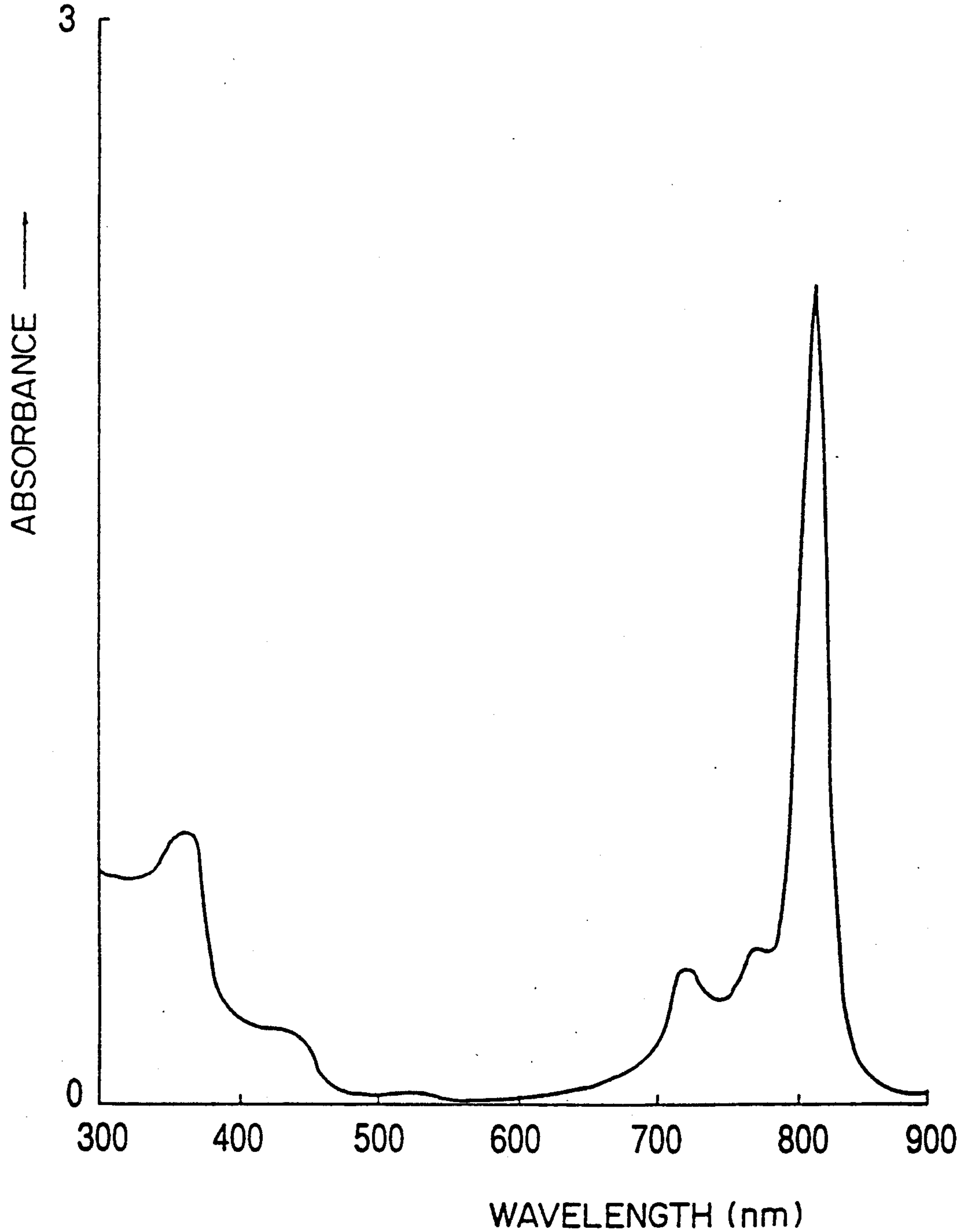

Vanadyl-tetra(t-butyl)naphthalocyanine of the formula:

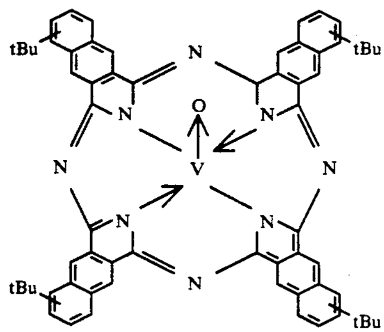

synthesized according to the method described in Zhurnal Obshchei Khimii, vol. 42, p. 696 (1972) disclosed in a chloroform solution was subjected to measurement of electronic spectrum and shown in FIG. 81. The electronic spectrum measured in a benzene solution was shown in FIG. 82. As shown in FIGS. 81 and 82, the absorption curves of this compound depends on kinds of solvents and changes of concentrations. Particularly, when the concentration becomes higher, the absorption near 800 nm is lowered and that of 720 to 730 nm is increased.

COMPARATIVE EXAMPLE 2

Figure 83:
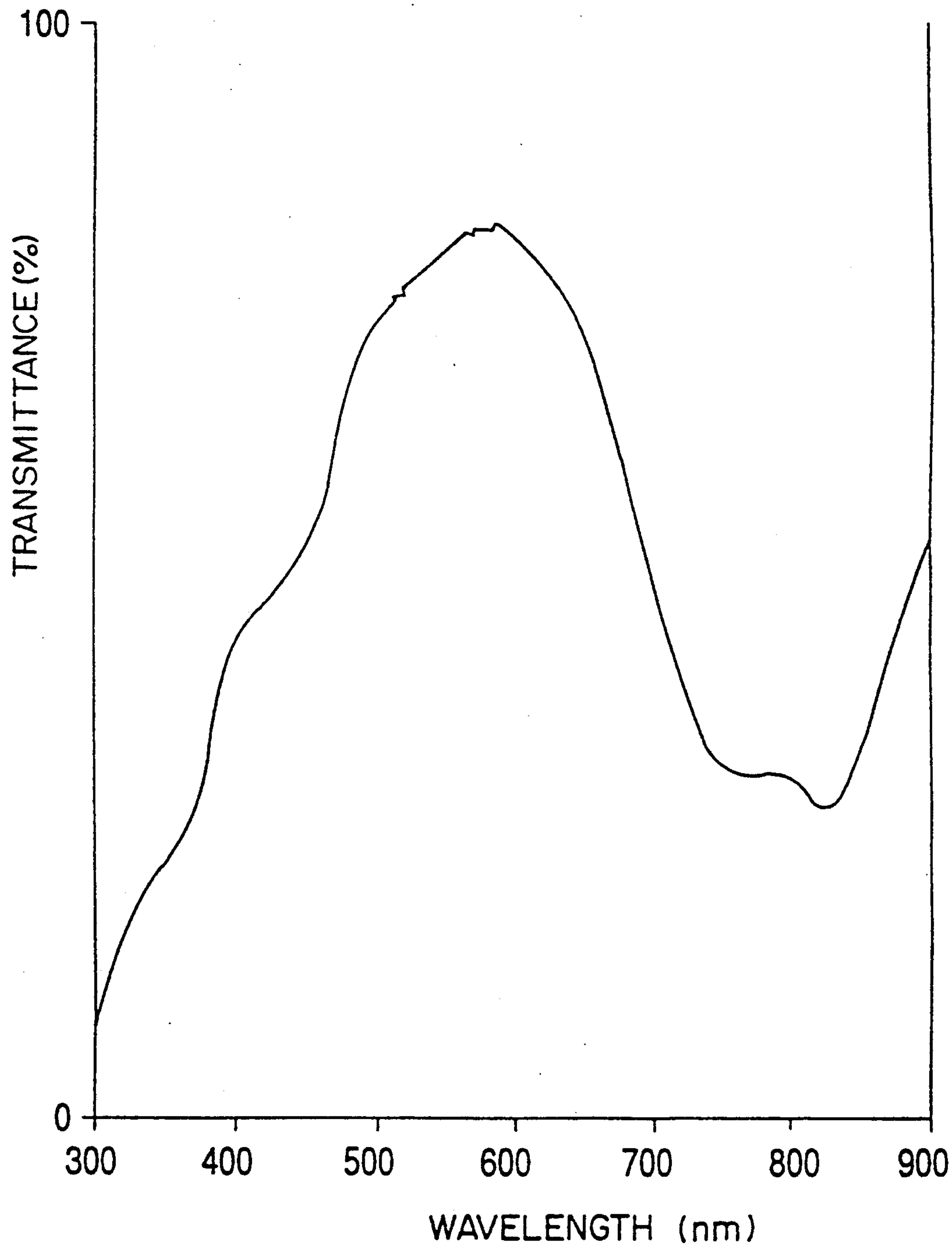
Figure 84:
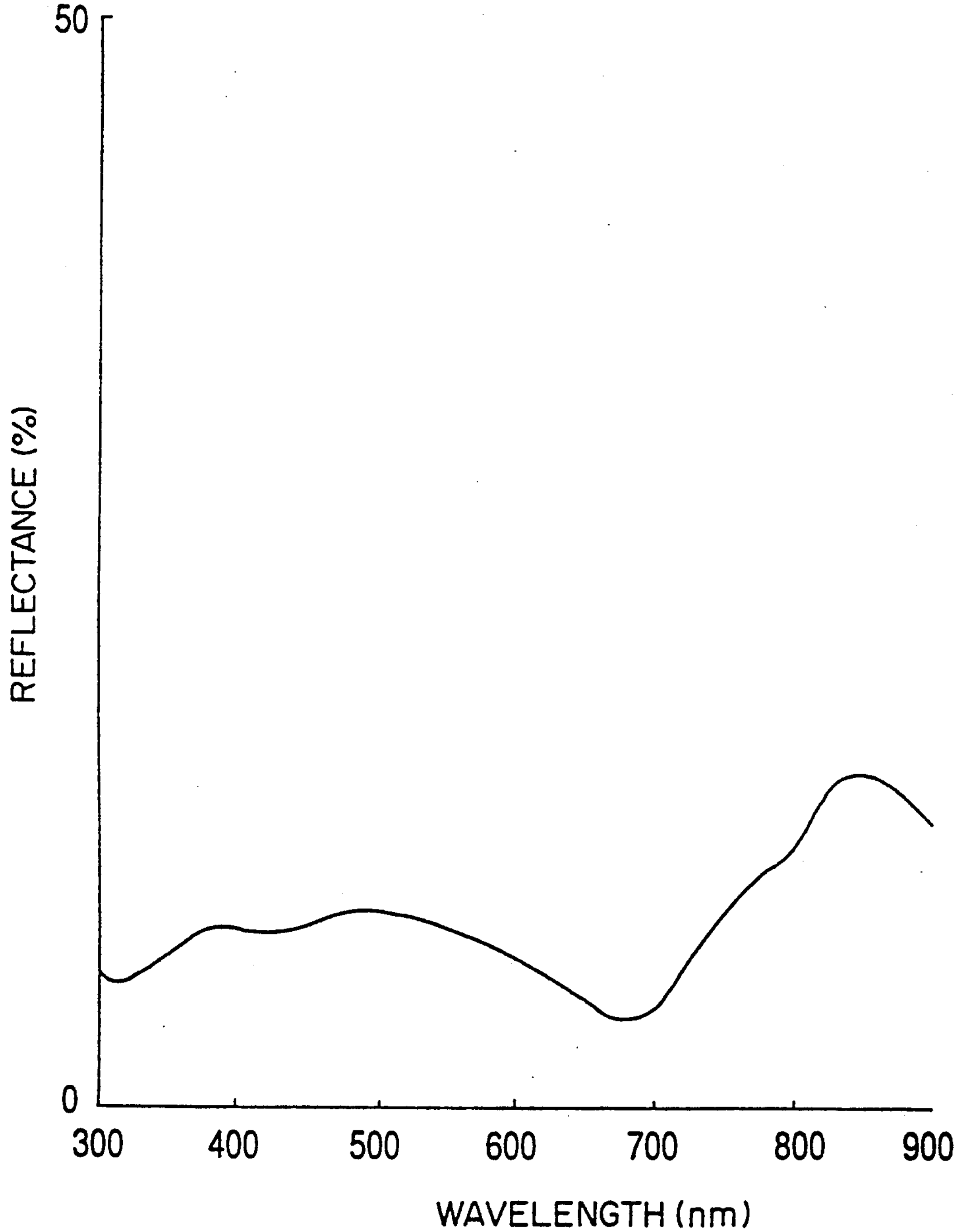

An organic film was formed on a glass plate in the same manner as described in Experiment 9 using the vanadyl-tetra(t-butyl)naphthalocyanine used in Comparative Example 1. This organic film was subjected to measurement of transmission spectrum (FIG. 83) and 5° regular reflection spectrum from the spin coated film side (FIG. 84). As is clear from FIGS. 83 and 84, low absorbing ability and low reflecting ability (20% or less) are observed in the wavelength region of 600 to 850 nm.

COMPARATIVE EXAMPLES 3 to 7

Optical recording media were produced in the same manner as described in Examples 12 to 865 using poly(-methyl methacrylate) 2P substrates having a thickness of 1.2 mm and a diameter of 130 mm and vanadyl-tetra(t-butyl)naphthalocyanine. The C/N was measured and shown in Table 3.

As shown in Comparative Example 2, vanadyl-tetra(t-butyl)naphthalocyanine is low in reflectance (<20%) in the wavelength region of 600 to 850 nm. Thus, the C/N values are low under the above-mentioned measuring conditions.

TABLE 3

| Comparative Example No. | Solvent | Solution concentration (%) (w/w) | Film thickness (Å) | Laser wavelength (nm) | Laser output (mW) Writing | Reading | C/N (dB) |
|---|---|---|---|---|---|---|---|
| 3 | Toluene | 1 | 600 | 780 | 10 | 0.5 | 39 |
| 4 | " | " | " | 750 | " | " | 40 |
| 5 | " | " | " | 730 | " | " | 38 |
| 6 | " | " | " | 670 | " | " | 35 |
| 7 | " | " | " | 650 | " | " | 34 |

COMPARATIVE EXAMPLE 8

Figure 85:
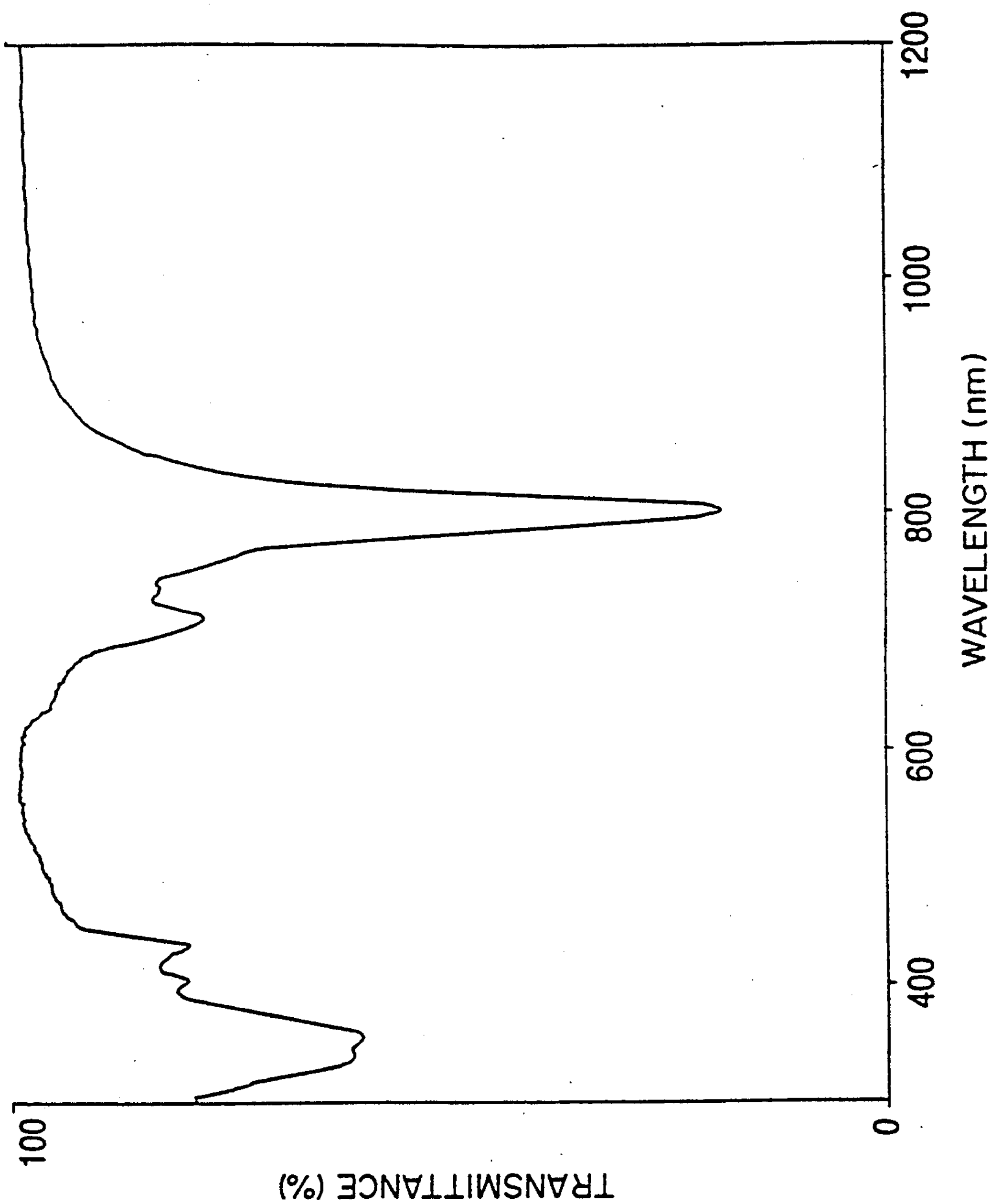
Figure 86:
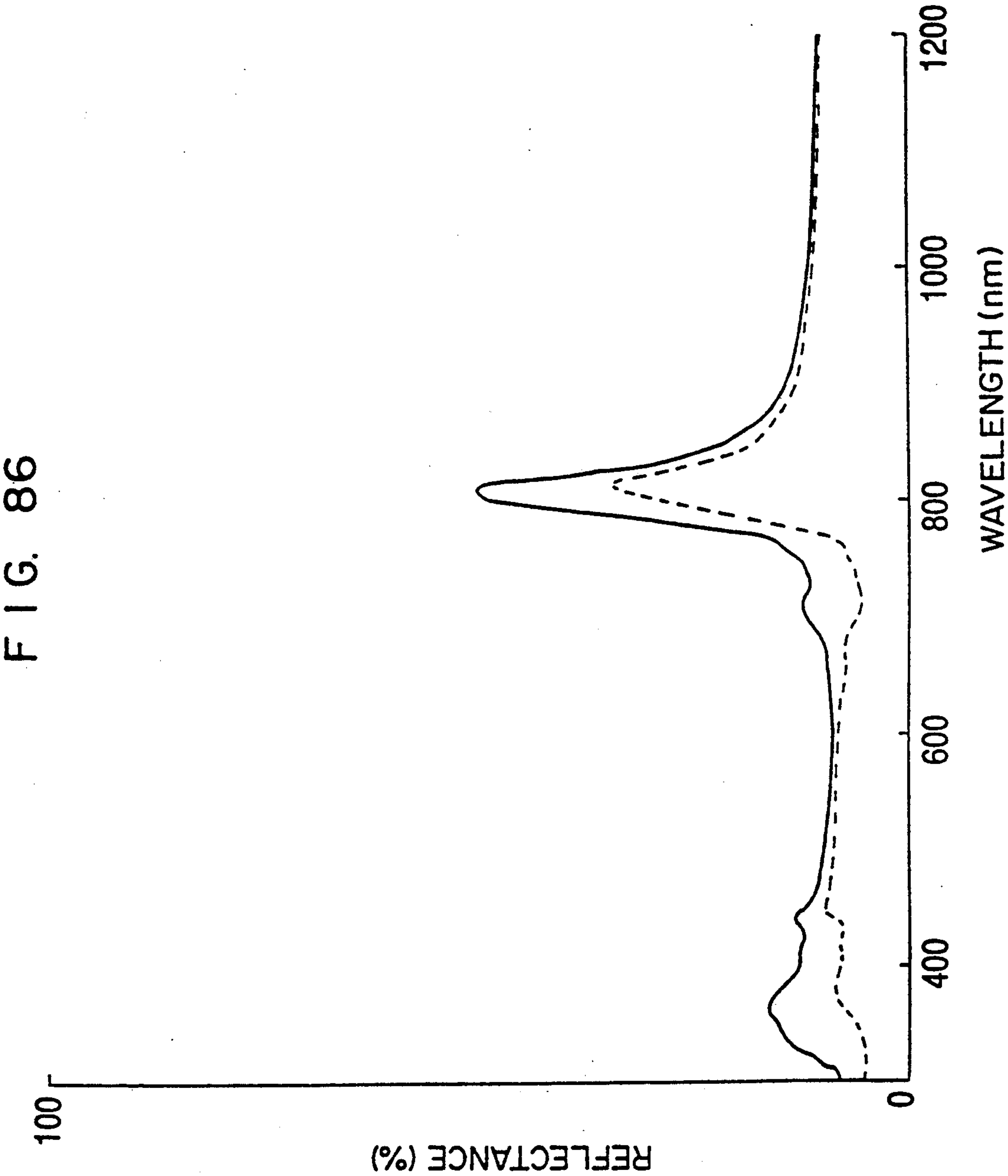

A toluene solution (0.6% (w/w) content) of bis(-trihexylsiloxy)silicon-naphthalocyanine of the formula:

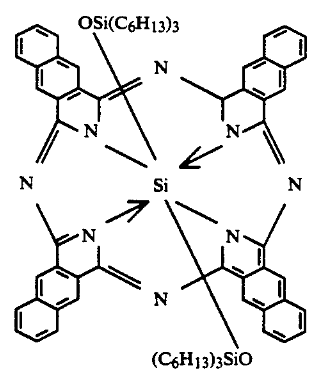

disclosed in U.S. Pat. No. 4,725,525 was spin-coated on a glass substrate and dried at about 80° C. for about 15 minutes to form an organic film. The organic film was subjected to measurement of transmission spectrum (FIG. 85) and 5° regular reflection spectra (FIG. 86) wherein the solid line reveals the spectrum measured from the spin-coated film side and the dotted line the spectrum measured from the substrate side.

This compound shows the reflection maximum of near 820 nm but shows 20% or less reflection in the region of 780 nm or less.

COMPARATIVE EXAMPLES 9 to 13

Optical recording media were produced in the same manner as described in Examples 12 to 865 using poly(-methyl methacrylate) 2P substrates having a thickness of 1.2 mm and a diameter of 130 mm and bis(trihexylsiloxy)silicon-naphthalocyanine used in Comparative Example 8. The C/N was measured and shown in Table 4.

As shown in Comparative Example 8, since this compound has a low reflectance in the region of 780 nm or less, the C/N values are also low.

TABLE 4

| Comparative Example No. | Solvent | Solution concentration (%) (w/w) | Film thickness (Å) | Laser wavelength (nm) | Laser output (mW) Writing | Reading | C/N (dB) |
|---|---|---|---|---|---|---|---|
| 9 | Toluene | 1 | 500 | 780 | 10 | 0.5 | 41 |
| 10 | " | " | " | 750 | " | " | 38 |
| 11 | " | " | " | 730 | " | " | 36 |
| 12 | " | " | " | 670 | " | " | 35 |
| 13 | " | " | " | 650 | " | " | 32 |

EXAMPLES 866 to 1310

Organic solutions (see Table 5) of the tetraazaporphins synthesized in Examples 1 to 11 or synthesized in the same manner as described in Examples 1 to 11 were spin coated on glass substrates of 1.2 mm thick and a diameter of 130 mm and dried at about 80° C. for about 15 minutes to form recording layers.

Recording properties of the thus produced optical recording media were evaluated by irradiating a laser light obtained by adjusting various omission wavelengths using argon ion laser and the like from the glass substrate side. Recording and reading were carried out by using a beam diameter of 1.6 μm.

For evaluating stability for reading light, there was measured R/Ro ratio wherein Ro is a reflectance at an initial time of reading and R is a reflectance after reading $10^6$ times using a reading light of 0.5 mW.

The results are shown in Table 5. As shown in Table 5, the tetraazaporphins of the present invention show high stability for the reading light.

TABLE 5

| Example No. | Compound No. | Solvent | Solution concentration (%) (w/w) | Film thickness (Å) | Laser wavelength (nm) | Laser output (mw) Writing | Linear velocity (m/sec) | $R/R_0$ |
|---|---|---|---|---|---|---|---|---|
| 866 | (1) | 1,1,2-Trichloroethane | 0.5 | 700 | 650 | 6.4 | 0.5 | 1 |
| 867 | (12) | " | " | " | " | 6.9 | " | " |
| 868 | (16) | " | " | 600 | " | 6.6 | " | " |
| 869 | (20) | Chloroform | " | " | " | 9.6 | " | " |
| 870 | (25) | 1,1,2-Trichloroethane | " | 700 | " | 4.6 | " | " |
| 871 | (30) | Dichloroethane | " | 500 | " | 4.4 | " | " |
| 872 | (36) | Toluene | 1 | " | " | 4.9 | " | " |
| 873 | (40) | Xylene | " | 400 | " | 4.2 | " | " |
| 874 | (51) | $CCl_4$ | 0.5 | 600 | " | 7.4 | 5 | " |
| 875 | (60) | Toluene | 1 | 400 | " | 4.5 | 0.5 | " |
| 876 | (94) | Methyl ethyl ketone | " | 600 | " | 4.8 | " | " |
| 877 | (97) | Cyclohexane | " | 500 | " | 5.5 | 2 | " |
| 878 | (113) | " | " | " | " | 6.8 | " | " |
| 879 | (118) | " | " | 600 | " | 7.2 | " | " |
| 880 | (122) | " | " | " | " | 7.3 | " | " |
| 881 | (137) | " | " | 500 | " | 6.5 | " | " |
| 882 | (150) | $CCl_4$ | 0.5 | " | " | 5.7 | " | " |
| 883 | (151) | Toluene | 1 | 700 | 670 | 6.4 | 0.5 | " |
| 884 | (156) | Xylene | " | " | " | " | " | " |
| 885 | (160) | $CCl_4$ | 0.5 | 600 | " | 5.6 | " | " |
| 886 | (163) | Cyclohexane | 1 | " | " | 6.6 | " | " |
| 887 | (200) | $CCl_4$ | 0.5 | 500 | " | 7.2 | " | " |
| 888 | (202) | " | " | 600 | " | 8.1 | " | " |
| 889 | (209) | Toluene | 1 | 500 | " | 7.4 | " | " |
| 890 | (228) | " | " | 700 | " | " | " | " |
| 891 | (233) | Xylene | " | 600 | " | 6.5 | " | " |
| 892 | (248) | 1,1,2-Trichloroethane | 0.5 | 700 | " | 6.4 | " | " |
| 893 | (249) | " | " | " | " | 6.9 | " | " |
| 894 | (252) | " | 1 | 900 | " | 6.6 | " | " |
| 895 | (254) | Chloroform | 0.5 | 500 | 670 | 9.6 | 0.5 | 1 |
| 896 | (256) | 1,1,2-Trichloroethane | " | 700 | " | 4.6 | " | " |
| 897 | (258) | Dichloroethane | " | 500 | " | 4.4 | " | " |
| 898 | (259) | Toluene | 1 | " | " | 4.9 | " | " |
| 899 | (261) | Xylene | " | 400 | " | 4.2 | " | " |
| 900 | (263) | Toluene | " | 600 | " | 7.4 | 5 | " |
| 901 | (265) | " | " | 400 | " | 4.5 | 0.5 | " |
| 902 | (266) | Methyl etyl ketone | " | 600 | " | 4.8 | " | " |
| 903 | (301) | 1,1,2-Trichloroethane | 0.5 | 500 | 630 | 6.4 | " | " |

TABLE 5-continued

| Example No. | Compound No. | Solvent | Solution concen-tration (%) (w/w) | Film thick-ness (Å) | Laser wave-length (nm) | Laser output (mw) Writing | Linear velocity (m/sec) | R/R0 |
|---|---|---|---|---|---|---|---|---|
| 904 | (315) | " | " | 700 | " | 6.9 | " | " |
| 905 | (317) | " | " | " | " | 6.6 | " | " |
| 906 | (322) | Chloroform | " | 600 | " | 9.4 | " | " |
| 907 | (327) | 1,1,2-Trichloroethane | " | 700 | " | 4.8 | " | " |
| 908 | (333) | Dichloroethane | " | 700 | " | 4.6 | " | " |
| 909 | (338) | Toluene | 1 | 500 | " | 4.7 | " | " |
| 910 | (342) | Xylene | " | " | " | 4.5 | " | " |
| 911 | (353) | Toluene | " | 700 | " | 7.6 | 5 | " |
| 912 | (358) | " | " | 500 | " | 4.7 | 0.5 | " |
| 913 | (395) | Methyl ethyl ketone | " | 600 | " | 4.5 | " | " |
| 914 | (397) | Cyclohexane | " | 700 | " | 5.5 | " | " |
| 915 | (399) | " | " | " | " | 7.8 | " | " |
| 916 | (413) | " | " | 500 | " | 6.4 | " | " |
| 917 | (418) | " | " | 600 | " | 5.1 | " | " |
| 918 | (422) | " | " | " | " | 6.3 | " | " |
| 919 | (437) | " | " | " | " | 6.9 | " | " |
| 920 | (439) | " | " | 500 | " | 5.3 | " | " |
| 921 | (443) | $CCl_4$ | 0.5 | " | " | 6.3 | " | " |
| 922 | (444) | " | " | " | " | 7.7 | " | " |
| 923 | (450) | " | " | 700 | " | 8.5 | " | " |
| 924 | (451) | 1,1,2-Trichloroethane | 0.5 | 700 | 670 | 6.2 | 0.5 | 1 |
| 925 | (467) | " | " | 600 | " | 6.6 | " | " |
| 926 | (469) | " | " | 700 | " | 6.8 | " | " |
| 927 | (475) | Chloroform | " | 500 | " | 9.6 | | " |
| 928 | (480) | 1,1,2-Trichlorethane | " | 600 | " | 5.2 | " | " |
| 929 | (482) | Dichloroethane | " | 800 | " | 4.2 | " | " |
| 930 | (495) | Toluene | 1 | 600 | " | 4.6 | " | " |
| 931 | (502) | Xylene | " | 700 | " | 4.2 | " | " |
| 932 | (508) | Toluene | " | " | " | 7.2 | 5 | " |
| 933 | (522) | " | " | 600 | " | 4.5 | 0.5 | " |
| 934 | (539) | Methyl ethyl ketone | " | 500 | " | 4.7 | " | " |
| 935 | (547) | Cyclohexane | " | " | " | 7.1 | " | " |
| 936 | (550) | " | " | 600 | " | 6.5 | " | " |
| 937 | (563) | " | " | 500 | " | 5.7 | " | " |
| 938 | (568) | " | " | " | " | 6.1 | " | " |
| 939 | (570) | " | " | 700 | " | 6.9 | " | " |
| 940 | (572) | " | " | 600 | " | 5.4 | " | " |
| 941 | (589) | " | " | " | " | 6.4 | " | " |
| 942 | (593) | $CCl_4$ | 0.5 | 700 | " | 8.1 | " | " |
| 943 | (594) | " | " | " | " | 7.8 | " | " |
| 944 | (600) | " | " | 500 | " | 6.2 | " | " |
| 945 | (601) | 1,1,2-Trichloroethane | " | 600 | " | 6.6 | " | " |
| 946 | (622) | " | " | " | " | 6.2 | " | " |
| 947 | (629) | " | " | " | " | 6.4 | " | " |
| 948 | (636) | Chloroform | " | 500 | " | 9.2 | " | " |
| 949 | (643) | 1,1,2-Trichloroethane | 1 | 700 | " | 5.4 | " | " |
| 950 | (653) | Dichloroethane | " | " | " | 4.6 | " | " |
| 951 | (669) | Toluene | 1 | " | " | 4.4 | " | " |
| 952 | (678) | Xylene | " | 600 | " | 4.2 | " | " |
| 953 | (683) | Toluene | 1 | 600 | 670 | 7.6 | 5 | 1 |
| 954 | (685) | " | " | " | " | 4.6 | 0.5 | " |
| 955 | (691) | Methyl ethyl keton | " | 700 | " | 4.4 | " | " |
| 956 | (697) | Cyclohexane | " | 600 | " | 6.4 | " | " |
| 957 | (699) | " | " | 500 | " | 7.1 | " | " |
| 958 | (713) | " | " | " | " | 8.3 | " | " |
| 959 | (718) | " | " | 700 | " | 5.7 | " | " |
| 960 | (720) | " | " | " | " | 4.9 | " | " |
| 961 | (722) | " | " | " | " | 6.6 | " | " |
| 962 | (737) | " | " | 500 | " | 5.1 | " | " |
| 963 | (739) | " | " | 600 | " | 6.2 | " | " |
| 964 | (743) | $CCl_4$ | 0.5 | 500 | " | 7.6 | " | " |
| 965 | (744) | " | " | " | " | 6.8 | " | " |
| 966 | (750) | " | " | 700 | " | 6.4 | " | " |
| 967 | (751) | 1,1,2-Trichloroethane | 1 | 900 | " | 7.8 | " | " |
| 968 | (775) | " | 0.5 | 700 | " | 6.4 | " | " |
| 969 | (780) | " | " | 600 | " | 6.6 | " | " |
| 970 | (784) | Chloroform | " | " | " | 9.4 | " | " |
| 971 | (788) | 1,1,2-Trichloroethane | " | 700 | " | 5.4 | " | " |
| 972 | (796) | Dichloroethane | " | 600 | " | 4.4 | " | " |
| 973 | (809) | Toluene | 1 | 500 | " | 4.2 | " | " |
| 974 | (818) | Xylene | " | 600 | " | 4.4 | " | " |
| 975 | (827) | Toluene | " | " | " | 7.5 | " | " |
| 976 | (832) | " | " | 700 | " | 4.2 | " | " |
| 977 | (845) | Methyl ethyl ketone | " | 600 | " | 4.3 | " | " |
| 978 | (847) | Cyclohexane | " | " | " | 7.3 | " | " |
| 979 | (849) | " | " | " | " | 6.7 | " | " |
| 980 | (863) | " | " | 700 | " | 5.5 | " | " |
| 981 | (868) | " | " | 500 | " | 6.2 | " | " |

TABLE 5-continued

| Example No. | Compound No. | Solvent | Solution concentration (%) (w/w) | Film thickness (Å) | Laser wavelength (nm) | Laser output (mw) Writing | Linear velocity (m/sec) | $R/R_0$ |
|---|---|---|---|---|---|---|---|---|
| 982 | (870) | Cyclohexane | 1 | 700 | 670 | 4.7 | 0.5 | 1 |
| 983 | (872) | " | " | " | " | 5.9 | " | " |
| 984 | (887) | " | " | 600 | " | 6.1 | " | " |
| 985 | (889) | " | " | 500 | " | 6.2 | " | " |
| 986 | (893) | $CCl_4$ | 0.5 | " | " | 5.7 | " | " |
| 987 | (894) | " | " | 700 | " | 6.5 | " | " |
| 988 | (900) | " | " | 600 | " | 7.1 | " | " |
| 989 | (901) | Chloroform | " | " | 780 | 7.6 | " | " |
| 990 | (904) | " | 1 | 800 | " | 6.3 | " | " |
| 991 | (933) | " | " | 900 | " | 9.3 | " | " |
| 992 | (945) | " | 0.5 | 700 | " | 8.3 | " | " |
| 993 | (948) | " | " | 500 | " | 5.4 | " | " |
| 994 | (957) | " | " | 600 | " | 9.3 | " | " |
| 995 | (971) | " | 1 | 900 | " | 8.7 | " | " |
| 996 | (976) | " | " | " | " | 7.9 | " | " |
| 997 | (904) | Dichloroethane | 0.5 | 700 | " | 7.6 | " | " |
| 998 | (924) | " | " | 600 | " | 6.7 | " | " |
| 999 | (951) | " | 1 | 900 | " | 5.5 | " | " |
| 1000 | (964) | " | 0.5 | 700 | " | 5.9 | " | " |
| 1001 | (971) | " | 1 | 900 | " | 9.1 | " | " |
| 1002 | (908) | Toluene | " | 700 | " | 6.3 | " | " |
| 1003 | (918) | " | " | 600 | " | 7.2 | " | " |
| 1004 | (957) | " | " | " | " | 5.3 | " | " |
| 1005 | (972) | " | " | 500 | " | 7.3 | " | " |
| 1006 | (904) | " | " | " | " | 6.2 | " | " |
| 1007 | (935) | Chloroform | 0.5 | 600 | " | 5.6 | " | " |
| 1008 | (965) | Methyl ethyl ketone | 1 | 500 | " | 7.3 | " | " |
| 1009 | (980) | " | " | 600 | " | 9.3 | " | " |
| 1010 | (901) | Toluene | " | 700 | " | 6.5 | " | " |
| 1011 | (981) | Cyclohexane | 1 | 700 | 780 | 7.2 | 0.5 | 1 |
| 1012 | (983) | " | " | 600 | " | 5.8 | " | " |
| 1013 | (997) | " | " | 500 | " | 6.7 | " | " |
| 1014 | (1002) | " | " | " | " | 5.9 | " | " |
| 1015 | (1004) | " | " | 600 | " | 7.3 | " | " |
| 1016 | (1006) | " | " | 700 | " | 6.5 | " | " |
| 1017 | (1021) | " | " | " | " | 7.1 | " | " |
| 1018 | (1023) | " | " | 500 | " | 8.2 | " | " |
| 1019 | (1027) | $CCl_4$ | 0.5 | 600 | " | 6.6 | " | " |
| 1020 | (1028) | " | " | 700 | " | 6.2 | " | " |
| 1021 | (1034) | " | " | " | " | 7.2 | " | " |
| 1022 | (1035) | Chloroform | " | " | " | 5.7 | " | " |
| 1023 | (1038) | " | " | 600 | " | 7.3 | " | " |
| 1024 | (1065) | " | 1 | 800 | " | 8.9 | " | " |
| 1025 | (1076) | " | 0.5 | 700 | " | 7.9 | " | " |
| 1026 | (1085) | " | " | 600 | " | 6.3 | " | " |
| 1027 | (1089) | " | " | " | " | 8.3 | " | " |
| 1028 | (1105) | " | 1 | 800 | " | 8.2 | " | " |
| 1029 | (1113) | " | 0.5 | 700 | " | 7.7 | " | " |
| 1030 | (1039) | Dichloroethane | " | 600 | " | 7.3 | " | " |
| 1031 | (1055) | " | " | 700 | " | 6.7 | " | " |
| 1032 | (1081) | " | 1 | 900 | " | 5.6 | " | " |
| 1033 | (1095) | " | 0.5 | 700 | " | 5.9 | " | " |
| 1034 | (1108) | " | 1 | 800 | " | 8.8 | " | " |
| 1035 | (1042) | Toluene | " | 600 | " | 5.9 | " | " |
| 1036 | (1052) | " | " | 500 | " | 7.9 | " | " |
| 1037 | (1087) | " | " | 700 | " | 5.3 | " | " |
| 1038 | (1105) | " | " | 600 | " | 6.9 | " | " |
| 1039 | (1038) | Xylene | " | 700 | " | 6.3 | " | " |
| 1040 | (1069) | Chloroform | 0.5 | 600 | 780 | 5.9 | 0.5 | 1 |
| 1041 | (1097) | Methyl ethyl ketone | 1 | 500 | " | 7.1 | " | " |
| 1042 | (1113) | " | " | 600 | " | 7.3 | " | " |
| 1043 | (1035) | Toluene | " | 500 | " | 5.6 | 5 | " |
| 1044 | (1117) | Cyclohexane | " | 600 | " | 6.4 | 0.5 | " |
| 1045 | (1119) | " | " | " | " | 5.7 | " | " |
| 1046 | (1133) | " | " | 500 | " | 7.3 | " | " |
| 1047 | (1138) | " | " | 700 | " | 5.8 | " | " |
| 1048 | (1140) | " | " | 600 | " | 6.4 | " | " |
| 1049 | (1142) | " | " | " | " | 5.3 | " | " |
| 1050 | (1157) | " | " | 500 | " | 7.8 | " | " |
| 1051 | (1159) | " | " | 700 | " | 6.7 | " | " |
| 1052 | (1161) | $CCl_4$ | 0.5 | 500 | " | 8.1 | " | " |
| 1053 | (1162) | " | " | " | " | 7.2 | " | " |
| 1054 | (1168) | " | " | 600 | " | 5.9 | " | " |
| 1055 | (1169) | Chloroform | 1 | 900 | " | 6.7 | " | " |
| 1056 | (1172) | " | " | " | " | 6.3 | " | " |
| 1057 | (1203) | " | " | 800 | " | 7.6 | " | " |
| 1058 | (1215) | Tetrahydrofuran | " | 700 | " | 6.9 | " | " |
| 1059 | (1227) | Toluene | " | " | " | 7.5 | " | " |

TABLE 5-continued

| Example No. | Compound No. | Solvent | Solution concentration (%) (w/w) | Film thickness (Å) | Laser wavelength (nm) | Laser output (mw) Writing | Linear velocity (m/sec) | R/R0 |
|---|---|---|---|---|---|---|---|---|
| 1060 | (1235) | Chloroform | 0.5 | " | " | 6.7 | " | " |
| 1061 | (1239) | Toluene | 1 | 600 | " | 9.1 | " | " |
| 1062 | (1254) | Chloroform | 0.5 | 700 | " | 9.6 | " | " |
| 1063 | (1173) | Dichloroethane | " | 600 | " | 9.5 | " | " |
| 1064 | (1186) | $CCl_4$ | 1 | 800 | " | 7.3 | " | " |
| 1065 | (1214) | Dichloroethane | " | 900 | " | 8.5 | " | " |
| 1066 | (1231) | Chloroform | 0.5 | 700 | " | 6.7 | " | " |
| 1067 | (1242) | Dichloroethane | 1 | 800 | " | 9.2 | " | " |
| 1068 | (1177) | Toluene | " | 700 | " | 5.9 | " | " |
| 1069 | (1185) | Toluene | 1 | 500 | 780 | 7.6 | 0.5 | 1 |
| 1070 | (1221) | Xylene | " | 700 | " | 5.3 | " | " |
| 1071 | (1251) | " | " | 600 | " | 9.7 | " | " |
| 1072 | (1172) | Toluene | " | 500 | " | 7.3 | " | " |
| 1073 | (1210) | Chloroform | 0.5 | 600 | " | 6.4 | " | " |
| 1074 | (1233) | Methyl ethyl ketone | 1 | 500 | " | 7.1 | " | " |
| 1075 | (1254) | $CCl_4$ | 0.5 | " | " | 8.5 | " | " |
| 1076 | (1169) | Toluene | 1 | 600 | " | 9.2 | 5 | " |
| 1077 | (1252) | Cyclohexane | " | " | " | 6.7 | 0.5 | " |
| 1078 | (1255) | $CCl_4$ | 0.5 | 500 | " | 7.4 | " | " |
| 1079 | (1257) | " | " | 700 | " | 8.1 | " | " |
| 1080 | (1262) | Cyclohexane | 1 | 600 | " | 7.3 | " | " |
| 1081 | (1266) | $CCl_4$ | 0.5 | " | " | 8.3 | " | " |
| 1082 | (1269) | Cyclohexane | 1 | " | " | 5.8 | " | " |
| 1083 | (1282) | " | " | 500 | " | 6.9 | " | " |
| 1084 | (1287) | " | " | " | " | 6.4 | " | " |
| 1085 | (1289) | " | " | 700 | " | 7.5 | " | " |
| 1086 | (1291) | " | " | " | " | 8.3 | " | " |
| 1087 | (1306) | " | " | " | " | 6.1 | " | " |
| 1088 | (1308) | " | " | 600 | " | 7.2 | " | " |
| 1089 | (1309) | Chloroform | 0.5 | 700 | 740 | 6.4 | " | " |
| 1090 | (1325) | " | " | " | " | 6.9 | " | " |
| 1091 | (1333) | " | 1 | 900 | " | 6.6 | " | " |
| 1092 | (1336) | " | 0.5 | 600 | " | 9.6 | " | " |
| 1093 | (1339) | " | " | 700 | " | 4.6 | " | " |
| 1094 | (1340) | Dichloroethane | " | 500 | " | 4.4 | " | " |
| 1095 | (1349) | Chloroform | " | " | " | 4.9 | " | " |
| 1096 | (1352) | " | " | 400 | " | 4.2 | " | " |
| 1097 | (1354) | Toluene | 1 | 600 | " | 7.4 | " | " |
| 1098 | (1355) | Chloroform | 0.5 | 400 | 740 | 4.5 | 0.5 | 1 |
| 1099 | (1361) | Methyl ethyl ketone | 1 | 600 | " | 4.8 | " | " |
| 1100 | (1367) | $CCl_4$ | 0.5 | 500 | " | 6.7 | " | " |
| 1101 | (1405) | " | " | " | " | 7.2 | " | " |
| 1102 | (1414) | Cyclohexane | 1 | 600 | " | 5.9 | " | " |
| 1103 | (1416) | " | " | 700 | " | 6.4 | " | " |
| 1104 | (1430) | " | " | 500 | " | 6.5 | " | " |
| 1105 | (1435) | " | " | 700 | " | 5.7 | " | " |
| 1106 | (1437) | " | " | " | " | 6.3 | " | " |
| 1107 | (1439) | " | " | 600 | " | 7.5 | " | " |
| 1108 | (1454) | " | " | 500 | " | 8.1 | " | " |
| 1109 | (1456) | " | " | " | " | 6.6 | " | " |
| 1110 | (1460) | " | 0.5 | 700 | " | 7.2 | " | " |
| 1111 | (1461) | " | " | 500 | " | 5.2 | " | " |
| 1112 | (1467) | " | " | 600 | " | 6.3 | " | " |
| 1113 | (1468) | 1,1,2-Trichloroethane | " | 500 | 730 | 6.4 | " | " |
| 1114 | (1586) | " | " | 600 | " | 6.9 | " | " |
| 1115 | (1589) | " | " | " | " | 6.6 | " | " |
| 1116 | (1468) | Chloroform | 0.5 | 600 | " | 9.4 | " | " |
| 1117 | (1565) | 1,1,2-Trichloroethane | " | 700 | " | 4.8 | " | " |
| 1118 | (1478) | Dichloroethane | " | " | " | 4.6 | " | " |
| 1119 | (1519) | Toluene | 1 | 500 | " | 4.7 | " | " |
| 1120 | (1530) | Xylene | " | " | " | 4.5 | " | " |
| 1121 | (1481) | Toluene | " | 700 | " | 7.6 | " | " |
| 1122 | (1482) | " | " | 500 | " | 4.7 | " | " |
| 1123 | (1480) | Methyl ethyl ketone | " | " | " | 4.5 | " | " |
| 1124 | (1473) | $CCl_4$ | 0.5 | 600 | " | 6.5 | " | " |
| 1125 | (1564) | Cyclohexane | 1 | " | " | 7.1 | " | " |
| 1126 | (1568) | " | " | 500 | " | 5.3 | " | " |
| 1127 | (1582) | Cyclohexane | 1 | 700 | 730 | 6.7 | 0.5 | 1 |
| 1128 | (1591) | " | " | 600 | " | 7.3 | " | " |
| 1129 | (1593) | " | " | 700 | " | 6.1 | " | " |
| 1130 | (1595) | " | " | " | " | 4.8 | " | " |
| 1131 | (1610) | " | " | 500 | " | 8.3 | " | " |
| 1132 | (1612) | " | " | 600 | " | 7.4 | " | " |
| 1133 | (1616) | $CCl_4$ | 0.5 | 500 | " | 5.6 | " | " |
| 1134 | (1617) | " | " | " | " | 6.2 | " | " |
| 1135 | (1623) | " | " | 700 | " | 7.5 | " | " |
| 1136 | (1624) | 1,1,2-Trichloroethane | 1 | 800 | 750 | 6.4 | " | " |
| 1137 | (1639) | " | 0.5 | 700 | " | 6.9 | " | " |

TABLE 5-continued

| Example No. | Compound No. | Solvent | Solution concen-tration (%) (w/w) | Film thick-ness (Å) | Laser wave-length (nm) | Laser output (mw) Writing | Linear velocity (m/sec) | $R/R_0$ |
|---|---|---|---|---|---|---|---|---|
| 1138 | (1640) | " | " | " | " | 6.6 | " | " |
| 1139 | (1624) | Chloroform | " | 600 | " | 9.4 | " | " |
| 1140 | (1664) | 1,1,2-Trichloroethane | " | 700 | " | 4.8 | " | " |
| 1141 | (1667) | Dichloroethane | " | " | " | 4.6 | " | " |
| 1142 | (1690) | Toluene | 1 | 500 | " | 4.7 | " | " |
| 1143 | (1697) | Xylene | " | " | " | 4.5 | " | " |
| 1144 | (1701) | Toluene | " | 700 | " | 7.6 | 5 | " |
| 1145 | (1714) | " | " | 500 | " | 4.7 | 0.5 | " |
| 1146 | (1702) | Methyl ethyl ketone | " | " | " | 4.5 | " | " |
| 1147 | (1735) | Cyclohexane | " | 600 | " | 5.7 | " | " |
| 1148 | (1737) | " | " | " | " | 6.3 | " | " |
| 1149 | (1751) | " | " | 700 | " | 7.5 | " | " |
| 1150 | (1756) | " | " | 500 | " | 8.1 | " | " |
| 1151 | (1758) | " | " | " | " | 7.2 | " | " |
| 1152 | (1760) | " | " | 700 | " | 9.1 | " | " |
| 1153 | (1775) | " | " | " | " | 6.9 | " | " |
| 1154 | (1777) | " | " | " | " | 5.4 | " | " |
| 1155 | (1781) | $CCl_4$ | 0.5 | 600 | " | 6.8 | " | " |
| 1156 | (1782) | $CCl_4$ | 0.5 | 600 | 750 | 7.7 | 0.5 | 1 |
| 1157 | (1788) | " | " | 500 | " | 5.9 | " | " |
| 1158 | (1789) | 1,1,2-Trichloroethane | 1 | 800 | 730 | 6.4 | " | " |
| 1159 | (1797) | " | 0.5 | 700 | " | 6.9 | " | " |
| 1160 | (1798) | " | " | " | " | 6.6 | " | " |
| 1161 | (1789) | Chloroform | " | 600 | " | 9.4 | " | " |
| 1162 | (1802) | 1,1,2-Trichloroethane | " | 700 | " | 4.8 | " | " |
| 1163 | (1843) | Dichloroethane | " | " | " | 4.6 | " | " |
| 1164 | (1852) | Toluene | 1 | 500 | " | 4.7 | " | " |
| 1165 | (1864) | Xylene | " | " | " | 4.5 | " | " |
| 1166 | (1878) | Toluene | " | 700 | " | 7.6 | " | " |
| 1167 | (1861) | " | " | 500 | " | 4.7 | " | " |
| 1168 | (1873) | Methyl ethyl ketone | " | 600 | " | 4.5 | " | " |
| 1169 | (1893) | Cyclohexane | " | " | " | 5.8 | " | " |
| 1170 | (1895) | " | " | 700 | " | 7.1 | " | " |
| 1171 | (1909) | " | " | 500 | " | 8.2 | " | " |
| 1172 | (1913) | " | " | " | " | 6.4 | " | " |
| 1173 | (1915) | " | " | 600 | " | 7.2 | " | " |
| 1174 | (1917) | " | " | " | " | " | " | " |
| 1175 | (1932) | " | " | 500 | " | 6.3 | " | " |
| 1176 | (1934) | " | " | 700 | " | 5.8 | " | " |
| 1177 | (1938) | $CCl_4$ | 0.5 | " | " | 6.6 | " | " |
| 1178 | (1939) | " | " | 500 | " | 5.4 | " | " |
| 1179 | (1945) | " | " | 600 | " | 7.6 | " | " |
| 1180 | (1946) | Toluene | 1 | " | 780 | " | " | " |
| 1181 | (1949) | Chloroform | " | 800 | " | 6.3 | " | " |
| 1182 | (2019) | 1,1,2-Trichloroethane | " | 900 | " | 7.5 | " | " |
| 1183 | (2028) | Tetrahydrofuran | " | 700 | " | 8.3 | " | " |
| 1184 | (2030) | $CCl_4$ | 0.5 | 500 | " | 5.4 | " | " |
| 1185 | (2047) | Chloroform | 0.5 | 600 | 780 | 6.8 | 0.5 | 1 |
| 1186 | (2060) | Xylene | 1 | 700 | " | 8.7 | " | " |
| 1187 | (2075) | Toluene | " | 600 | " | 7.9 | " | " |
| 1188 | (1950) | Dichloroethane | 0.5 | 700 | " | 7.6 | " | " |
| 1189 | (1969) | " | " | 600 | " | 6.7 | " | " |
| 1190 | (2032) | Toluene | 1 | 500 | " | 5.5 | " | " |
| 1191 | (2037) | Dichloroethane | 0.5 | 700 | " | 5.9 | " | " |
| 1192 | (2060) | Tetrahydrofuran | 1 | 600 | " | 9.1 | " | " |
| 1193 | (1953) | Toluene | " | 700 | " | 6.3 | " | " |
| 1194 | (1963) | " | " | 600 | " | 7.2 | " | " |
| 1195 | (2047) | " | " | " | " | 5.3 | " | " |
| 1196 | (2061) | " | " | 700 | " | 7.3 | " | " |
| 1197 | (1949) | " | " | 600 | " | 6.2 | " | " |
| 1198 | (1984) | " | " | " | " | 5.6 | " | " |
| 1199 | (2038) | " | " | 500 | " | 7.3 | " | " |
| 1200 | (2065) | Xylene | " | 600 | " | 9.3 | " | " |
| 1201 | (1946) | Toluene | " | 700 | " | 6.5 | " | " |
| 1202 | (2076) | Cyclohexane | " | 500 | " | 6.8 | " | " |
| 1203 | (2078) | " | " | " | " | 7.5 | " | " |
| 1204 | (2092) | " | " | 600 | " | 8.1 | " | " |
| 1205 | (2098) | " | " | 700 | " | 7.2 | " | " |
| 1206 | (2100) | " | " | 600 | " | 5.6 | " | " |
| 1207 | (2102) | " | " | 500 | " | 4.8 | " | " |
| 1208 | (2117) | " | " | " | " | 6.5 | " | " |
| 1209 | (2119) | " | " | 600 | " | 7.4 | " | " |
| 1210 | (2121) | $CCl_4$ | 0.5 | " | " | 5.5 | " | " |
| 1211 | (2122) | " | " | " | " | 6.8 | " | " |
| 1212 | (2128) | " | " | 700 | " | 5.7 | " | " |
| 1213 | (2129) | Chloroform | " | " | 730 | 7.6 | " | " |
| 1214 | (2132) | Chloroform | 1 | 800 | 730 | 6.8 | 0.5 | 1 |
| 1215 | (2205) | " | " | 900 | " | 7.5 | " | " |

TABLE 5-continued

| Example No. | Compound No. | Solvent | Solution concentration (%) (w/w) | Film thickness (Å) | Laser wavelength (nm) | Laser output (mw) Writing | Linear velocity (m/sec) | R/R₀ |
|---|---|---|---|---|---|---|---|---|
| 1216 | (2213) | " | 0.5 | 700 | " | 6.4 | " | " |
| 1217 | (2216) | " | " | 500 | " | 5.4 | " | " |
| 1218 | (2236) | " | " | 600 | " | 7.4 | " | " |
| 1219 | (2249) | " | 1 | 900 | " | 8.1 | " | " |
| 1220 | (2264) | " | " | " | " | 7.9 | " | " |
| 1221 | (2133) | Dichloroethane | 0.5 | 700 | " | 7.6 | " | " |
| 1222 | (2152) | " | " | 600 | " | 6.7 | " | " |
| 1223 | (2219) | " | 1 | 900 | " | 5.5 | " | " |
| 1224 | (2226) | Toluene | " | 500 | " | 5.9 | " | " |
| 1225 | (2249) | Dichloroethane | " | 900 | " | 9.1 | " | " |
| 1226 | (2136) | Toluene | " | 700 | " | 6.3 | " | " |
| 1227 | (2146) | " | " | 600 | " | 7.2 | " | " |
| 1228 | (2236) | " | " | 500 | " | 5.3 | " | " |
| 1229 | (2250) | " | " | 600 | " | 7.3 | " | " |
| 1230 | (2132) | Xylene | " | " | " | 6.2 | " | " |
| 1231 | (2168) | Chloroform | 0.5 | 500 | " | 5.6 | " | " |
| 1232 | (2227) | Xylene | 1 | 600 | " | 7.3 | " | " |
| 1233 | (2254) | Toluene | " | " | " | 9.3 | " | " |
| 1234 | (2129) | " | " | 700 | " | 6.5 | 5 | " |
| 1235 | (2265) | Cyclohexane | " | " | " | 7.1 | 0.5 | " |
| 1236 | (2268) | " | " | 600 | " | 5.4 | " | " |
| 1237 | (2285) | " | " | " | " | 4.9 | " | " |
| 1238 | (2287) | " | " | 500 | " | 6.3 | " | " |
| 1239 | (2288) | " | " | 700 | " | 7.4 | " | " |
| 1240 | (2290) | " | " | 600 | " | 5.1 | " | " |
| 1241 | (2305) | " | " | 700 | " | 6.5 | " | " |
| 1242 | (2307) | " | " | 500 | " | 5.8 | " | " |
| 1243 | (2311) | $CCl_4$ | 0.5 | 500 | 730 | 6.1 | 0.5 | 1 |
| 1244 | (2312) | " | " | " | " | 8.5 | " | " |
| 1245 | (2318) | " | " | 600 | " | 7.2 | " | " |
| 1246 | (2319) | Chloroform | " | " | " | 7.3 | " | " |
| 1247 | (2322) | " | 1 | 800 | " | 7.2 | " | " |
| 1248 | (2350) | " | 0.5 | 700 | " | 9.5 | " | " |
| 1249 | (2403) | " | " | 600 | " | 7.6 | " | " |
| 1250 | (2405) | " | " | " | " | 6.3 | " | " |
| 1251 | (2415) | " | " | 700 | " | 8.9 | " | " |
| 1252 | (2449) | " | 1 | 850 | " | 9.1 | " | " |
| 1253 | (2513) | " | " | 800 | " | 8.2 | " | " |
| 1254 | (2322) | Dichloroethane | " | " | " | 8.3 | " | " |
| 1255 | (2340) | " | 0.5 | 700 | " | 7.3 | " | " |
| 1256 | (2408) | " | 1 | 800 | " | 7.1 | " | " |
| 1257 | (2437) | " | 0.5 | 600 | " | 7.4 | " | " |
| 1258 | (2517) | " | 1 | 800 | " | 8.7 | " | " |
| 1259 | (2325) | Toluene | " | 600 | " | 6.9 | " | " |
| 1260 | (2335) | " | " | 700 | " | 7.7 | " | " |
| 1261 | (2415) | " | " | 600 | " | 6.9 | " | " |
| 1262 | (2474) | " | " | " | " | 7.6 | " | " |
| 1263 | (2319) | " | " | " | " | 6.2 | " | " |
| 1264 | (2384) | " | " | 500 | " | 6.3 | " | " |
| 1265 | (2420) | Methyl ethyl ketone | " | " | " | 7.6 | " | " |
| 1266 | (2513) | " | " | 600 | " | 9.2 | " | " |
| 1267 | (2319) | Toluene | " | 700 | " | 7.3 | " | " |
| 1268 | (2523) | Chloroform | 0.5 | " | 780 | 7.5 | " | " |
| 1269 | (2524) | " | 1 | 750 | " | 6.9 | " | " |
| 1270 | (2560) | " | " | 800 | " | 9.4 | " | " |
| 1271 | (2577) | " | 0.5 | 700 | " | 7.7 | " | " |
| 1272 | (2608) | Chloroform | 0.5 | 600 | 780 | 6.1 | 0.5 | 1 |
| 1273 | (2614) | " | " | 700 | " | 9.2 | " | " |
| 1274 | (2639) | " | " | 500 | " | 8.7 | " | " |
| 1275 | (2655) | " | " | " | " | 8.0 | " | " |
| 1276 | (2527) | Tetrahydrofuran | 1 | 700 | " | 7.9 | " | " |
| 1277 | (2546) | " | " | 500 | " | 6.9 | " | " |
| 1278 | (2610) | Xylene | " | 600 | " | 7.2 | " | " |
| 1279 | (2631) | " | " | 700 | " | 7.1 | " | " |
| 1280 | (2672) | " | " | 600 | " | 8.5 | " | " |
| 1281 | (2531) | Toluene | " | 700 | " | 7.1 | " | " |
| 1282 | (2541) | " | " | " | " | 7.7 | " | " |
| 1283 | (2614) | " | " | 600 | " | 6.4 | " | " |
| 1284 | (2708) | " | " | 650 | " | 7.7 | " | " |
| 1285 | (2525) | Chloroform | 0.5 | " | " | 6.6 | " | " |
| 1286 | (2600) | " | " | 600 | " | 6.7 | " | " |
| 1287 | (2648) | Methyl ethyl ketone | 1 | " | " | 8.1 | " | " |
| 1288 | (2658) | " | " | 500 | " | 9.4 | " | " |
| 1289 | (2525) | Toluene | " | 700 | " | 6.9 | " | " |
| 1290 | (2717) | Chloroform | 0.5 | 500 | " | 7.8 | " | " |
| 1291 | (2719) | " | " | 700 | " | 6.7 | " | " |
| 1292 | (2763) | " | " | 600 | " | 9.3 | " | " |
| 1293 | (2784) | " | " | 650 | " | 8.3 | " | " |

TABLE 5-continued

| Example No. | Compound No. | Solvent | Solution concentration (%) (w/w) | Film thickness (Å) | Laser wavelength (nm) | Laser output (mw) Writing | Linear velocity (m/sec) | $R/R_0$ |
|---|---|---|---|---|---|---|---|---|
| 1294 | (2800) | " | " | 700 | " | 6.3 | " | " |
| 1295 | (2816) | " | " | 600 | " | 9.1 | " | " |
| 1296 | (2835) | " | " | " | " | 8.7 | " | " |
| 1297 | (2847) | " | " | 550 | " | 7.8 | " | " |
| 1298 | (2739) | Tetrahydrofuran | 1 | 600 | " | 7.0 | " | " |
| 1299 | (2802) | Xylene | " | 650 | " | 7.1 | " | " |
| 1300 | (2806) | " | " | 700 | " | 6.9 | " | " |
| 1301 | (2864) | Xylene | 1 | 550 | 780 | 9.2 | 0.5 | 1 |
| 1302 | (2727) | Toluene | " | 700 | " | 7.3 | " | " |
| 1303 | (2735) | " | " | " | " | 7.6 | " | " |
| 1304 | (2809) | " | " | " | " | 6.2 | " | " |
| 1305 | (2848) | " | " | 600 | " | 7.1 | " | " |
| 1306 | (2717) | " | " | " | " | 7.2 | " | " |
| 1307 | (2790) | " | " | 500 | " | 7.1 | " | " |
| 1308 | (2837) | Methyl ethyl ketone | " | 700 | " | 7.4 | " | " |
| 1319 | (2901) | " | " | " | " | 9.3 | " | " |
| 1310 | (2722) | Toluene | " | 600 | " | 7.3 | 5 | " |

COMPARATIVE EXAMPLES 14 TO 19

Recording layers are formed in the same manner as described in Examples 866 to 1310 using organic solvent solutions of cyanine dyes (mfd. by Nippon Kankoh-Shikiso Kenkyusho Co., Ltd.) as listed in Table 6.

The stability for reading light was evaluated in the same manner as described in Examples 866 to 1310.

The results are shown in Table 6. As is clear. from Table 6, the cyanine dyes are remarkably poor in stability for reading light.

TABLE 6

| Comparative Example No. | Compound name | Solvent | Solution concentration (%) (w/w) | Film thickness (Å) | Laser wavelength (nm) | Laser output (mW) Writing | Linear velocity (m/sec) | $R/R_0$ |
|---|---|---|---|---|---|---|---|---|
| 14 | NK-2905 | Dichloroethane | 0.5 | 600 | 780 | 5.2 | 0.5 | 0.7 |
| 15 | NK-1760 | " | " | 500 | 750 | 4.8 | " | " |
| 16 | NK-1805 | " | " | 600 | 730 | 5.2 | " | 0.6 |
| 17 | NK-1841 | " | " | " | 670 | 5.5 | " | " |
| 18 | NK-1757 | " | " | 600 | 640 | 5.4 | " | " |

TABLE 6-continued

| Comparative Example No. | Compound name | Solvent | Solution concentration (%) (w/w) | Film thickness (Å) | Laser wavelength (nm) | Laser output (mW) Writing | Linear velocity (m/sec) | $R/R_0$ |
|---|---|---|---|---|---|---|---|---|
| 19 | NK-2029 | " | " | 500 | 730 | 5.2 | " | 0.5 |

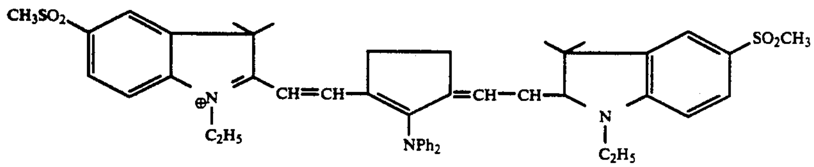

NK-2905

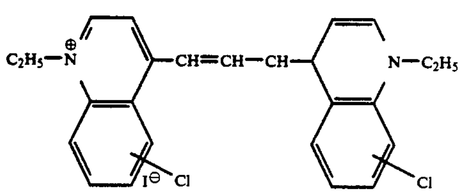

NK-1760

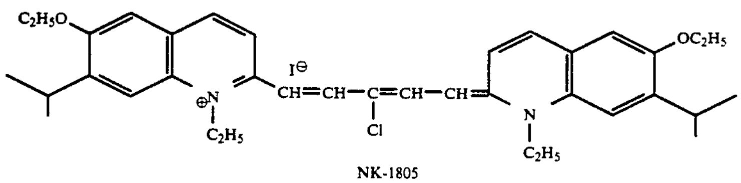

NK-1805

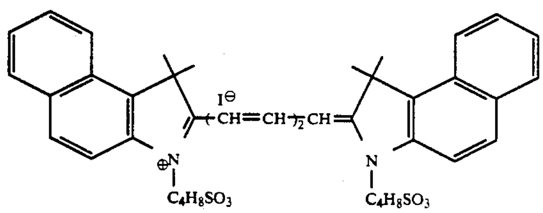

NH-1841

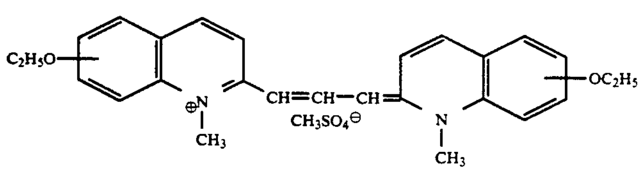

NK-1757

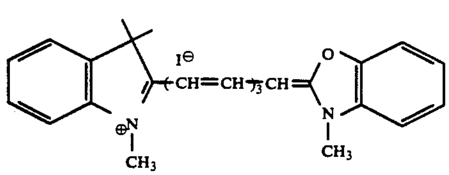

NK-2029

EXAMPLES 1311 TO 1362

Organic solutions (see Table 7) of the tetraazaporphins synthesized in Examples 1 to 11 or synthesized in the same manner as described in Examples 1 to 11 were spin-coated on glass substrates of 1.2 mm thick and 130 mm diameter and dried at about 80° C. for about 15 minutes to form recording layers.

The stability for reproducing light of the thus produced optical recording media was evaluated in the same manner as described in Examples 866 to 1310.

The results are shown in Table 7. As shown in Table 7, the tetrazaporphins of the present invention show high stability for the reading light.

TABLE 7

| Example No. | Recording layer forming material: Compound No. | Recording layer forming material: Binder | Solvent | Concentration (%) (w/w) (Compound/binder) | Film thickness (Å) | Laser wave-length (nm) | Laser output (mw) writing | Linear velocity (m/sec) | $R/R_0$ |
|---|---|---|---|---|---|---|---|---|---|
| 1311 | (20) | Polystyrene | Chloroform | (1/1) | 1500 | 650 | 9.6 | 0.5 | 1 |
| 1312 | (94) | " | Methyl ethyl ketone | (2/1) | 1600 | " | 4.8 | " | " |
| 1313 | (254) | " | Chloroform | (1/1) | 1500 | 670 | 9.6 | " | " |
| 1314 | (266) | " | Methyl ethyl ketone | (2/1) | 1600 | " | 4.8 | " | " |
| 1315 | (322) | " | Chloroform | (1/1) | " | 630 | 9.4 | " | " |
| 1316 | (395) | " | Methyl ethyl ketone | (2/1) | " | " | 4.5 | " | " |
| 1317 | (475) | " | Chloroform | (1/1) | 1800 | 670 | 9.6 | " | " |
| 1318 | (539) | " | Methyl ethyl ketone | (2/1) | 1500 | " | 4.7 | " | " |
| 1319 | (636) | " | Chloroform | (1/1) | " | " | 9.2 | " | " |
| 1320 | (691) | " | Methyl ethyl ketone | (2/1) | 1700 | " | 4.4 | " | " |
| 1321 | (784) | " | Chloroform | (1/1) | 1600 | " | 9.4 | " | " |
| 1322 | (845) | " | Methyl ethyl ketone | (2/1) | " | " | 4.3 | " | " |
| 1323 | (904) | " | Chloroform | (1/1) | 1400 | 780 | 6.2 | " | " |
| 1324 | (935) | " | " | " | 1300 | " | 5.6 | " | " |
| 1325 | (965) | " | Methyl ethyl ketone | (2/1) | 1500 | " | 7.3 | " | " |
| 1326 | (980) | " | " | (3/1) | 1400 | " | 9.3 | " | " |
| 1327 | (1038) | " | Chloroform | (1/1) | 1300 | " | 6.3 | " | " |
| 1328 | (1069) | " | " | " | 1500 | " | 5.9 | " | " |
| 1329 | (1097) | " | Methyl ethyl ketone | (2/1) | 1400 | " | 7.1 | " | " |
| 1330 | (1113) | " | " | (3/1) | 1300 | " | 7.3 | " | " |
| 1331 | (1172) | " | Chloroform | (1/1) | " | " | " | " | " |
| 1332 | (1210) | Polystyrene | Chloroform | (1/1) | 1500 | 780 | 6.4 | 0.5 | 1 |
| 1333 | (1233) | " | Methyl ethyl ketone | (2/1) | 1400 | " | 7.1 | " | " |
| 1334 | (1254) | " | " | (3/1) | 1300 | " | 8.5 | " | " |
| 1335 | (1336) | " | Chloroform | (1/1) | 1500 | 740 | 9.6 | " | " |
| 1336 | (1361) | " | Methyl ethyl ketone | (2/1) | 1600 | " | 4.8 | " | " |
| 1337 | (1468) | " | Chloroform | (1/1) | " | 730 | 9.4 | " | " |
| 1338 | (1480) | " | Methyl ethyl ketone | (2/1) | " | " | 4.5 | " | " |
| 1339 | (1624) | " | Chloroform | (1/1) | " | 750 | 9.4 | " | " |
| 1340 | (1702) | " | Methyl ethyl ketone | (2/1) | " | " | 4.5 | " | " |
| 1341 | (1789) | " | Chloroform | (1/1) | " | 730 | 9.4 | " | " |
| 1342 | (1873) | " | Methyl ethyl ketone | (2/1) | 1400 | " | 4.5 | " | " |
| 1343 | (1949) | " | Chloroform | (1/1) | " | 780 | 6.2 | " | " |
| 1344 | (1984) | " | " | " | 1300 | " | 5.6 | " | " |
| 1345 | (2038) | " | Toluene | (2/1) | 1500 | " | 7.3 | " | " |
| 1346 | (2065) | " | Xylene | (3/1) | 1400 | " | 9.3 | " | " |
| 1347 | (2132) | " | " | (1/1) | " | 730 | 6.2 | " | " |
| 1348 | (2168) | " | Chloroform | " | 1300 | " | 5.6 | " | " |
| 1349 | (2277) | " | Xylene | (2/1) | 1500 | " | 7.3 | " | " |
| 1350 | (2254) | " | Toluene | (3/1) | 1400 | " | 9.3 | " | " |
| 1351 | (2319) | " | Chloroform | (1/1) | " | " | 6.2 | " | " |
| 1352 | (2384) | " | " | " | 1100 | " | 6.3 | " | " |
| 1353 | (2420) | Polystyrene | Methyl ethyl ketone | (2/1) | 1400 | 730 | 7.6 | 0.5 | 1 |
| 1354 | (2513) | " | " | (3/1) | 1200 | " | 9.2 | " | " |
| 1355 | (2525) | " | Chloroform | (1/1) | " | 780 | 6.6 | " | " |
| 1356 | (2600) | " | " | " | " | " | 6.7 | " | " |
| 1357 | (2648) | " | Methyl ethyl ketone | (2/1) | 1300 | " | 8.1 | " | " |
| 1358 | (2658) | " | " | (3/1) | 1100 | " | 9.4 | " | " |
| 1359 | (2717) | " | Chloroform | (1/1) | " | " | 7.2 | " | " |
| 1360 | (2790) | " | " | " | " | " | 7.1 | " | " |
| 1361 | (2837) | " | Methyl ethyl ketone | (2/1) | 1400 | " | 7.4 | " | " |
| 1362 | (2901) | " | " | (3/1) | 1300 | " | 9.3 | " | " |

As mentioned above, the tetraazaporphins of the present invention are useful as materials for forming recording layers in optical recording media, or organic photoconducting materials, liquid crystal display materials, etc.

Particularly, the tetraazaporphins of the present invention are effective as recording layers in optical recording media using laser light in the wavelength region of 800 nm or less for recording and reading out, and more effective as recording layers in write once type optical recording media.

What is claimed is:

1. A tetraazaporphin represented by the formula:

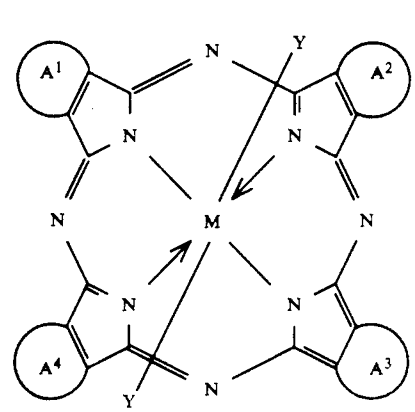

(1)

wherein M is Si, Ge or Sn; Y is an aryloxy group, an alkoxy group, a trialkylsiloxy group, a triarylsiloxy group, a trialkoxysiloxy group, a triaryloxysiloxy group, a trityloxy group or an acyloxy group, and two Y's may be the same or different; $A^1$, $A^2$, $A^3$ and $A^4$ are independently selected from the group consisting of

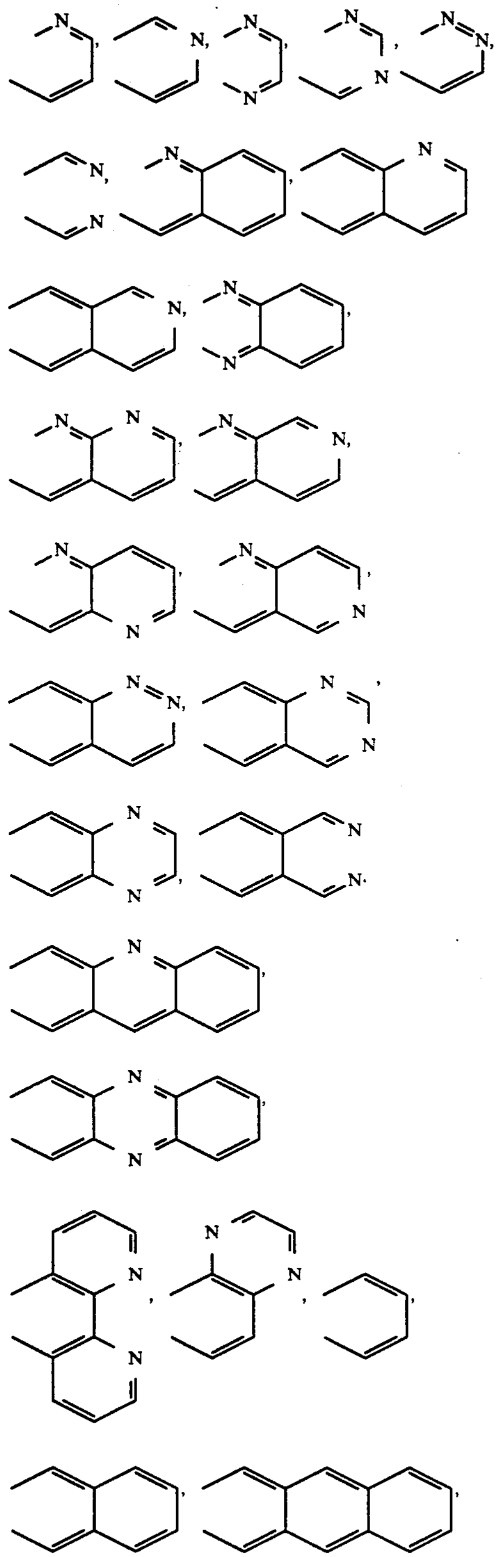

-continued

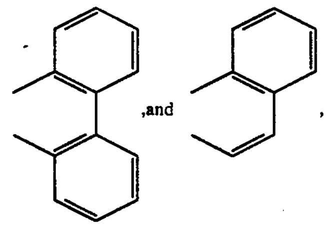

at least one of $A^1$, $A^2$, $A^3$ and $A^4$ is nitrogen-containing aromatic ring selected from the group consisting of

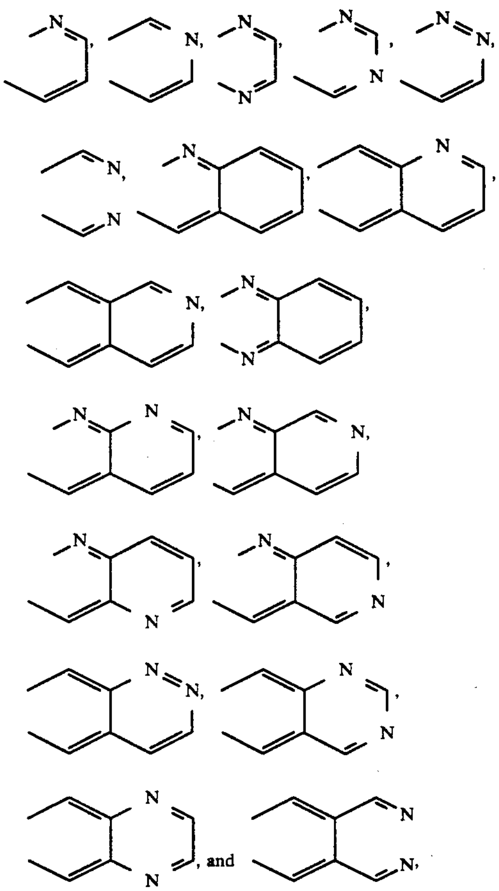

and $A^1$, $A^2$, $A^3$ and $A^4$ may have independently one or more organic substituents selected from the group consisting of —$R^1$,
—$OR^2$,
—$SiR^3R^4R^5$,
—$SO_2NR^6R^7$,
—$COR^8$,
—$COOR^9$,
—$OCOR^{10}$,
—$COHNR^{11}$,
—$NR^{12}R^{13}$,
—$SR^{14}$,
—$SO_2R^{15}$, and
—$X^1$, wherein $R^1$ to $R^{15}$ are independently a hydrogen atom, an alkyl group which may have one or more substituents, or an aryl group; and $X^1$ is a halogen atom.

2. A tetraazaporphin according to claim 1, wherein M is Si or Ge.

3. A tetraazaporphin according to claim 1, wherein two Y's are trialkylsiloxy groups.

4. A tetraazaporphin according to claim 1, wherein $A^1$, $A^2$, $A^3$ and $A^4$ are nitrogen-containing aromatic rings.

5. A tetraazaporphin according to claim 1, wherein all the $A^1$, $A^2$, $A^3$ and $A^4$ are the same nitrogen-containing aromatic rings.

6. A tetraazaporphin according to claim 4, wherein $A^1$, $A^2$, $A^3$ and $A^4$ are nitrogen-containing aromatic rings selected from the group consisting of

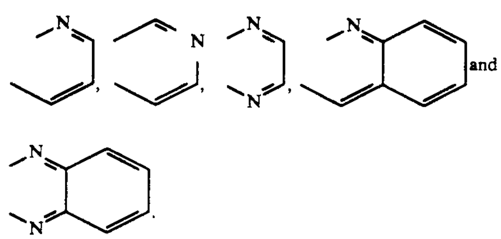

7. A tetraazaporphin according to claim 1, which is represented by the formula:

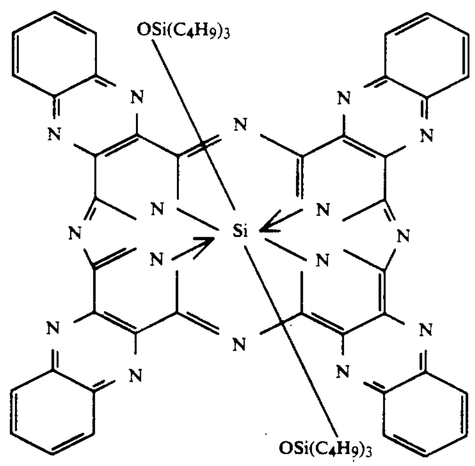

8. A tetraazaporphin according to claim 1, which is represented by the formula:

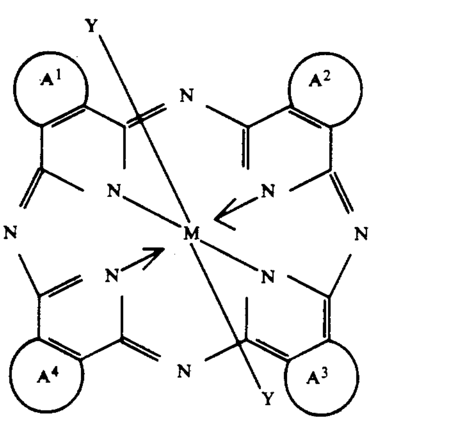

(I)

wherein M is Si; Y is a trialkylsiloxy group; and $A^1$, $A^2$, $A^3$ and $A^4$ are groups of the formula:

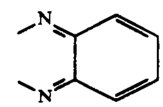

9. A tetraazaporphin according to claim 8, wherein Y is a triethylsiloxy group.

10. A tetraazaporphin according to claim 1, which is represented by the formula:

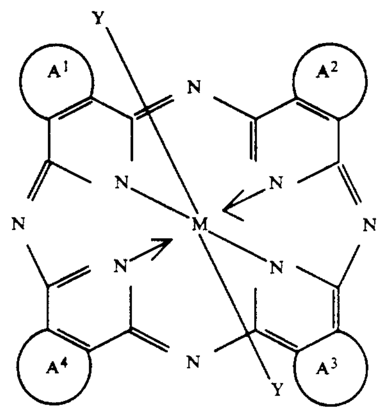

(I)

wherein M is Si; Y is a trialkylsiloxy group; and $A^1$, $A^2$, $A^3$ and $A^4$ are groups of the formula:

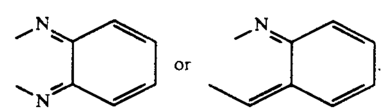

11. A tetraazaporphin according to claim 10, wherein $A^1$, $A^2$, $A^3$ and $A^4$ are groups of the formula:

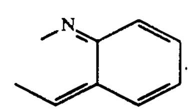

12. A tetraazaporphin according to claim 10, wherein Y is a triethylsiloxy group or a tributysiloxy group; and $A^1$, $A^2$, $A^3$ and $A^4$ are groups of the formula:

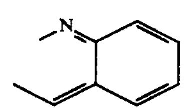

13. A tetraazaporphin according to claim 1, wherein $A^1$, $A^2$, $A^3$ and $A^4$ are independently nitrogen-containing aromatic rings selected from the group consisting of

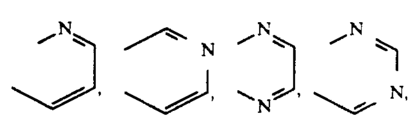

-continued
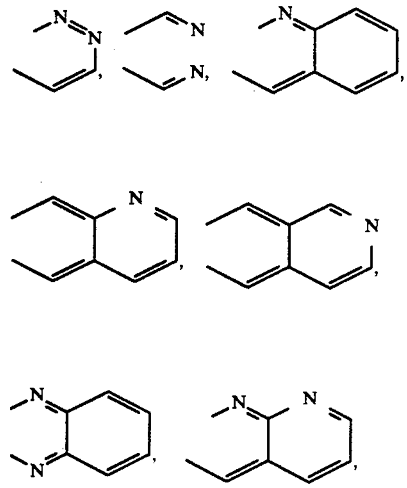
-continued
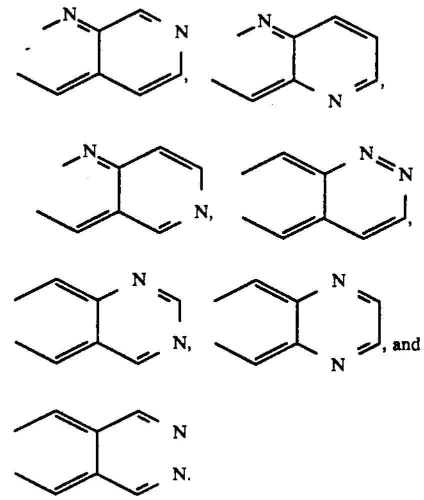
14. A tetraazaporphin according to claim 1, wherein $A^1$, $A^2$, $A^3$ and $A^4$ are the same.
* * * * *